US011488510B2

(12) United States Patent
Mandle et al.

(10) Patent No.: US 11,488,510 B2
(45) Date of Patent: Nov. 1, 2022

(54) SYSTEM AND METHOD FOR A MULTI-PRIMARY WIDE GAMUT COLOR SYSTEM

(71) Applicant: Baylor University, Waco, TX (US)

(72) Inventors: Gary B. Mandle, Los Altos, CA (US); James M. DeFilippis, Pacific Palisades, CA (US); Mitchell J. Bogdanowicz, Somis, CA (US); Corey P. Carbonara, Waco, TX (US); Michael F. Korpi, Hewitt, TX (US)

(73) Assignee: BAYLOR UNIVERSITY, Waco, TX (US)

( * ) Notice: Subject to any disclaimer, the term of this patent is extended or adjusted under 35 U.S.C. 154(b) by 0 days.

(21) Appl. No.: 17/727,372

(22) Filed: Apr. 22, 2022

(65) Prior Publication Data

US 2022/0254295 A1 Aug. 11, 2022

Related U.S. Application Data

(63) Continuation-in-part of application No. 17/671,074, filed on Feb. 14, 2022, which is a continuation-in-part (Continued)

(51) Int. Cl.

*G09G 3/20* (2006.01)
*G02F 1/1335* (2006.01)

(Continued)

(52) U.S. Cl.

CPC .......... *G09G 3/2003* (2013.01); *G02B 5/201* (2013.01); *G02F 1/133514* (2013.01);

(Continued)

(58) Field of Classification Search

None

See application file for complete search history.

(56) References Cited

U.S. PATENT DOCUMENTS

| | | |
|---|---|---|
| 3,481,258 A | 12/1969 | Mori et al. |
| 3,971,065 A | 7/1976 | Bayer |

(Continued)

FOREIGN PATENT DOCUMENTS

| | | |
|---|---|---|
| JP | 2003315529 A | 11/2003 |
| WO | 2017184784 A1 | 10/2017 |

OTHER PUBLICATIONS

Toda et al. "High Dynamic Range Rendering for YUV Images with a constrainton Perceptual Chroma Preservation", ICIP 2009 (Year: 2009).*

(Continued)

*Primary Examiner* — Yingchun He
(74) *Attorney, Agent, or Firm* — Neo IP

(57) ABSTRACT

Systems and methods for a multi-primary color system for display. A multi-primary color system increases the number of primary colors available in a color system and color system equipment. Increasing the number of primary colors reduces metameric errors from viewer to viewer. One embodiment of the multi-primary color system includes Red, Green, Blue, Cyan, Yellow, and Magenta primaries. The systems of the present invention maintain compatibility with existing color systems and equipment and provide systems for backwards compatibility with older color systems.

20 Claims, 262 Drawing Sheets
(213 of 262 Drawing Sheet(s) Filed in Color)

Related U.S. Application Data of application No. 17/670,018, filed on Feb. 11, 2022, now Pat. No. 11,315,467, which is a continuation-in-part of application No. 17/516,143, filed on Nov. 1, 2021, now Pat. No. 11,341,890, which is a continuation-in-part of application No. 17/338,357, filed on Jun. 3, 2021, now Pat. No. 11,189,210, which is a continuation-in-part of application No. 17/225,734, filed on Apr. 8, 2021, now Pat. No. 11,289,000, which is a continuation-in-part of application No. 17/076,383, filed on Oct. 21, 2020, now Pat. No. 11,069,279, which is a continuation-in-part of application No. 17/009,408, filed on Sep. 1, 2020, now Pat. No. 11,043,157, which is a continuation-in-part of application No. 16/887,807, filed on May 29, 2020, now Pat. No. 10,950,162, which is a continuation-in-part of application No. 16/860,769, filed on Apr. 28, 2020, now Pat. No. 10,950,161, which is a continuation-in-part of application No. 16/853,203, filed on Apr. 20, 2020, now Pat. No. 10,997,896, which is a continuation-in-part of application No. 16/831,157, filed on Mar. 26, 2020, now Pat. No. 10,950,160, which is a continuation of application No. 16/659,307, filed on Oct. 21, 2019, now Pat. No. 10,607,527.

(60) Provisional application No. 62/876,878, filed on Jul. 22, 2019, provisional application No. 62/847,630, filed on May 14, 2019, provisional application No. 62/805,705, filed on Feb. 14, 2019, provisional application No. 62/750,673, filed on Oct. 25, 2018.

(51) Int. Cl.

*G09G 3/34* (2006.01)
*G09G 5/02* (2006.01)
*G02B 5/20* (2006.01)

(52) U.S. Cl.

CPC ............ *G09G 3/3413* (2013.01); *G09G 5/02* (2013.01); *G09G 2300/0452* (2013.01); *G09G 2320/0242* (2013.01); *G09G 2340/06* (2013.01)

(56) References Cited

U.S. PATENT DOCUMENTS 4,489,349 A 12/1984 Okada
5,216,522 A 6/1993 Ishikawa
5,479,189 A 12/1995 Chesavage et al.
5,844,629 A 12/1998 Murray et al.
6,160,579 A 12/2000 Shiraiwa et al.
6,175,644 B1 1/2001 Scola et al.
6,539,110 B2 3/2003 Myers
6,570,584 B1 5/2003 Cok et al.
6,769,772 B2 8/2004 Roddy et al.
6,870,523 B1 3/2005 Ben-David et al.
6,897,876 B2 5/2005 Murdoch et al.
6,962,414 B2 11/2005 Roth
7,077,524 B2 7/2006 Roth
7,113,152 B2 9/2006 Ben-David et al.
7,242,478 B1 7/2007 Dombrowski et al.
7,535,433 B2 5/2009 Ledebohm et al.
7,627,167 B2 12/2009 Roth et al.
7,787,702 B2 8/2010 Elliott et al.
7,812,797 B2 10/2010 Joo et al.
7,876,341 B2 1/2011 Credelle et al.
7,916,939 B2 3/2011 Roth et al.
7,929,193 B2 4/2011 Roth
7,948,507 B2 5/2011 Okada et al.
7,990,393 B2 8/2011 Higgins
8,018,476 B2 9/2011 Credelle et al.
8,044,967 B2 10/2011 Belik et al.
8,063,862 B2 11/2011 Hisatake
8,081,835 B2 12/2011 Elliott et al.
8,228,275 B2 7/2012 Langendijk
8,237,751 B2 8/2012 Belik
8,248,430 B2 8/2012 Hekstra et al.
8,310,498 B2 11/2012 Ben-Chorin et al.
8,339,344 B2 12/2012 Okada et al.
8,390,652 B2 3/2013 Nakanishi et al.
8,405,675 B2 3/2013 Peng et al.
8,405,687 B2 3/2013 Miyazaki et al.
8,411,022 B2 4/2013 Elliott et al.
8,436,875 B2 5/2013 Ueki et al.
8,451,405 B2 5/2013 Roth et al.
8,599,226 B2 12/2013 Ben-Chorin et al.
8,654,050 B2 2/2014 Ueki et al.
8,698,856 B2 4/2014 Roth et al.
8,717,348 B2 5/2014 Basile et al.
8,773,340 B2 7/2014 Tomizawa et al.
8,837,562 B1 9/2014 Betts et al.
8,885,120 B2 11/2014 Ben-David et al.
8,911,291 B2 12/2014 Liu
8,922,603 B2 12/2014 Yonemaru et al.
8,979,272 B2 3/2015 Roth
8,982,038 B2 3/2015 Higgins et al.
8,982,144 B2 3/2015 Park
9,035,969 B2 5/2015 Ivashin et al.
9,041,724 B2 5/2015 Zeng et al.
9,091,884 B2 7/2015 Kim et al.
9,099,046 B2 8/2015 Whitehead et al.
9,117,711 B2 8/2015 Suzuki et al.
9,147,362 B2 9/2015 Znamenskiy et al.
9,280,940 B2 3/2016 Chen et al.
9,307,616 B2 4/2016 Robinson et al.
9,311,841 B2 4/2016 Nakagawa et al.
9,317,939 B2 4/2016 Yang et al.
9,318,075 B2 4/2016 Kim et al.
9,324,286 B2 4/2016 Mori et al.
9,373,305 B2 6/2016 Kawaguchi
9,412,316 B2 8/2016 Ben-David et al.
9,430,974 B2 8/2016 Roth
9,430,986 B2 8/2016 Ito et al.
9,583,054 B2 2/2017 Nakagawa et al.
9,607,576 B2 3/2017 Buckley
9,659,517 B2 5/2017 Wu
9,697,761 B2 7/2017 Li
9,886,932 B2 2/2018 Yoshida et al.
9,911,176 B2 3/2018 Griffin et al.
9,911,387 B2 3/2018 Kim et al.
9,953,590 B2 4/2018 Ben-David et al.
9,966,014 B2 5/2018 Yashiki
10,079,963 B1 9/2018 Liu et al.
10,162,590 B2 12/2018 Ritter
10,185,533 B2 1/2019 Kim et al.
10,222,263 B2 3/2019 Shigezane
10,504,437 B2 12/2019 Zhang et al.
10,607,527 B1 3/2020 Mandle
10,832,611 B2 11/2020 Xi et al.
10,847,498 B2 11/2020 Nakamura et al.
10,896,635 B2 1/2021 Xi et al.
2001/0021260 A1 9/2001 Chung et al.
2002/0130957 A1 9/2002 Gallagher et al.
2003/0137610 A1 7/2003 Ohsawa
2004/0017379 A1 1/2004 Ajito et al.
2004/0070736 A1 4/2004 Roddy et al.
2004/0070834 A1 4/2004 Hendrix et al.
2004/0145599 A1 7/2004 Taoka et al.
2004/0196381 A1 10/2004 Matsuzaka
2004/0263638 A1 12/2004 Ohsawa et al.
2005/0083344 A1 4/2005 Higgins
2005/0083352 A1 4/2005 Higgins
2005/0099426 A1 5/2005 Primerano et al.
2005/0134808 A1 6/2005 Pettitt
2005/0190967 A1 9/2005 Ok et al.
2005/0244051 A1 11/2005 Shiohara
2005/0275806 A1 12/2005 Roth
2005/0280851 A1 12/2005 Kim et al.
2006/0285217 A1 12/2006 Roth
2007/0001994 A1 1/2007 Roth

(56) References Cited

U.S. PATENT DOCUMENTS

2007/0035752 A1 2/2007 Evans et al.
2007/0052861 A1 3/2007 Osawa et al.
2007/0070086 A1 3/2007 Elliott et al.
2007/0118821 A1 5/2007 Yee et al.
2007/0160057 A1 7/2007 Kimn et al.
2007/0165946 A1 7/2007 Hong et al.
2007/0176948 A1 8/2007 Ben-David et al.
2007/0189266 A1 8/2007 Izumi et al.
2007/0199039 A1 8/2007 Diroo et al.
2007/0220525 A1 9/2007 State et al.
2007/0268205 A1 11/2007 Sasaguri
2008/0012805 A1 1/2008 Duncan et al.
2008/0018506 A1 1/2008 Raveendran
2008/0024410 A1 1/2008 Ben-David et al.
2008/0158097 A1 7/2008 Guo
2008/0204469 A1 8/2008 Jaspers
2008/0252797 A1 10/2008 Hamer et al.
2008/0303927 A1 12/2008 Khanh
2009/0058777 A1 3/2009 Cheng
2009/0085924 A1 4/2009 Ben-Chorin et al.
2009/0091582 A1 4/2009 Ajito et al.
2009/0096815 A1 4/2009 Fukuda et al.
2009/0313669 A1 12/2009 Boudani et al.
2010/0103200 A1 4/2010 Langendijk
2010/0118047 A1 5/2010 Ajito et al.
2010/0188437 A1 7/2010 Itoh et al.
2010/0214315 A1 8/2010 Nguyen et al.
2010/0265283 A1 10/2010 Langendijk et al.
2011/0080520 A1 4/2011 Tomizawa et al.
2011/0148910 A1 6/2011 Botzas et al.
2011/0188744 A1 8/2011 Sun
2011/0255608 A1 10/2011 Kim et al.
2011/0273493 A1 11/2011 Yoshiga et al.
2011/0303750 A1 12/2011 Wang
2011/0316973 A1 12/2011 Miller et al.
2012/0117365 A1 5/2012 Navy et al.
2012/0242719 A1 9/2012 Klompenhouwer et al.
2012/0287146 A1 11/2012 Elliott et al.
2012/0287168 A1 11/2012 Botzas et al.
2012/0299946 A1 11/2012 Kim et al.
2013/0010187 A1* 1/2013 Yamashita ....... H04N 21/43635 348/E7.003
2013/0063573 A1 3/2013 Erinjippurath
2013/0278993 A1 10/2013 Heikenfeld et al.
2014/0022410 A1 1/2014 Gish et al.
2014/0028698 A1 1/2014 Maier et al.
2014/0028699 A1 1/2014 Kurtz et al.
2014/0043371 A1 2/2014 Langendijk et al.
2014/0092105 A1 4/2014 Guttag et al.
2014/0218511 A1 8/2014 Lee
2014/0218610 A1 8/2014 Chujoh et al.
2014/0225912 A1 8/2014 Govil et al.
2014/0341272 A1 11/2014 Miller et al.
2015/0022685 A1 1/2015 Gish et al.
2015/0189329 A1 7/2015 Wada
2015/0256778 A1 9/2015 Kusaka
2015/0339996 A1 11/2015 Schuck et al.
2016/0005349 A1* 1/2016 Atkins ..................... H04N 9/68 345/591
2016/0117993 A1 4/2016 Buckley et al.
2016/0125580 A1* 5/2016 He .......................... H04N 9/68 345/590
2016/0205367 A1 7/2016 Wallace et al.
2016/0300538 A1 10/2016 Lee et al.
2016/0360214 A1 12/2016 Rojals et al.
2017/0006273 A1 1/2017 Borer et al.
2017/0026646 A1 1/2017 Minoo et al.
2017/0085878 A1 3/2017 Rojals et al.
2017/0085896 A1 3/2017 Ramasubramonian et al.
2017/0140556 A1 5/2017 Safaee-Rad et al.
2017/0147516 A1 5/2017 De
2017/0153382 A1 6/2017 Wang et al.
2017/0200309 A1 7/2017 Qian et al.
2017/0201751 A1 7/2017 Seo
2017/0285307 A1 10/2017 Kamm et al.
2017/0339418 A1 11/2017 Ramasubramonian et al.
2018/0007374 A1 1/2018 Atkins et al.
2018/0063500 A1 3/2018 Rusanovskyy et al.
2018/0084024 A1 3/2018 Xie et al.
2018/0146533 A1 5/2018 Goodman et al.
2018/0160127 A1 6/2018 Ström et al.
2018/0198754 A1 7/2018 Kielhofner et al.
2018/0224333 A1 8/2018 Sakakibara et al.
2018/0308410 A1 10/2018 Chen
2018/0324481 A1 11/2018 Bordes et al.
2018/0348574 A1 12/2018 Lin et al.
2018/0376047 A1 12/2018 Li et al.
2019/0043179 A1 2/2019 Lucas et al.
2019/0069768 A1 3/2019 Chiba
2019/0098317 A1 3/2019 Lu et al.
2019/0130519 A1 5/2019 Hu et al.
2019/0141291 A1 5/2019 McNelley et al.
2019/0147832 A1 5/2019 Kim et al.
2019/0158894 A1 5/2019 Lee et al.
2019/0172415 A1 6/2019 Davis et al.
2019/0265552 A1 8/2019 Shiomi
2019/0356881 A1 11/2019 Huang et al.
2020/0045340 A1 2/2020 Chen et al.
2020/0105221 A1 4/2020 Marcu et al.
2020/0105657 A1 4/2020 Lee et al.
2020/0128220 A1 4/2020 Bao et al.
2020/0144327 A1 5/2020 Lee et al.
2020/0209678 A1 7/2020 Hsu et al.
2020/0226965 A1 7/2020 Xi et al.
2020/0226967 A1 7/2020 Mandle
2020/0251039 A1 8/2020 Mandle et al.
2020/0258442 A1 8/2020 Mandle et al.
2020/0294439 A1 9/2020 Mandle et al.
2020/0402441 A1 12/2020 Mandle
2021/0020094 A1 1/2021 Bogdanowicz et al.
2021/0027692 A1 1/2021 Mandle et al.
2021/0027693 A1 1/2021 Mandle et al.
2021/0035486 A1 2/2021 Mandle
2021/0035487 A1 2/2021 Bogdanowicz et al.
2021/0043127 A1 2/2021 Bogdanowicz et al.
2021/0097922 A1 4/2021 Mandle
2021/0097923 A1 4/2021 Mandle
2021/0097943 A1 4/2021 Wyatt
2021/0174729 A1 6/2021 Mandle
2021/0233454 A1 7/2021 Mandle et al.
2021/0272500 A1 9/2021 Mandle
2021/0280118 A1 9/2021 Mandle et al.
2021/0295762 A1 9/2021 Mandle et al.
2021/0304657 A1 9/2021 Mandle
2021/0327330 A1 10/2021 Bogdanowicz et al.
2021/0335188 A1 10/2021 Mandle
2021/0343219 A1 11/2021 Bogdanowicz et al.
2021/0390899 A1 12/2021 Mandle
2022/0051605 A1 2/2022 Bogdanowicz et al.

OTHER PUBLICATIONS

"Affordable Colour Grading Monitors", downloaded@https://jonnyelwyn.co.uk/film-and-video-editing/affordable-colour-grading-monitors-2/, posted on Apr. 4, 2015 (Year: 2015).

"Color Temperature Scale", downloaded@https://web.archive.org/web/20170711064110/https://www.atlantalightbulbs.com/color-temperature-scale/, available online Jul. 2017 (Year: 2017).

Ajito, T., Obi, T., Yamaguchi, M., & Ohyama, N. (2000). Expanded color gamut reproduced by six-primary projection display. In Projection Displays 2000: Sixth in a Series (vol. 3954, pp. 130-138). International Society for Optics and Photonics. https://doi.org/10.1117/12.383364.

Baylor University, U.S. Appl. No. 17/516,143, Non-Provisional Patent Application; Entire Document.

Brill, M. H., & Larimer, J. (2005a). Avoiding on-screen metamerism in N-primary displays. Journal of the Society for Information Display, 13(6), 509-516. https://doi.org/10.1889/1.1974003.

Brill, M. H., & Larimer, J. (2005b). Color-matching issues in multi-primary displays. SID Conference Record of the International Display Research Conference, 119-122.

(56) References Cited

OTHER PUBLICATIONS

Centore, et. al, Extensible Multi-Primary Control Sequences, Oct. 2011.
Chan, C.-C., Wei, G.-F., Hui, C.-K., & Cheng, S.-W. (2007). Development of multi-primary color LCD.
Chang, C.-K. (2013). The Effect on Gamut Expansion of Real Object Colors in Multi-primary Display. Retrieved from http://www.color.org/events/chiba/Chang.pdf.
ColorSpace.Rgb, downloaded@https://web.archive.org/ web/20171113045313/ https://developer.android.com/reference/ android/graphics/ ColorSpace.Rgb.html, archived on Nov. 13, 2017 (Year: 2017).
Consumer Technology Association CTA Standard CTA-861-G (Nov. 2016). A DTV Profile for Uncompressed High Speed Digital Interfaces including errata dated Sep. 13, 2017 and Nov. 28, 2017.
CYGM filter, Wikipedia published on Dec. 14, 2017, downloaded@https://en.wikipedia.org/w/index.php?title=CYGM_filter&oldid=815388285 (Year: 2017).
De Vaan, A. T. S. M. (2007). Competing display technologies for the best image performance. Journal of the Society for Information Display, 15(9), 657-666. https://doi org/10.1889/1.2785199.
Decarlo, Blog "4:4:4 vs 4:2:0: Which Chroma Subsampling Do You Need for Your Video Application?", posted on May 2, 2014 @ https://www.semiconductorstore.com/blog/2014/444-vs-420 chroma subsampling/667/ (Year: 2014).
Display Daily WCG Standards Needed for Multi-Primary Displays, Matthew Brennesholtz. https://www.displaydaily.com/article/display-daily/wcg-standards-needed-for-multi-primary-displays.
Dolby Labs white paper V7.2 What is ICtCp? https://www.dolby.com/us/en/technologies/dolby-vision/ICtCp-white-paper.pdf.
Eliav, D., Roth, S., & Chorin, M. B. (2006). Application driven design of multi-primary displays.
Hsieh, Y.-F., Chuang, M.-C., Ou-Yang, M., Huang, S.-W., Li, J., & Kuo, Y.-T. (2008). Establish a six-primary color display without pixel-distortion and brightness loss. In Emerging Liquid Crystal Technologies III (vol. 6911, p. 69110R). International Society for Optics and Photonics. https://doi.org/10.1117/12.762944.
Jansen, "The Pointer's Gamut—The Coverage of Real Surface Colors by RGB Color Spaces and Wide Gamut Displays", TFT Central, downloaded @https://tftcentral.co.uk/articles/pointers_gamut, posted on Feb. 19, 2014 (Year: 2014).
Kerr, The CIE XYZ and xyY Color Space, downloaded @ https://graphics.stanford.edu/courses/cs148-10-summer/docs/2010-kerr--cie_xyz.pdf, Mar. 21, 2010 (Year: 2010).
Langendijk, E. H. A., Belik, O., Budzelaar, F., & Vossen, F. (2007). Dynamic Wide-Color-Gamut RGBW Display. SID Symposium Digest of Technical Papers, 38(1), 1458-1461. https://doi.org/10.1889/1.2785590.
Li, Y., Majumder, A., Lu, D., & Gopi, M. (2015) Content-Independent Multi-Spectral Display Using Superimposed Projections. Computer Graphics Forum, 34(2), 337-348. https://doi.org/10.1111/cgf.12564.
Lovetskiy et al. "Numerical modeling of color perception of optical radiation", Mathematical Modelling and Geometry, vol. 6, No. 1, pp. 21-36, 2018 (Year: 2018).
Nagase, A., Kagawa, S., Someya, J., Kuwata, M., Sasagawa, T., Sugiura, H., & Miyata, A. (2007). Development of PTV Using Six-Primary-Color Display Technology. SID Symposium Digest of Technical Papers, 38(1), 27-30. https://doi.org/10.1889/1.2785217.
Noble, The Technology Inside the New Kodak Professional DCS 620x Digital Camera High-Quality Images at Extremely High ISO Settings, available online @ https://web.archive.org/web/20160303171931/http://www.modernimaging.com/Kodak_DCS-620x_ Technology.htm on Mar. 3, 2016 (Year: 2016).
Pascale, A Review of RGB Color Spaces, downloaded @https://www.babelcolor.com/index_htm_files/A%20review%20of%20RGB%20color%20spaces.pdf, 2003 (Year: 2003).
Pointer, M. R. (1980), The Gamut of Real Surface Colours. Color Res. Appl., 5: 145-155. doi:10.1002/col.5080050308.
Poynton, Chroma subsampling notation, downloaded @ https://poynton.ca/PDFs/Chroma_subsampling_notation.pdf, published on Jan. 24, 2008 (Year: 2008).
RFC4566, SOP: Session Description Protocol, published in Jul. 2006 (Year: 2006).
Samsung You tube video "Quantum Dot Technology on Samsung monitors", posted on Mar. 24, 2017 (Year: 2017).
Song et al. Studies on different primaries for a nearly-ultimate gamut in a laser display, Optics Express, vol. 36, No. 18, Sep. 3, 2018 (Year: 2018).
Susstrunk, "Computing Chromatic Adaptation", PhD thesis, Univ. of East Anglia Norwich, Jul. 2005 (Year: 2005).
Trémeau, A., Tominaga, S., & Plataniotis, K. N. (2008). Color in Image and Video Processing: Most Recent Trends and Future Research Directions. EURASIP Journal on Image and Video Processing, 2008, 1-26. https://doi.org/10.1155/2008/581371.
Urban, "How Chroma Subsampling Works", downloaded @ https://blog.biamp.com/how-chroma-subsampling-works/, posted on Sep. 14, 2017 (Year: 2017).
Xilinx, Implementing SMPTE SDI Interfaces with 7 Series GTX transceivers, 2018 (Year: 2018).

* cited by examiner

System 1

12P sequence as 1920 x 1080

12P sequence as 3840 x 2160

12P sequence as 2048 x 1080

6P sequence as 1920 x 1080 Stereo 6P sequence as 3840 x 2160 Stereo $$E'_{CR} = \frac{E'_R - E'_{Y_6}}{1.7874}$$

$$E'_{CC} = \frac{E'_C - E'_{Y_6}}{1.6063}$$

$$E'_{CB} = \frac{E'_B - E'_{Y_6}}{1.9278}$$

$$E'_{CY} = \frac{E'_Y - E'_{Y_6}}{1.5361}$$

$$E_M = \frac{\frac{E_B}{2} + \frac{E_R}{2}}{2}$$

$$E'_R = \frac{E'_{CR} - Y'_6}{1.7874} \qquad E'_C = \frac{E'_{CC} - Y'_6}{1.6063}$$

$$E'_B = \frac{E'_{CB} - Y'_6}{1.9278} \qquad E'_Y = \frac{E'_{CY} - Y'_6}{1.5361}$$

| Value | Sampling | Value | Sampling | Value | Sampling | Value | Sampling |
|---|---|---|---|---|---|---|---|
| 0h | 4:2:2 (Y/Cb/Cr) | 1h | 4:4:4 (Y/Cb/Cr) | 2h | 4:4:4 (G/B/R) | 3h | 4:2:0 (Y/Cb/Cr) |
| 4h | 4:2:2:4 (Y/Cb/Cr/A) | 5h | 4:4:4:4 (Y/Cb/Cr/A) | 6h | 4:4:4:4 (G/B/R/A) | 7h | 4:2:0 (Y/Cb/Cr/Cc/Cy) |
| 8h | 4:2:2:4 (Y/Cb/Cr/D) | 9h | 4:4:4:4 (Y/Cb/Cr/D) | Ah | 4:4:4:4 (G/B/R/D) | Bh | 4:2:2 (CL-Y/Cb/Cr/Cc/Cy) |
| Ch | 4:2:2 (Y/Cb/Cr/Cc/Cy) | Dh | 4:4:4 (G/B/R/M/Y/C) | Eh | 4:4:4 (X'Y'Z') | Fh | Sys 1/Sys2 |

FIG. 71

| Value | Sampling | Value | Sampling | Value | Sampling | Value | Sampling |
|---|---|---|---|---|---|---|---|
| **0h** | Unknown/Unspecified | 1h | 4:2:2<br>10 bit | 2h | 4:4:4<br>10 bit | 3h | 4:4:4:4<br>10 bit |
| **4h** | Reserved | 5h | 4:2:2<br>12 bit | 6h | 4:4:4<br>12 bit | 7h | 4:4:4:4<br>12 bit |
| **8h** | (4:2:2:4)<br>12 bit | 9h | 6P 4:2:0<br>10 bit | Ah | 6P 4:2:0<br>12 bit | Bh | 6P 4:2:2<br>10 bit |
| **Ch** | 6P 4:2:2<br>12 bit | Dh | 6P 4:4:4<br>10 bit | Eh | 6P 4:4:4<br>12 bit | Fh | Reserved |

FIG. 72

| | R0' | G0' | B0' | R1' | G1' | B1' | R2' | G2' | B2' | R3' | G3' | B3' |
|---|---|---|---|---|---|---|---|---|---|---|---|---|
| $G'_{INT} + M'_{INT}$ | | O | | | O | | | O | | | O | |
| $R'_{INT} + C'_{INT}$ | O | | | O | | | O | | | O | | |
| $B'_{INT} + Y'_{INT}$ | | | O | | | O | | | O | | | O |

FIG. 73

| | R0' | G0' | B0' | R1' | G1' | B1' | R0' | G0' | B0' | R1' | G1' | B1' |
|---|---|---|---|---|---|---|---|---|---|---|---|---|
| $G'_{INT} + M'_{INT}$ | | O | | | O | | | O | | | O | |
| $R'_{INT} + C'_{INT}$ | O | | | O | | | O | | | O | | |
| $B'_{INT} + Y'_{INT}$ | | | O | | | O | | | O | | | O |

FIG. 74

| | Cb0’ | Y0’ | Cr0’ | Y1’ | Cb1’ | Y2’ | Cr1’ | Y3’ | Cb2’ | Y4’ | Cr2’ | Y5’ |
|---|---|---|---|---|---|---|---|---|---|---|---|---|
| $E'_{Y_6-INT}$ | | O | | O | | O | | O | | O | | O |
| $E'_{Cb-INT} + E'_{Cy-INT}$ | O | | | | O | | | | O | | | |
| $E'_{Cr-INT} + E'_{Cc-INT}$ | | | O | | | | O | | | | O | |

FIG. 75

| | Cb0' | Y0' | Cr0' | Y1' | Cb1' | Y2' | Cr1' | Y3' | Cb2' | Y4' | Cr2' | Y5' |
|---|---|---|---|---|---|---|---|---|---|---|---|---|
| $E'_{Y_6-INT}$ | | O | | O | | O | | O | | O | | O |
| $E'_{Cb-INT} + E'_{Cy-INT}$ | O | | | | O | | | | O | | | |
| $E'_{Cr-INT} + E'_{Cc-INT}$ | | | O | | | | O | | | | O | |

FIG. 77

| | R0' | G0' | B0' | R1' | G1' | B1' | R2' | G2' | B2' | R3' | G3' | B3' |
|---|---|---|---|---|---|---|---|---|---|---|---|---|
| $G'_{INT}$ | | O | | | | | | O | | | | |
| $B'_{INT}$ | | | O | | | | | | O | | | |
| $R'_{INT}$ | O | | | | | | O | | | | | |
| $M'_{INT}$ | | | | | O | | | | | | O | |
| $Y'_{INT}$ | | | | | | O | | | | | | O |
| $C'_{INT}$ | | | | O | | | | | | O | | |

FIG. 79

| | R0’ | G0’ | B0’ | R1’ | G1’ | B1’ | R0’ | G0’ | B0’ | R1’ | G1’ | B1’ |
|---|---|---|---|---|---|---|---|---|---|---|---|---|
| $G'_{INT}$ | | O | | | | | | O | | | | |
| $R'_{INT}$ | | | O | | | | | | O | | | |
| $B'_{INT}$ | O | | | | | | O | | | | | |
| $M'_{INT}$ | | | | | O | | | | | | O | |
| $Y'_{INT}$ | | | | | | O | | | | | | O |
| $C'_{INT}$ | | | | O | | | | | | O | | |

| | R2’ | G2’ | B2’ | R3’ | G3’ | B3’ | R2’ | G2’ | B2’ | R3’ | G3’ | B3’ |
|---|---|---|---|---|---|---|---|---|---|---|---|---|
| $G'_{INT}$ | | O | | | | | | O | | | | |
| $R'_{INT}$ | | | O | | | | | | O | | | |
| $B'_{INT}$ | O | | | | | | O | | | | | |
| $M'_{INT}$ | | | | | O | | | | | | O | |
| $Y'_{INT}$ | | | | | | O | | | | | | O |
| $C'_{INT}$ | | | | O | | | | | | O | | |

FIG. 80

| | Cb0' | Y0' | Cr0' | Y1' | Cb1' | Y2' | Cr1' | Y3' | Cb2' | Y4' | Cr2' | Y5' |
|---|---|---|---|---|---|---|---|---|---|---|---|---|
| $E'_{Y_{RGB}-INT}$ | | O | | | | O | | | | O | | |
| $E'_{Y_{CYM}-INT}$ | | | | O | | | | O | | | | O |
| $E'_{Cr-INT}$ | | | O | | | | | | O | | | |
| $E'_{Cb-INT}$ | O | | | | | | | | | | O | |
| $E'_{Cc-INT}$ | | | | | | | O | | | | | |
| $E'_{Cy-INT}$ | | | | | O | | | | | | | |

FIG. 81

| | Cb0’ | Y0’ | Cr0’ | Y1’ | Cb1’ | Y2’ | Cr1’ | Y3’ | Cb2’ | Y4’ | Cr2’ | Y5’ |
|---|---|---|---|---|---|---|---|---|---|---|---|---|
| $E'_{Y_{RGB}-INT}$ | | O | | | | O | | | | O | | |
| $E'_{Y_{CYM}-INT}$ | | | | O | | | | O | | | | O |
| $E'_{Cr-INT}$ | O | | | | | | | | O | | | |
| $E'_{Cb-INT}$ | | | O | | | | | | | | O | |
| $E'_{Cc-INT}$ | | | | | O | | | | | | | |
| $E'_{Cy-INT}$ | | | | | | | O | | | | | |

FIG. 82

1/3 DRR

| Bits | Byte 2 | Byte 3 | Byte 4 |
|---|---|---|---|
| Bit 7 | Interlaced (0) or<br>Progressive (1) transport | Aspect ratio<br>16:9 (1), unknown (0) | Reserved |
| Bit 6 | Interlaced (0) or<br>Progressive (1) picture | Horizontal Pixel Array<br>Size<br>1920 (0) or 2048 (1) | Reserved |
| Bit 5<br>Bit 4 | Transfer characteristics<br><br>SDR-TV (0h)<br>HLG (1h)<br>PQ (2h)<br>Unspecified (3h) | Colorimetry<br><br>Rec 709*1 (0h)<br>Reserved (1h)<br>UHDTV*2 (2h)<br>Unknown (3h) | Luminance, Color Difference,<br>or Colorimetric<br>Y'C'BC'R (0h)<br>ICTCP (1h)<br>Y'xy/Yu'v' (2h)<br>Unspecified (3h) |
| Bit 3 | Picture Rate<br>(Refer to SMPTE ST 352<br>Table 2) | Sampling structure<br>(Refer to Table 5a) | Yxy (0h) Yu'v' (1h) |
| Bit 2 | | | Reserved |
| Bit 1<br>Bit 0 | | | Bit depth<br>10-bit Full Range (0h),<br>10-bit (1h),<br>Bit 0 12-bit (2h),<br>12-bit Full Range (3h) |

*1 Rec 709 indicates Conventional System Colorimetry as defined in Recommendation ITU-R BT.709 and referenced in SMPTE ST274.

*2 UHDTV indicates Recommendation ITU-R BT.2020 Reference primaries and reference white as referred in Recommendation ITU-R BT.2100

FIG. 113

Payload ID per S352:2013 & S292:2018
Byte 3/Bits 0-3

| Value | Sampling | Value | Sampling | Value | Sampling | Value | Sampling |
|---|---|---|---|---|---|---|---|
| 0h | 4:2:2<br>($Y/C_b/C_r$) or ($I/C_t/C_p$) or (Y/x/y) or (Y/u'/v') | 1h | 4:4:4<br>($Y/C_b/C_r$) or ($I/C_t/C_p$) or (Y/x/y) or (Y/u'/v') | 2h | 4:4:4<br>(R/G/B) | 3h | 4:2:0<br>($Y/C_b/C_r$) or ($I/C_t/C_p$) or (Y/x/y) or (Y/u'/v') |
| 4h | 4:2:2:4<br>($Y/C_b/C_r/A$) or ($I/C_t/C_p/A$) or (Y/x/y/A) or (Y/u'/v'/A) | 5h | 4:4:4:4<br>($Y/C_b/C_r/A$) or ($I/C_t/C_p/A$) or (Y/x/y/A) or (Y/u'/v'/A) | 6h | 4:4:4:4<br>(R/G/B/A) | 7h | SMPTE ST2048-2 FS |
| 8h | 4:2:2:4<br>($Y/C_b/C_r/D$) or ($I/C_t/C_p/D$) or (Y/x/y/D) or (Y/u'/v'/D) | 9h | 4:4:4:4<br>($Y/C_b/C_r/D$) or ($I/C_t/C_p/D$) or (Y/x/y/D) or (Y/u'/v'/D) | Ah | 4:4:4:4<br>(R/G/B/D) | Bh | Reserved |
| Ch | Reserved | Dh | Reserved | Eh | 4:4:4<br>(X/Y/Z) | Fh | Reserved |

FIG. 114A

Payload ID per S352:2013 & S372:2017
Byte 3/Bits 0-3

| Value | Sampling | Value | Sampling | Value | Sampling | Value | Sampling |
|---|---|---|---|---|---|---|---|
| 0h | 4:2:2<br>$(Y/C_b/C_r)$ or $(I/C_t/C_p)$ or $(Y/x/y)$ or $(Y/u'/v')$ | 1h | 4:4:4<br>$(Y/C_b/C_r)$ or $(I/C_t/C_p)$ or $(Y/x/y)$ or $(Y/u'/v')$ | 2h | 4:4:4<br>(R/G/B) | 3h | 4:2:0<br>$(Y/C_b/C_r)$ or $(I/C_t/C_p)$ or $(Y/x/y)$ or $(Y/u'/v')$ |
| 4h | 4:2:2:4<br>$(Y/C_b/C_r/A)$ or $(I/C_t/C_p/A)$ or $(Y/x/y/A)$ or $(Y/u'/v'/A)$ | 5h | 4:4:4:4<br>$(Y/C_b/C_r/A)$ or $(I/C_t/C_p/A)$ or $(Y/x/y/A)$ or $(Y/u'/v/A')$ | 6h | 4:4:4:4<br>(R/G/B/A) | 7h | SMPTE ST2048-2 FS |
| 8h | 4:2:2:4<br>$(Y/C_b/C_r/D)$ or $(I/C_t/C_p/D)$ or $(Y/x/y/D)$ or $(Y/u'/v'/D)$ | 9h | 4:4:4:4<br>$(Y/C_b/C_r/D)$ or $(I/C_t/C_p/D)$ or $(Y/x/y/D)$ or $(Y/u'/v'/D)$ | Ah | 4:4:4:4<br>(R/G/B/D) | Bh | Reserved |
| Ch | Reserved | Dh | Reserved | Eh | 4:4:4<br>(X/Y/Z) | Fh | Reserved |

FIG. 114B

Payload ID per S352:2013 & S425:2017
Byte 3/Bits 0-3

| Value | Sampling | Value | Sampling | Value | Sampling | Value | Sampling |
|---|---|---|---|---|---|---|---|
| 0h | 4:2:2<br>($Y/C_b/C_r$) or ($I/C_t/C_p$) or ($Y/x/y$) or ($Y/u'/v'$) | 1h | 4:4:4<br>($Y/C_b/C_r$) or ($I/C_t/C_p$) or ($Y/x/y$) or ($Y/u'/v'$) | 2h | 4:4:4<br>(R/G/B) | 3h | 4:2:0<br>($Y/C_b/C_r$) or ($I/C_t/C_p$) or ($Y/x/y$) or ($Y/u'/v'$) |
| 4h | 4:2:2:4<br>($Y/C_b/C_r$+A) or ($I/C_t/C_p$+A) or (Y/x/y+A) or (Y/u'/v'+A) | 5h | 4:4:4:4<br>($Y/C_b/C_r$+A) or ($I/C_t/C_p$+A) or (Y/x/y+A) or (Y/u'/v'+A) | 6h | 4:4:4:4<br>(R/G/B/A) | 7h | SMPTE ST2048-2 FS |
| 8h | 4:2:2:4<br>($Y/C_b/C_r$+D) or $Y/C_b/C_r$ or ($I/C_t/C_p$+D) or (Y/x/y+D) or (Y/u'/v'+D) | 9h | 4:4:4:4<br>($Y/C_b/C_r$+D) or $Y/C_b/C_r$ or ($I/C_t/C_p$+D) or (Y/x/y+D) or (Y/u'/v'+D) | Ah | 4:4:4:4<br>(R/G/B/D) | Bh | Reserved |
| Ch | Reserved | Dh | Reserved | Eh | 4:4:4<br>(X/Y/Z) | Fh | Reserved |

FIG. 114C

| Item | | 10 bit system | 12 bit system | ST Notes |
|---|---|---|---|---|
| R'G'B'Y' xy-u'v' | Signal level of 100% | 3ACh ($940_{10}$) | EB0h ($3760_{12}$) | Section 7.5 |
| | Signal Level of 0% | 040h ($64_{10}$) | 100h ($256_{12}$) | |
| | Headroom for Overshoot | 3ADh-3FBh ($941_{10}$-$1019_{10}$) | EB1h-FEFh ($3761_{12}$-$4079_{12}$) | Section 7.10 |
| | Footroom for Undershoot | 004h-03Fh ($4_{10}$-$63_{10}$) | 010h-0FFh ($16_{12}$-$255_{12}$) | |
| $C'_B$, $C'_R$ | Signal level of 50% | 3C0h ($960_{10}$) | F00h ($3840_{12}$) | Section 7.6 |
| | Signal Level of 0% | 200h ($512_{10}$) | 800h ($2048_{12}$) | |
| | Signal level of -50% | 040h ($64_{10}$) | 100h ($256_{12}$) | |
| | Headroom for Overshoot | 3C1h-3FBh ($961_{10}$-$1019_{10}$) | F01h-FEFh ($3841_{12}$-$4097_{12}$) | Section 7.10 |
| | Footroom for Undershoot | 004h-03Fh ($4_{10}$-$63_{10}$) | 010h-0FFh ($16_{12}$-$255_{12}$) | |
| Y'xy-u'v' | Signal level of 100% | $1019_{10}$ | $4079_{12}$ | To be added |
| | Signal Level of 0% | $4_{10}$ | $16_{12}$ | |
| Prohibited codes | Upper Range | 3FCh-3FFh ($1020_{10}$-$1023_{10}$) | FF0h-FFFh ($4080_{12}$-$4095_{12}$) | Section 7.8 |
| | Lower Range | 000h-003h ($0_{10}$-$3_{10}$) | 000h-00Fh ($0_{12}$-$15_{12}$) | |

FIG. 127

| | Transfer Function | | | |
|---|---|---|---|---|
| Colorimetry | Gamma-SDR (P=100cd/m² unless specified below) | Gamma – HDR (P=max_display_ mastering_luminance) | PQ | HLG |
| RGB | Rec. ITU-R BT.709 [7] Item 1.2 | Rec. ITU-R BT.709 [7] Item 1.2 | Rec.ITU-R BT.2100 [48] Table 4 | Rec.ITU-R BT.2100 [48] Table 5 |
| opRGB | γ=2.19921875 P=160 cd/m² | γ=2.19921875 | Rec.ITU-R BT.2100 [48] Table 4 | Rec.ITU-R BT.2100 [48] Table 5 |
| Rec.ITU-R BT.2020 R'G'B' | Rec.ITU-R BT.2020 [40] Table 4 | Rec.ITU-R BT.2020 [40] Table 4 | Rec.ITU-R BT.2100 [48] Table 4 | Rec.ITU-R BT.2100 [48] Table 5 |
| SMPTE ST2113 P3D65 R'G'B' | γ=2.6 P=48 cd/m² | γ=2.6 | Rec.ITU-R BT.2100 [48] Table 4 | Rec.ITU-R BT.2100 [48] Table 5 |
| SMPTE ST2113 P3DCI R'G'B' | γ=2.6 P=48 cd/m² | γ=2.6 | Rec.ITU-R BT.2100 [48] Table 4 | Rec.ITU-R BT.2100 [48] Table 5 |
| SMPTE ST170 or Rec.ITU-R BT.709 | Rec. ITU-R BT.709 [7] Item 1.2 | Rec. ITU-R BT.709 [7] Item 1.2 | Rec.ITU-R BT.2100 [48] Table 4 | Rec.ITU-R BT.2100 [48] Table 5 |
| $xvYCC_{601}$ | IEC 61966-2-4 [5] Section 4.2 | IEC 61966-2-4 [5] Section 4.2 | Reserved | Reserved |
| $xvYCC_{709}$ | IEC 61966-2-4 [5] Section 4.3 | IEC 61966-2-4 [5] Section 4.3 | Reserved | Reserved |
| $sYCC_{601}$ | IEC 61966-2-1 [33] Section 5.2 | IEC 61966-2-1 [33] Section 5.2 | Reserved | Reserved |
| $opYCC_{601}$ | γ=2.19921875 P=160 cd/m² | γ=2.19921875 | Reserved | Reserved |
| Rec.ITU-R BT.2020 $Y'_cC'_{BC}C'_{RC}$ | Rec.ITU-R BT.2020 [40] Table 4 (CL) | Rec.ITU-R BT.2020 [40] Table 4 (CL) | Reserved | Reserved |
| Rec.ITU-R BT.2020 $Y'C'_BC'_R$ | Rec.ITU-R BT.2020 [40] Table 4 (NCL) | Rec.ITU-R BT.2020 [40] Table 4 (NCL) | Rec.ITU-R BT.2100 [48] Table 4 | Rec.ITU-R BT.2100 [48] Table 5 |
| Rec.ITU-R BT.2020 $IC_TC_P$ | Reserved | Reserved | Rec.ITU-R BT.2100 [48] Table 7 (PQ) | Rec.ITU-R BT.2100 [48] Table 7 (HLG) |
| Y'x'y' or Y'u'v' | DRR Applied | DRR Applied | Reserved | Reserved |

FIG. 128

| Yxy 8bit 4:2:2 - 4 Lane | | | |
|---|---|---|---|
| **Lane 0** | **Lane 1** | **Lane 2** | **Lane 3** |
| x0-7:0 | x1-7:0 | x2-7:0 | x3-7:0 |
| Y0-7:0 | Y1-7:0 | Y2-7:0 | Y3-7:0 |
| y0-7:0 | y1-7:0 | y2-7:0 | y3-7:0 |
| x4-7:0 | x5-7:0 | x6-7:0 | x7-7:0 |
| Y4-7:0 | Y5-7:0 | Y6-7:0 | Y7-7:0 |
| y4-7:0 | y5-7:0 | y6-7:0 | y7-7:0 |
| x8-7:0 | x9-7:0 | x10-7:0 | x11-7:0 |
| Y8-7:0 | Y9-7:0 | Y10-7:0 | Y11-7:0 |
| y8-7:0 | y9-7:0 | y10-7:0 | y11-7:0 |

FIG. 129A

| Yxy 8bit 4:2:2 - 2 Lane | |
|---|---|
| **Lane 0** | **Lane 1** |
| x0-7:0 | x1-7:0 |
| Y0-7:0 | Y1-7:0 |
| y0-7:0 | y1-7:0 |
| x2-7:0 | x3-7:0 |
| Y2-7:0 | Y3-7:0 |
| y2-7:0 | y3-7:0 |
| x4-7:0 | x5-7:0 |
| Y4-7:0 | Y5-7:0 |
| y4-7:0 | y5-7:0 |

FIG. 129B

| Yxy 8bit 4:2:2 - 1 Lane |
|---|
| **Lane 0** |
| x0-7:0 |
| Y0-7:0 |
| y0-7:0 |
| x1-7:0 |
| Y1-7:0 |
| y1-7:0 |
| x2-7:0 |
| Y2-7:0 |
| y2-7:0 |

FIG. 129C

| Yu'v' 8bit 4:2:2 - 4 Lane | | | |
|---|---|---|---|
| **Lane 0** | **Lane 1** | **Lane 2** | **Lane 3** |
| u'0-7:0 | u'1-7:0 | u'2-7:0 | u'3-7:0 |
| Y0-7:0 | Y1-7:0 | Y2-7:0 | Y3-7:0 |
| v'0-7:0 | v'1-7:0 | v'2-7:0 | v'3-7:0 |
| u'4-7:0 | u'5-7:0 | u'6-7:0 | u'7-7:0 |
| Y4-7:0 | Y5-7:0 | Y6-7:0 | Y7-7:0 |
| v'4-7:0 | v'5-7:0 | v'6-7:0 | v'7-7:0 |
| u'8-7:0 | u'9-7:0 | u'10-7:0 | u'11-7:0 |
| Y8-7:0 | Y9-7:0 | Y10-7:0 | Y11-7:0 |
| v'8-7:0 | v'9-7:0 | v'10-7:0 | v'11-7:0 |

FIG. 129D

| Yu'v' 8bit 4:2:2 - 2 Lane | |
|---|---|
| **Lane 0** | **Lane 1** |
| u'0-7:0 | u'1-7:0 |
| Y0-7:0 | Y1-7:0 |
| v'0-7:0 | v'1-7:0 |
| u'2-7:0 | u'3-7:0 |
| Y2-7:0 | Y3-7:0 |
| v'2-7:0 | v'3-7:0 |
| u'4-7:0 | u'5-7:0 |
| Y4-7:0 | Y5-7:0 |
| v'4-7:0 | v'5-7:0 |

FIG. 129E

| Yu'v' 8bit 4:2:2 - 1 Lane |
|---|
| **Lane 0** |
| u'0-7:0 |
| Y0-7:0 |
| v'0-7:0 |
| u'1-7:0 |
| Y1-7:0 |
| v'1-7:0 |
| u'2-7:0 |
| Y2-7:0 |
| v'2-7:0 |

FIG. 129F

| Yxy 10bit 4:2:2 - 4 Lane | | | |
|---|---|---|---|
| **Lane 0** | **Lane 1** | **Lane 2** | **Lane 3** |
| x0-9:2 | y0-9:2 | x2-9:2 | x2-9:2 |
| x0-1:0\|Y0-9:4 | y0-1:0\|Y1-9:4 | x2-1:0\|Y2-9:4 | x2-1:0\|Y3-9:4 |
| Y0-3:0\|x4-9:6 | Y1-3:0\|y4-9:6 | Y2-3:0\|x6-9:6 | Y3-3:0\|y6-9:6 |
| x4-5:0\|Y4-9:8 | y4-5:0\|Y5-9:8 | x6-5:0\|Y6-9:8 | y6-5:0\|Y7-9:8 |
| Y4-7:0 | Y5-7:0 | Y6-7:0 | Y7-7:0 |
| x8-9:2 | y8-9:2 | x10-9:2 | y10-9:2 |
| x8-1:0\|Y8-9:4 | y8-1:0\|Y9-9:4 | x10-1:0\|Y10-9:4 | y10-1:0\|Y11-9:4 |
| Y8-3:0\|x12-9:6 | Y9-3:0\|y12-9:6 | Y10-3:0\|x14-9:6 | Y11-3:0\|y14-9:6 |
| x12-5:0\|Y12-9:8 | y12-5:0\|Y13-9:8 | x14-5:0\|Y114-9:8 | y14-5:0\|Y15-9:8 |
| Y12-7:0 | Y13-7:0 | Y14-7:0 | Y15-7:0 |

FIG. 130A

| Yxy 10bit 4:2:2 - 2 Lane | |
|---|---|
| **Lane 0** | **Lane 1** |
| x0-9:2 | y0-9:2 |
| x0-1:0\|Y0-9:4 | y2-1:0\|Y1-9:4 |
| Y0-3:0\|x2-9:6 | Y1-3:0\|y2-9:6 |
| x2-5:0\|Y2-9:8 | y2-5:0\|Y3-9:8 |
| Y2-7:0 | Y3-7:0 |
| x4-9:2 | y4-9:2 |
| x4-1:0\|Y4-9:4 | y4-1:0\|Y5-9:4 |
| Y4-3:0\|x6-9:6 | Y5-3:0\|y6-9:6 |
| x4-5:0\|Y6-9:8 | y6-5:0\|Y7-9:8 |
| Y6-7:0 | Y7-7:0 |

FIG. 130B

| Yxy 10bit 4:2:2 - 1 Lane |
|---|
| **Lane 0** |
| x0-9:2 |
| x0-1:0\|Y0-9:4 |
| Y0-3:0\|y0-9:6 |
| y0-5:0\|Y1-9:8 |
| Y1-7:0 |
| x2-9:2 |
| x2-1:0\|Y2-9:4 |
| Y2-3:0\|y2-9:6 |
| y2-5:0\|Y3-9:8 |
| Y3-7:0 |

FIG. 130C

| Yu'v' 10bit 4:2:2 - 4 Lane | | | |
|---|---|---|---|
| **Lane 0** | **Lane 1** | **Lane 2** | **Lane 3** |
| u'0-9:2 | v'0-9:2 | u'2-9:2 | u'2-9:2 |
| u'0-1:0\|Y0-9:4 | v'0-1:0\|Y1-9:4 | u'2-1:0\|Y2-9:4 | u'2-1:0\|Y3-9:4 |
| Y0-3:0\|u'4-9:6 | Y1-3:0\|v'4-9:6 | Y2-3:0\|u'6-9:6 | Y3-3:0\|v'6-9:6 |
| u'4-5:0\|Y4-9:8 | v'4-5:0\|Y5-9:8 | u'6-5:0\|Y6-9:8 | v'6-5:0\|Y7-9:8 |
| Y4-7:0 | Y5-7:0 | Y6-7:0 | Y7-7:0 |
| u'8-9:2 | v'8-9:2 | u'10-9:2 | v'10-9:2 |
| u'8-1:0\|Y8-9:4 | v'8-1:0\|Y9-9:4 | u'10-1:0\|Y10-9:4 | v'10-1:0\|Y11-9:4 |
| Y8-3:0\|u'12-9:6 | Y9-3:0\|v'12-9:6 | Y10-3:0\|u'14-9:6 | Y11-3:0\|v'14-9:6 |
| u'12-5:0\|Y12-9:8 | v'12-5:0\|Y13-9:8 | u'14-5:0\|Y114-9:8 | v'14-5:0\|Y15-9:8 |
| Y12-7:0 | Y13-7:0 | Y14-7:0 | Y15-7:0 |

FIG. 130D

| Yu'v' 10bit 4:2:2 - 2 Lane | |
|---|---|
| **Lane 0** | **Lane 1** |
| u'0-9:2 | v'0-9:2 |
| u'0-1:0\|Y0-9:4 | v'2-1:0\|Y1-9:4 |
| Y0-3:0\|u'2-9:6 | Y1-3:0\|v'2-9:6 |
| u'2-5:0\|Y2-9:8 | v'2-5:0\|Y3-9:8 |
| Y2-7:0 | Y3-7:0 |
| u'4-9:2 | v'4-9:2 |
| u'4-1:0\|Y4-9:4 | v'4-1:0\|Y5-9:4 |
| Y4-3:0\|u'6-9:6 | Y5-3:0\|v'6-9:6 |
| u'4-5:0\|Y6-9:8 | v'6-5:0\|Y7-9:8 |
| Y6-7:0 | Y7-7:0 |

FIG. 130E

| Yu'v' 10bit 4:2:2 - 1 Lane |
|---|
| **Lane 0** |
| u'0-9:2 |
| u'0-1:0\|Y0-9:4 |
| Y0-3:0\|v'0-9:6 |
| v'0-5:0\|Y1-9:8 |
| Y1-7:0 |
| u'2-9:2 |
| u'2-1:0\|Y2-9:4 |
| Y2-3:0\|v'2-9:6 |
| v'2-5:0\|Y3-9:8 |
| Y3-7:0 |

FIG. 130F

| Yxy 12bit 4:2:2 - 4 Lane | | | |
|---|---|---|---|
| **Lane 0** | **Lane 1** | **Lane 2** | **Lane 3** |
| x0-11:4 | y0-11:4 | x2-11:4 | y2-11:4 |
| x0-3:0\|Y0-11:8 | y0-3:0\|Y1-11:8 | x2-3:0\|Y2-11:8 | y2-3:0\|Y3-11:8 |
| Y0-7:0 | Y1-7:0 | Y2-7:0 | Y3-7:0 |
| x4-11:4 | y4-11:4 | x6-11:4 | y6-11:4 |
| x4-3:0\|Y4-11:8 | y4-3:0\|Y5-11:8 | x63:0\|Y6-11:8 | y6-3:0\|Y7-11:8 |
| Y4-7:0 | Y5-7:0 | Y6-7:0 | Y7-7:0 |

FIG. 131A

| Yxy 12bit 4:2:2 - 2 Lane | |
|---|---|
| **Lane 0** | **Lane 1** |
| x0-11:4 | y0-11:4 |
| x0-3:0\|Y0-11:8 | y0-3:0\|Y1-11:8 |
| Y0-7:0 | Y1-7:0 |
| x2-11:4 | y2-11:4 |
| x2-3:0\|Y2-11:8 | y2-3:0\|Y3-11:8 |
| Y2-7:0 | Y3-7:0 |

FIG. 131B

| Yxy 12bit 4:2:2 - 1 Lane |
|---|
| **Lane 0** |
| x0-11:4 |
| x0-3:0\|Y0-11:8 |
| Y0-7:0 |
| y0-11:4 |
| y0-3:0\|Y1-11:8 |
| Y1-7:0 |

FIG. 131C

| Yu'v' 12bit 4:2:2 - 4 Lane | | | |
|---|---|---|---|
| **Lane 0** | **Lane 1** | **Lane 2** | **Lane 3** |
| u'0-11:4 | v'0-11:4 | u'2-11:4 | v'2-11:4 |
| u'0-3:0\|Y0-11:8 | v'0-3:0\|Y1-11:8 | u'2-3:0\|Y2-11:8 | v'2-3:0\|Y3-11:8 |
| Y0-7:0 | Y1-7:0 | Y2-7:0 | Y3-7:0 |
| u'4-11:4 | v'4-11:4 | u'6-11:4 | v'6-11:4 |
| u'4-3:0\|Y4-11:8 | v'4-3:0\|Y5-11:8 | u'6-3:0\|Y6-11:8 | v'6-3:0\|Y7-11:8 |
| Y4-7:0 | Y5-7:0 | Y6-7:0 | Y7-7:0 |

FIG. 131D

| Yu'v' 12bit 4:2:2 - 2 Lane | |
|---|---|
| **Lane 0** | **Lane 1** |
| u'0-11:4 | v'0-11:4 |
| u'0-3:0\|Y0-11:8 | v'0-3:0\|Y1-11:8 |
| Y0-7:0 | Y1-7:0 |
| u'2-11:4 | v'2-11:4 |
| u'2-3:0\|Y2-11:8 | v'2-3:0\|Y3-11:8 |
| Y2-7:0 | Y3-7:0 |

FIG. 131E

| Yu'v' 12bit 4:2:2 - 1 Lane |
|---|
| **Lane 0** |
| u'0-11:4 |
| u'0-3:0\|Y0-11:8 |
| Y0-7:0 |
| v'0-11:4 |
| v'0-3:0\|Y1-11:8 |
| Y1-7:0 |

FIG. 131F

| Yxy 16bit 4:2:2 - 4 Lane | | | |
|---|---|---|---|
| **Lane 0** | **Lane 1** | **Lane 2** | **Lane 3** |
| x0-15:8 | y0-15:8 | x2-15:8 | y2-15:8 |
| x0-7:0 | y0-7:0 | x2-7:0 | y2-7:0 |
| Y0-15:8 | Y1-15:8 | Y2-15:8 | Y3-15:8 |
| Y0-7:0 | Y1-7:0 | Y2-7:0 | Y3-7:0 |
| x4-15:8 | y4-15:8 | x6-15:8 | y6-15:8 |
| x4-7:0 | y4-7:0 | x6-7:0 | y6-7:0 |
| Y4-15:8 | Y5-15:8 | Y6-15:8 | Y7-15:8 |
| Y4-7:0 | Y5-7:0 | Y6-7:0 | Y7-7:0 |

FIG. 132A

| Yxy 16bit 4:2:2 - 2 Lane | |
|---|---|
| **Lane 0** | **Lane 1** |
| x0-15:8 | y0-15:8 |
| x0-7:0 | y0-7:0 |
| Y0-15:8 | Y1-15:8 |
| Y0-7:0 | Y1-7:0 |
| x2-15:8 | y2-15:8 |
| x2-7:0 | y2-7:0 |
| Y2-15:8 | Y3-15:8 |
| Y2-7:0 | Y3-7:0 |

FIG. 132B

| Yxy 16bit 4:2:2 - 1 Lane |
|---|
| **Lane 0** |
| x0-15:8 |
| x0-7:0 |
| Y0-15:8 |
| Y0-7:0 |
| y0-15:8 |
| y0-7:0 |
| Y1-15:8 |
| Y1-7:0 |
| x2-15:8 |
| x2-7:0 |
| Y2-15:8 |
| Y2-7:0 |
| y2-15:8 |
| y2-7:0 |
| Y3-15:8 |
| Y3-7:0 |

FIG. 132C

| Yu'v' 16bit 4:2:2 - 4 Lane | | | |
|---|---|---|---|
| **Lane 0** | **Lane 1** | **Lane 2** | **Lane 3** |
| u'0-15:8 | v'0-15:8 | u'2-15:8 | v'2-15:8 |
| u'0-7:0 | v'0-7:0 | u'2-7:0 | v'2-7:0 |
| Y0-15:8 | Y1-15:8 | Y2-15:8 | Y3-15:8 |
| Y0-7:0 | Y1-7:0 | Y2-7:0 | Y3-7:0 |
| u'4-15:8 | v'4-15:8 | u'6-15:8 | v'6-15:8 |
| u'4-7:0 | v'4-7:0 | u'6-7:0 | v'6-7:0 |
| Y4-15:8 | Y5-15:8 | Y6-15:8 | Y7-15:8 |
| Y4-7:0 | Y5-7:0 | Y6-7:0 | Y7-7:0 |

FIG. 132D

| Yu'v' 16bit 4:2:2 - 2 Lane | |
|---|---|
| **Lane 0** | **Lane 1** |
| u'0-15:8 | v'0-15:8 |
| u'0-7:0 | v'0-7:0 |
| Y0-15:8 | Y1-15:8 |
| Y0-7:0 | Y1-7:0 |
| u'2-15:8 | v'2-15:8 |
| u'2-7:0 | v'2-7:0 |
| Y2-15:8 | Y3-15:8 |
| Y2-7:0 | Y3-7:0 |

FIG. 132E

| Yu'v' 16bit 4:2:2 - 1 Lane |
|---|
| **Lane 0** |
| u'0-15:8 |
| u'0-7:0 |
| Y0-15:8 |
| Y0-7:0 |
| v'0-15:8 |
| v'0-7:0 |
| Y1-15:8 |
| Y1-7:0 |
| u'2-15:8 |
| u'2-7:0 |
| Y2-15:8 |
| Y2-7:0 |
| v'2-15:8 |
| v'2-7:0 |
| Y3-15:8 |
| Y3-7:0 |

FIG. 132F

| Yxy 10bit 4:4:4 - 4 Lane | | | |
|---|---|---|---|
| **Lane 0** | **Lane 1** | **Lane 2** | **Lane 3** |
| x0-9:2 | x1-9:2 | x2-9:2 | x3-9:2 |
| x0-1:0\|Y0-9:4 | x1-1:0\|Y1-9:4 | x2-1:0\|Y2-9:4 | x3-1:0\|Y3-9:4 |
| Y0-3:0\|y0-9:6 | Y1-3:0\|y1-9:6 | Y2-3:0\|y2-9:6 | Y3-3:0\|y3-9:6 |
| y0-5:0\|x4-9:8 | y1-5:0\|x5-9:8 | y2-5:0\|x6-9:8 | y3-5:0\|x7-9:8 |
| x4-7:0 | x5-7:0 | x6-7:0 | x7-7:0 |
| Y4-9:2 | Y5-9:2 | Y6-9:2 | Y7-9:2 |
| Y4-1:0\|y4-9:4 | Y5-1:0\|y5-9:4 | Y6-1:0\|y6-9:4 | Y7-1:0\|y7-9:4 |
| y4-3:0\|x8-9:6 | y5-3:0\|x9-9:6 | y6-3:0\|x10-9:6 | y7-3:0\|x11-9:6 |
| x8-5:0\|Y8-9:8 | x9-5:0\|Y9-9:8 | x10-5:0\|Y10-9:8 | x11-5:0\|Y11-9:8 |

FIG. 133A

| Yxy 10bit 4:4:4 - 2 Lane | |
|---|---|
| **Lane 0** | **Lane 1** |
| x0-9:2 | x1-9:2 |
| x0-1:0\|Y0-9:4 | x1-1:0\|Y1-9:4 |
| Y0-3:0\|y0-9:6 | Y1-3:0\|y1-9:6 |
| y0-5:0\|x2-9:8 | y1-5:0\|x3-9:8 |
| x2-7:0 | x3-7:0 |
| Y2-9:2 | Y3-9:2 |
| Y2-1:0\|y2-9:4 | Y3-1:0\|y3-9:4 |
| y2-3:0\|x4-9:6 | y3-3:0\|x5-9:6 |
| x4-5:0\|Y4-9:8 | x5-5:0\|Y5-9:8 |
| Y4-7:0 | Y5-7:0 |
| y4-9:2 | y5-9:2 |
| y4-1:0\|x6-9:4 | y5-1:0\|x7-9:4 |
| x6-3:0\|Y6-9:6 | x7-3:0\|Y7-9:6 |

FIG. 133B

| Yxy 10bit 4:4:4 - 1 Lane |
|---|
| **Lane 0** |
| x0-9:2 |
| x0-1:0\|Y0-9:4 |
| Y0-3:0\|y0-9:6 |
| y0-5:0\|x1-9:8 |
| x1-7:0 |
| Y1-9:2 |
| Y1-1:0\|y1-9:4 |
| y1-3:0\|x2-9:6 |
| x2-5:0\|Y2-9:8 |
| Y2-7:0 |
| y2-9:2 |
| y2-1:0\|x3-9:4 |
| x3-3:0\|Y3-9:6 |
| Y3-5:0\|y3-9:8 |
| y3-7:0 |

FIG. 133C

| **Yu'v' 10bit 4:4:4 - 4 Lane** | | | |
|---|---|---|---|
| **Lane 0** | **Lane 1** | **Lane 2** | **Lane 3** |
| u'0-9:2 | u'1-9:2 | u'2-9:2 | u'3-9:2 |
| u'0-1:0\|Y0-9:4 | u'1-1:0\|Y1-9:4 | u'2-1:0\|Y2-9:4 | u'3-1:0\|Y3-9:4 |
| Y0-3:0\|v'0-9:6 | Y1-3:0\|v'1-9:6 | Y2-3:0\|v'2-9:6 | Y3-3:0\|v'3-9:6 |
| v'0-5:0\|u'4-9:8 | v'1-5:0\|u'5-9:8 | v'2-5:0\|u'6-9:8 | v'3-5:0\|u'7-9:8 |
| u'4-7:0 | u'5-7:0 | u'6-7:0 | u'7-7:0 |
| Y4-9:2 | Y5-9:2 | Y6-9:2 | Y7-9:2 |
| Y4-1:0\|v'4-9:4 | Y5-1:0\|v'5-9:4 | Y6-1:0\|v'6-9:4 | Y7-1:0\|v'7-9:4 |
| v'4-3:0\|u'8-9:6 | v'5-3:0\|u'9-9:6 | v'6-3:0\|u'10-9:6 | v'7-3:0\|u'11-9:6 |
| u'8-5:0\|Y8-9:8 | u'9-5:0\|Y9-9:8 | u'10-5:0\|Y10-9:8 | u'11-5:0\|Y11-9:8 |

FIG. 133D

| **Yu'v' 10bit 4:4:4 - 2 Lane** | |
|---|---|
| **Lane 0** | **Lane 1** |
| u'0-9:2 | u'1-9:2 |
| u'0-1:0\|Y0-9:4 | u'1-1:0\|Y1-9:4 |
| Y0-3:0\|v'0-9:6 | Y1-3:0\|v'1-9:6 |
| v'0-5:0\|u'2-9:8 | v'1-5:0\|u'3-9:8 |
| u'2-7:0 | u'3-7:0 |
| Y2-9:2 | Y3-9:2 |
| Y2-1:0\|v'2-9:4 | Y3-1:0\|v'3-9:4 |
| v'2-3:0\|u'4-9:6 | v'3-3:0\|u'5-9:6 |
| u'4-5:0\|Y4-9:8 | u'5-5:0\|Y5-9:8 |
| Y4-7:0 | Y5-7:0 |
| v'4-9:2 | v'5-9:2 |
| v'4-1:0\|u'6-9:4 | v'5-1:0\|u'7-9:4 |
| u'6-3:0\|Y6-9:6 | u'7-3:0\|Y7-9:6 |

FIG. 133E

| **Yu'v' 10bit 4:4:4 - 1 Lane** |
|---|
| **Lane 0** |
| u'0-9:2 |
| u'0-1:0\|Y0-9:4 |
| Y0-3:0\|v'0-9:6 |
| v'0-5:0\|u'1-9:8 |
| u'1-7:0 |
| Y1-9:2 |
| Y1-1:0\|v'1-9:4 |
| v'1-3:0\|u'2-9:6 |
| u'2-5:0\|Y2-9:8 |
| Y2-7:0 |
| v'2-9:2 |
| v'2-1:0\|u'3-9:4 |
| u'3-3:0\|Y3-9:6 |
| Y3-5:0\|v'3-9:8 |
| v'3-7:0 |

FIG. 133F

| Yxy 12bit 4:4:4 – 4 Lane | | | |
|---|---|---|---|
| **Lane 0** | **Lane 1** | **Lane 2** | **Lane 3** |
| x0-11:4 | x1-11:4 | x2-11:4 | x3-11:4 |
| x0-3:0\|Y0-11:8 | x1-3:0\|Y1-11:8 | x2-3:0\|Y2-11:8 | x3-3:0\|Y3-11:8 |
| Y0-7:0 | Y1-7:0 | Y2-7:0 | Y3-7:0\| |
| y0-11:4 | y1-11:4 | y2-11:4 | y3-11:4 |
| y0-3:0\|x4-11:8 | y1-3:0\|x5-11:8 | y2-3:0\|x6-11:8 | y3-3:0\|x7-11:8 |
| x4-7:0 | x5-7:0 | x6-7:0 | x7-7:0 |
| Y4-11:4 | Y5-11:4 | Y6-11:4 | Y7-11:4 |
| Y4-3:0\|y4-11:8 | Y5-3:0\|y5-11:8 | Y6-3:0\|y6-11:8 | Y7-3:0\|y7-11:8 |
| y4-7:0 | y5-7:0 | y6-7:0 | y7-7:0 |

FIG. 134A

| Yxy 12bit 4:4:4 - 2 Lane | |
|---|---|
| **Lane 0** | **Lane 1** |
| x0-11:4 | x1-11:4 |
| x0-3:0\|Y0-11:8 | x1-3:0\|Y1-11:8 |
| Y0-7:0 | Y1-7:0 |
| y0-11:4 | y1-11:4 |
| y0-3:0\|x2-11:8 | y1-3:0\|x3-11:8 |
| x2-7:0 | x3-7:0 |
| Y2-11:4 | Y3-11:4 |
| Y2-3:0\|y2-11:8 | Y3-3:0\|y3-11:8 |
| y2-7:0 | y3-7:0 |

FIG. 134B

| Yxy 12bit 4:4:4 - 1 Lane |
|---|
| **Lane 0** |
| x0-11:4 |
| x0-3:0\|Y0-11:8 |
| Y0-7:0 |
| y0-11:4 |
| y0-3:0\|x1-11:8 |
| x1-7:0 |
| Y1-11:4 |
| Y1-3:0\|y1-11:8 |
| y1-7:0 |

FIG. 134C

| Yu'v' 12bit 4:4:4 – 4 Lane | | | |
|---|---|---|---|
| **Lane 0** | **Lane 1** | **Lane 2** | **Lane 3** |
| u'0-11:4 | u'1-11:4 | u'2-11:4 | u'3-11:4 |
| u'0-3:0\|Y0-11:8 | u'1-3:0\|Y1-11:8 | u'2-3:0\|Y2-11:8 | u'3-3:0\|Y3-11:8 |
| Y0-7:0 | Y1-7:0 | Y2-7:0 | Y3-7:0 |
| v'0-11:4 | v'1-11:4 | v'2-11:4 | v'3-11:4 |
| v'0-3:0\|u'4-11:8 | v'1-3:0\|u'5-11:8 | v'2-3:0\|u'6-11:8 | v'3-3:0\|u'7-11:8 |
| u'4-7:0 | u'5-7:0 | u'6-7:0 | u'7-7:0 |
| Y4-11:4 | Y5-11:4 | Y6-11:4 | Y7-11:4 |
| Y4-3:0\|v'4-11:8 | Y5-3:0\|v'5-11:8 | Y6-3:0\|v'6-11:8 | Y7-3:0\|v'7-11:8 |
| v'4-7:0 | v'5-7:0 | v'6-7:0 | v'7-7:0 |

FIG. 134D

| Yu'v' 12bit 4:4:4 - 2 Lane | |
|---|---|
| **Lane 0** | **Lane 1** |
| u'0-11:4 | u'1-11:4 |
| u'0-3:0\|Y0-11:8 | u'1-3:0\|Y1-11:8 |
| Y0-7:0 | Y1-7:0 |
| v'0-11:4 | v'1-11:4 |
| v'0-3:0\|u'2-11:8 | v'1-3:0\|u'3-11:8 |
| u'2-7:0 | u'3-7:0 |
| Y2-11:4 | Y3-11:4 |
| Y2-3:0\|v'2-11:8 | Y3-3:0\|v'3-11:8 |
| v'2-7:0 | v'3-7:0 |

FIG. 134E

| Yu'v' 12bit 4:4:4 - 1 Lane |
|---|
| **Lane 0** |
| u'0-11:4 |
| u'0-3:0\|Y0-11:8 |
| Y0-7:0 |
| v'0-11:4 |
| v'0-3:0\|u'1-11:8 |
| u'1-7:0 |
| Y1-11:4 |
| Y1-3:0\|v'1-11:8 |
| v'1-7:0 |

FIG. 134F

| Yxy 16bit 4:4:4 – 4 Lane | | | |
|---|---|---|---|
| **Lane 0** | **Lane 1** | **Lane 2** | **Lane 3** |
| x0-15:8 | x1-15:8 | x2-15:8 | x3-15:8 |
| x0-7:0 | x1-7:0 | x2-7:0 | x3-7:0 |
| Y0-15:8 | Y1-15:8 | Y2-15:8 | Y3-15:8 |
| Y0-7:0 | Y1-7:0 | Y2-7:0 | Y3-7:0 |
| y0-15:8 | y1-15:8 | y2-15:8 | y3-15:8 |
| y0-7:0 | y1-7:0 | y2-7:0 | y3-7:0 |
| x4-15:8 | x5-15:8 | x6-15:8 | x7-15:8 |
| x4-7:0 | x5-7:0 | x6-7:0 | x7-7:0 |
| Y4-15:8 | Y5-15:8 | Y6-15:8 | Y7-15:8 |
| Y4-7:0 | Y5-7:0 | Y6-7:0 | Y7-7:0 |
| y4-15:8 | y5-15:8 | y6-15:8 | y7-15:8 |
| y4-7:0 | y5-7:0 | y6-7:0 | y7-7:0 |

FIG. 135A

| Yxy 16yit 4:4:4 - 2 Lane | |
|---|---|
| **Lane 0** | **Lane 1** |
| x0-15:8 | x1-15:8 |
| x0-7:0 | x1-7:0 |
| Y0-15:8 | Y1-15:8 |
| Y0-7:0 | Y1-7:0 |
| y0-15:8 | y1-15:8 |
| y0-7:0 | y1-7:0 |
| x2-15:8 | x3-15:8 |
| x2-7:0 | x3-7:0 |
| Y2-15:8 | Y3-15:8 |
| Y2-7:0 | Y3-7:0 |
| y2-15:8 | y3-15:8 |
| y2-7:0 | y3-7:0 |

FIG. 135B

| Yxy 16yit 4:4:4 - 1 Lane |
|---|
| **Lane 0** |
| x0-15:8 |
| x0-7:0 |
| Y0-15:8 |
| Y0-7:0 |
| y0-15:8 |
| y0-7:0 |
| x1-15:8 |
| x1-7:0 |
| Y1-15:8 |
| Y1-7:0 |
| y1-15:8 |
| y1-7:0 |

FIG. 135C

| Yu'v' 16bit 4:4:4 – 4 Lane | | | |
|---|---|---|---|
| **Lane 0** | **Lane 1** | **Lane 2** | **Lane 3** |
| u'0-15:8 | u'1-15:8 | u'2-15:8 | u'3-15:8 |
| u'0-7:0 | u'1-7:0 | u'2-7:0 | u'3-7:0 |
| Y0-15:8 | Y1-15:8 | Y2-15:8 | Y3-15:8 |
| Y0-7:0 | Y1-7:0 | Y2-7:0 | Y3-7:0 |
| v'0-15:8 | v'1-15:8 | v'2-15:8 | v'3-15:8 |
| v'0-7:0 | v'1-7:0 | v'2-7:0 | v'3-7:0 |
| u'4-15:8 | u'5-15:8 | u'6-15:8 | u'7-15:8 |
| u'4-7:0 | u'5-7:0 | u'6-7:0 | u'7-7:0 |
| Y4-15:8 | Y5-15:8 | Y6-15:8 | Y7-15:8 |
| Y4-7:0 | Y5-7:0 | Y6-7:0 | Y7-7:0 |
| v'4-15:8 | v'5-15:8 | v'6-15:8 | v'7-15:8 |
| v'4-7:0 | v'5-7:0 | v'6-7:0 | v'7-7:0 |

FIG. 135D

| Yu'v' 16bit 4:4:4 - 2 Lane | |
|---|---|
| **Lane 0** | **Lane 1** |
| u'0-15:8 | u'1-15:8 |
| u'0-7:0 | u'1-7:0 |
| Y0-15:8 | Y1-15:8 |
| Y0-7:0 | Y1-7:0 |
| v'0-15:8 | v'1-15:8 |
| v'0-7:0 | v'1-7:0 |
| u'2-15:8 | u'3-15:8 |
| u'2-7:0 | u'3-7:0 |
| Y2-15:8 | Y3-15:8 |
| Y2-7:0 | Y3-7:0 |
| v'2-15:8 | v'3-15:8 |
| v'2-7:0 | v'3-7:0 |

FIG. 135E

| Yu'v' 16bit 4:4:4 - 1 Lane |
|---|
| **Lane 0** |
| u'0-15:8 |
| u'0-7:0 |
| Y0-15:8 |
| Y0-7:0 |
| v'0-15:8 |
| v'0-7:0 |
| u'1-15:8 |
| u'1-7:0 |
| Y1-15:8 |
| Y1-7:0 |
| v'1-15:8 |
| v'1-7:0 |

FIG. 135F

| Auxiliary Video Information (AVI) InfoFrame V4 | | | | | | | | |
|---|---|---|---|---|---|---|---|---|
| InfoFrame Type Code | InfoFrame Type = 0x02 | | | | | | | |
| InfoFrame Version Number | Version = 0x04 | | | | | | | |
| Length of AVI InfoFrame | Length of AVI InfoFrame (14) | | | | | | | |
| Data Byte 1 | [Y2] | Y1 | Y0 | A0 | B1 | B0 | S1 | S0 |
| Data Byte 2 | C1 | C0 | M1 | M0 | R3 | R2 | R1 | R0 |
| Data Byte 3 | ITC | EC2 | EC1 | EC0 | Q1 | Q0 | SC1 | SC0 |
| Data Byte 4 | [VIC7] | VIC6 | VIC5 | VIC4 | VIC3 | VIC2 | VIC1 | VIC0 |
| Data Byte 5 | YQ1 | YQ0 | CN1 | CN0 | PR3 | PR2 | PR1 | PR0 |
| Data Byte 6 | ETB07-ETB00 (Line Number of End of Top Bar – lower 8 bits) | | | | | | | |
| Data Byte 7 | ETB15-ETB08 (Line Number of End of Top Bar – upper 8 bits) | | | | | | | |
| Data Byte 8 | SBB07-SBB00 (Line Number of Start of Bottom Bar – lower 8 bits) | | | | | | | |
| Data Byte 9 | SBB15-SBB08 (Line Number of Start of Bottom Bar – upper 8 bits) | | | | | | | |
| Data Byte 10 | ELB07-ELB00 (Pixel Number of End of Left Bar – lower 8 bits) | | | | | | | |
| Data Byte 11 | ELB15-ELB08 (Pixel Number of End of Left Bar – upper 8 bits) | | | | | | | |
| Data Byte 12 | SRB07-SRB00 (Pixel Number of Start of Right Bar – lower 8 bits) | | | | | | | |
| Data Byte 13 | SRB15-SRB08 (Pixel Number of Start of Right Bar – upper 8 bits) | | | | | | | |
| Data Byte 14 | ACE3 | ACE2 | ACE1 | ACE0 | F143=0 | F142=0 | F141=0 | F140=0 |

FIG. 136

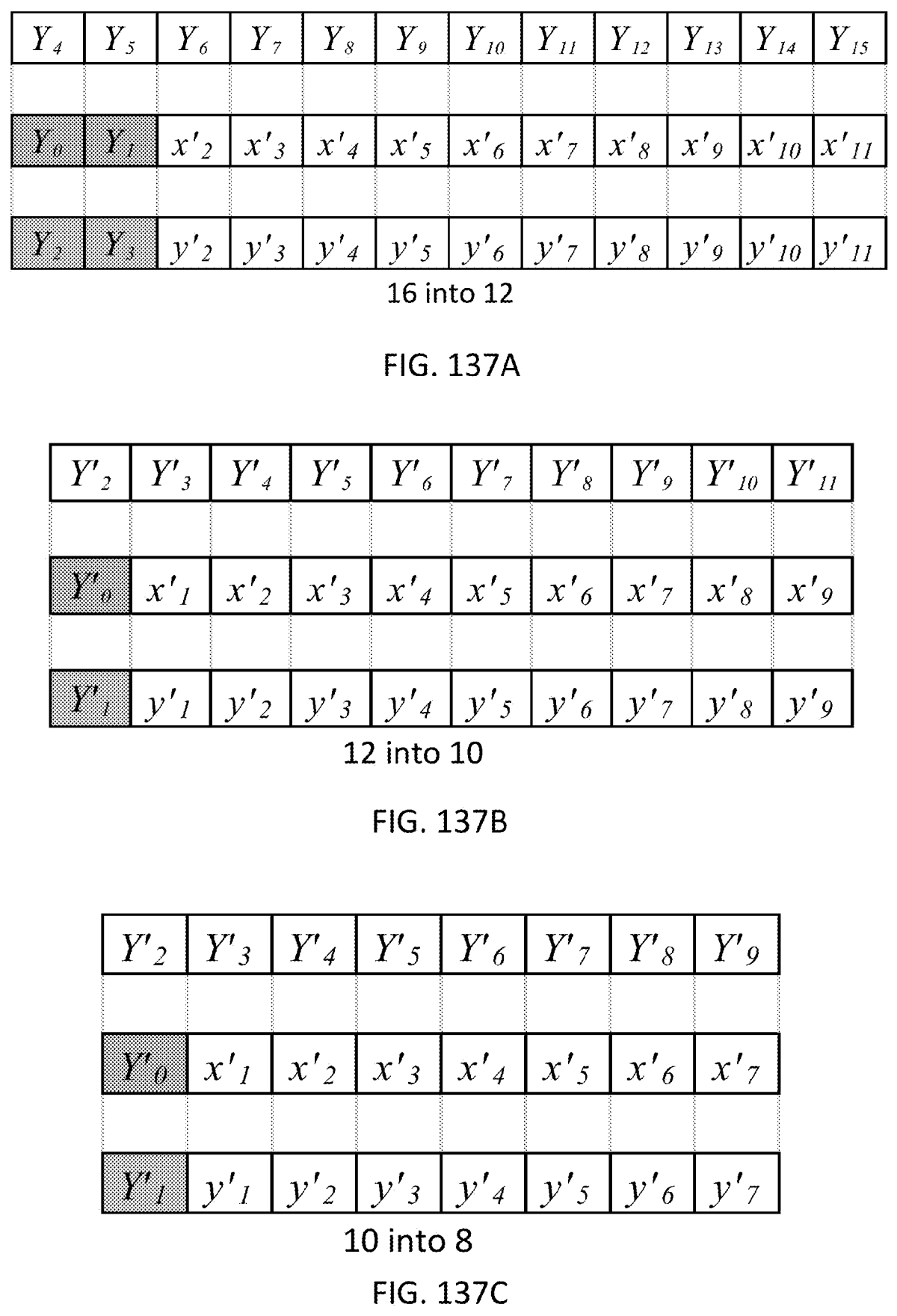

| | | | | | | | | | | | |
|---|---|---|---|---|---|---|---|---|---|---|---|
| $Y_4$ | $Y_5$ | $Y_6$ | $Y_7$ | $Y_8$ | $Y_9$ | $Y_{10}$ | $Y_{11}$ | $Y_{12}$ | $Y_{13}$ | $Y_{14}$ | $Y_{15}$ |
| | | | | | | | | | | | |
| $Y_0$ | $Y_1$ | $x'_2$ | $x'_3$ | $x'_4$ | $x'_5$ | $x'_6$ | $x'_7$ | $x'_8$ | $x'_9$ | $x'_{10}$ | $x'_{11}$ |
| | | | | | | | | | | | |
| $Y_2$ | $Y_3$ | $y'_2$ | $y'_3$ | $y'_4$ | $y'_5$ | $y'_6$ | $y'_7$ | $y'_8$ | $y'_9$ | $y'_{10}$ | $y'_{11}$ |

16 into 12

FIG. 137A

| | | | | | | | | | |
|---|---|---|---|---|---|---|---|---|---|
| $Y'_2$ | $Y'_3$ | $Y'_4$ | $Y'_5$ | $Y'_6$ | $Y'_7$ | $Y'_8$ | $Y'_9$ | $Y'_{10}$ | $Y'_{11}$ |
| | | | | | | | | | |
| $Y'_0$ | $x'_1$ | $x'_2$ | $x'_3$ | $x'_4$ | $x'_5$ | $x'_6$ | $x'_7$ | $x'_8$ | $x'_9$ |
| | | | | | | | | | |
| $Y'_1$ | $y'_1$ | $y'_2$ | $y'_3$ | $y'_4$ | $y'_5$ | $y'_6$ | $y'_7$ | $y'_8$ | $y'_9$ |

12 into 10

FIG. 137B

| | | | | | | | |
|---|---|---|---|---|---|---|---|
| $Y'_2$ | $Y'_3$ | $Y'_4$ | $Y'_5$ | $Y'_6$ | $Y'_7$ | $Y'_8$ | $Y'_9$ |
| | | | | | | | |
| $Y'_0$ | $x'_1$ | $x'_2$ | $x'_3$ | $x'_4$ | $x'_5$ | $x'_6$ | $x'_7$ |
| | | | | | | | |
| $Y'_1$ | $y'_1$ | $y'_2$ | $y'_3$ | $y'_4$ | $y'_5$ | $y'_6$ | $y'_7$ |

10 into 8

FIG. 137C

| | | | | | | | | | | | |
|---|---|---|---|---|---|---|---|---|---|---|---|
| $I_4$ | $I_5$ | $I_6$ | $I_7$ | $I_8$ | $I_9$ | $I_{10}$ | $I_{11}$ | $I_{12}$ | $I_{13}$ | $I_{14}$ | $I_{15}$ |
| $I_0$ | $I_1$ | $C_T'_2$ | $C_T'_3$ | $C_T'_4$ | $C_T'_5$ | $C_T'_6$ | $C_T'_7$ | $C_T'_8$ | $C_T'_9$ | $C_T'_{10}$ | $C_T'_{11}$ |
| $I_2$ | $I_3$ | $C_P'_2$ | $C_P'_3$ | $C_P'_4$ | $C_P'_5$ | $C_P'_6$ | $C_P'_7$ | $C_P'_8$ | $C_P'_9$ | $C_P'_{10}$ | $C_P'_{11}$ |

16 to 12bit

FIG. 138A

| | | | | | | | | | |
|---|---|---|---|---|---|---|---|---|---|
| $I'_2$ | $I'_3$ | $I'_4$ | $I'_5$ | $I'_6$ | $I'_7$ | $I'_8$ | $I'_9$ | $I'_{10}$ | $I'_{11}$ |
| $I'_0$ | $C_T'_1$ | $C_T'_2$ | $C_T'_3$ | $C_T'_4$ | $C_T'_5$ | $C_T'_6$ | $C_T'_7$ | $C_T'_8$ | $C_T'_9$ |
| $I'_1$ | $C_P'_1$ | $C_P'_2$ | $C_P'_3$ | $C_P'_4$ | $C_P'_5$ | $C_P'_6$ | $C_P'_7$ | $C_P'_8$ | $C_P'_9$ |

12 to 10bit

FIG. 138B

| | | | | | | | |
|---|---|---|---|---|---|---|---|
| $I'_2$ | $I'_3$ | $I'_4$ | $I'_5$ | $I'_6$ | $I'_7$ | $I'_8$ | $I'_9$ |
| $I'_0$ | $C_T'_1$ | $C_T'_2$ | $C_T'_3$ | $C_T'_4$ | $C_T'_5$ | $C_T'_6$ | $C_T'_7$ |
| $I'_1$ | $C_P'_1$ | $C_P'_2$ | $C_P'_3$ | $C_P'_4$ | $C_P'_5$ | $C_P'_6$ | $C_P'_7$ |

10 to 8bit

FIG. 138C

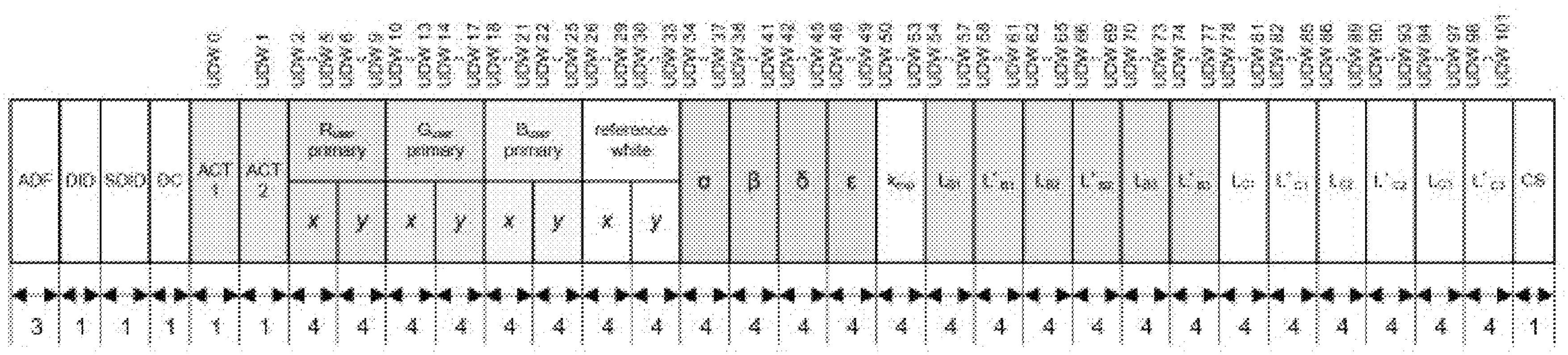

FIG. 151

| Bit Number | CDW |
|---|---|
| | ACT2 |
| b9 (MSB) | Not Used |
| b8 | Even parity for b0 through b7 |
| b7 | Reserved (set to 0) |
| b6 | Reserved (set to 0) |
| b5 | bit shifting active: 1, inactive: 0 |
| b4 | a2.4 active: 1, inactive: 0 (user defined $k_{exp}$ (≠1.00000)) |
| b3 | a2.3 active: 1, inactive: 0 (lower three coordinates ($L_{B1}$, $L'_{B1}$), ($L_{B2}$, $L'_{B2}$), ($L_{B3}$, $L'_{B3}$)) |
| b2 | a2.2 active: 1, inactive: 0 (upper three coordinates ($L_{B1}$, $L'_{B1}$), ($L_{B2}$, $L'_{B2}$), ($L_{B3}$, $L'_{B3}$)) |
| b1 | a2.1 active: 1, inactive: 0 (gamma curve defined in ITU-R BT.709) |
| b0 (LSB) | a2.0 active: 1, inactive: 0 (FS-Log curve defined in Equation 1 (α, β, δ, ε parameters)) |

FIG. 152

| Item | | 10 bit system | 12 bit system | ST Notes |
|---|---|---|---|---|
| **R'G'B'Y'** | Signal level of 100% | 3ACh ($940_{10}$) | EB0h ($3760_{12}$) | Section 7.5 |
| | Signal Level of 0% | 040h ($64_{10}$) | 100h ($256_{12}$) | |
| | Headroom for Overshoot | 3ADh-3FBh ($941_{10}$-$1019_{10}$) | EB1h-FEFh ($3761_{12}$-$4079_{12}$) | Section 7.10 |
| | Footroom for Undershoot | 004h-03Fh ($4_{10}$-$63_{10}$) | 010h-0FFh ($16_{12}$-$255_{12}$) | |
| **$C'_B$, $C'_R$** | Signal level of 50% | 3C0h ($960_{10}$) | F00h ($3840_{12}$) | Section 7.6 |
| | Signal Level of 0% | 200h ($512_{10}$) | 800h ($2048_{12}$) | |
| | Signal level of -50% | 040h ($64_{10}$) | 100h ($256_{12}$) | |
| | Headroom for Overshoot | 3C1h-3FBh ($961_{10}$-$1019_{10}$) | F01h-FEFh ($3841_{12}$-$4097_{12}$) | Section 7.10 |
| | Footroom for Undershoot | 004h-03Fh ($4_{10}$-$63_{10}$) | 010h-0FFh ($16_{12}$-$255_{12}$) | |
| **Y'x'y' or Y'u'v' (with DRR)** | Signal level of 100% | $1019_{10}$ | $4079_{12}$ | To be added |
| | Signal Level of 0% | $4_{10}$ | $16_{12}$ | |
| **Prohibited codes** | Upper Range | 3FCh-3FFh ($1020_{10}$-$1023_{10}$) | FF0h-FFFh ($4080_{12}$-$4095_{12}$) | Section 7.8 |
| | Lower Range | 000h-003h ($0_{10}$-$3_{10}$) | 000h-00Fh ($0_{12}$-$15_{12}$) | |

FIG. 153

| | Transfer Function | | | |
|---|---|---|---|---|
| Colorimetry | Gamma-SDR (P=100cd/m² unless specified below) | Gamma – HDR (P=max_display_mastering_luminance) | PQ | HLG |
| RGB | Rec. ITU-R BT.709 [7] Item 1.2 | Rec. ITU-R BT.709 [7] Item 1.2 | Rec.ITU-R BT.2100 [48] Table 4 | Rec.ITU-R BT.2100 [48] Table 5 |
| opRGB | γ=2.19921875 P=160 cd/m² | γ=2.19921875 | Rec.ITU-R BT.2100 [48] Table 4 | Rec.ITU-R BT.2100 [48] Table 5 |
| Rec.ITU-R BT.2020 R'G'B' | Rec.ITU-R BT.2020 [40] Table 4 | Rec.ITU-R BT.2020 [40] Table 4 | Rec.ITU-R BT.2100 [48] Table 4 | Rec.ITU-R BT.2100 [48] Table 5 |
| SMPTE ST2113 P3D65 R'G'B' | γ=2.6 P=48 cd/m² | γ=2.6 | Rec.ITU-R BT.2100 [48] Table 4 | Rec.ITU-R BT.2100 [48] Table 5 |
| SMPTE ST2113 P3DCI R'G'B' | γ=2.6 P=48 cd/m² | γ=2.6 | Rec.ITU-R BT.2100 [48] Table 4 | Rec.ITU-R BT.2100 [48] Table 5 |
| SMPTE ST170 or Rec.ITU-R BT.709 | Rec. ITU-R BT.709 [7] Item 1.2 | Rec. ITU-R BT.709 [7] Item 1.2 | Rec.ITU-R BT.2100 [48] Table 4 | Rec.ITU-R BT.2100 [48] Table 5 |
| $xvYCC_{601}$ | IEC 61966-2-4 [5] Section 4.2 | IEC 61966-2-4 [5] Section 4.2 | Reserved | Reserved |
| $xvYCC_{709}$ | IEC 61966-2-4 [5] Section 4.3 | IEC 61966-2-4 [5] Section 4.3 | Reserved | Reserved |
| $sYCC_{601}$ | IEC 61966-2-1 [33] Section 5.2 | IEC 61966-2-1 [33] Section 5.2 | Reserved | Reserved |
| $opYCC_{601}$ | γ=2.19921875 P=160 cd/m² | γ=2.19921875 | Reserved | Reserved |
| Rec.ITU-R BT.2020 $Y'_{C}C'_{BC}C'_{RC}$ | Rec.ITU-R BT.2020 [40] Table 4 (CL) | Rec.ITU-R BT.2020 [40] Table 4 (CL) | Reserved | Reserved |
| Rec.ITU-R BT.2020 $Y'C'_{B}C'_{R}$ | Rec.ITU-R BT.2020 [40] Table 4 (NCL) | Rec.ITU-R BT.2020 [40] Table 4 (NCL) | Rec.ITU-R BT.2100 [48] Table 4 | Rec.ITU-R BT.2100 [48] Table 5 |
| Rec.ITU-R BT.2020 $IC_{T}C_{P}$ | Reserved | Reserved | Rec.ITU-R BT.2100 [48] Table 7 (PQ) | Rec.ITU-R BT.2100 [48] Table 7 (HLG) |
| Y'x'y' or Y'u'v' | DR8 Applied | DR8 Applied | Reserved | Reserved |

FIG. 154

| S1 | S2 | S3 |
|---|---|---|
| $Y'_0$ | $Y'_1$ | $Y'_2$ |
| $x'_1$ | $y'_1$ | $Y'_3$ |
| $x'_2$ | $y'_2$ | $Y'_4$ |
| $x'_3$ | $y'_3$ | $Y'_5$ |
| $x'_4$ | $y'_4$ | $Y'_6$ |
| $x'_5$ | $y'_5$ | $Y'_7$ |
| $x'_6$ | $y'_6$ | $Y'_8$ |
| $x'_7$ | $y'_7$ | $Y'_9$ |

FIG. 155A

| S1 | S2 | S3 |
|---|---|---|
| $Y'_0$ | $Y'_1$ | $Y'_2$ |
| $u'_1$ | $v'_1$ | $Y'_3$ |
| $u'_2$ | $v'_2$ | $Y'_4$ |
| $u'_3$ | $v'_3$ | $Y'_5$ |
| $u'_4$ | $v'_4$ | $Y'_6$ |
| $u'_5$ | $v'_5$ | $Y'_7$ |
| $u'_6$ | $v'_6$ | $Y'_8$ |
| $u'_7$ | $v'_7$ | $Y'_9$ |

FIG. 155B

| Yxy or Yu'v' 10bit to 8bit 4:2:2 - 4 Lane | | | |
|---|---|---|---|
| Lane 0 | Lane 1 | Lane 2 | Lane 3 |
| S1-0 | S2-0 | S1-2 | S2-2 |
| S3-0 | S3-1 | S3-2 | S3-3 |
| S1-4 | S2-4 | S1-6 | S2-6 |
| S3-4 | S3-5 | S3-6 | S3-7 |
| S1-8 | S2-8 | S1-10 | S2-10 |
| S3-8 | S3-9 | S3-10 | S3-11 |

FIG. 156A

| Yxy or Yu'v' 10bit into 8bit 4:2:2 - 2 Lane | |
|---|---|
| Lane 0 | Lane 1 |
| S1-0 | S2-0 |
| S3-0 | S3-1 |
| S1-2 | S2-2 |
| S3-2 | S3-3 |
| S1-4 | S2-4 |
| S3-4 | S3-5 |
| S1-6 | S2-6 |
| S3-6 | S3-6 |
| S1-8 | S2-8 |

FIG. 156B

| Yxy or Yu'v' 10bit into 8bit 4:2:2 - 1 Lane |
|---|
| Lane 0 |
| S1-0 |
| S3-0 |
| S2-0 |
| S3-1 |
| S1-2 |
| S2-2 |
| S3-2 |
| S1-4 |
| S2-4 |

FIG. 156C

| S1 | S2 | S3 | S4 | S5 | S6 | S7 | S8 | S9 | S10 | S11 | S12 |
|---|---|---|---|---|---|---|---|---|---|---|---|
| $x'_2$ | $y'_2$ | $Y'_0$ | $Y'_6$ | $Y'_1$ | $Y'_2$ | $x'_6$ | $y'_6$ | $Y'_0$ | $Y'_{10}$ | $Y'_1$ | $Y'_2$ |
| $x'_3$ | $y'_3$ | $x'_1$ | $Y'_7$ | $y'_1$ | $Y'_3$ | $x'_7$ | $y'_7$ | $x'_1$ | $Y'_{11}$ | $y'_1$ | $Y'_3$ |
| $x'_4$ | $y'_4$ | | $Y'_8$ | | $Y'_4$ | $x'_8$ | $y'_8$ | $x'_2$ | | $y'_2$ | $Y'_4$ |
| $x'_5$ | $y'_5$ | | $Y'_9$ | | $Y'_5$ | $x'_9$ | $y'_9$ | $x'_3$ | | $y'_3$ | $Y'_5$ |
| $x'_6$ | $y'_6$ | | $Y'_{10}$ | | | | | $x'_4$ | | $y'_4$ | $Y'_6$ |
| $x'_7$ | $y'_7$ | | $Y'_{11}$ | | | | | $x'_5$ | | $y'_5$ | $Y'_7$ |
| $x'_8$ | $y'_8$ | | | | | | | | | | $Y'_8$ |
| $x'_9$ | $y'_9$ | | | | | | | | | | $Y'_9$ |

FIG. 157A

| S1 | S2 | S3 | S4 | S5 | S6 | S7 | S8 | S9 | S10 | S11 | S12 |
|---|---|---|---|---|---|---|---|---|---|---|---|
| $u'_2$ | $v'_2$ | $Y'_0$ | $Y'_6$ | $Y'_1$ | $Y'_2$ | $u'_6$ | $v'_6$ | $Y'_0$ | $Y'_{10}$ | $Y'_1$ | $Y'_2$ |
| $u'_3$ | $v'_3$ | $u'_1$ | $Y'_7$ | $v'_1$ | $Y'_3$ | $u'_7$ | $v'_7$ | $u'_1$ | $Y'_{11}$ | $v'_1$ | $Y'_3$ |
| $u'_4$ | $v'_4$ | | $Y'_8$ | | $Y'_4$ | $u'_8$ | $v'_8$ | $u'_2$ | | $v'_2$ | $Y'_4$ |
| $u'_5$ | $v'_5$ | | $Y'_9$ | | $Y'_5$ | $u'_9$ | $v'_9$ | $u'_3$ | | $v'_3$ | $Y'_5$ |
| $u'_6$ | $v'_6$ | | $Y'_{10}$ | | | | | $u'_4$ | | $v'_4$ | $Y'_6$ |
| $u'_7$ | $v'_7$ | | $Y'_{11}$ | | | | | $u'_5$ | | $v'_5$ | $Y'_7$ |
| $u'_8$ | $v'_8$ | | | | | | | | | | $Y'_8$ |
| $u'_9$ | $v'_9$ | | | | | | | | | | $Y'_9$ |

FIG. 157B

| Yxy or Yu'v' 12bit into 10bit 4:2:2 - 4 Lane | | | |
|---|---|---|---|
| **Lane 0** | **Lane 1** | **Lane 2** | **Lane 3** |
| S1-0 | S2-0 | S1-2 | S2-2 |
| S3-0\|S4-0 | S5-0\|S4-1 | S3-2\|S4-2 | S3-2\|S4-3 |
| S6-0\|S7-4 | S6-1\|S8-4 | S6-2\|S7-6 | S6-3\|S8-6 |
| S9-4\|S10-4 | S11-4\|S10-5 | S9-6\|S10-6 | S11-6\|S10-7 |
| S12-4 | S12-5 | S12-6 | S12-7 |
| S1-8 | S2-8 | S1-10 | S2-10 |
| S3-8\|S4-8 | S5-8\|S4-9 | S3-10\|S4-10 | S3-10\|S4-11 |
| S6-8\|S7-12 | S6-9\|S8-12 | S6-10\|S7-14 | S6-11\|S8-14 |
| S9-12\|S10-12 | S11-12\|S10-13 | S9-14\|S10-14 | S11-14\|S10-15 |
| S12-12 | S12-13 | S12-14 | S12-15 |

FIG. 158A

| Yxy or Yu'v' 12bit into 10bit 4:2:2 - 2 Lane | |
|---|---|
| **Lane 0** | **Lane 1** |
| S1-0 | S2-0 |
| S3-0\|S4-0 | S5-2\|S4-1 |
| S6-0\|S7-2 | S6-1\|S8-2 |
| S9-2\|S10-2 | S11-2\|S10-3 |
| S12-2 | S12-3 |
| S1-4 | S2-4 |
| S3-4\|S4-4 | S5-4\|S4-5 |
| S6-4\|S7-6 | S6-5\|S8-6 |
| S9-4\|S10-6 | S11-6\|S10-7 |
| S12-6 | S12-7 |

FIG. 158B

| Yxy or Yu'v' 12bit into 10bit 4:2:2 - 1 Lane |
|---|
| **Lane 0** |
| S1-0 |
| S3-0\|S4-0 |
| S6-0\|S8-0 |
| S11-0\|S10-1 |
| S12-1 |
| S1-2 |
| S3-2\|S4-2 |
| S6-2\|S8-2 |
| S11-2\|S10-3 |
| S12-3 |

FIG. 158C

| S1 | S2 | S3 | S4 | S5 | S6 |
|---|---|---|---|---|---|
| $x'_4$ | $y'_4$ | $Y_0$ | $Y_{12}$ | $Y_2$ | $Y_4$ |
| $x'_5$ | $y'_5$ | $Y_1$ | $Y_{13}$ | $Y_3$ | $Y_5$ |
| $x'_6$ | $y'_6$ | $x'_2$ | $Y_{14}$ | $y'_2$ | $Y_6$ |
| $x'_7$ | $y'_7$ | $x'_3$ | $Y_{15}$ | $y'_3$ | $Y_7$ |
| $x'_8$ | $y'_8$ | | | | $Y_8$ |
| $x'_9$ | $y'_9$ | | | | $Y_9$ |
| $x'_{10}$ | $y'_{10}$ | | | | $Y_{10}$ |
| $x'_{11}$ | $y'_{11}$ | | | | $Y_{11}$ |

FIG. 159A

| S1 | S2 | S3 | S4 | S5 | S6 |
|---|---|---|---|---|---|
| $u'_4$ | $v'_4$ | $Y_0$ | $Y_{12}$ | $Y_2$ | $Y_4$ |
| $u'_5$ | $v'_5$ | $Y_1$ | $Y_{13}$ | $Y_3$ | $Y_5$ |
| $u'_6$ | $v'_6$ | $u'_2$ | $Y_{14}$ | $v'_2$ | $Y_6$ |
| $u'_7$ | $v'_7$ | $u'_3$ | $Y_{15}$ | $v'_3$ | $Y_7$ |
| $u'_8$ | $v'_8$ | | | | $Y_8$ |
| $u'_9$ | $v'_9$ | | | | $Y_9$ |
| $u'_{10}$ | $v'_{10}$ | | | | $Y_{10}$ |
| $u'_{11}$ | $v'_{11}$ | | | | $Y_{11}$ |

FIG. 159B

| Yxy or Yu'v' 16bit into 12bit 4:2:2 - 4 Lane | | | |
|---|---|---|---|
| Lane 0 | Lane 1 | Lane 2 | Lane 3 |
| S1-0 | S2-0 | S1-2 | S2-2 |
| S3-0\|S4-0 | S5-0\|S4-1 | S3-2\|S4-2 | S5-2\|S4-3 |
| S6-0 | S6-1 | S6-2 | S6-3 |
| S1-4 | S2-4 | S1-6 | S2-6 |
| S3-4\|S4-4 | S5-4\|S4-5 | S3-6\|S4-6 | S5-6\|S4-7 |
| S6-4 | S6-5 | S6-6 | S6-7 |

FIG. 160A

| Yxy or Yu'v' 16bit into 12bit 4:2:2 - 2 Lane | |
|---|---|
| Lane 0 | Lane 1 |
| S1-0 | S2-0 |
| S3-0\|S4-0 | S5-0\|S4-1 |
| S6-0 | S6-1 |
| S1-2 | S2-2 |
| S3-2\|S4-2 | S5-2\|S4-3 |
| S6-2 | S6-3 |

FIG. 160B

| Yxy or Yu'v' 16bit into 12bit 4:2:2 - 1 Lane |
|---|
| Lane 0 |
| S1-0 |
| S3-0\|S4-0 |
| S6-0 |
| S2-0 |
| S5-0\|S4-1 |
| S6-1 |

FIG. 160C

| | | | | | | | | |
|---|---|---|---|---|---|---|---|---|
| S1 | $x'_2$ | $x'_3$ | $x'_4$ | $x'_5$ | $x'_6$ | $x'_7$ | $x'_8$ | $x'_9$ |
| S2 | $Y'_0$ | $x'_1$ | | | | | | |
| S3 | $Y'_6$ | $Y'_7$ | $Y'_8$ | $Y'_9$ | $Y'_{10}$ | $Y'_{11}$ | | |
| S4 | $Y'_2$ | $Y'_3$ | $Y'_4$ | $Y'_5$ | | | | |
| S5 | $y'_6$ | $y'_7$ | $y'_8$ | $y'_9$ | | | | |
| S6 | $Y'_1$ | $y'_1$ | $y'_2$ | $y'_3$ | $y'_4$ | $y'_5$ | | |
| S7 | $x'_8$ | $x'_9$ | | | | | | |
| S8 | $Y'_0$ | $x'_1$ | $x'_2$ | $x'_3$ | $x'_4$ | $x'_5$ | $x'_6$ | $x'_7$ |
| S9 | $Y'_4$ | $Y'_5$ | $Y'_6$ | $Y'_7$ | $Y'_8$ | $Y'_9$ | $Y'_{10}$ | $Y'_{11}$ |
| S10 | $Y'_2$ | $Y'_3$ | | | | | | |
| S11 | $y'_4$ | $y'_5$ | $y'_6$ | $y'_7$ | $y'_8$ | $y'_9$ | | |
| S12 | $Y'_1$ | $y'_1$ | $y'_2$ | $y'_3$ | | | | |
| S13 | $x'_6$ | $x'_7$ | $x'_8$ | $x'_9$ | | | | |
| S14 | $Y'_0$ | $x'_1$ | $x'_2$ | $x'_3$ | $x'_4$ | $x'_5$ | | |
| S15 | $Y'_{10}$ | $Y'_{11}$ | | | | | | |
| S16 | $Y'_2$ | $Y'_3$ | $Y'_4$ | $Y'_5$ | $Y'_6$ | $Y'_7$ | $Y'_8$ | $Y'_9$ |
| S17 | $y'_2$ | $y'_3$ | $y'_4$ | $y'_5$ | $y'_6$ | $y'_7$ | $y'_8$ | $y'_9$ |
| S18 | $Y'_1$ | $y'_1$ | | | | | | |
| S19 | $x'_4$ | $x'_5$ | $x'_6$ | $x'_7$ | $x'_8$ | $x'_9$ | | |
| S20 | $Y'_0$ | $x'_1$ | $x'_2$ | $x'_3$ | | | | |
| S21 | $Y'_8$ | $Y'_9$ | $Y'_{10}$ | $Y'_{11}$ | | | | |
| S22 | $Y'_2$ | $Y'_3$ | $Y'_4$ | $Y'_5$ | $Y'_6$ | $Y'_7$ | | |
| S23 | $y'_8$ | $y'_9$ | | | | | | |
| S24 | $Y'_1$ | $y'_1$ | $y'_2$ | $y'_3$ | $y'_4$ | $y'_5$ | $y'_6$ | $y'_7$ |

FIG. 161A

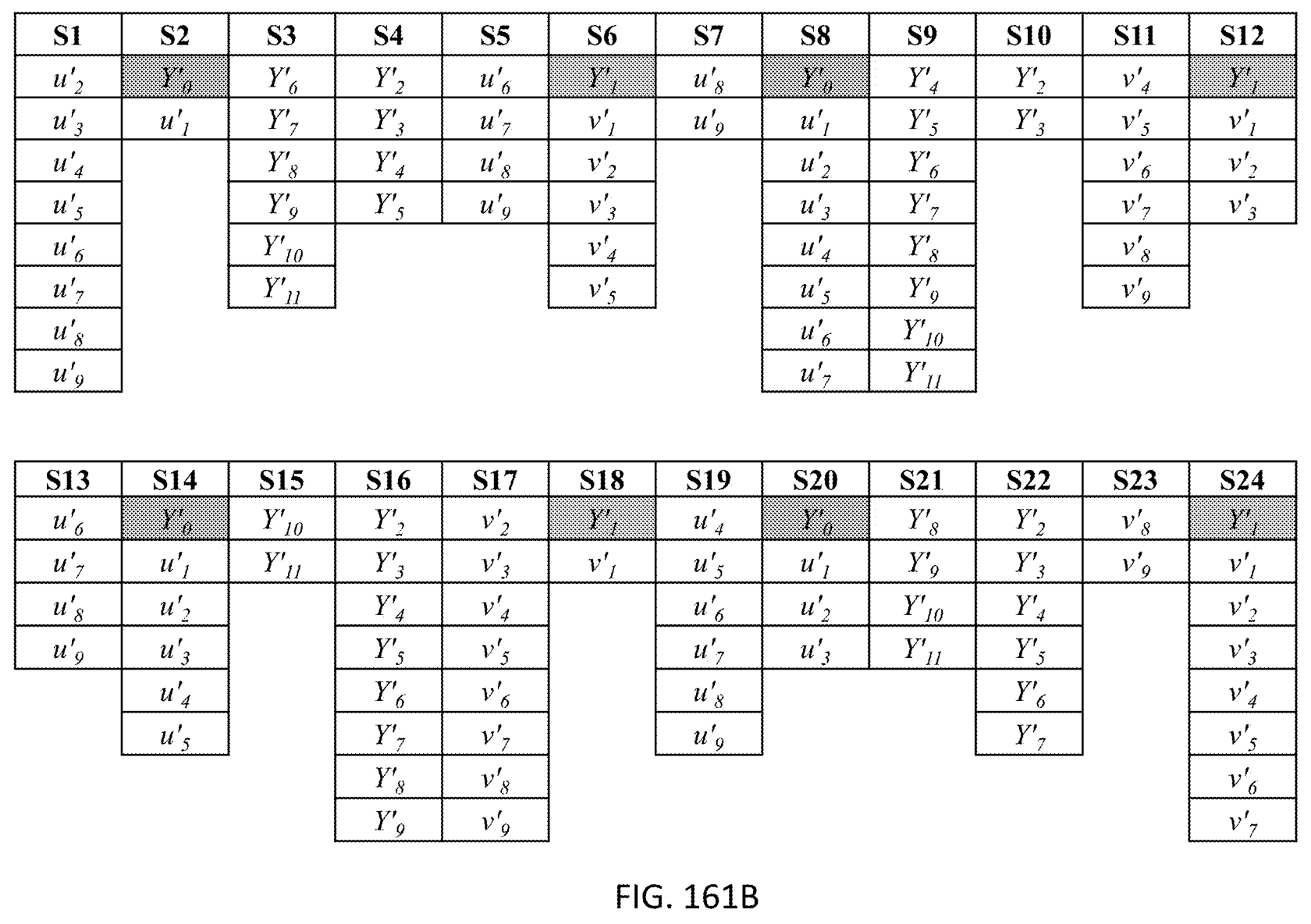

| S1 | S2 | S3 | S4 | S5 | S6 | S7 | S8 | S9 | S10 | S11 | S12 |
|---|---|---|---|---|---|---|---|---|---|---|---|
| $u'_2$ | $Y'_0$ | $Y'_6$ | $Y'_2$ | $u'_6$ | $Y'_1$ | $u'_8$ | $Y'_0$ | $Y'_4$ | $Y'_2$ | $v'_4$ | $Y'_1$ |
| $u'_3$ | $u'_1$ | $Y'_7$ | $Y'_3$ | $u'_7$ | $v'_1$ | $u'_9$ | $u'_1$ | $Y'_5$ | $Y'_3$ | $v'_5$ | $v'_1$ |
| $u'_4$ | | $Y'_8$ | $Y'_4$ | $u'_8$ | $v'_2$ | | $u'_2$ | $Y'_6$ | | $v'_6$ | $v'_2$ |
| $u'_5$ | | $Y'_9$ | $Y'_5$ | $u'_9$ | $v'_3$ | | $u'_3$ | $Y'_7$ | | $v'_7$ | $v'_3$ |
| $u'_6$ | | $Y'_{10}$ | | | $v'_4$ | | $u'_4$ | $Y'_8$ | | $v'_8$ | |
| $u'_7$ | | $Y'_{11}$ | | | $v'_5$ | | $u'_5$ | $Y'_9$ | | $v'_9$ | |
| $u'_8$ | | | | | | | $u'_6$ | $Y'_{10}$ | | | |
| $u'_9$ | | | | | | | $u'_7$ | $Y'_{11}$ | | | |

| S13 | S14 | S15 | S16 | S17 | S18 | S19 | S20 | S21 | S22 | S23 | S24 |
|---|---|---|---|---|---|---|---|---|---|---|---|
| $u'_6$ | $Y'_0$ | $Y'_{10}$ | $Y'_2$ | $v'_2$ | $Y'_1$ | $u'_4$ | $Y'_0$ | $Y'_8$ | $Y'_2$ | $v'_8$ | $Y'_1$ |
| $u'_7$ | $u'_1$ | $Y'_{11}$ | $Y'_3$ | $v'_3$ | $v'_1$ | $u'_5$ | $u'_1$ | $Y'_9$ | $Y'_3$ | $v'_9$ | $v'_1$ |
| $u'_8$ | $u'_2$ | | $Y'_4$ | $v'_4$ | | $u'_6$ | $u'_2$ | $Y'_{10}$ | $Y'_4$ | | $v'_2$ |
| $u'_9$ | $u'_3$ | | $Y'_5$ | $v'_5$ | | $u'_7$ | $u'_3$ | $Y'_{11}$ | $Y'_5$ | | $v'_3$ |
| | $u'_4$ | | $Y'_6$ | $v'_6$ | | $u'_8$ | | | $Y'_6$ | | $v'_4$ |
| | $u'_5$ | | $Y'_7$ | $v'_7$ | | $u'_9$ | | | $Y'_7$ | | $v'_5$ |
| | | | $Y'_8$ | $v'_8$ | | | | | | | $v'_6$ |
| | | | $Y'_9$ | $v'_9$ | | | | | | | $v'_7$ |

FIG. 161B

| Yxy or Yu'v' 12bit into 10bit 4:4:4 - 4 Lane | | | |
|---|---|---|---|
| **Lane 0** | **Lane 1** | **Lane 2** | **Lane 3** |
| S1-0 | S1-1 | S1-2 | S1-3 |
| S2-0\|S3-0 | S2-1\|S3-1 | S2-2\|S3-2 | S2-3\|S3-3 |
| S4-0\|S5-0 | S4-1\|S5-1 | S4-2\|S5-2 | S4-3\|S5-3 |
| S6-0\|S7-0 | S6-1\|S7-1 | S6-2\|S7-2 | S6-3\|S7-3 |
| S8-4 | S8-5 | S8-6 | S8-7 |
| S9-4 | S9-5 | S9-6 | S9-7 |
| S10-4\|S11-4 | S10-5\|S11-5 | S10-6\|S11-6 | S10-7\|S11-7 |
| S12-4\|S13-8 | S12-5\|S13-9 | S12-6\|S13-10 | S12-7\|S13-11 |
| S14-8\|S15-8 | S14-9\|S15-9 | S14-10\|S15-10 | S14-11\|S15-11 |
| S16-8 | S16-9 | S16-10 | S16-11 |
| S17-8 | S17-9 | S17-10 | S17-11 |
| S18-8\|S19-12 | S18-9\|S19-13 | S18-10\|S19-14 | S18-11\|S19-15 |
| S20-12\|S21-12 | S20-13\|S21-13 | S20-14\|S21-14 | S20-15\|S21-15 |
| S22-12\|S23-12 | S22-13\|S23-13 | S22-14\|S23-14 | S22-15\|S23-15 |
| S24-12 | S24-13 | S24-14 | S24-15 |

FIG. 162A

| Yxy or Yu'v' 12bit into 10bit 4:4:4 - 2 Lane | |
|---|---|
| **Lane 0** | **Lane 1** |
| S1-0 | S1-1 |
| S2-0\|S3-0 | S2-1\|S3-1 |
| S4-0\|S5-0 | S4-1\|S5-1 |
| S6-0\|S7-2 | S6-1\|S7-3 |
| S8-2 | S8-3 |
| S9-2 | S9-3 |
| S10-2\|S11-2 | S10-3\|S11-3 |
| S12-2\|S13-4 | S12-3\|S13-5 |
| S14-4\|S15-4 | S14-5\|S15-5 |
| S16-4 | S16-5 |
| S17-4 | S17-5 |
| S18-4\|S19-6 | S18-5\|S19-7 |
| S20-6\|S21-6 | S20-7\|S21-7 |
| S22-6\|S23-6 | S22-7\|S23-7 |
| S24-6 | S24-7 |

FIG. 162B

| Yxy or Yu'v' 12bit into 10bit 4:4:4 - 1 Lane |
|---|
| **Lane 0** |
| S1-0 |
| S2-0\|S3-0 |
| S4-0\|S5-0 |
| S6-0\|S7-1 |
| S8-1 |
| S9-1 |
| S10-1\|S11-1 |
| S12-1\|S13-2 |
| S14-2\|S15-2 |
| S16-2 |
| S17-2 |
| S18-2\|S19-3 |
| S20-3\|S21-3 |
| S22-3\|S23-3 |
| S24-3 |

FIG. 162C

| S1 | S2 | S3 | S4 | S5 | S6 | S7 | S8 | S9 | S10 | S11 | S12 |
|---|---|---|---|---|---|---|---|---|---|---|---|
| $x'_4$ | $Y_0$ | $Y_{12}$ | $Y_4$ | $y'_4$ | $Y_2$ | $x'_8$ | $Y_0$ | $Y_8$ | $Y_4$ | $y'_8$ | $Y_2$ |
| $x'_5$ | $Y_1$ | $Y_{13}$ | $Y_5$ | $y'_5$ | $Y_3$ | $x'_9$ | $Y_1$ | $Y_9$ | $Y_5$ | $y'_9$ | $Y_3$ |
| $x'_6$ | $x'_2$ | $Y_{14}$ | $Y_6$ | $y'_6$ | $y'_2$ | $x'_{10}$ | $x'_2$ | $Y_{10}$ | $Y_6$ | $y'_{10}$ | $y'_2$ |
| $x'_7$ | $x'_3$ | $Y_{15}$ | $Y_7$ | $y'_7$ | $y'_3$ | $x'_{11}$ | $x'_3$ | $Y_{11}$ | $Y_7$ | $y'_{11}$ | $y'_3$ |
| $x'_8$ | | | $Y_8$ | $y'_8$ | | | $x'_4$ | $Y_{12}$ | | | $y'_4$ |
| $x'_9$ | | | $Y_9$ | $y'_9$ | | | $x'_5$ | $Y_{13}$ | | | $y'_5$ |
| $x'_{10}$ | | | $Y_{10}$ | $y'_{10}$ | | | $x'_6$ | $Y_{14}$ | | | $y'_6$ |
| $x'_{11}$ | | | $Y_{11}$ | $y'_{11}$ | | | $x'_7$ | $Y_{15}$ | | | $y'_7$ |

FIG. 163A

| S1 | S2 | S3 | S4 | S5 | S6 | S7 | S8 | S9 | S10 | S11 | S12 |
|---|---|---|---|---|---|---|---|---|---|---|---|
| $u'_4$ | $Y_0$ | $Y_{12}$ | $Y_4$ | $v'_4$ | $Y_2$ | $u'_8$ | $Y_0$ | $Y_8$ | $Y_4$ | $v'_8$ | $Y_2$ |
| $u'_5$ | $Y_1$ | $Y_{13}$ | $Y_5$ | $v'_5$ | $Y_3$ | $u'_9$ | $Y_1$ | $Y_9$ | $Y_5$ | $v'_9$ | $Y_3$ |
| $u'_6$ | $u'_2$ | $Y_{14}$ | $Y_6$ | $v'_6$ | $v'_2$ | $u'_{10}$ | $u'_2$ | $Y_{10}$ | $Y_6$ | $v'_{10}$ | $v'_2$ |
| $u'_7$ | $u'_3$ | $Y_{15}$ | $Y_7$ | $v'_7$ | $v'_3$ | $u'_{11}$ | $u'_3$ | $Y_{11}$ | $Y_7$ | $v'_{11}$ | $v'_3$ |
| $u'_8$ | | | $Y_8$ | $v'_8$ | | | $u'_4$ | $Y_{12}$ | | | $v'_4$ |
| $u'_9$ | | | $Y_9$ | $v'_9$ | | | $u'_5$ | $Y_{13}$ | | | $v'_5$ |
| $u'_{10}$ | | | $Y_{10}$ | $v'_{10}$ | | | $u'_6$ | $Y_{14}$ | | | $v'_6$ |
| $u'_{11}$ | | | $Y_{11}$ | $v'_{11}$ | | | $u'_7$ | $Y_{15}$ | | | $v'_7$ |

FIG. 163B

| Yxy or Yu'v' 16 bit into 12bit 4:4:4 – 4 Lane | | | |
|---|---|---|---|
| Lane 0 | Lane 1 | Lane 2 | Lane 3 |
| S1-0 | S1-1 | S1-2 | S1-3 |
| S2-0\|S3-0 | S2-1\|S3-1 | S2-2\|S3-2 | S2-3\|S3-3 |
| S4-0 | S4-1 | S4-2 | S4-3 |
| S5-0 | S5-1 | S5-2 | S5-3 |
| S6-0\|S7-4 | S6-1\|S7-5 | S6-2\|S7-6 | S6-3\|S7-7 |
| S8-4 | S8-5 | S8-6 | S8-7 |
| S9-4 | S9-5 | S9-6 | S9-7 |
| S10-4\|S11-4 | S10-5\|S11-5 | S10-6\|S11-6 | S10-7\|S11-7 |
| S12-4 | S12-5 | S12-6 | S12-7 |

FIG. 164A

| Yxy or Yu'v' 16bit into 12bit 4:4:4 - 2 Lane | |
|---|---|
| Lane 0 | Lane 1 |
| S1-0 | S1-1 |
| S2-0\|S3-0 | S2-1\|S3-1 |
| S4-0 | S4-1 |
| S5-0 | S5-1 |
| S6-0\|S7-2 | S6-1\|S7-3 |
| S8-2 | S8-3 |
| S9-2 | S9-3 |
| S10-2\|S11-2 | S10-3\|S11-3 |
| S12-2 | S12-3 |

FIG. 164B

| Yxy or Yu'v' 16bit into 12bit 4:4:4 - 1 Lane |
|---|
| Lane 0 |
| S1-0 |
| S2-0\|S3-0 |
| S12-0 |
| S5-0 |
| S6-0\|S7-1 |
| S8-1 |
| S9-1 |
| S10-1\|S11-1 |
| S12-1 |

FIG. 164C

SYSTEM AND METHOD FOR A MULTI-PRIMARY WIDE GAMUT COLOR SYSTEM

CROSS REFERENCES TO RELATED APPLICATIONS

This application is a continuation-in-part of U.S. application Ser. No. 17/671,074, filed Feb. 14, 2022, which is a continuation-part-of U.S. application Ser. No. 17/670,018, filed Feb. 11, 2022, which is a continuation-in-part of U.S. application Ser. No. 17/516,143, filed Nov. 1, 2021, which is a continuation-in-part of U.S. application Ser. No. 17/338,357, filed Jun. 3, 2021, which is a continuation-in-part of U.S. application Ser. No. 17/225,734, filed Apr. 8, 2021, which is a continuation-in-part of U.S. application Ser. No. 17/076,383, filed Oct. 21, 2020, which is a continuation-in-part of U.S. application Ser. No. 17/009,408, filed Sep. 1, 2020, which is a continuation-in-part of U.S. application Ser. No. 16/887,807, filed May 29, 2020, which is a continuation-in-part of U.S. application Ser. No. 16/860,769, filed Apr. 28, 2020, which is a continuation-in-part of U.S. application Ser. No. 16/853,203, filed Apr. 20, 2020, which is a continuation-in-part of U.S. patent application Ser. No. 16/831,157, filed Mar. 26, 2020, which is a continuation of U.S. patent application Ser. No. 16/659,307, filed Oct. 21, 2019, now U.S. Pat. No. 10,607,527, which is related to and claims priority from U.S. Provisional Patent Application No. 62/876,878, filed Jul. 22, 2019, U.S. Provisional Patent Application No. 62/847,630, filed May 14, 2019, U.S. Provisional Patent Application No. 62/805,705, filed Feb. 14, 2019, and U.S. Provisional Patent Application No. 62/750,673, filed Oct. 25, 2018, each of which is incorporated herein by reference in its entirety.

BACKGROUND OF THE INVENTION

1. Field of the Invention

The present invention relates to color systems, and more specifically to a wide gamut color system with an increased number of primary colors.

2. Description of the Prior Art

It is generally known in the prior art to provide for an increased color gamut system within a display.

Prior art patent documents include the following:

U.S. Pat. No. 10,222,263 for RGB value calculation device by inventor Yasuyuki Shigezane, filed Feb. 6, 2017 and issued Mar. 5, 2019, is directed to a microcomputer that equally divides the circumference of an RGB circle into 6×n (n is an integer of 1 or more) parts, and calculates an RGB value of each divided color. (255, 0, 0) is stored as a reference RGB value of a reference color in a ROM in the microcomputer. The microcomputer converts the reference RGB value depending on an angular difference of the RGB circle between a designated color whose RGB value is to be found and the reference color, and assumes the converted RGB value as an RGB value of the designated color.

U.S. Pat. No. 9,373,305 for Semiconductor device, image processing system and program by inventor Hiorfumi Kawaguchi, filed May 29, 2015 and issued Jun. 21, 2016, is directed to an image process device including a display panel operable to provide an input interface for receiving an input of an adjustment value of at least a part of color attributes of each vertex of n axes (n is an integer equal to or greater than 3) serving as adjustment axes in an RGB color space, and an adjustment data generation unit operable to calculate the degree of influence indicative of a following index of each of the n-axis vertices, for each of the n axes, on a basis of distance between each of the n-axis vertices and a target point which is an arbitrary lattice point in the RGB color space, and operable to calculate adjusted coordinates of the target point in the RGB color space.

U.S. Publication No. 20130278993 for Color-mixing bi-primary color systems for displays by inventor Heikenfeld, et. al, filed Sep. 1, 2011 and published Oct. 24, 2013, is directed to a display pixel. The pixel includes first and second substrates arranged to define a channel. A fluid is located within the channel and includes a first colorant and a second colorant. The first colorant has a first charge and a color. The second colorant has a second charge that is opposite in polarity to the first charge and a color that is complimentary to the color of the first colorant. A first electrode, with a voltage source, is operably coupled to the fluid and configured to moving one or both of the first and second colorants within the fluid and alter at least one spectral property of the pixel.

U.S. Pat. No. 8,599,226 for Device and method of data conversion for wide gamut displays by inventor Ben-Chorin, et. al, filed Feb. 13, 2012 and issued Dec. 3, 2013, is directed to a method and system for converting color image data from a, for example, three-dimensional color space format to a format usable by an n-primary display, wherein n is greater than or equal to 3. The system may define a two-dimensional sub-space having a plurality of two-dimensional positions, each position representing a set of n primary color values and a third, scaleable coordinate value for generating an n-primary display input signal. Furthermore, the system may receive a three-dimensional color space input signal including out-of range pixel data not reproducible by a three-primary additive display, and may convert the data to side gamut color image pixel data suitable for driving the wide gamut color display.

U.S. Pat. No. 8,081,835 for Multiprimary color sub-pixel rendering with metameric filtering by inventor Elliot, et. al, filed Jul. 13, 2010 and issued Dec. 20, 2011, is directed to systems and methods of rendering image data to multiprimary displays that adjusts image data across metamers as herein disclosed. The metamer filtering may be based upon input image content and may optimize sub-pixel values to improve image rendering accuracy or perception. The optimizations may be made according to many possible desired effects. One embodiment comprises a display system comprising: a display, said display capable of selecting from a set of image data values, said set comprising at least one metamer; an input image data unit; a spatial frequency detection unit, said spatial frequency detection unit extracting a spatial frequency characteristic from said input image data; and a selection unit, said unit selecting image data from said metamer according to said spatial frequency characteristic.

U.S. Pat. No. 7,916,939 for High brightness wide gamut display by inventor Roth, et. al, filed Nov. 30, 2009 and issued Mar. 29, 2011, is directed to a device to produce a color image, the device including a color filtering arrangement to produce at least four colors, each color produced by a filter on a color filtering mechanism having a relative segment size, wherein the relative segment sizes of at least two of the primary colors differ.

U.S. Pat. No. 6,769,772 for Six color display apparatus having increased color gamut by inventor Roddy, et. al, filed Oct. 11, 2002 and issued Aug. 3, 2004, is directed to a display system for digital color images using six color light sources or two or more multicolor LED arrays or OLEDs to provide an expanded color gamut. Apparatus uses two or more spatial light modulators, which may be cycled between two or more color light sources or LED arrays to provide a six-color display output. Pairing of modulated colors using relative luminance helps to minimize flicker effects.

SUMMARY OF THE INVENTION

It is an object of this invention to provide an enhancement to the current RGB systems or a replacement for them.

In one embodiment, the present invention provides a system for displaying a primary color system, including a set of image data including a set of primary color signals, wherein the set of primary color signals corresponds to a set of values in an International Commission on Illumination (CIE) Yu'v' color space, wherein the set of values in the CIE Yu'v' color space includes a luminance (Y) and two colorimetric coordinates (u',v'), and wherein the two colorimetric coordinates (u',v') are independent from the luminance (Y), an image data converter, wherein the image data converter includes a digital interface, and wherein the digital interface is operable to encode and decode the set of values in the CIE Yu'v' color space, at least one non-linear function for processing the set of values in the CIE Yu'v' color space, wherein the at least one non-linear function is applied to data related to the luminance (Y) and data related to the two colorimetric coordinates (u',v'), and at least one viewing device, wherein the at least one viewing device and the image data converter are in network communication, wherein the encode and the decode includes transportation of processed Yu'v' data, wherein the processed Yu'v' data includes a first channel related to the luminance (Y), a second channel related to a first colorimetric coordinate (u') of the two colorimetric coordinates (u',v'), and a third channel related to the second colorimetric coordinate (v') of the two colorimetric coordinates (u',v'), and wherein the image data converter is operable to convert the set of image data for display on the at least one viewing device.

In another embodiment, the present invention provides a system for displaying a primary color system, including a set of image data including a set of primary color signals, wherein the set of primary color signals corresponds to a set of values in an International Commission on Illumination (CIE) Yu'v' color space, wherein the set of values in the CIE Yu'v' color space includes a luminance (Y) and two colorimetric coordinates (u',v'), and wherein the two colorimetric coordinates (u',v') are independent from the luminance (Y), an image data converter, wherein the image data converter includes a digital interface, and wherein the digital interface is operable to encode and decode the set of values in the CIE Yu'v' color space, and at least one non-linear function for processing the set of values in the CIE Yu'v' color space, wherein the at least one non-linear function is applied to data related to the luminance (Y) and data related to the two colorimetric coordinates (u',v'), a set of Session Description Protocol (SDP) parameters, and at least one viewing device, wherein the at least one viewing device and the image data converter are in network communication, wherein the encode and the decode includes transportation of processed Yu'v' data, wherein the processed Yu'v' data includes a first channel related to the luminance (Y), a second channel related to a first colorimetric coordinate (u') of the two colorimetric coordinates (u',v'), and a third channel related to the second colorimetric coordinate (v') of the two colorimetric coordinates (u',v'), and wherein the image data converter is operable to convert the set of image data for display on the at least one viewing device.

In yet another embodiment, the present invention provides a method for displaying a primary color system, including providing a set of image data including a set of primary color signals, wherein the set of primary color signals corresponds to a set of values in an International Commission on Illumination (CIE) Yu'v' color space, wherein the set of values in the CIE Yu'v' color space includes a luminance (Y) and two colorimetric coordinates (u',v'), encoding the set of image data in the CIE Yu'v' color space using a digital interface of an image data converter, wherein the image data converter is in network communication with at least one viewing device, processing the set of image data in the CIE Yu'v' color space by scaling the two colorimetric coordinates (u',v') and applying at least one non-linear function to the luminance (Y) and the scaled two colorimetric coordinates, decoding the set of image data in the CIE Yu'v' color space using the digital interface of the image data converter, and the image data converter converting the set of image data for display on the at least one viewing device, wherein the encoding and the decoding include transportation of processed Yu'v' data, wherein the processed Yu'v' data includes a first channel related to the luminance (Y), a second channel related to a first colorimetric coordinate (u') of the two colorimetric coordinates (u',v'), and a third channel related to the second colorimetric coordinate (v') of the two colorimetric coordinates (u',v').

These and other aspects of the present invention will become apparent to those skilled in the art after a reading of the following description of the preferred embodiment when considered with the drawings, as they support the claimed invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 71 illustrates modifications to the SMPTE ST352 standards for a six-primary color system.

FIG. 72 illustrates modifications to the SMPTE ST2022 standard for a six-primary color system.

FIG. 73 illustrates a table of 4:4:4 sampling for a six-primary color system for a 10-bit video system.

FIG. 74 illustrates a table of 4:4:4 sampling for a six-primary color system for a 12-bit video system.

FIG. 75 illustrates sequence substitutions for 10-bit and 12-bit video in 4:2:2 sampling systems in a Y Cb Cr Cc Cy color space.

FIG. 77 illustrates sequence substitutions for 10-bit and 12-bit video in 4:2:0 sampling systems using a Y Cb Cr Cc Cy color space.

FIG. 79 illustrates modifications to SMPTE ST2110-20 for a 10-bit six-primary color system in 4:4:4 video.

FIG. 80 illustrates modifications to SMPTE ST2110-20 for a 12-bit six-primary color system in 4:4:4 video.

FIG. 81 illustrates modifications to SMPTE ST2110-20 for a 10-bit six primary color system in 4:2:2 video.

FIG. 82 illustrates modifications to SMPTE ST2110-20 for a 12-bit six-primary color system in 4:2:0 video.

FIG. 90 illustrates a Y Cr Cb Cc Cy sampling transmission using a 4:2:0 sampling system.

FIG. 91 illustrates a dual stack LCD projection system for a six-primary color system.

FIG. 92 illustrates one embodiment of a single projector.

FIG. 93 illustrates a six-primary color system using a single projector and reciprocal mirrors.

FIG. 94 illustrates a dual stack DMD projection system for a six-primary color system.

FIG. 95 illustrates one embodiment of a single DMD projector solution.

FIG. 96 illustrates one embodiment of a color filter array for a six-primary color system with a white OLED monitor.

FIG. 97 illustrates one embodiment of an optical filter array for a six-primary color system with a white OLED monitor.

FIG. 98 illustrates one embodiment of a matrix of an LCD drive for a six-primary color system with a backlight illuminated LCD monitor.

FIG. 99 illustrates one embodiment of an optical filter array for a six-primary color system with a backlight illuminated LCD monitor.

FIG. 100 illustrates an array for a Quantum Dot (QD) display device.

FIG. 101 illustrates one embodiment of an array for a six-primary color system for use with a direct emissive assembled display.

Figure 102:
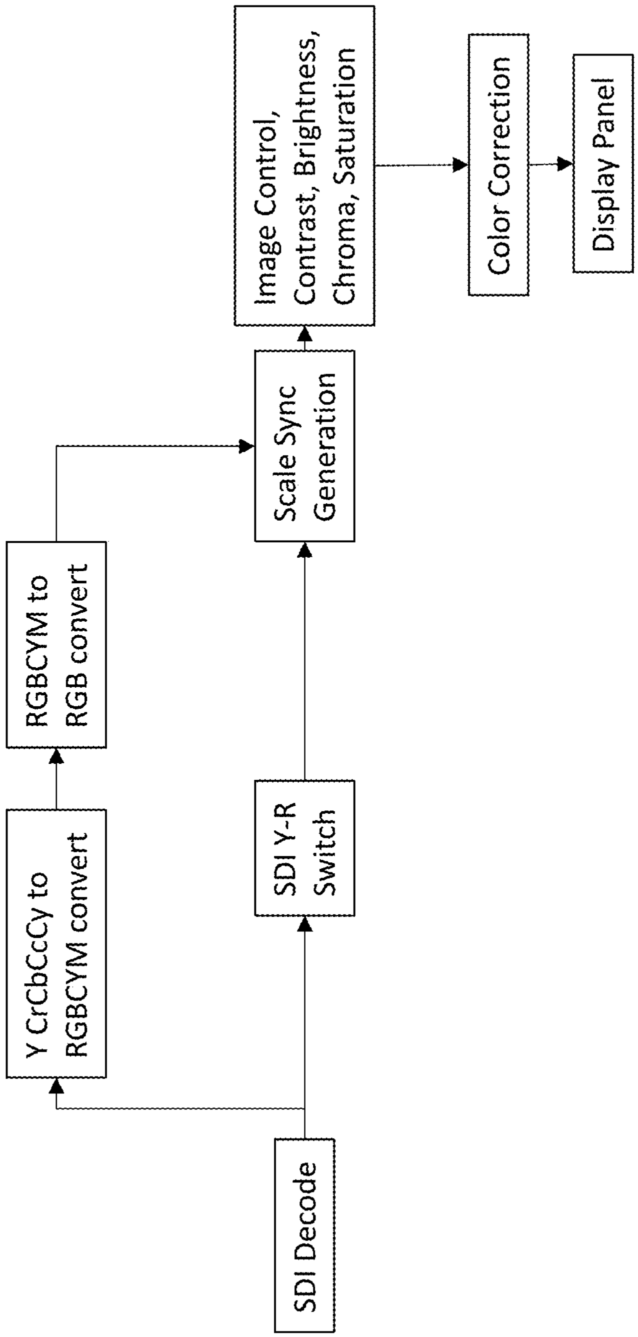

FIG. 102 illustrates one embodiment of a six-primary color system in an emissive display that does not incorporate color filtered subpixels.

Figure 103:
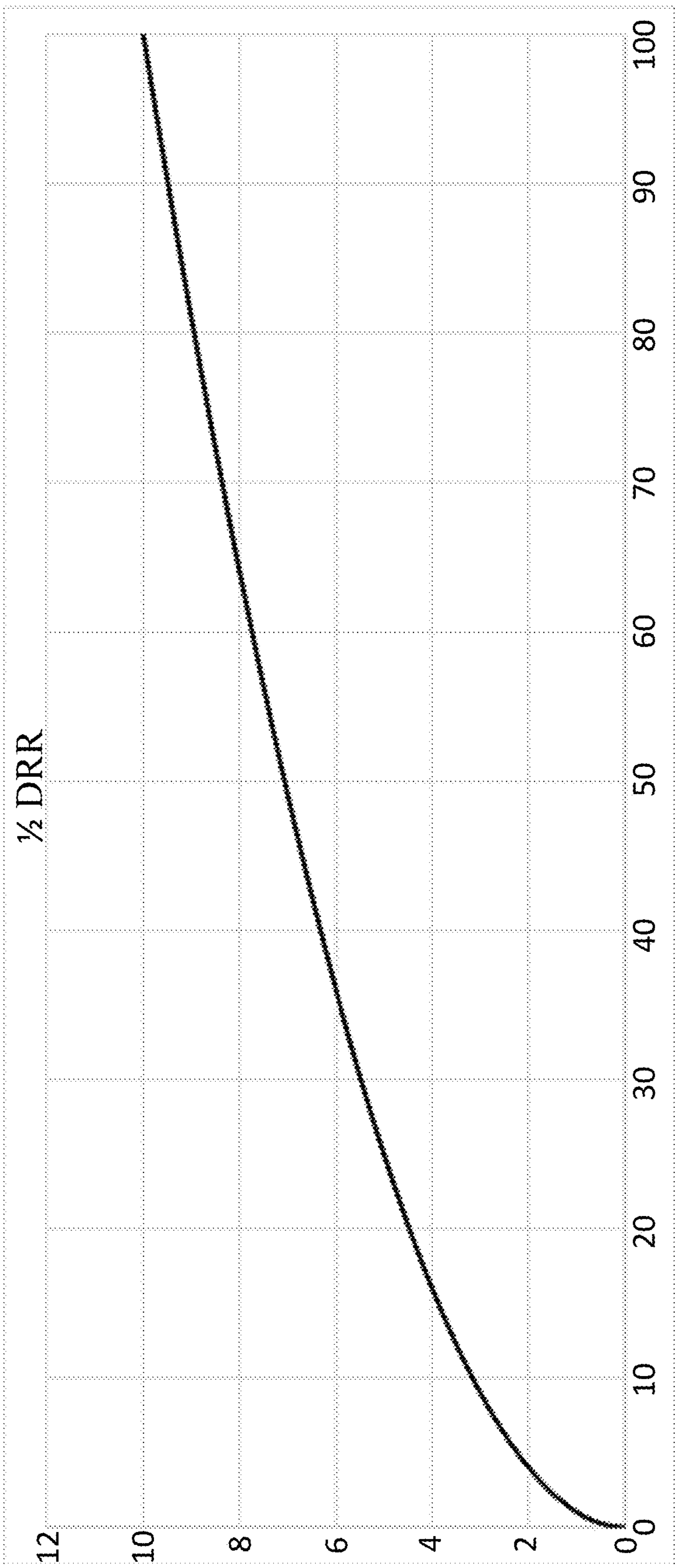

FIG. 103 illustrates one embodiment of a ½ Data Rate Reduction (DRR) function.

Figure 104:
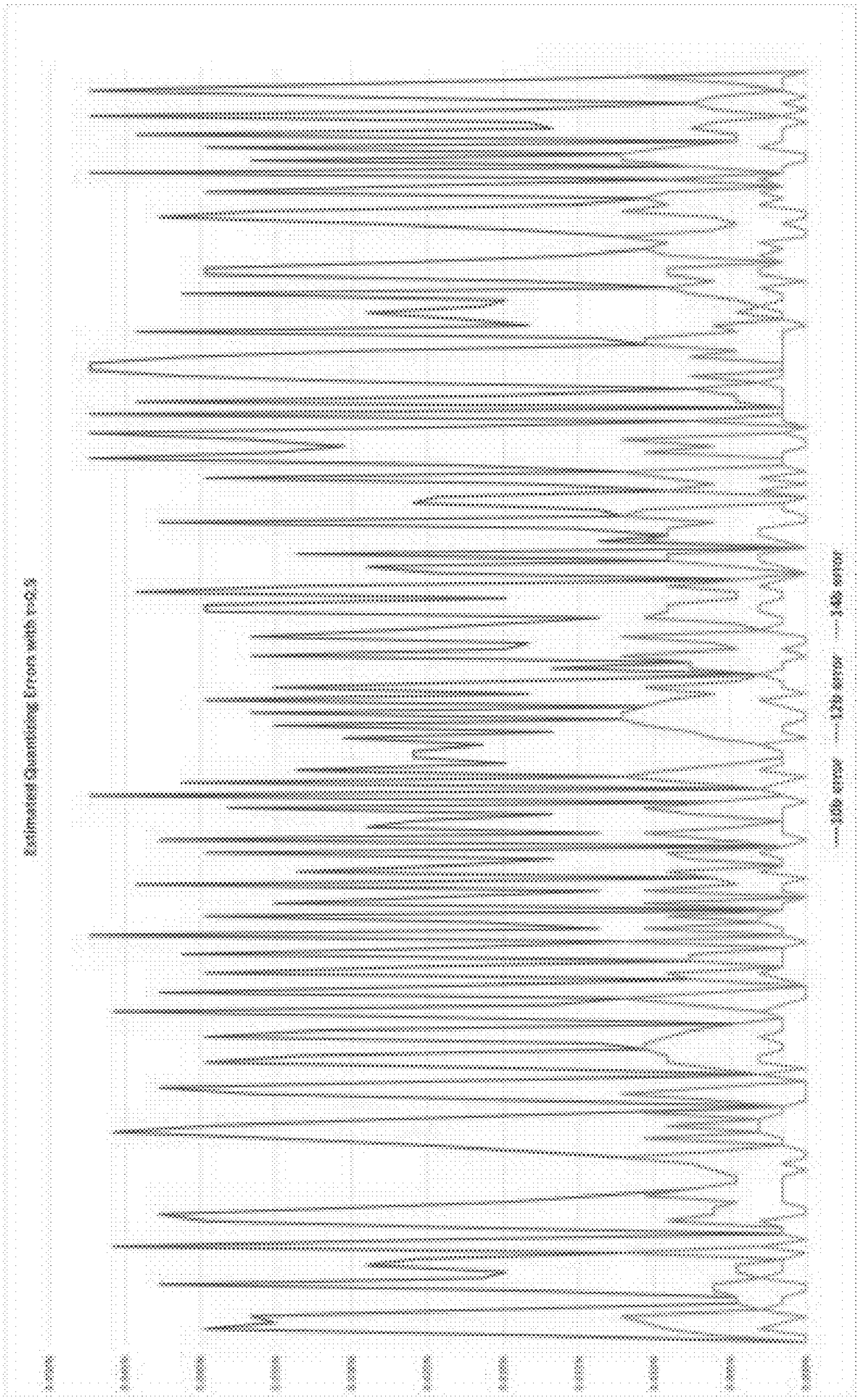

FIG. 104 illustrates a graph of maximum quantizing error using the ½ DRR function.

Figure 105:
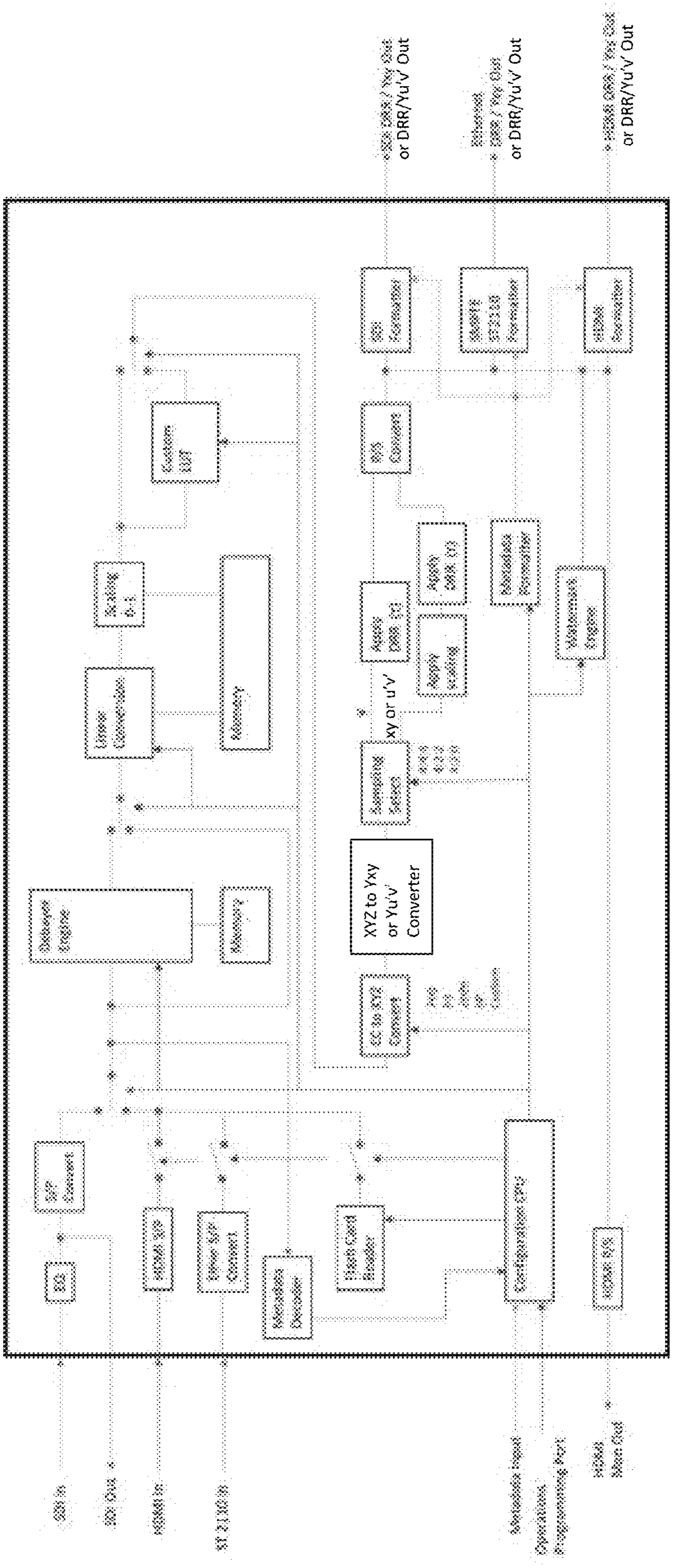

FIG. 105 illustrates one embodiment of an encoder.

Figure 106:
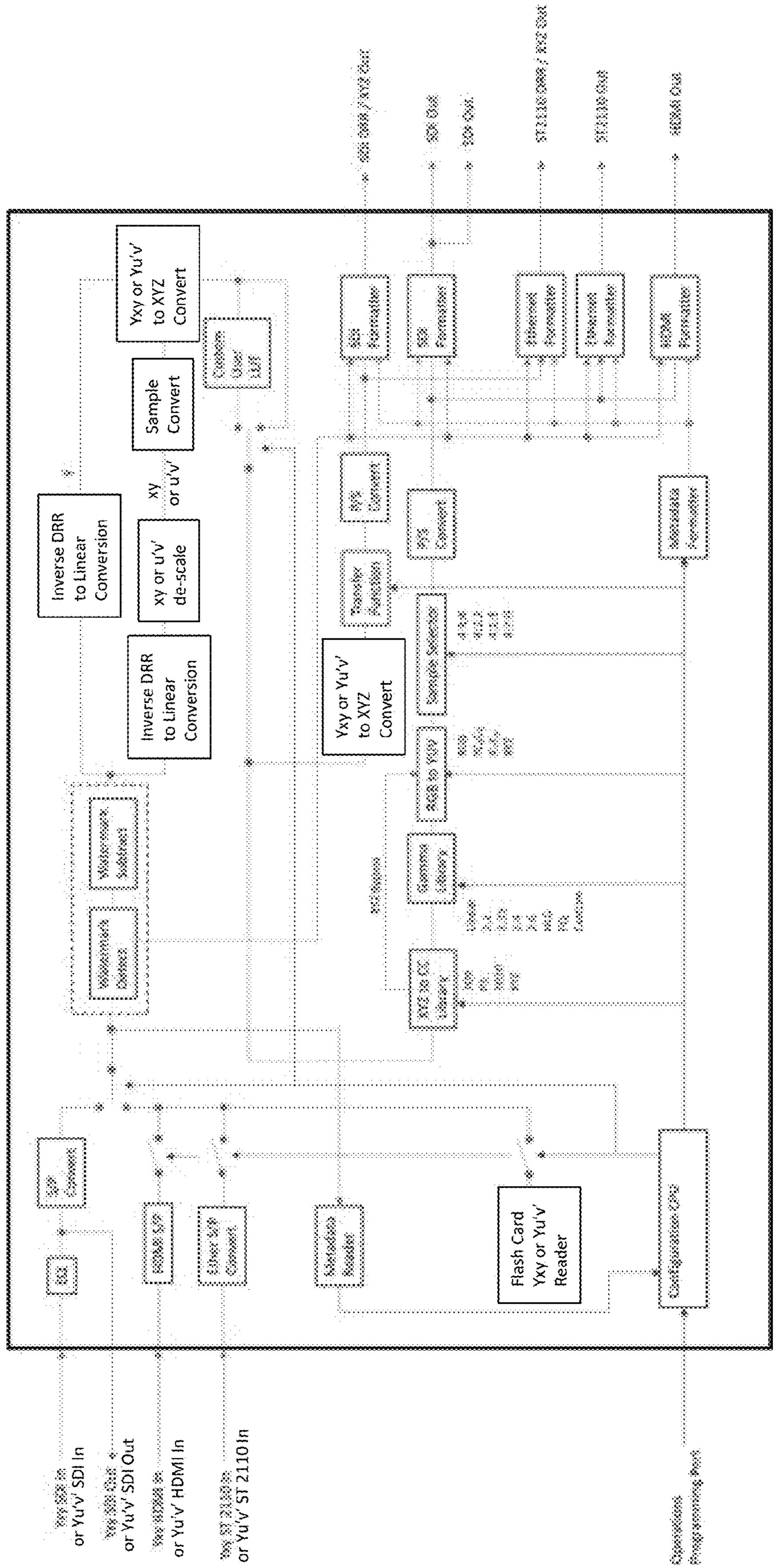

FIG. 106 illustrates one embodiment of a decoder.

Figure 107:
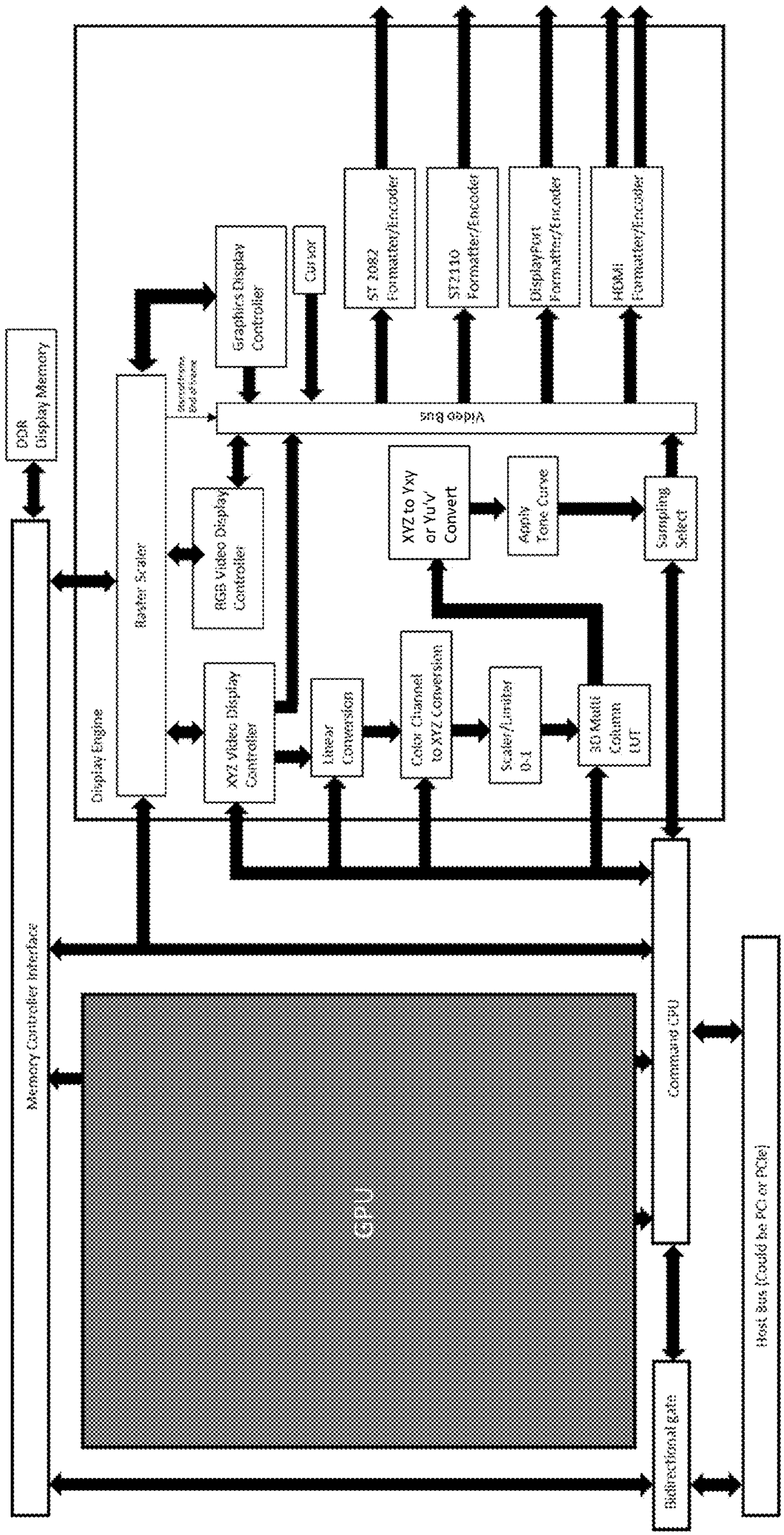

FIG. 107 illustrates one embodiment of a display engine operable to interact with a graphics processing unit (GPU) according to the present invention.

Figure 108:
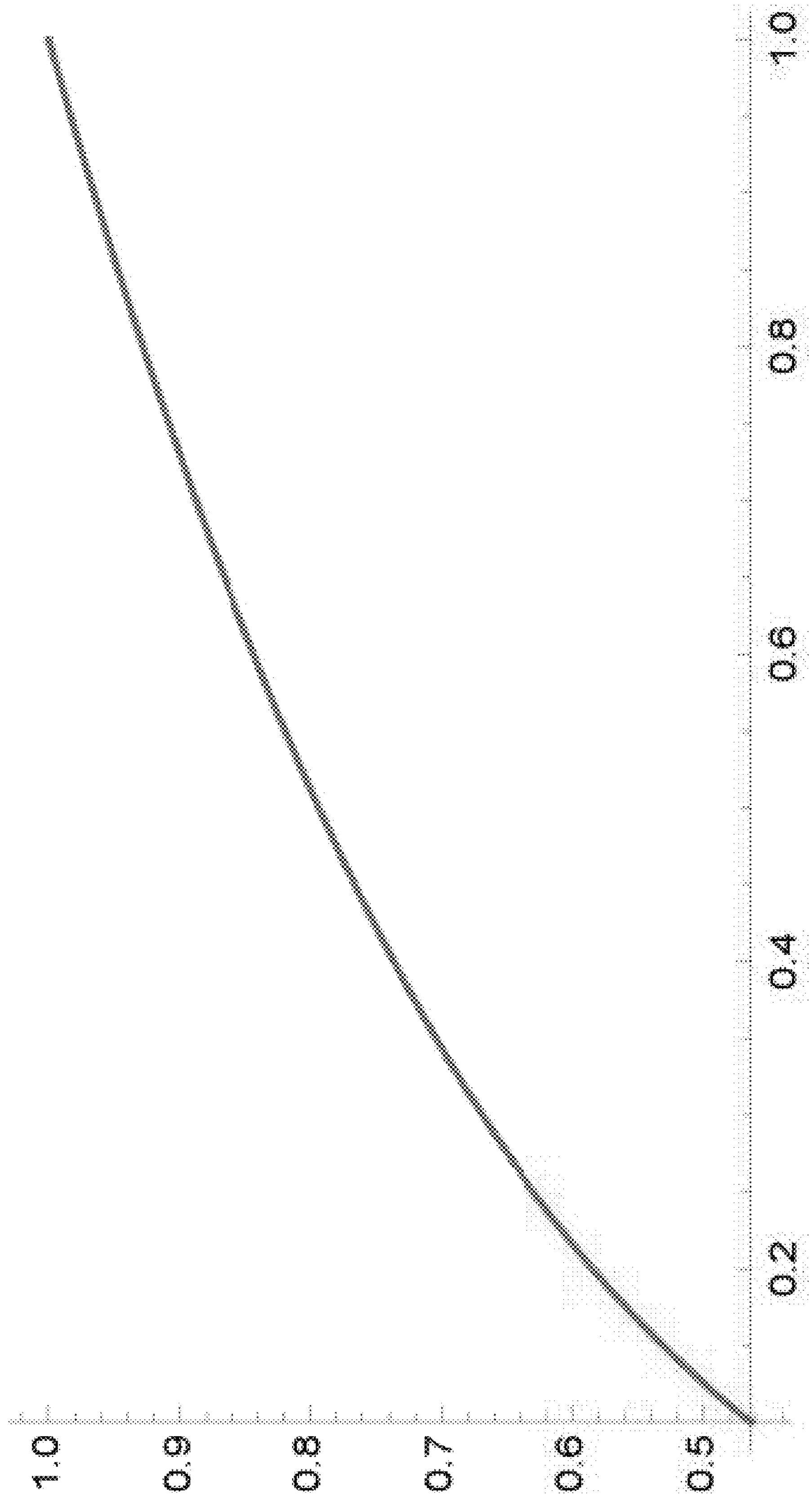

FIG. 108 illustrates one embodiment of a ⅓ DRR function.

Figure 109:
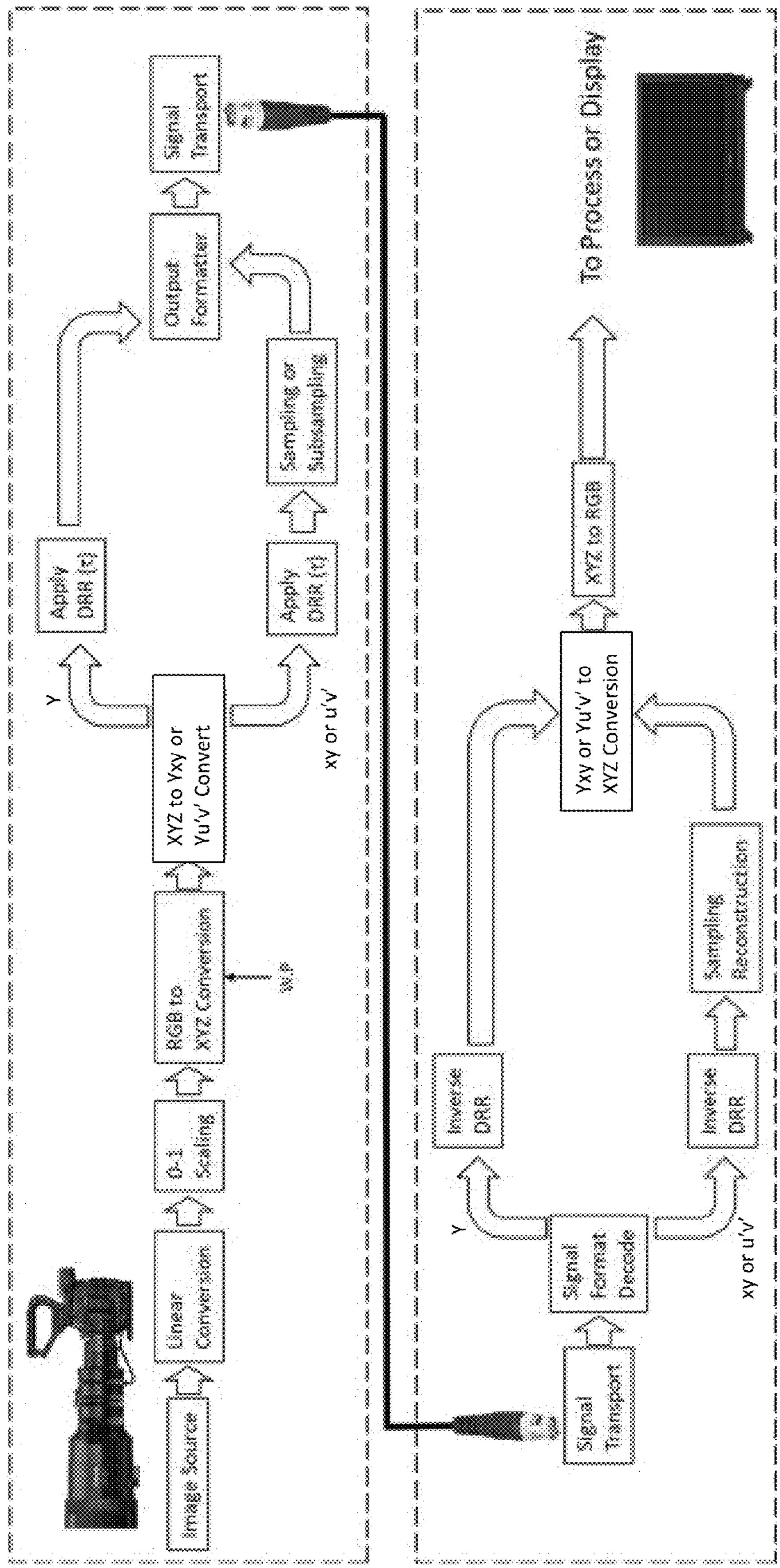

FIG. 109 illustrates one embodiment of a process flow diagram to convert an image for display.

Figure 110:
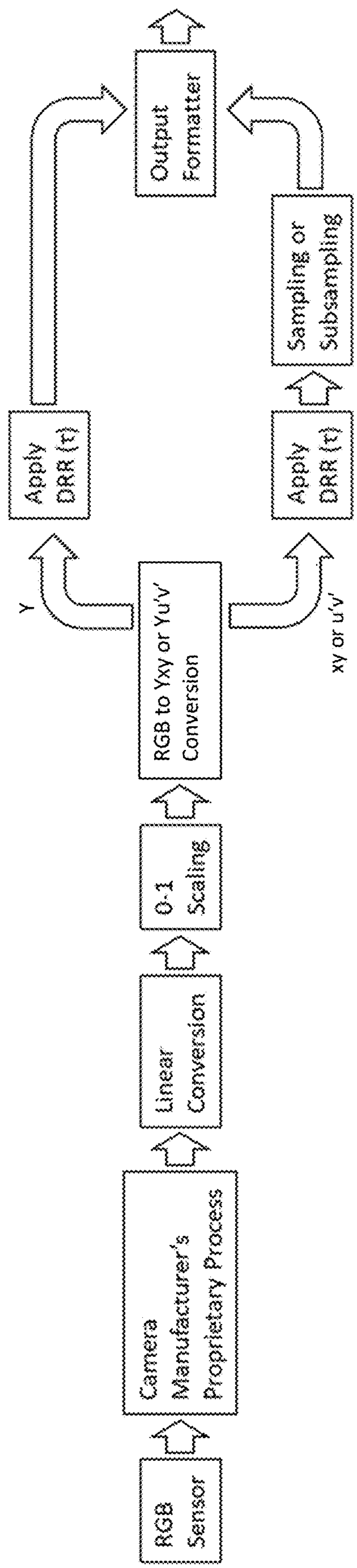

FIG. 110 illustrates one embodiment of a camera process flow.

Figure 111:
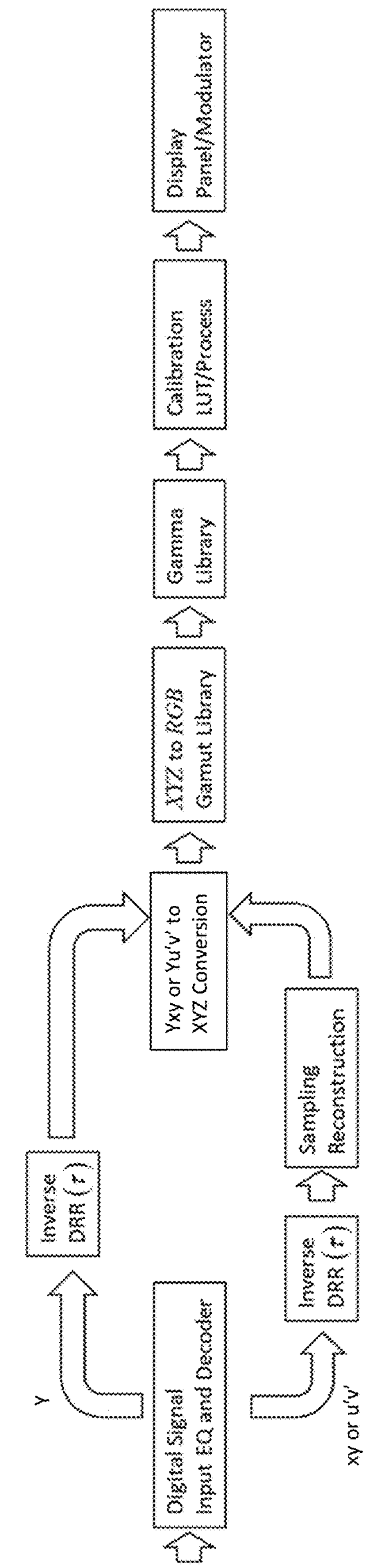

FIG. 111 illustrates one embodiment of a display process flow.

Figure 112:
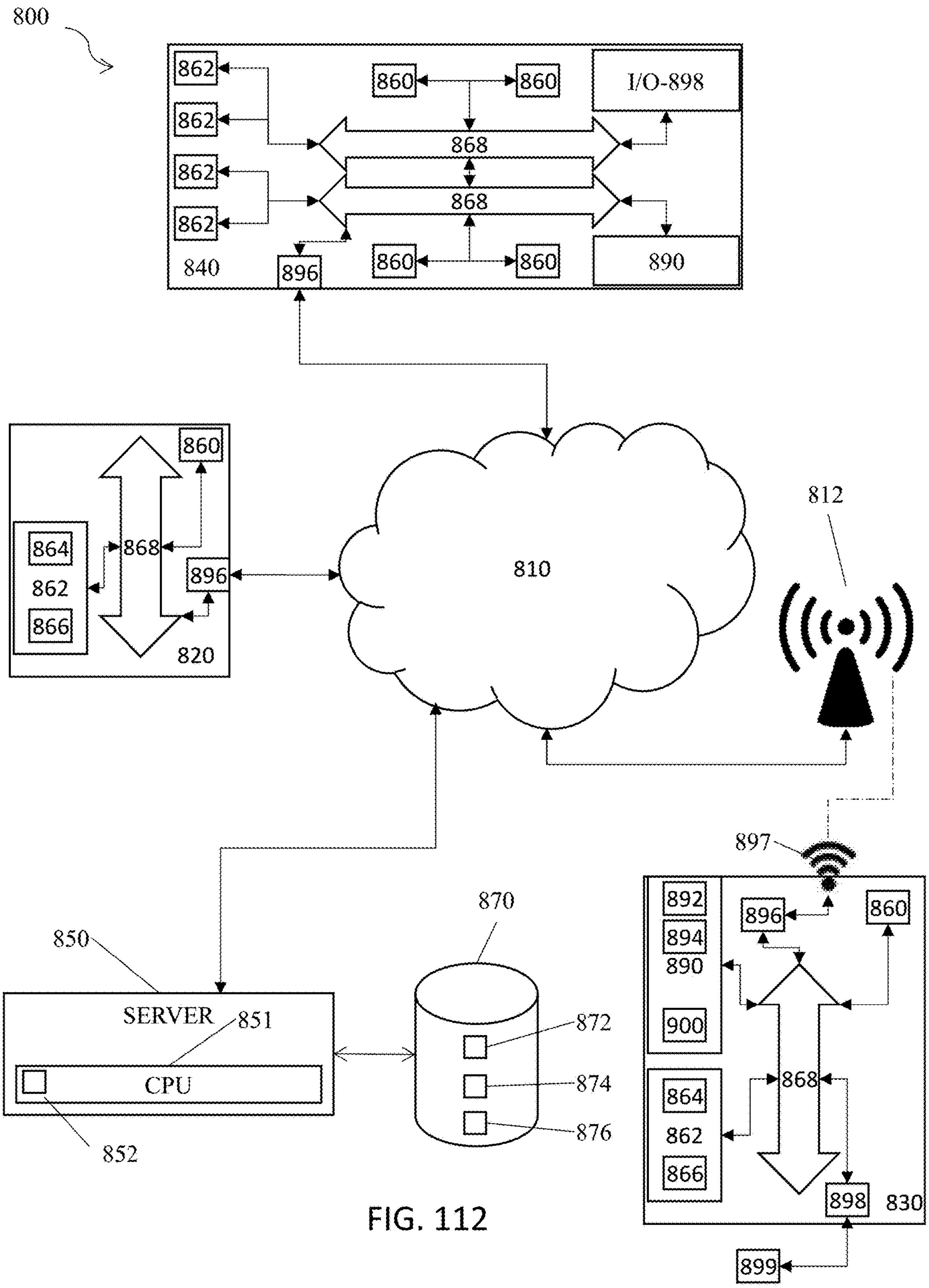

FIG. 112 is a schematic diagram of an embodiment of the invention illustrating a computer system.

FIG. 113 illustrates one embodiment of modifications to payload ID metadata as applied to SMPTE ST352.

FIG. 114A illustrates one embodiment of modifications to payload ID as applied to SMPTE ST352 and ST292.

FIG. 114B illustrates one embodiment of payload ID as applied to SMPTE ST352 and ST372.

FIG. 114C illustrates one embodiment of payload ID as applied to SMPTE ST352 and ST425.

Figure 115A:
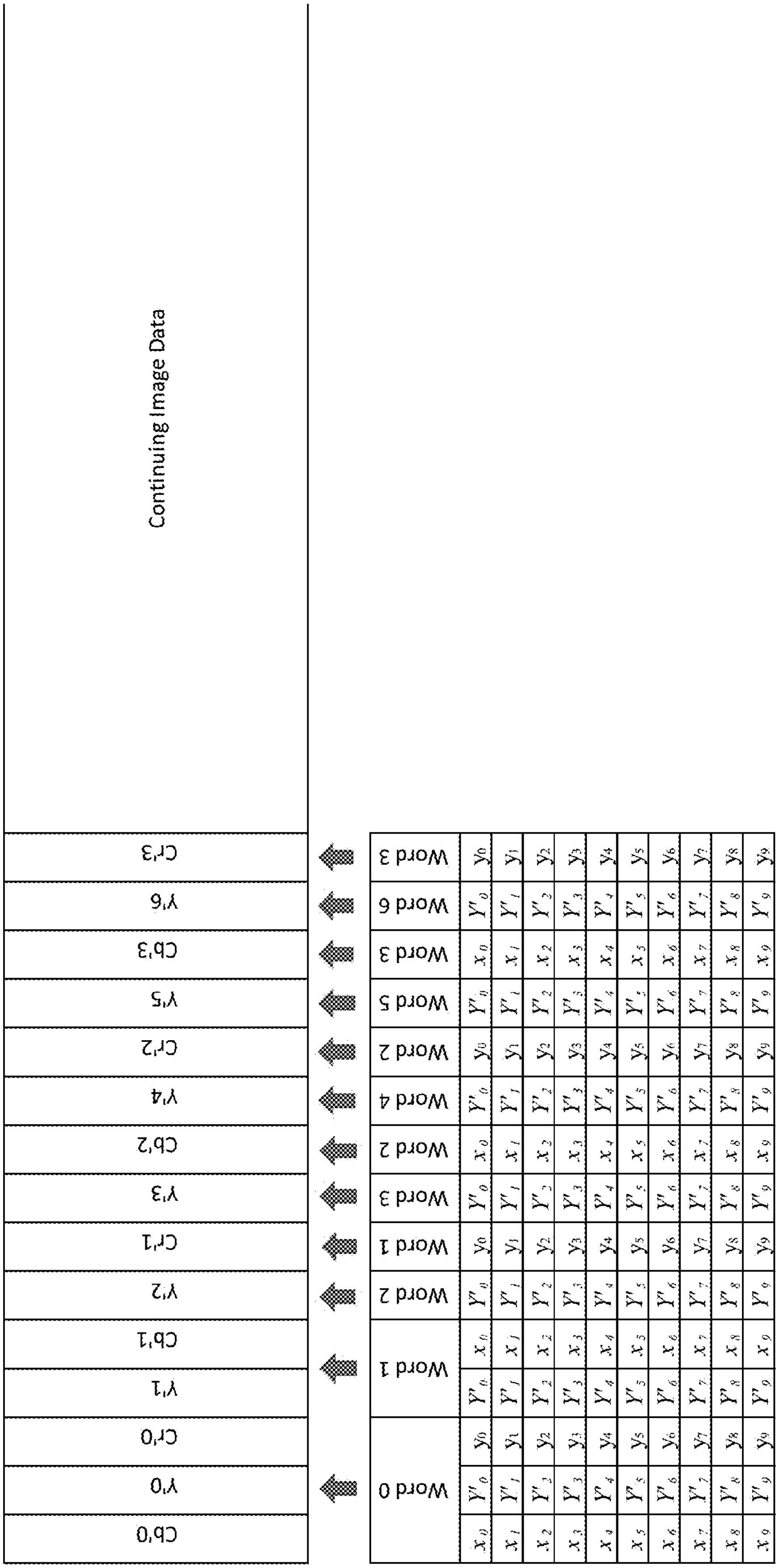

FIG. 115A illustrates one embodiment of a System 4 Yxy 10-bit 4:2:2 encode as applied to SMPTE ST292.

Figure 115B:
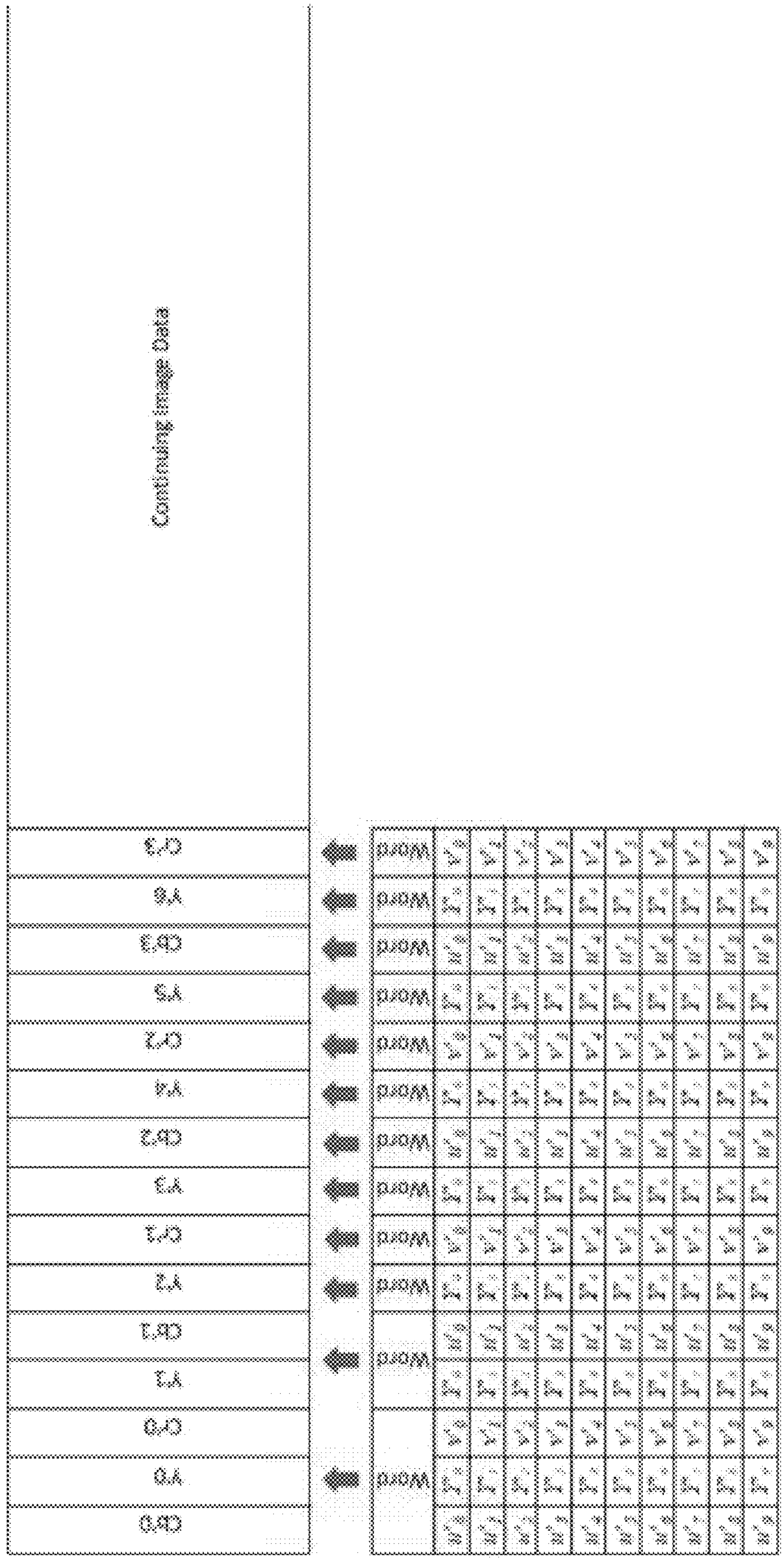

FIG. 115B illustrates one embodiment of a System 4 Yu'v' 10-bit 4:2:2 encode as applied to SMPTE ST292.

Figure 116A:
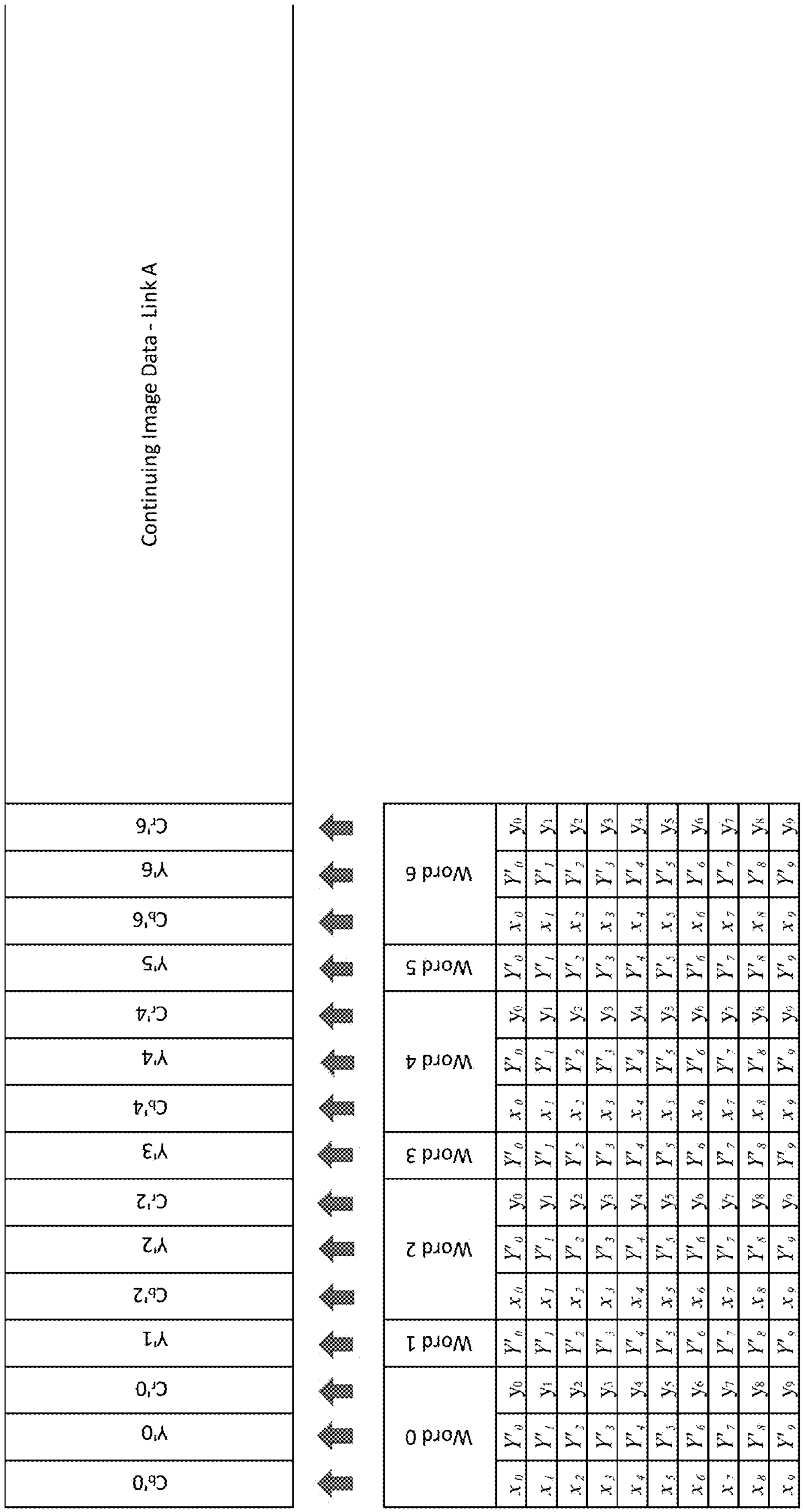

FIG. 116A illustrates one embodiment of a first link for a System 4 Yxy 10-bit 4:4:4 $YC_BC_R$ encode as applied to SMPTE ST372.

Figure 116B:
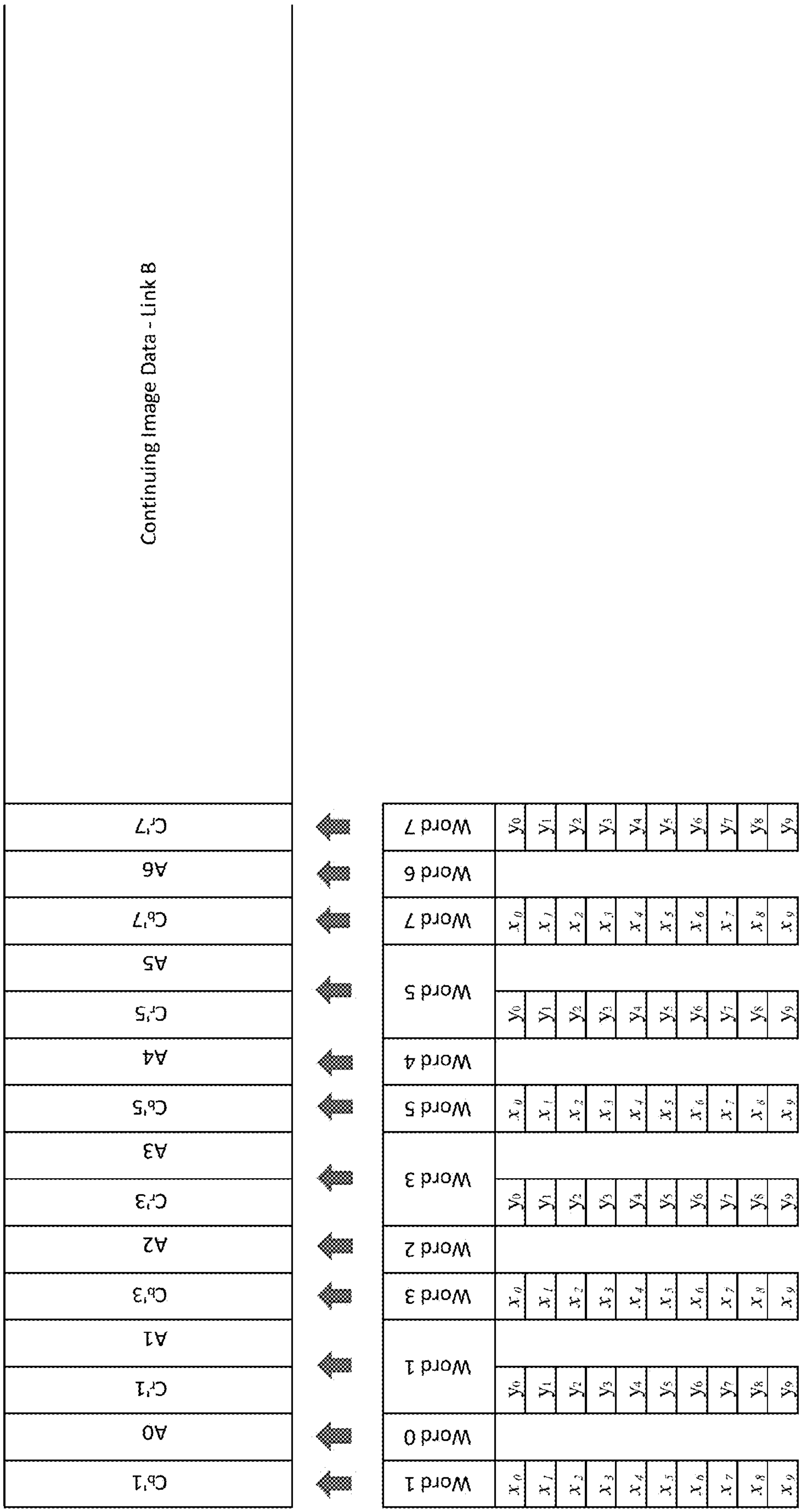

FIG. 116B illustrates one embodiment of a second link for a System 4 Yxy 10-bit 4:4:4 $YC_BC_R$ encode as applied to SMPTE ST372.

Figure 116C:
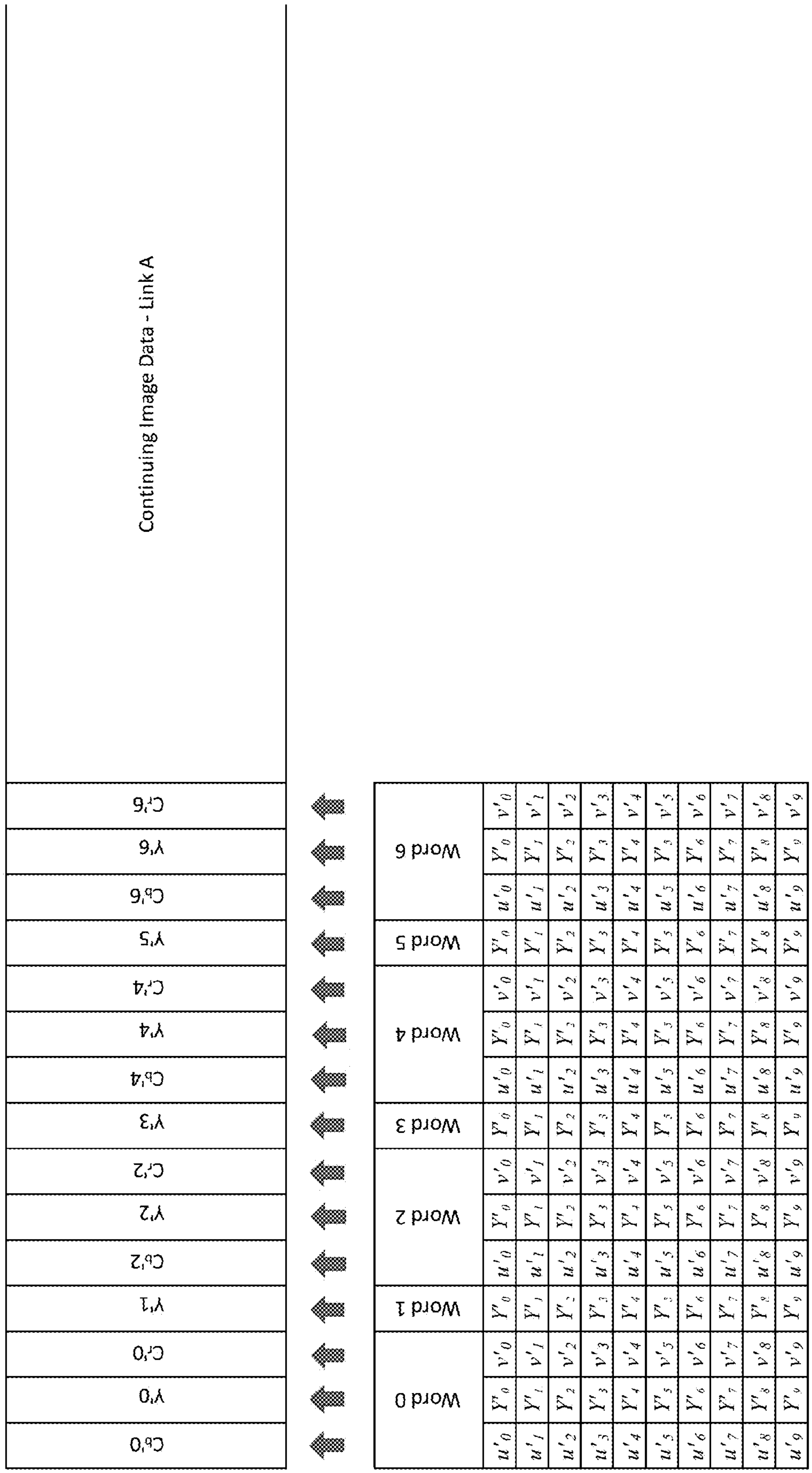

FIG. 116C illustrates one embodiment of a first link for a System 4 Yu'v' 10-bit 4:4:4 $YC_BC_R$ encode as applied to SMPTE ST372.

Figure 116D:
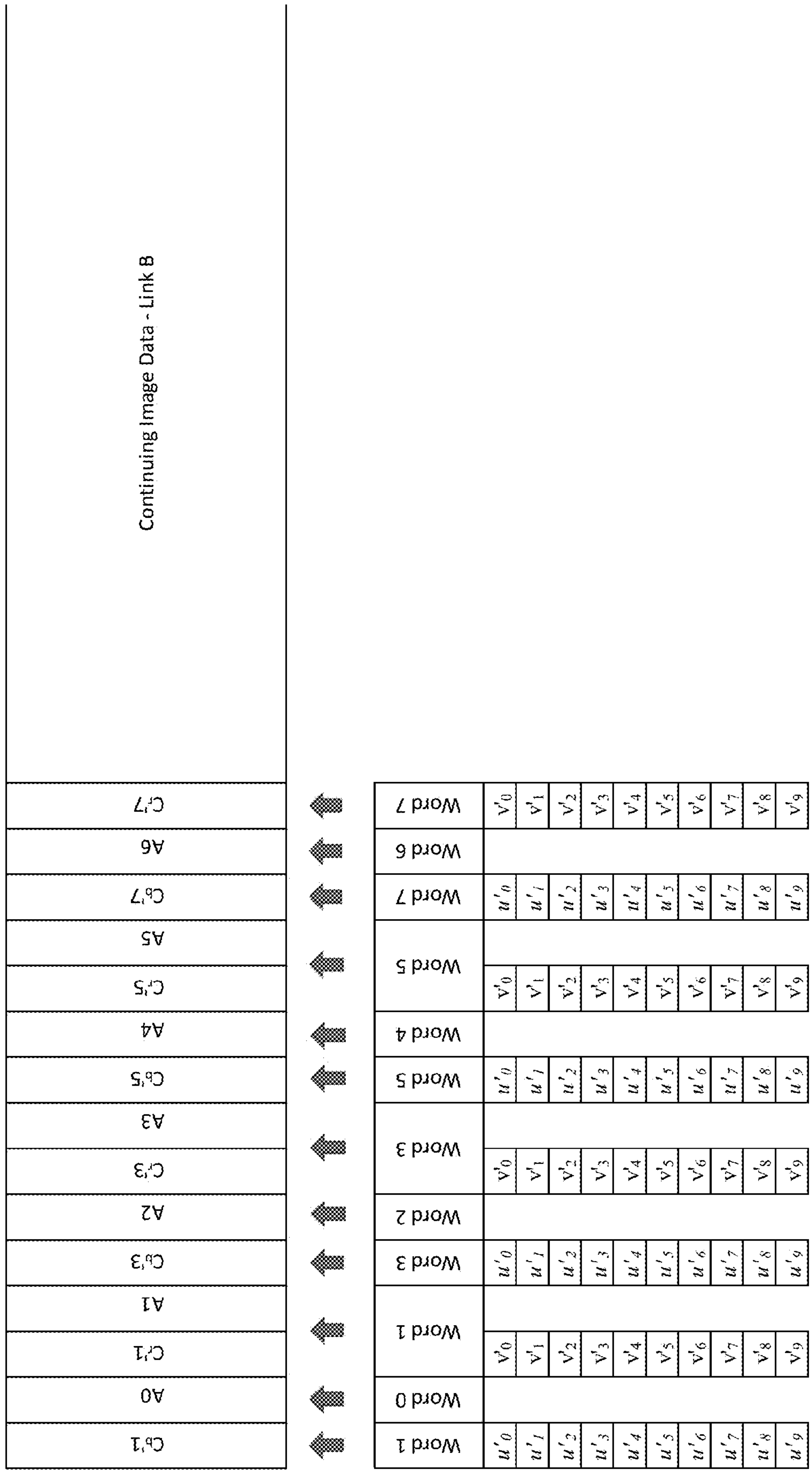

FIG. 116D illustrates one embodiment of a second link for a System 4 Yu'v' 10-bit 4:4:4 $YC_BC_R$ encode as applied to SMPTE ST372.

Figure 117A:
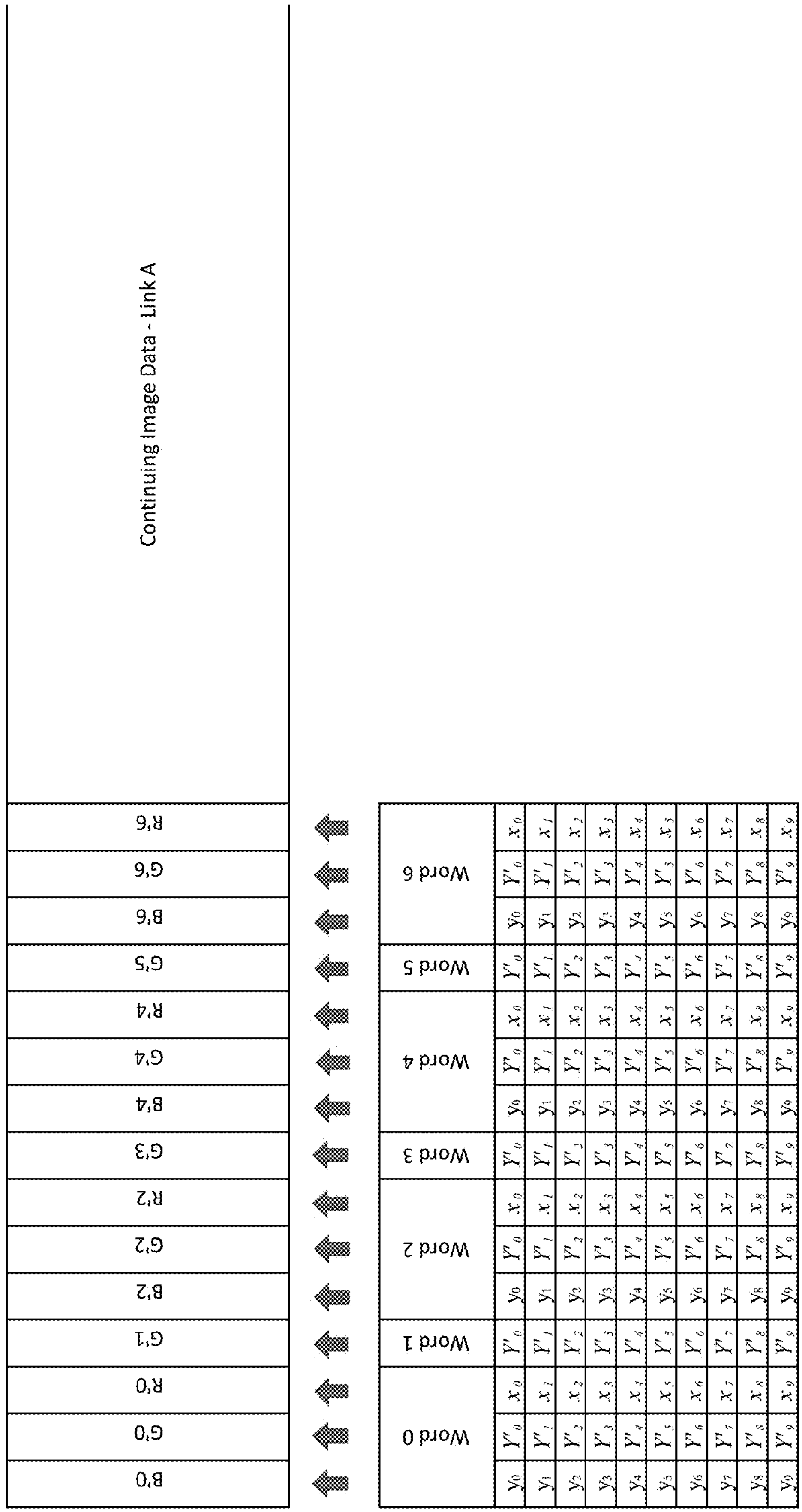

FIG. 117A illustrates one embodiment of a first link for a System 4 Yxy 10-bit 4:4:4 RGB encode as applied to SMPTE ST372.

Figure 117B:
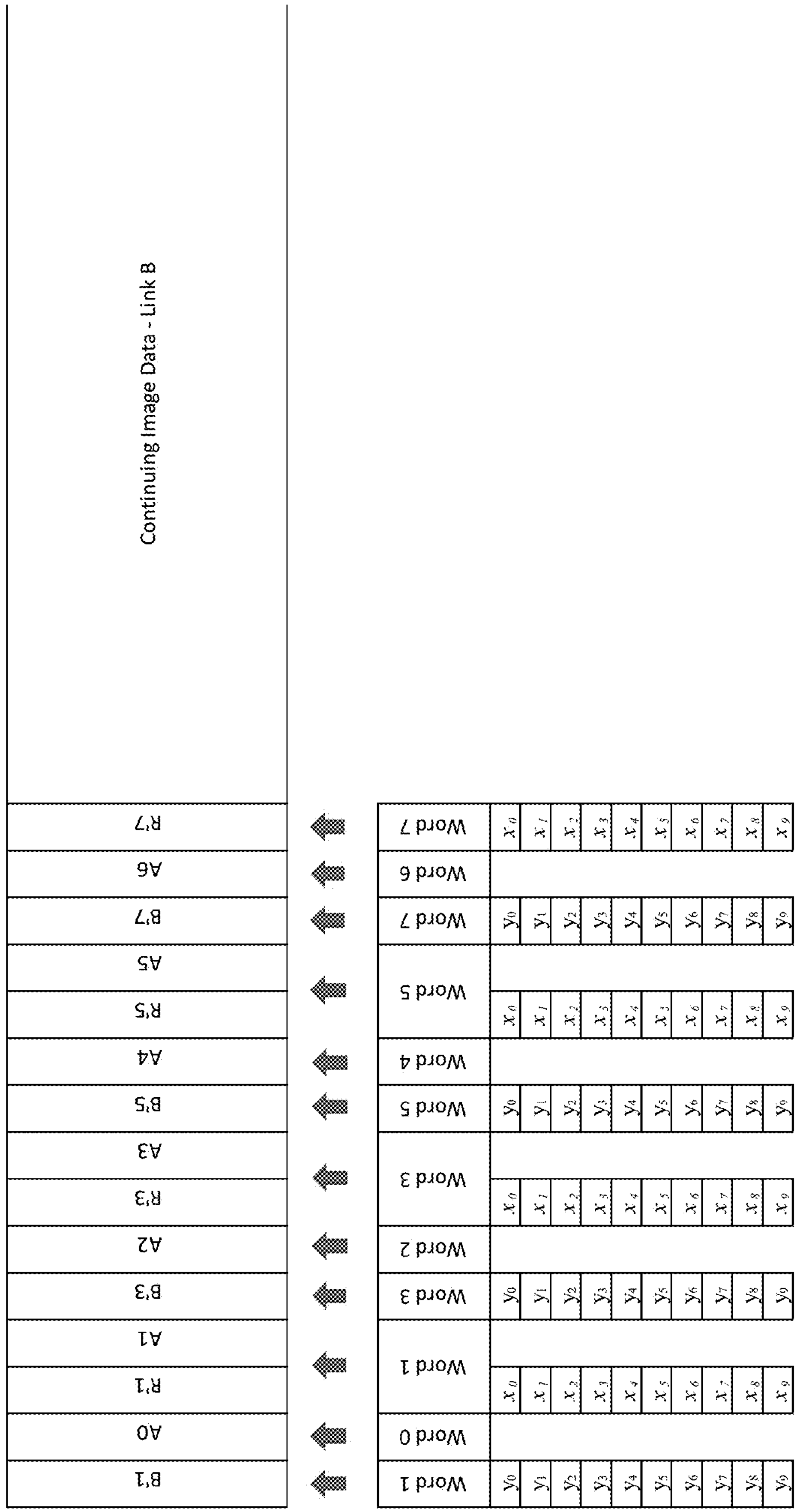

FIG. 117B illustrates one embodiment of a second link for a System 4 Yxy 10-bit 4:4:4 RGB encode as applied to SMPTE ST372.

Figure 117C:
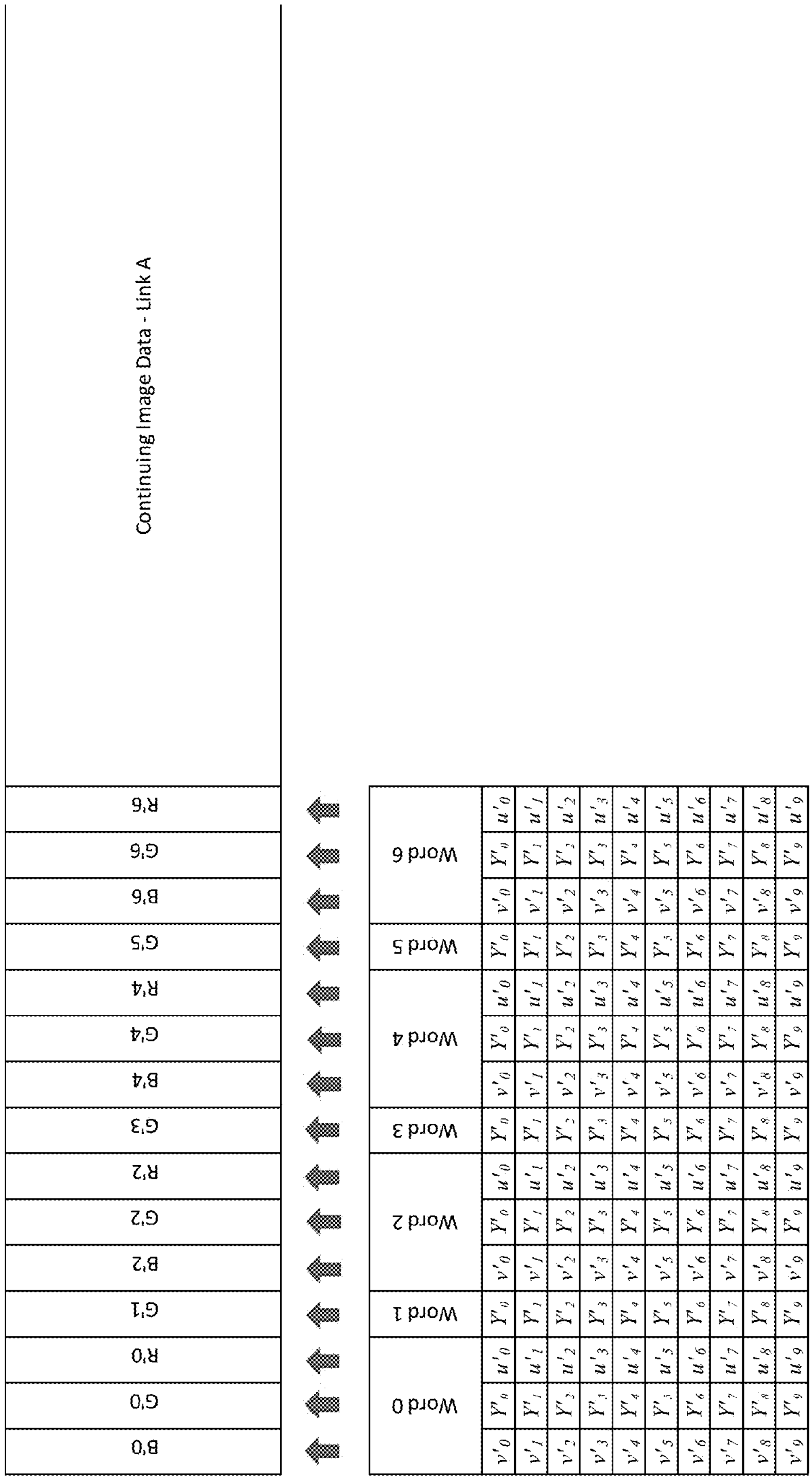

FIG. 117C illustrates one embodiment of a first link for a System 4 Yu'v' 10-bit 4:4:4 RGB encode as applied to SMPTE ST372.

Figure 117D:
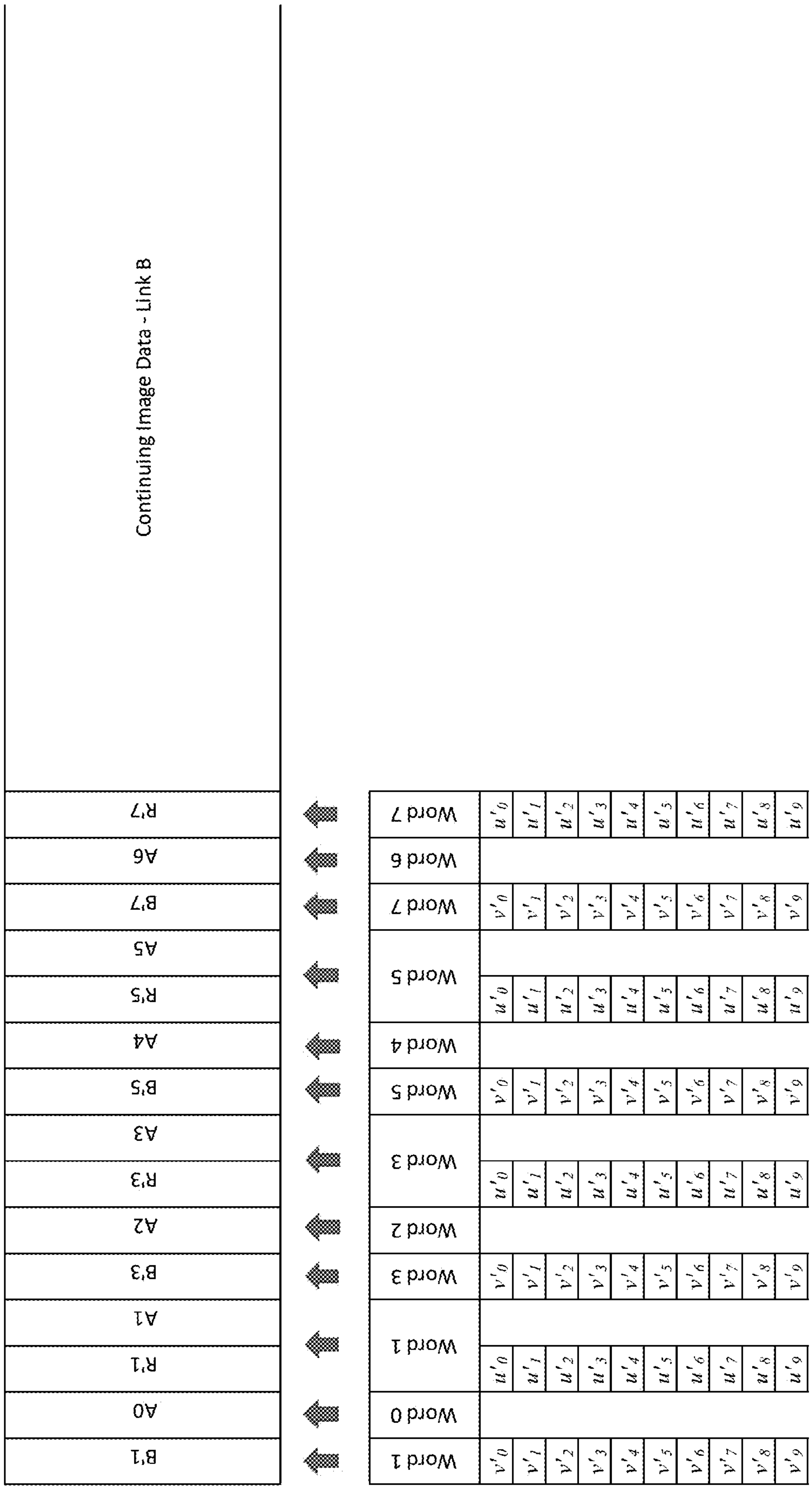

FIG. 117D illustrates one embodiment of a second link for a System 4 Yu'v' 10-bit 4:4:4 RGB encode as applied to SMPTE ST372.

Figure 118A:
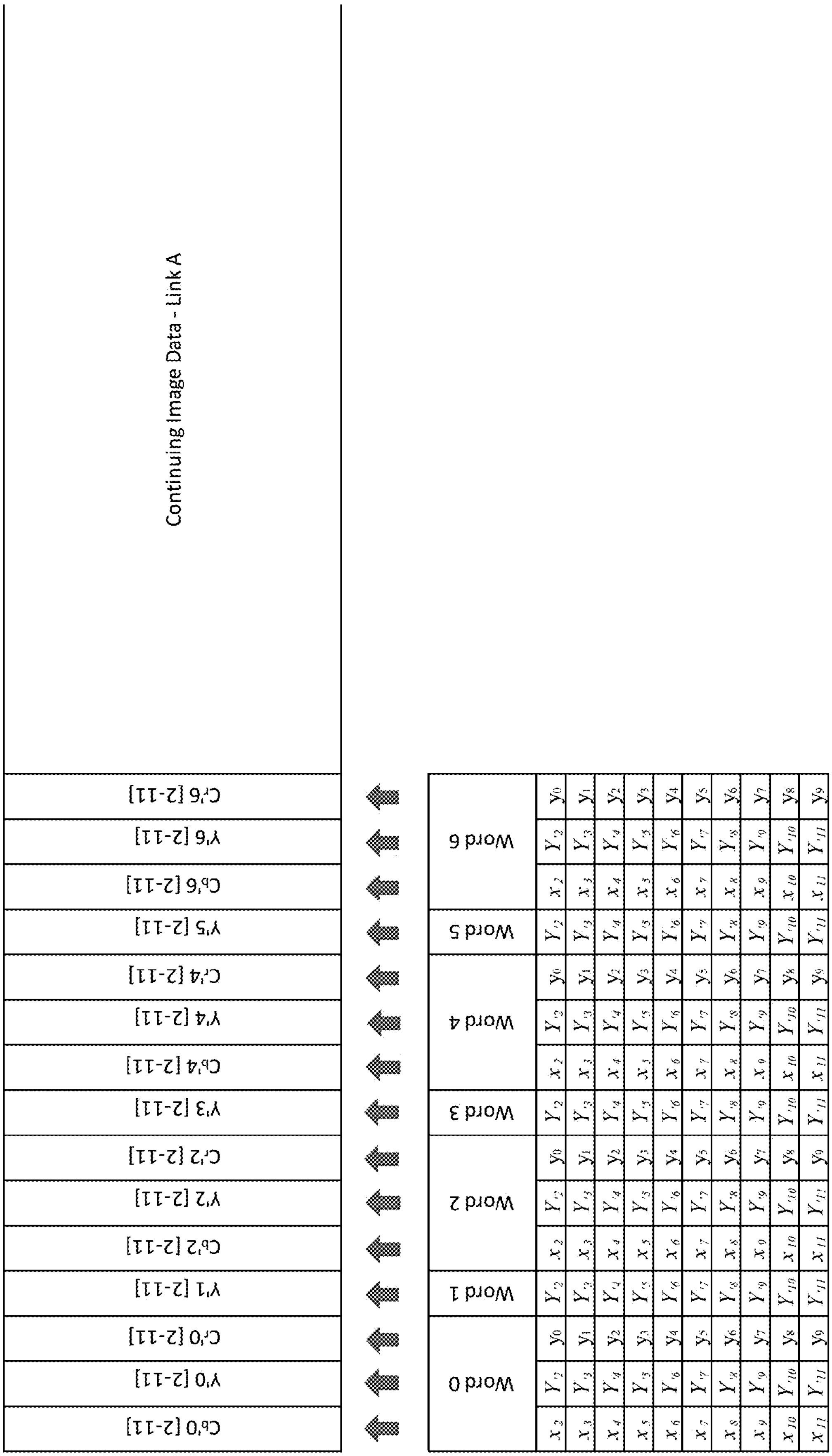

FIG. 118A illustrates one embodiment of a first link for a System 4 Yxy 12-bit 4:4:4 $YC_BC_R$ encode as applied to SMPTE ST372.

Figure 118B:
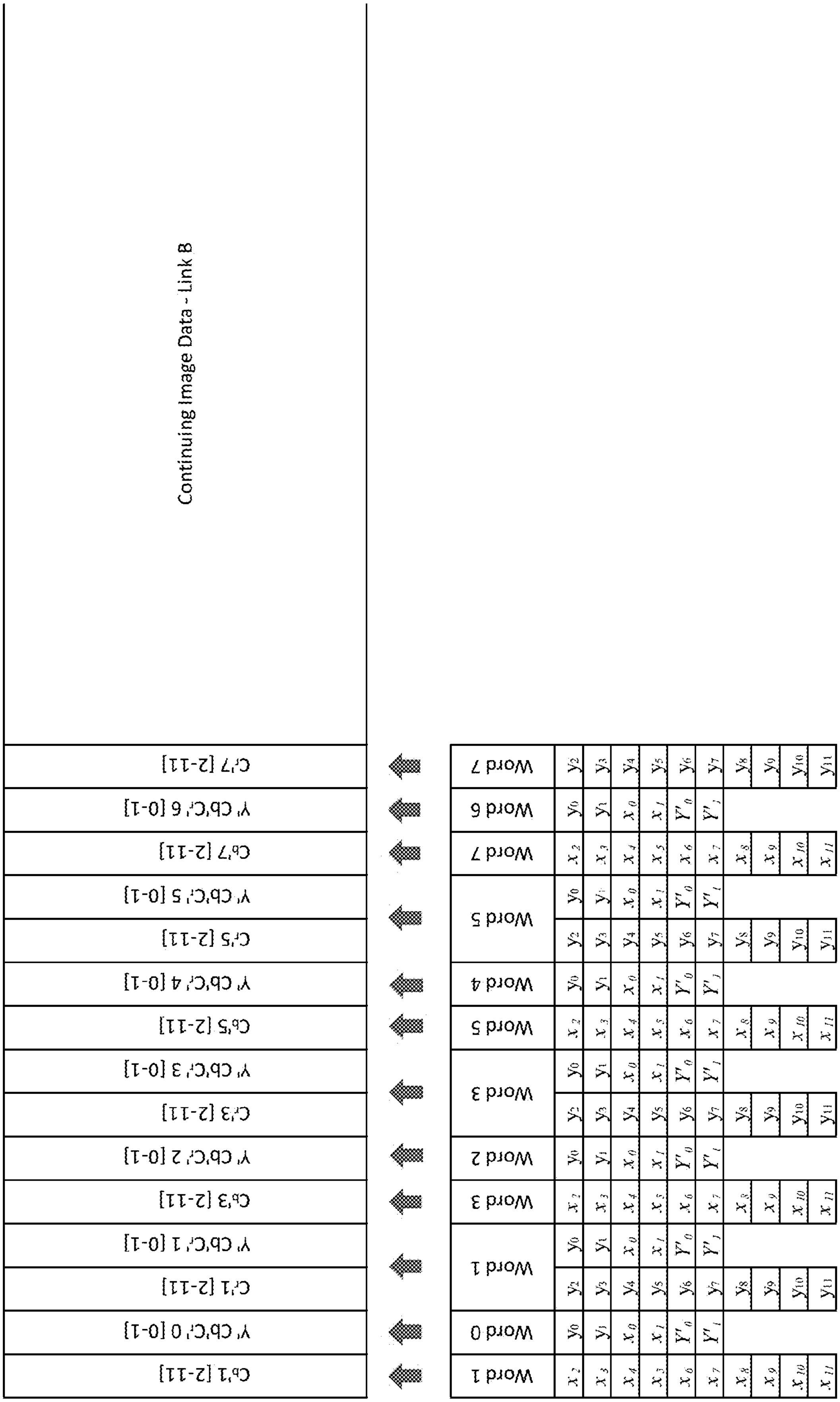

FIG. 118B illustrates one embodiment of a second link for a System 4 Yxy 12-bit 4:4:4 $YC_BC_R$ encode as applied to SMPTE ST372.

Figure 118C:
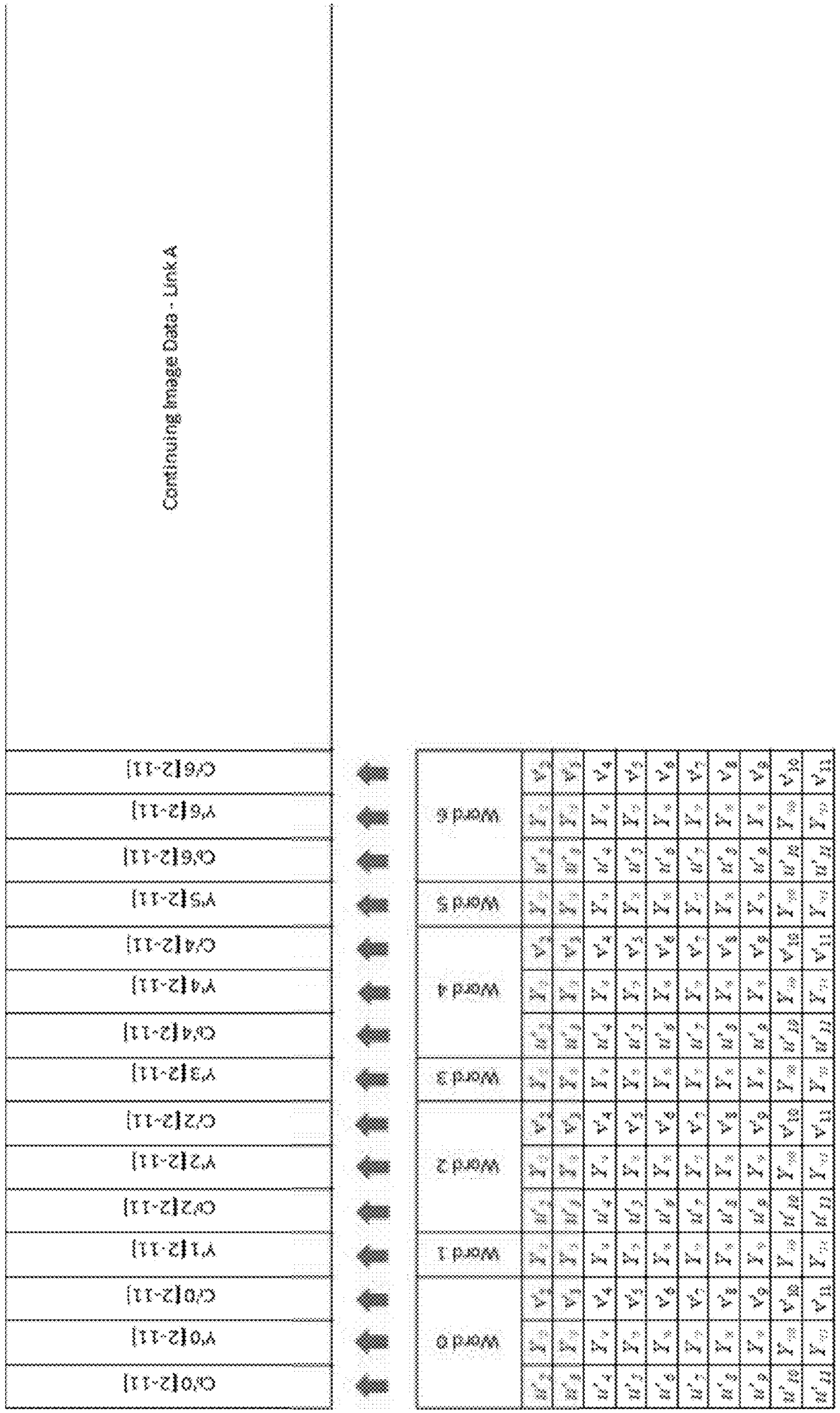

FIG. 118C illustrates one embodiment of a first link for a System 4 Yu'v' 12-bit 4:4:4 $YC_BC_R$ encode as applied to SMPTE ST372.

Figure 118D:
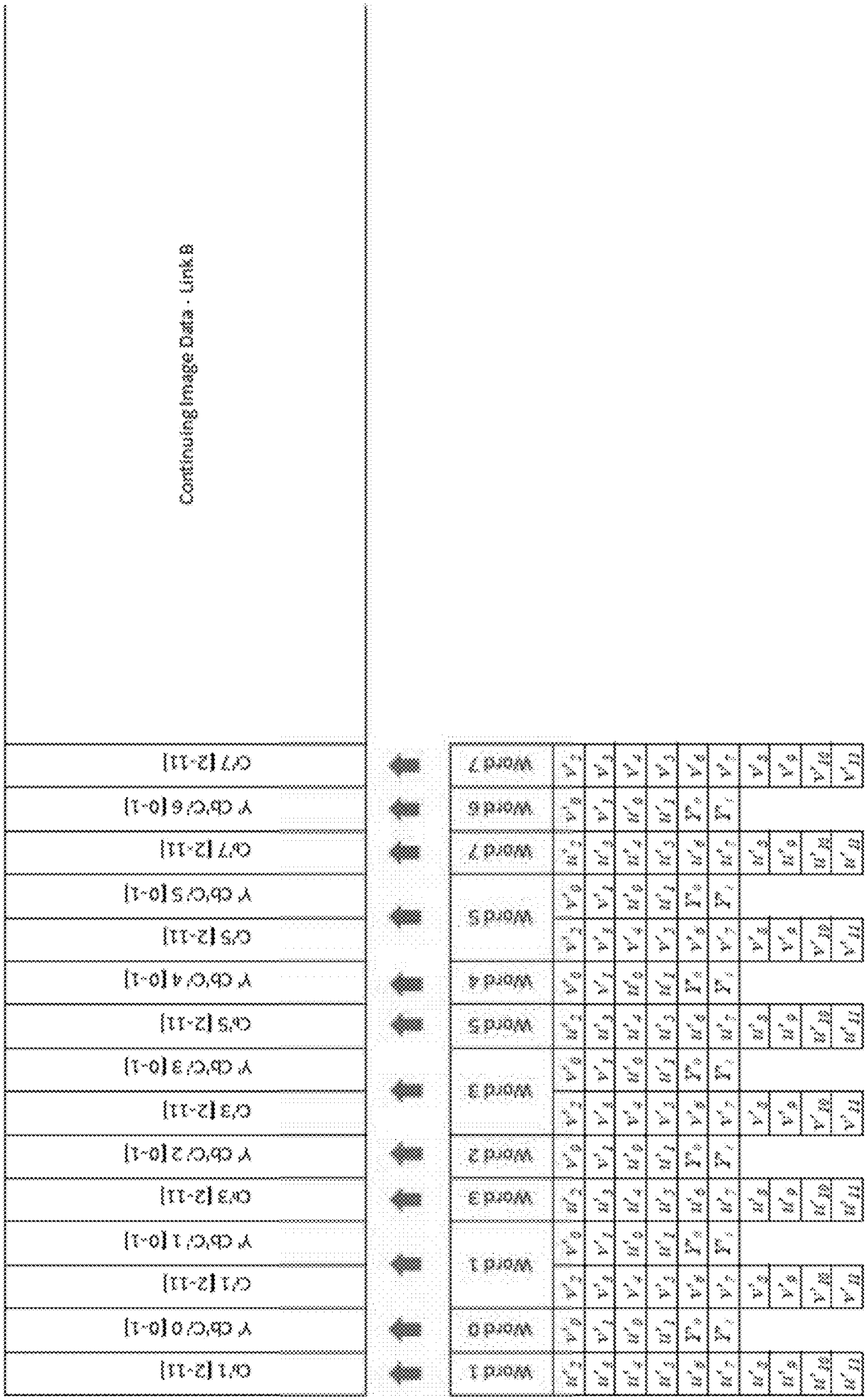

FIG. 118D illustrates one embodiment of a second link for a System 4 Yu'v' 12-bit 4:4:4 $YC_BC_R$ encode as applied to SMPTE ST372.

Figure 119A:
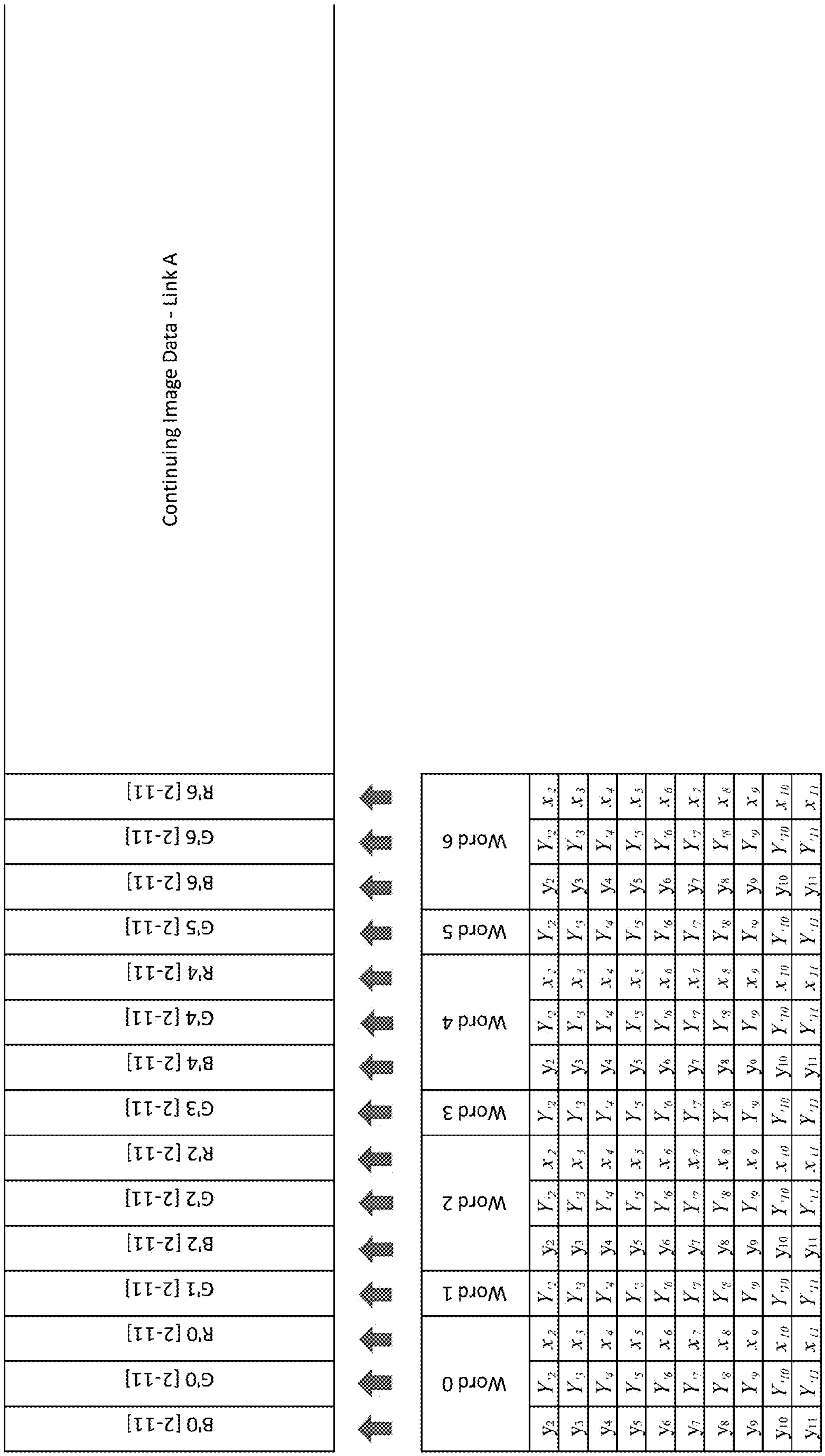

FIG. 119A illustrates one embodiment of a first link for a System 4 12-bit Yxy 4:4:4 RGB encode as applied to SMPTE ST372.

Figure 119B:
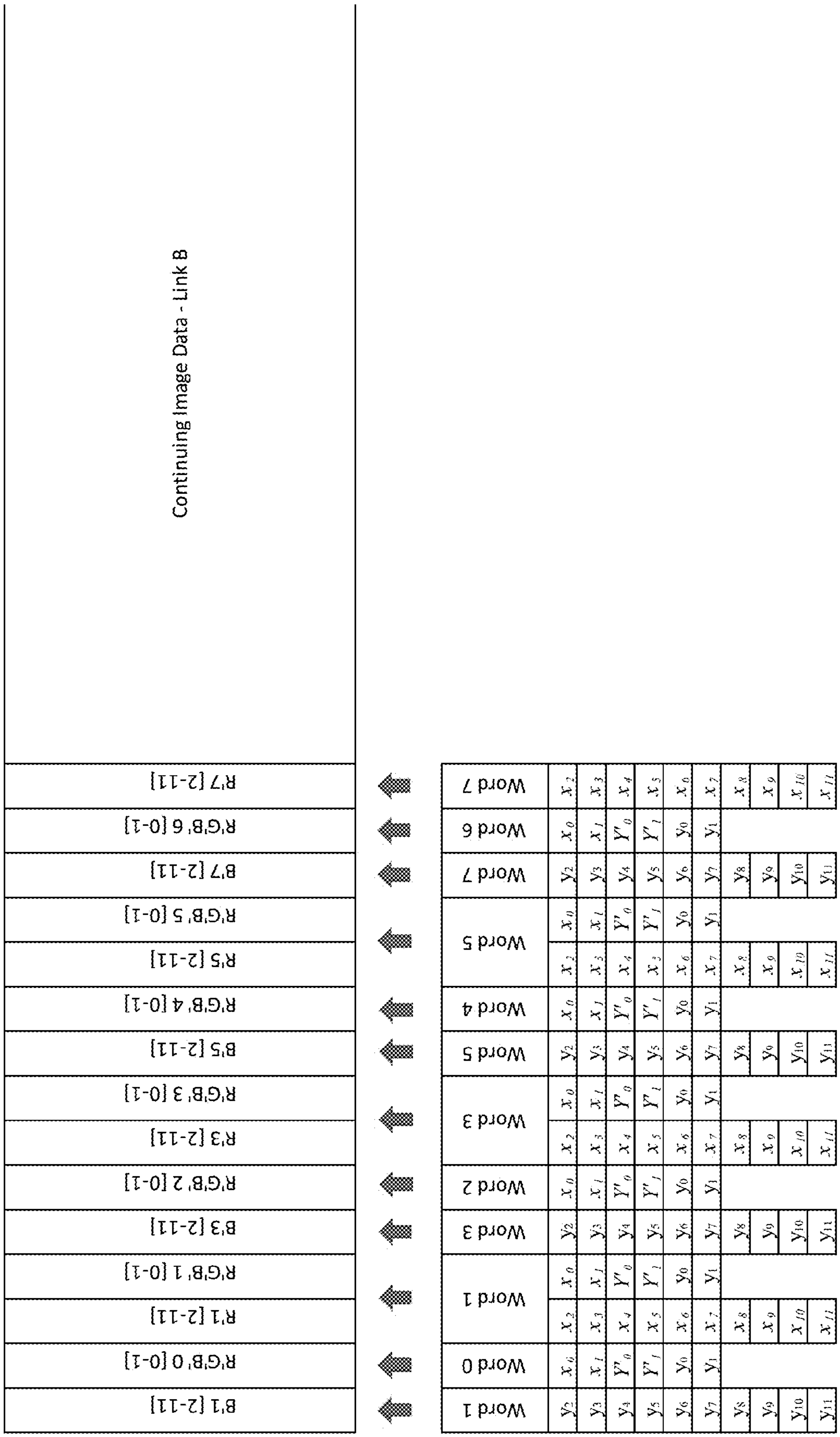

FIG. 119B illustrates one embodiment of a second link for a System 4 Yxy 12-bit 4:4:4 RGB encode as applied to SMPTE ST372.

Figure 119C:
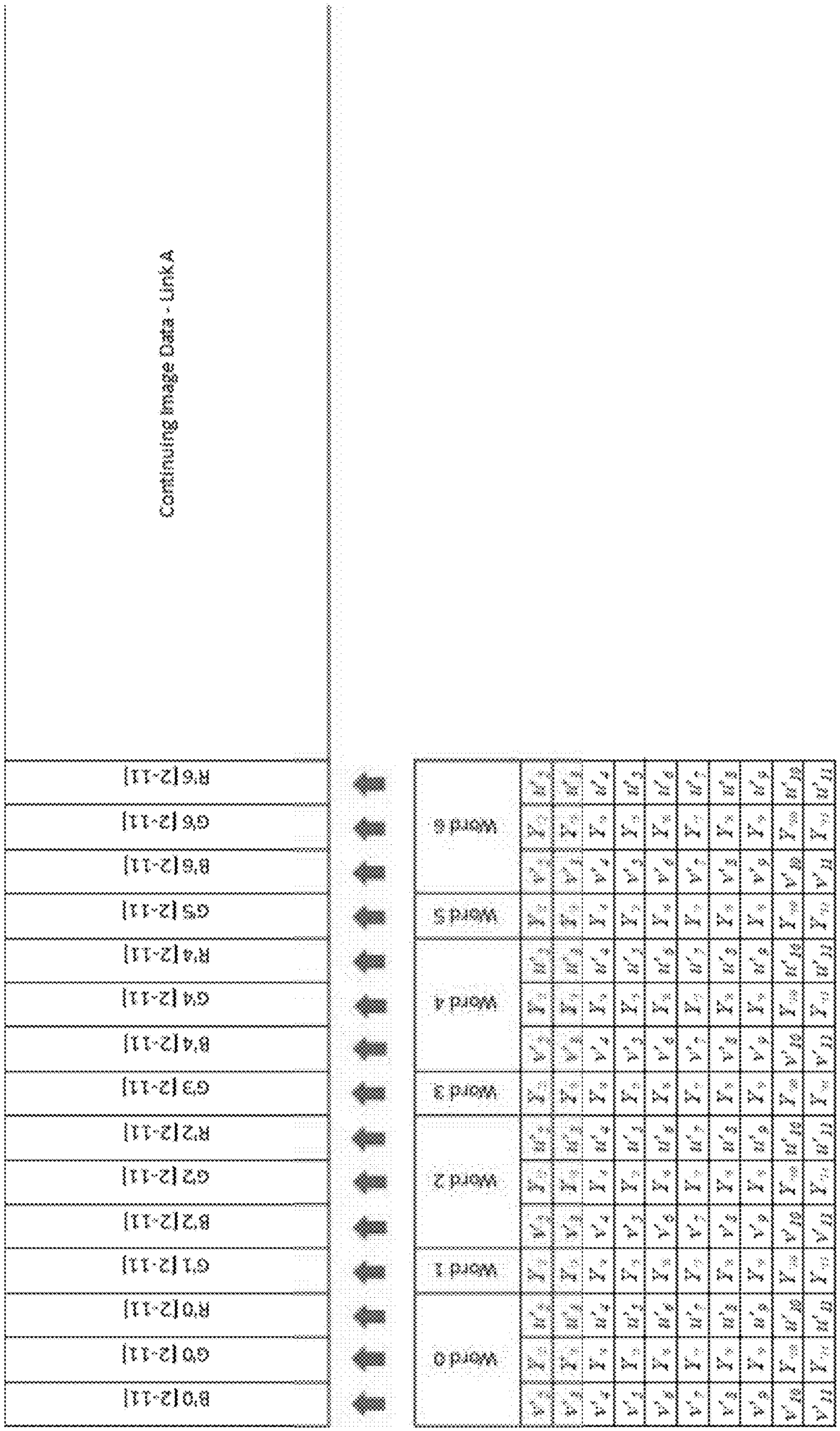

FIG. 119C illustrates one embodiment of a first link for a System 4 Yu'v' 12-bit 4:4:4 RGB encode as applied to SMPTE ST372.

Figure 119D:
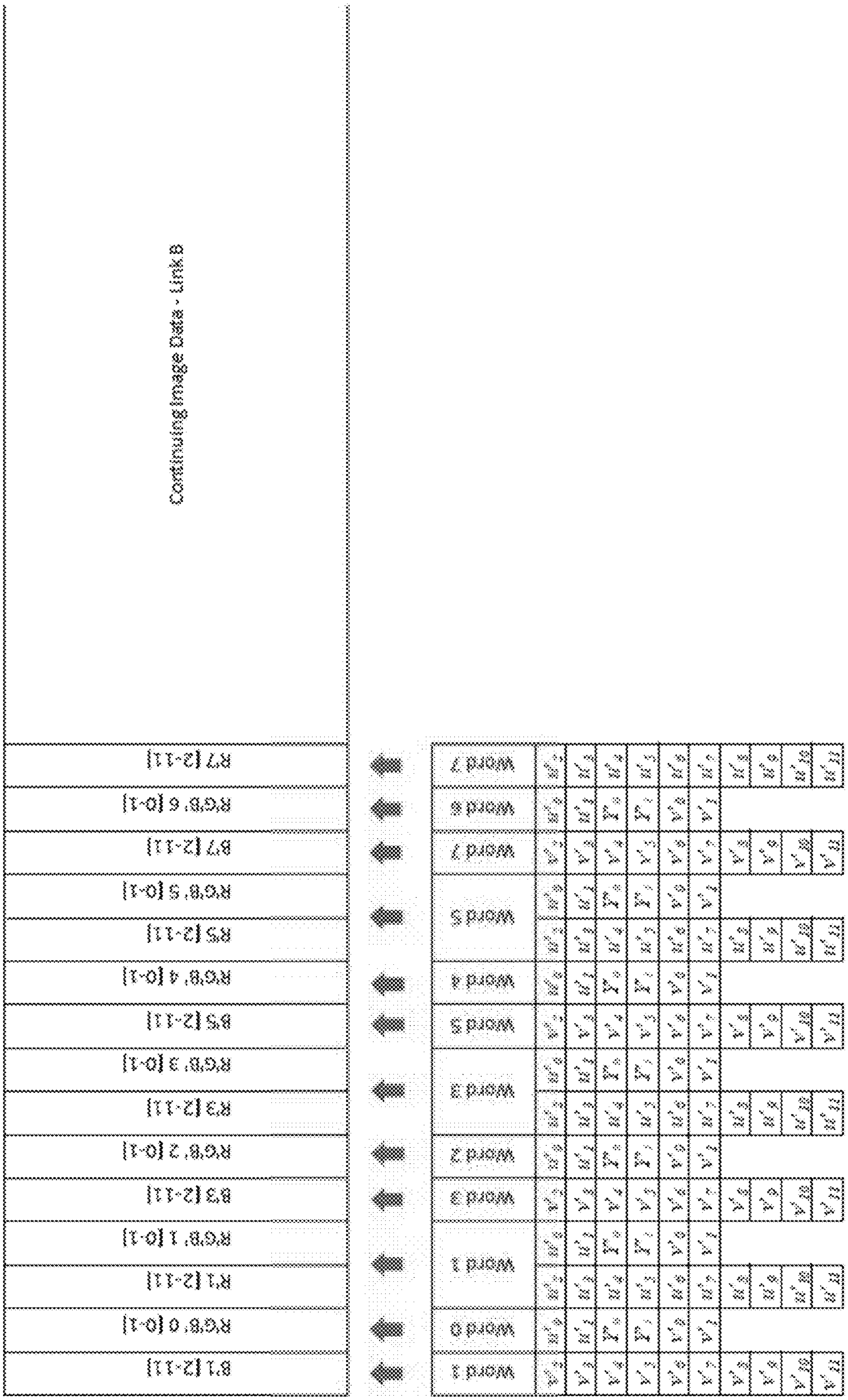

FIG. 119D illustrates one embodiment of a second link for a System 4 Yu'v' 12-bit 4:4:4 RGB encode as applied to SMPTE ST372.

Figure 120A:
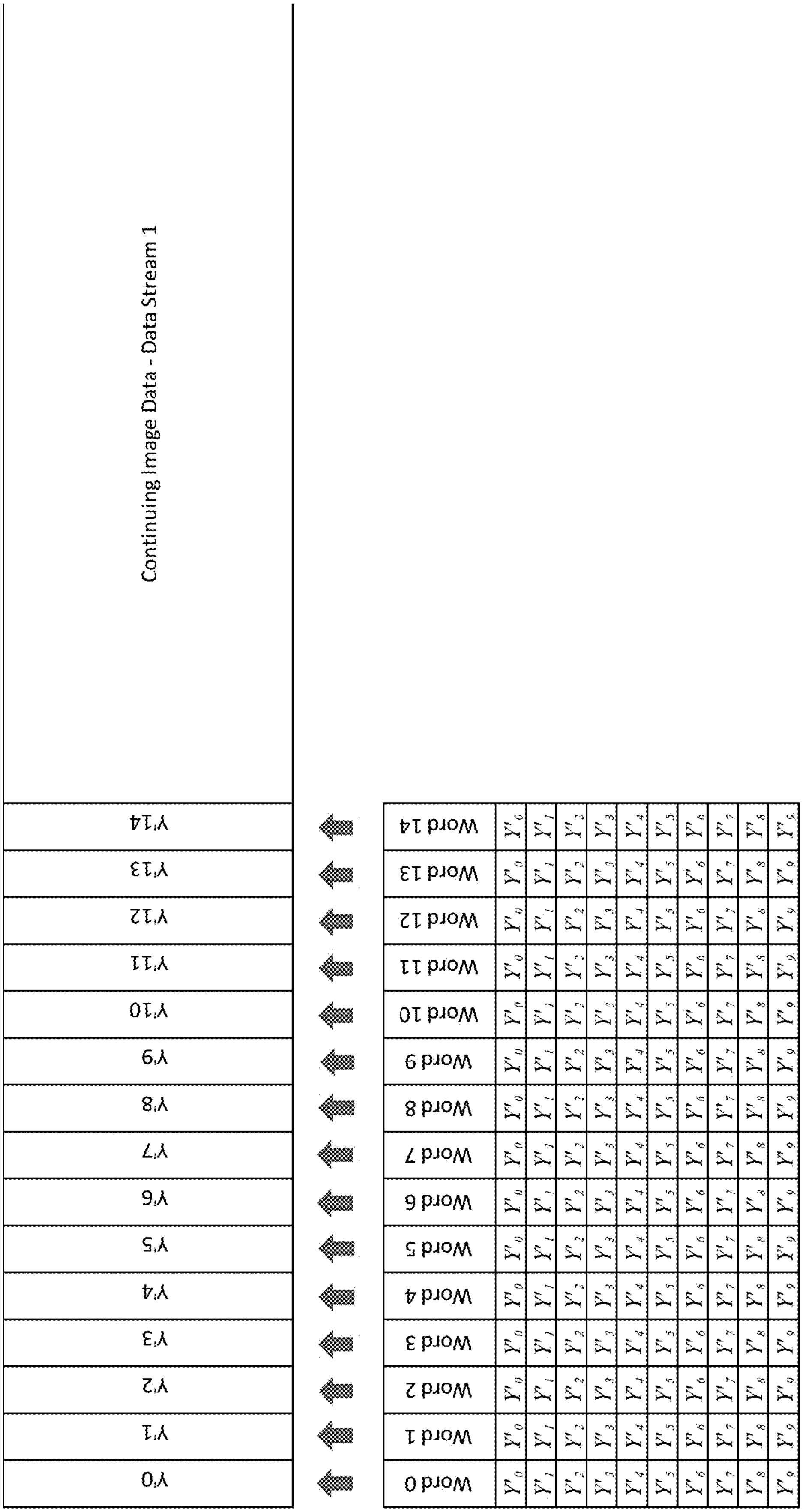

FIG. 120A illustrates one embodiment of a first data stream for a System 4 Yxy 10-bit 4:2:2 Level A encode as applied to SMPTE ST425.

Figure 120B:
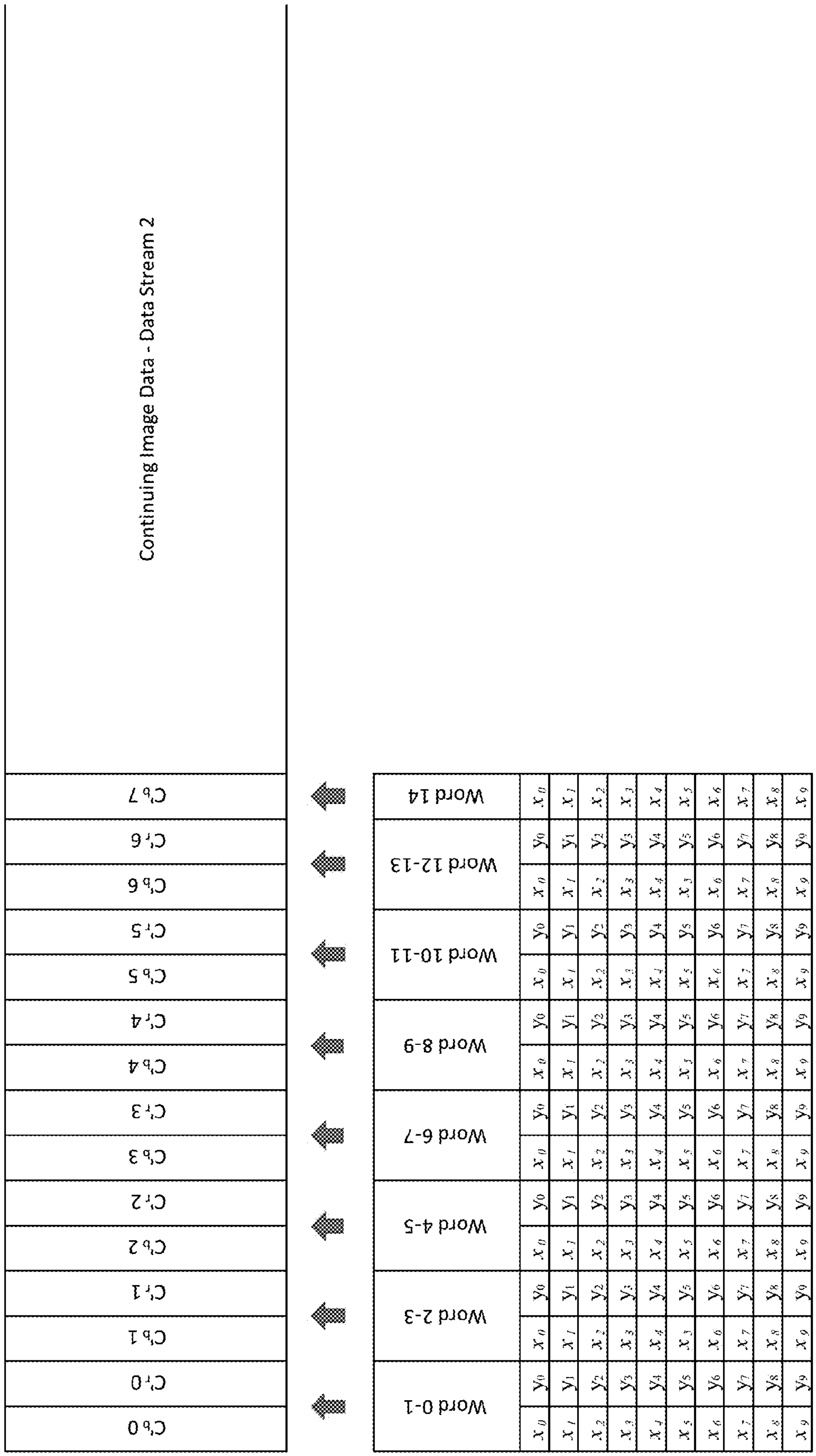

FIG. 120B illustrates one embodiment of a second data stream for a System 4 Yxy 10-bit 4:2:2 Level A encode as applied to SMPTE ST425.

Figure 120C:
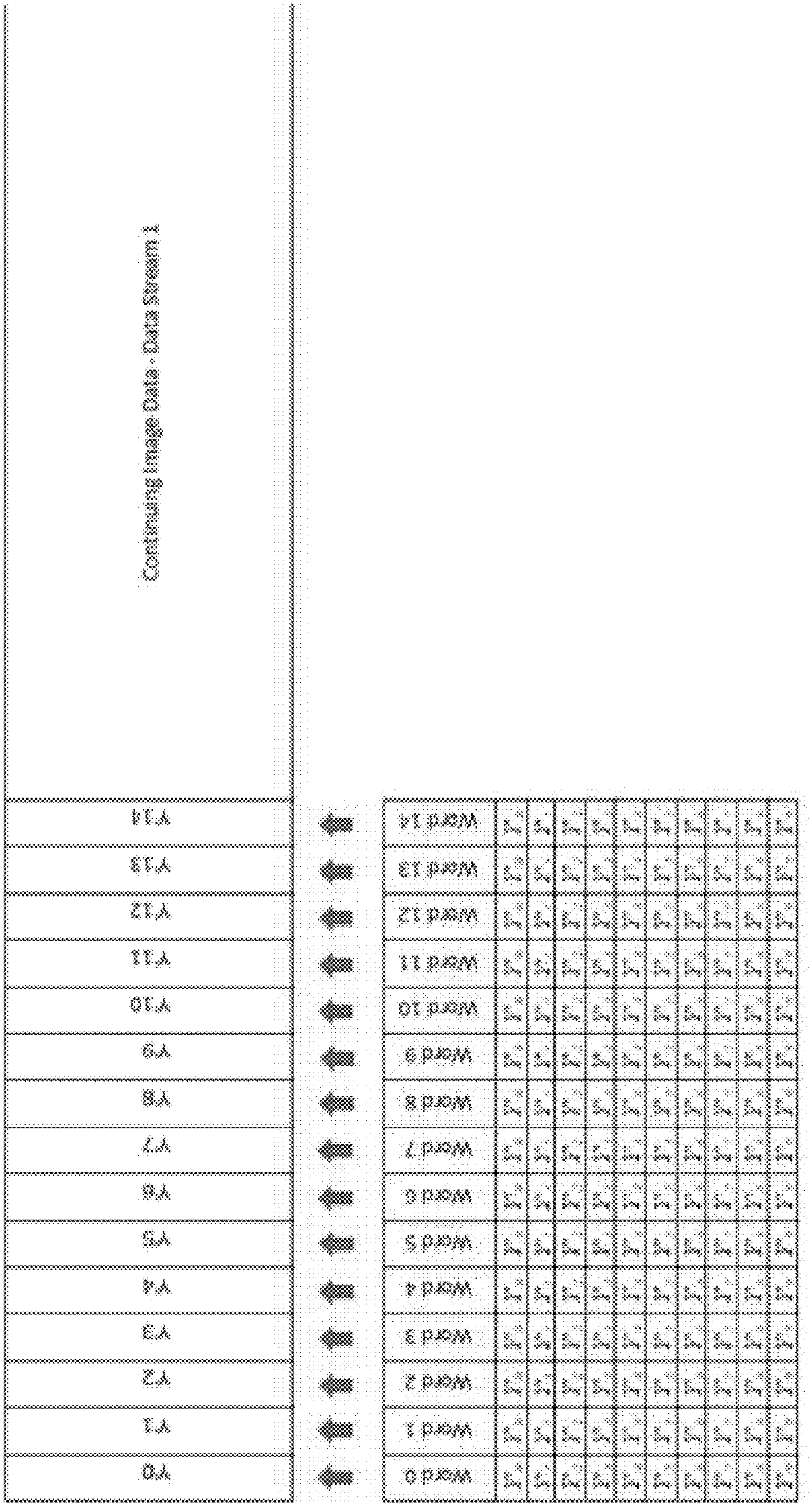

FIG. 120C illustrates one embodiment of a first data stream for a System 4 Yu'v' 10-bit 4:2:2 Level A encode as applied to SMPTE ST425.

Figure 120D:
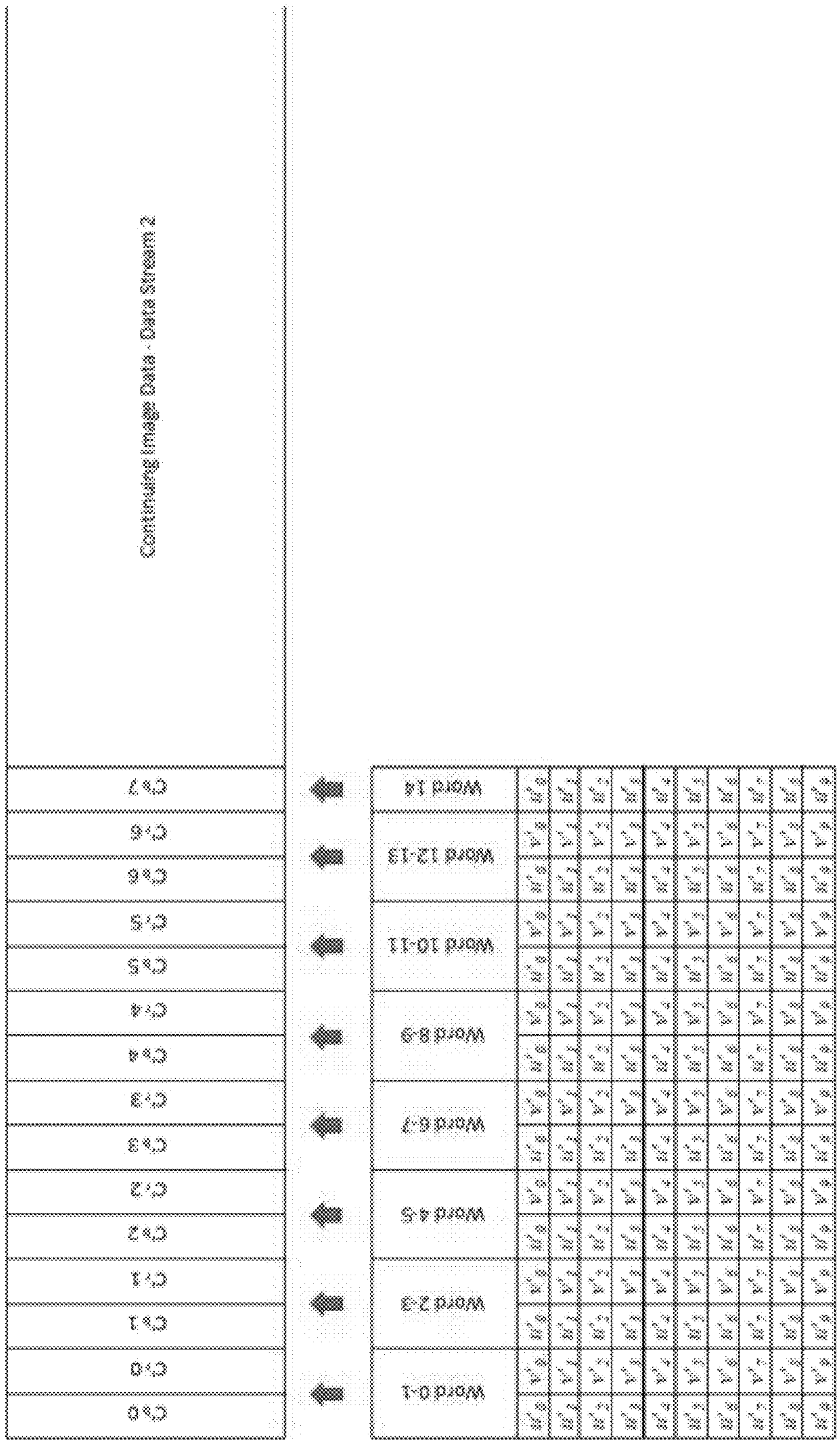

FIG. 120D illustrates one embodiment of a second data stream for a System 4 Yu'v' 10-bit 4:2:2 Level A encode as applied to SMPTE ST425.

Figure 121A:
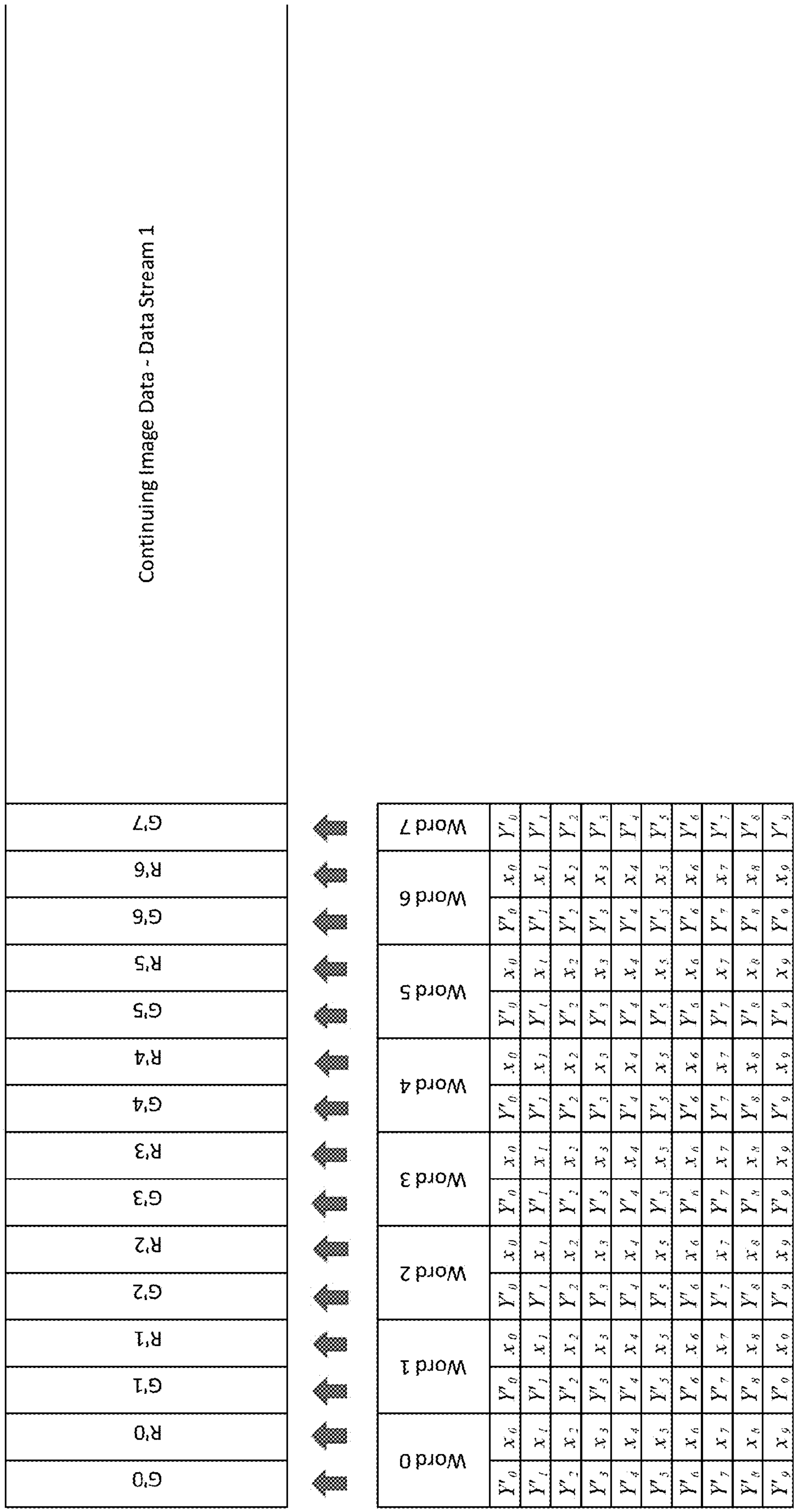

FIG. 121A illustrates one embodiment of a first data stream for a Yxy System 4 10-bit 4:4:4 Level A encode as applied to SMPTE ST425.

Figure 121B:
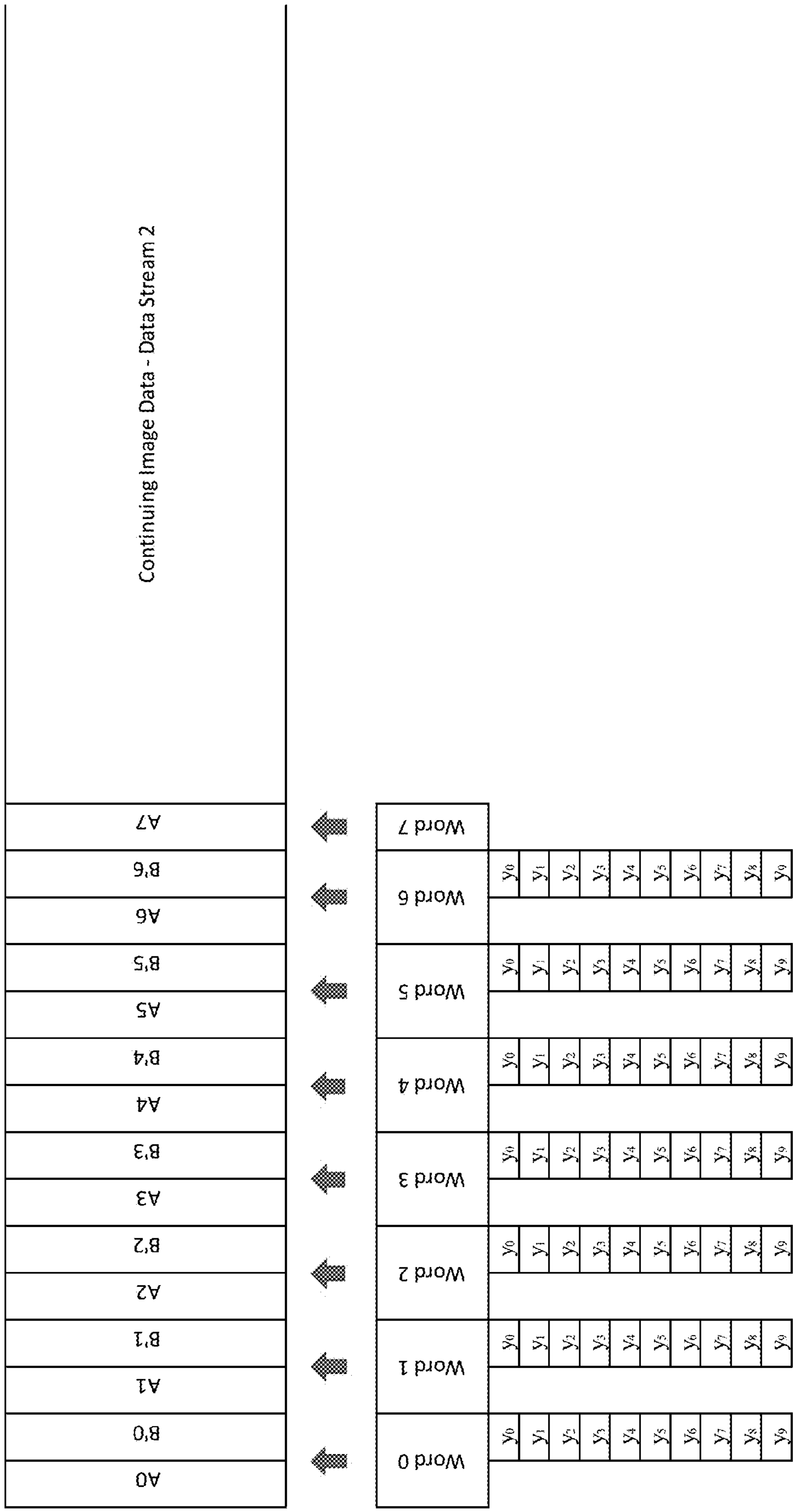

FIG. 121B illustrates one embodiment of a second data stream for a Yxy System 4 10-bit 4:4:4 Level A encode as applied to SMPTE ST425.

Figure 121C:
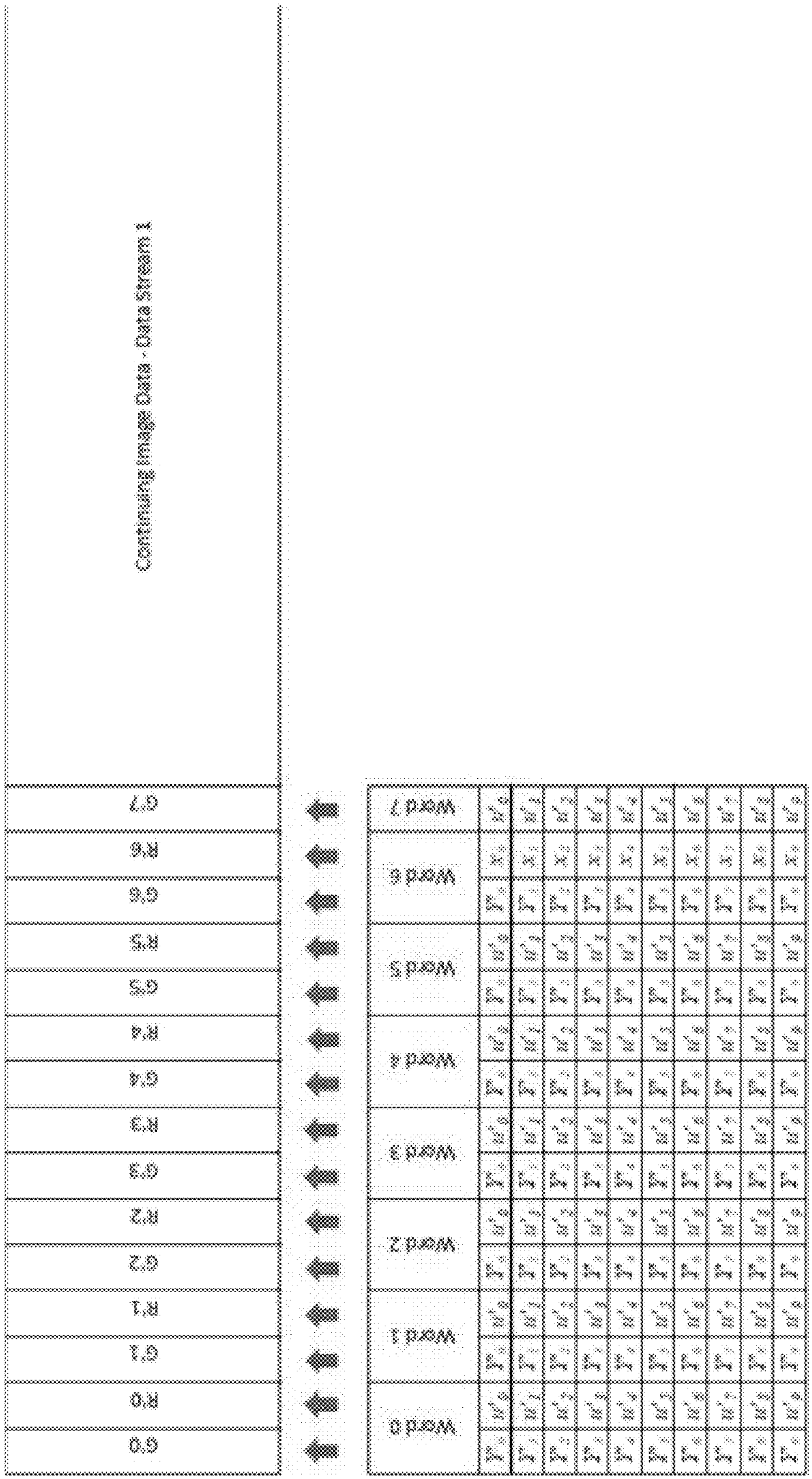

FIG. 121C illustrates one embodiment of a first data stream for a Yu'v' System 4 10-bit 4:4:4 Level A encode as applied to SMPTE ST425.

Figure 121D:
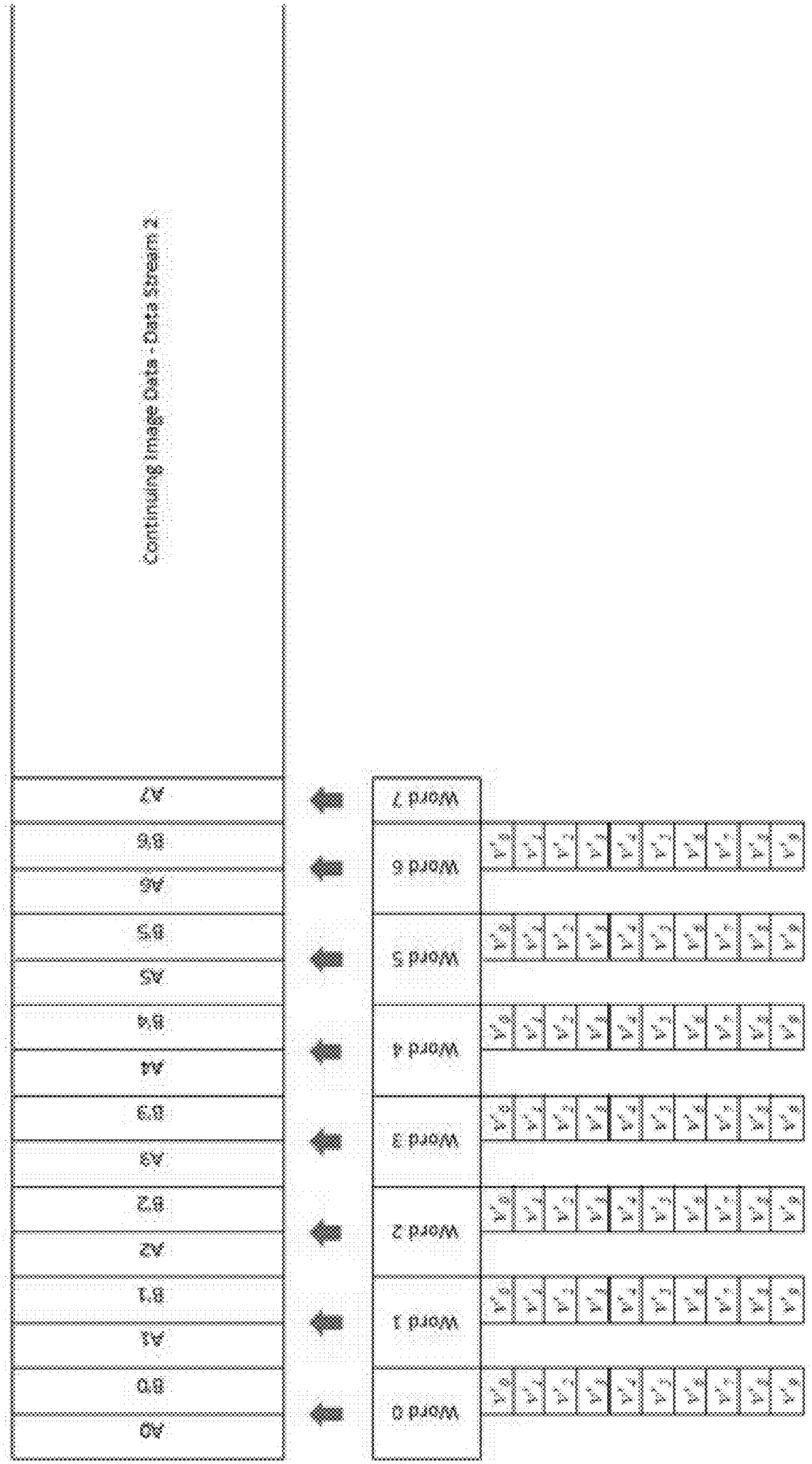

FIG. 121D illustrates one embodiment of a second data stream for a Yu'v' System 4 10-bit 4:4:4 Level A encode as applied to SMPTE ST425.

Figure 122A:
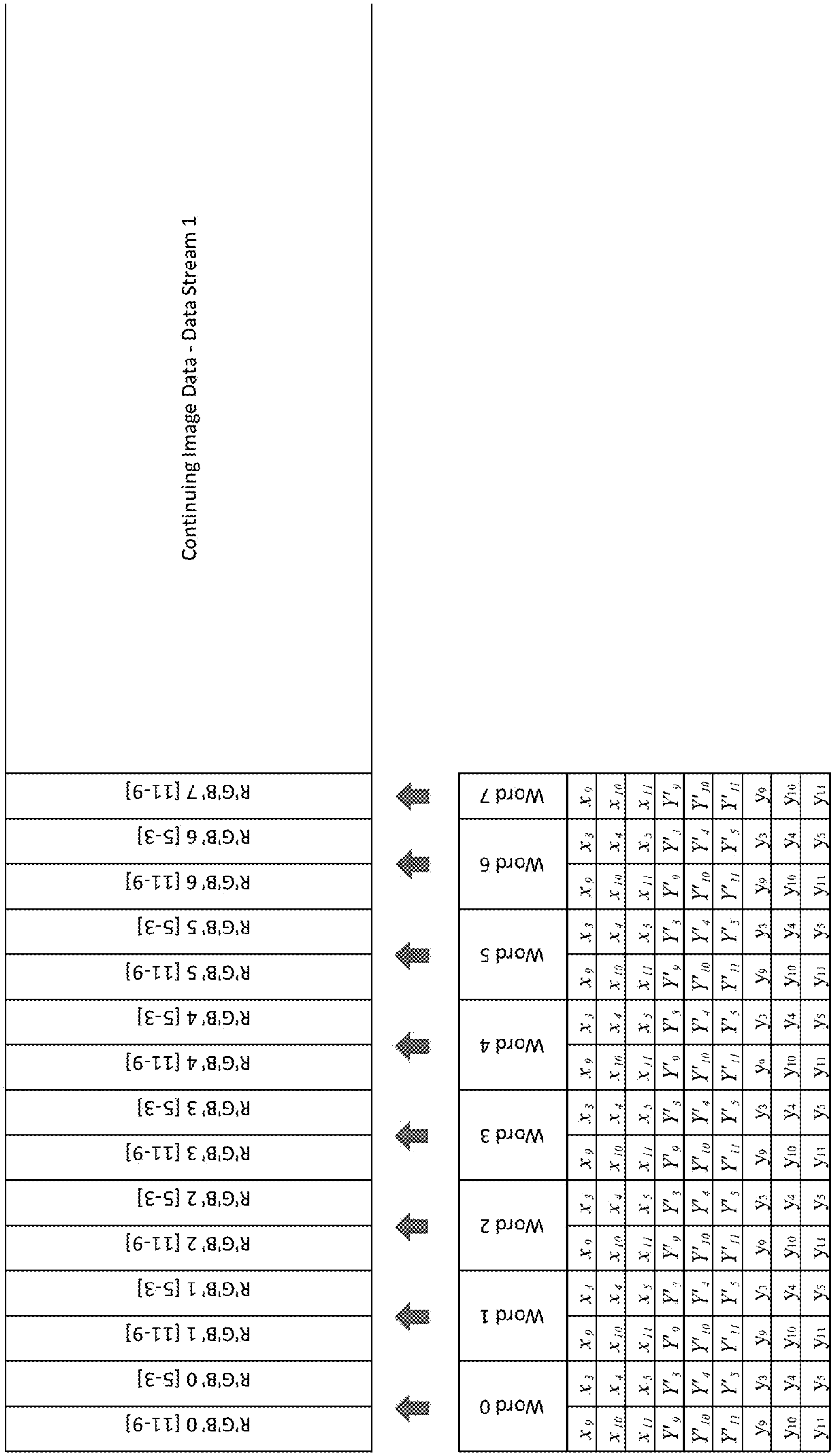

FIG. 122A illustrates one embodiment of a first data stream for a Yxy System 4 12-bit 4:4:4 Level A encode as applied to SMPTE ST425.

Figure 122B:
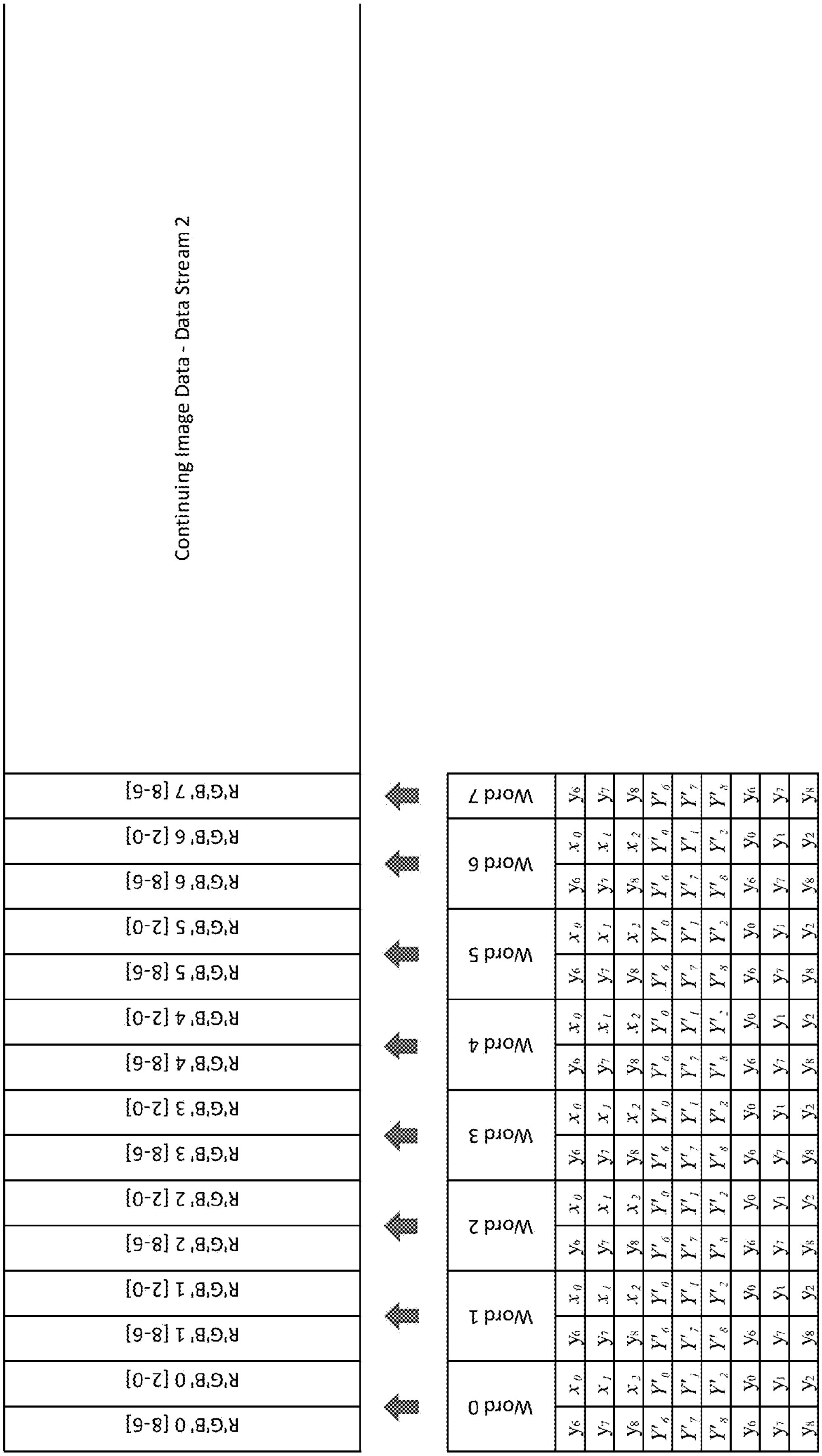

FIG. 122B illustrates one embodiment of a second data stream for a Yxy System 4 12-bit 4:4:4 Level A encode as applied to SMPTE ST425.

Figure 122C:
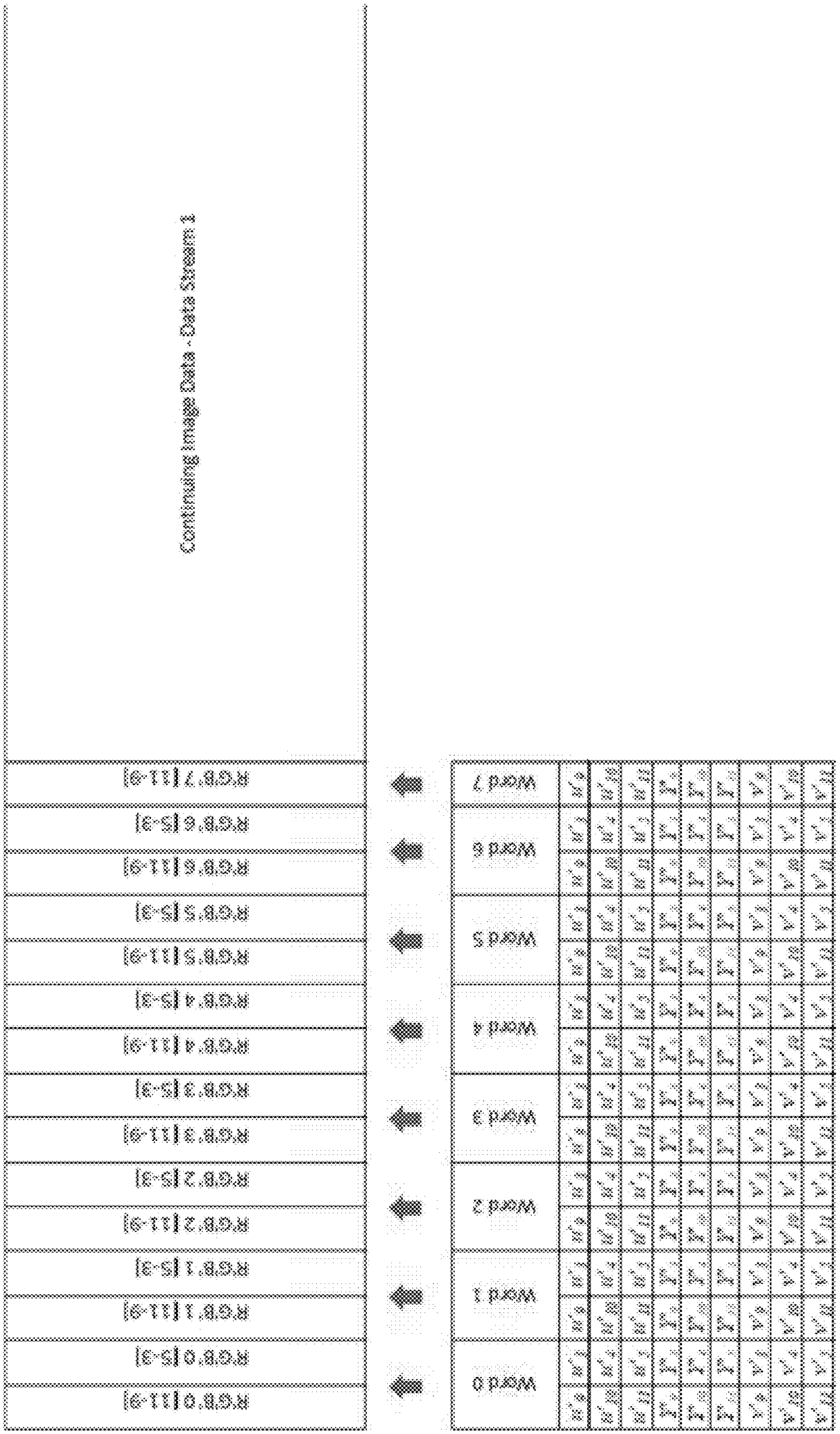

FIG. 122C illustrates one embodiment of a first data stream for a Yu'v' System 4 12-bit 4:4:4 Level A encode as applied to SMPTE ST425.

Figure 122D:
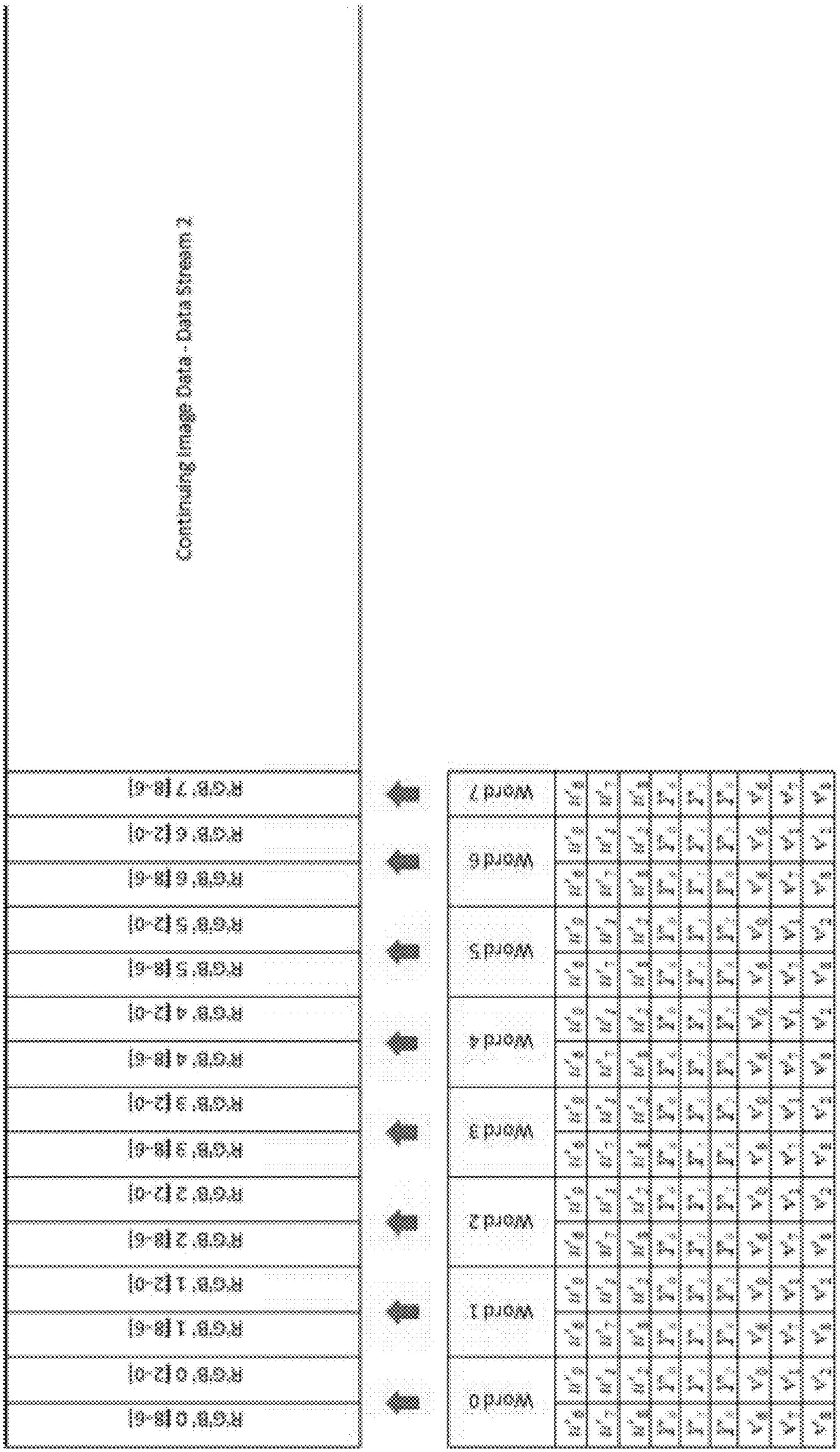

FIG. 122D illustrates one embodiment of a second data stream for a Yu'v' System 4 12-bit 4:4:4 Level A encode as applied to SMPTE ST425.

Figure 123A:
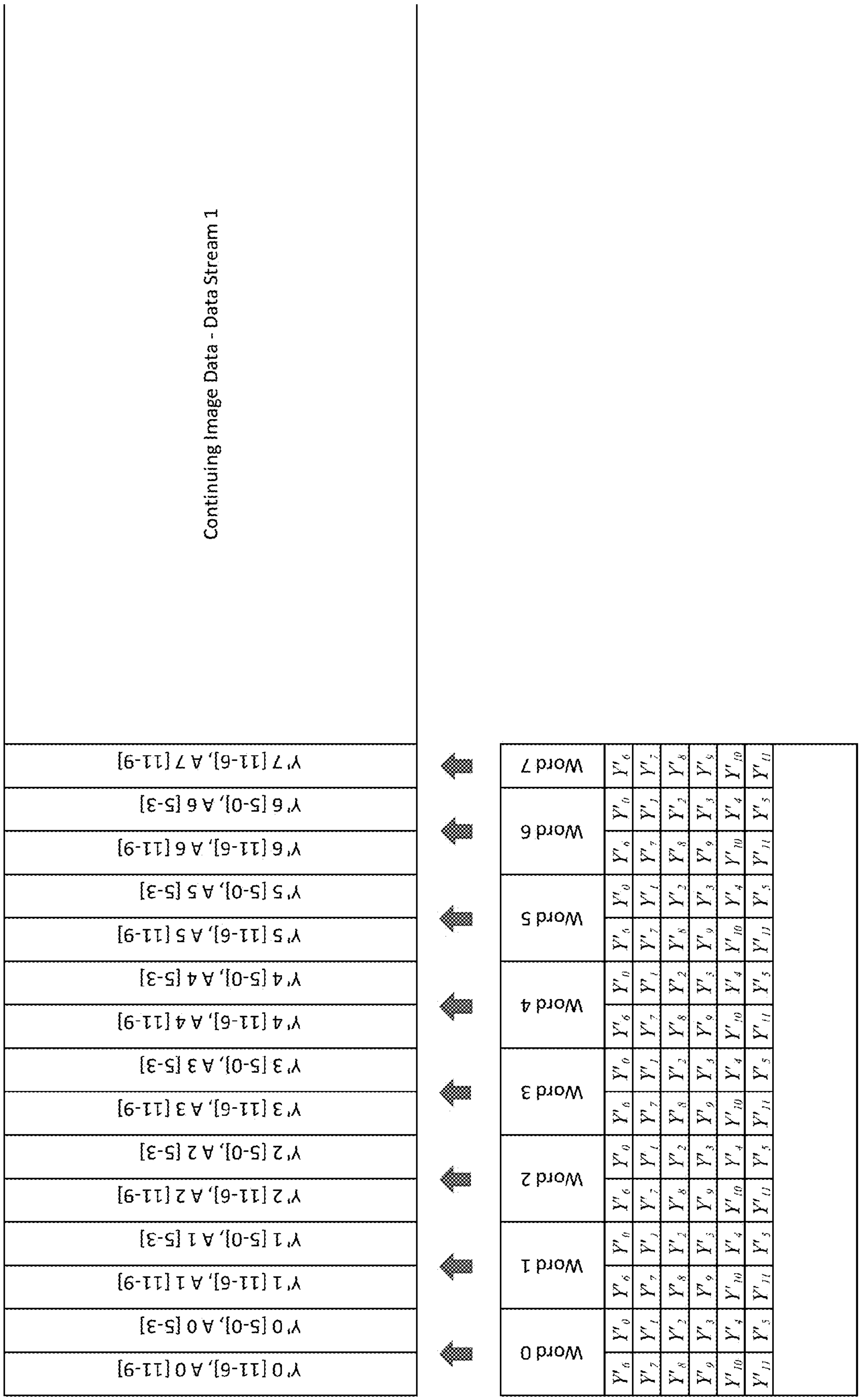

FIG. 123A illustrates one embodiment of a first data stream for a System 4 Yxy 12-bit 4:2:2 Level A encode as applied to SMPTE ST425.

Figure 123B:
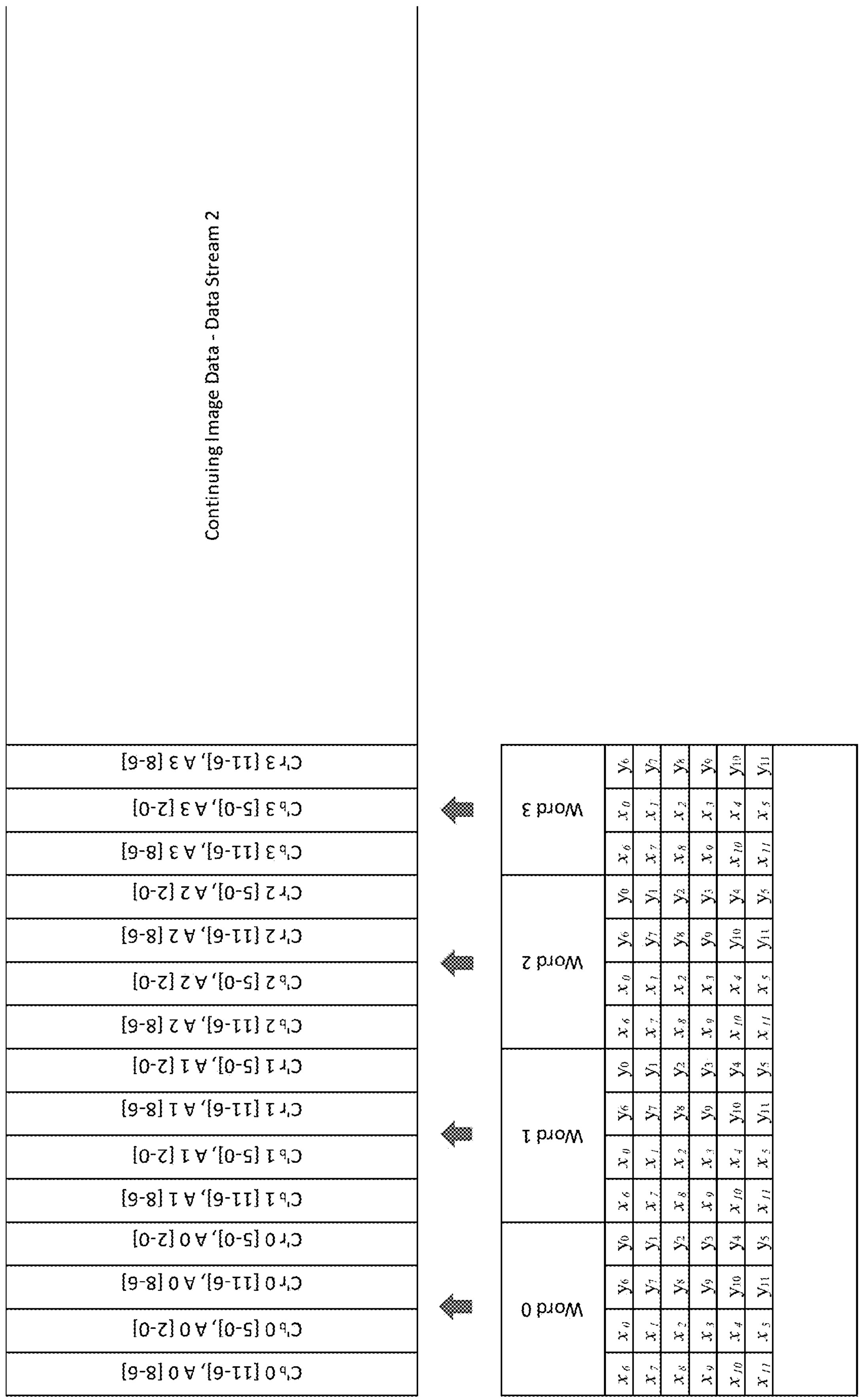

FIG. 123B illustrates one embodiment of a second data stream for a System 4 Yxy 12-bit 4:2:2 Level A encode as applied to SMPTE ST425.

Figure 123C:
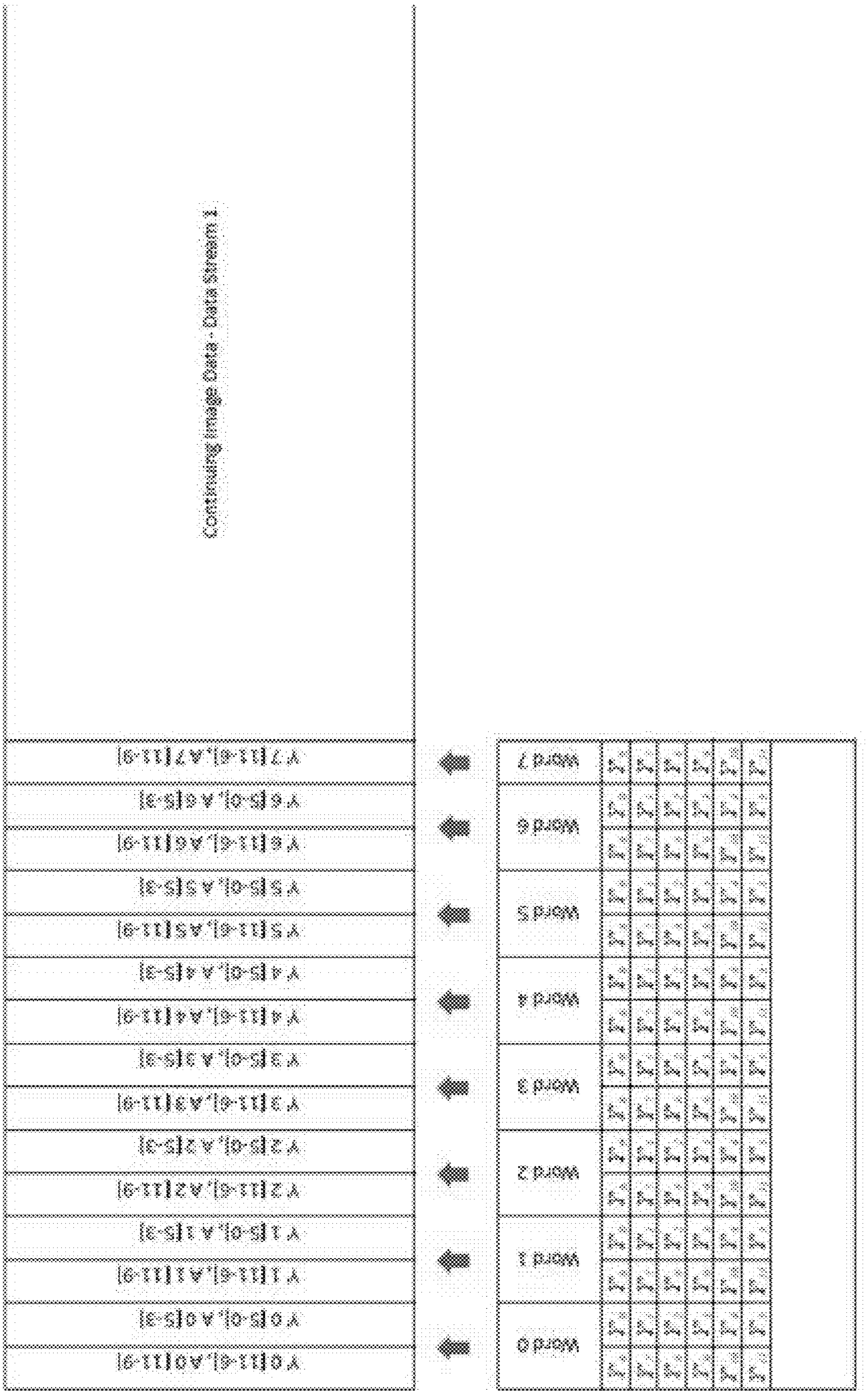

FIG. 123C illustrates one embodiment of a first data stream for a System 4 Yu'v' 12-bit 4:2:2 Level A encode as applied to SMPTE ST425.

Figure 123D:
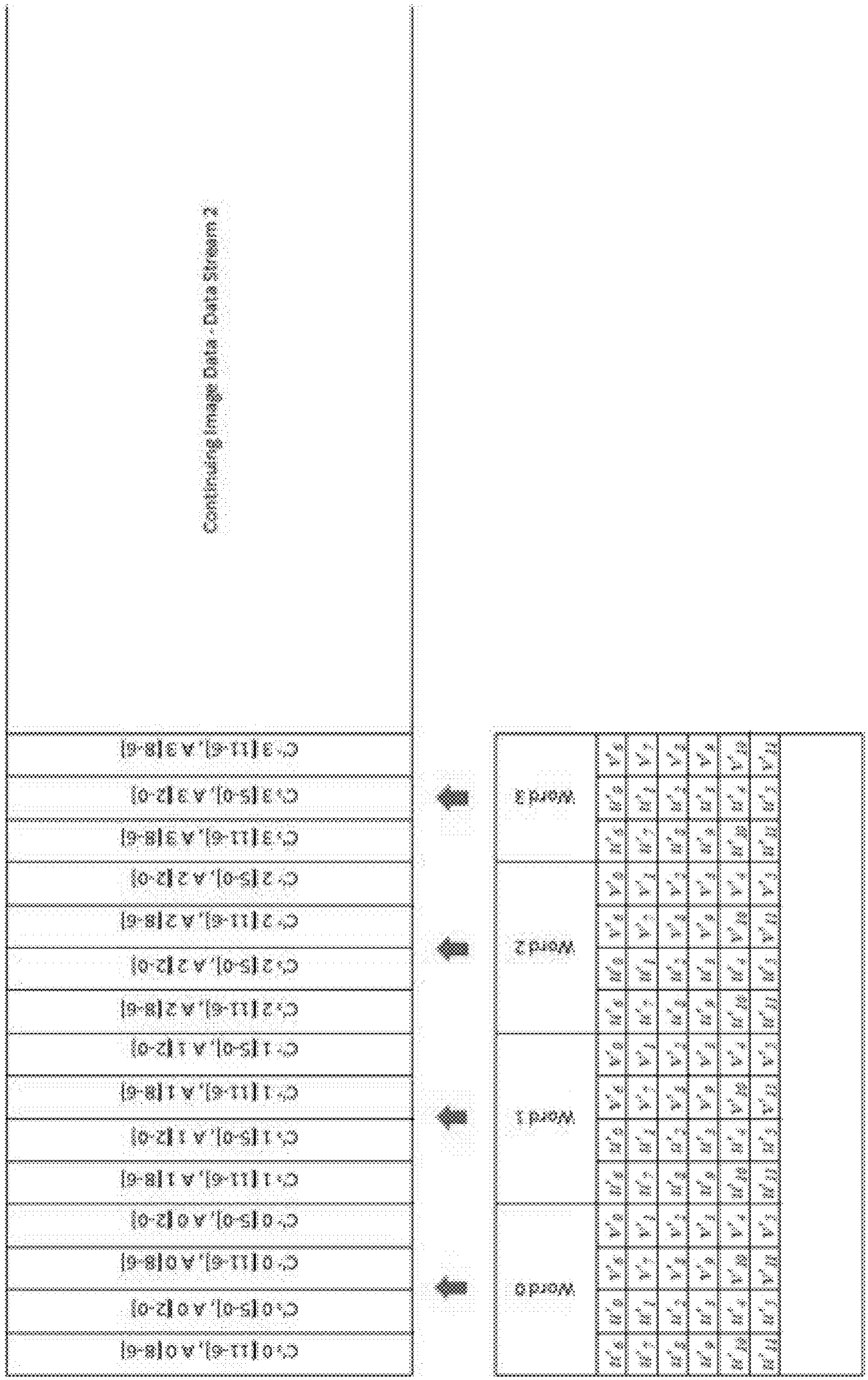

FIG. 123D illustrates one embodiment of a second data stream for a System 4 Yu'v' 12-bit 4:2:2 Level A encode as applied to SMPTE ST425.

Figure 124A:
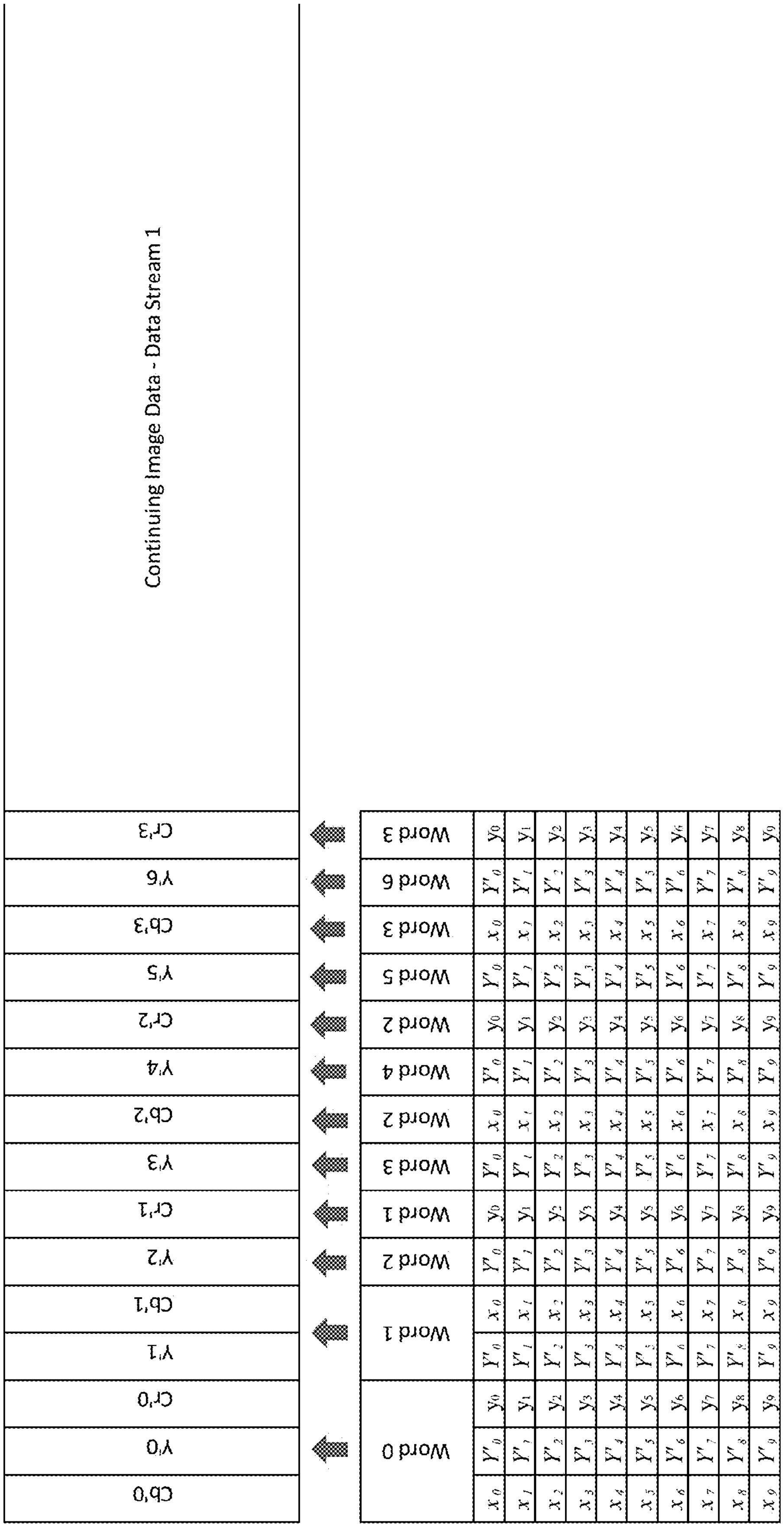

FIG. 124A illustrates one embodiment of a first data stream for a System 4 Yxy Level B Multiplex Dual Stream (DS) encode as applied to SMPTE ST425.

Figure 124B:
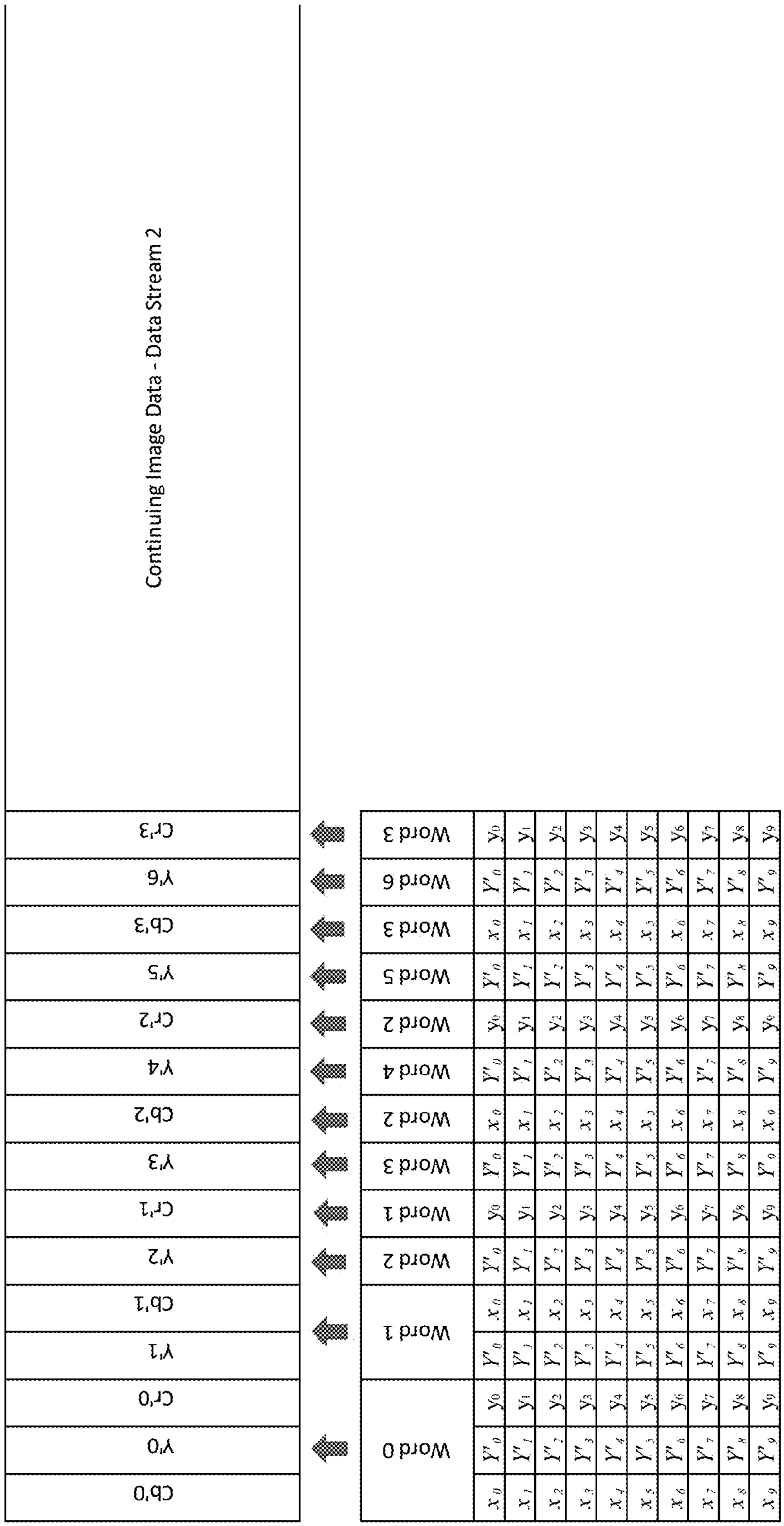

FIG. 124B illustrates one embodiment of a second data stream for a System 4 Yxy Level B Multiplex Dual Stream (DS) encode as applied to SMPTE ST425.

Figure 124C:
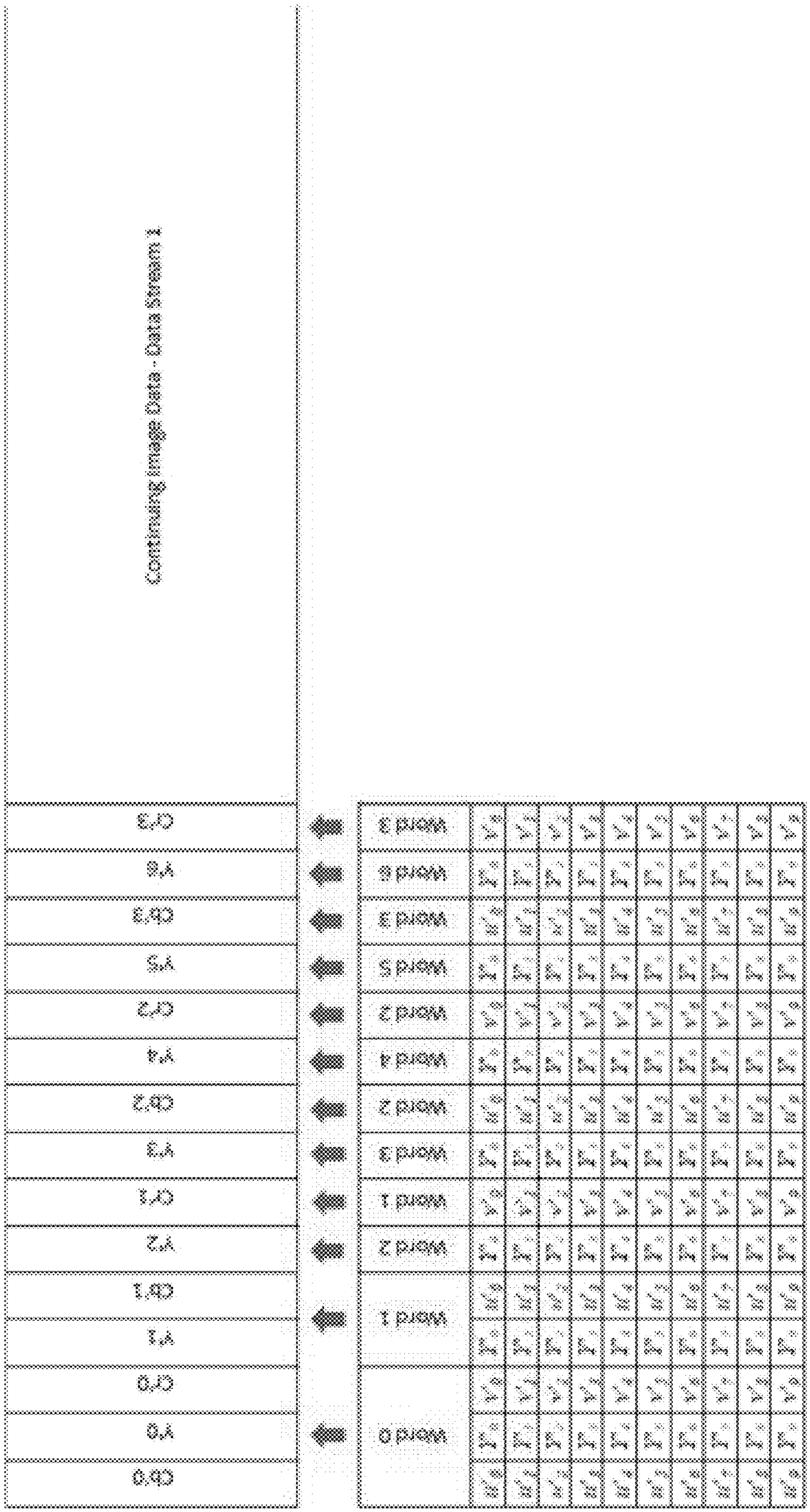

FIG. 124C illustrates one embodiment of a first data stream for a System 4 Yu'v' Level B Multiplex Dual Stream (DS) encode as applied to SMPTE ST425.

Figure 124D:
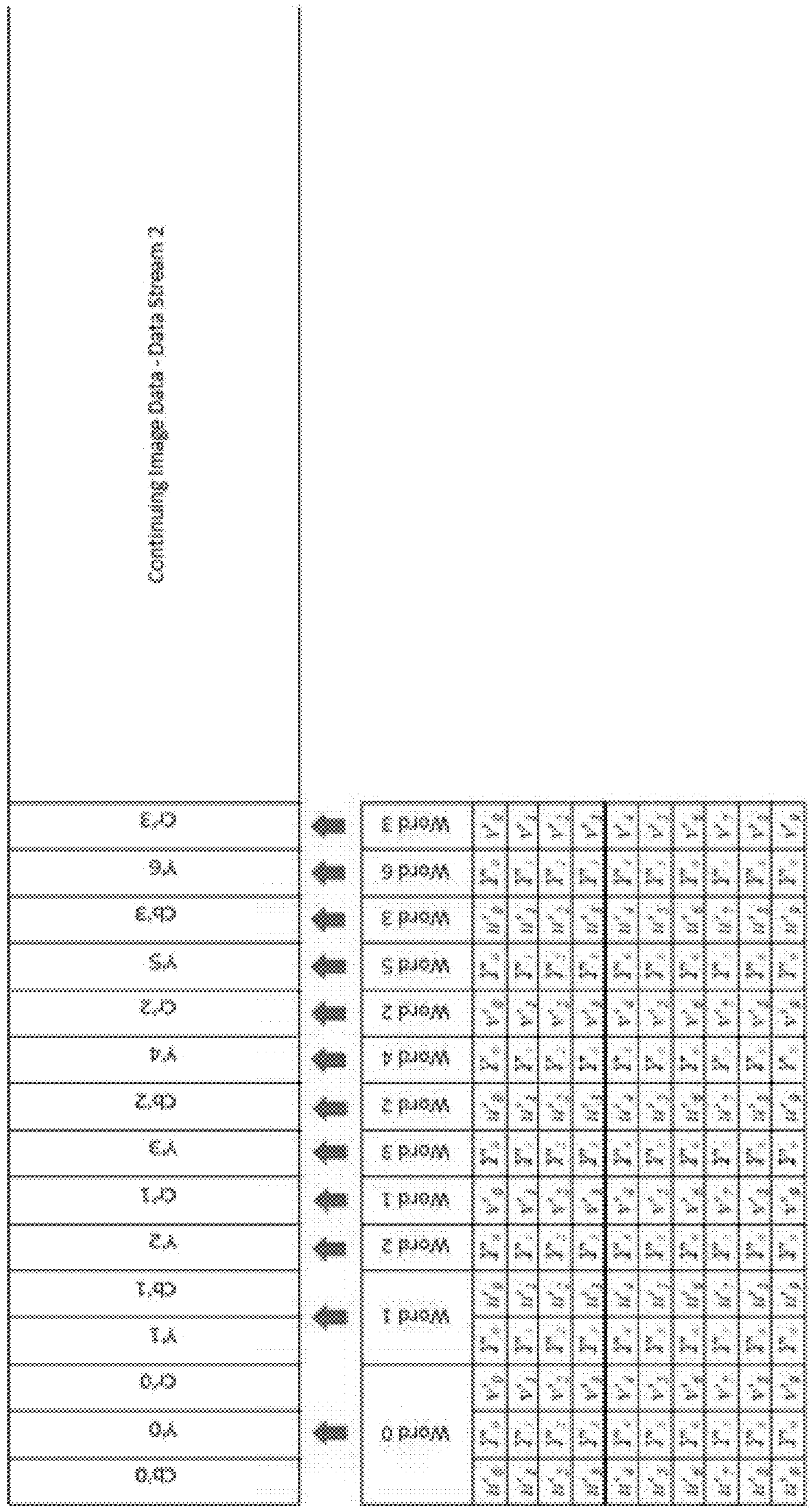

FIG. 124D illustrates one embodiment of a second data stream for a System 4 Yu'v' Level B Multiplex Dual Stream (DS) encode as applied to SMPTE ST425.

Figure 125A:
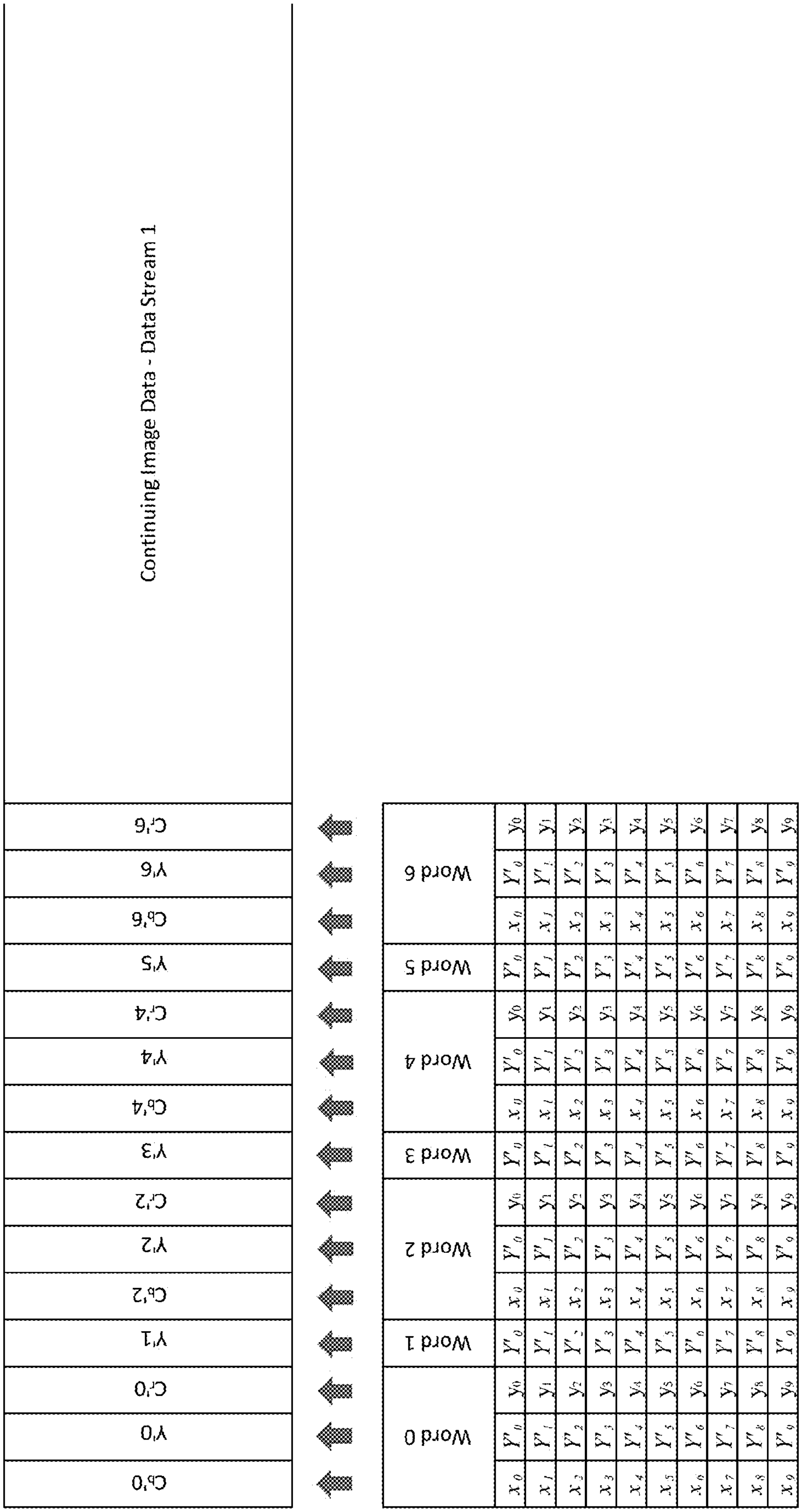

FIG. 125A illustrates one embodiment of a first data link for a System 4 Yxy 10-bit Level B Multiplex Dual Link (DL) encode as applied to SMPTE ST425.

Figure 125B:
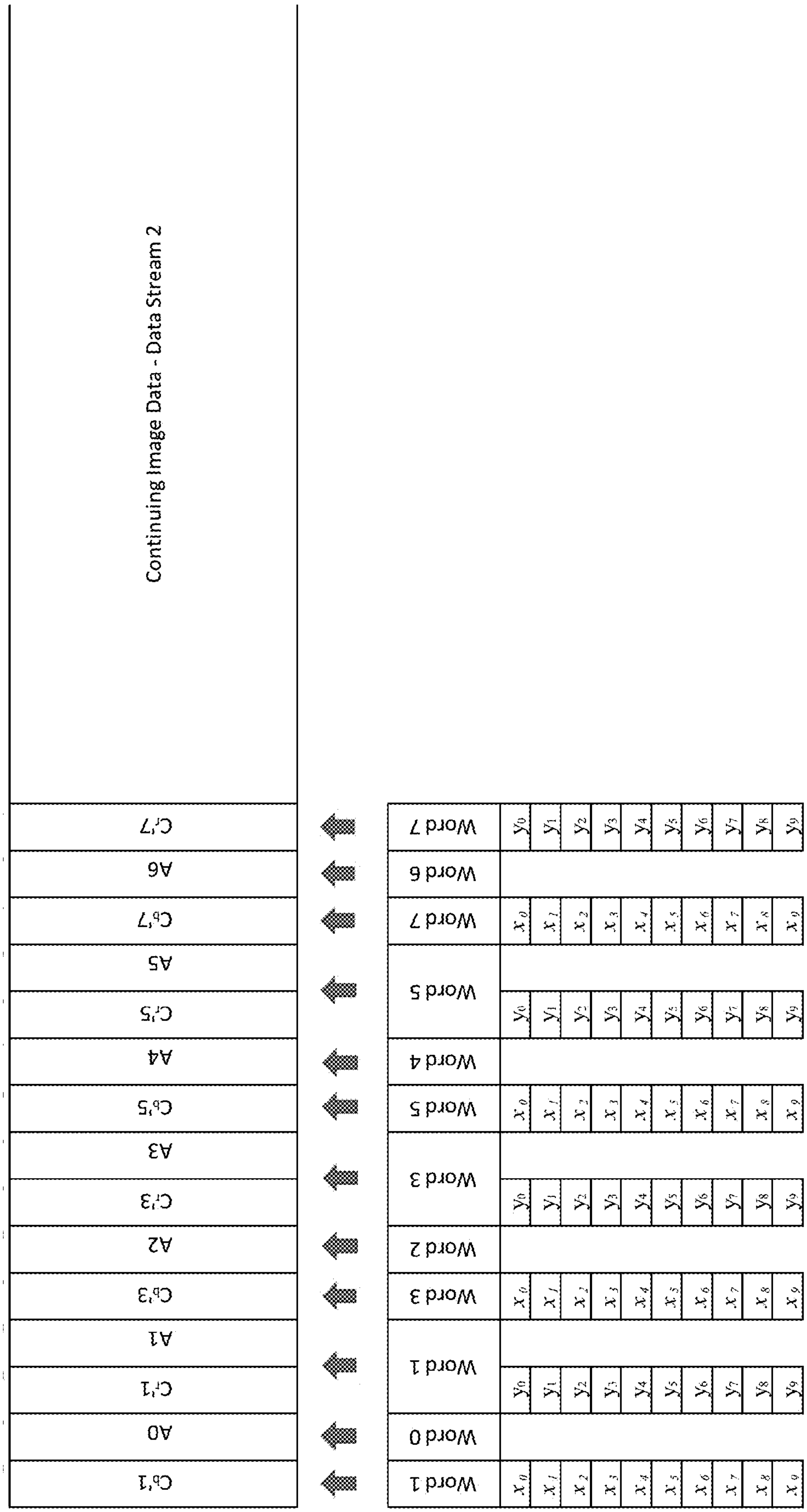

FIG. 125B illustrates one embodiment of a second data link for a System 4 Yxy 10-bit Level B Multiplex Dual Link (DL) encode as applied to SMPTE ST425.

Figure 125C:
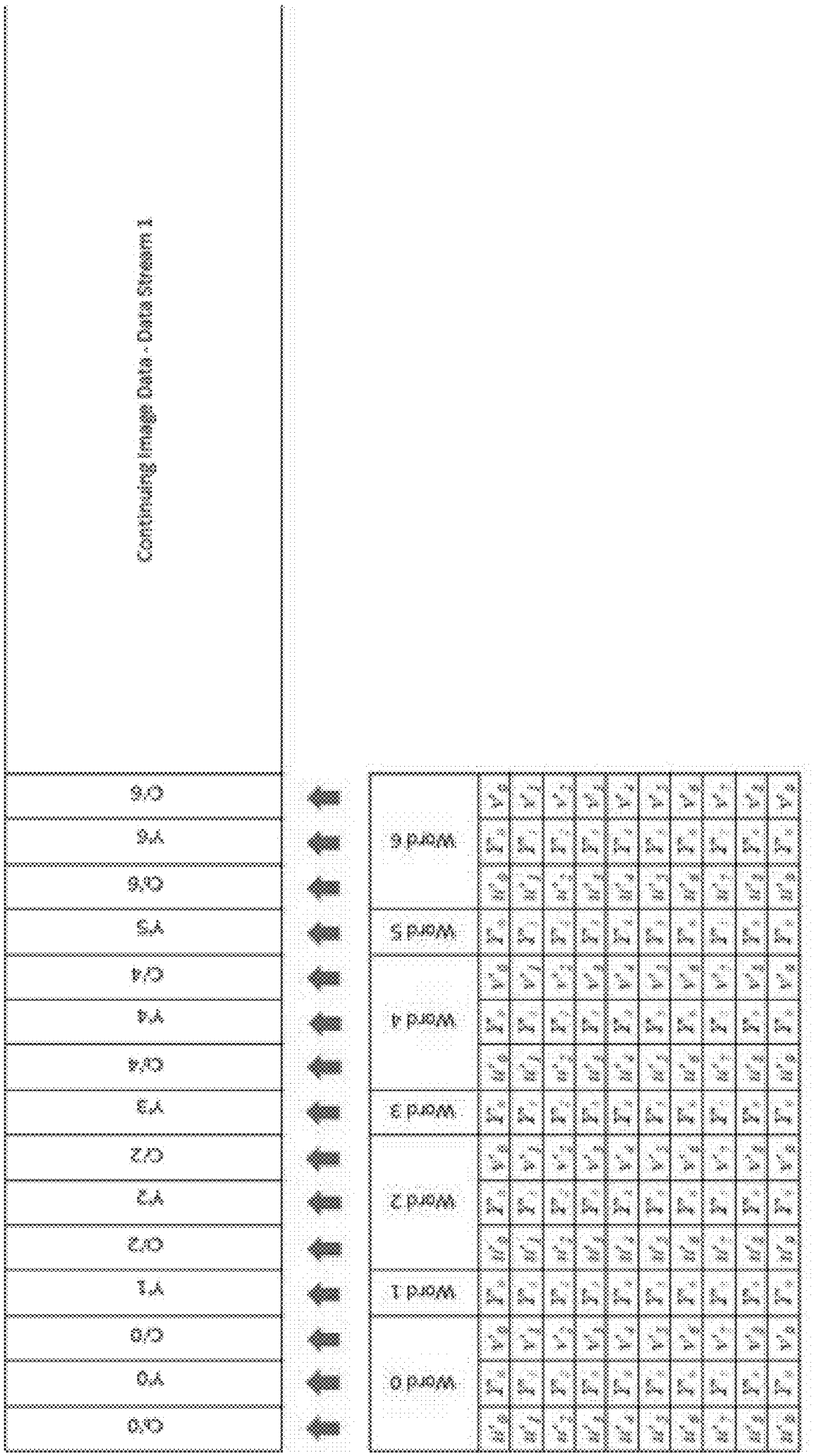

FIG. 125C illustrates one embodiment of a first data link for a System 4 Yu'v' 10-bit Level B Multiplex Dual Link (DL) encode as applied to SMPTE ST425.

Figure 125D:
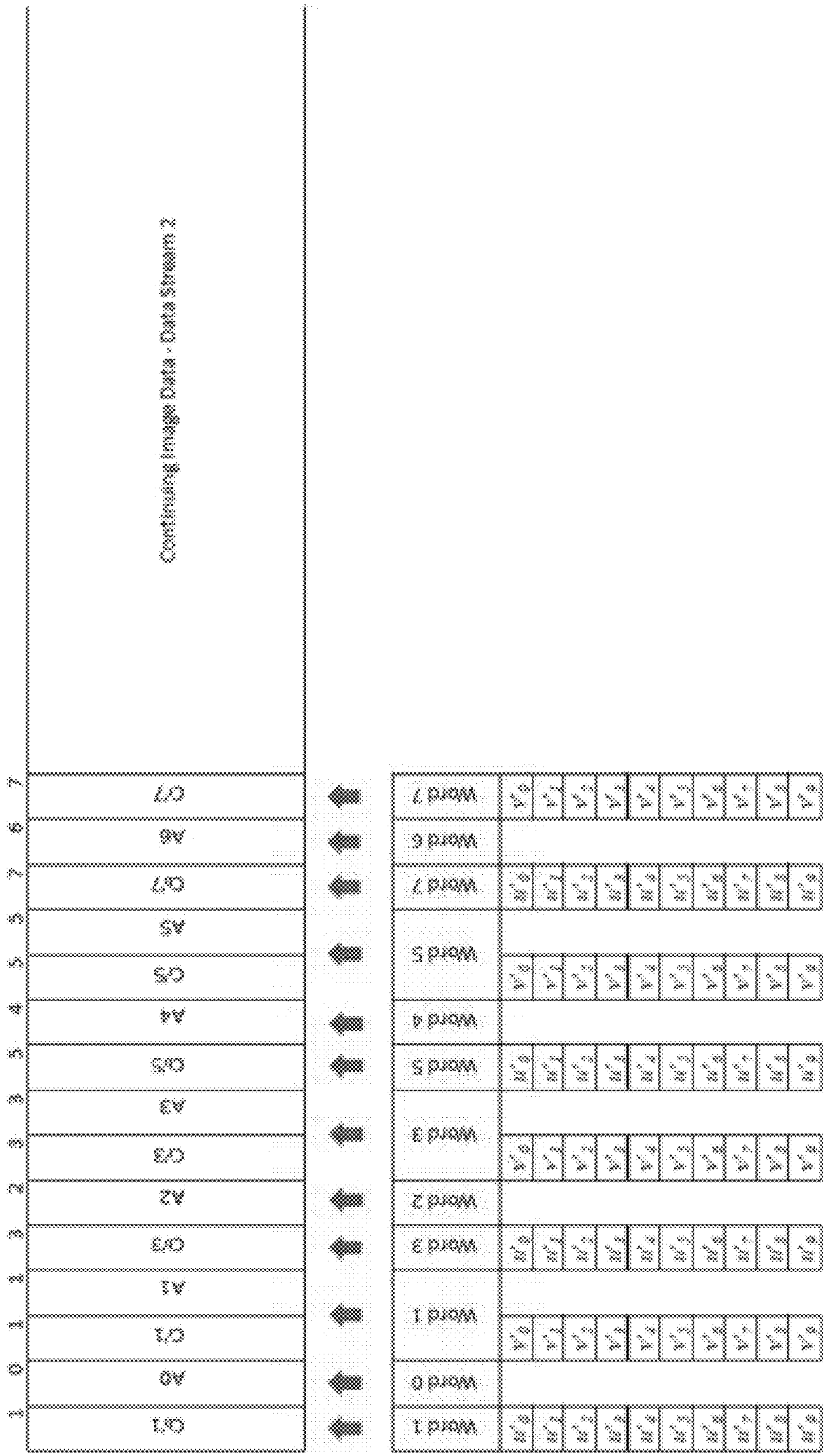

FIG. 125D illustrates one embodiment of a second data link for a System 4 Yu'v' 10-bit Level B Multiplex Dual Link (DL) encode as applied to SMPTE ST425.

Figure 126A:
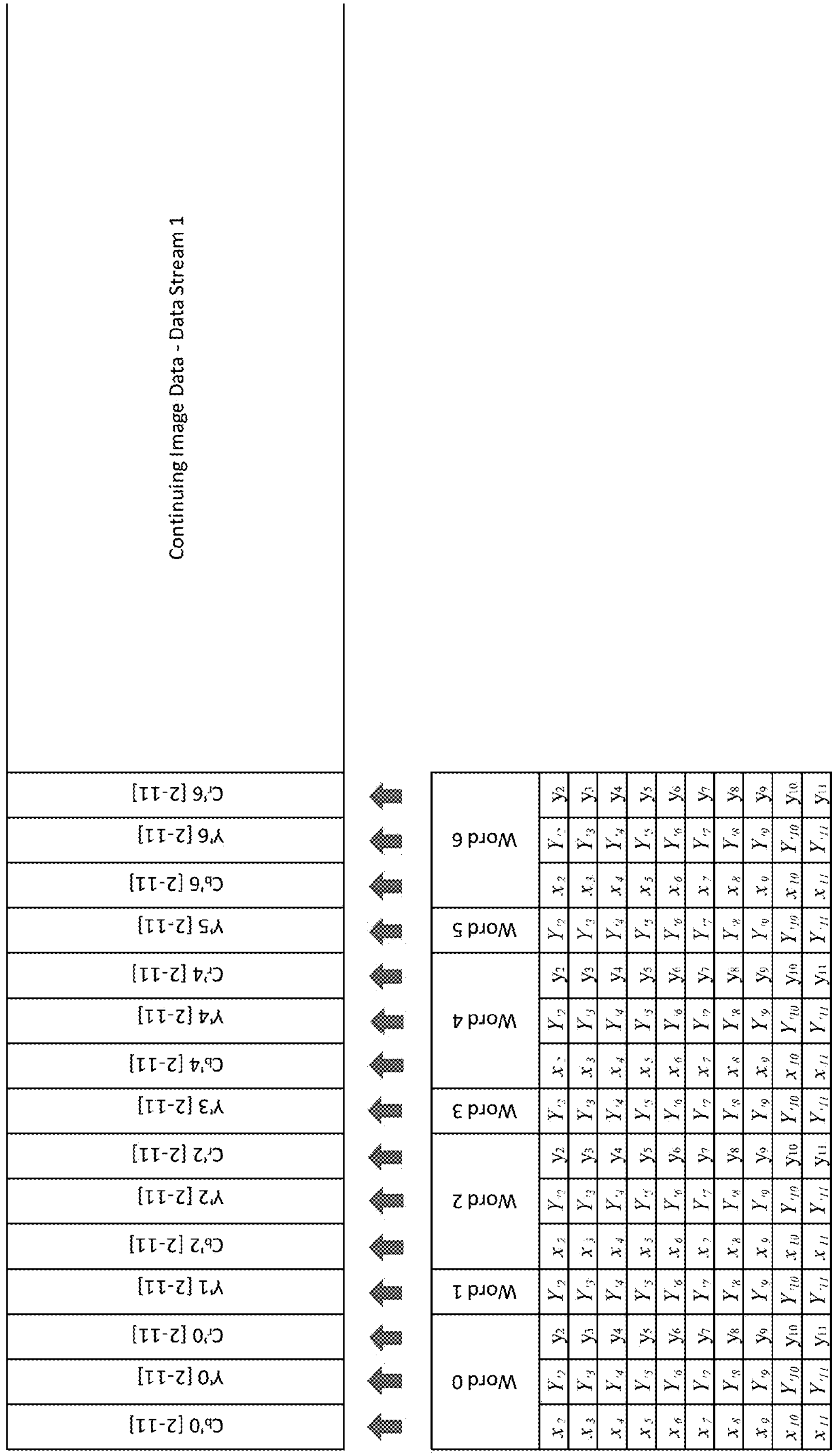

FIG. 126A illustrates one embodiment of a first data link for a System 4 Yxy 12-bit Level B Multiplex Dual Link (DL) encode as applied to SMPTE ST425.

Figure 126B:
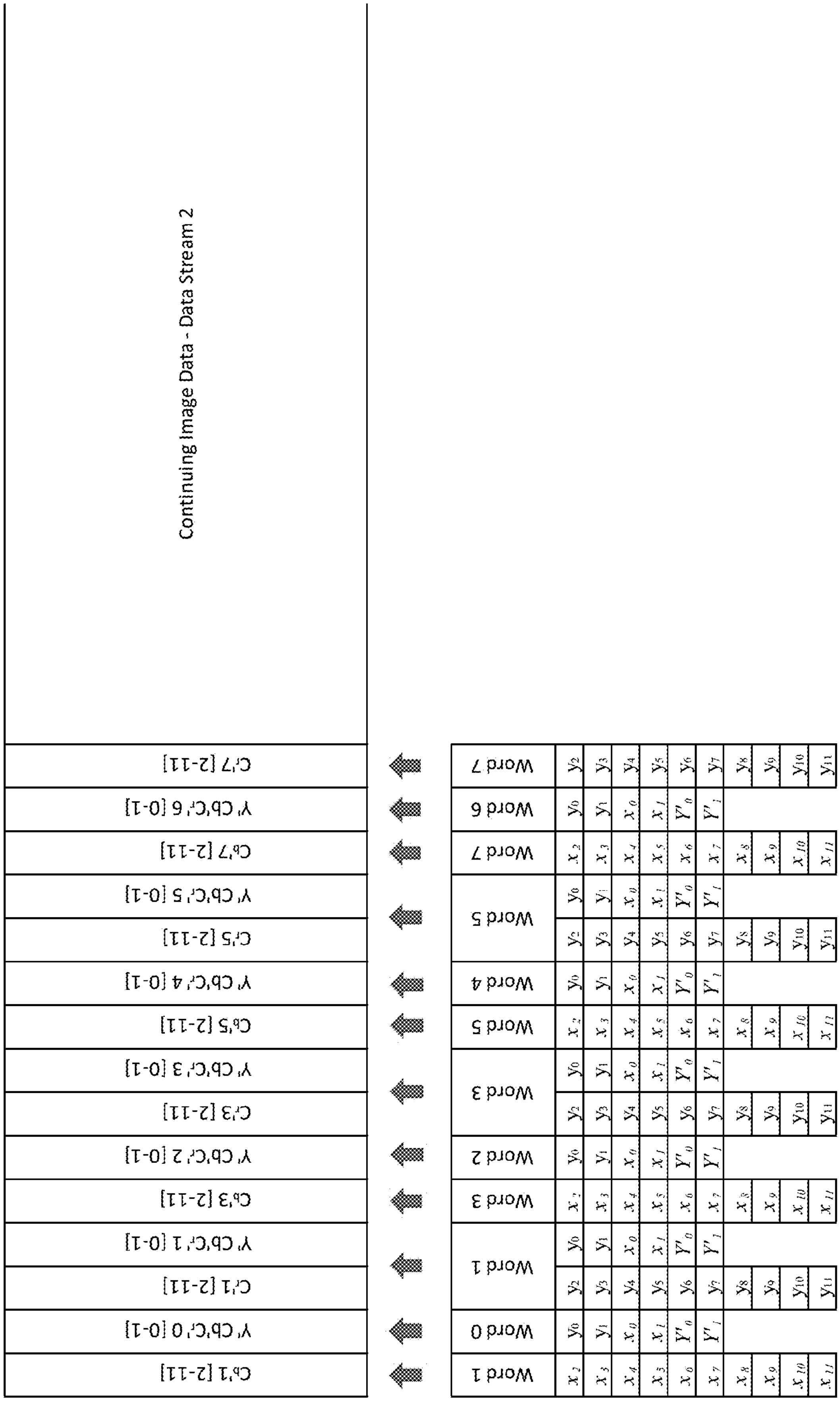

FIG. 126B illustrates one embodiment of a second data link for a System 4 Yxy 12-bit Level B Multiplex Dual Link (DL) encode as applied to SMPTE ST425.

Figure 126C:
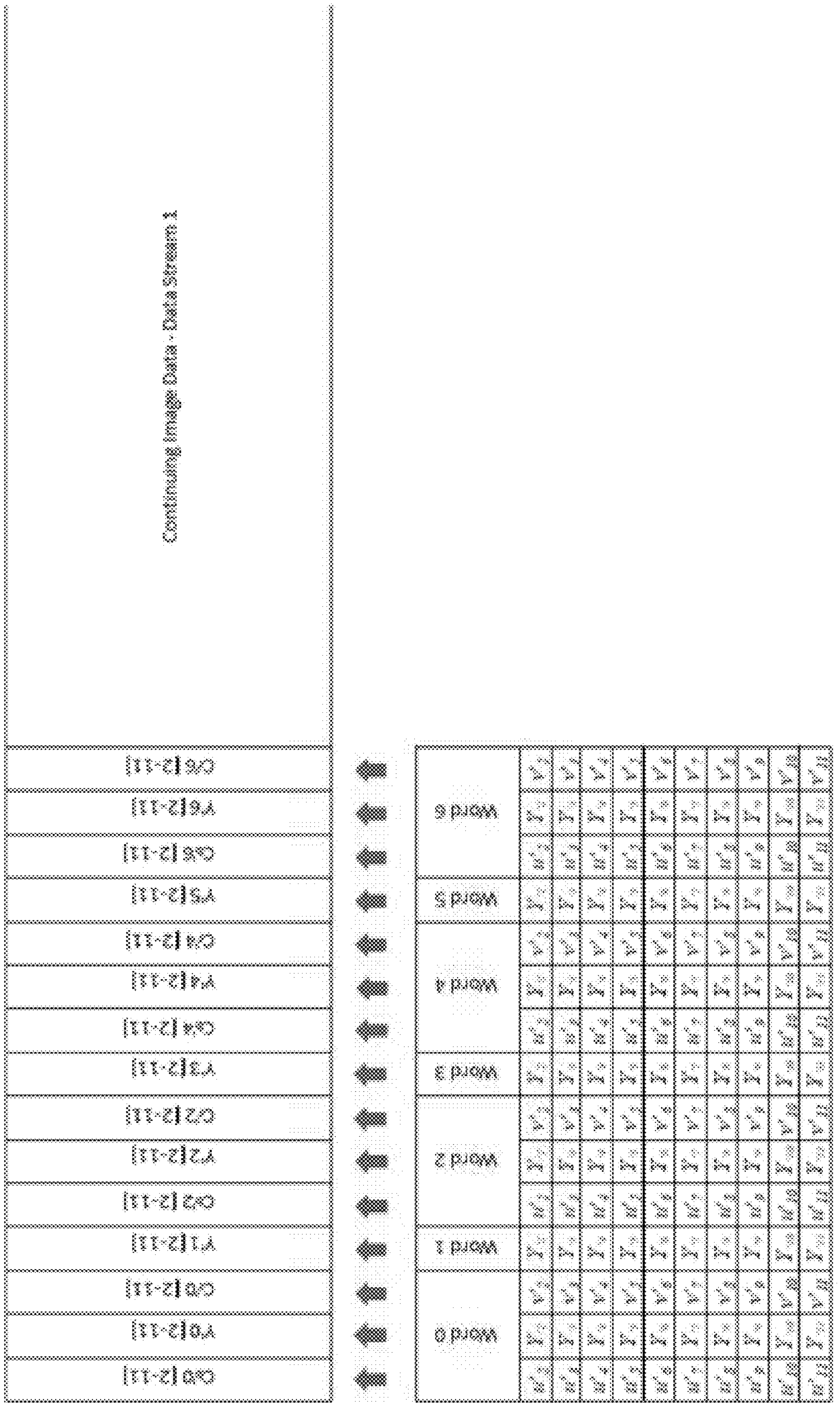

FIG. 126C illustrates one embodiment of a first data link for a System 4 Yu'v' 12-bit Level B Multiplex Dual Link (DL) encode as applied to SMPTE ST425.

Figure 126D:
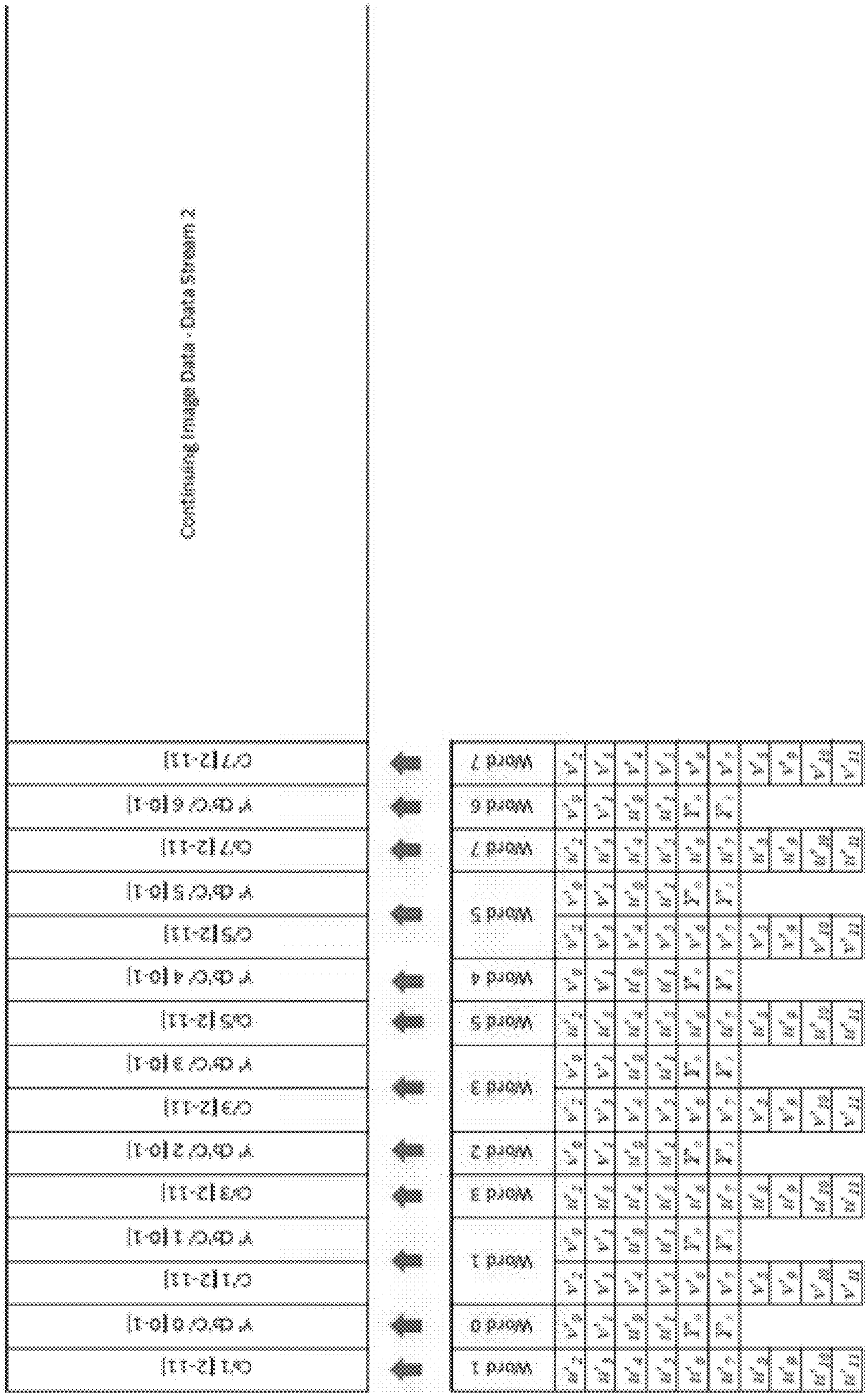

FIG. 126D illustrates one embodiment of a second data link for a System 4 Yu'v' 12-bit Level B Multiplex Dual Link (DL) encode as applied to SMPTE ST425.

FIG. 127 is a table illustrating modification of SMPTE ST2036-1 (2014) parameters to include System 4 (e.g., Yxy, Yu'v').

FIG. 128 is a table illustrating modification of CTA 861 Table 6—Colorimetry Transfer Characteristics to include System 4 (e.g., Yxy, Yu'v').

FIG. 129A is a table for Yxy 8-bit 4:2:2 encoding with 4 lanes.

FIG. 129B is a table for Yxy 8-bit 4:2:2 encoding with 2 lanes.

FIG. 129C is a table for Yxy 8-bit 4:2:2 encoding with 1 lane.

FIG. 129D is a table for Yu'v' 8-bit 4:2:2 encoding with 4 lanes.

FIG. 129E is a table for Yu'v' 8-bit 4:2:2 encoding with 2 lanes.

FIG. 129F is a table for Yu'v' 8-bit 4:2:2 encoding with 1 lane.

FIG. 130A is a table for Yxy 10-bit 4:2:2 encoding with 4 lanes.

FIG. 130B is a table for Yxy 10-bit 4:2:2 encoding with 2 lanes.

FIG. 130C is a table for Yxy 10-bit 4:2:2 encoding with 1 lane.

FIG. 130D is a table for Yu'v' 10-bit 4:2:2 encoding with 4 lanes.

FIG. 130E is a table for Yu'v' 10-bit 4:2:2 encoding with 2 lanes.

FIG. 130F is a table for Yu'v' 10-bit 4:2:2 encoding with 1 lane.

FIG. 131A is a table for Yxy 12-bit 4:2:2 encoding with 4 lanes.

FIG. 131B is a table for Yxy 12-bit 4:2:2 encoding with 2 lanes.

FIG. 131C is a table for Yxy 12-bit 4:2:2 encoding with 1 lane.

FIG. 131D is a table for Yu'v' 12-bit 4:2:2 encoding with 4 lanes.

FIG. 131E is a table for Yu'v' 12-bit 4:2:2 encoding with 2 lanes.

FIG. 131F is a table for Yu'v' 12-bit 4:2:2 encoding with 1 lane.

FIG. 132A is a table for Yxy 16-bit 4:2:2 encoding with 4 lanes.

FIG. 132B is a table for Yxy 16-bit 4:2:2 encoding with 2 lanes.

FIG. 132C is a table for Yxy 16-bit 4:2:2 encoding with 1 lane.

FIG. 132D is a table for Yu'v' 16-bit 4:2:2 encoding with 4 lanes.

FIG. 132E is a table for Yu'v' 16-bit 4:2:2 encoding with 2 lanes.

FIG. 132F is a table for Yu'v' 16-bit 4:2:2 encoding with 1 lane.

FIG. 133A is a table for Yxy 10-bit 4:4:4 encoding with 4 lanes.

FIG. 133B is a table for Yxy 10-bit 4:4:4 encoding with 2 lanes.

FIG. 133C is a table for Yxy 10-bit 4:4:4 encoding with 1 lane.

FIG. 133D is a table for Yu'v' 10-bit 4:4:4 encoding with 4 lanes.

FIG. 133E is a table for Yu'v' 10-bit 4:4:4 encoding with 2 lanes.

FIG. 133F is a table for Yu'v' 10-bit 4:4:4 encoding with 1 lane.

FIG. 134A is a table for Yxy 12-bit 4:4:4 encoding with 4 lanes.

FIG. 134B is a table for Yxy 12-bit 4:4:4 encoding with 2 lanes.

FIG. 134C is a table for Yxy 12-bit 4:4:4 encoding with 1 lane.

FIG. 134D is a table for Yu'v' 12-bit 4:4:4 encoding with 4 lanes.

FIG. 134E is a table for Yu'v' 12-bit 4:4:4 encoding with 2 lanes.

FIG. 134F is a table for Yu'v' 12-bit 4:4:4 encoding with 1 lane.

FIG. 135A is a table for Yxy 16-bit 4:4:4 encoding with 4 lanes.

FIG. 135B is a table for Yxy 16-bit 4:4:4 encoding with 2 lanes.

FIG. 135C is a table for Yxy 16-bit 4:4:4 encoding with 1 lane.

FIG. 135D is a table for Yu'v' 16-bit 4:4:4 encoding with 4 lanes.

FIG. 135E is a table for Yu'v' 16-bit 4:4:4 encoding with 2 lanes.

FIG. 135F is a table for Yu'v' 16-bit 4:4:4 encoding with 1 lane.

FIG. 136 is table with auxiliary video information (AVI) for InfoFrame version 4.

FIG. 137A is an example of a 16-bit Y channel shared with 12-bit x and y channels.

FIG. 137B is an example of a 12-bit Y channel shared with 10-bit x and y channels.

FIG. 137C is an example of a 10-bit Y channel shared with 8-bit x and y channels.

Figure 137D:
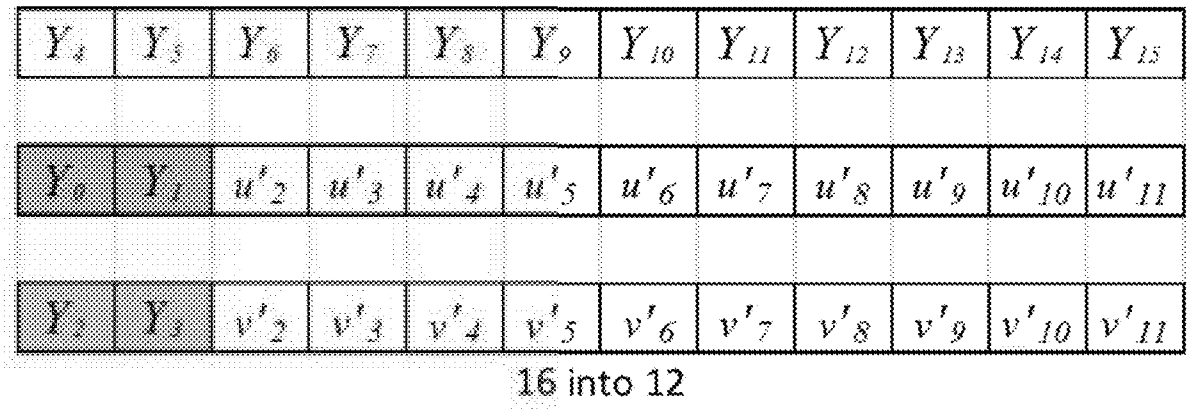

FIG. 137D is an example of a 16-bit Y channel shared with 12-bit u' and v' channels.

Figure 137E:
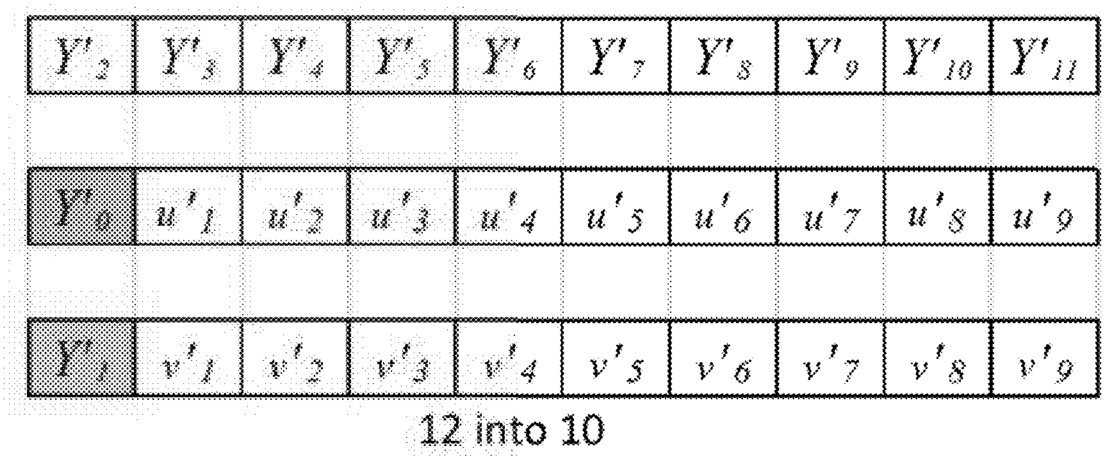

FIG. 137E is an example of a 12-bit Y channel shared with 10-bit u' and v' channels.

Figure 137F:
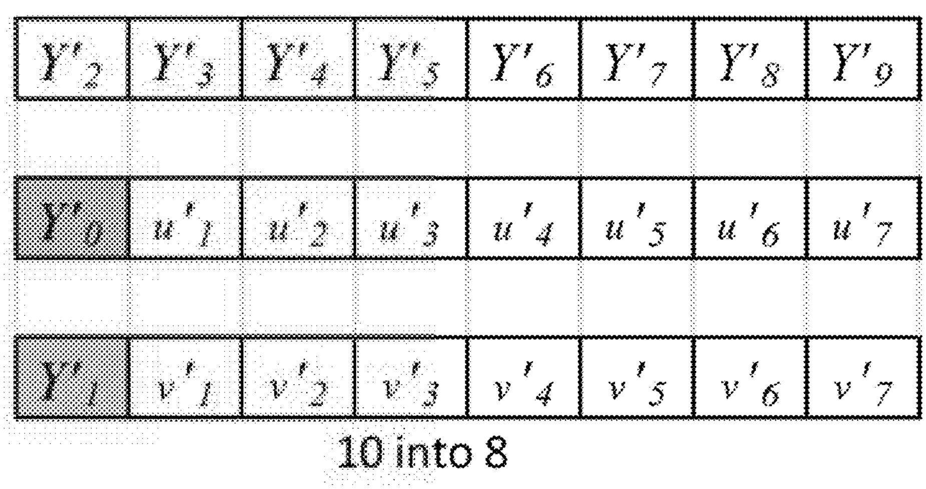

FIG. 137F is an example of a 10-bit Y channel shared with 8-bit u' and v' channels.

FIG. 138A is an example of a 16-bit I channel shared with 12-bit $C_TC_P$ channels.

FIG. 138B is an example of a 12-bit I channel shared with 10-bit $C_TC_P$ channels.

FIG. 138C is an example of a 10-bit I channel shared with 8-bit $C_TC_P$ channels.

Figure 139A:
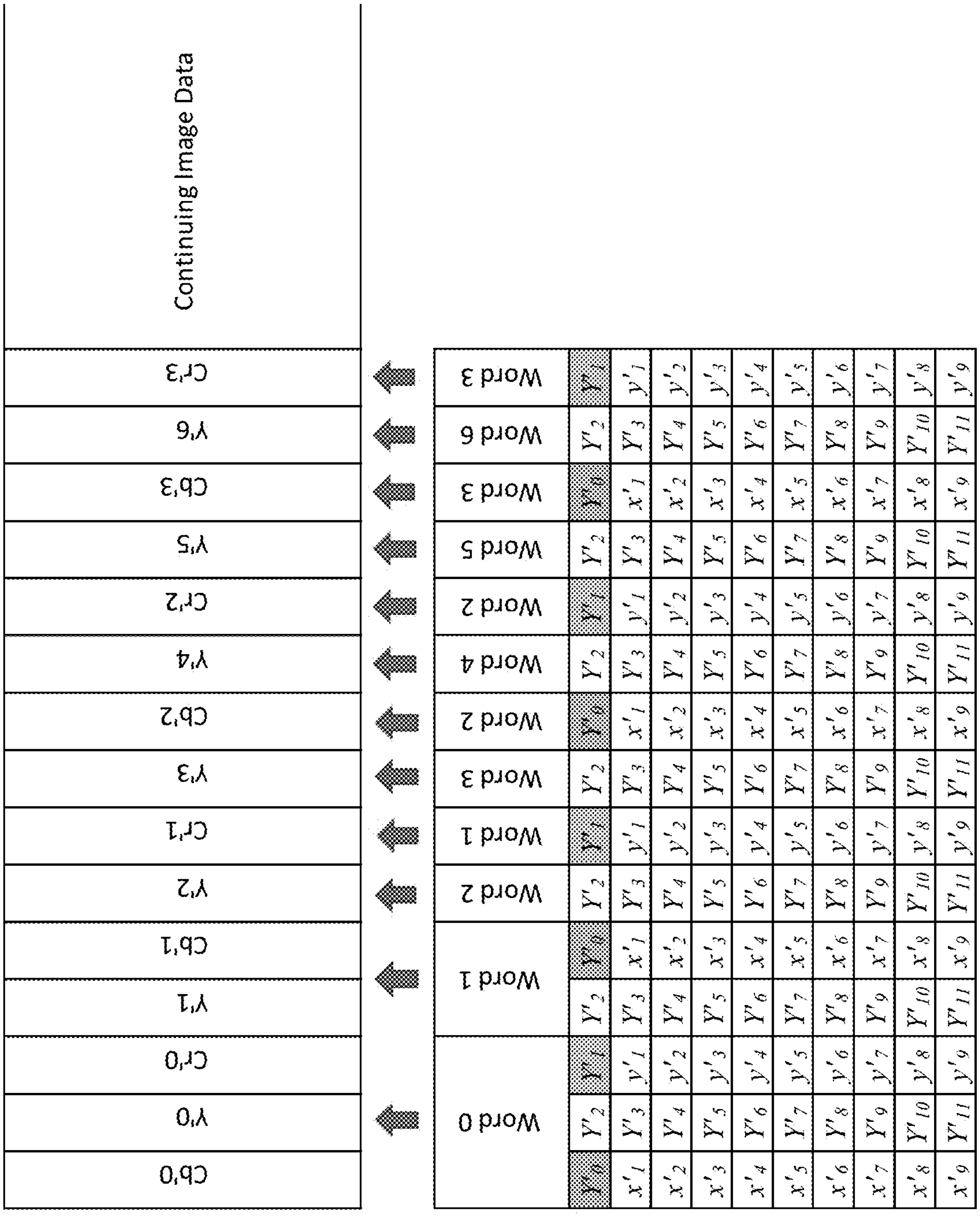

FIG. 139A illustrates one embodiment of a 12-bit into 10-bit shift for a Yxy 4:2:2 encode as applied to SMPTE ST292.

Figure 139B:
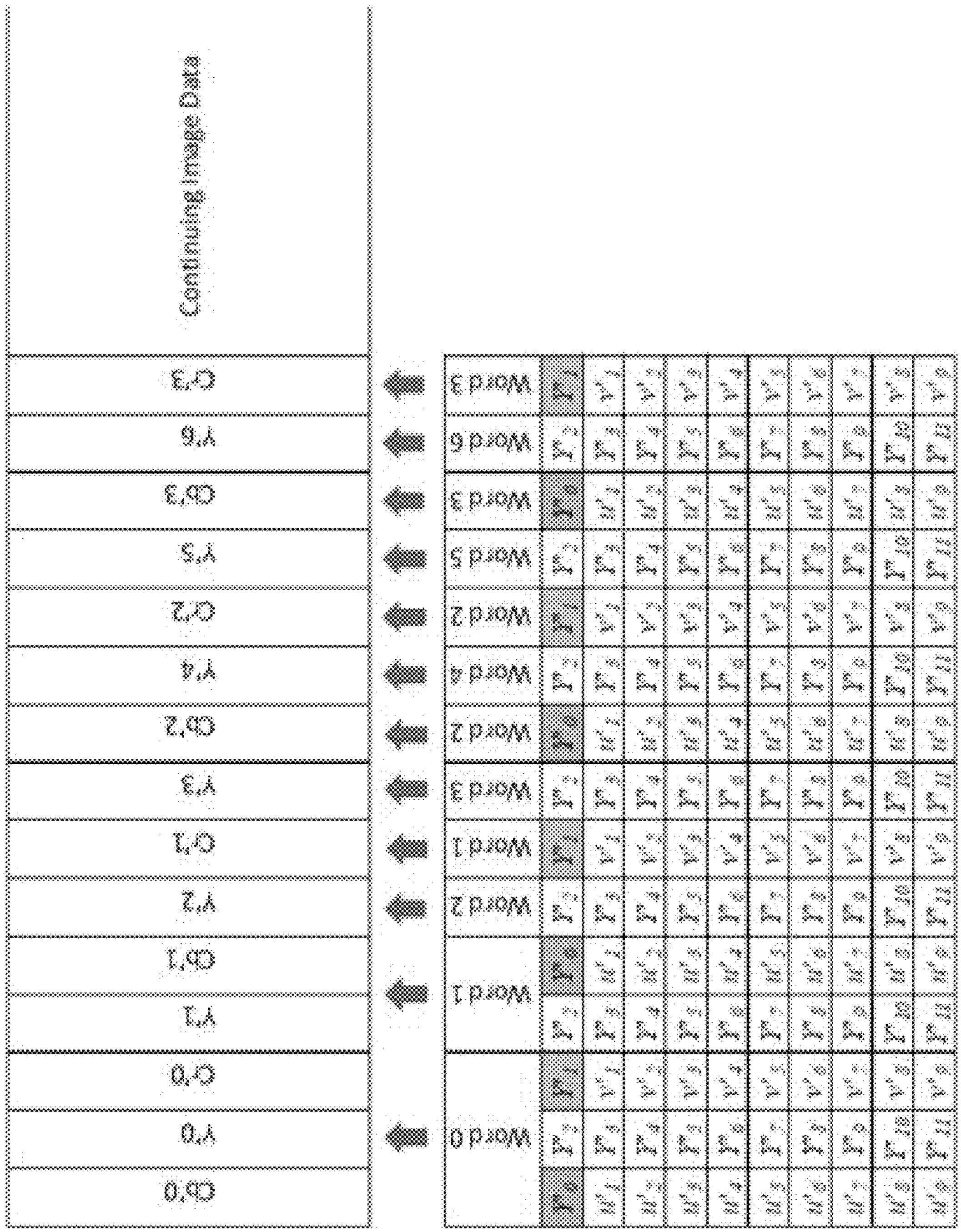

FIG. 139B illustrates one embodiment of a 12-bit into 10-bit shift for a Yu'v' 4:2:2 encode as applied to SMPTE ST292.

Figure 140A:
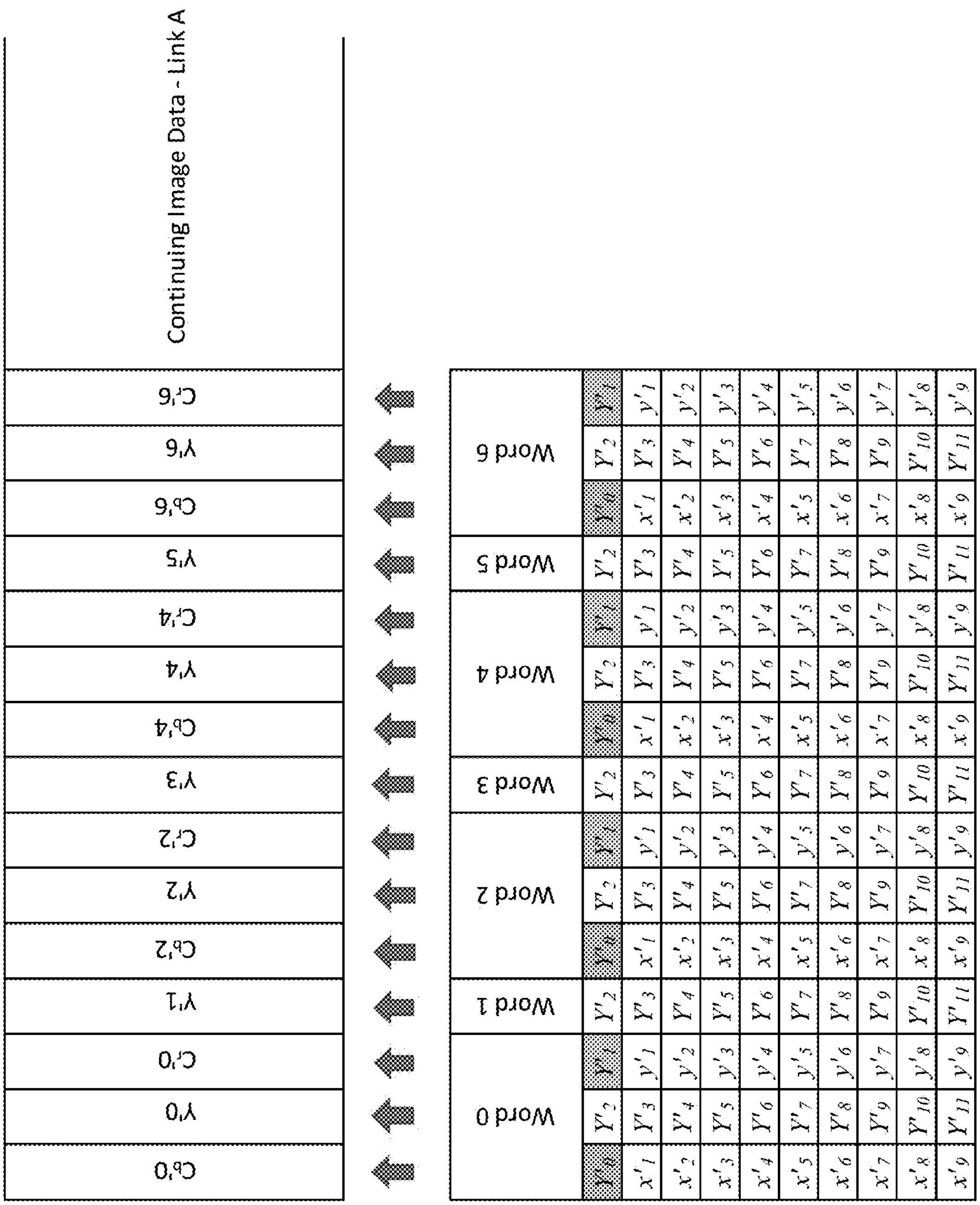

FIG. 140A illustrates one embodiment of a first link for a 12-bit into 10-bit shift for a Yxy 4:4:4 $YC_BC_R$ encode as applied to SMPTE ST372.

Figure 140B:
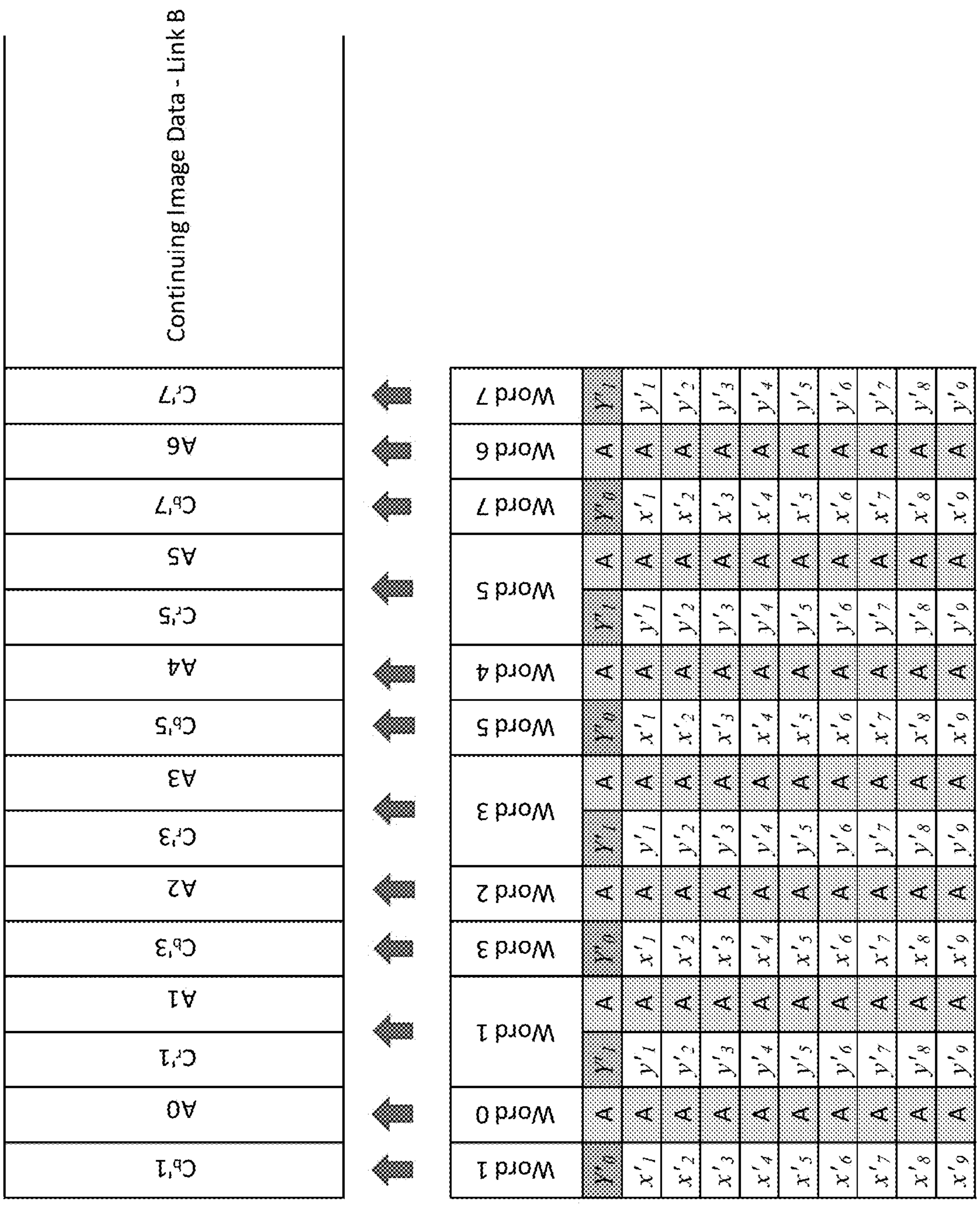

FIG. 140B illustrates one embodiment of a second link for a 12-bit into 10-bit shift for a Yxy 4:4:4 $YC_BC_R$ encode as applied to SMPTE ST372.

Figure 140C:
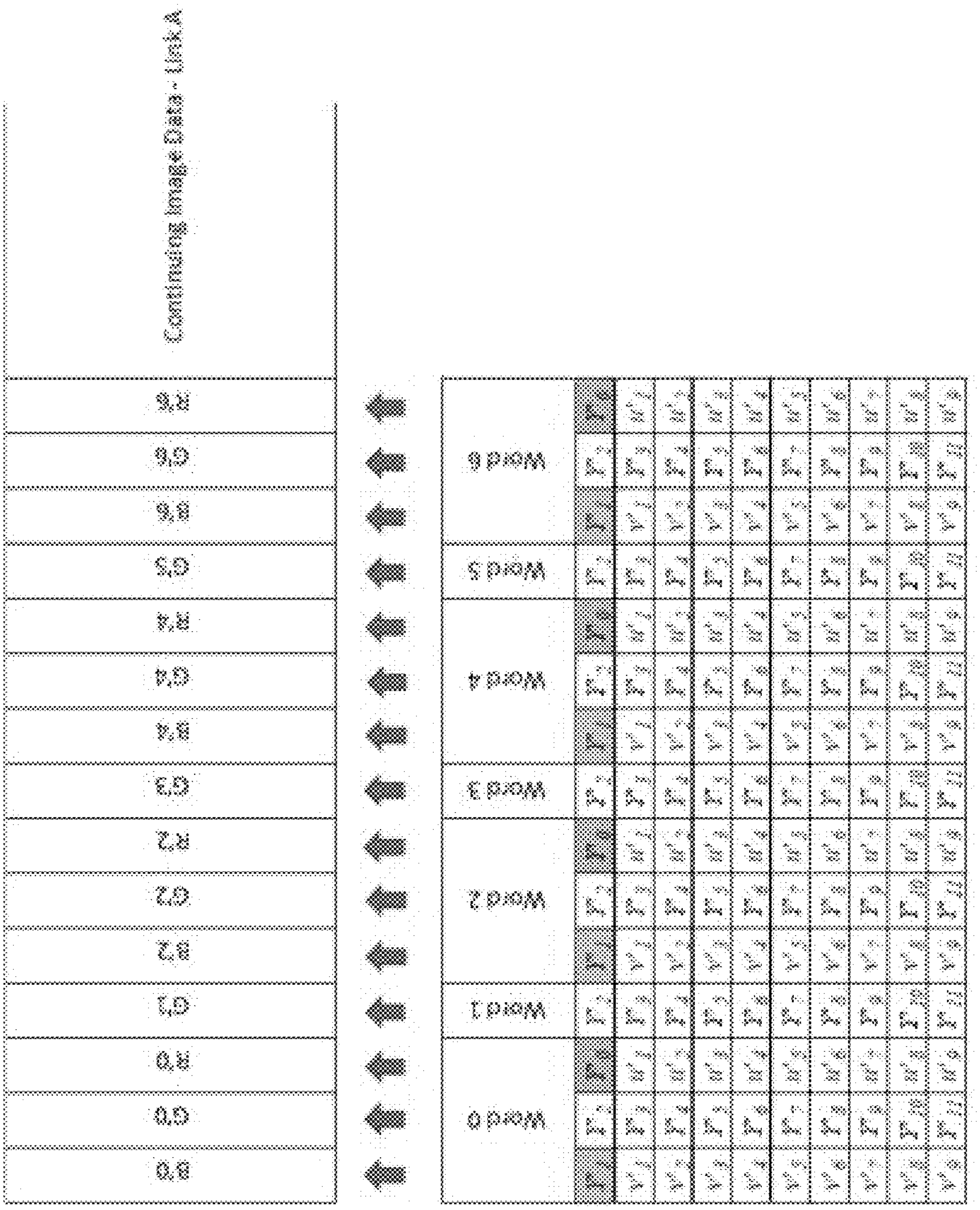

FIG. 140C illustrates one embodiment of a first link for a 12-bit into 10-bit shift for a Yu'v' 4:4:4 $YC_BC_R$ encode as applied to SMPTE ST372.

Figure 140D:
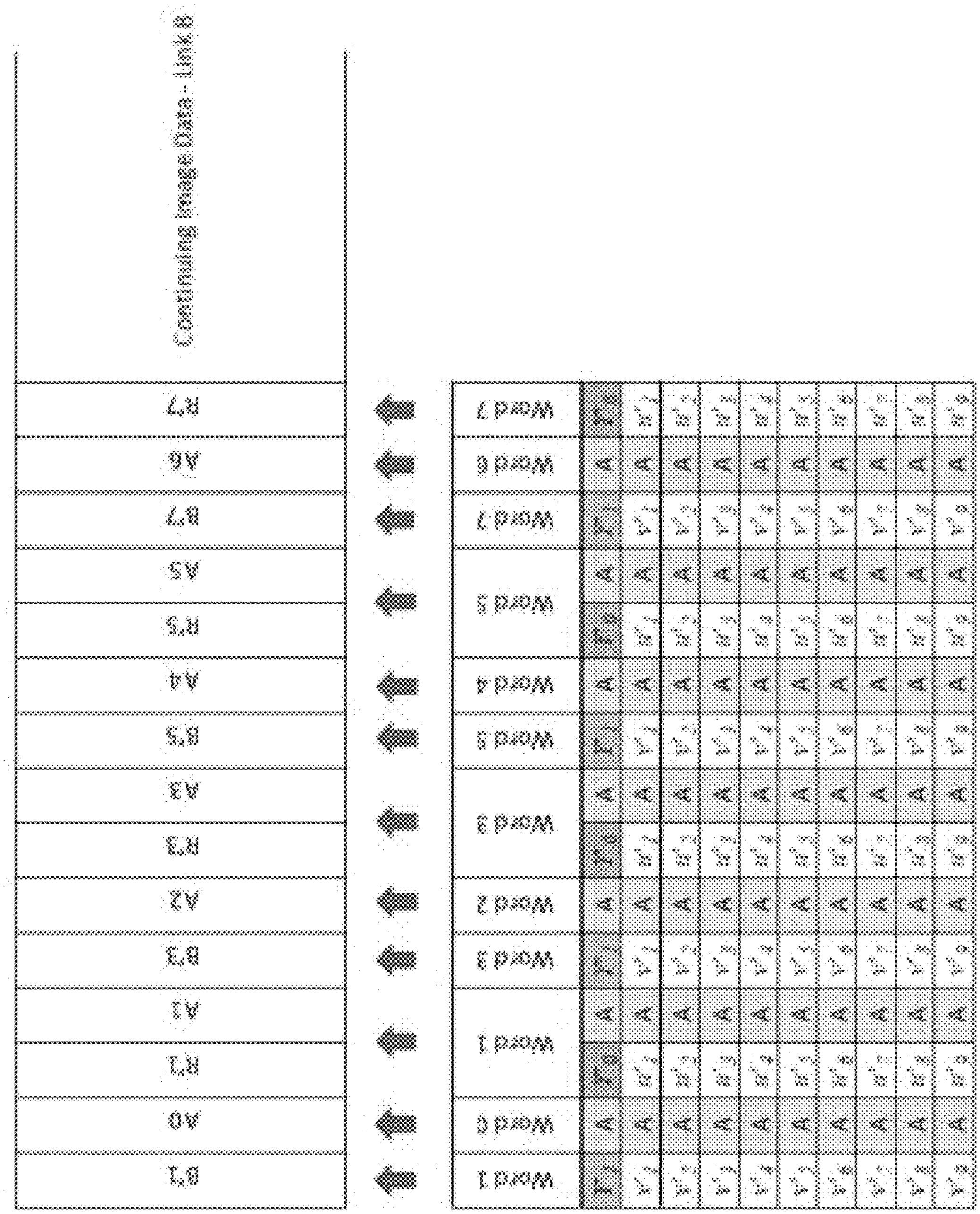

FIG. 140D illustrates one embodiment of a second link for a 12-bit into 10-bit shift for a Yu'v' 4:4:4 $YC_BC_R$ encode as applied to SMPTE ST372.

Figure 141A:
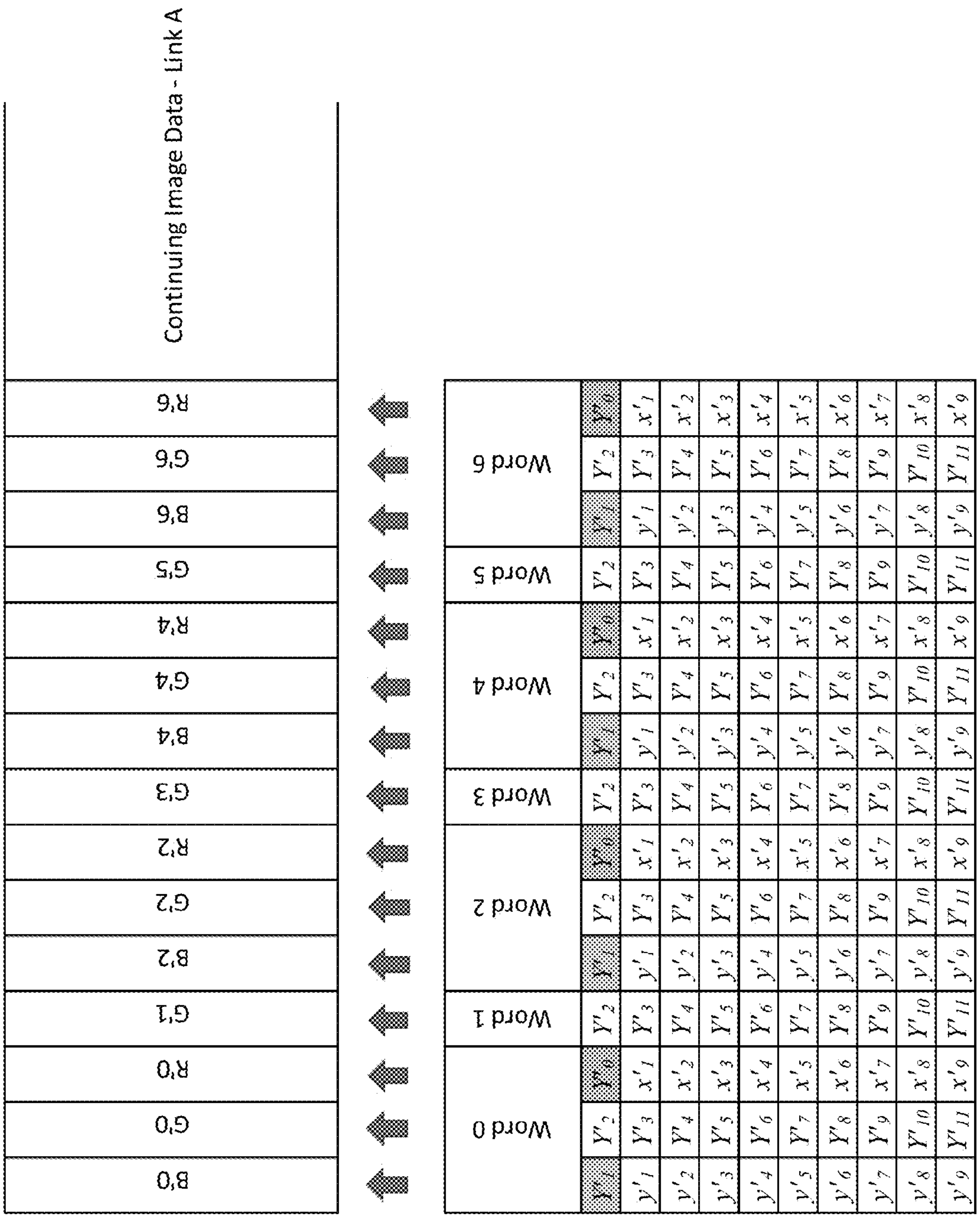

FIG. 141A illustrates one embodiment of a first link for a 12-bit into 10-bit shift for a Yxy 4:4:4 RGB encode as applied to SMPTE ST372.

Figure 141B:
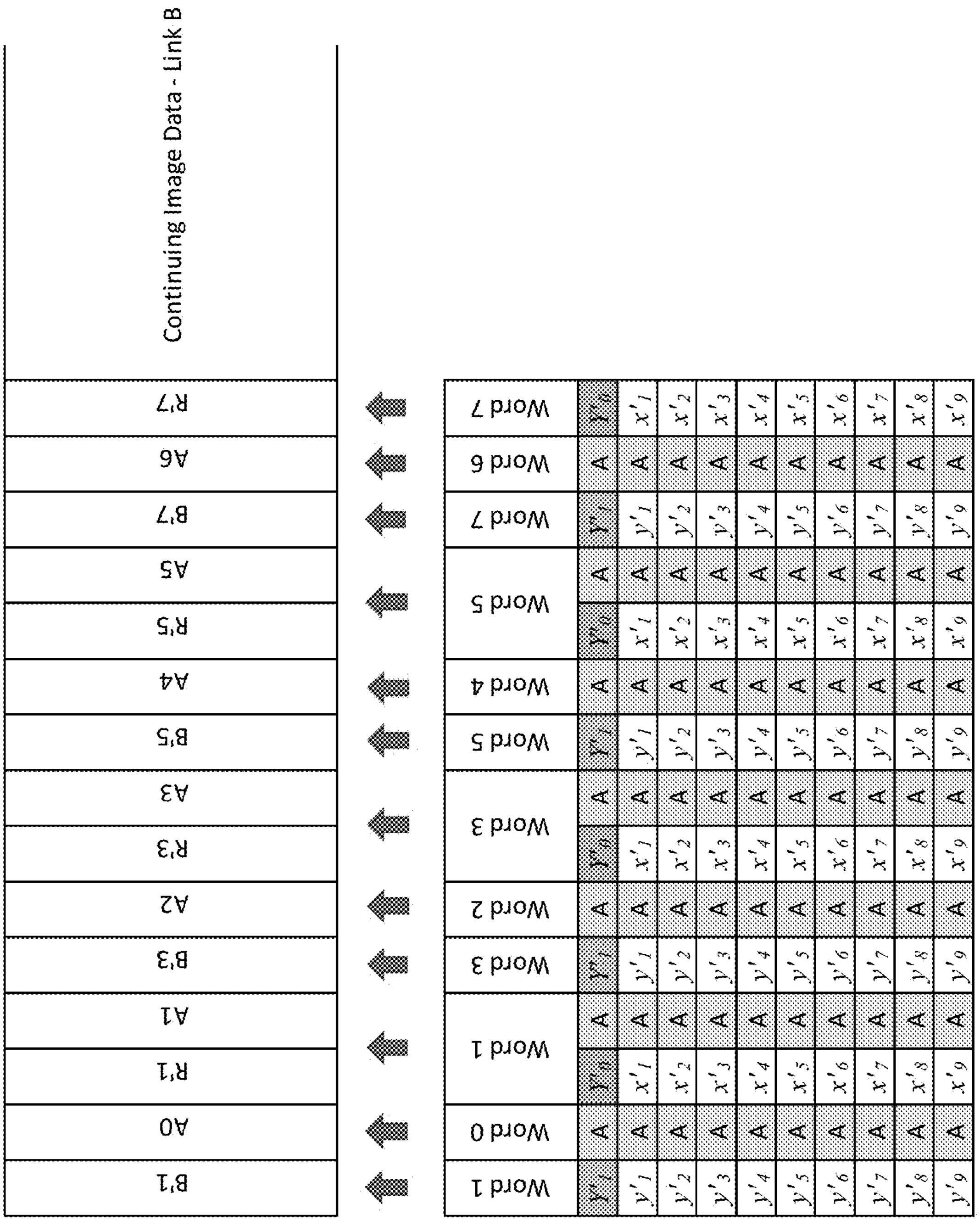

FIG. 141B illustrates one embodiment of a second link for a 12-bit into 10-bit shift for a Yxy 4:4:4 RGB encode as applied to SMPTE ST372.

Figure 141C:
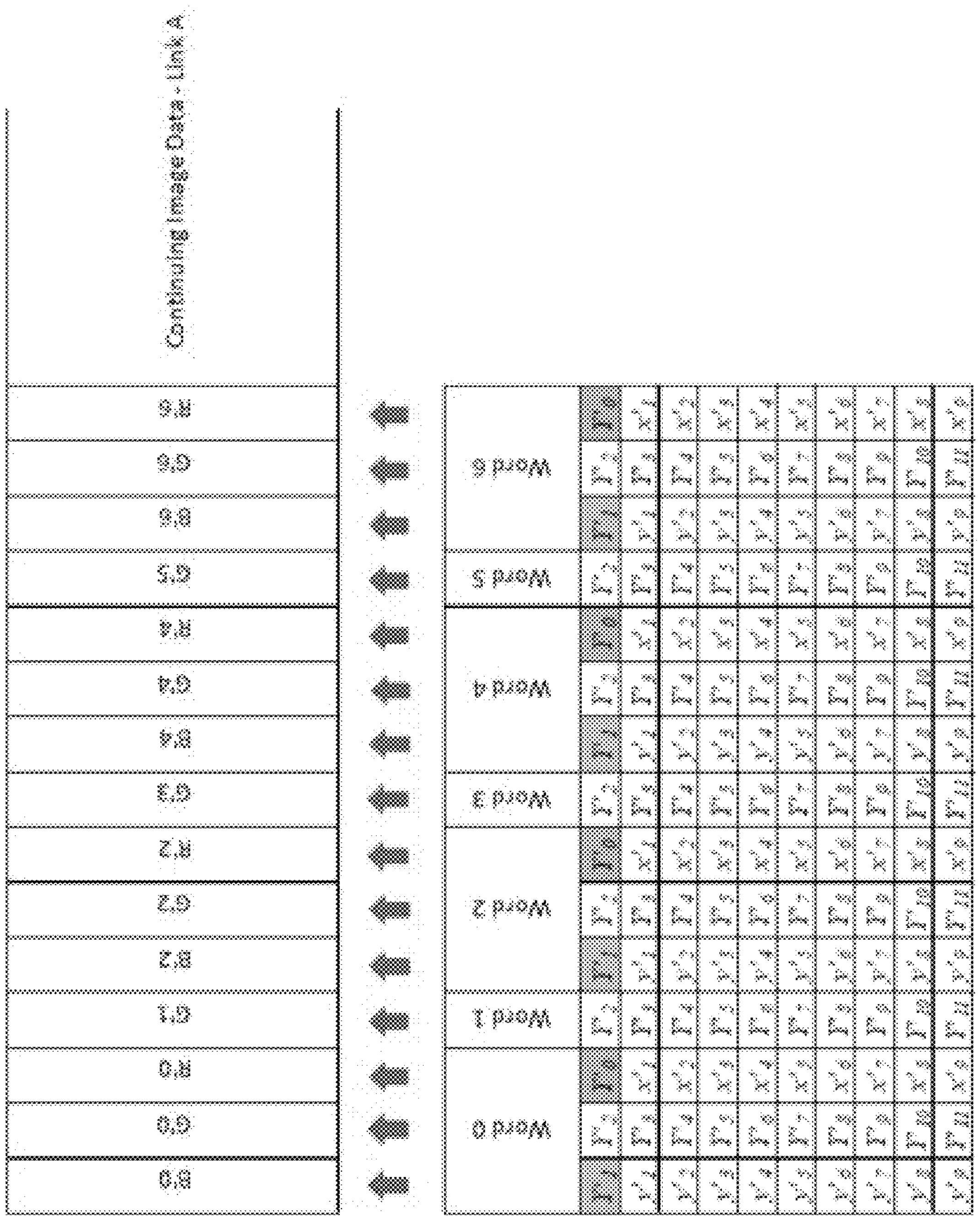

FIG. 141C illustrates one embodiment of a first link for a 12-bit into 10-bit shift for a Yu'v' 4:4:4 RGB encode as applied to SMPTE ST372.

Figure 141D:
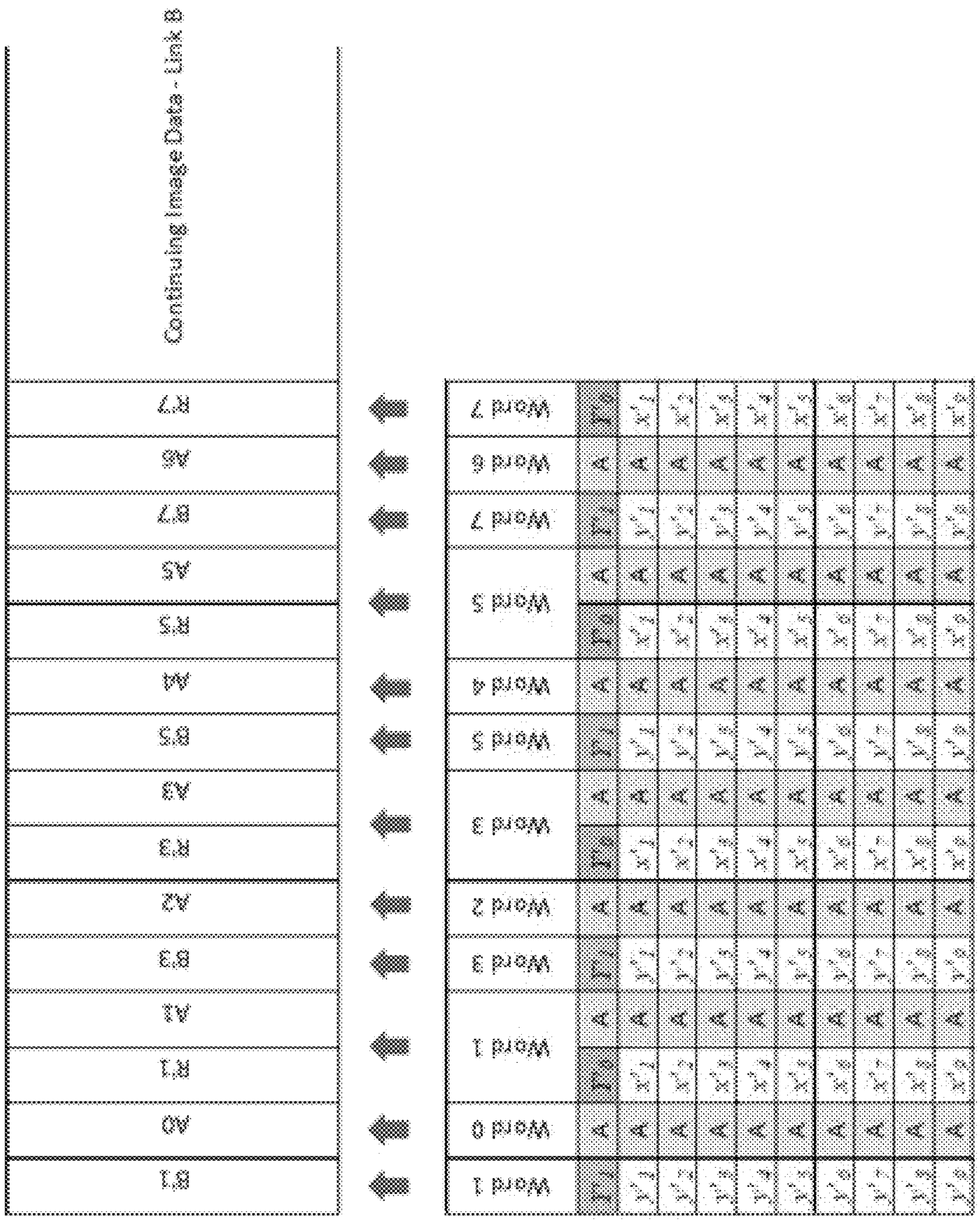

FIG. 141D illustrates one embodiment of a second link for a 12-bit into 10-bit shift for a Yu'v' 4:4:4 RGB encode as applied to SMPTE ST372.

Figure 142A:
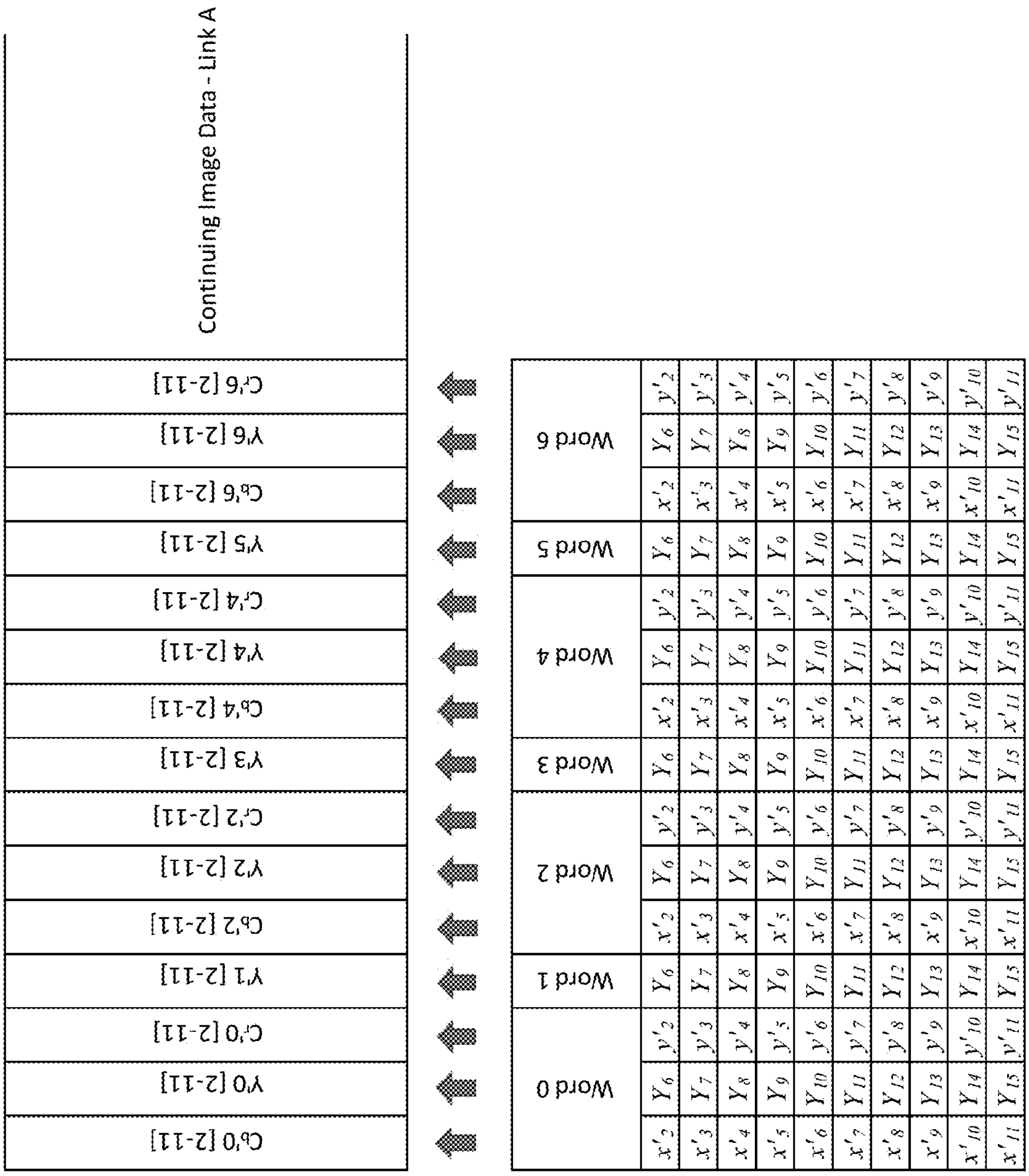

FIG. 142A illustrates one embodiment of a first link for a 16-bit into 12-bit shift for a Yxy 4:4:4 $YC_BC_R$ encode as applied to SMPTE ST372.

Figure 142B:
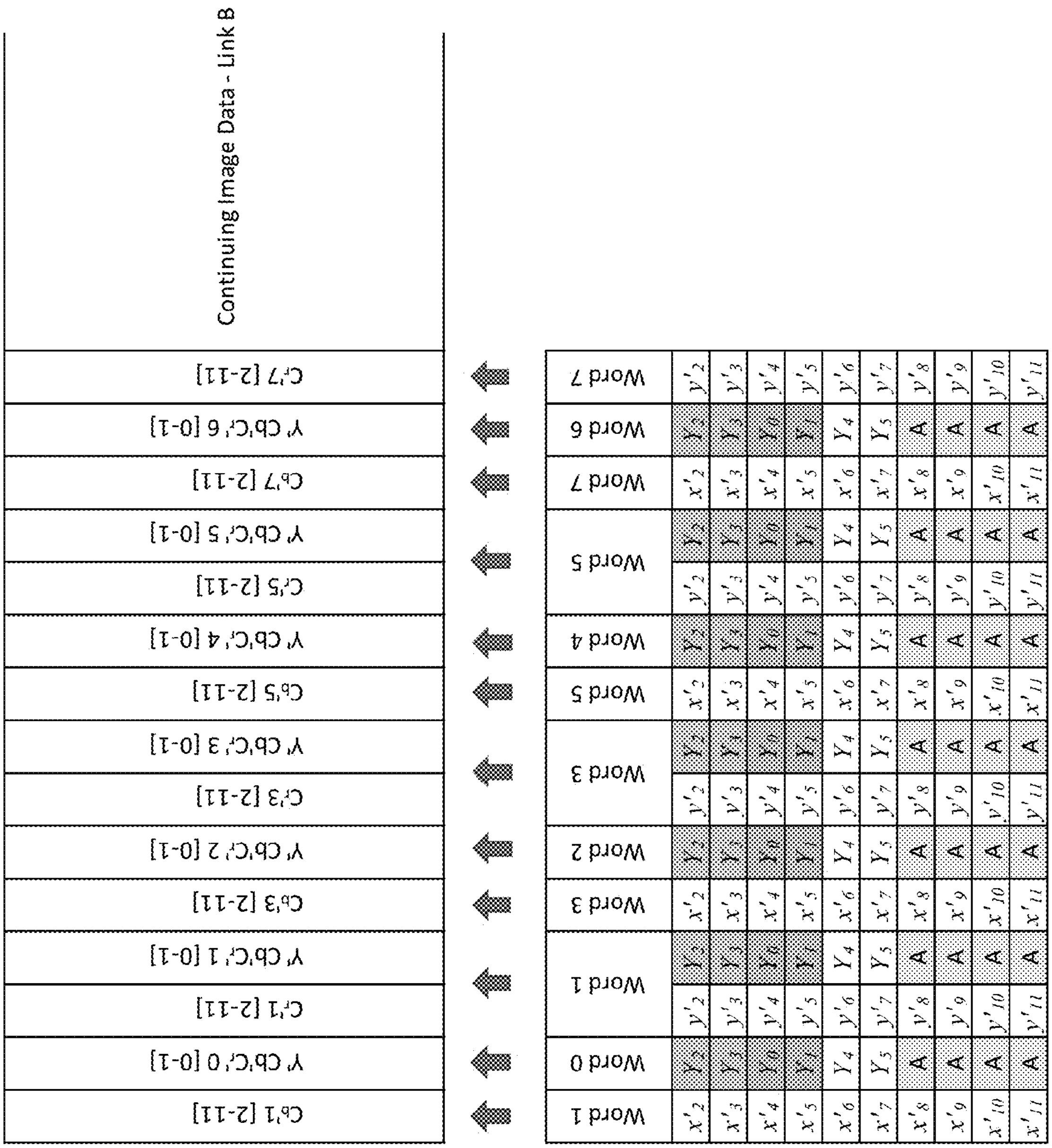

FIG. 142B illustrates one embodiment of a second link for a 16-bit into 12-bit shift for a Yxy 4:4:4 $YC_BC_R$ encode as applied to SMPTE ST372.

Figure 142C:
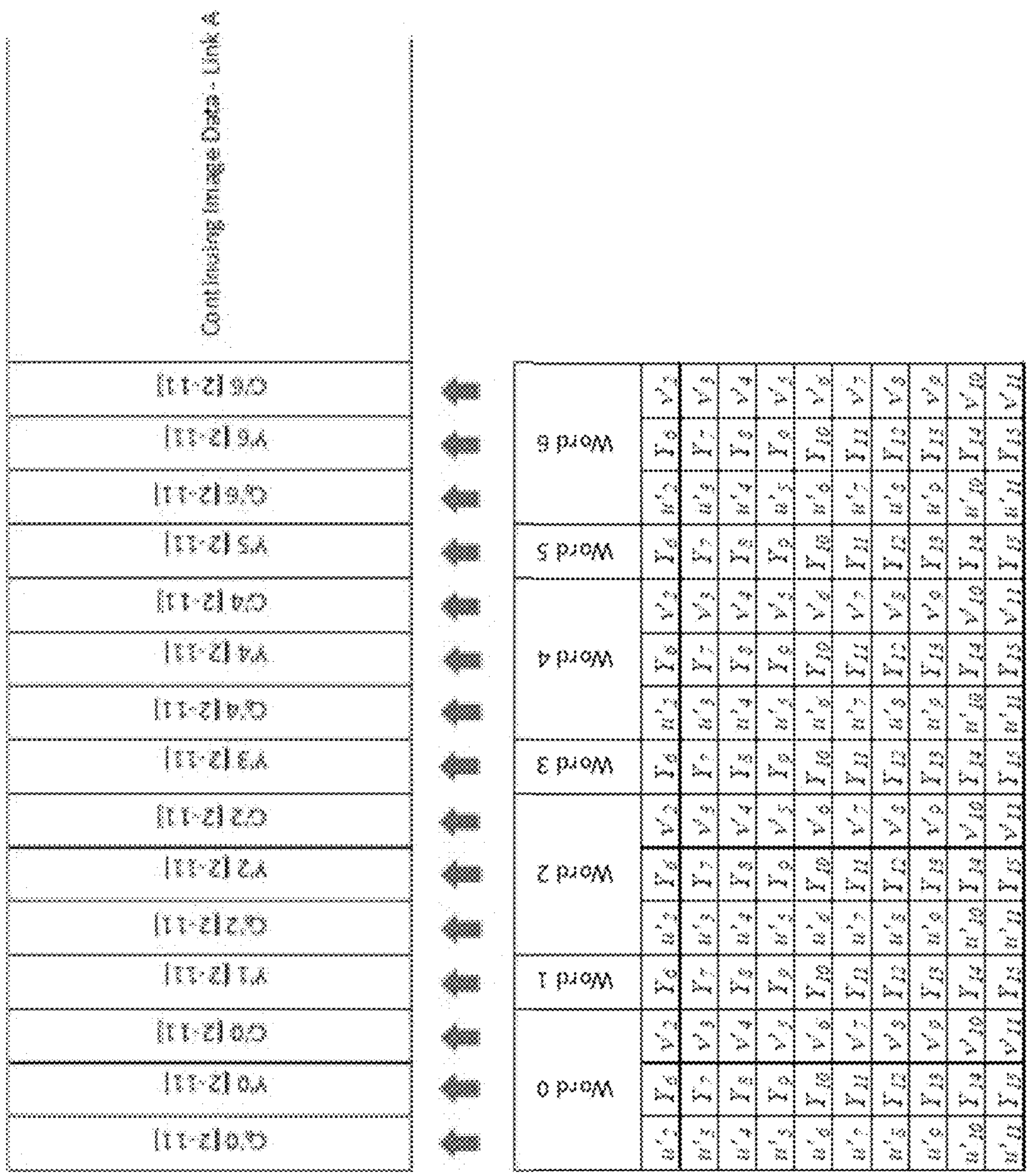

FIG. 142C illustrates one embodiment of a first link for a 16-bit into 12-bit shift for a Yu'v' 4:4:4 $YC_BC_R$ encode as applied to SMPTE ST372.

Figure 142D:
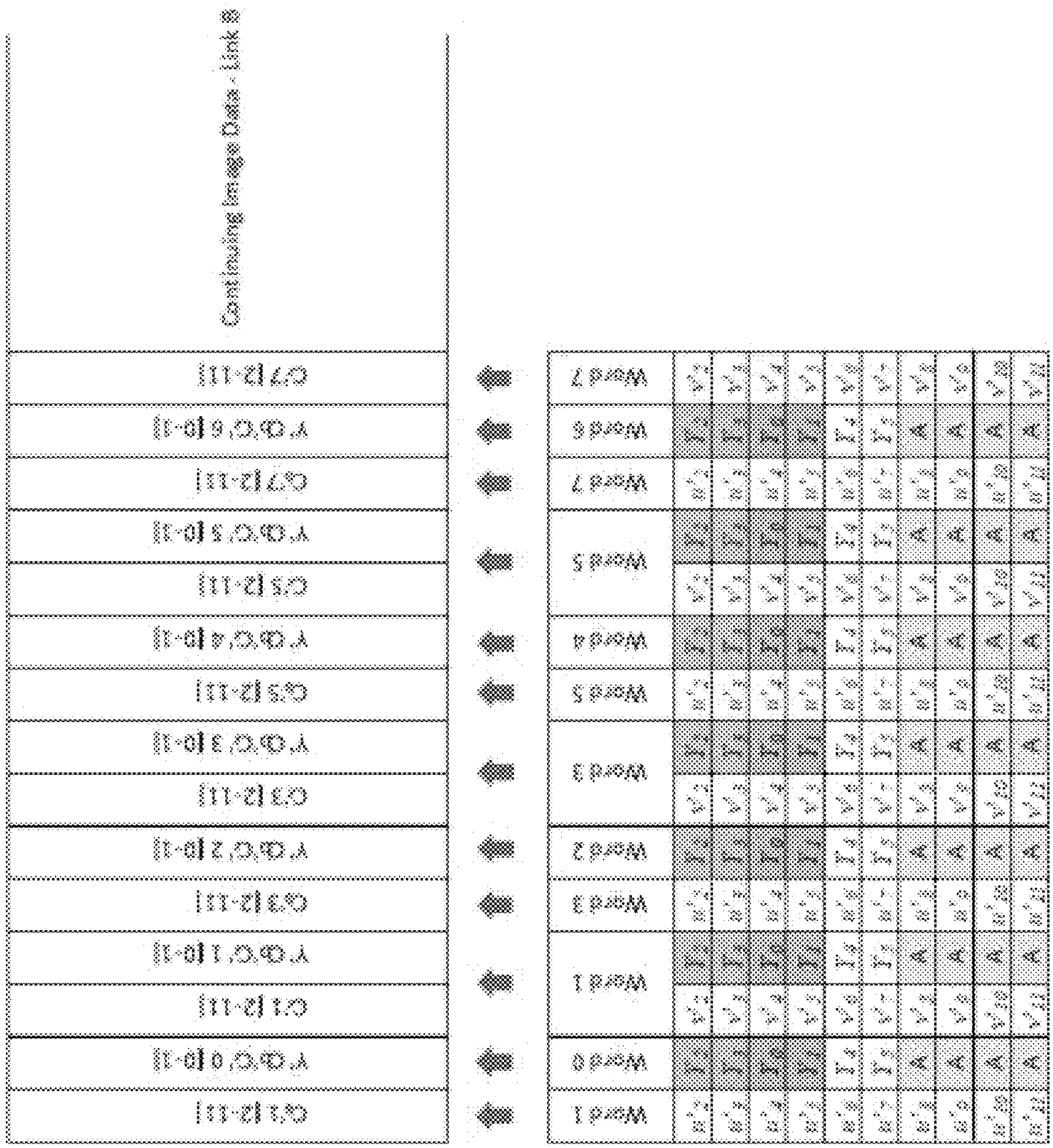

FIG. 142D illustrates one embodiment of a second link for a 16-bit into 12-bit shift for a Yu'v' 4:4:4 $YC_BC_R$ encode as applied to SMPTE ST372.

Figure 143A:
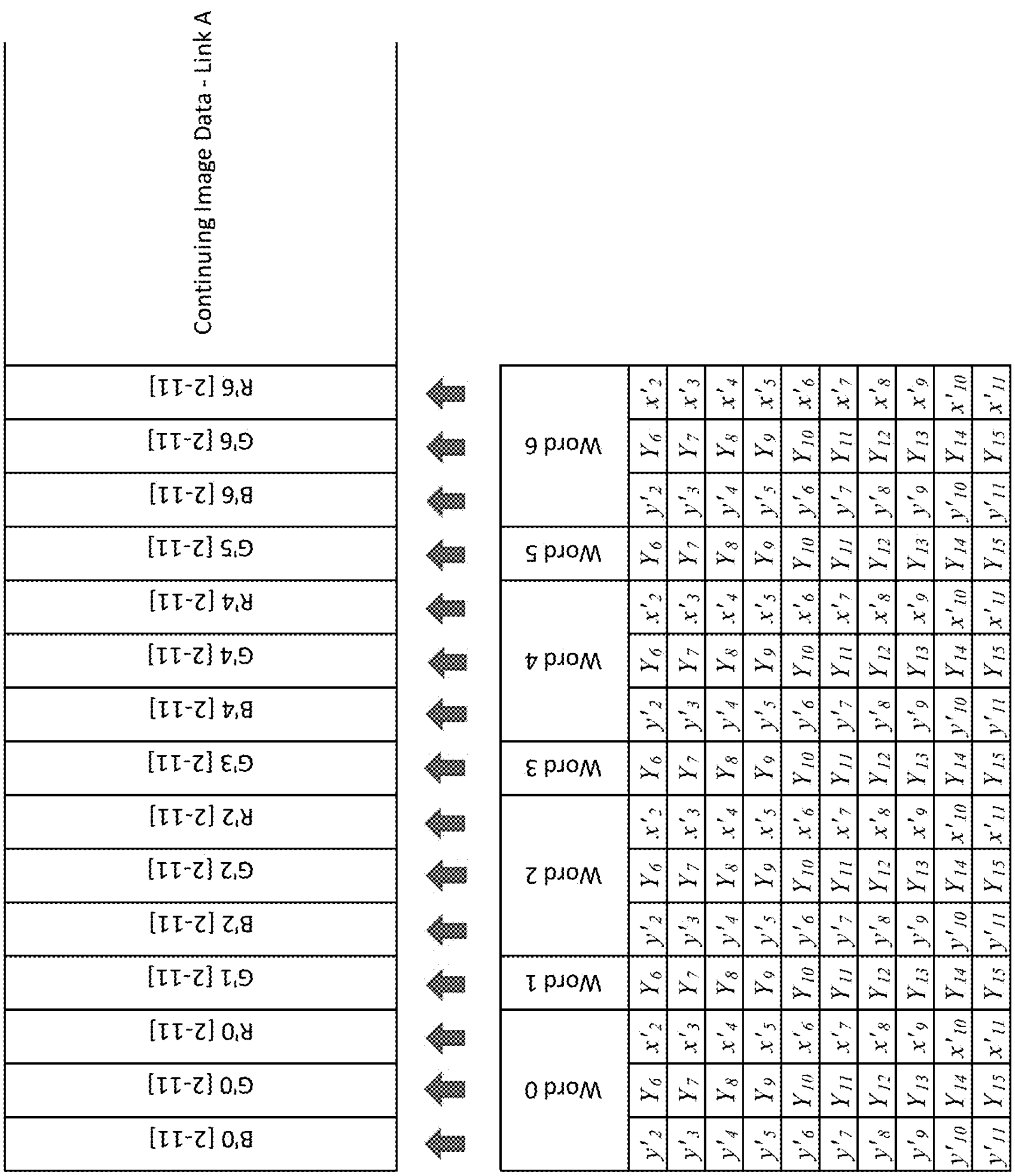

FIG. 143A illustrates one embodiment of a first link for a 16-bit into 12-bit shift for a Yxy 4:4:4 RGB encode as applied to SMPTE ST372.

Figure 143B:
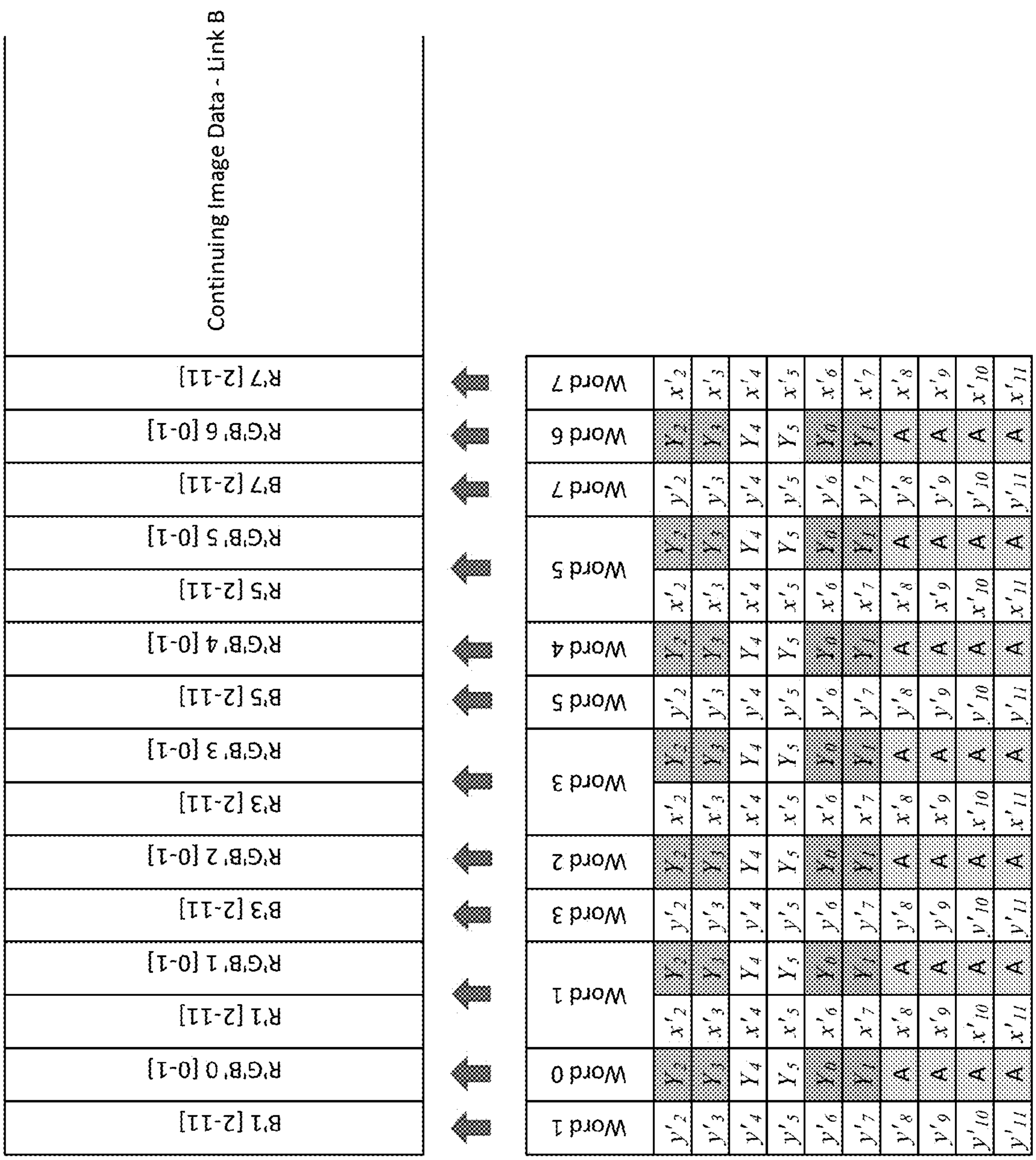

FIG. 143B illustrates one embodiment of a second link for a 16-bit into 12-bit shift for a Yxy 4:4:4 RGB encode as applied to SMPTE ST372.

Figure 143C:
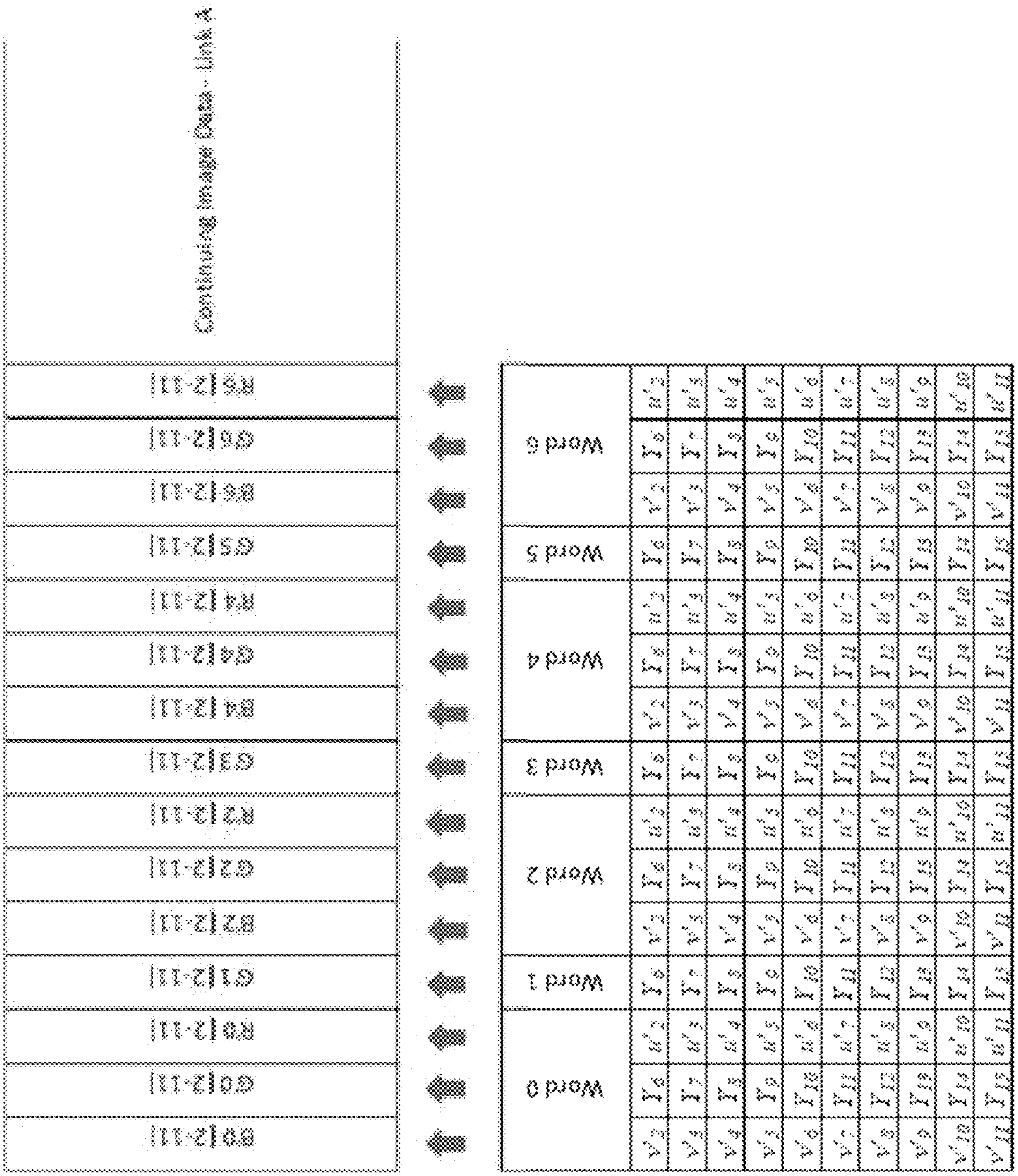

FIG. 143C illustrates one embodiment of a first link for a 16-bit into 12-bit shift for a Yu'v' 4:4:4 RGB encode as applied to SMPTE ST372.

Figure 143D:
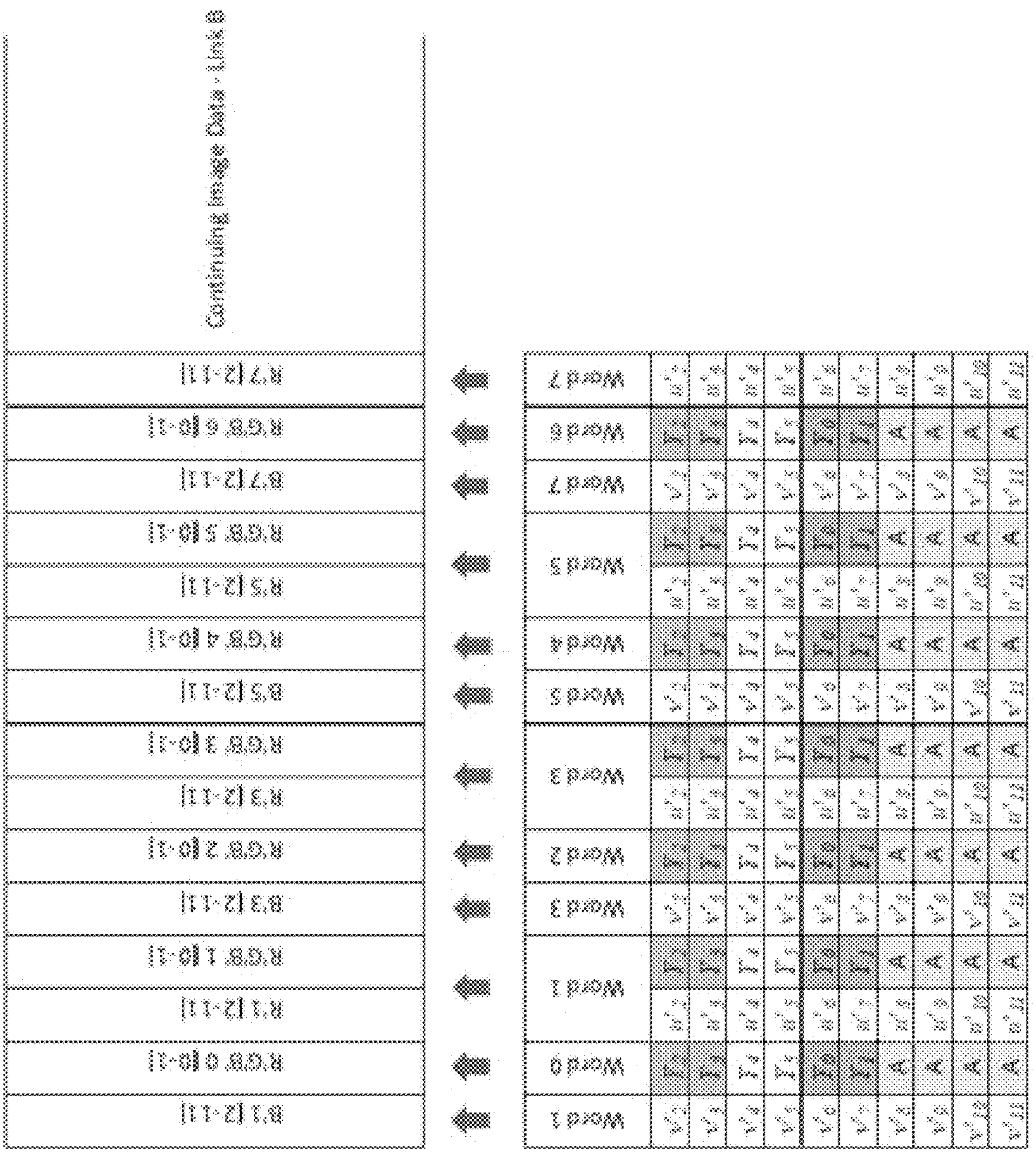

FIG. 143D illustrates one embodiment of a second link for a 16-bit into 12-bit shift for a Yu'v' 4:4:4 RGB encode as applied to SMPTE ST372.

Figure 144A:
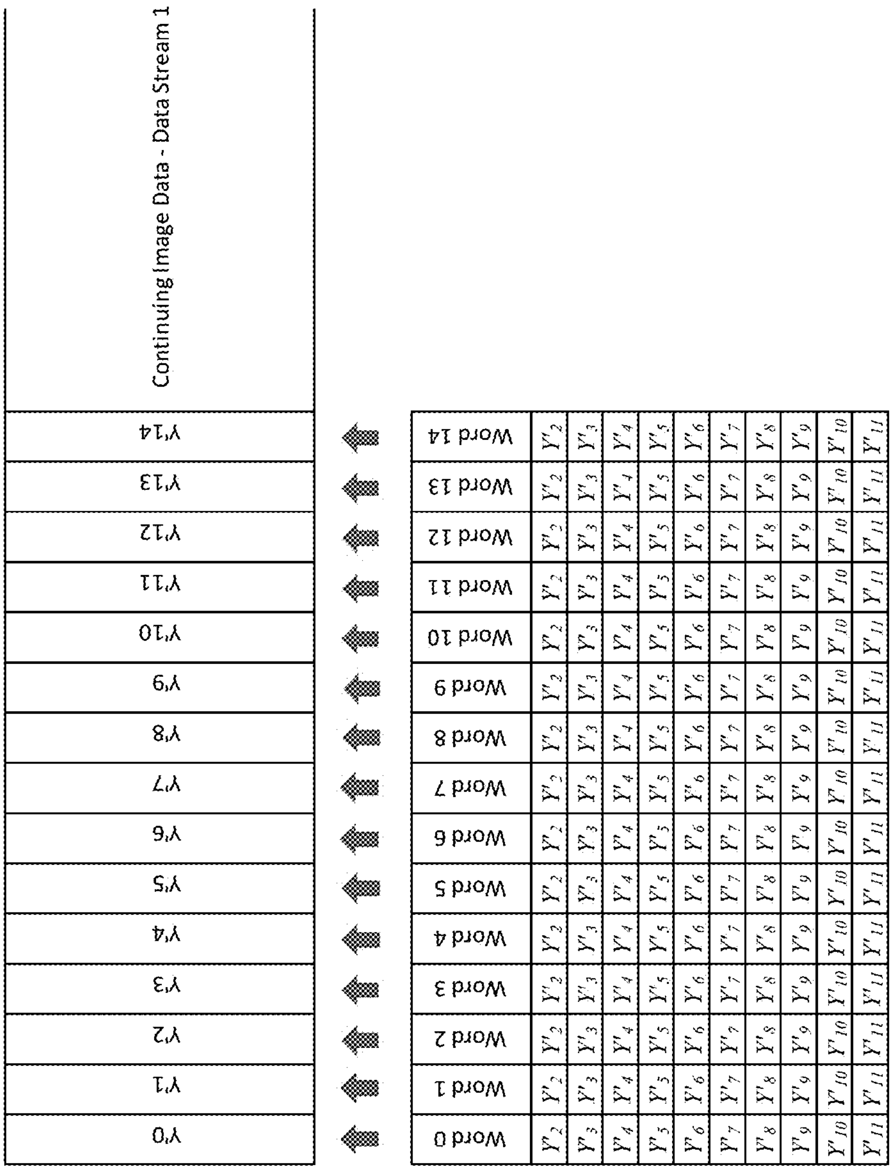

FIG. 144A illustrates one embodiment of a first data stream for a 12-bit into 10-bit shift for a Yxy 4:2:2 Level A encode as applied to SMPTE ST425.

Figure 144B:
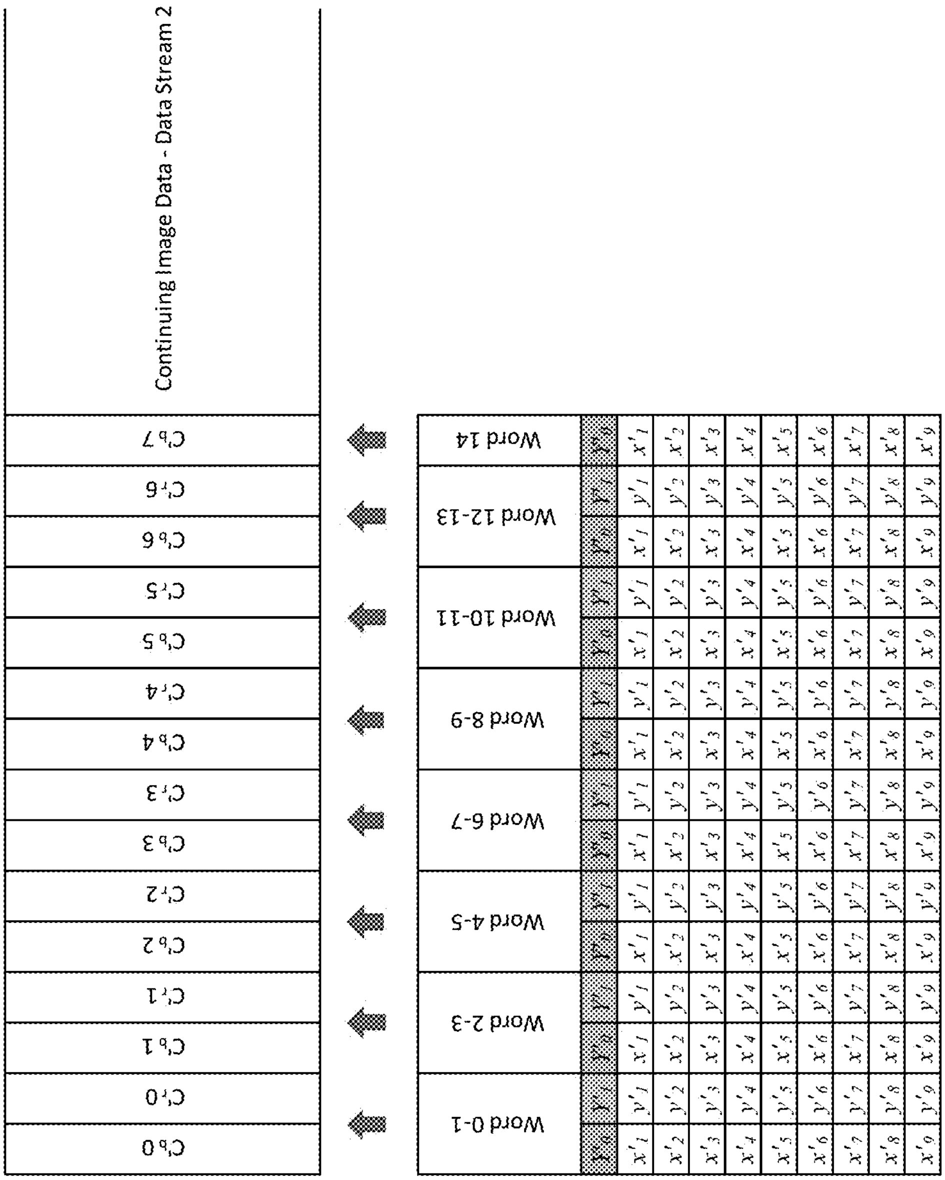

FIG. 144B illustrates one embodiment of a second data stream for a 12-bit into 10-bit shift for a Yxy 4:2:2 Level A encode as applied to SMPTE ST425.

Figure 144C:
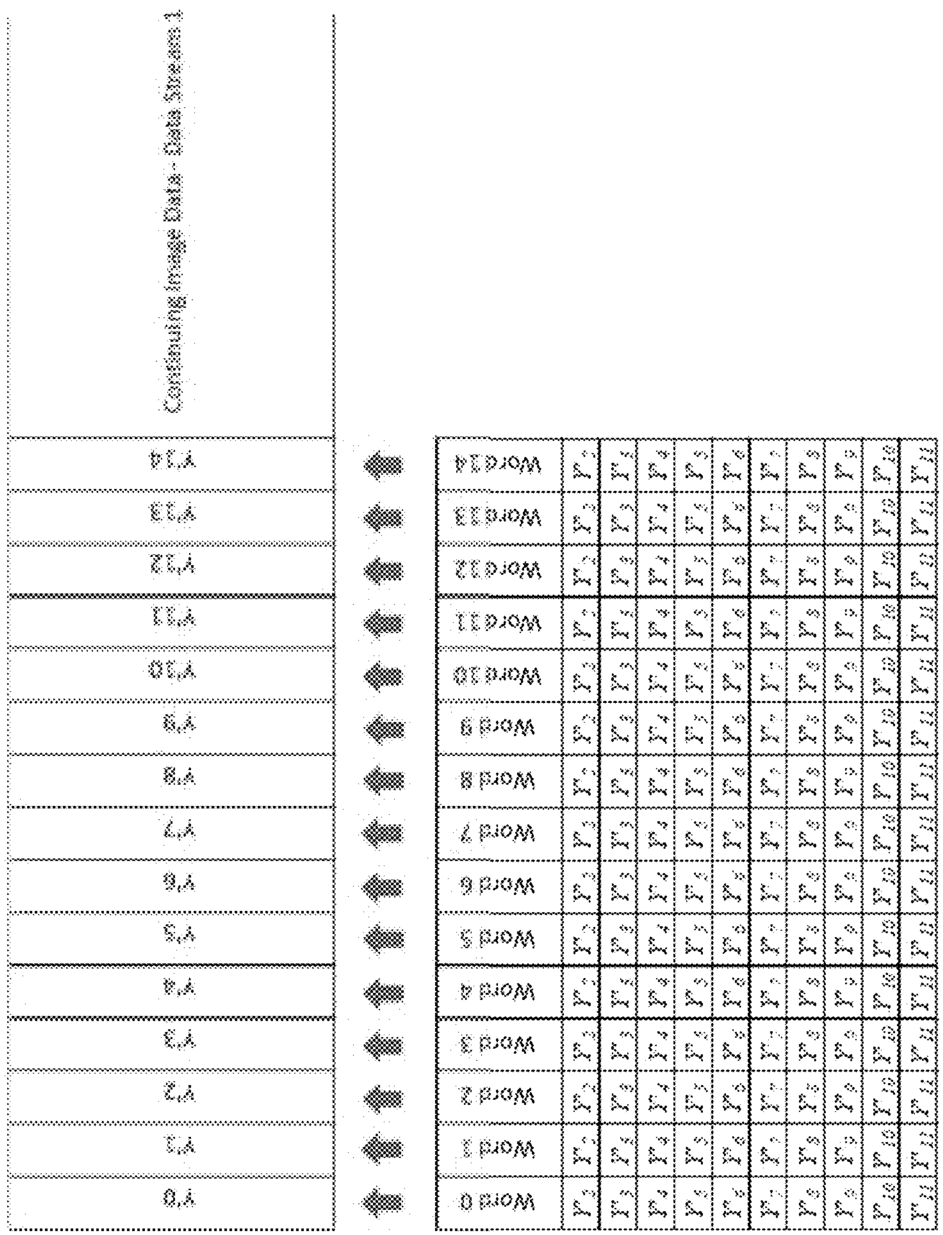

FIG. 144C illustrates one embodiment of a first data stream for a 12-bit into 10-bit shift for a Yu'v' 4:2:2 Level A encode as applied to SMPTE ST425.

Figure 144D:
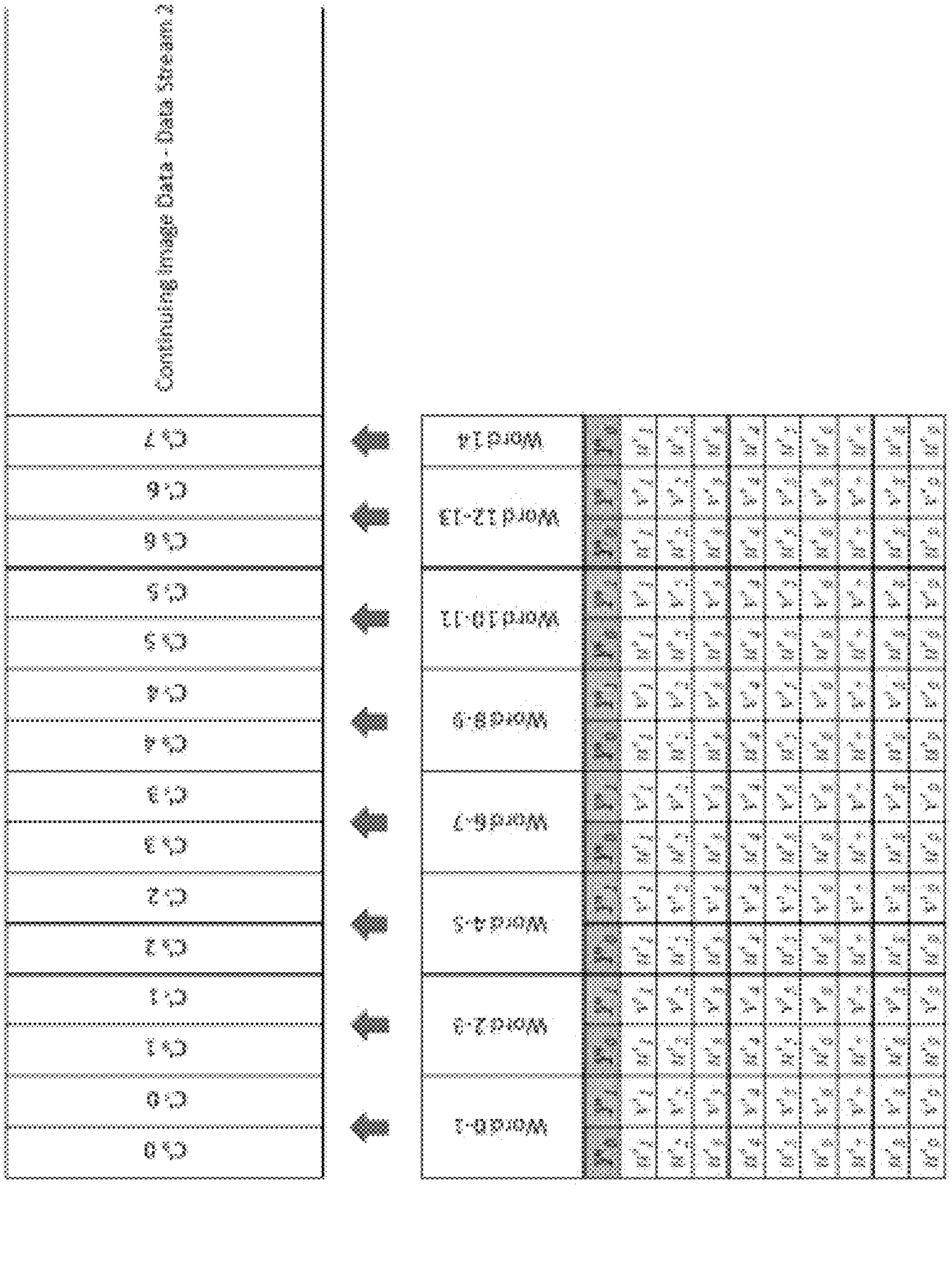

FIG. 144D illustrates one embodiment of a second data stream for a 12-bit into 10-bit shift for a Yu'v' 4:2:2 Level A encode as applied to SMPTE ST425.

Figure 145A:
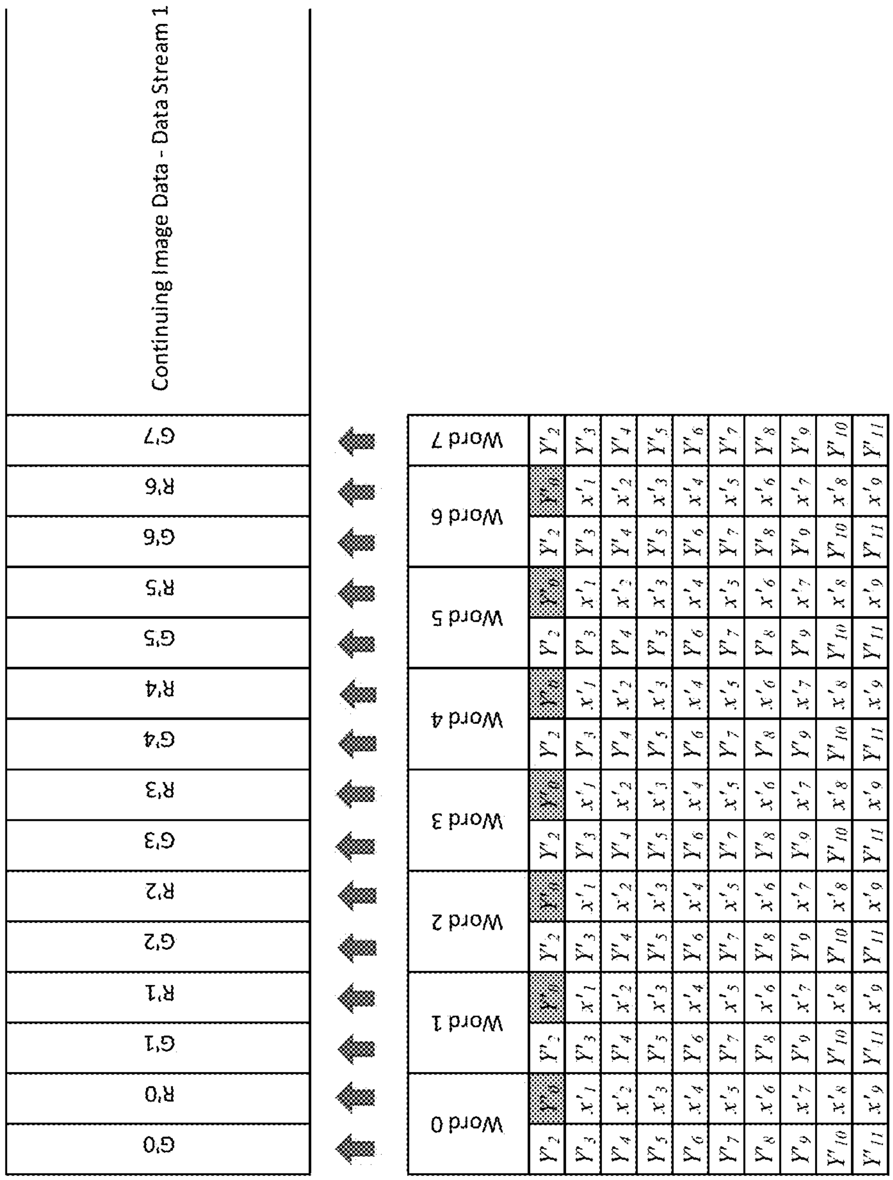

FIG. 145A illustrates one embodiment of a first data stream for a 12-bit into 10-bit shift for a Yxy 4:4:4 Level A encode as applied to SMPTE ST425.

Figure 145B:
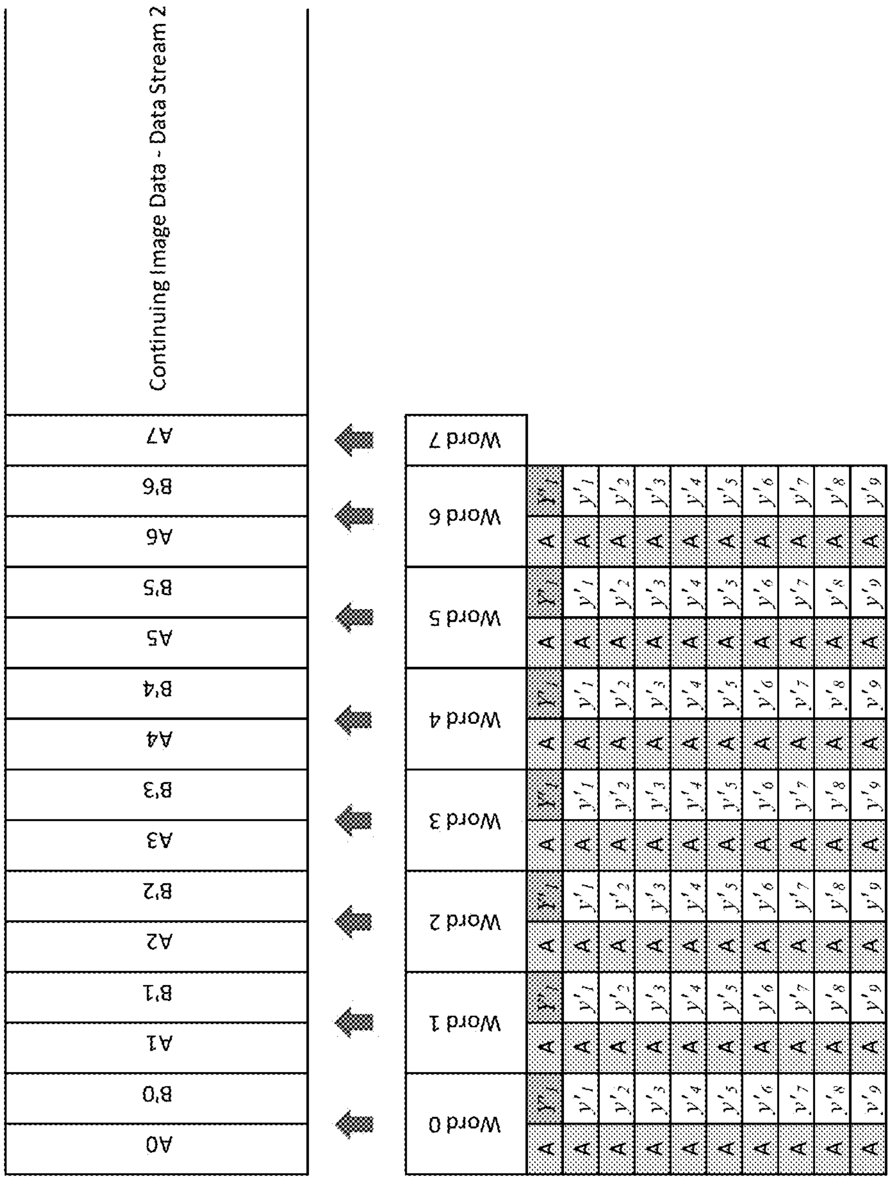

FIG. 145B illustrates one embodiment of a second data stream for a 12-bit into 10-bit shift for a Yxy 4:4:4 Level A encode as applied to SMPTE ST425.

Figure 145C:
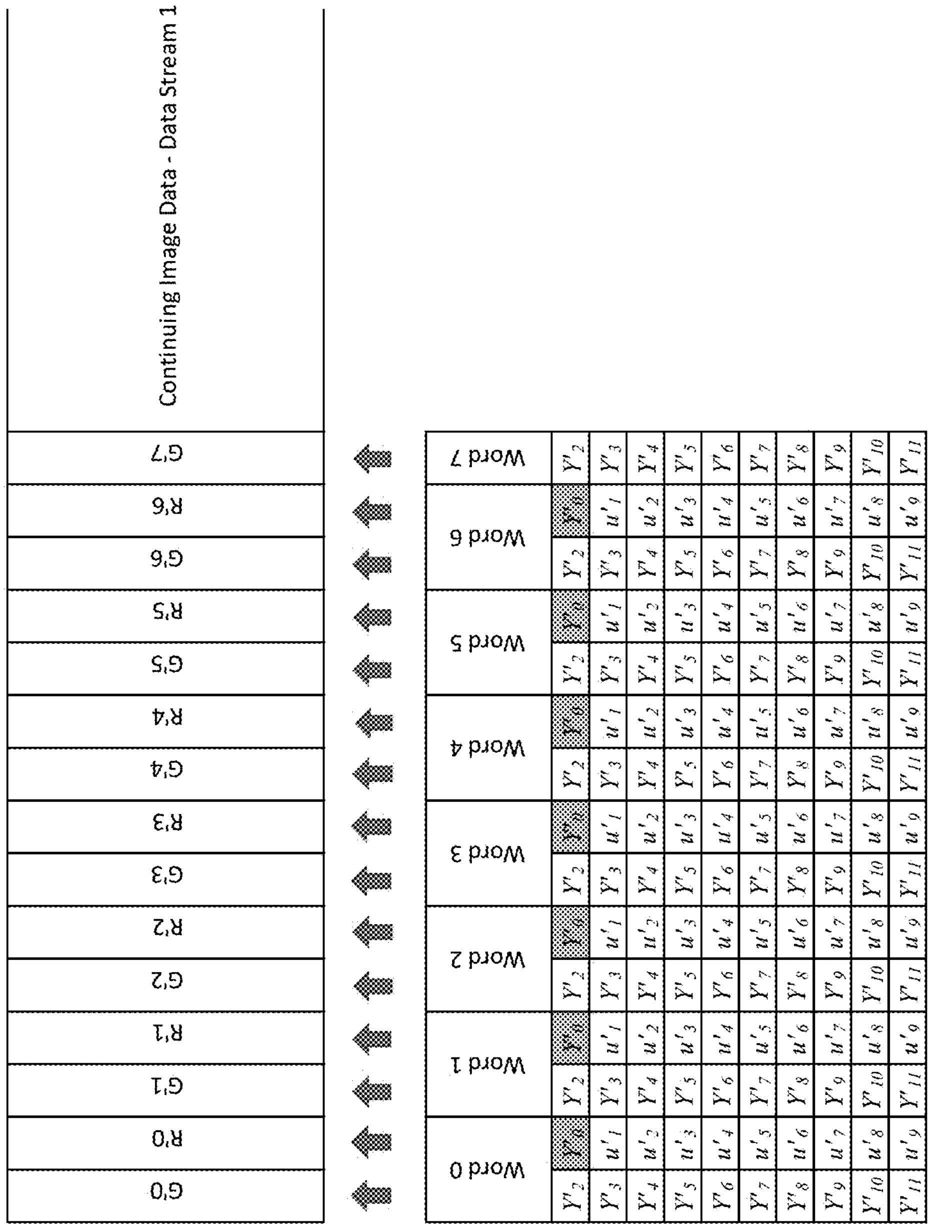

FIG. 145C illustrates one embodiment of a first data stream for a 12-bit into 10-bit shift for a Yu'v' 4:4:4 Level A encode as applied to SMPTE ST425.

Figure 145D:
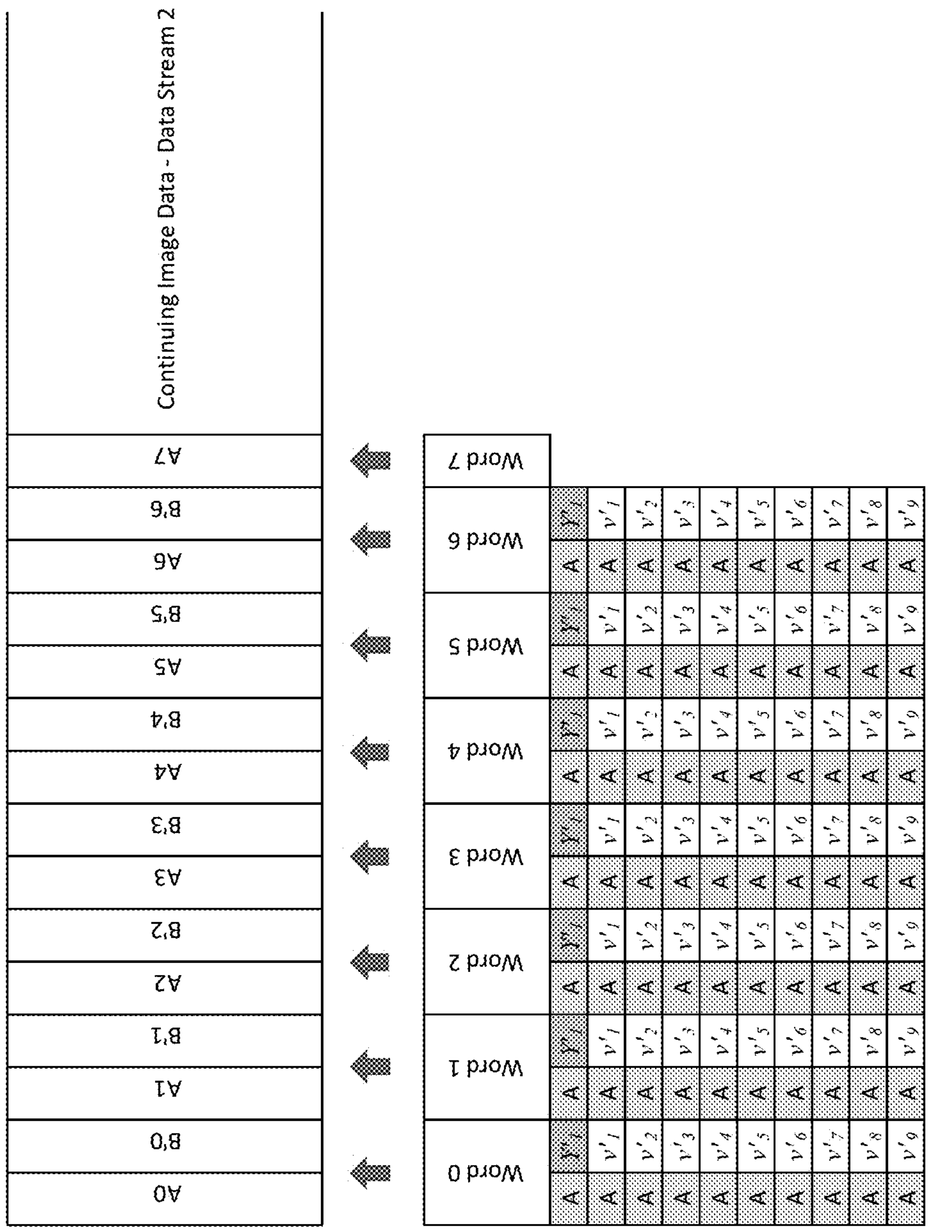

FIG. 145D illustrates one embodiment of a second data stream for a 12-bit into 10-bit shift for a Yu'v' 4:4:4 Level A encode as applied to SMPTE ST425.

Figure 146A:
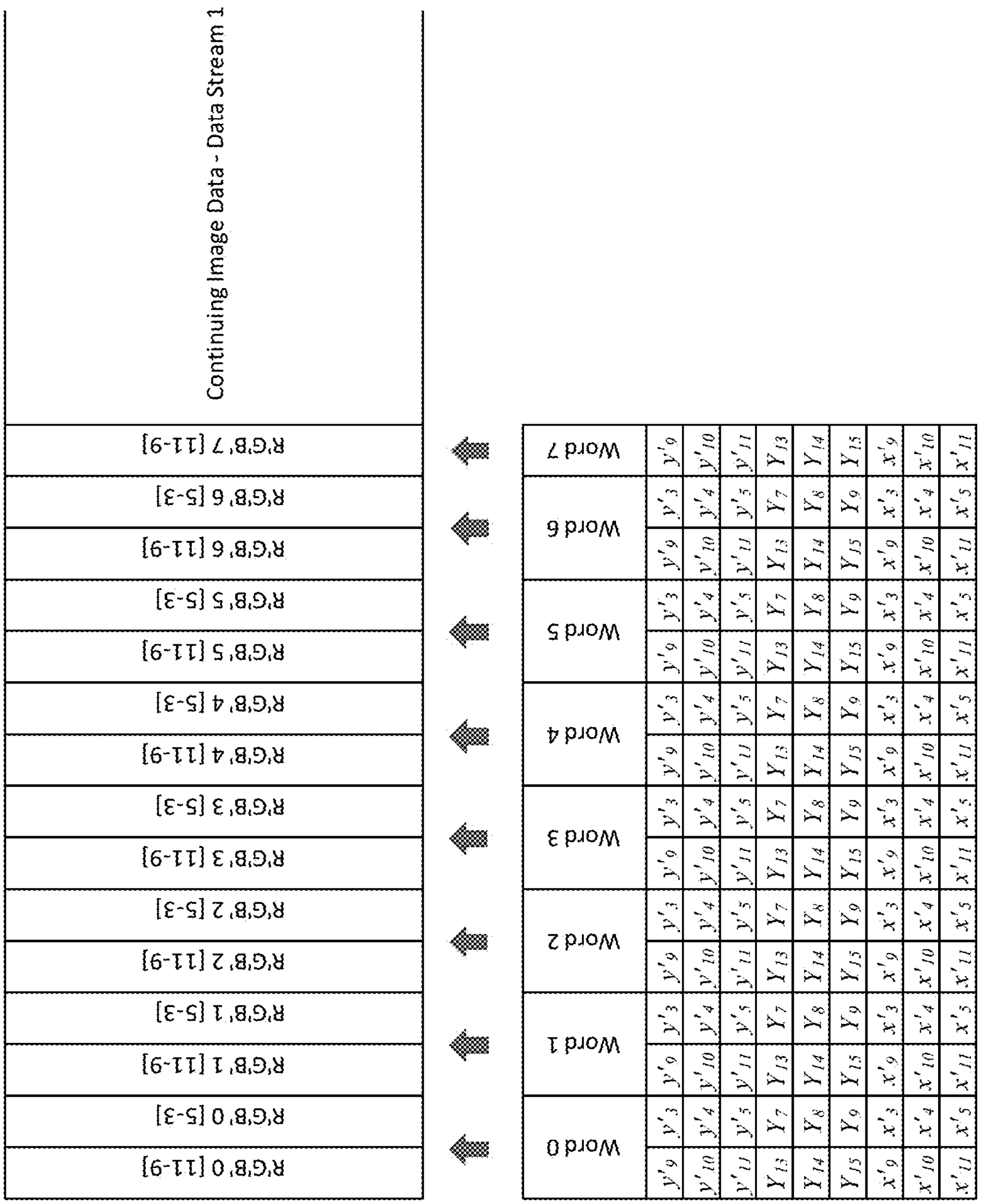

FIG. 146A illustrates one embodiment of a first data stream for a 16-bit into 12-bit shift for a Yxy 4:4:4 Level A encode as applied to SMPTE ST425.

Figure 146B:
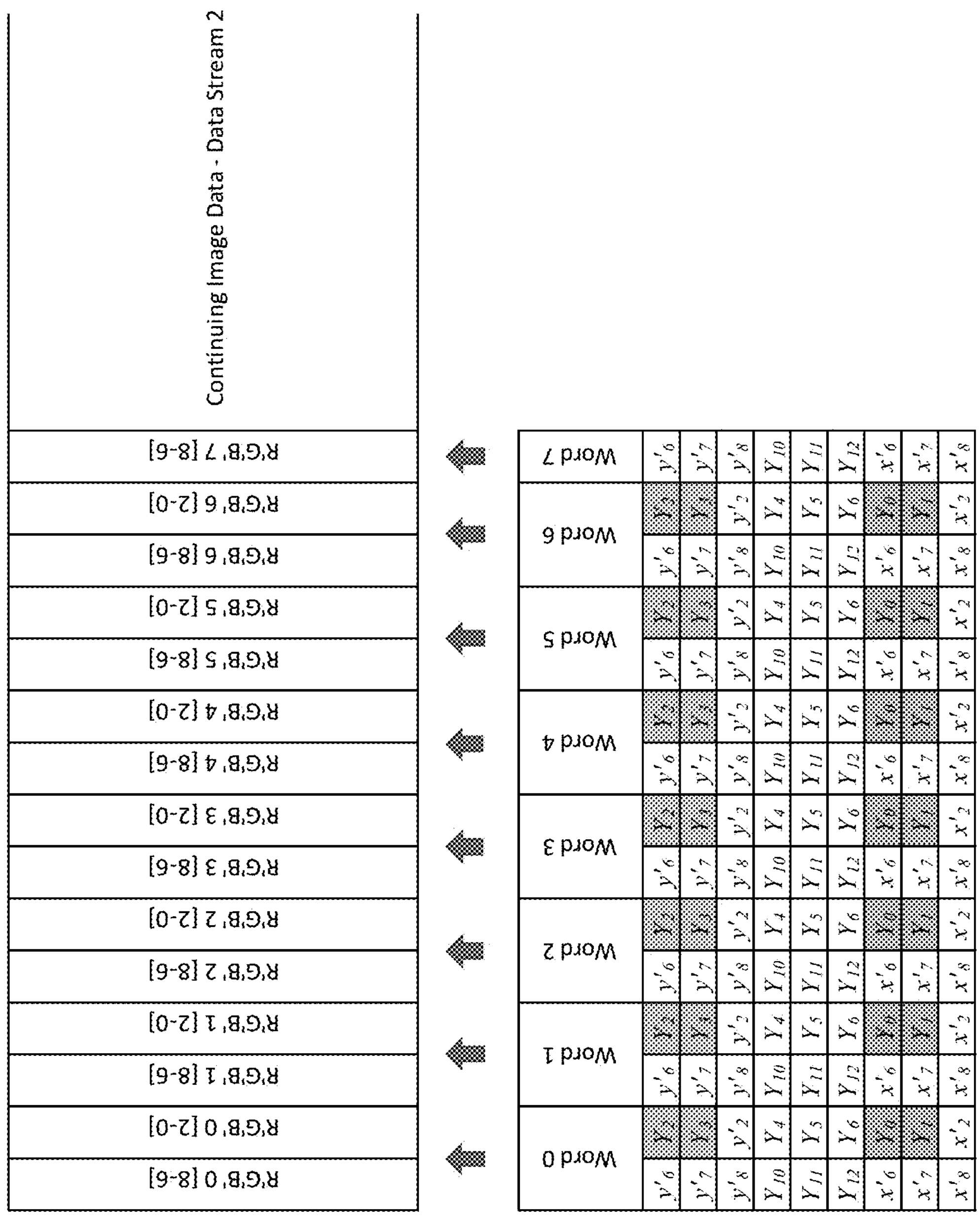

FIG. 146B illustrates one embodiment of a second data stream for a 16-bit into 12-bit shift for a Yxy 4:4:4 Level A encode as applied to SMPTE ST425.

Figure 146C:
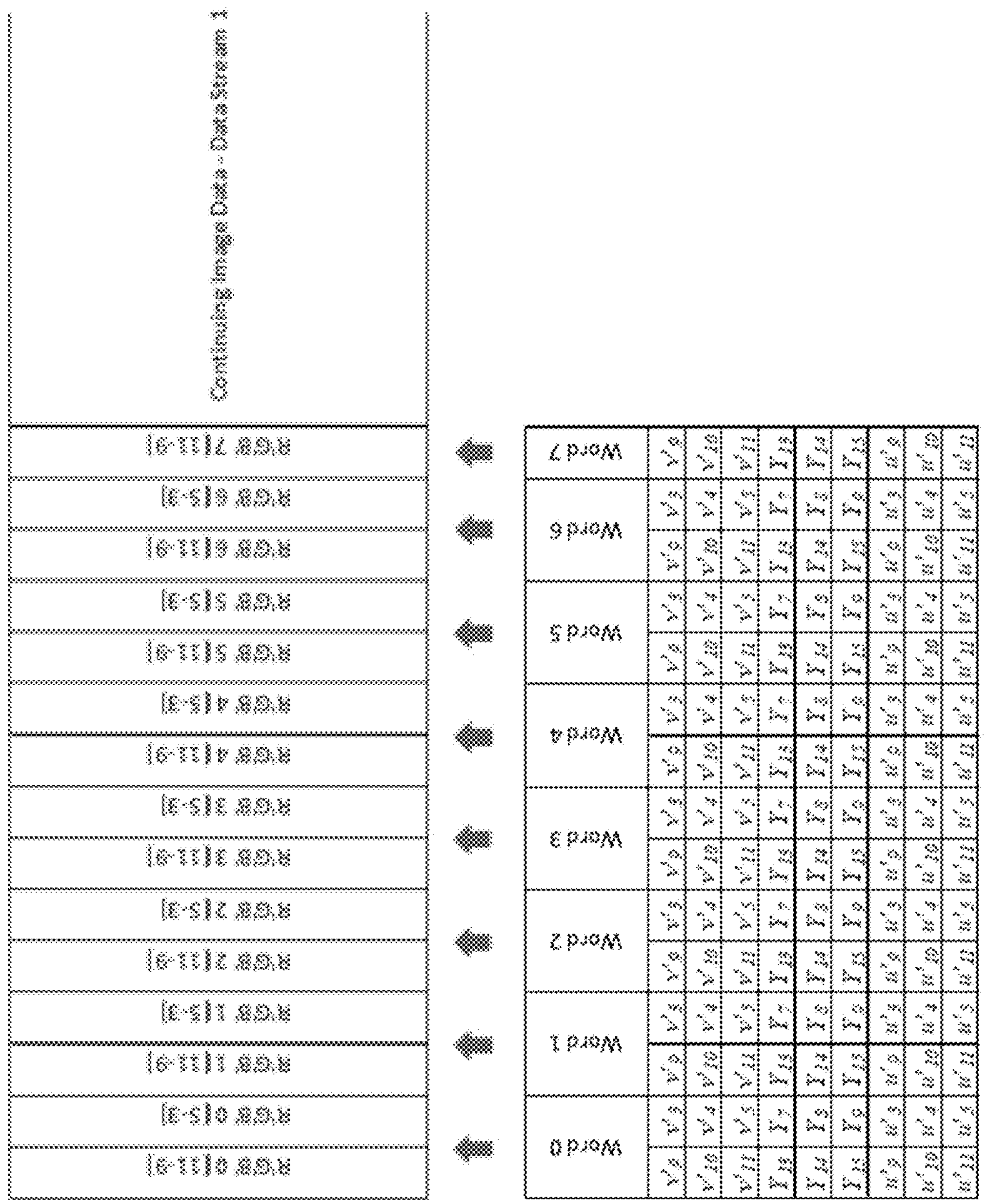

FIG. 146C illustrates one embodiment of a first data stream for a 16-bit into 12-bit shift for a Yu'v' 4:4:4 Level A encode as applied to SMPTE ST425.

Figure 146D:
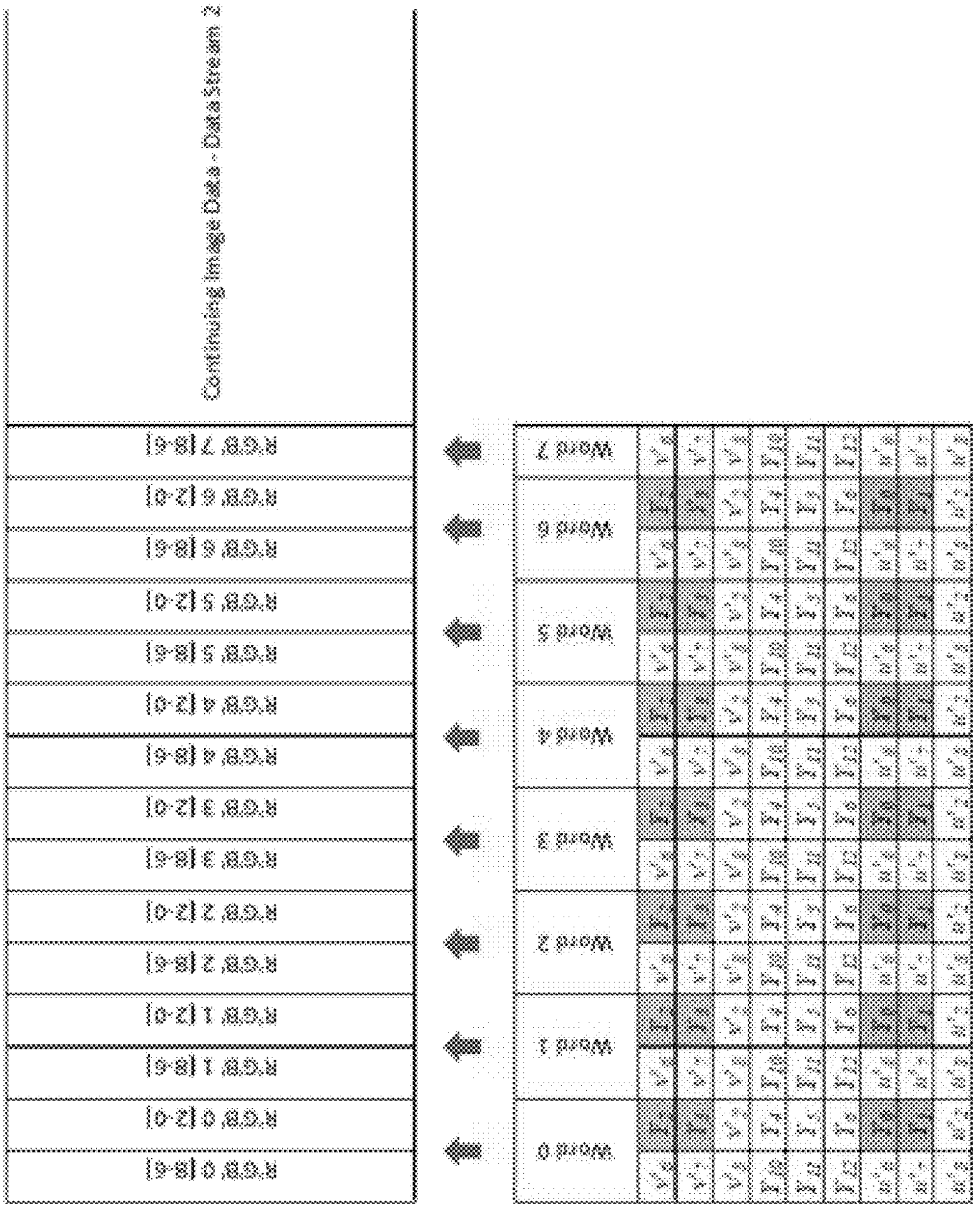

FIG. 146D illustrates one embodiment of a second data stream for a 16-bit into 12-bit shift for a Yu'v' 4:4:4 Level A encode as applied to SMPTE ST425.

Figure 147A:
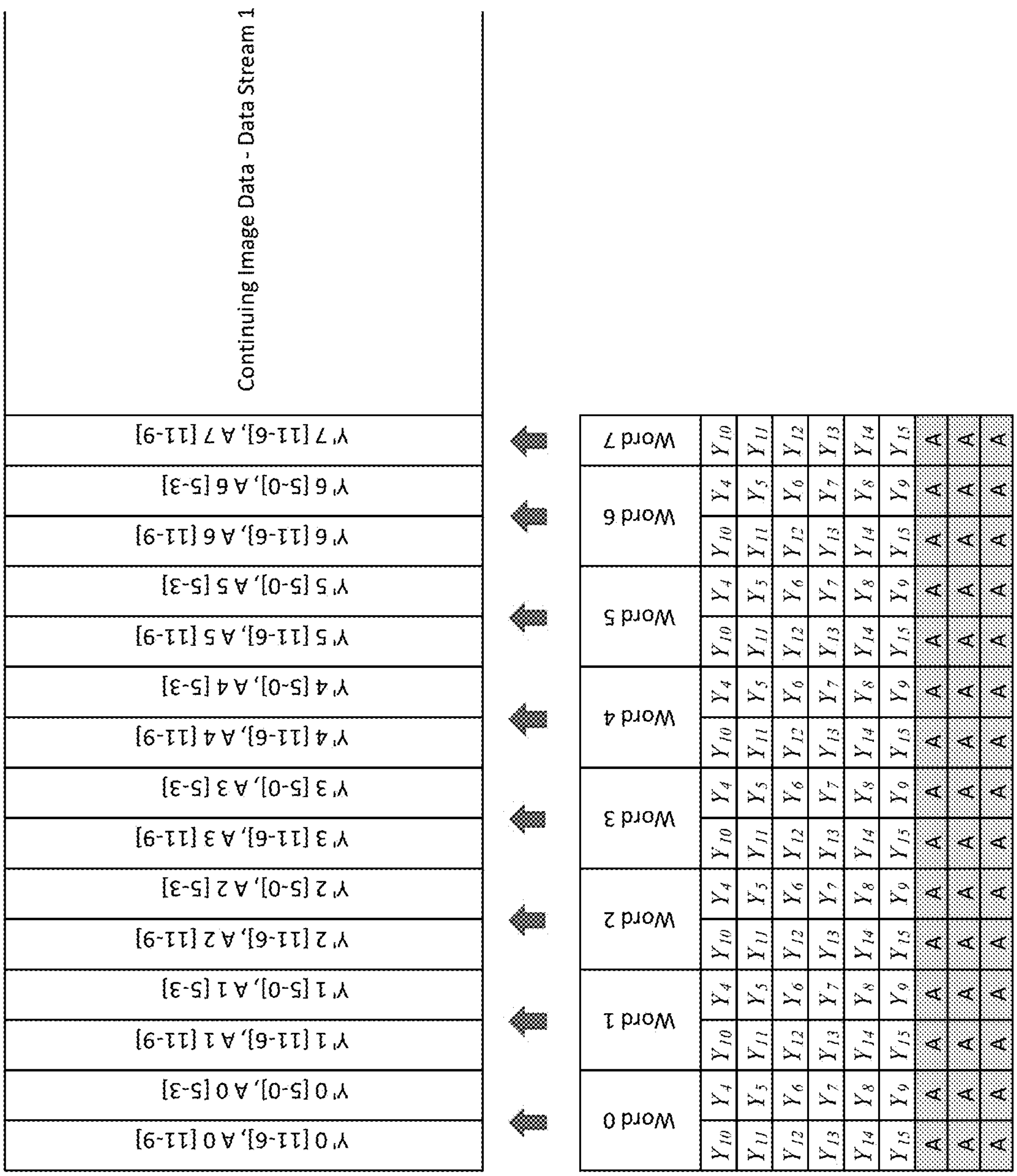

FIG. 147A illustrates one embodiment of a first data stream for a 16-bit into 12-bit shift for a Yxy 4:2:2 Level A encode as applied to SMPTE ST425.

Figure 147B:
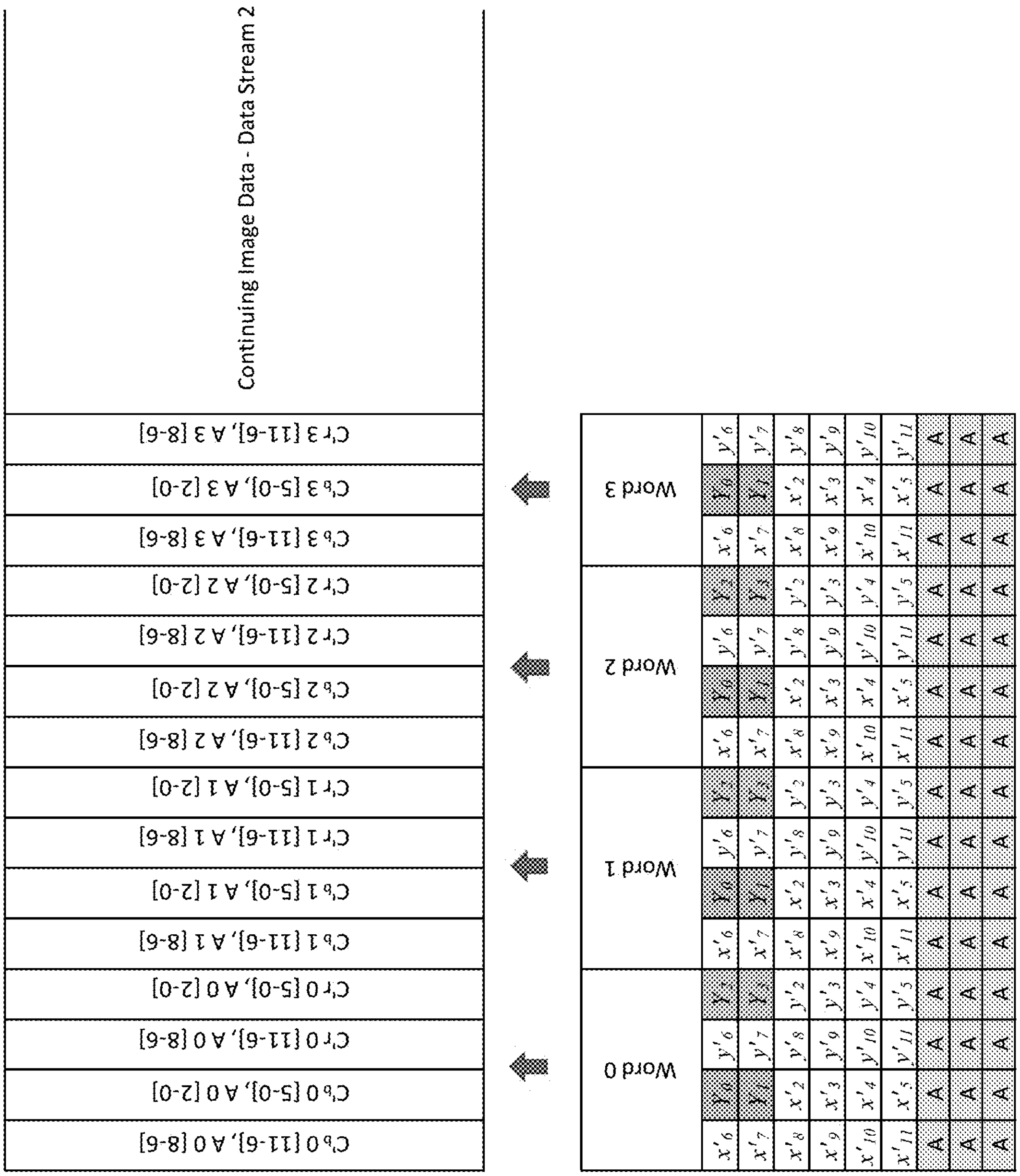

FIG. 147B illustrates one embodiment of a second data stream for a 16-bit into 12-bit shift for a Yxy 4:2:2 Level A encode as applied to SMPTE ST425.

Figure 147C:
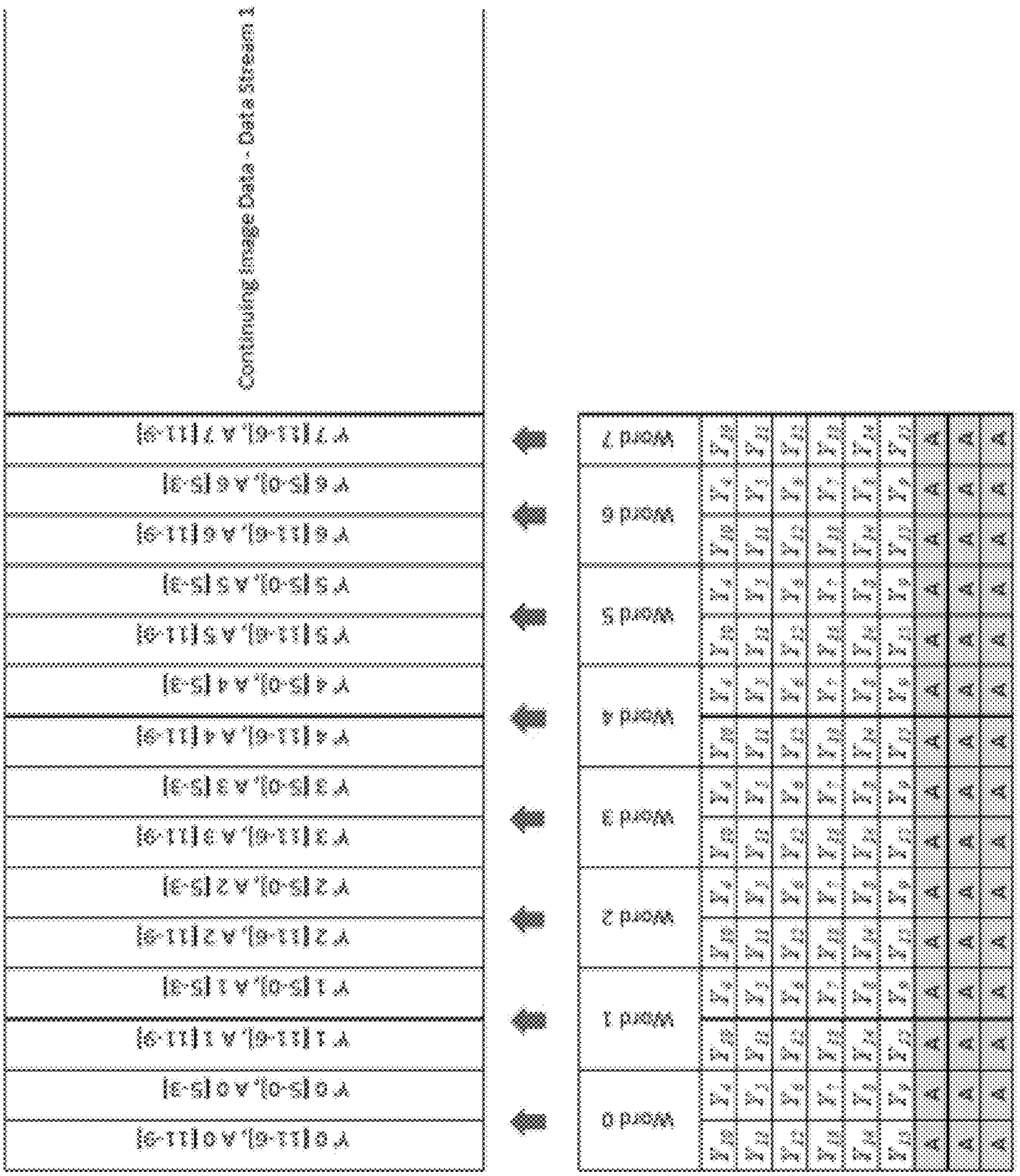

FIG. 147C illustrates one embodiment of a first data stream for a 16-bit into 12-bit shift for a Yu'v' 4:2:2 Level A encode as applied to SMPTE ST425.

Figure 147D:
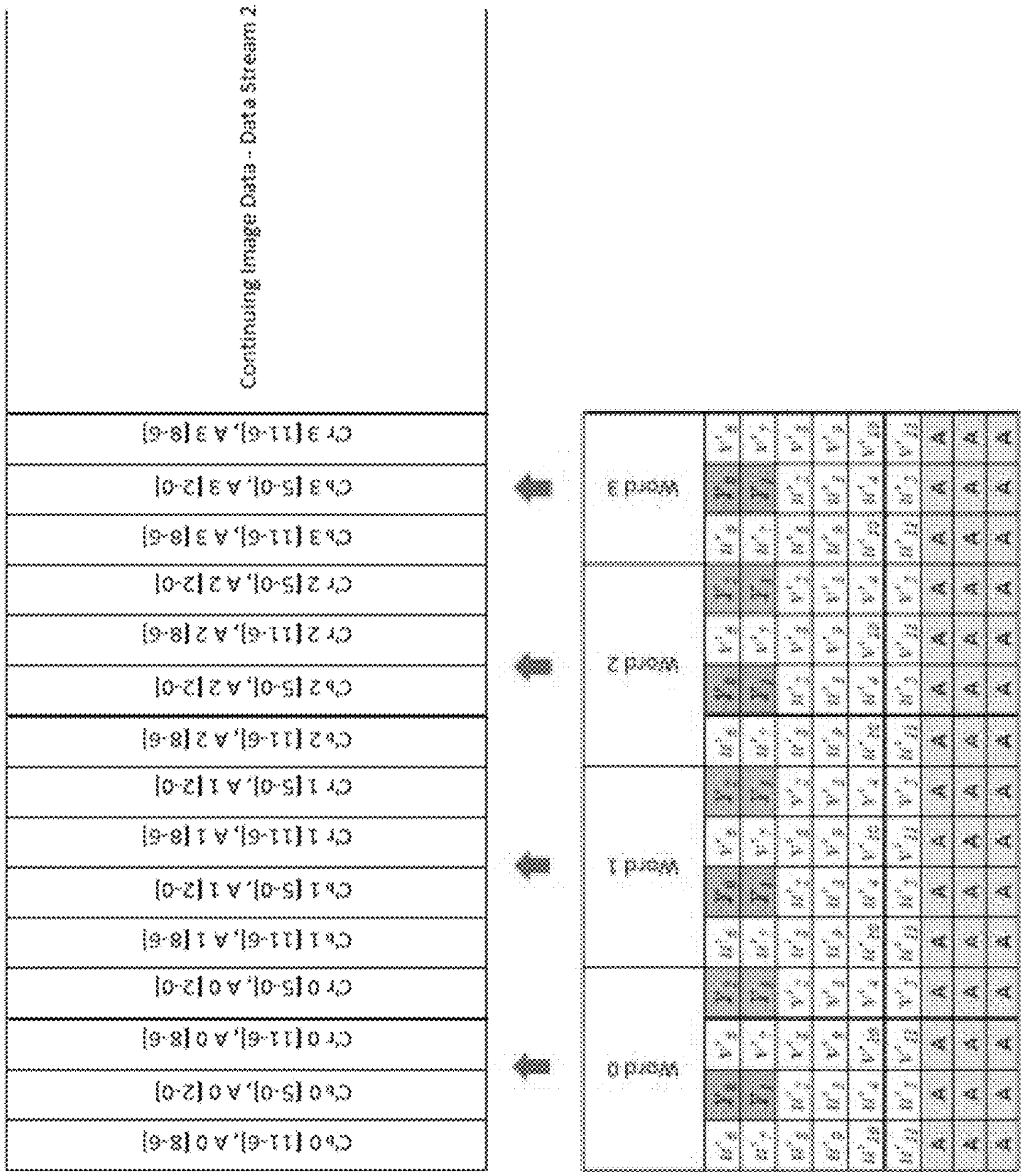

FIG. 147D illustrates one embodiment of a second data stream for a 16-bit into 12-bit shift for a Yu'v' 4:2:2 Level A encode as applied to SMPTE ST425.

Figure 148A:
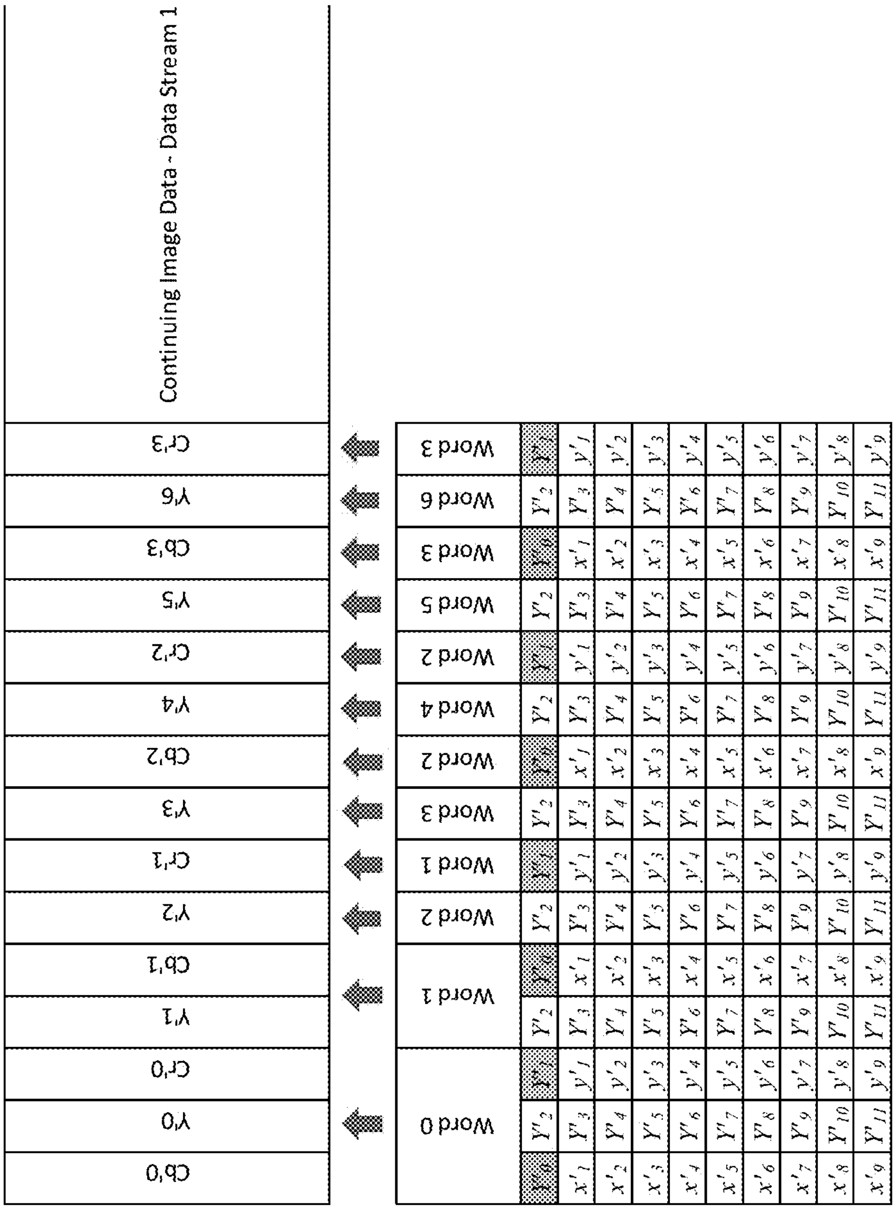

FIG. 148A illustrates one embodiment of a first data stream for a 12-bit into 10-bit shift for a Yxy Level B Multiplex Dual Stream (DS) encode as applied to SMPTE ST425.

Figure 148B:
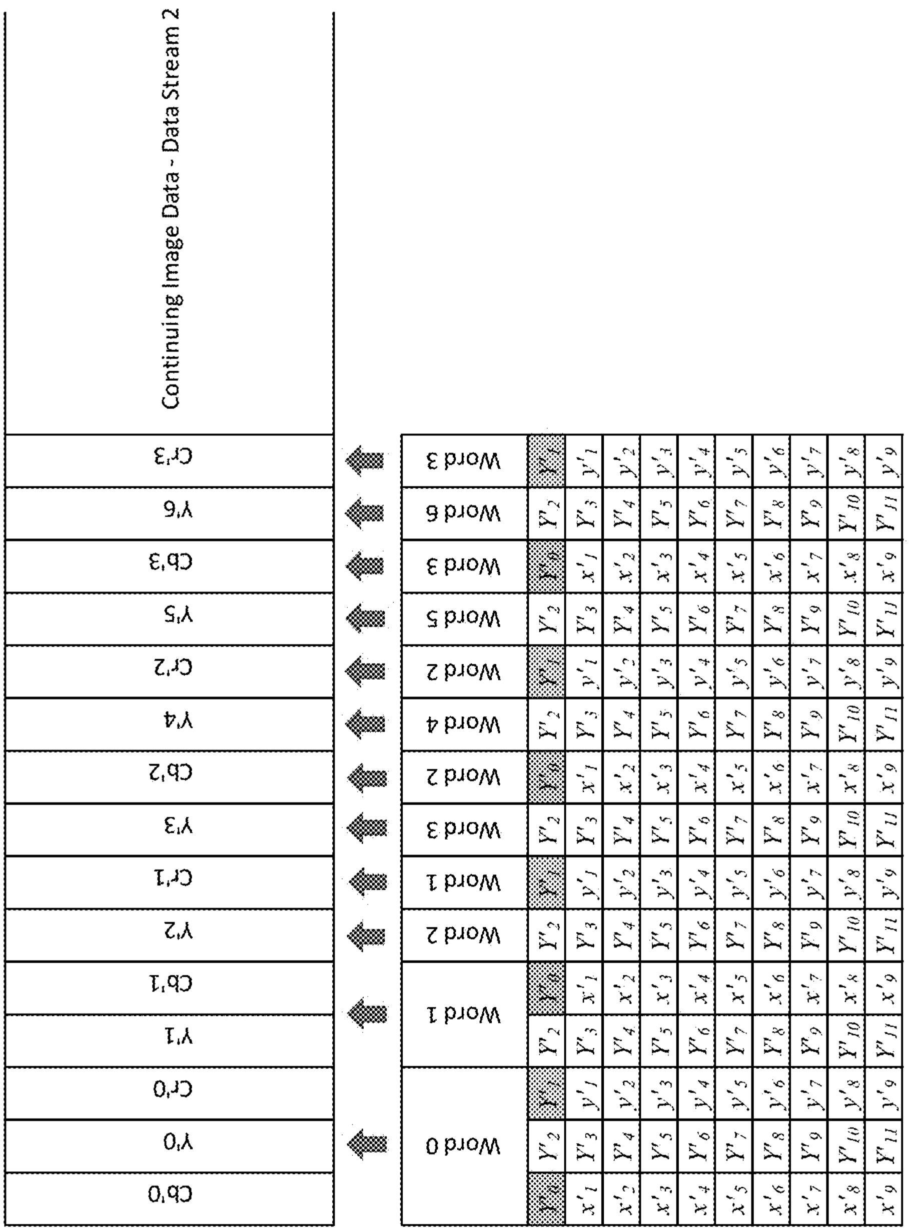

FIG. 148B illustrates one embodiment of a second data stream for a 12-bit into 10-bit shift for a Yxy Level B Multiplex Dual Stream (DS) encode as applied to SMPTE ST425.

Figure 148C:
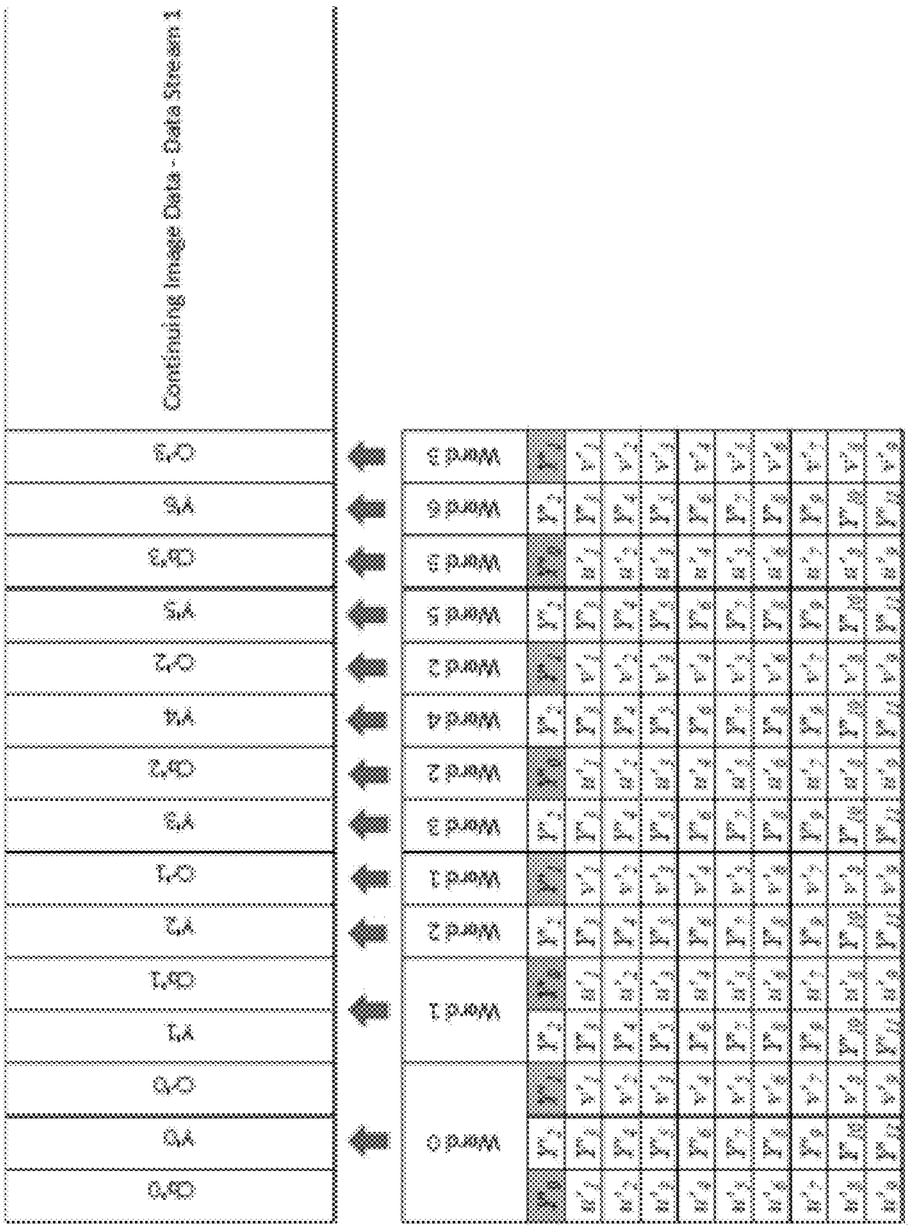

FIG. 148C illustrates one embodiment of a first data stream for a 12-bit into 10-bit shift for a Yu'v' Level B Multiplex Dual Stream (DS) encode as applied to SMPTE ST425.

Figure 148D:
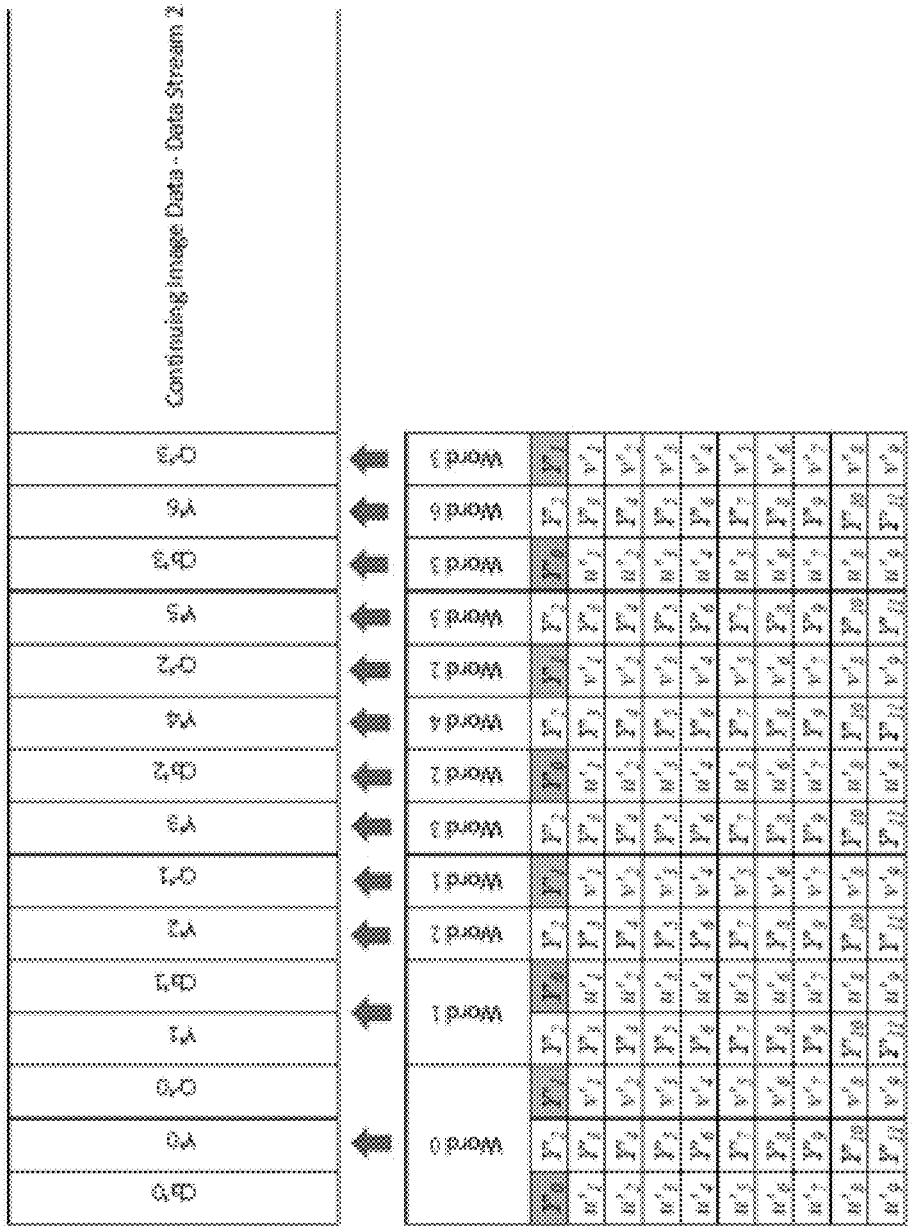

FIG. 148D illustrates one embodiment of a second data stream for a 12-bit into 10-bit shift for a Yu'v' Level B Multiplex Dual Stream (DS) encode as applied to SMPTE ST425.

Figure 149A:
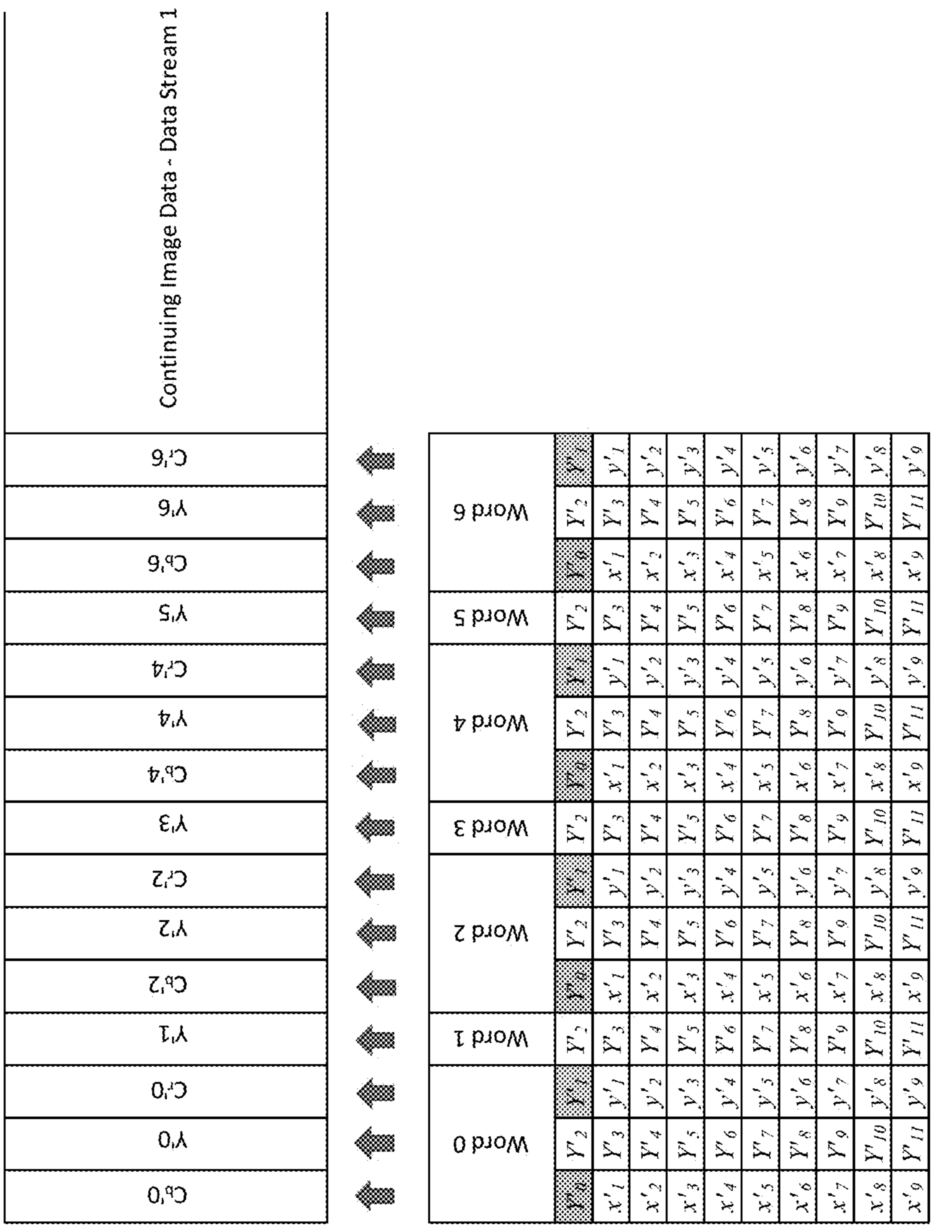

FIG. 149A illustrates one embodiment of a first data link for a 12-bit into 10-bit shift for a Yxy Level B Multiplex Dual Link (DL) encode as applied to SMPTE ST425.

Figure 149B:
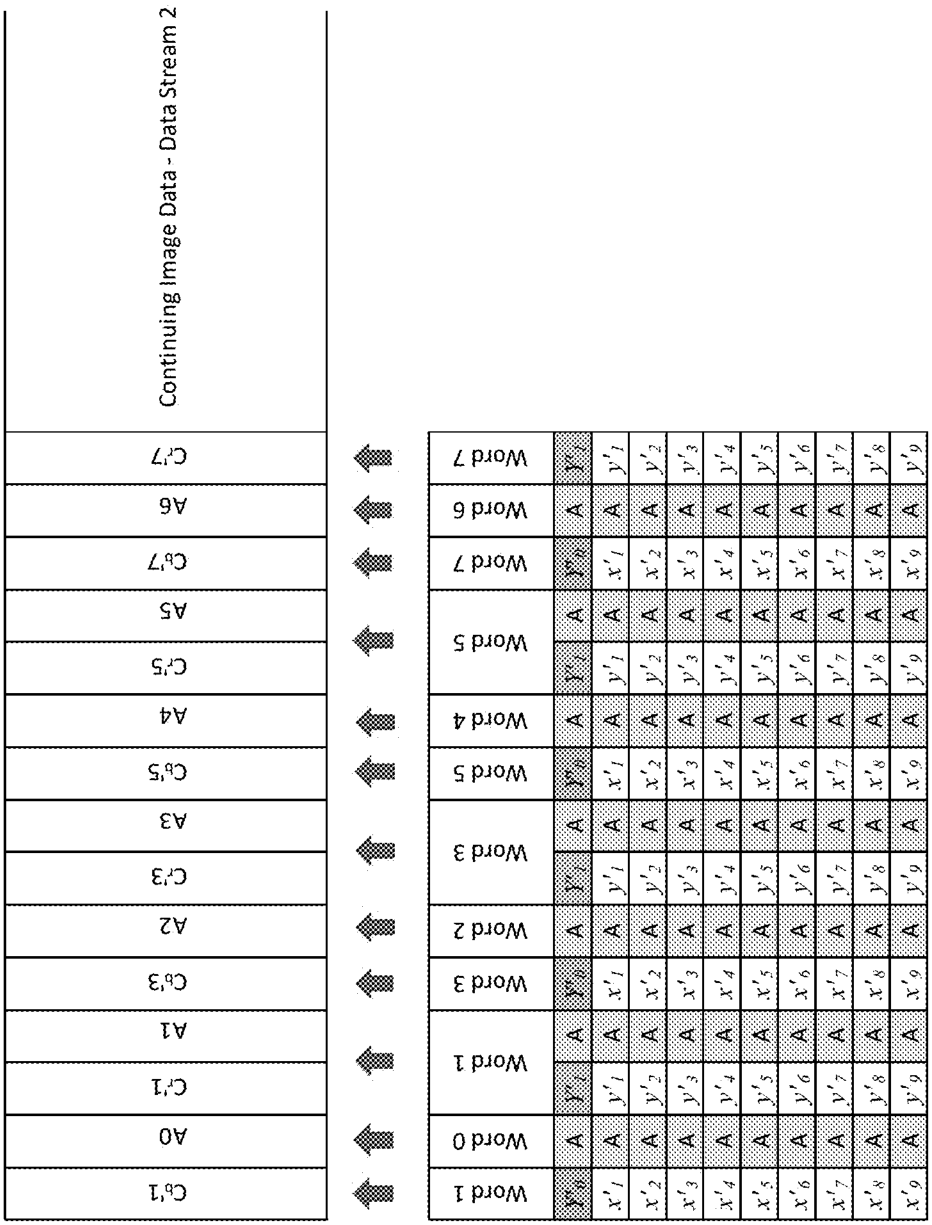

FIG. 149B illustrates one embodiment of a second data link for a 12-bit into 10-bit shift for a Yxy Level B Multiplex Dual Link (DL) encode as applied to SMPTE ST425.

Figure 149C:
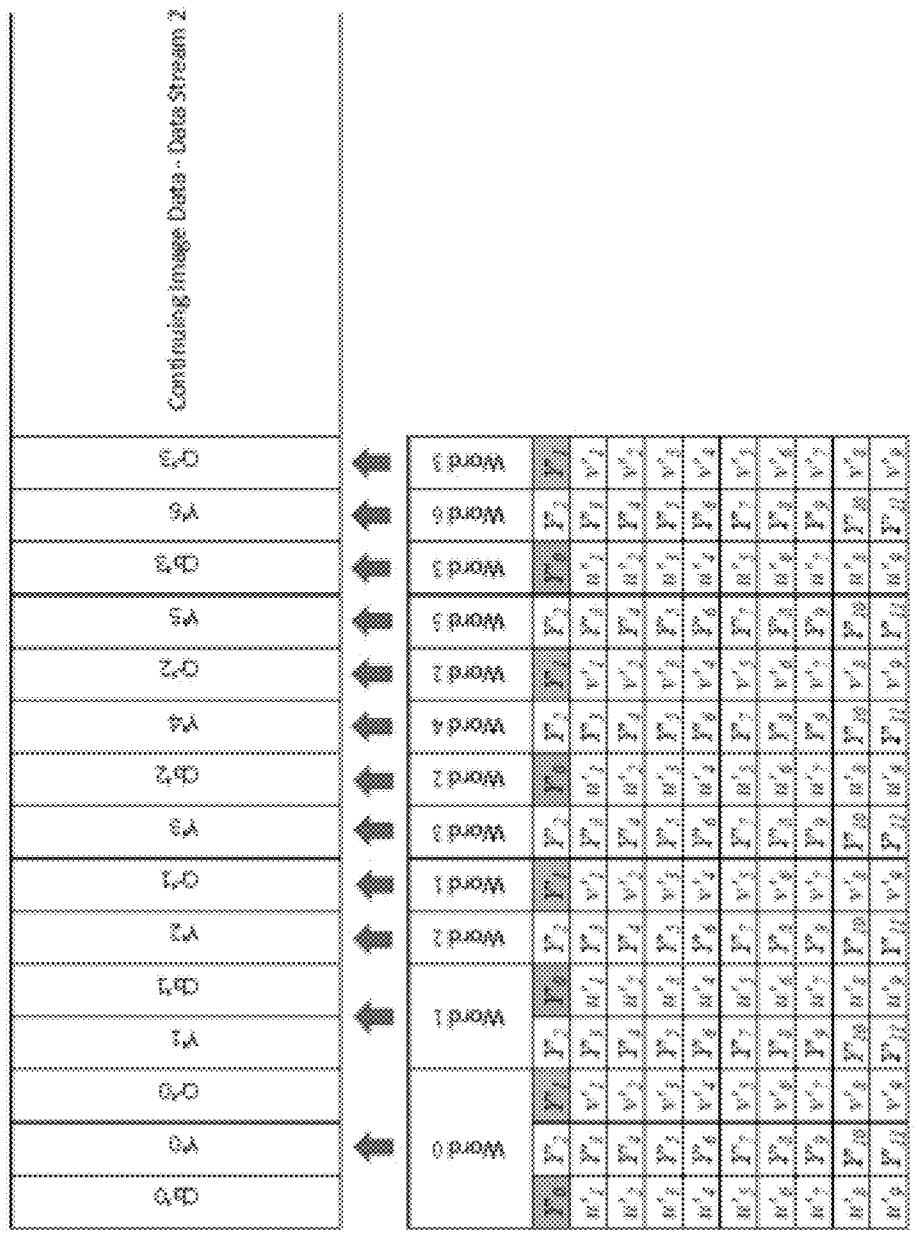

FIG. 149C illustrates one embodiment of a first data link for a 12-bit into 10-bit shift for a Yu'v' Level B Multiplex Dual Link (DL) encode as applied to SMPTE ST425.

Figure 149D:
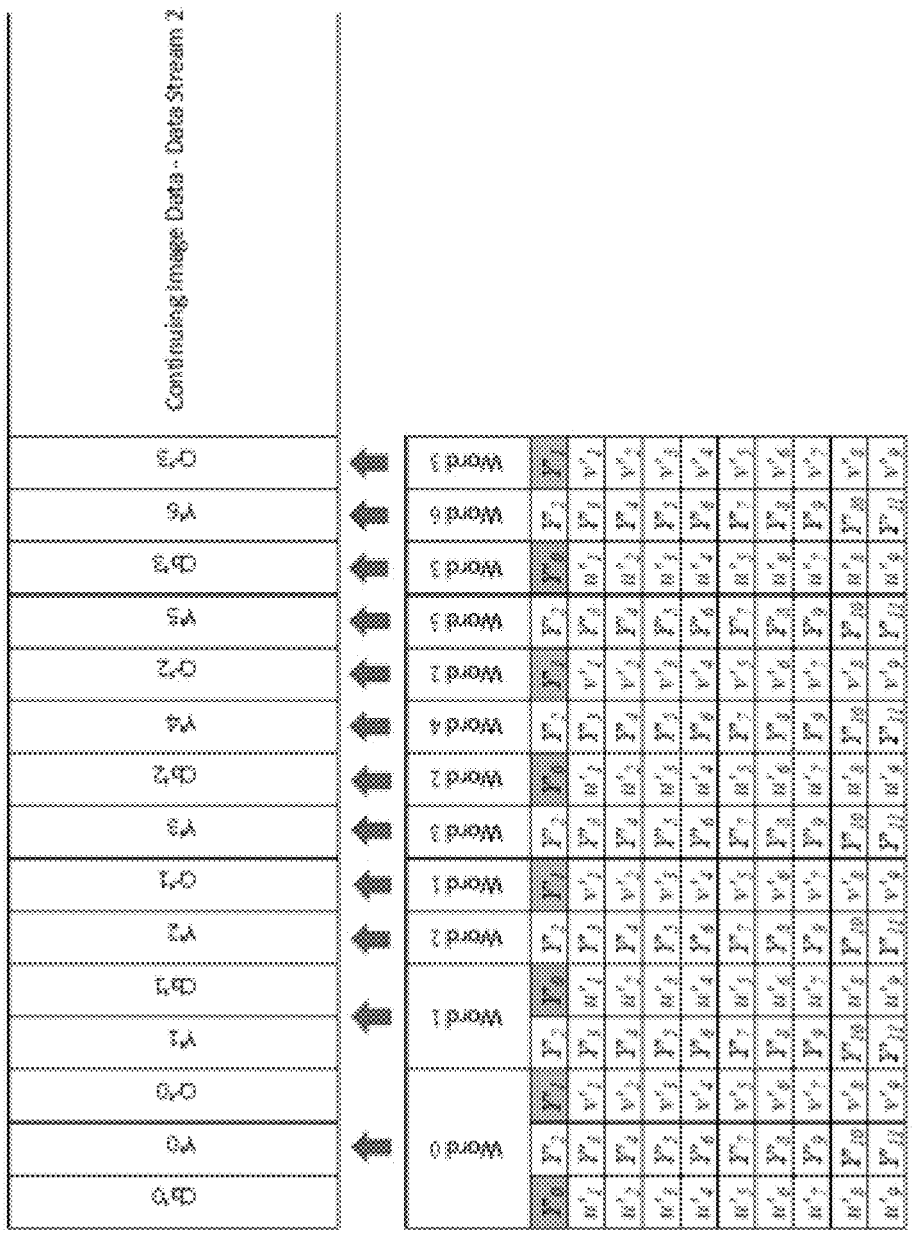

FIG. 149D illustrates one embodiment of a second data link for a 12-bit into 10-bit shift for a Yu'v' Level B Multiplex Dual Link (DL) encode as applied to SMPTE ST425.

Figure 150A:
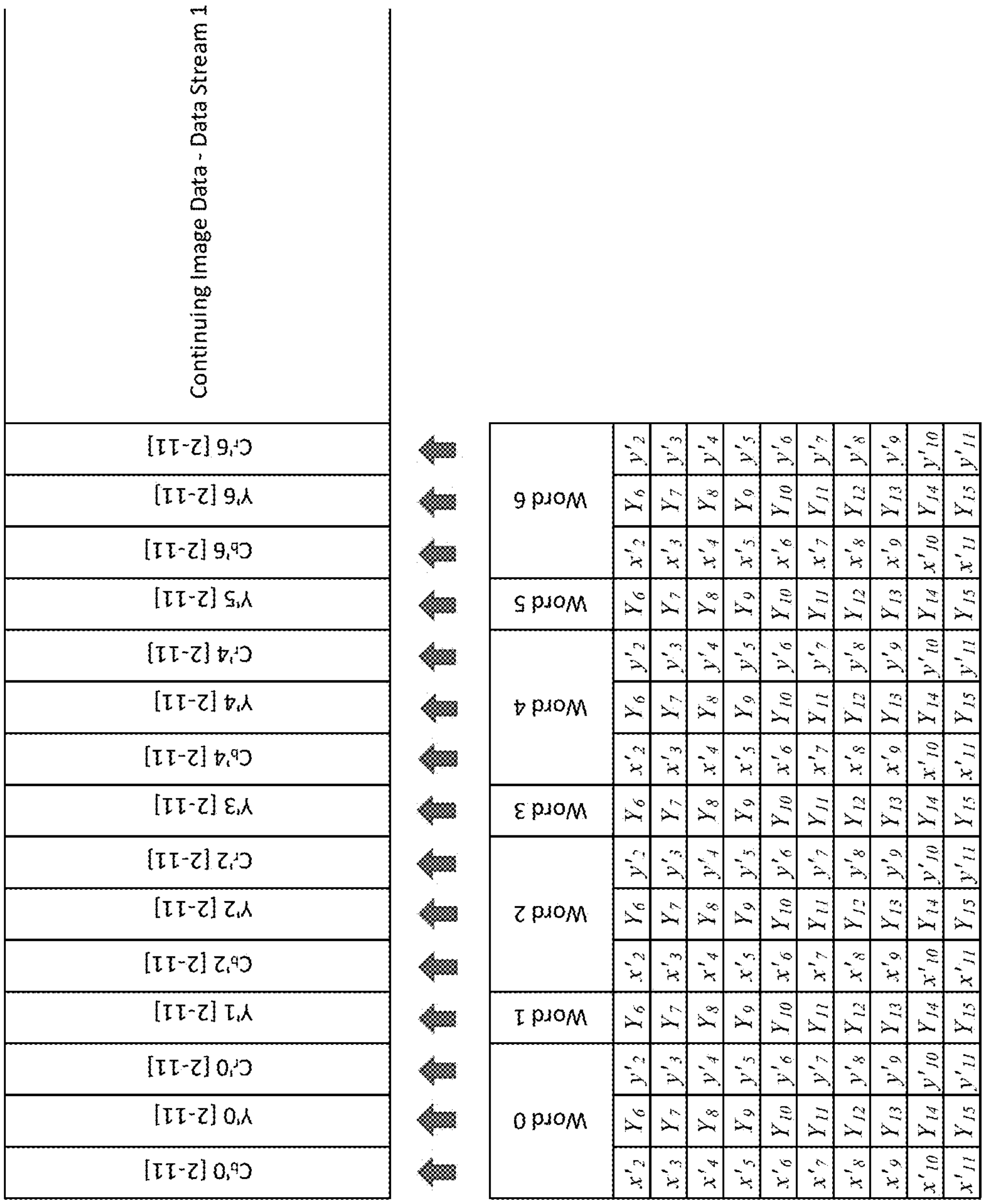

FIG. 150A illustrates one embodiment of a first data link for a 16-bit into 12-bit shift for a Yxy Level B Multiplex Dual Link (DL) encode as applied to SMPTE ST425.

Figure 150B:
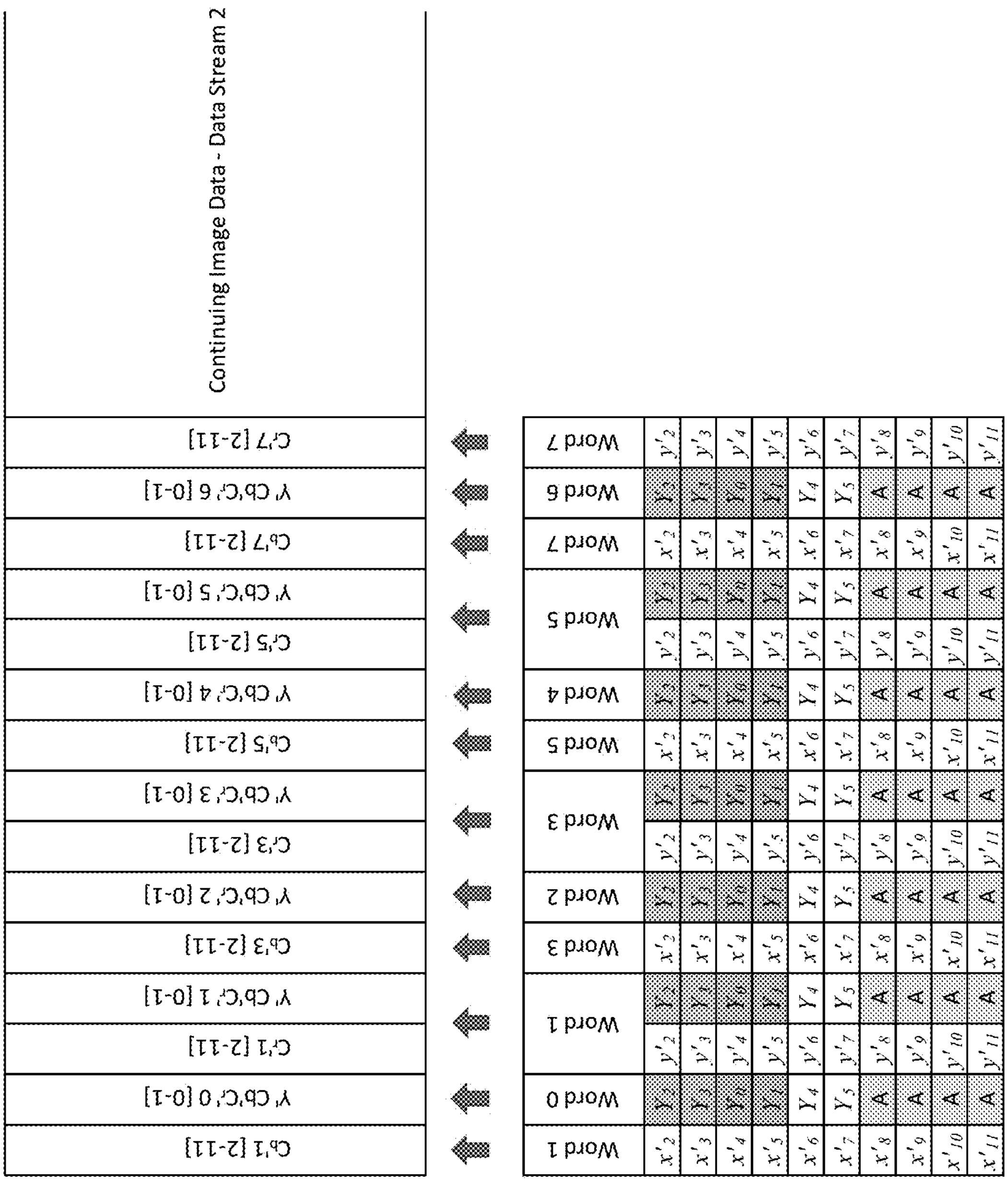

FIG. 150B illustrates one embodiment of a second data link for a 16-bit into 12-bit shift for a Yxy Level B Multiplex Dual Link (DL) encode as applied to SMPTE ST425.

Figure 150C:
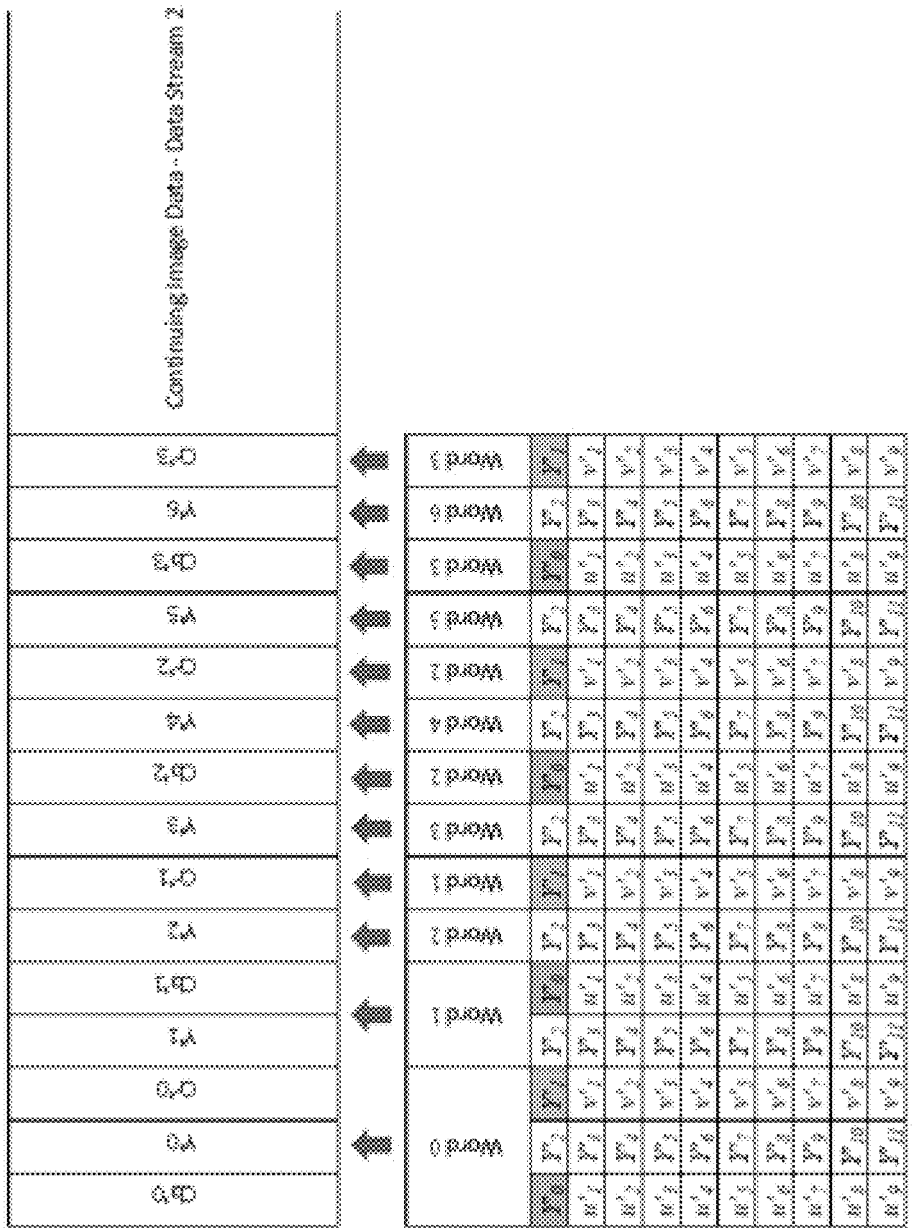

FIG. 150C illustrates one embodiment of a first data link for a 16-bit into 12-bit shift for a Yu'v' Level B Multiplex Dual Link (DL) encode as applied to SMPTE ST425.

Figure 150D:
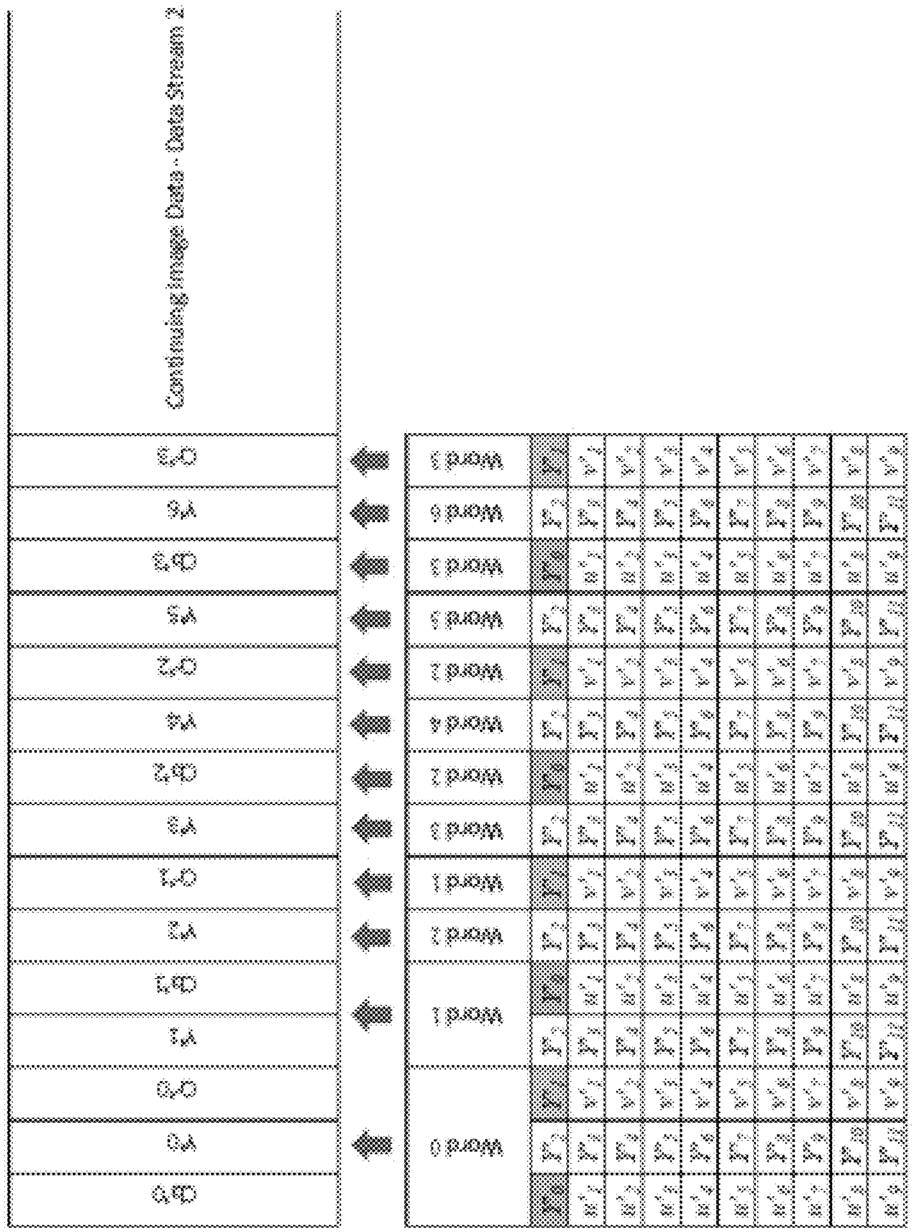

FIG. 150D illustrates one embodiment of a second data link for a 16-bit into 12-bit shift for a Yu'v' Level B Multiplex Dual Link (DL) encode as applied to SMPTE ST425.

FIG. 151 illustrates vertical ancillary data (VANC) as defined by SMPTE ST2048.

FIG. 152 is a table illustrating modification of SMPTE ST2048 parameters to indicate bit shifting.

FIG. 153 is a table illustrating modification of SMPTE ST2036 parameters to include System 4 with bit shifting.

FIG. 154 is a table illustrating modification of CTA 861 to include System 4 with bit shifting.

FIG. 155A illustrates grouped bits as placed in a DisplayPort or HDMI stream for an 8-bit Yxy 4:2:2 system.

FIG. 155B illustrates grouped bits as placed in a DisplayPort or HDMI stream for an 8-bit Yu'v' 4:2:2 system.

FIG. 156A is a table for Yxy or Yu'v' 10-bit into 8-bit 4:2:2 encoding with 4 lanes.

FIG. 156B is a table for Yxy or Yu'v' 10-bit into 8-bit 4:2:2 encoding with 2 lanes.

FIG. 156C is a table for Yxy or Yu'v' 10-bit into 8-bit 4:2:2 encoding with 1 lane.

FIG. 157A illustrates word set designations as placed in a DisplayPort or HDMI stream for a 10-bit Yxy 4:2:2 system.

FIG. 157B illustrates word set designations as placed in a DisplayPort or HDMI stream for a 10-bit Yu'v' 4:2:2 system.

FIG. 158A is a table for Yxy or Yu'v' 12-bit into 10-bit 4:2:2 encoding with 4 lanes.

FIG. 158B is a table for Yxy or Yu'v' 12-bit into 10-bit 4:2:2 encoding with 2 lanes.

FIG. 158C is a table for Yxy or Yu'v' 12-bit into 10-bit 4:2:2 encoding with 1 lane.

FIG. 159A illustrates word set designations as placed in a DisplayPort or HDMI stream for a 12-bit Yxy 4:2:2 system.

FIG. 159B illustrates word set designations as placed in a DisplayPort or HDMI stream for a 12-bit Yu'v' 4:2:2 system.

FIG. 160A is a table for Yxy or Yu'v' 16-bit into 12-bit 4:2:2 encoding with 4 lanes.

FIG. 160B is a table for Yxy or Yu'v' 16-bit into 12-bit 4:2:2 encoding with 2 lanes.

FIG. 160C is a table for Yxy or Yu'v' 16-bit into 12-bit 4:2:2 encoding with 1 lane.

FIG. 161A illustrates word set designations as placed in a DisplayPort or HDMI stream for a 10-bit Yxy 4:4:4 system.

FIG. 161B illustrates word set designations as placed in a DisplayPort or HDMI stream for a 10-bit Yu'v' 4:4:4 system.

FIG. 162A is a table for Yxy or Yu'v' 12-bit into 10-bit 4:4:4 encoding with 4 lanes.

FIG. 162B is a table for Yxy or Yu'v' 12-bit into 10-bit 4:4:4 encoding with 2 lanes.

FIG. 162C is a table for Yxy or Yu'v' 12-bit into 10-bit 4:4:4 encoding with 1 lane.

FIG. 163A illustrates word set designations as placed in a DisplayPort or HDMI stream for a 12-bit Yxy 4:4:4 system.

FIG. 163B illustrates word set designations as placed in a DisplayPort or HDMI stream for a 12-bit Yu'v' 4:4:4 system.

FIG. 164A is a table for Yxy or Yu'v' 16-bit into 12-bit 4:4:4 encoding with 4 lanes.

FIG. 164B is a table for Yxy or Yu'v' 16-bit into 12-bit 4:4:4 encoding with 2 lanes.

FIG. 164C is a table for Yxy or Yu'v' 16-bit into 12-bit 4:4:4 encoding with 1 lane.

DETAILED DESCRIPTION

The present invention is generally directed to a multi-primary color system.

In one embodiment, the present invention provides a system for displaying a primary color system, including a set of image data including a set of primary color signals, wherein the set of primary color signals corresponds to a set of values in an International Commission on Illumination (CIE) Yu'v' color space, wherein the set of values in the CIE Yu'v' color space includes a luminance (Y) and two colorimetric coordinates (u',v'), and wherein the two colorimetric coordinates (u',v') are independent from the luminance (Y), an image data converter, wherein the image data converter includes a digital interface, and wherein the digital interface is operable to encode and decode the set of values in the CIE Yu'v' color space, at least one non-linear function for processing the set of values in the CIE Yu'v' color space, wherein the at least one non-linear function is applied to data related to the luminance (Y) and data related to the two colorimetric coordinates (u',v'), and at least one viewing device, wherein the at least one viewing device and the image data converter are in network communication, wherein the encode and the decode includes transportation of processed Yu'v' data, wherein the processed Yu'v' data includes a first channel related to the luminance (Y), a second channel related to a first colorimetric coordinate (u') of the two colorimetric coordinates (u',v'), and a third channel related to the second colorimetric coordinate (v') of the two colorimetric coordinates (u',v'), and wherein the image data converter is operable to convert the set of image data for display on the at least one viewing device. In one embodiment, the at least one viewing device is operable to display the primary color system based on the set of image data, wherein the primary color system displayed on the at least one viewing device is based on the set of image data. In one embodiment, the image data converter is operable to convert the set of primary color signals to the set of values in the CIE Yu'v' color space and/or the set of values in the CIE Yu'v' color space to a plurality of color gamuts. In one embodiment, the image data converter is operable to fully sample the processed Yu'v' data on the first channel and subsample the processed Yu'v' data on the second channel and the third channel. In one embodiment, the processed Yu'v' data on the first channel, the second channel, and the third channel are fully sampled. In one embodiment, the encode includes scaling of the two colorimetric coordinates (u',v'), thereby creating a first scaled colorimetric coordinate and a second scaled colorimetric coordinate. In one embodiment, the scaling includes dividing the first colorimetric coordinate (u') by a first divisor to create the first scaled colorimetric coordinate and dividing the second colorimetric coordinate (v') by a second divisor to create the second scaled colorimetric coordinate, wherein the first divisor is between about 0.55 and about 0.70, and wherein the second divisor is between about 0.53 and about 0.65. In one embodiment, the decode includes rescaling of data related to the first scaled colorimetric coordinate and data related to the second scaled colorimetric coordinate. In one embodiment, the rescaling includes multiplying the data related to the first scaled colorimetric coordinate by a first multiplier and multiplying the data related to the second colorimetric coordinate by a second multiplier, wherein the first multiplier is between about 1.42 and about 1.82, and wherein the second multiplier is between about 1.53 and about 1.89. In one embodiment, the encode includes converting the set of primary color signals to XYZ data and then converting the XYZ data to create the set of values in the CIE Yu'v' color space and/or the decode includes converting the processed Yu'v' data to XYZ data and then converting the XYZ data to a format operable to display on the at least one viewing device. In one embodiment, the at least one non-linear function includes a data rate reduction function with a value between about 0.25 and about 0.9 and/or an inverse data rate reduction function with a value between about 1.1 and about 4. In one embodiment, the processed Yu'v' data is transported using a standardized transportation format. In one embodiment, the standardized transportation format is operable to transport RGB data or YCbYCr data. In one embodiment, the image data converter applies one or more of the at least one non-linear function to encode and/or decode the set of values in the CIE Yu'v' color space. In one embodiment, the image data converter includes a look-up table.

In another embodiment, the present invention provides a system for displaying a primary color system, including a set of image data including a set of primary color signals, wherein the set of primary color signals corresponds to a set of values in an International Commission on Illumination (CIE) Yu'v' color space, wherein the set of values in the CIE Yu'v' color space includes a luminance (Y) and two colorimetric coordinates (u',v'), and wherein the two colorimetric coordinates (u',v') are independent from the luminance (Y), an image data converter, wherein the image data converter includes a digital interface, and wherein the digital interface is operable to encode and decode the set of values in the CIE Yu'v' color space, and at least one non-linear function for processing the set of values in the CIE Yu'v' color space, wherein the at least one non-linear function is applied to data related to the luminance (Y) and data related to the two colorimetric coordinates (u',v'), a set of Session Description Protocol (SDP) parameters, and at least one viewing device, wherein the at least one viewing device and the image data converter are in network communication, wherein the encode and the decode includes transportation of processed Yu'v' data, wherein the processed Yu'v' data includes a first channel related to the luminance (Y), a second channel related to a first colorimetric coordinate (u') of the two colorimetric coordinates (u',v'), and a third channel related to the second colorimetric coordinate (v') of the two colorimetric coordinates (u',v'), and wherein the image data converter is operable to convert the set of image data for display on the at least one viewing device. In one embodiment, the at least one non-linear function includes a data rate reduction function with a value between about 0.25 and about 0.9 and/or an inverse data rate reduction function with a value between about 1.1 and about 4.

In yet another embodiment, the present invention provides a method for displaying a primary color system, including providing a set of image data including a set of primary color signals, wherein the set of primary color signals corresponds to a set of values in an International Commission on Illumination (CIE) Yu'v' color space, wherein the set of values in the CIE Yu'v' color space includes a luminance (Y) and two colorimetric coordinates (u',v'), encoding the set of image data in the CIE Yu'v' color space using a digital interface of an image data converter, wherein the image data converter is in network communication with at least one viewing device, processing the set of image data in the CIE Yu'v' color space by scaling the two colorimetric coordinates (u',v') and applying at least one non-linear function to the luminance (Y) and the scaled two colorimetric coordinates, decoding the set of image data in the CIE Yu'v' color space using the digital interface of the image data converter, and the image data converter converting the set of image data for display on the at least one viewing device, wherein the encoding and the decoding include transportation of processed Yu'v' data, wherein the processed Yu'v' data includes a first channel related to the luminance (Y), a second channel related to a first colorimetric coordinate (u') of the two colorimetric coordinates (u',v'), and a third channel related to the second colorimetric coordinate (v') of the two colorimetric coordinates (u',v'). In one embodiment, the scaling of the two colorimetric coordinates includes dividing the first colorimetric coordinate (u') by a first divisor to create a first scaled colorimetric coordinate and data related to the second colorimetric coordinate (v') by a second divisor to create a second scaled colorimetric coordinate, wherein the first divisor is between about 0.55 and about 0.70, and wherein the second divisor is between about 0.53 and about 0.65. In one embodiment, the decoding of the set of image data includes rescaling data related to the two scaled colorimetric coordinates and applying an inverse of the at least one non-linear function to data related to the luminance (Y) and the data related to the two colorimetric coordinates (u',v').

The present invention relates to color systems. A multitude of color systems are known, but they continue to suffer numerous issues. As imaging technology is moving forward, there has been a significant interest in expanding the range of colors that are replicated on electronic displays. Enhancements to the television system have expanded from the early CCIR 601 standard to ITU-R BT.709-6, to Society of Motion Picture and Television Engineers (SMPTE) RP431-2, and ITU-R BT.2020. Each one has increased the gamut of visible colors by expanding the distance from the reference white point to the position of the Red (R), Green (G), and Blue (B) color primaries (collectively known as "RGB") in chromaticity space. While this approach works, it has several disadvantages. When implemented in content presentation, issues arise due to the technical methods used to expand the gamut of colors seen (typically using a more-narrow emissive spectrum) can result in increased viewer metameric errors and require increased power due to lower illumination source. These issues increase both capital and operational costs.

With the current available technologies, displays are limited in respect to their range of color and light output. There are many misconceptions regarding how viewers interpret the display output technically versus real-world sensations viewed with the human eye. The reason we see more than just the three emitting primary colors is because the eye combines the spectral wavelengths incident on it into the three bands. Humans interpret the radiant energy (spectrum and amplitude) from a display and process it so that an individual color is perceived. The display does not emit a color or a specific wavelength that directly relates to the sensation of color. It simply radiates energy at the same spectrum which humans sense as light and color. It is the observer who interprets this energy as color.

When the CIE 2° standard observer was established in 1931, common understanding of color sensation was that the eye used red, blue, and green cone receptors (James Maxwell & James Forbes 1855). Later with the Munsell vision model (Munsell 1915), Munsell described the vision system to include three separate components: luminance, hue, and saturation. Using RGB emitters or filters, these three primary colors are the components used to produce images on today's modern electronic displays.

There are three primary physical variables that affect sensation of color. These are the spectral distribution of radiant energy as it is absorbed into the retina, the sensitivity of the eye in relation to the intensity of light landing on the retinal pigment epithelium, and the distribution of cones within the retina. The distribution of cones (e.g., L cones, M cones, and S cones) varies considerably from person to person.

Enhancements in brightness have been accomplished through larger backlights or higher efficiency phosphors. Encoding of higher dynamic ranges is addressed using higher range, more perceptually uniform electro-optical transfer functions to support these enhancements to brightness technology, while wider color gamuts are produced by using narrow bandwidth emissions. Narrower bandwidth emitters result in the viewer experiencing higher color saturation. But there can be a disconnect between how saturation is produced and how it is controlled. What is believed to occur when changing saturation is that increasing color values of a color primary represents an increase to saturation. This is not true, as changing saturation requires the variance of a color primary spectral output as parametric. There are no variable spectrum displays available to date as the technology to do so has not been commercially developed, nor has the new infrastructure required to support this been discussed.

Instead, the method that a display changes for viewer color sensation is by changing color luminance. As data values increase, the color primary gets brighter. Changes to color saturation are accomplished by varying the brightness of all three primaries and taking advantage of the dominant color theory.

Expanding color primaries beyond RGB has been discussed before. There have been numerous designs of multi-primary displays. For example, SHARP has attempted this with their four-color QUATTRON TV systems by adding a yellow color primary and developing an algorithm to drive it. Another four primary color display was proposed by Matthew Brennesholtz which included an additional cyan primary, and a six primary display was described by Yan Xiong, Fei Deng, Shan Xu, and Sufang Gao of the School of Physics and Optoelectric Engineering at the Yangtze University Jingzhou China. In addition, AU OPTRONICS has developed a five primary display technology. SONY has also recently disclosed a camera design featuring RGBCMY (red, green, blue, cyan, magenta, and yellow) and RGBCMYW (red, green, blue cyan, magenta, yellow, and white) sensors.

Actual working displays have been shown publicly as far back as the late 1990's, including samples from Tokyo Polytechnic University, Nagoya City University, and Genoa Technologies. However, all of these systems are exclusive to their displays, and any additional color primary information is limited to the display's internal processing.

Additionally, the Visual Arts System for Archiving and Retrieval of Images (VASARI) project developed a colorimetric scanner system for direct digital imaging of paintings. The system provides more accurate coloring than conventional film, allowing it to replace film photography. Despite the project beginning in 1989, technical developments have continued. Additional information is available at https://www.southampton.ac.uk/~km2/projs/vasari/(last accessed Mar. 30, 2020), which is incorporated herein by reference in its entirety.

None of the prior art discloses developing additional color primary information outside of the display. Moreover, the system driving the display is often proprietary to the demonstration. In each of these executions, nothing in the workflow is included to acquire or generate additional color primary information. The development of a multi-primary color system is not complete if the only part of the system that supports the added primaries is within the display itself.

Referring now to the drawings in general, the illustrations are for the purpose of describing one or more preferred embodiments of the invention and are not intended to limit the invention thereto.

Additional details about multi-primary systems are available in U.S. Pat. Nos. 10,607,527; 10,950,160; 10,950,161; 10,950,162; 10,997,896; 11,011,098; 11,017,708; 11,030,934; 11,037,480; 11,037,481; 11,037,482; 11,043,157; 11,049,431; 11,062,638; 11,062,639; 11,069,279; 11,069,280; and 11,100,838 and U.S. Publication Nos. 20200251039, 20210233454, and 20210209990, each of which is incorporated herein by reference in its entirety.

Traditional displays include three primaries: red, green, and blue. The multi-primary systems of the present invention include at least four primaries. The at least four primaries preferably include at least one red primary, at least one green primary, and/or at least one blue primary. In one embodiment, the at least four primaries include a cyan primary, a magenta primary, and/or a yellow primary. In one embodiment, the at least four primaries include at least one white primary.

In one embodiment, the multi-primary system includes six primaries. In one preferred embodiment, the six primaries include a red (R) primary, a green (G) primary, a blue (B) primary, a cyan (C) primary, a magenta (M) primary, and a yellow (Y) primary, often referred to as "RGBCMY". However, the systems and methods of the present invention are not restricted to RGBCMY, and alternative primaries are compatible with the present invention.

6P-B

6P-B is a color set that uses the same RGB values that are defined in the ITU-R BT.709-6 television standard. The gamut includes these RGB primary colors and then adds three more color primaries orthogonal to these based on the white point. The white point used in 6P-B is D65 (ISO 11664-2).

In one embodiment, the red primary has a dominant wavelength of 609 nm, the yellow primary has a dominant wavelength of 571 nm, the green primary has a dominant wavelength of 552 nm, the cyan primary has a dominant wavelength of 491 nm, and the blue primary has a dominant wavelength of 465 nm as shown in Table 1. In one embodiment, the dominant wavelength is approximately (e.g., within ±10%) the value listed in the table below. Alternatively, the dominant wavelength is within ±5% of the value listed in the table below. In yet another embodiment, the dominant wavelength is within ±2% of the value listed in the table below.

TABLE 1

| | x | y | u' | v' | λ |
|---|---|---|---|---|---|
| W (D65) | 0.3127 | 0.3290 | 0.1978 | 0.4683 | |
| R | 0.6400 | 0.3300 | 0.4507 | 0.5228 | 609 nm |
| G | 0.3000 | 0.6000 | 0.1250 | 0.5625 | 552 nm |
| B | 0.1500 | 0.0600 | 0.1754 | 0.1578 | 464 nm |
| C | 0.1655 | 0.3270 | 0.1041 | 0.4463 | 491 nm |
| M | 0.3221 | 0.1266 | 0.3325 | 0.2940 | |
| Y | 0.4400 | 0.5395 | 0.2047 | 0.5649 | 571 nm |

Figure 1:
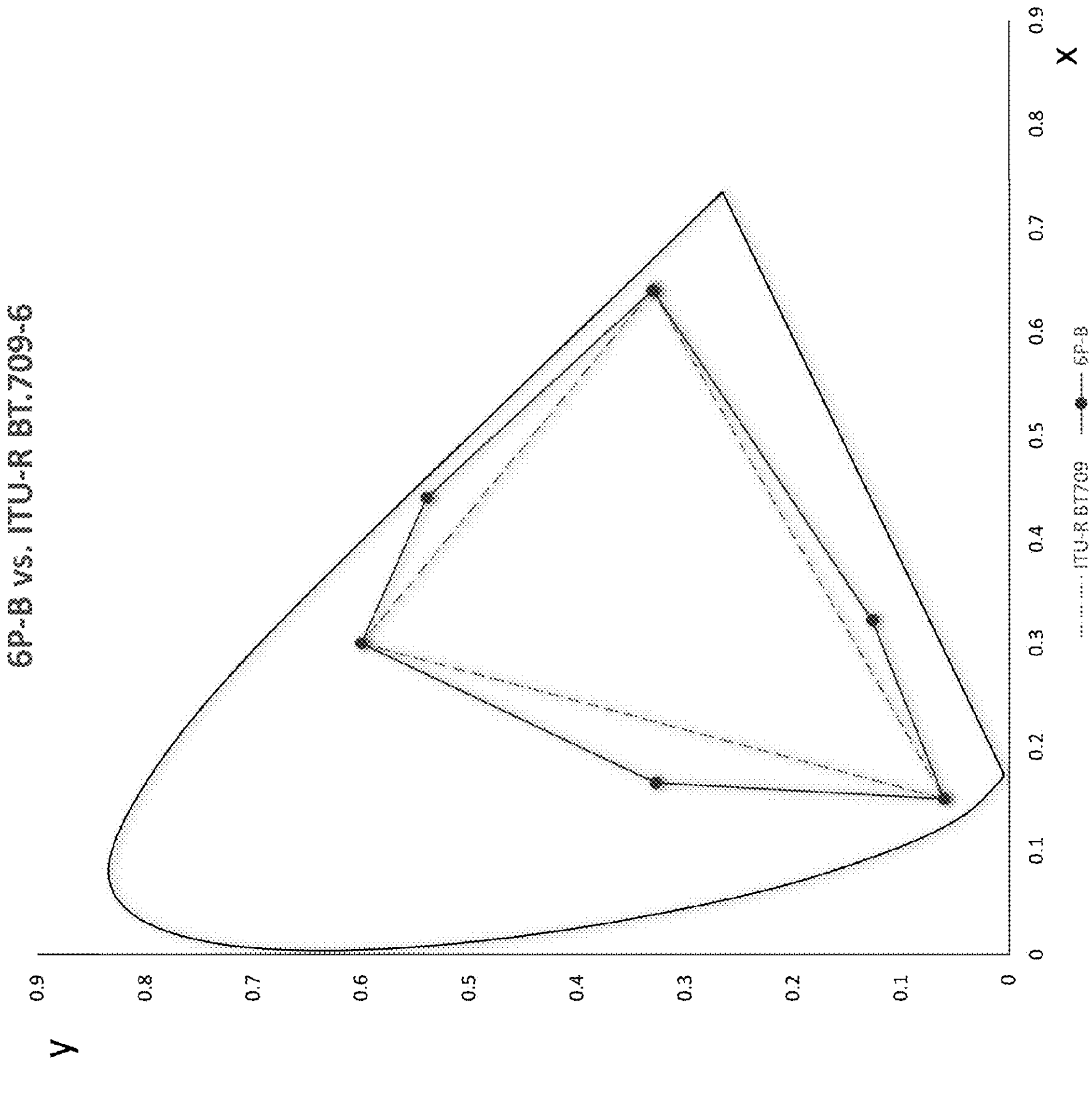
FIG. 1 illustrates one embodiment of a six primary system including a red primary, a green primary, a blue primary, a cyan primary, a magenta primary, and a yellow primary ("6P-B") compared to ITU-R BT.709-6.

FIG. 1 illustrates 6P-B compared to ITU-R BT.709-6.

6P-C

6P-C is based on the same RGB primaries defined in SMPTE RP431-2 projection recommendation. Each gamut includes these RGB primary colors and then adds three more color primaries orthogonal to these based on the white point. The white point used in 6P-B is D65 (ISO 11664-2). Two versions of 6P-C are used. One is optimized for a D60 white point (SMPTE ST2065-1), and the other is optimized for a D65 white point. Additional information about white points is available in ISO 11664-2:2007 "Colorimetry—Part 2: CIE standard illuminants" and "ST 2065-1:2012-SMPTE Standard—Academy Color Encoding Specification (ACES)," in ST 2065-1:2012, pp. 1-23, 17 Apr. 2012, doi: 10.5594/SMPTE.ST2065-1.2012, each of which is incorporated herein by reference in its entirety.

In one embodiment, the red primary has a dominant wavelength of 615 nm, the yellow primary has a dominant wavelength of 570 nm, the green primary has a dominant wavelength of 545 nm, the cyan primary has a dominant wavelength of 493 nm, and the blue primary has a dominant wavelength of 465 nm as shown in Table 2. In one embodiment, the dominant wavelength is approximately (e.g., within ±10%) the value listed in the table below. Alternatively, the dominant wavelength is within ±5% of the value listed in the table below. In yet another embodiment, the dominant wavelength is within ±2% of the value listed in the table below.

TABLE 2

| | x | y | u' | v' | λ |
|---|---|---|---|---|---|
| W (D60) | 0.3217 | 0.3377 | 0.2008 | 0.4742 | |
| R | 0.6800 | 0.3200 | 0.4964 | 0.5256 | 615 nm |
| G | 0.2650 | 0.6900 | 0.0980 | 0.5777 | 545 nm |
| B | 0.1500 | 0.0600 | 0.1754 | 0.1579 | 465 nm |
| C | 0.1627 | 0.3419 | 0.0960 | 0.4540 | 493 nm |
| M | 0.3523 | 0.1423 | 0.3520 | 0.3200 | |
| Y | 0.4502 | 0.5472 | 0.2078 | 0.5683 | 570 nm |

Figure 2:
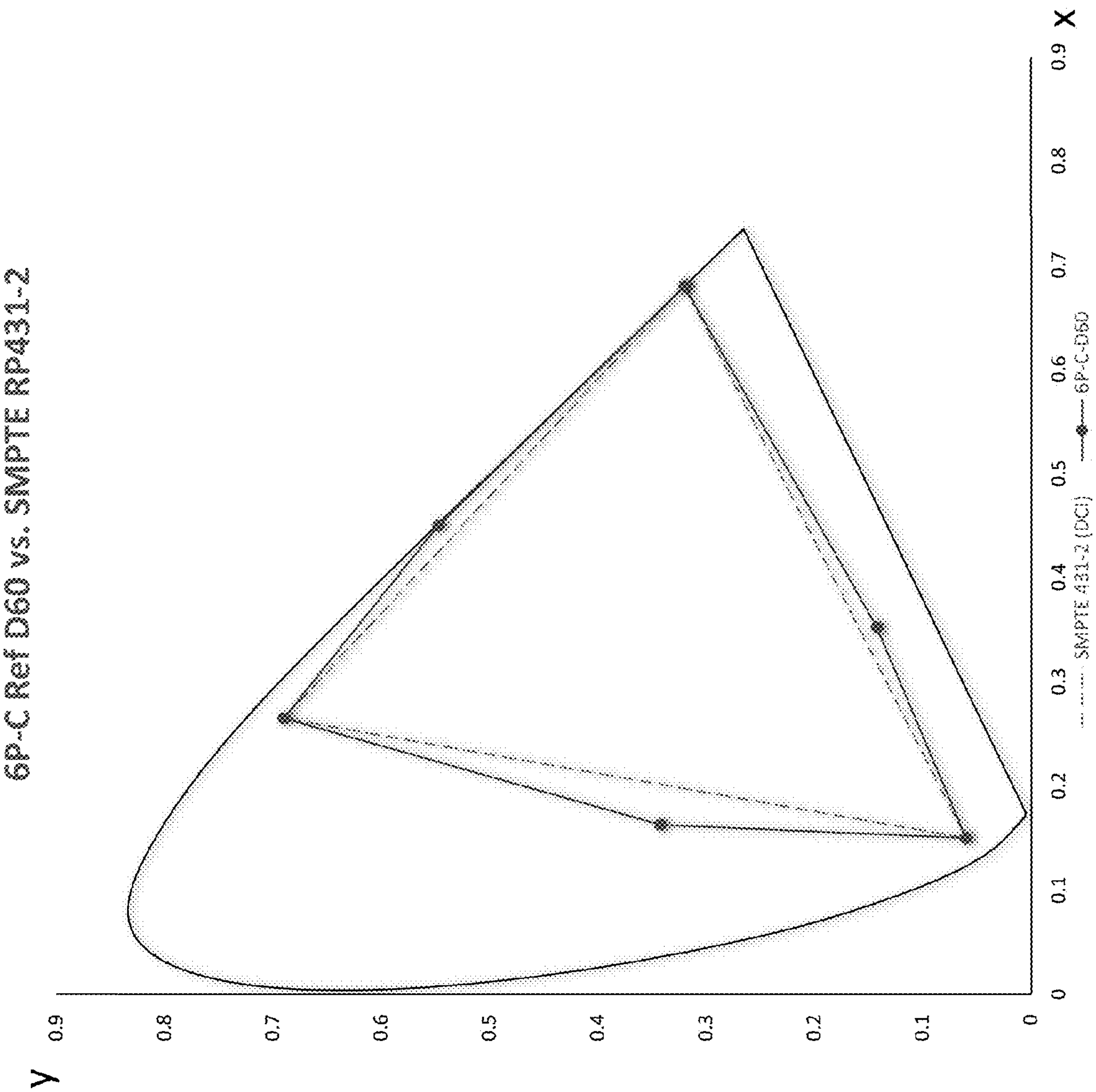
FIG. 2 illustrates another embodiment of a six primary system including a red primary, a green primary, a blue primary, a cyan primary, a magenta primary, and a yellow primary ("6P-C") compared to SMPTE RP431-2 for a D60 white point.

FIG. 2 illustrates 6P-C compared to SMPTE RP431-2 for a D60 white point.

In one embodiment, the red primary has a dominant wavelength of 615 nm, the yellow primary has a dominant wavelength of 570 nm, the green primary has a dominant wavelength of 545 nm, the cyan primary has a dominant wavelength of 423 nm, and the blue primary has a dominant wavelength of 465 nm as shown in Table 3. In one embodiment, the dominant wavelength is approximately (e.g., within ±10%) the value listed in the table below. Alternatively, the dominant wavelength is within ±5% of the value listed in the table below. In yet another embodiment, the dominant wavelength is within ±2% of the value listed in the table below.

TABLE 3

| | x | y | u' | v' | λ |
|---|---|---|---|---|---|
| W (D65) | 0.3127 | 0.3290 | 0.1978 | 0.4683 | |
| R | 0.6800 | 0.3200 | 0.4964 | 0.5256 | 615 nm |
| G | 0.2650 | 0.6900 | 0.0980 | 0.5777 | 545 nm |
| B | 0.1500 | 0.0600 | 0.1754 | 0.1579 | 465 nm |
| C | 0.1617 | 0.3327 | 0.0970 | 0.4490 | 492 nm |
| M | 0.3383 | 0.1372 | 0.3410 | 0.3110 | |
| Y | 0.4470 | 0.5513 | 0.2050 | 0.5689 | 570 nm |

Figure 3:
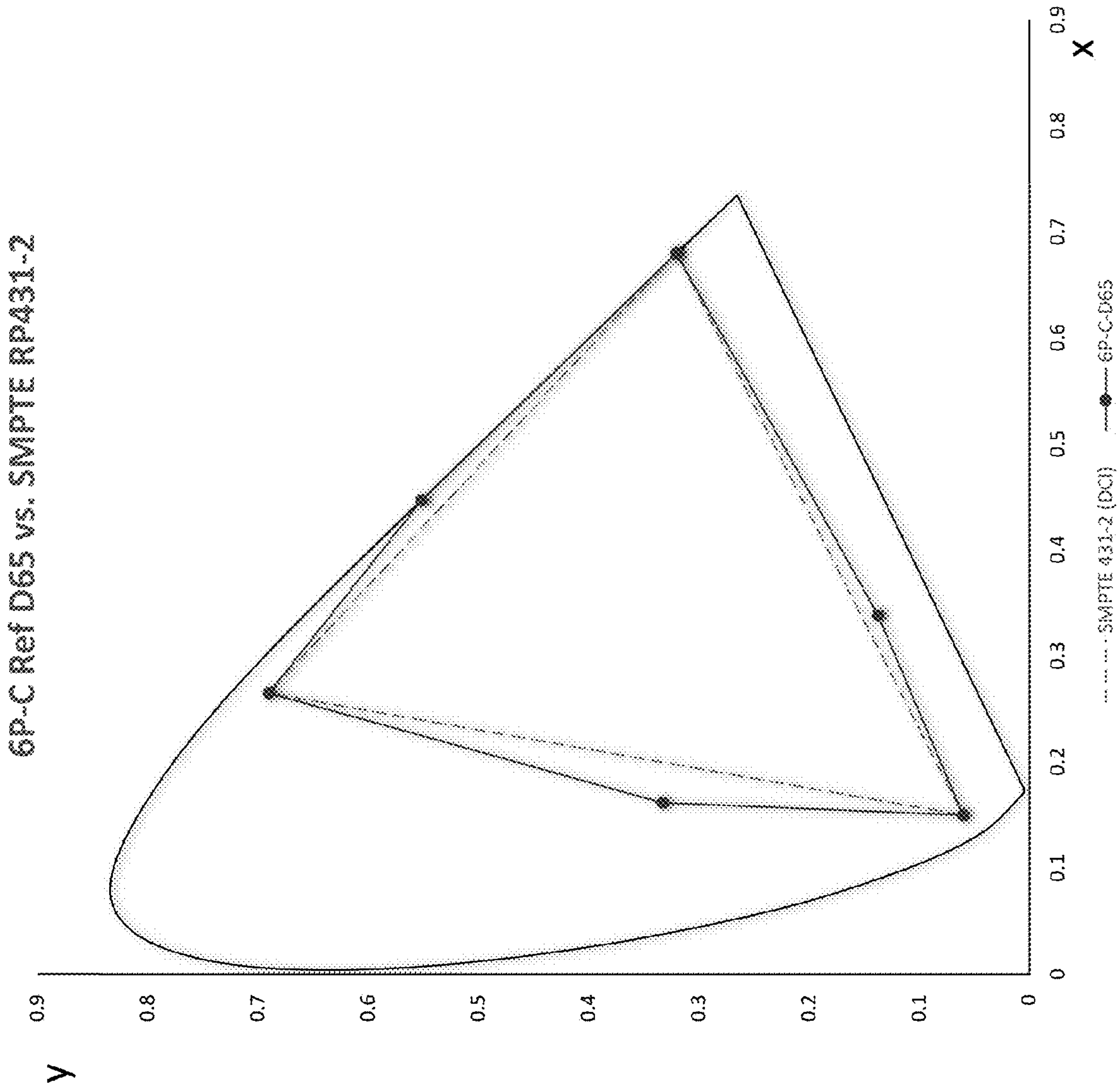
FIG. 3 illustrates yet another embodiment of a six primary system including a red primary, a green primary, a blue primary, a cyan primary, a magenta primary, and a yellow primary ("6P-C") compared to SMPTE RP431-2 for a D65 white point.

FIG. 3 illustrates 6P-C compared to SMPTE RP431-2 for a D65 white point.

Super 6P

Figure 4:
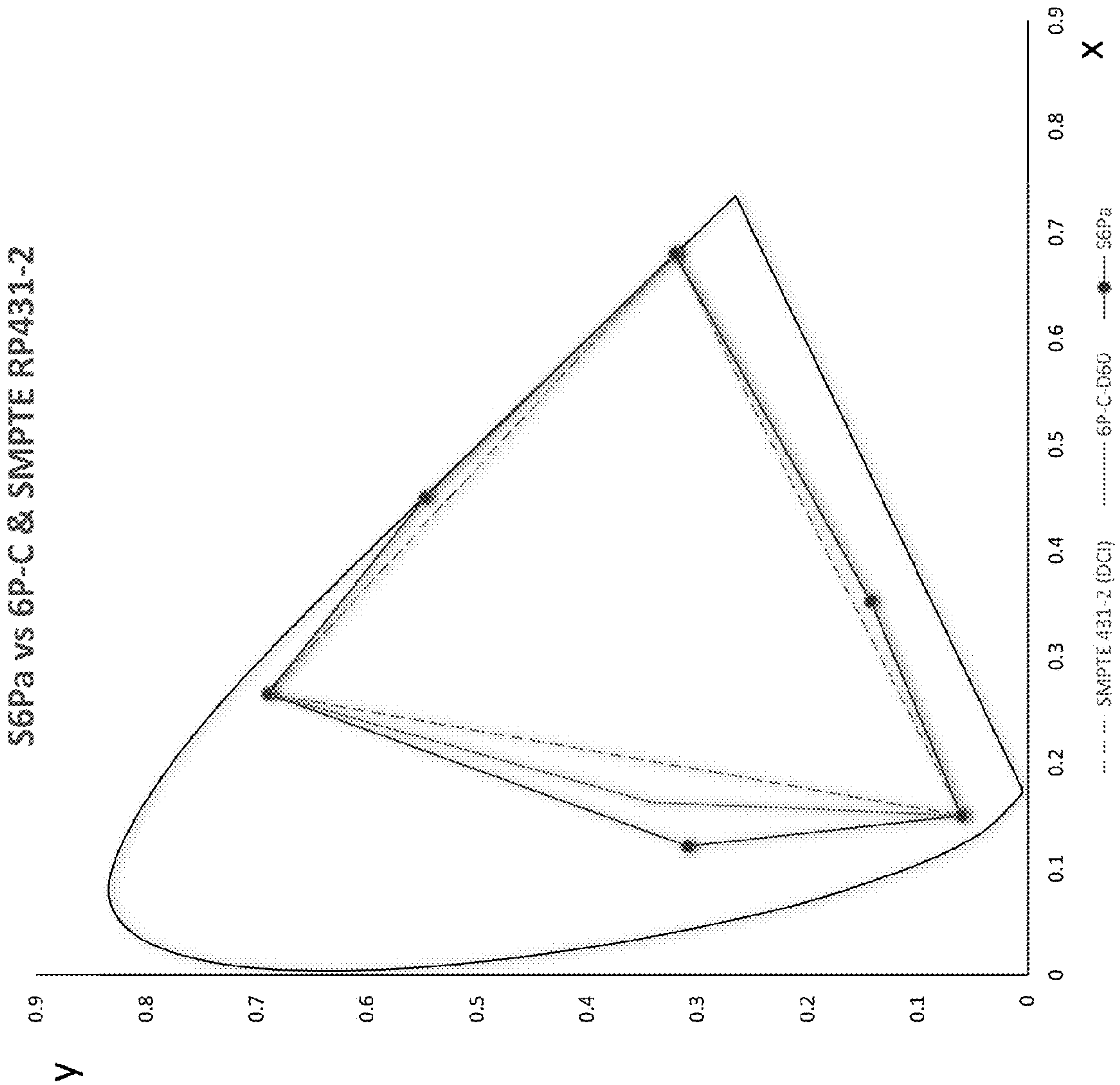
FIG. 4 illustrates Super 6 Pa compared to 6P-C.

One of the advantages of ITU-R BT.2020 is that it is operable to include all of the Pointer colors and that increasing primary saturation in a six-color primary design is also operable to do this. Pointer is described in "The Gamut of Real Surface Colors", M.R. Pointer, Published in Colour Research and Application Volume #5, Issue #3 (1980), which is incorporated herein by reference in its entirety. However, extending the 6P gamut beyond SMPTE RP431-2 ("6P-C") adds two problems. The first problem is the requirement to narrow the spectrum of the extended primaries. The second problem is the complexity of designing a backwards compatible system using color primaries that are not related to current standards. But in some cases, there is a need to extend the gamut beyond 6P-C and avoid these problems. If the goal is to encompass Pointer's data set, then it is possible to keep most of the 6P-C system and only change the cyan color primary position. In one embodiment, the cyan color primary position is located so that the gamut edge encompasses all of Pointer's data set. In another embodiment, the cyan color primary position is a location that limits maximum saturation. With 6P-C, cyan is positioned as u'=0.096, v'=0.454. In one embodiment of Super 6P, cyan is moved to u'=0.075, v'=0.430 ("Super 6 Pa" (S6 Pa)). Advantageously, this creates a new gamut that covers Pointer's data set almost in its entirety. FIG. 4 illustrates Super 6 Pa compared to 6P-C.

Table 4 is a table of values for Super 6 Pa. The definition of x,y are described in ISO 11664-3:2012/CIE S 014 Part 3, which is incorporated herein by reference in its entirety. The definition of u',v' are described in ISO 11664-5:2016/CIE S 014 Part 5, which is incorporated herein by reference in its entirety. λ defines each color primary as dominant color wavelength for RGB and complementary wavelengths CMY.

TABLE 4

| | x | y | u' | v' | λ |
|---|---|---|---|---|---|
| W (D60) | 0.3217 | 0.3377 | 0.2008 | 0.4742 | |
| W (D65) | 0.3127 | 0.3290 | 0.1978 | 0.4683 | |
| R | 0.6800 | 0.3200 | 0.4964 | 0.5256 | 615 nm |
| G | 0.2650 | 0.6900 | 0.0980 | 0.5777 | 545 nm |
| B | 0.1500 | 0.0600 | 0.1754 | 0.1579 | 465 nm |
| C | 0.1211 | 0.3088 | 0.0750 | 0.4300 | 490 nm |
| M | 0.3523 | 0.1423 | 0.3520 | 0.3200 | |
| Y | 0.4502 | 0.5472 | 0.2078 | 0.5683 | 570 nm |

Figure 5:
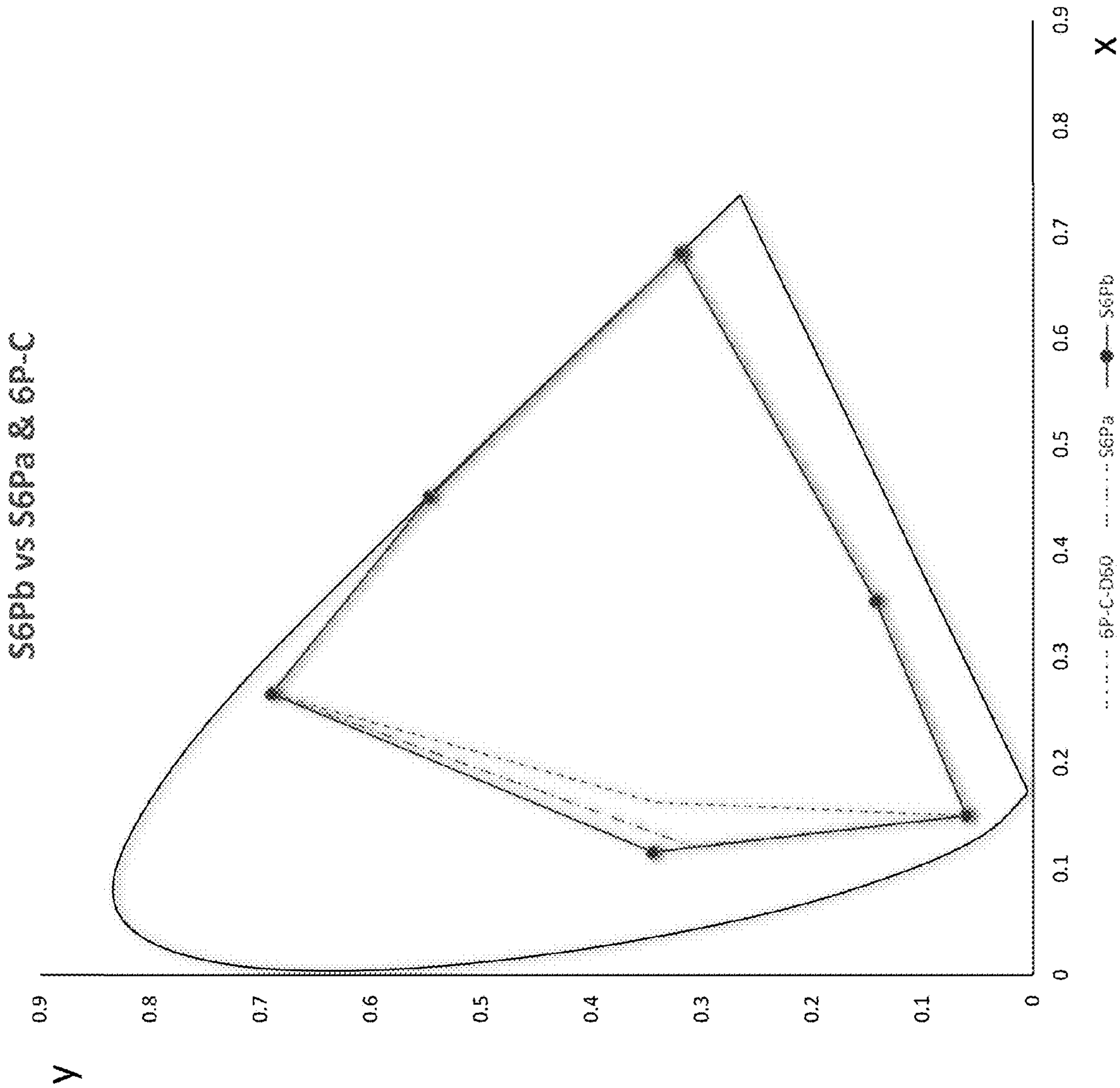
FIG. 5 illustrates Super 6Pb compared to Super 6 Pa and 6P-C.

In an alternative embodiment, the saturation is expanded on the same hue angle as 6P-C as shown in FIG. 5. Advantageously, this makes backward compatibility less complicated. However, this requires much more saturation (i.e., narrower spectra). In another embodiment of Super 6P, cyan is moved to u'=0.067, v'=0.449 ("Super 6Pb" (S6Pb)). Additionally, FIG. 5 illustrates Super 6Pb compared to Super 6 Pa and 6P-C.

Table 5 is a table of values for Super 6Pb. The definition of x,y are described in ISO 11664-3:2012/CIE S 014 Part 3, which is incorporated herein by reference in its entirety. The definition of u',v' are described in ISO 11664-5:2016/CIE S 014 Part 5, which is incorporated herein by reference in its entirety. $\lambda$ defines each color primary as dominant color wavelength for RGB and complementary wavelengths CMY.

TABLE 5

| | x | y | u' | v' | $\lambda$ |
|---|---|---|---|---|---|
| W (ACES D60) | 0.32168 | 0.33767 | 0.2008 | 0.4742 | |
| W (D65) | 0.3127 | 0.3290 | 0.1978 | 0.4683 | |
| R | 0.6800 | 0.3200 | 0.4964 | 0.5256 | 615 nm |
| G | 0.2650 | 0.6900 | 0.0980 | 0.5777 | 545 nm |
| B | 0.1500 | 0.0600 | 0.1754 | 0.1579 | 465 nm |
| C | 0.1156 | 0.3442 | 0.0670 | 0.4490 | 493 nm |
| M | 0.3523 | 0.1423 | 0.3520 | 0.3200 | |
| Y | 0.4502 | 0.5472 | 0.2078 | 0.5683 | 570 nm |

In a preferred embodiment, a matrix is created from XYZ values of each of the primaries. As the XYZ values of the primaries change, the matrix changes. Additional details about the matrix are described below.

Formatting and Transportation of Multi-Primary Signals

The present invention includes three different methods to format video for transport: System 1, System 2, and System 3. System 1 is comprised of an encode and decode system, which is operable to be divided into base encoder and digitation, image data stacking, mapping into the standard data transport, readout, unstack, and finally image decoding. In one embodiment, the basic method of this system is to combine opposing color primaries within the three standard transport channels and identify them by their code value.

System 2 uses a sequential method where three color primaries are passed to the transport format as full bit level image data and inserted as normal. The three additional channels are delayed by one pixel and then placed into the transport instead of the first colors. This is useful in situations where quantizing artifacts is critical to image performance. In one embodiment, this system is comprised of the six primaries (e.g., RGB plus a method to delay the CMY colors for injection), image resolution identification to allow for pixel count synchronization, start of video identification, and RGB Delay.

System 3 utilizes a dual link method where two wires are used. In one embodiment, a first set of three channels (e.g., RGB) are sent to link A and a second set of three channels (e.g., CMY) is sent to link B. Once they arrive at the image destination, they are recombined.

To transport up to six color components (e.g., four, five, or six), System 1, System 2, or System 3 is operable to be used as described. If four color components are used, two of the channels are set to "0". If five color components are used, one of the channels is set to "0". Advantageously, this transportation method works for all primary systems described herein that include up to six color components.

Comparison of Three Systems

Advantageously, System 1 fits within legacy SDI, CTA, and Ethernet transports.

Additionally, System 1 has zero latency processing for conversion to an RGB display. However, System 1 is limited to 11-bit words.

System 2 is advantageously operable to transport 6 channels using 16-bit words with no compression. Additionally, System 2 fits within newer SDI, CTA, and Ethernet transport formats. However, System 2 requires double bit rate speed. For example, a 4K image requires a data rate for an 8K RGB image.

In comparison, System 3 is operable to transport up to 6 channels using 16-bit words with compression and at the same data required for a specific resolution. For example, a data rate for an RGB image is the same as for a 6P image using System 3. However, System 3 requires a twin cable connection within the video system.

Nomenclature

In one embodiment, a standard video nomenclature is used to better describe each system.

R describes red data as linear light (e.g., without a non-linear function applied). G describes green data as linear light. B describes blue data as linear light. C describes cyan data as linear light. M describes magenta data as linear light. $Y^c$ and/or Y describe yellow data as linear light.

R' describes red data as non-linear light (e.g., with a non-linear function applied). G' describes green data as non-linear light. B' describes blue data as non-linear light. C' describes cyan data as non-linear light. M' describes magenta data as non-linear light. $Y^{c\prime}$ and/or Y' describe yellow data as non-linear light.

$Y_6$ describes the luminance sum of RGBCMY data. $Y_{RGB}$ describes a System 2 encode that is the linear luminance sum of the RGB data. $Y_{CMY}$ describes a System 2 encode that is the linear luminance sum of the CMY data.

$C_R$ describes the data value of red after subtracting linear image luminance. $C_B$ describes the data value of blue after subtracting linear image luminance. $C_C$ describes the data value of cyan after subtracting linear image luminance. $C_Y$ describes the data value of yellow after subtracting linear image luminance.

$Y'_{RGB}$ describes a System 2 encode that is the nonlinear luminance sum of the RGB data. $Y'_{CMY}$ describes a System 2 encode that is the nonlinear luminance sum of the CMY data. −Y describes the sum of RGB data subtracted from $Y_6$.

$C'_R$ describes the data value of red after subtracting nonlinear image luminance. $C'_B$ describes the data value of blue after subtracting nonlinear image luminance. $C'_C$ describes the data value of cyan after subtracting nonlinear image luminance. $C'_Y$ describes the data value of yellow after subtracting nonlinear image luminance.

B+Y describes a System 1 encode that includes either blue or yellow data. G+M describes a System 1 encode that includes either green or magenta data. R+C describes a System 1 encode that includes either green or magenta data.

$C_R+C_C$ describes a System 1 encode that includes either color difference data. $C_B+C_Y$ describes a System 1 encode that includes either color difference data.

4:4:4 describes full bandwidth sampling of a color in an RGB system. 4:4:4:4:4:4 describes full sampling of a color in an RGBCMY system. 4:2:2 describes an encode where a full bandwidth luminance channel (Y) is used to carry image detail and the remaining components are half sampled as a Cb Cr encode. 4:2:2:2:2 describes an encode where a full bandwidth luminance channel (Y) is used to carry image detail and the remaining components are half sampled as a Cb Cr Cy Cc encode. 4:2:0 describes a component system similar to 4:2:2, but where Cr and Cb samples alternate per line. 4:2:0:2:0 describes a component system similar to 4:2:2, but where Cr, Cb, Cy, and Cc samples alternate per line.

Constant luminance is the signal process where luminance (Y) values are calculated in linear light. Non-constant luminance is the signal process where luminance (Y) values are calculated in nonlinear light.

Deriving Color Components

When using a color difference method (4:2:2), several components need specific processing so that they are operable to be used in lower frequency transports. These are derived as:

$$Y'_6:=0.1063R'+0.23195Y^{c}{}'+0.3576G'+0.19685C+0.0361B'+0.0712M'$$

$$G'_6=\left(\frac{1}{0.3576Y}\right)-(0.1063R')-(0.0361B')-(0.19685C')-\left(0.23195Y^{C'}\right)-(0.0712M')$$

$$-Y'=Y'_6-(C'Y^{c}+M')$$

$$C'_R=\frac{R'-Y'_6}{1.7874}$$

$$C'_B=\frac{B'-Y'_6}{1.9278}$$

$$C'_C=\frac{C'-Y'_6}{1.6063}$$

$$C'_Y=\frac{Y^{C'}-Y'_6}{1.5361}$$

$$R'=\frac{C'_R-Y'_6}{1.7874}$$

$$B'=\frac{C'_B-Y'_6}{1.9278}$$

$$C'=\frac{C'-Y'_{6'}}{1.6063}$$

$$Y^{C'}=\frac{C'_Y-Y'_6}{1.5361}$$

The ratios for Cr, Cb, Cc, and Cy are also valid in linear light calculations.

Magenta is operable to be calculated as follows:

$$M'=\frac{B'+R'}{B'\times R'}\text{ or }M=\frac{B+R}{B\times R}$$

System 1

In one embodiment, the multi-primary color system is compatible with legacy systems. A backwards compatible multi-primary color system is defined by a sampling method. In one embodiment, the sampling method is 4:4:4. In one embodiment, the sampling method is 4:2:2. In another embodiment, the sampling method is 4:2:0. In one embodiment of a backwards compatible multi-primary color system, new encode and decode systems are divided into the steps of performing base encoding and digitization, image data stacking, mapping into the standard data transport, readout, unstacking, and image decoding ("System 1"). In one embodiment, System 1 combines opposing color primaries within three standard transport channels and identifies them by their code value. In one embodiment of a backwards compatible multi-primary color system, the processes are analog processes. In another embodiment of a backwards compatible multi-primary color system, the processes are digital processes.

In one embodiment, the sampling method for a multi-primary color system is a 4:4:4 sampling method. Black and white bits are redefined. In one embodiment, putting black at midlevel within each data word allows the addition of CMY color data.

Figure 6:
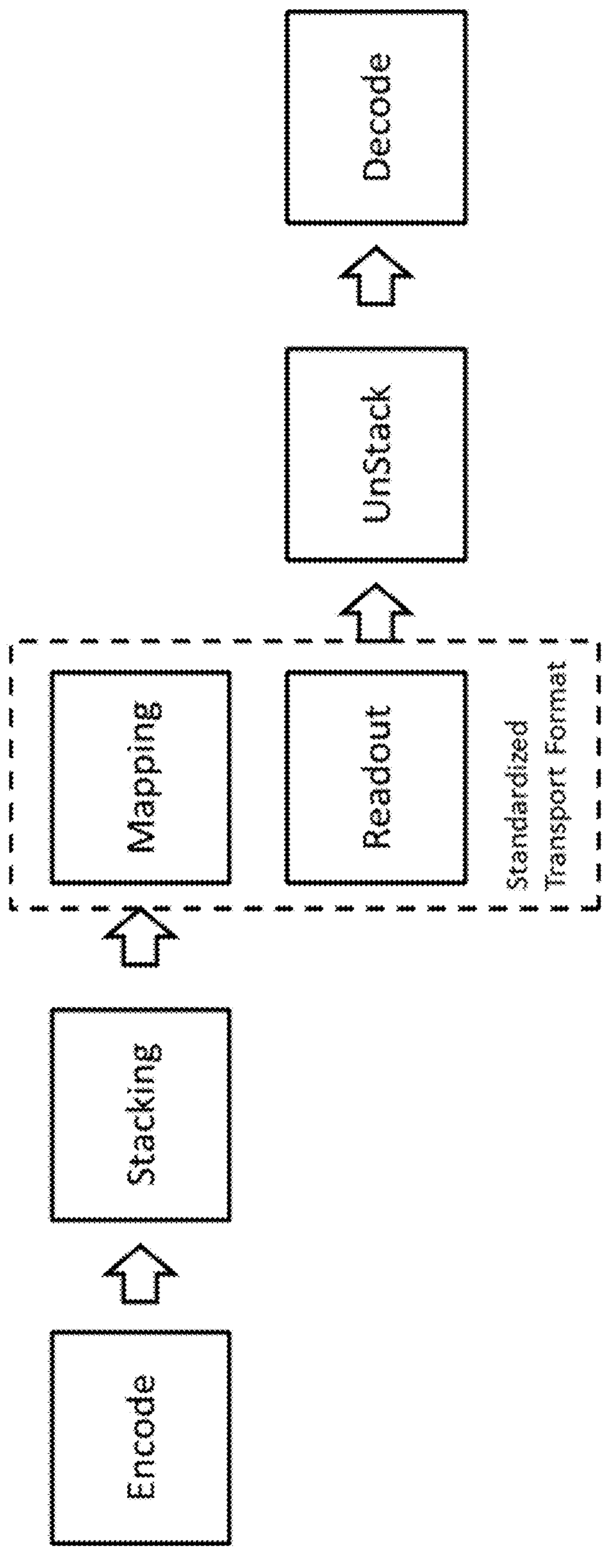
FIG. 6 illustrates an embodiment of an encode and decode system for a multi-primary color system.

FIG. 6 illustrates an embodiment of an encode and decode system for a multi-primary color system. In one embodiment, the multi-primary color encode and decode system is divided into a base encoder and digitation, image data stacking, mapping into the standard data transport, readout, unstack, and finally image decoding ("System 1"). In one embodiment, the method of this system combines opposing color primaries within the three standard transport channels and identifies them by their code value. In one embodiment, the encode and decode for a multi-primary color system are analog-based. In another embodiment, the encode and decode for a multi-primary color system are digital-based. System 1 is designed to be compatible with lower bandwidth systems and allows a maximum of 11 bits per channel and is limited to sending only three channels of up to six primaries at a time. In one embodiment, it does this by using a stacking system where either the color channel or the complementary channel is decoded depending on the bit level of that one channel.

System 2

Figure 7:
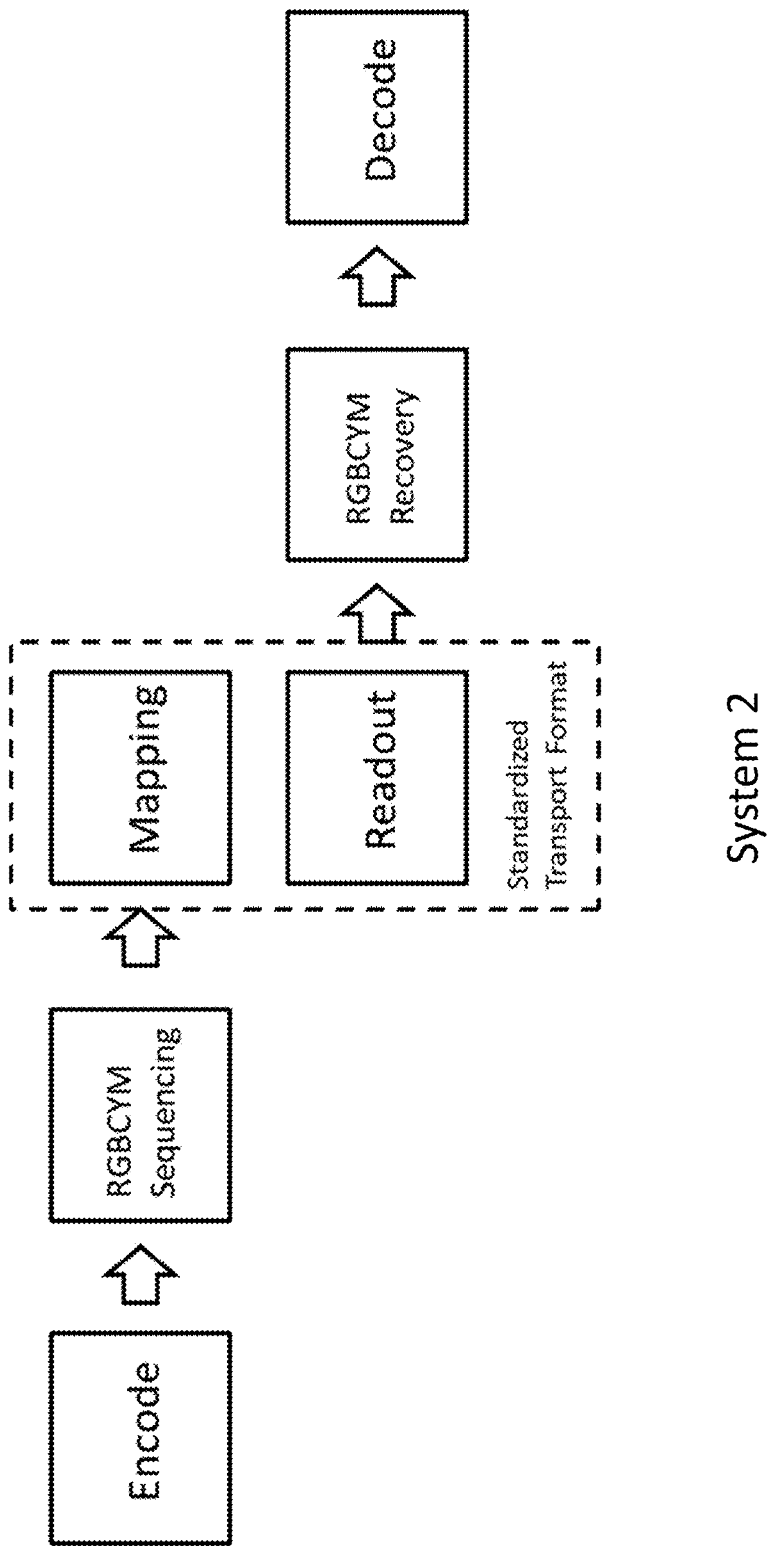
FIG. 7 illustrates a sequential method where three color primaries are passed to the transport format as full bit level image data and inserted as normal ("System 2").

FIG. 7 illustrates a sequential method where three color primaries are passed to the transport format as full bit level image data and inserted as normal ("System 2"). The three additional channels are delayed by one pixel and then placed into the transport instead of the first colors. This method is useful in situations where quantizing artifacts is critical to image performance. In one embodiment, this system is comprised of six primaries (RGBCMY), a method to delay the CMY colors for injection, image resolution identification to all for pixel count synchronization, start of video identification, RGB delay, and for YCCCCC systems, logic to select the dominant color primary. The advantage of System 2 is that full bit level video is operable to be transported, but at double the normal data rate.

System 2A

System 2 sequences on a pixel to pixel basis. However, a quadrature method is also possible ("System 2A") that is operable to transport six primaries in stereo or twelve primary image information. Each quadrant of the frame contains three color primary data sets. These are combined in the display. A first set of three primaries is displayed in the upper left quadrant, a second set of three primaries is displayed in the upper right quadrant, a third set of primaries is displayed in the lower left quadrant, and a fourth set of primaries is displayed in lower right quadrant. In one embodiment, the first set of three primaries, the second set of three primaries, the third set of three primaries, and the fourth set of three primaries do not contain any overlapping primaries (i.e., twelve different primaries). Alternatively, the first set of three primaries, the second set of three primaries, the third set of three primaries, and the fourth set of three primaries contain overlapping primaries (i.e., at least one primary is contained in more than one set of three primaries). In one embodiment, the first set of three primaries and the third set of three primaries contain the same primaries and the second set of three primaries and the fourth set of three primaries contain the same primaries.

Figure 8A:
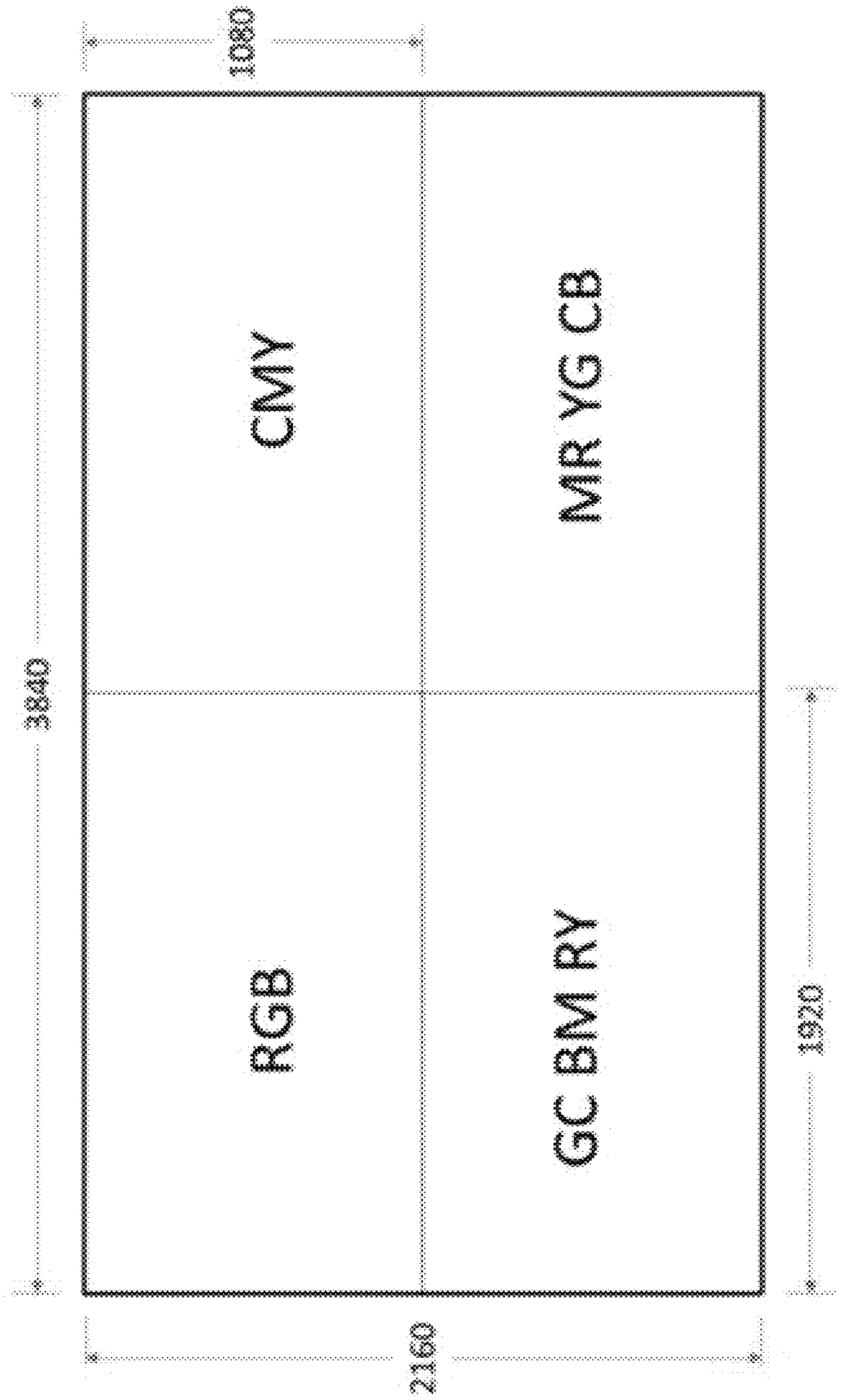
FIG. 8A illustrates one embodiment of a quadrature method ("System 2A").

FIG. 8A illustrates one embodiment of a quadrature method ("System 2A"). In the example shown in FIG. 8A, a first set of three primaries (e.g., RGB) is displayed in the upper left quadrant, a second set of three primaries (e.g., CMY) is displayed in the upper right quadrant, a third set of three primaries (e.g., GC, BM, and RY) is displayed in the lower left quadrant, and a fourth set of three primaries (e.g., MR, YG, and CB) is displayed in the lower right quadrant. Although the example shown in FIG. 8A illustrates a backwards compatible 12P system, this is merely for illustrative purposes. The present invention is not limited to the twelve primaries shown in FIG. 8A. Additionally, alternative pixel arrangements are compatible with the present invention.

Figure 8B:
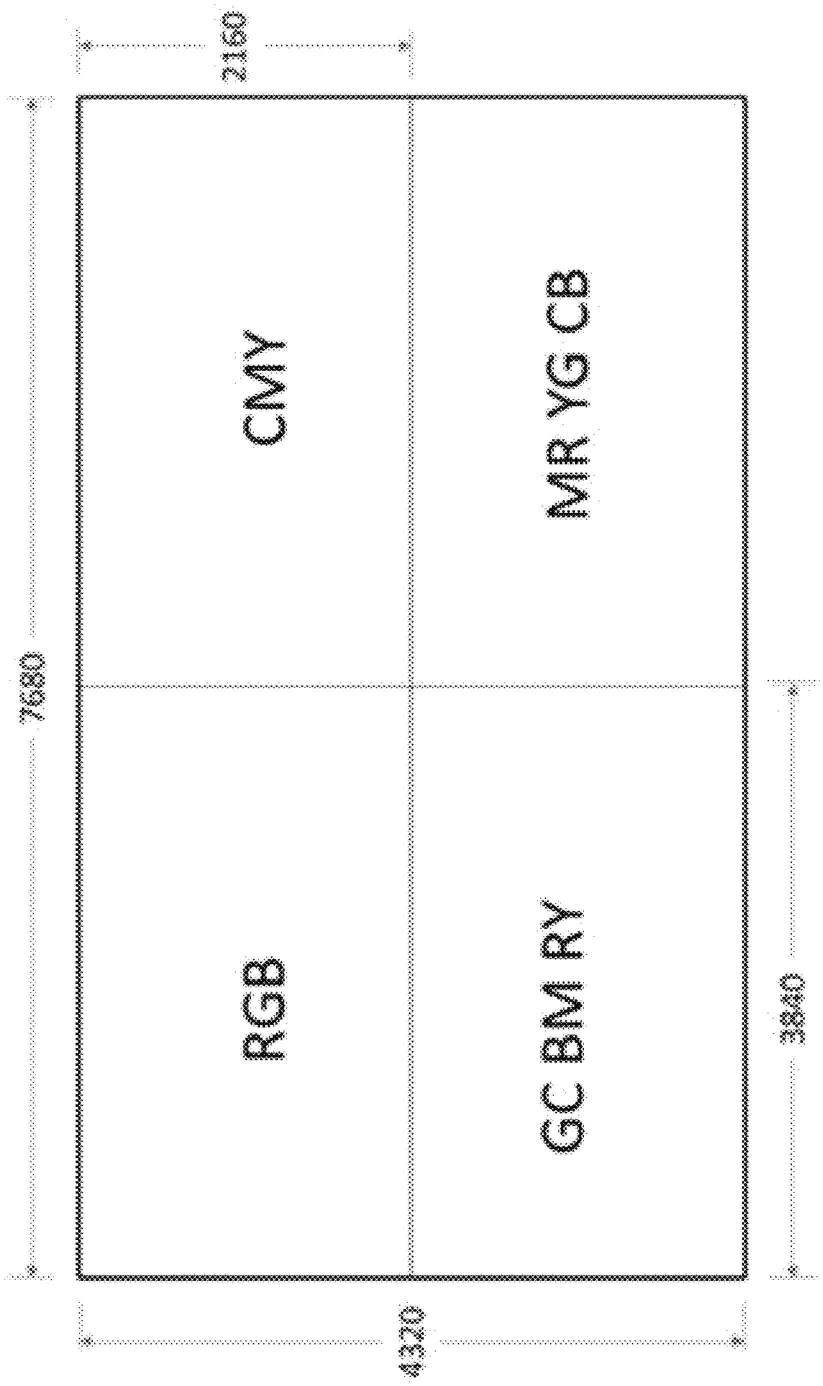
FIG. 8B illustrates another embodiment of a quadrature method ("System 2A").

FIG. 8B illustrates another embodiment of a quadrature method ("System 2A"). In the example shown in FIG. 8B, a first set of three primaries (e.g., RGB) is displayed in the upper left quadrant, a second set of three primaries (e.g., CMY) is displayed in the upper right quadrant, a third set of three primaries (e.g., GC, BM, and RY) is displayed in the lower left quadrant, and a fourth set of three primaries (e.g., MR, YG, and $C_B$) is displayed in the lower right quadrant. Although the example shown in FIG. 8B illustrates a backwards compatible 12P system, this is merely for illustrative purposes. The present invention is not limited to the twelve primaries shown in FIG. 8B. Additionally, alternative pixel arrangements are compatible with the present invention.

Figure 8C:
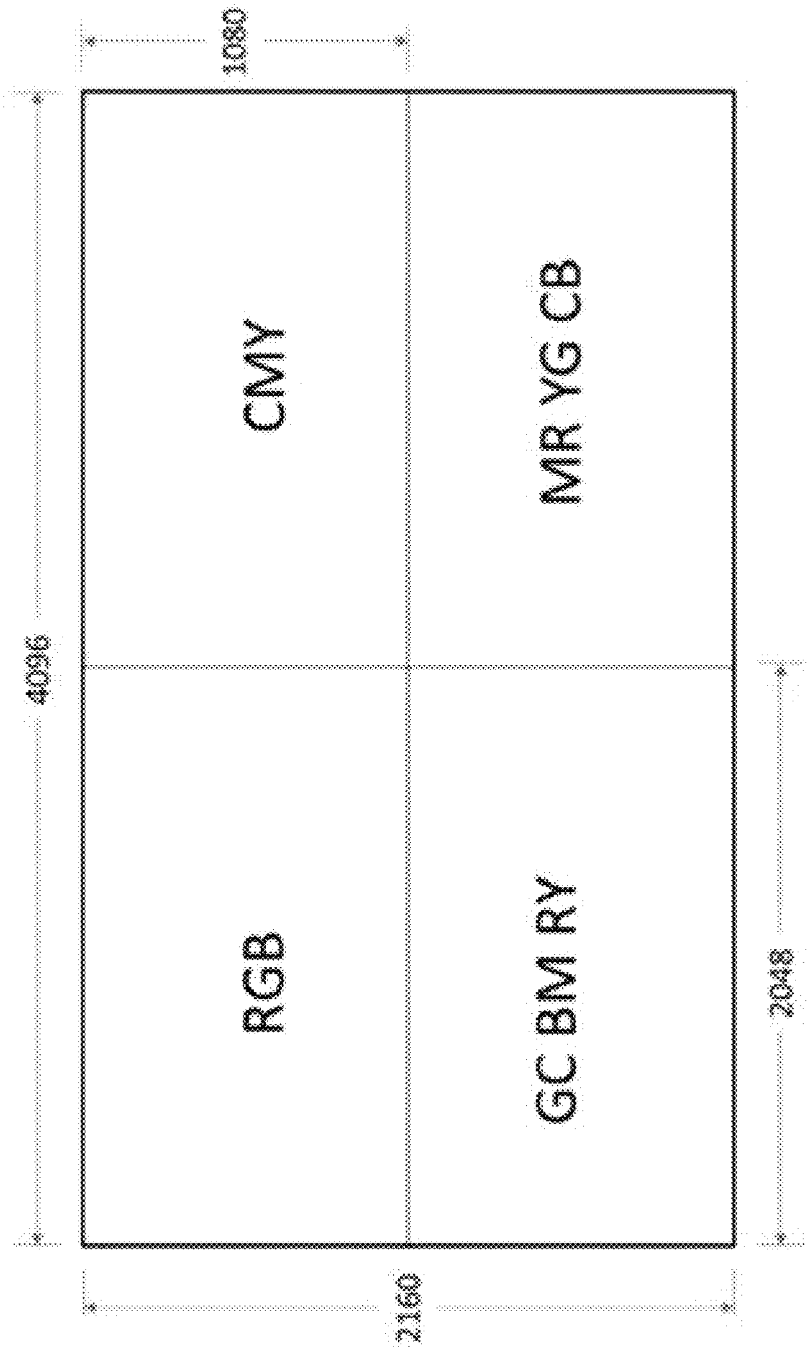
FIG. 8C illustrates yet another embodiment of a quadrature method ("System 2A").

FIG. 8C illustrates yet another embodiment of a quadrature method ("System 2A"). In the example shown in FIG. 8C, a first set of three primaries (e.g., RGB) is displayed in the upper left quadrant, a second set of three primaries (e.g., CMY) is displayed in the upper right quadrant, a third set of three primaries (e.g., GC, BM, and RY) is displayed in the lower left quadrant, and a fourth set of three primaries (e.g., MR, YG, and CB) is displayed in the lower right quadrant. Although the example shown in FIG. 8C illustrates a backwards compatible 12P system, this is merely for illustrative purposes. The present invention is not limited to the twelve primaries shown in FIG. 8C. Additionally, alternative pixel arrangements are compatible with the present invention.

Figure 9A:
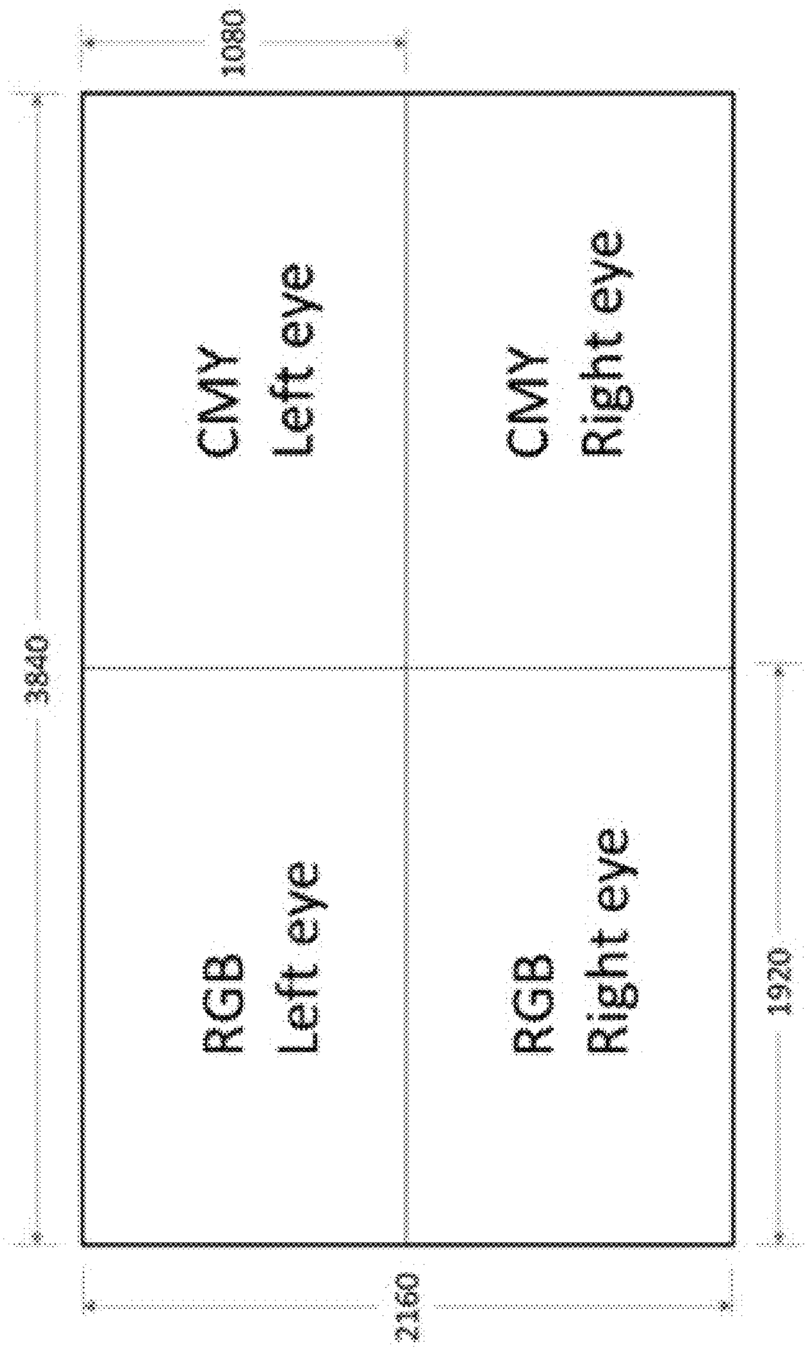
FIG. 9A illustrates an embodiment of a stereo quadrature method ("System 2A").

FIG. 9A illustrates an embodiment of a quadrature method ("System 2A") in stereo. In the example shown in FIG. 9A, a first set of three primaries (e.g., RGB) is displayed in the upper left quadrant, a second set of three primaries (e.g., CMY) is displayed in the upper right quadrant, a third set of three primaries (e.g., RGB) is displayed in the lower left quadrant, and a fourth set of three primaries (e.g., CMY) is displayed in the lower right quadrant. This embodiment allows for separation of the left eye with the first set of three primaries and the second set of three primaries and the right eye with the third set of three primaries and the fourth set of three primaries. Alternatively, a first set of three primaries (e.g., RGB) is displayed in the upper left quadrant, a second set of three primaries (e.g., RGB) is displayed in the upper right quadrant, a third set of three primaries (e.g., CMY) is displayed in the lower left quadrant, and a fourth set of three primaries (e.g., CMY) is displayed in the lower right quadrant. Alternative pixel arrangements and primaries are compatible with the present invention.

Figure 9B:
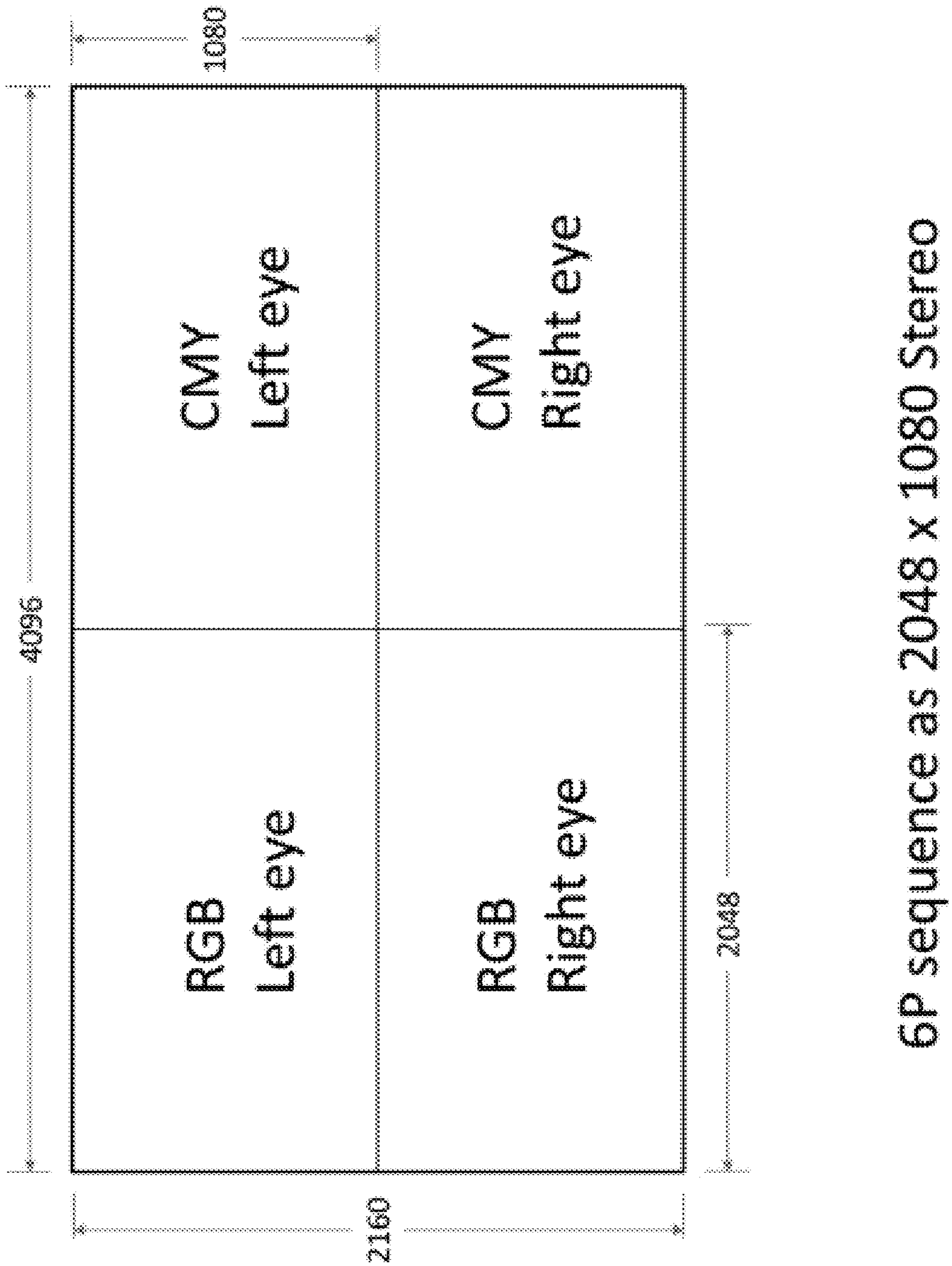
FIG. 9B illustrates another embodiment of a stereo quadrature method ("System 2A").

FIG. 9B illustrates another embodiment of a quadrature method ("System 2A") in stereo. Alternative pixel arrangements and primaries are compatible with the present invention.

Figure 9C:
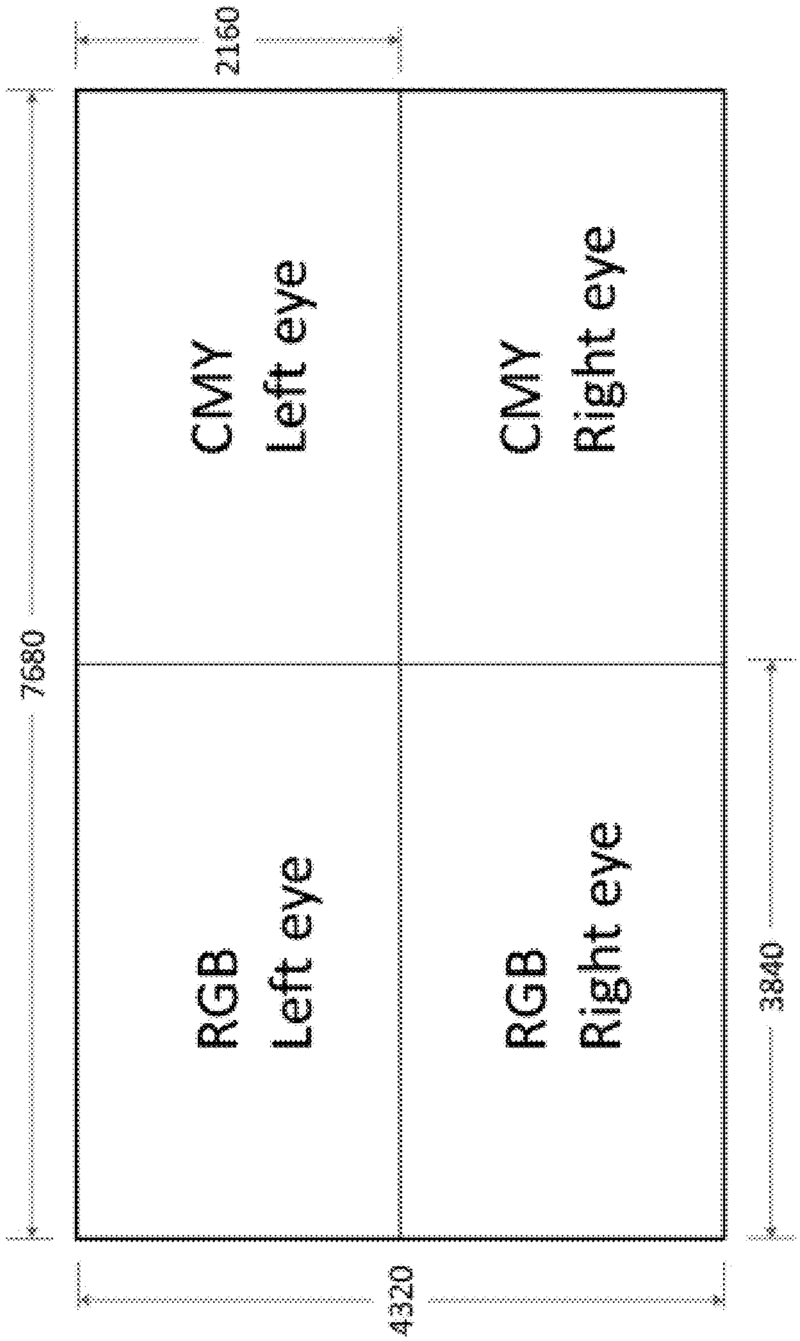
FIG. 9C illustrates yet another embodiment of a stereo quadrature method ("System 2A").

FIG. 9C illustrates yet another embodiment of a quadrature method ("System 2A") in stereo. Alternative pixel arrangements and primaries are compatible with the present invention.

Advantageously, System 2A allows for the ability to display multiple primaries (e.g., 12P and 6P) on a conventional monitor. Additionally, System 2A allows for a simplistic viewing of false color, which is useful in the production process and allows for visualizing relationships between colors. It also allows for display of multiple projectors (e.g., a first projector, a second projector, a third projector, and a fourth projector).

System 3

Figure 10:
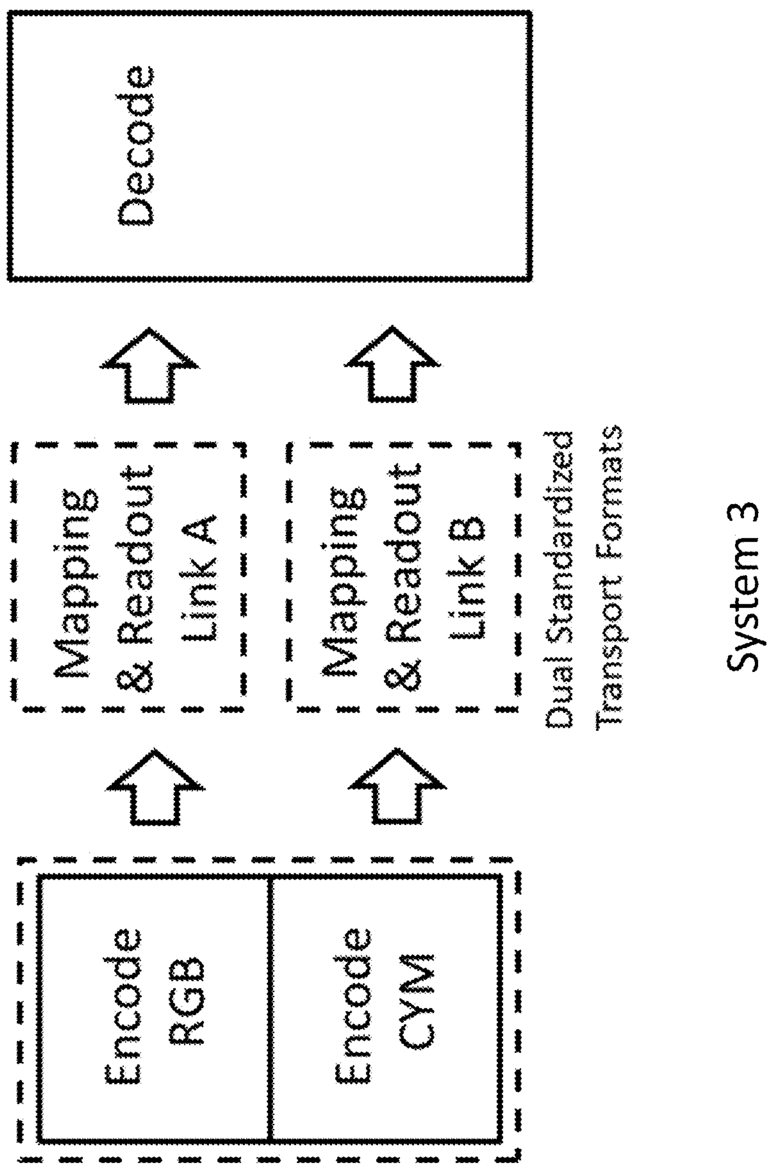
FIG. 10 illustrates one embodiment of a system encode and decode process using a dual link method ("System 3").

FIG. 10 illustrates one embodiment of a system encode and decode process using a dual link method ("System 3"). System 3 utilizes a dual link method where two wires are used. In one embodiment, RGB is sent to link A and CMY is sent to link B. After arriving at the image destination, the two links are recombined. Alternative primaries are compatible with the present invention.

System 3 is simpler and more straight forward than Systems 1 and 2. The advantage with this system is that adoption is simply to format non-RGB primaries (e.g., CMY) on a second link. So, in one example, for an SDI design, RGB is sent on a standard SDI stream just as it is currently done. There is no modification to the transport and this link is operable to be sent to any RGB display requiring only the compensation for the luminance difference because the non-RGB (e.g., CMY) components are not included. Data for the non-RGB primaries (e.g., CMY data) is transported in the same manner as RGB data. This data is then combined in the display to make up a 6P image. The downside is that the system requires two wires to move one image. This system is operable to work with most any format including SMPTE ST292, 424, 2082, and 2110. It also is operable to work with dual HDMI/CTA connections. In one embodiment, the system includes at least one transfer function (e.g., OETF, EOTF).

Figure 11:
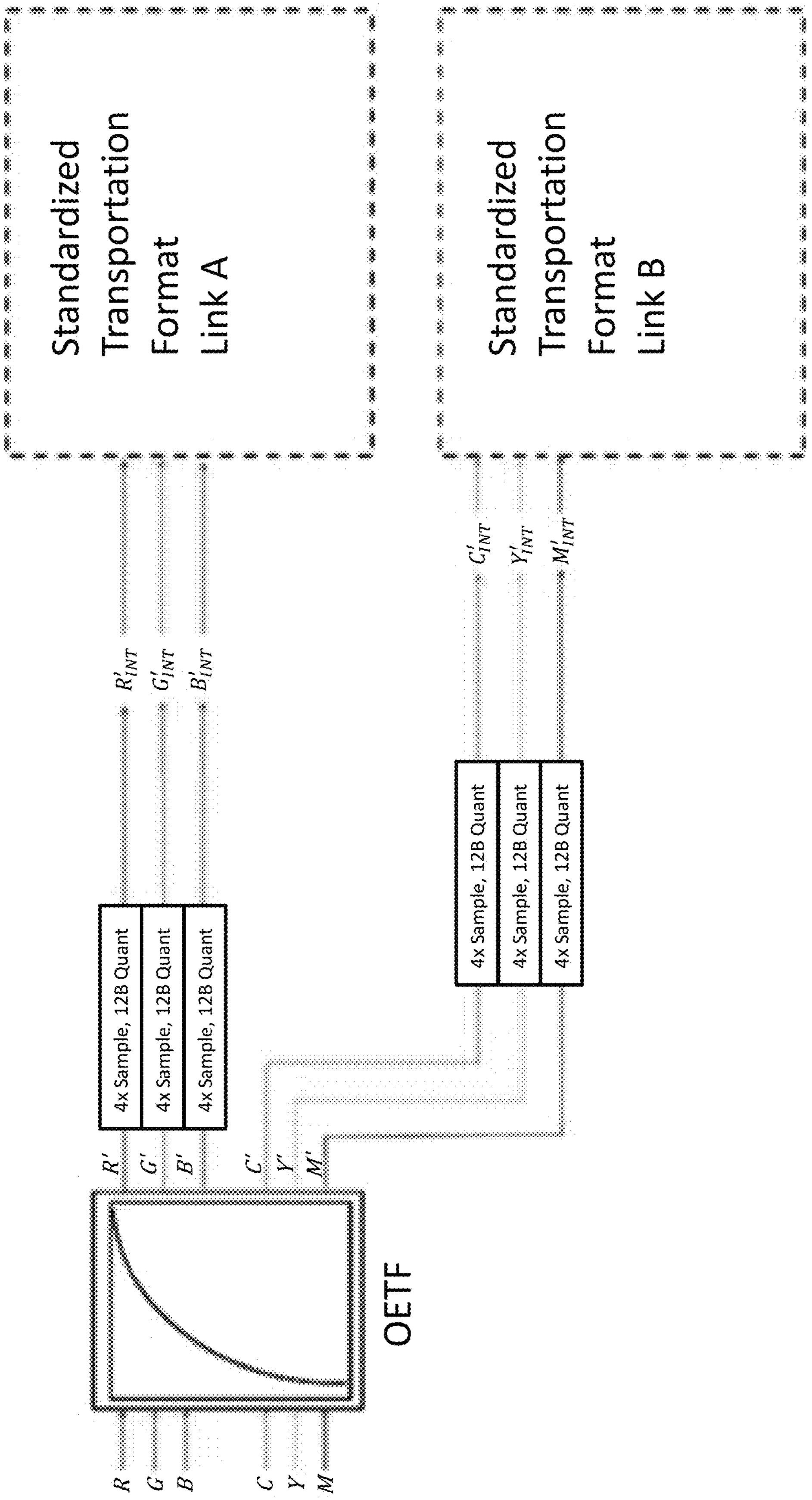
FIG. 11 illustrates one embodiment of an encoding process using a dual link method.

FIG. 11 illustrates one embodiment of an encoding process using a dual link method. Alternative numbers of primaries and alternative primaries are compatible with the present invention.

Figure 12:
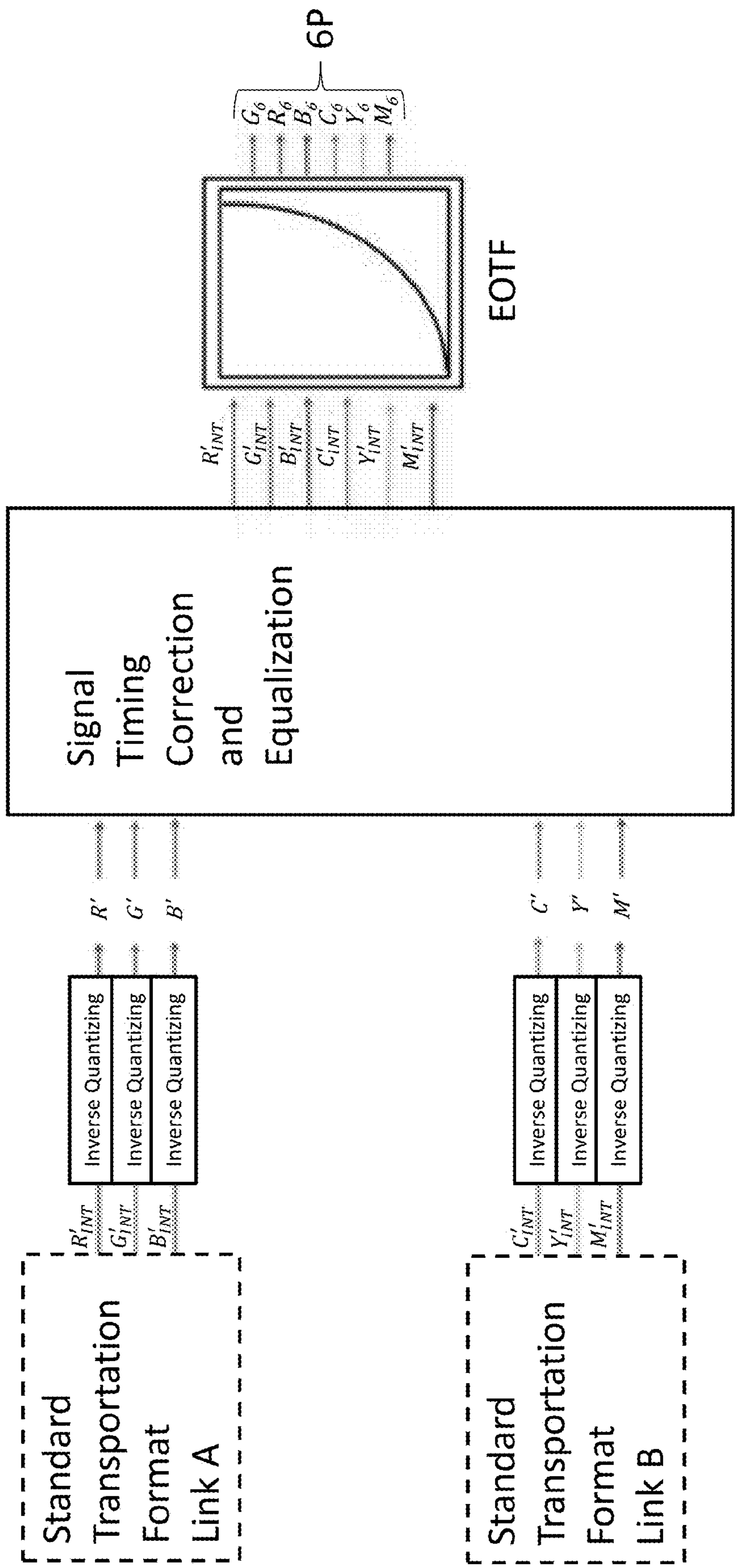
FIG. 12 illustrates one embodiment of a decoding process using a dual link method.

FIG. 12 illustrates one embodiment of a decoding process using a dual link method. Alternative numbers of primaries and alternative primaries are compatible with the present invention.

System 4

Color is generally defined by three component data levels (e.g., RGB, YCbCr). A serial data stream must accommodate a word for each color contributor (e.g., R, G, B). Use of more than three primaries requires accommodations to fit this data based on an RGB concept. This is why System 1, System 2, and System 3 use stacking, sequencing, and/or dual links. Multiple words are required to define a single pixel, which is inefficient because not all values are needed. In one embodiment, System 4 includes, but is not limited to, Yxy, L*a*b*, $IC_TC_P$, YCbCr, YUV, Yu'v', YPbPr, YIQ, OkLab, LMS, Mlm, and/or XYZ. The previously mentioned color spaces are all based on a set of three human spectral response functions.

In a preferred embodiment, color is defined as a colorimetric coordinate. Thus, every color is defined by three words. Serial systems are already based on three color contributors (e.g., RGB, YCrCb). System 4 preferably uses XYZ or Yxy as the three color contributors. System 4 more preferably uses Yxy as the three color contributors. In another preferred embodiment, System 4 uses Yu'v' as the three color contributors. System 4 preferably uses two colorimetric coordinates and a luminance or a luma. In a preferred embodiment, System 4 uses color formats described in CIE and/or ISO colorimetric standards. In a preferred embodiment, System 4 uses color contributors that are independent of a white point and/or a reference white value. Alternatively, System 4 uses color contributors that are not independent of a white point and/or a reference white value (e.g., YCbCr, L*a*b*). In another embodiment, System 4 uses color contributors that require at least one known primary.

Advantageously, Yxy does not require reference to a white point and/or at least one known primary. While YUV and/or L*a*b are plausible solutions, both are based on the CIE 1931 standard observer and would require additional processing with no gain in accuracy or gamut coverage when compared to Yxy. While XYZ is the basis for YUV and L*a*b, both require additional mathematical conversions beyond those required by Yxy. For example, x and y must be calculated before calculating a*b*. Additionally, YUV requires converting back to RGB and then converting to YUV via a known white point and color primaries. The reliance on a known white point also requires additional processing (e.g., chromatic adaptation) if the display white point is different from the encoded white point. Further, the 3×3 matrix used in the conversion of RGB to YUV has negative values that impact the chrominance because the values are centered around 0 and can have positive and negative values, while luminance can only be positive. In comparison, although Yxy is derived from XYZ, it advantageously only deals with positive coefficients. In addition, because luminance is only in Y, as brightness is reduced, chrominance is not affected. However, in YUV, the chrominance gets less contrast as brightness is reduced. Because Y is independent, it does not have to be calculated within xy because these are just data points for color, and not used for calculating luminance.

In yet another embodiment, L*C*h or other non-rectangular coordinate systems (e.g., cylindrical, polar) are compatible with the present invention. In one embodiment, a polar system is defined from Yxy by converting x,y to a hue angle (e.g., θ=arctan(y/x)) and a magnitude vector (e.g., r) that is similar to C* in an L*C*h polar system. However, when converting Yxy to a polar system, θ is restricted from 0 to 90 degrees because x and y are always non-negative. In one embodiment, the θ angle is expanded by applying a transform (e.g., an affine transform) to x, y data wherein the x, y values of the white point of the system (e.g., D65) are subtracted from the x, y data such that the x, y data includes negative values. Thus, θ ranges from 0 to 360 degrees and the polar plot of the Yxy data is operable to occupy more than one quadrant.

The Digital Cinema Initiative (DCI) defined the file format for distribution to theaters using an XYZ format. The reason for adopting XYZ was specifically to allow adaptation of new display technologies of the future. By including every color possible within a 3D space, legacy content would be compatible with any new display methods. This system has been in place since 2005.

While XYZ works very well within the closed infrastructure of digital cinema, it has drawbacks once it is used in other applications (e.g., broadcast, streaming). The reason for this is that many applications have limits on signal bandwidth. Both RGB and XYZ contain luminance in all three channels, which requires a system where each subpixel uses discrete image information. To get around this, a technology is employed to spread color information over several pixel areas. The logic behind this is that (1) image detail is held in the luminance component of the image and (2) resolution of the color areas is operable to be much lower without an objectionable loss of picture quality. Therefore, methods such as $YP_BP_R$, $YC_BC_R$, and $IC_TC_P$ are used to move images. Using color difference encoding with image subsampling allows quality images to be moved at lower signal bandwidths. Thus, RGB or XYZ only utilize a 4:4:4 sampling system, while $YC_BC_R$ is operable be implemented as a 4:4:4, 4:2:2, 4:1:1, or a 4:2:0 sampled system.

There is a long-standing, unmet need for a system operable to describe more than an RGB image. In a preferred embodiment, the present invention advantageously uses Yxy or Yu'v' to describe images outside of an RGB gamut. Further, the Yxy or Yu'v' system is operable to transmit data using more than three primaries (e.g., more than RGB). The Yxy or Yu'v' system advantageously provides for all color possibilities to be presented to the display. Further, the Yxy or Yu'v' system bridges the problems between scene referred and display referred imaging. In an end-to-end system, with a defined white point and EOTF, image data from a camera or graphics generator must conform to the defined display. With the advent of new displays and the use of High Dynamic Range displays, this often requires that the source image data (e.g., scene referred) be re-authored for the particular display (e.g., display referred). A scene-referred workflow refers to manipulating an image prior to its transformation from camera color space to display color space. The ease with which XYZ or ACES 0 are operable to be used to color time, then move to Yxy or Yu'v' to meet the display requirements, allows for a smoother approach to the display not losing any of the color values and keeping the color values as positive values. This is an advantage of Yxy or Yu'v', even if an image is only manipulated after it has been transformed from camera color space to display color space as displayed referred imaging. The Yxy or Yu'v' system is agnostic to both the camera data and the display characteristics, thus simplifying the distribution of electronic images. The Yxy or Yu'v' system of the present invention additionally does not increase data payloads and is operable to be substituted into any RGB file or transport system. Additionally, xy or u'v' information is operable to be subsampled, allowing for 4:2:2, 4:1:1, and 4:2:0 packaging. The present invention also does not require specific media definitions to address limits in a display gamut. Displays with different color primaries (e.g., multi-primary display) are operable to display the same image if the color falls within the limits of that display using the Yxy or Yu'v' system of the present invention. The Yxy or Yu'v' system also allows for the addition of more primaries to fill the visual spectrum, reducing metameric errors. Color fidelity is operable to extend beyond the prior art R+G+B=W model. Displays with any number of color primaries and various white points are operable to benefit from the use of a Yxy or Yu'v' approach to define one media source encode for all displays. Conversion from wide gamut cameras to multi-primary displays is operable to be accomplished using a multiple triad conversion method, which is operable to reside in the display, thereby simplifying transmission of image data.

Out of gamut information is operable to be managed by the individual display, not by the media definitions. Luminance is described only in one channel (Y), and because xy or u'v' do not contain any luminance information, a change in Y is independent of hue or chroma, making conversions between SDR and HDR simpler. Any camera gamut is operable to be coded into a Yxy or Yu'v' encode, and only minor modifications are required to implement a Yxy or Yu'v' system. Conversion from Yxy or Yu'v' to RGB is simple, with minimal latency processing and is completely compatible with any legacy RGB system.

There is also a long-standing, unmet need for a system that replaces optically-based gamma functions with a code efficient non-linearity method (e.g., data rate reduction (DRR)). DRR is operable to optimize data efficiency and simplify image display. Further, DRR is not media or display specific. By using a data efficient non-linearity instead of a representation of an optical gamma, larger data words (e.g., 16-bit float) are operable to be preserved as 12-bit, 10-bit, or 8-bit integer data words.

As previously described, the addition of primaries is simplified by the Yxy or Yu'v' process. Further, the brightness of the display is advantageously operable to be increased by adding more primaries. When brightness is delivered in a range from 0 to 1, the image brightness is operable to be scaled to any desired display brightness using DRR.

XYZ needs 16-bit float and 32-bit float encode or a minimum of 12 bits for gamma or log encoded images for better quality. Transport of XYZ must be accomplished using a 4:4:4 sample system. Less than a 4:4:4 sample system causes loss of image detail because Y is used as a coordinate along with X and Z and carries color information, not a value. Further, X and Z are not orthogonal to Y and, therefore, also include luminance information. Advantageously, converting to Yxy (or Yu'v') concentrates the luminance in Y only, leaving two independent and pure chromaticity values. In a preferred embodiment, X, Y, and Z are used to calculate x and y. Alternatively, X, Y, and Z are used to calculate u' and v'.

However, if Y or an equivalent component is used as a luminance value with two independent colorimetric coordinates (e.g., x and y, u' and v', u and v, etc.) used to describe color, then a system using subsampling is possible because of differing visual sensitivity to color and luminance. In one embodiment, I or L* components are used instead of Y. In one embodiment, I and/or L* data is created from XYZ via a matrix conversion to LMS values. In one embodiment, L* has a non-linear form that uses a power function of ⅓. In one embodiment, I has a non-linear curve applied (e.g., PQ, HLG). For example, and not limitation, in the case of ICtCp, in one embodiment, I has a power function of 0.43 applied (e.g., in the case of ITP). The system is operable to use any two independent colorimetric coordinates with similar properties to x and y, u' and v', and/or u and v. In a preferred embodiment, the two independent colorimetric coordinates are x and y and the system is a Yxy system. In another preferred embodiment, the two colorimetric coordinates are u' and v' and the system is a Yu'v' system. Advantageously, the two independent colorimetric coordinates (e.g., x and y, u' and v') are independent of a white point. Further, this reduces the complexity of the system when compared to XYZ, which includes a luminance value for all three channels (i.e., X, Y, and Z). Further, this also provides an advantage for subsampling (e.g., 4:2:2, 4:2:0 and 4:1:1). In one embodiment, other systems (e.g., $IC_TC_P$ and L*a*b*) require a white point in calculations. However, a conversion matrix using the white point of [1,1,1] is operable to be used for $IC_TC_P$ and L*a*b*, which would remove the white point reference. The white point reference is operable to then be recaptured because it is the white point of [1,1,1] in XYZ space. In a preferred embodiment, the image data includes a reference to at least one white point.

Current technology uses components derived from the legacy NTSC television system. Encoding described in SMPTE, ITU, and CTA standards includes methods using subsampling as 4:2:2, 4:2:0, and 4:1:1. Advantageously, this allows for color transportation of more than three primaries, including, but not limited to, at least four primaries, at least five primaries, at least six primaries, at least seven primaries, at least eight primaries, at least nine primaries, at least ten primaries, at least eleven primaries, and/or at least twelve primaries (e.g., through a SMPTE ST292 or an HDMI 1.2 transport). In one embodiment, color transportation of more than three primaries occurs through SMPTE defined Serial Digital Interfaces (SDI), HDMI, or Display Port digital display interfaces. In one embodiment, color transportation of more than three primaries occurs through an imaging serial data stream format.

System 1, System 2, and System 3 use a YCbCr expansion to transport six color primary data sets, and the same transport (e.g., a YCbCr expansion) is operable to accommodate the image information as Yxy where Y is the luminance information and x,y describe CIE 1931 color coordinates in the half sample segments of the data stream (e.g., 4:2:2). The same transport (e.g., a YCbCr expansion) is also operable to accommodate the image information as Yu'v', where Y is the luminance information and u' and v' describe CIE 1976 color coordinates in the half sample segments of the data stream (e.g., 4:2:2). Alternatively, x,y or u',v' are fully sampled (e.g., 4:4:4). In yet another embodiment, the sampling rate is 4:2:0 or 4:1:1. In still another embodiment, the same transport is operable to accommodate the information as luminance and colorimetric coordinates other than x,y (e.g., u',v'). In one embodiment, the same transport is operable to accommodate data set using one channel of luminance data and two channels of colorimetric data. Alternatively, the same transport is operable to accommodate the image information as Yu'v' with full sampling (e.g., 4:4:4) or partial sampling (e.g., 4:2:2, 4:2:0, 4:1:1). In one embodiment, the same transport is used with full sampling (e.g., XYZ).

Advantageously, there is no need to add more channels, nor is there any need to separate the luminance information from the color components. Further, for example, x,y have no reference to any primaries because x,y are explicit colorimetric positions. In the Yxy space, x and y are chromaticity coordinates such that x and y are operable to be used to define a gamut of visible color. Similarly, in the Yu'v' space, u' and v' are explicit colorimetric positions. It is possible to define a gamut of visible color in other formats (e.g., L*a*b*, $IC_TC_P$, YCbCr), but it is not always trivial. For example, while L*a*b* and $IC_TC_P$ are colorimetric and are operable to describe any visible color, YCbCr is constrained to the available colors within the RGB primary color triad. Further, $IC_TC_P$ requires a gamut limitation/description before it is operable to encode color information.

To determine if a color is visible in Yxy space, it must be determined if the sum of x and y is greater than or equal to zero. If not, the color is not defined. If the x,y point is within the CIE x,y locus (CIE horseshoe), the color is visible. If not, the color is not visible. Similarly, if a u',v' point is within the CIE u',v' locus (CIE horseshoe), the color is visible. The Yxy chromaticity diagram is non-linear, such that there is not a vector of unit magnitude operable to represent the difference between two chromaticities that is uniformly visible. Advantageously, Yu'v' reduces non-uniformity present in Yxy systems and is perceptually more uniform than Yxy.

The Y value plays a role especially in a display. In one embodiment, the display is operable to reproduce an x,y color within a certain range of Y values, wherein the range is a function of the primaries. In another embodiment, the display is operable to reproduce a u',v' color within a certain range of Y values, wherein the range is a function of the primaries. Another advantage is that an image is operable to be sent as linear data (e.g., without a non-linear function applied) with a non-linear function (e.g., electro-optical transfer function (EOTF)) added after the image is received, rather than requiring a non-linear function (e.g., OETF) applied to the signal. This allows for a much simpler encode and decode system. In one embodiment, only Y, L*, or I are altered by a non-linear function. Alternatively, Y, L*, or I are sent linearly (e.g., without a non-linear function applied). In a preferred embodiment, a non-linear function is applied to all three channels (e.g., Yxy, Yu'v'). Advantageously, applying the non-linear function to all three channels provides data compression.

Figure 13:
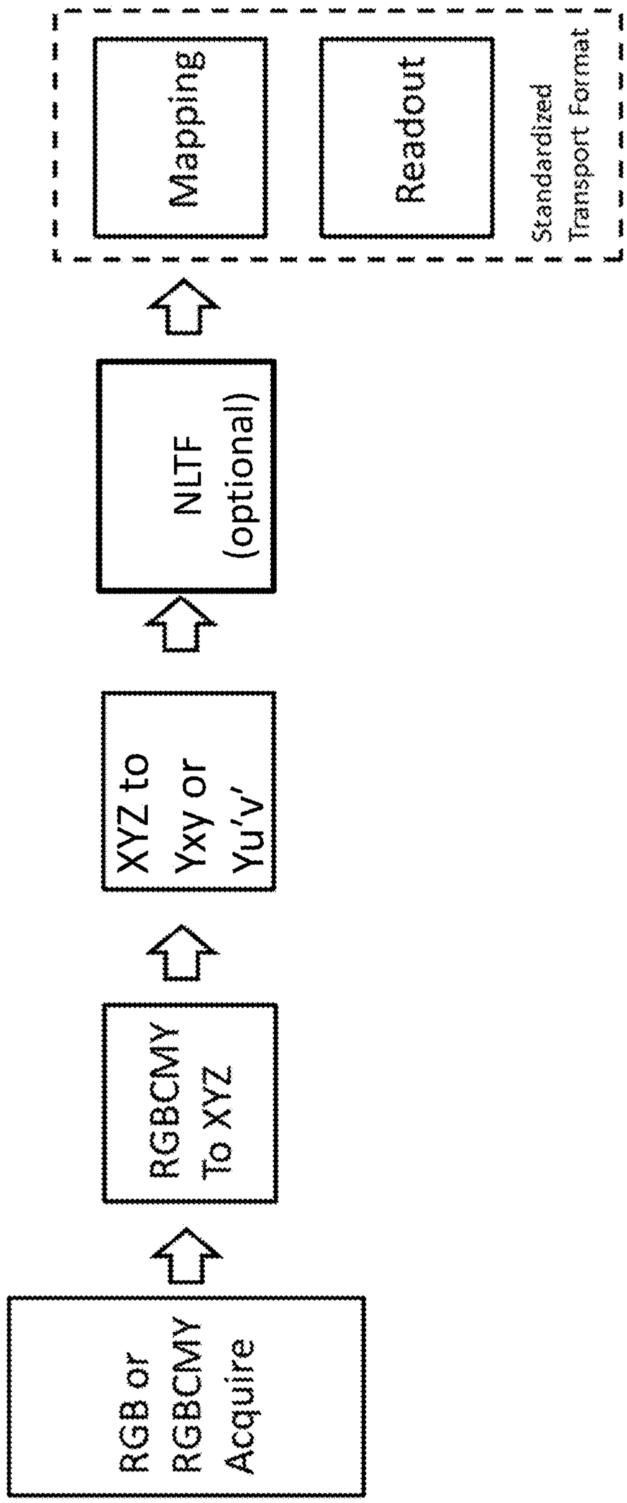
FIG. 13 illustrates one embodiment of a Yxy or Yu'v' encode with a non-linear transfer function (NLTF).

FIG. 13 illustrates one embodiment of a Yxy or Yu'v' encode with a non-linear transfer function (NLTF). Image data is acquired in any format (e.g., RGB, RGBCMY, CMYK) operable to be converted to XYZ linear data. The XYZ data is then converted to Yxy or Yu'v' data, and the Yxy or Yu'v' data is processed through an NLTF. The processed Yxy or Yu'v' data is then converted to a standardized transportation format for mapping and readout. Advantageously, in one embodiment, x and y remain as independent colorimetric coordinates and the non-linear transfer function is only applied to Y, thus providing simpler decoding of x and y values. In one embodiment, u' and v' remain as independent colorimetric coordinates and the non-linear transfer function is only applied to Y, thus providing simpler decoding of u' and v' values. In another embodiment, advantageously, application of the NLTF to all three channels provides compression in the system. In one embodiment, the NLTF is described in ITU-R BT.2100 or ITU-R BT.1886. Advantageously, Y is orthogonal to x and y, and remains orthogonal to x and y even when a non-linear function is applied. Y is also orthogonal to u' and v', and remains orthogonal to u' and v' even when a non-linear function is applied. Although the example shown includes Yxy and Yu'v' data, System 4 is compatible with a plurality of data formats including data formats using one luminance coordinate and two colorimetric coordinates.

There are many different RGB sets so the matrix used to convert the image data from a set of RGB primaries to XYZ will involve a specific solution given the RGB values:

$$\begin{bmatrix} X \\ Y \\ Z \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R \\ G \\ B \end{bmatrix}$$

In an embodiment where the image data is 6P-B data, the following equation is used to convert to XYZ data:

$$\begin{bmatrix} X \\ Y \\ Z \end{bmatrix}_{D65} = \begin{bmatrix} 0.4124000 & 0.3576000 & 0.1805000 & 0.1574900 & 0.3427600 & 0.4502060 \\ 0.2126000 & 0.7152000 & 0.0721998 & 0.3132660 & 0.1347200 & 0.5520130 \\ 0.0193001 & 0.1192000 & 0.9505000 & 0.4814200 & 0.5866620 & 0.0209755 \end{bmatrix} \begin{bmatrix} R \\ G \\ B \\ C \\ M \\ Y \end{bmatrix}_{6P-B}$$

In an embodiment where the image data is 6P-C data with a D60 white point, the following equation is used to convert to XYZ data:

$$\begin{bmatrix} X \\ Y \\ Z \end{bmatrix}_{D60_{ACES}} = \begin{bmatrix} 0.50836664 & 0.26237069 & 0.18337670 & 0.15745217 & 0.36881328 & 0.42784843 \\ 0.23923145 & 0.68739938 & 0.07336917 & 0.33094114 & 0.14901541 & 0.52004327 \\ -0.0001363 & 0.04521596 & 0.96599714 & 0.47964602 & 0.52900498 & 0.00242485 \end{bmatrix} \begin{bmatrix} R \\ G \\ B \\ C \\ M \\ Y \end{bmatrix}_{6P-C_{refD60}}$$

In an embodiment where the image data is 6P-C data with a D65 white point, the following equation is used to convert to XYZ data:

$$\begin{bmatrix} X \\ Y \\ Z \end{bmatrix}_{D65} = \begin{bmatrix} 0.48657095 & 0.26566769 & 0.19821729 & 0.32295962 & -0.54969800 & 1.177199435 \\ 0.22897456 & 0.69173852 & 0.07928691 & 0.67867175 & -0.22203240 & 0.543360700 \\ 0.00000000 & 0.04511338 & 1.04394437 & 0.98336936 & -0.78858190 & 0.894270250 \end{bmatrix} \begin{bmatrix} R \\ G \\ B \\ C \\ M \\ Y \end{bmatrix}_{6P-C_{refD65}}$$

To convert the XYZ data to Yxy data, the following equations are used:

$$x = \frac{X}{(X+Y+Z)}$$

$$y = \frac{Y}{(X+Y+Z)}$$

To convert the XYZ data to Yu'v' data, the following equations are used:

$$u' = \frac{4X}{X+15Y+3Z}$$

-continued $$v' = \frac{9Y}{X+15Y+3Z}$$

To convert x,y data to u',v' data, the following equations are used:

$$u' = \frac{4x}{-2x+12y+3}$$

-continued $$v' = \frac{9y}{-2x+12y+3}$$

In one embodiment, LMS data is transformed to a projected representation using the following equations:

$$l = \frac{L}{(L+M+S)}$$

$$m = \frac{M}{(L+M+S)}$$

$$s = 1.0 - l - m$$

In contrast with Yxy and Yu'v', where the Y is the tristimulus relative luminance, the M channel, which is the closest to the Y response is not exactly Y. The projected representation is operable to be used analogous to Yxy as Mlm. Alternatively, the projected representation is operable to be used as Ylm where lms is operable to be transformed back to XYZ via a 3×3 matrix.

In one embodiment, to convert XYZ data to LMS data with equal-energy illuminants, the following equation is used:

$$\begin{bmatrix} L \\ M \\ S \end{bmatrix}_E = \begin{bmatrix} 0.38971 & 0.68898 & -0.07868 \\ -0.22981 & 1.18340 & 0.04641 \\ 0.00000 & 0.00000 & 1.00000 \end{bmatrix} \begin{bmatrix} X \\ Y \\ Z \end{bmatrix}$$

In one embodiment, to convert XYZ data to LMS data normalized to D65, the following equation is used:

$$\begin{bmatrix} L \\ M \\ S \end{bmatrix}_{D65} = \begin{bmatrix} 0.4002 & 0.7076 & -0.0808 \\ -0.2263 & 1.1653 & 0.0457 \\ 0 & 0 & 0.9182 \end{bmatrix} \begin{bmatrix} X \\ Y \\ Z \end{bmatrix}$$

In one embodiment, to convert LMS data to XYZ data, the Hunt-Pointer-Estevez matrix is used as shown below:

$$\begin{bmatrix} X \\ Y \\ Z \end{bmatrix} = \begin{bmatrix} 1.91020 & -1.11212 & 0.20191 \\ 0.37095 & 0.62905 & 0.00000 \\ 0.00000 & 0.00000 & 1.00000 \end{bmatrix} \begin{bmatrix} L \\ M \\ S \end{bmatrix}$$

The XYZ data from the above equation is operable to be rescaled by using a ratio of $Y_{original}$ to $Y_{matrix}$ using the following equation:

$$\begin{bmatrix} X \\ Y \\ Z \end{bmatrix}_{rescaled} = \frac{Y_{original}}{Y_{matrix}} \begin{bmatrix} X \\ Y \\ Z \end{bmatrix}_{matrix}$$

Figure 14:
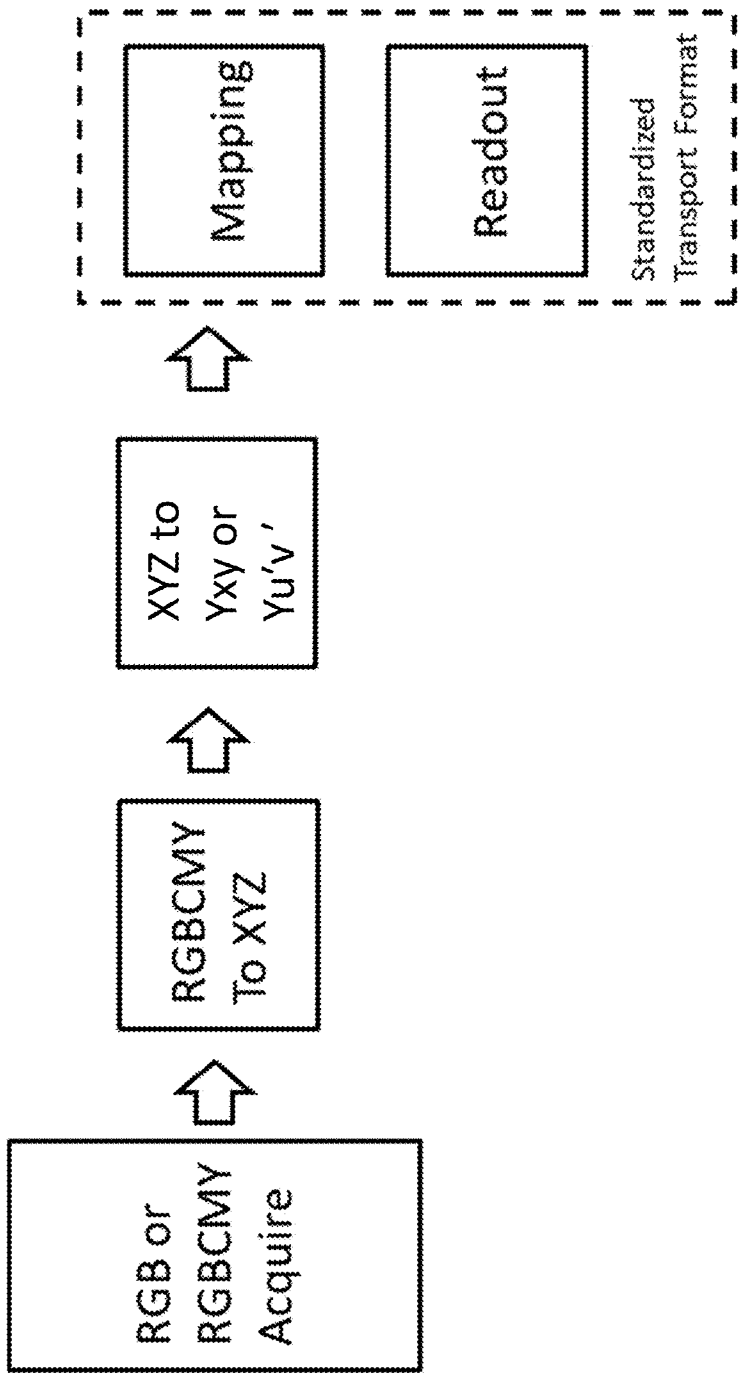
FIG. 14 illustrates one embodiment of a Yxy or Yu'v' encode without an NLTF.

FIG. 14 illustrates one embodiment of a Yxy or Yu'v' encode without an NLTF. Image data is acquired in any format (e.g., RGB, RGBCMY, CMYK) operable to be converted to XYZ data. The XYZ data is then converted to Yxy or Yu'v' data, and then converted to a standardized transportation format for mapping and readout. Although the example in FIG. 14 shows a Yxy or Yu'v' encode, System 4 is operable to be used with a plurality of data formats.

Figure 15:
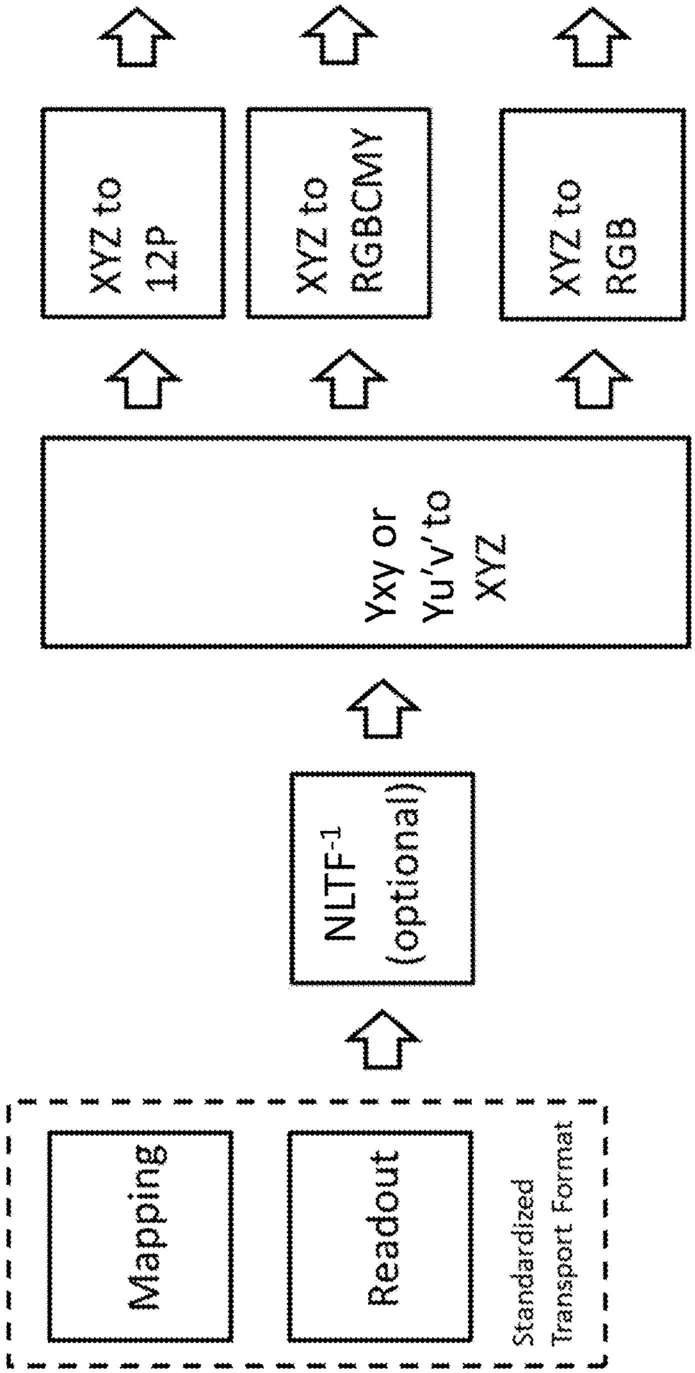
FIG. 15 illustrates one embodiment of a Yxy or Yu'v' decode with an inverse non-linear transfer function ($NLTF^{-1}$).

FIG. 15 illustrates one embodiment of a Yxy or Yu'v' decode with an inverse non-linear transfer function ($NLTF^{-1}$). After mapping and readout, the data is processed through an $NLTF^{-1}$ to yield the Yxy or Yu'v' data. The Yxy or Yu'v' data is then converted back to the XYZ data. The XYZ data is operable to be converted to multiple data formats including, but not limited to, RGB, CMYK, 6P (e.g., 6P-B, 6P-C), and gamuts including at least four primaries through at least twelve primaries. Although the example in FIG. 15 shows a Yxy or Yu'v' decode, System 4 is operable to be used with a plurality of data formats.

Finally, the XYZ data must converted to the correct standard color space. In an embodiment where the color gamut used is a 6P-B color gamut, the following equations are used:

$$\begin{bmatrix} R \\ G \\ B \end{bmatrix}_{6P-B} = \begin{bmatrix} 3.240625 & -1.537208 & -0.498629 \\ -0.968931 & 1.875756 & 0.041518 \\ 0.055710 & -0.204021 & 1.056996 \end{bmatrix} \begin{bmatrix} X \\ Y \\ Z \end{bmatrix}_{D65}$$

$$\begin{bmatrix} C \\ M \\ Y \end{bmatrix}_{6P-B} = \begin{bmatrix} -3.496203 & 2.798197 & 1.400100 \\ 2.822710 & -2.324505 & 0.589173 \\ 1.295195 & 0.790883 & -0.938342 \end{bmatrix} \begin{bmatrix} X \\ Y \\ Z \end{bmatrix}_{D65}$$

In an embodiment where the color gamut used is a 6P-C color gamut with a D60 white point, the following equations are used:

$$\begin{bmatrix} R \\ G \\ B \end{bmatrix}_{6P-C_{refD60}} = \begin{bmatrix} 2.402666 & -0.897456 & -0.388041 \\ -0.832567 & 1.769204 & 0.023712 \\ 0.038833 & -0.082520 & 1.036625 \end{bmatrix} \begin{bmatrix} X \\ Y \\ Z \end{bmatrix}_{D60_{ACES}}$$

$$\begin{bmatrix} C \\ M \\ Y \end{bmatrix}_{6P-C_{refD60}} = \begin{bmatrix} -2.959036 & 2.427947 & 1.379050 \\ 2.695538 & -2.220786 & 0.647402 \\ 1.116577 & 1.007431 & -1.061986 \end{bmatrix} \begin{bmatrix} X \\ Y \\ Z \end{bmatrix}_{D60_{ACES}}$$

In another embodiment where the color used is a 6P-C color gamut with a D65 white point, the following equations are used:

$$\begin{bmatrix} R \\ G \\ B \end{bmatrix}_{6P-C_{refD65}} = \begin{bmatrix} 2.479190 & -0.919911 & -0.400759 \\ -0.829514 & 1.762731 & 0.023585 \\ 0.036423 & -0.076852 & 0.957005 \end{bmatrix} \begin{bmatrix} X \\ Y \\ Z \end{bmatrix}_{D65}$$

$$\begin{bmatrix} C \\ M \\ Y \end{bmatrix}_{6P-C_{refD65}} = \begin{bmatrix} -3.020525 & 2.444939 & 1.309331 \\ 2.686642 & -2.180032 & 0.575266 \\ 1.198493 & 0.982883 & -1.030246 \end{bmatrix} \begin{bmatrix} X \\ Y \\ Z \end{bmatrix}_{D65}$$

In an embodiment where the color gamut used is an ITU-R BT709.6 color gamut, the matrices are as follows:

$$\begin{bmatrix} R \\ G \\ B \end{bmatrix}_{BT\text{-}709} = \begin{bmatrix} 3.2405 & -1.5371 & -0.4985 \\ -0.9693 & 1.8760 & 0.0416 \\ 0.0556 & -0.2040 & 1.0572 \end{bmatrix} \begin{bmatrix} X \\ Y \\ Z \end{bmatrix}$$

In an embodiment where the color gamut used is a SMPTE RP431-2 color gamut, the matrices are as follows:

$$\begin{bmatrix} R \\ G \\ B \end{bmatrix}_{RP431} = \begin{bmatrix} 2.7254 & -1.0180 & -0.4402 \\ -0.7952 & 1.6897 & 0.0226 \\ 0.0412 & -0.0876 & 1.1009 \end{bmatrix} \begin{bmatrix} X \\ Y \\ Z \end{bmatrix}$$

In an embodiment where the color gamut used is an ITU-R BT.2020/2100 color gamut, the matrices are as follows:

$$\begin{bmatrix} R \\ G \\ B \end{bmatrix}_{BT2020} = \begin{bmatrix} 1.7166512 & -0.3556708 & -0.2533663 \\ -0.6666844 & 1.6164812 & 0.0157685 \\ 0.0176399 & -0.0427706 & 0.9421031 \end{bmatrix} \begin{bmatrix} X \\ Y \\ Z \end{bmatrix}$$

To convert the Yxy data to the XYZ data, the following equations are used:

$$X = \left(\frac{x}{y}\right)Y$$

$$Z = \left(\frac{(1 - x - y)}{y}\right)Y$$

To convert the Yu'v' data to the XYZ data, the following equations are used:

$$X = \left(\frac{9u'}{4v'}\right)Y$$

$$Z = \left(\frac{12 - 3u' - 20v'}{4v'}\right)Y$$

Figure 16:
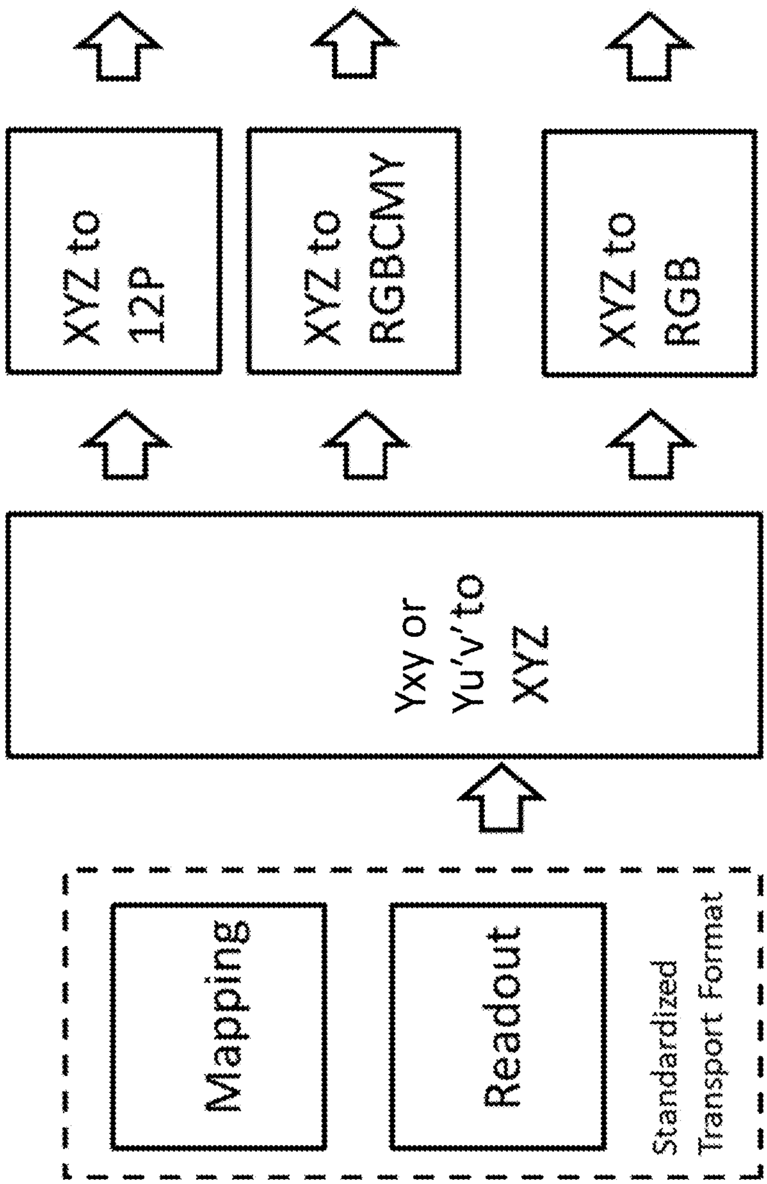
FIG. 16 illustrates one embodiment of a Yxy or Yu'v' decode without an $NLTF^{-1}$.

FIG. 16 illustrates one embodiment of a Yxy or Yu'v' decode without an NLTF. After mapping and readout, the Yxy or Yu'v' data is then converted to the XYZ data. The XYZ data is operable to be converted to multiple data formats including, but not limited to, RGB, CMYK, 6P (e.g., 6P-B, 6P-C), and gamuts including at least four primaries through at least twelve primaries. Although the example in FIG. 16 shows a Yxy or Yu'v' encode, System 4 is operable to be used with a plurality of data formats.

Figure 17A:
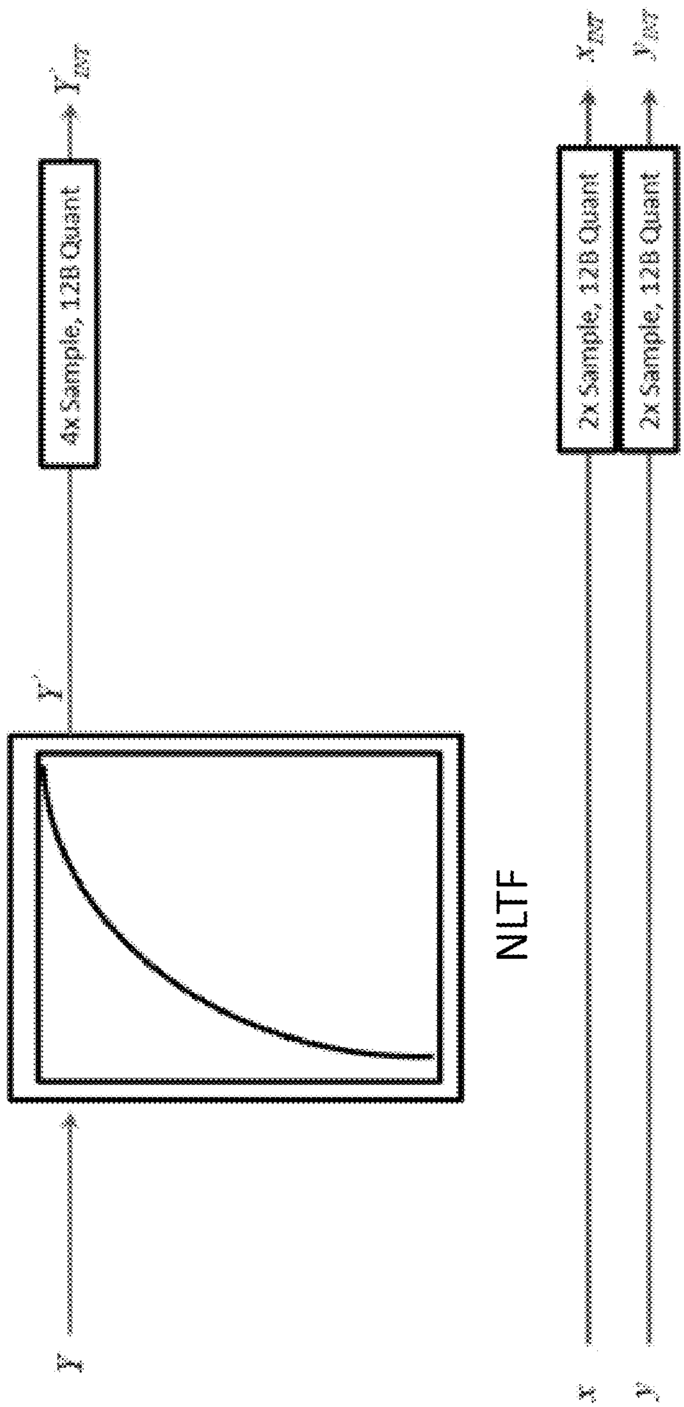
FIG. 17A illustrates one embodiment of a 4:2:2 Yxy encode with an NLTF.

FIG. 17A illustrates one embodiment of a 4:2:2 Yxy encode with an NLTF. A full bandwidth luminance channel (Y) is used to carry image detail and the remaining color coordinate components (e.g., x,y) are half sampled. In the example shown in FIG. 17A, the Yxy data undergoes a 4:2:2 encode. Other encoding methods (e.g., 4:4:4, 4:2:0, 4:1:1) are compatible with the present invention. Other quantization methods and bit depths are also compatible with the present invention. In one embodiment, the bit depth is 8 bits, 10 bits, 12 bits, 14 bits, and/or 16 bits. In one embodiment, the Yxy values are sampled as floats (e.g., 16-bit floating point representation, 32-bit floating point representation). For example, and not limitation, the floats include IEEE 754 defined floats. Although the example in FIG. 17A shows a Yxy decode, System 4 is operable to be used with a plurality of data formats.

In one embodiment, the NLTF is a DRR function between about 0.25 and about 0.9. In another embodiment, the NLTF is a DRR function between about 0.25 and about 0.7. In one embodiment, the NLTF is a ½ DRR function including a value between about 0.41 and about 0.7. In one embodiment, the NLTF is a ⅓ DRR function including a value between about 0.25 and about 0.499.

Figure 17B:
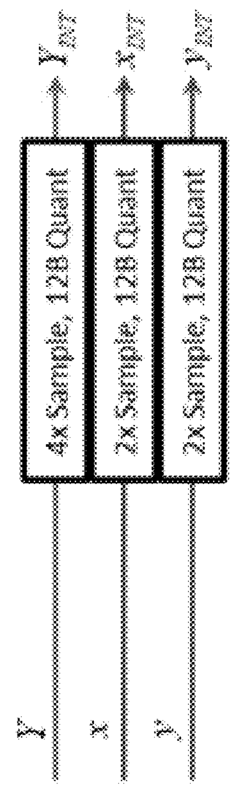
FIG. 17B illustrates one embodiment of a 4:2:2 Yxy encode without an NLTF.

FIG. 17B illustrates one embodiment of a 4:2:2 Yxy encode without an NLTF. In the example shown in FIG. 17B, the Yxy data undergoes a 4:2:2 encode. Other encoding methods (e.g., 4:4:4, 4:2:0, 4:1:1) are compatible with the present invention. Although the example in FIG. 17B shows a Yxy encode, System 4 is operable to be used with a plurality of data formats.

Figure 17C:
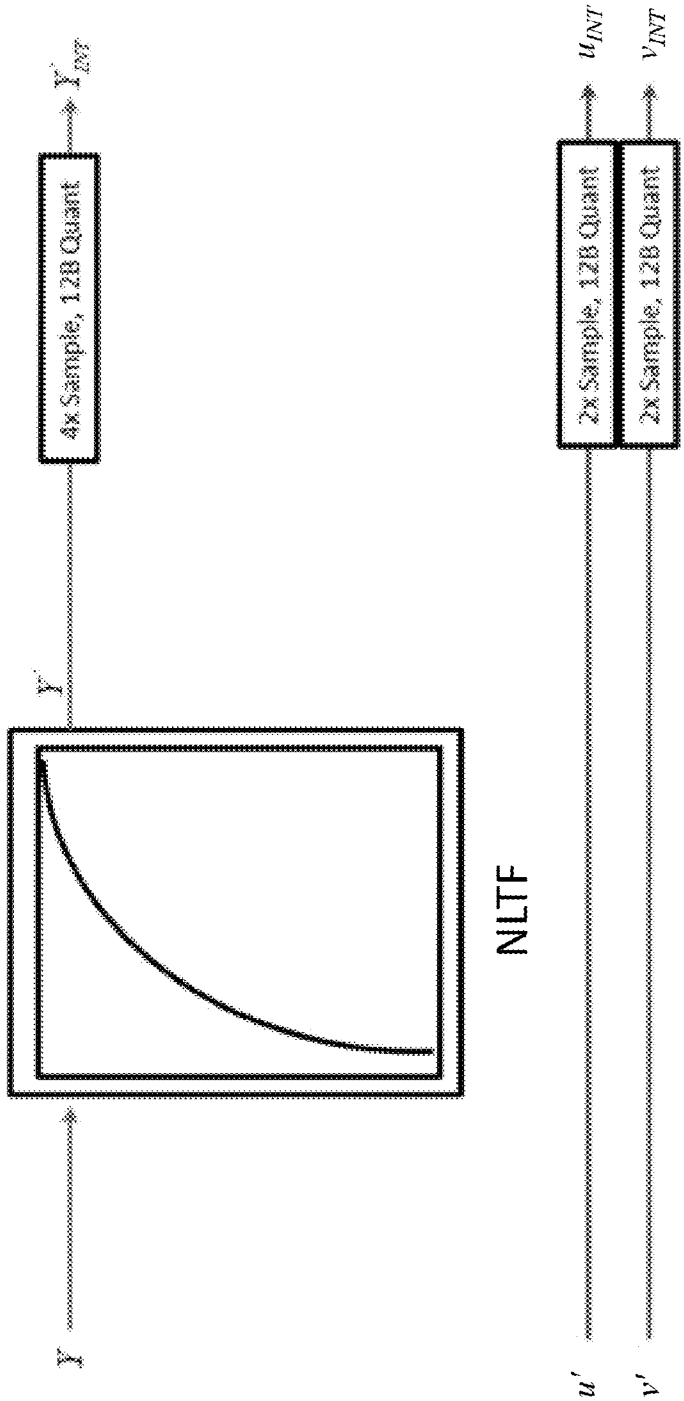
FIG. 17C illustrates one embodiment of a 4:2:2 Yu'v' encode with an NLTF.

FIG. 17C illustrates one embodiment of a 4:2:2 Yu'v' encode with an NLTF. A full bandwidth luminance channel (Y) is used to carry image detail and the remaining color coordinate components (e.g., u'v') are half sampled. In the example shown in FIG. 17C, the Yu'v' data undergoes a 4:2:2 encode. Other encoding methods (e.g., 4:4:4, 4:2:0, 4:1:1) are compatible with the present invention. Other quantization methods and bit depths are also compatible with the present invention. In one embodiment, the bit depth is 8 bits, 10 bits, 12 bits, 14 bits, and/or 16 bits. In one embodiment, the Yu'v' values are sampled as floats (e.g., 16-bit floating point representation, 32-bit floating point representation). For example, and not limitation, the floats include IEEE 754 defined floats. Although the example in FIG. 17C shows a Yu'v' decode, System 4 is operable to be used with a plurality of data formats.

Figure 17D:
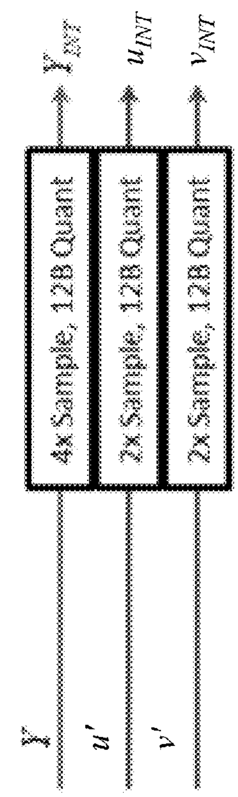
FIG. 17D illustrates one embodiment of a 4:2:2 Yu'v' encode without an NLTF.

FIG. 17D illustrates one embodiment of a 4:2:2 Yu'v' encode without an NLTF. In the example shown in FIG. 17D, the Yu'v' data undergoes a 4:2:2 encode. Other encoding methods (e.g., 4:4:4, 4:2:0, 4:1:1) are compatible with the present invention. Although the example in FIG. 17D shows a Yu'v' encode, System 4 is operable to be used with a plurality of data formats.

Figure 18A:
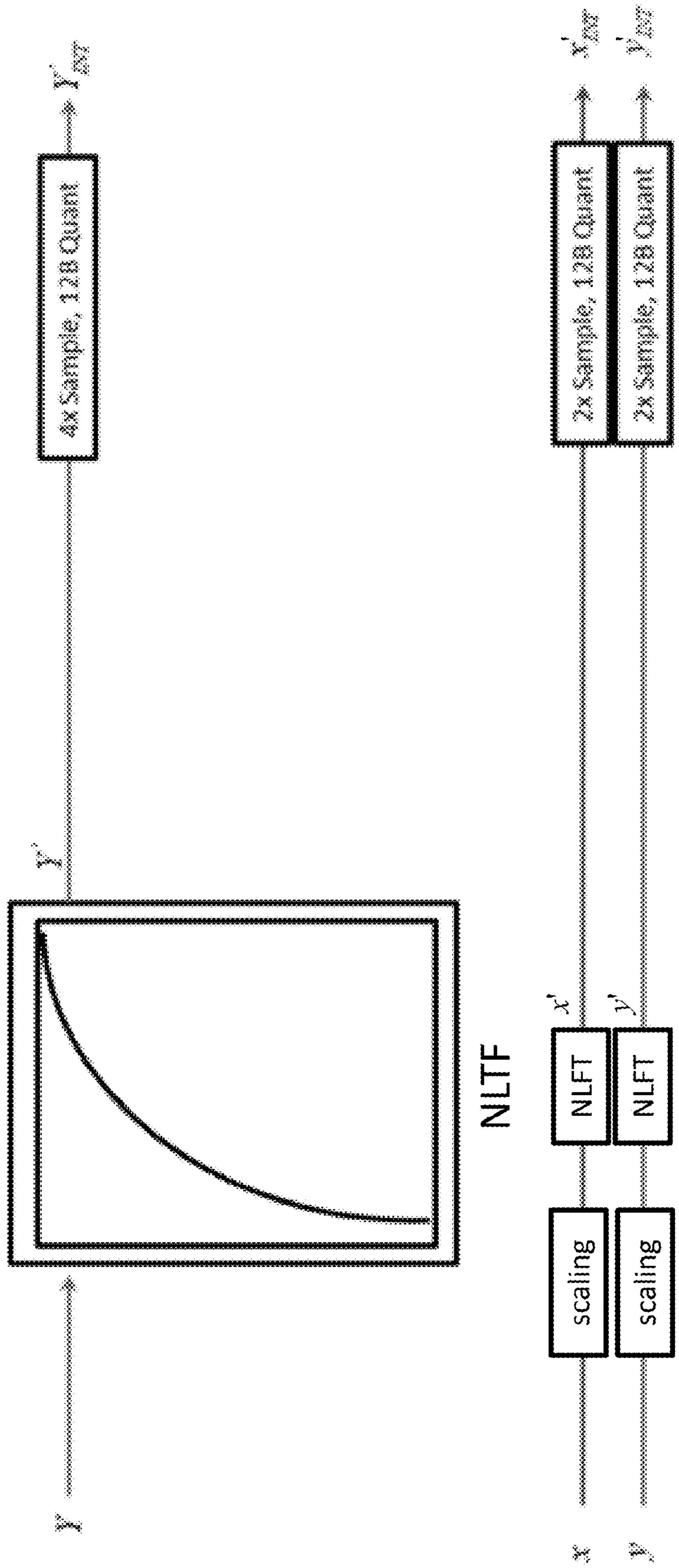
FIG. 18A illustrates one embodiment of a 4:2:2 Yxy encode with an NLTF applied to all three channels and linear scaling of x and y.

FIG. 18A illustrates one embodiment of a 4:2:2 Yxy encode with an NLTF applied to all three channels and linear scaling of x,y. A full bandwidth luminance channel (Y) is used to carry image detail and the remaining color coordinate components (e.g., x,y) are half sampled. In the example shown in FIG. 18A, the Yxy data undergoes a 4:2:2 encode. Other encoding methods (e.g., 4:4:4, 4:2:0, 4:1:1) are compatible with the present invention. Other quantization methods and bit depths are also compatible with the present invention. In one embodiment, the bit depth is 8 bits, 10 bits, 12 bits, 14 bits, and/or 16 bits. In one embodiment, the Yxy values are sampled as floats (e.g., 16-bit floating point representation, 32-bit floating point representation). For example, and not limitation, the floats include IEEE 754 defined floats. Although the example in FIG. 18A shows a Yxy decode, System 4 is operable to be used with a plurality of data formats.

Figure 18B:
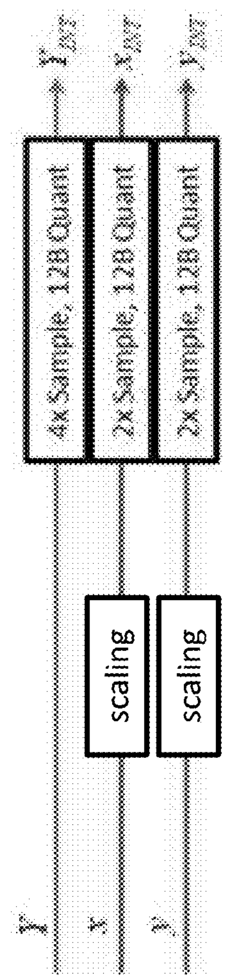
FIG. 18B illustrates one embodiment of a 4:2:2 Yxy encode without an NLTF and with linear scaling of x and y.

FIG. 18B illustrates one embodiment of a 4:2:2 Yxy encode without an NLTF and with linear scaling of x,y. In the example shown in FIG. 18B, the Yxy data undergoes a 4:2:2 encode. Other encoding methods (e.g., 4:4:4, 4:2:0, 4:1:1) are compatible with the present invention. Although the example in FIG. 18B shows a Yxy encode, System 4 is operable to be used with a plurality of data formats.

Figure 18C:
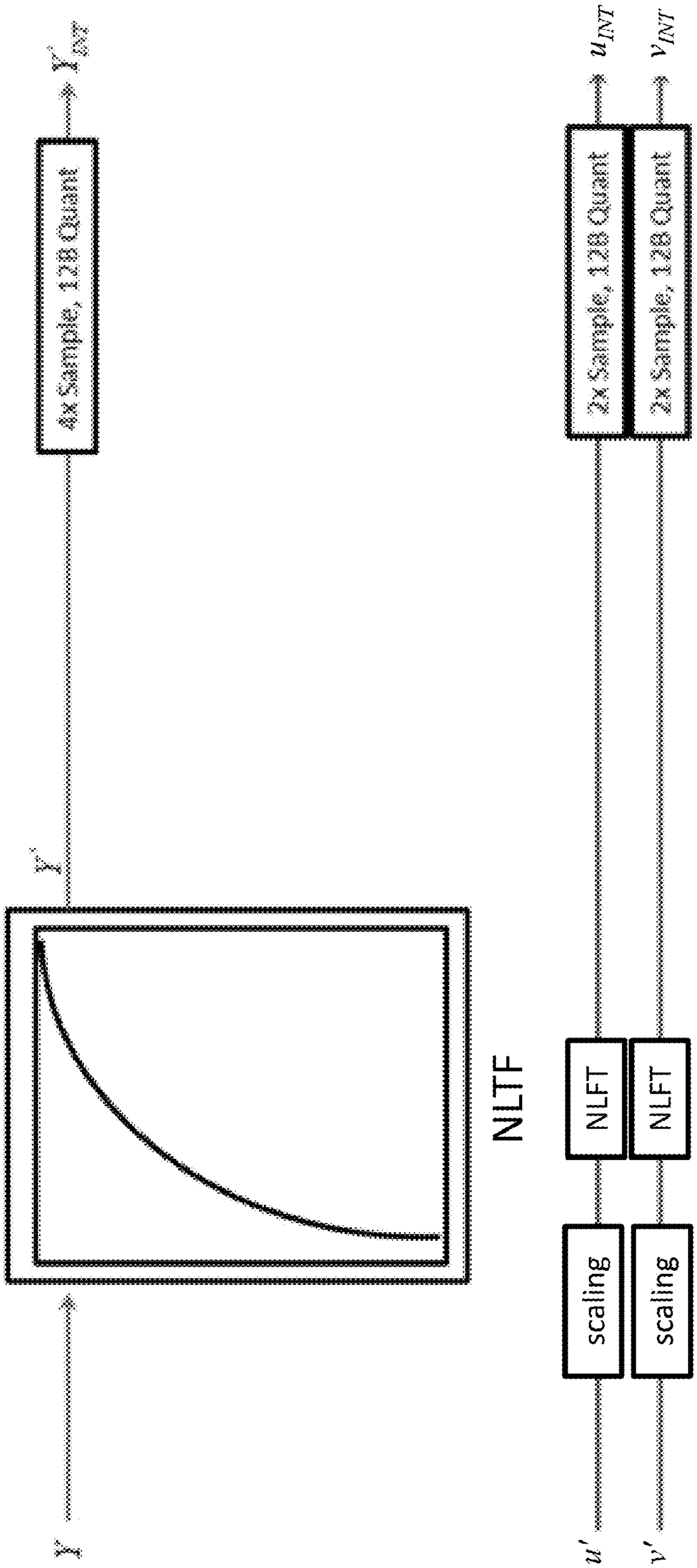
FIG. 18C illustrates one embodiment of a 4:2:2 Yu'v' encode with an NLTF applied to all three channels and linear scaling of u' and v'.

FIG. 18C illustrates one embodiment of a 4:2:2 Yu'v' encode with an NLTF applied to all three channels and linear scaling of u',v'. A full bandwidth luminance channel (Y) is used to carry image detail and the remaining color coordinate components (e.g., u',v') are half sampled. In the example shown in FIG. 18C, the Yu'v' data undergoes a 4:2:2 encode. Other encoding methods (e.g., 4:4:4, 4:2:0, 4:1:1) are compatible with the present invention. Other quantization methods and bit depths are also compatible with the present invention. In one embodiment, the bit depth is 8 bits, 10 bits, 12 bits, 14 bits, and/or 16 bits. In one embodiment, the Yu'v' values are sampled as floats (e.g., 16-bit floating point representation, 32-bit floating point representation). For example, and not limitation, the floats include IEEE 754 defined floats. Although the example in FIG. 18C shows a Yu'v' decode, System 4 is operable to be used with a plurality of data formats.

Figure 18D:
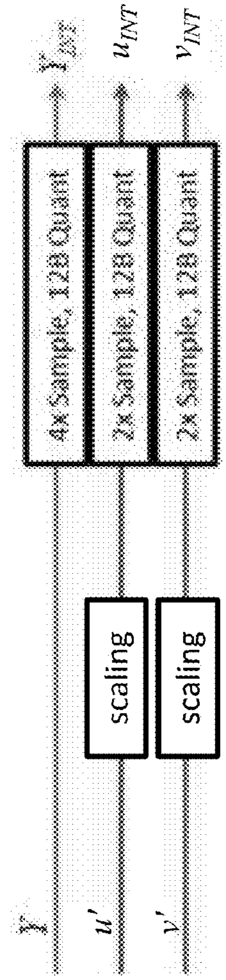
FIG. 18D illustrates one embodiment of a 4:2:2 Yu'v' encode without an NLTF and with linear scaling of u' and v'.

FIG. 18D illustrates one embodiment of a 4:2:2 Yu'v' encode without an NLTF and with linear scaling of u',v'. In the example shown in FIG. 18D, the Yu'v' data undergoes a 4:2:2 encode. Other encoding methods (e.g., 4:4:4, 4:2:0, 4:1:1) are compatible with the present invention. Although the example in FIG. 18D shows a Yu'v' encode, System 4 is operable to be used with a plurality of data formats.

Figure 19A:
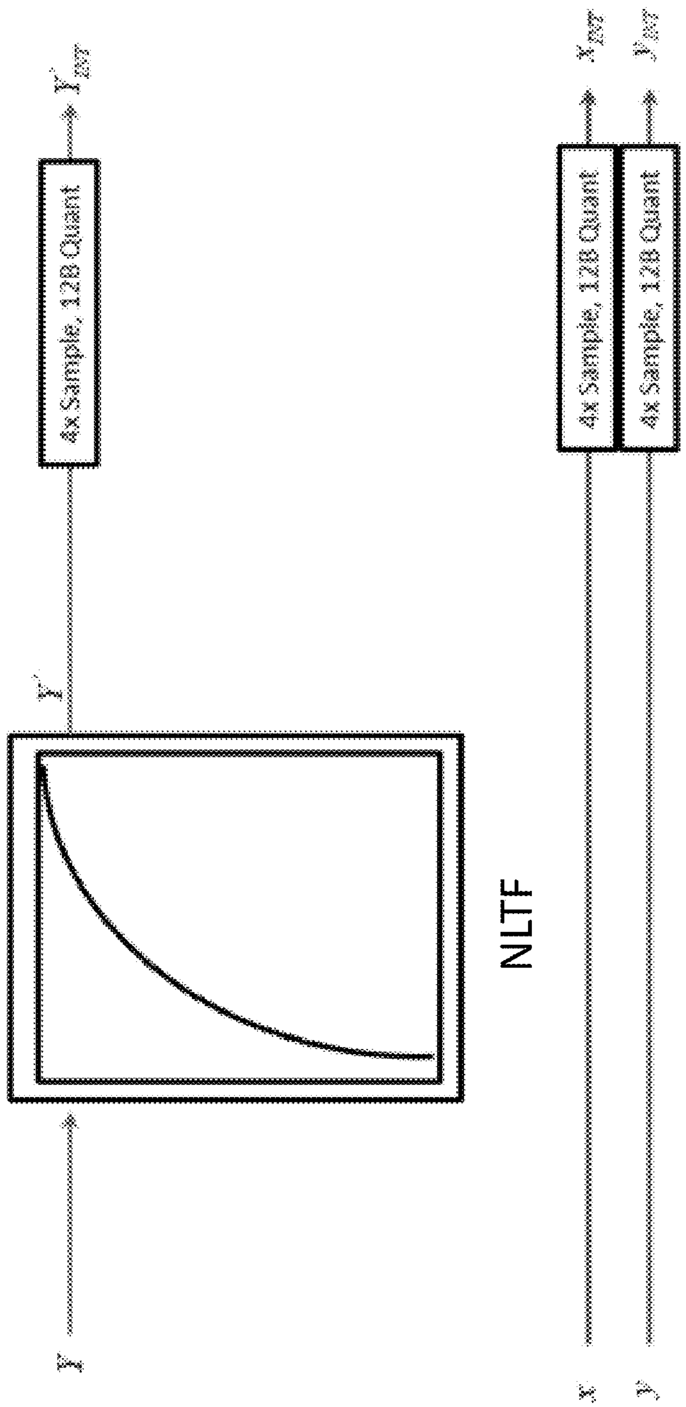
FIG. 19A illustrates one embodiment of a 4:4:4 Yxy encode with an NLTF.

FIG. 19A illustrates one embodiment of a 4:4:4 Yxy encode with an NLTF. A full bandwidth luminance channel (Y) is used to carry image detail and the remaining color coordinate components (e.g., x,y) are also fully sampled. In the example shown in FIG. 19A, the Yxy data undergoes a 4:4:4 encode. Other encoding methods (e.g., 4:2:2, 4:2:0, 4:1:1) are compatible with the present invention. Although the example in FIG. 19A shows a Yxy encode, System 4 is operable to be used with a plurality of data formats.

Figure 19B:
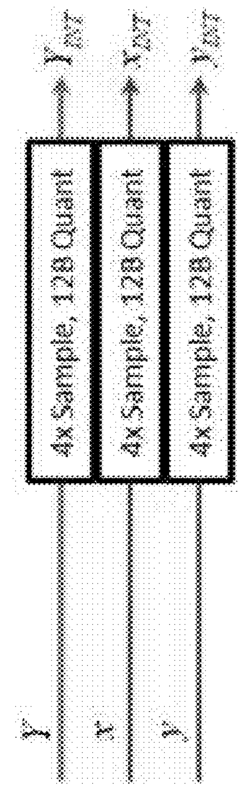
FIG. 19B illustrates one embodiment of a 4:4:4 Yxy encode without an NLTF.

FIG. 19B illustrates one embodiment of a 4:4:4 Yxy encode without an NLTF. In the example shown in FIG. 19B, the Yxy data undergoes a 4:4:4 encode. Other encoding methods (e.g., 4:2:2, 4:2:0, 4:1:1) are compatible with the present invention. Although the example in FIG. 19B shows a Yxy encode, System 4 is operable to be used with a plurality of data formats.

Figure 19C:
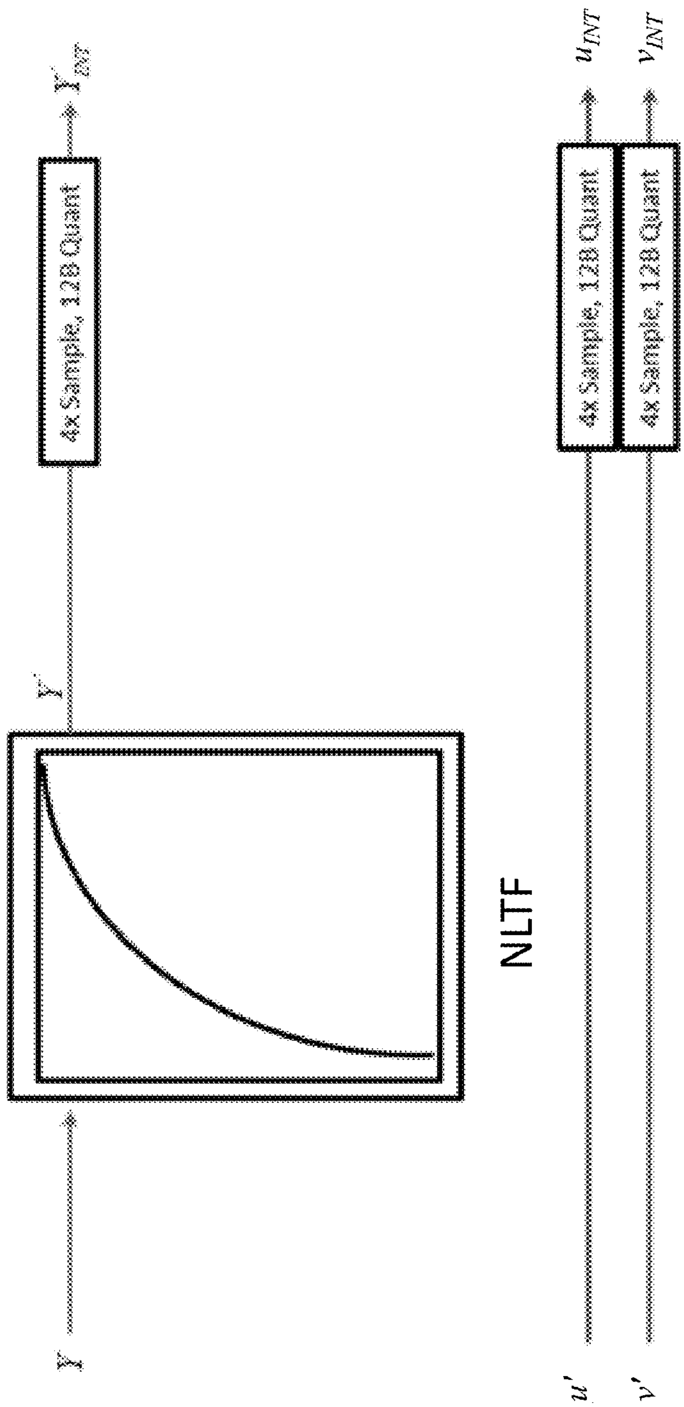
FIG. 19C illustrates one embodiment of a 4:4:4 Yu'v' encode with an NLTF.

FIG. 19C illustrates one embodiment of a 4:4:4 Yu'v' encode with an NLTF. A full bandwidth luminance channel (Y) is used to carry image detail and the remaining color coordinate components (e.g., u',v') are also fully sampled. In the example shown in FIG. 19C, the Yu'v' data undergoes a 4:4:4 encode. Other encoding methods (e.g., 4:2:2, 4:2:0, 4:1:1) are compatible with the present invention. Although the example in FIG. 19C shows a Yu'v' encode, System 4 is operable to be used with a plurality of data formats.

Figure 19D:
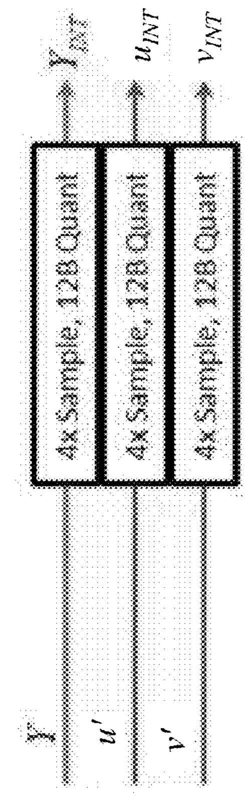
FIG. 19D illustrates one embodiment of a 4:4:4 Yu'v' encode without an NLTF.

FIG. 19D illustrates one embodiment of a 4:4:4 Yu'v' encode without an NLTF. In the example shown in FIG. 19D, the Yu'v' data undergoes a 4:4:4 encode. Other encoding methods (e.g., 4:2:2, 4:2:0, 4:1:1) are compatible with the present invention. Although the example in FIG. 19D shows a Yu'v' encode, System 4 is operable to be used with a plurality of data formats.

Figure 20A:
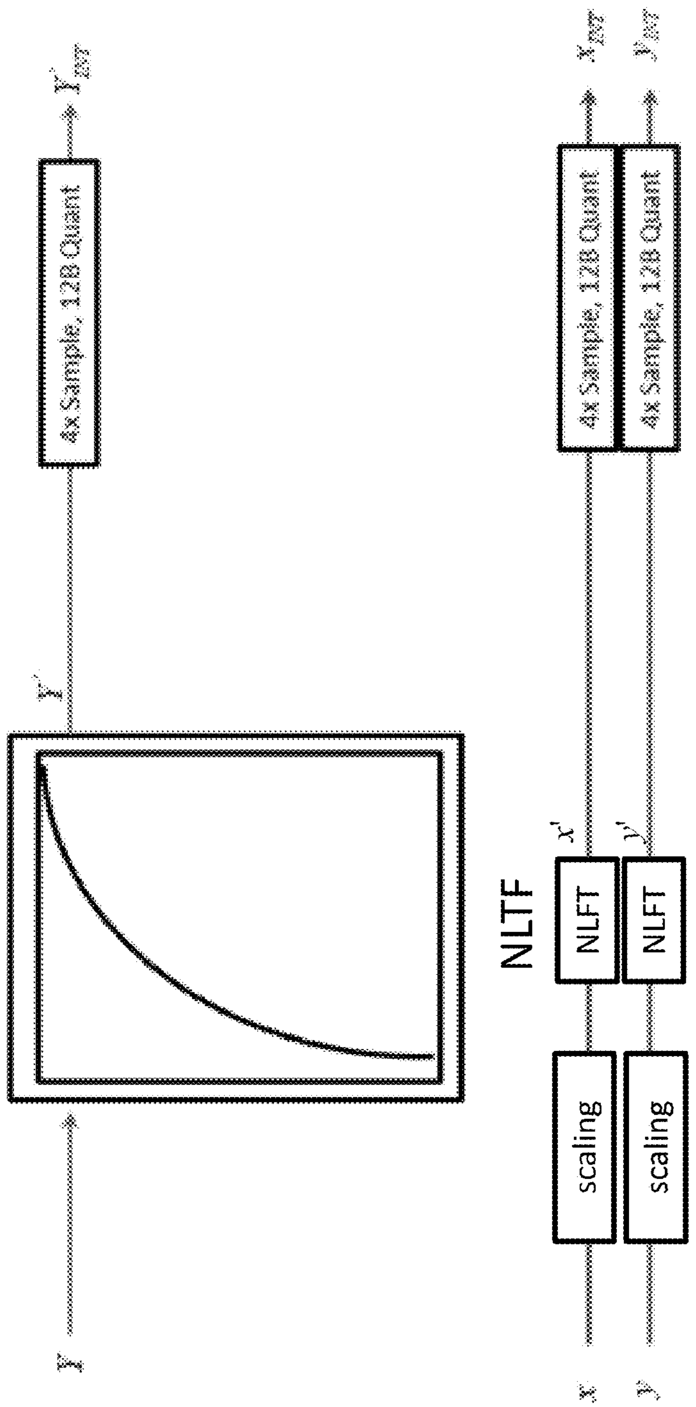
FIG. 20A illustrates one embodiment of a 4:4:4 Yxy encode with an NLTF applied to all three channels and linear scaling of x and y.

FIG. 20A illustrates one embodiment of a 4:4:4 Yxy encode with an NLTF applied to all three channels and linear scaling of x,y. A full bandwidth luminance channel (Y) is used to carry image detail and the remaining color coordinate components (e.g., x,y) are also fully sampled. In the example shown in FIG. 20A, the Yxy data undergoes a 4:4:4 encode. Other encoding methods (e.g., 4:2:2, 4:2:0, 4:1:1) are compatible with the present invention. Although the example in FIG. 20A shows a Yxy encode, System 4 is operable to be used with a plurality of data formats.

Figure 20B:
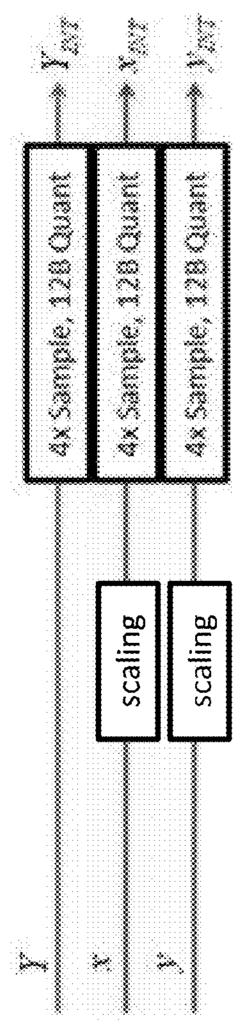
FIG. 20B illustrates one embodiment of a 4:4:4 Yxy encode without an NLTF and with linear scaling of x and y.

FIG. 20B illustrates one embodiment of a 4:4:4 Yxy encode without an NLTF and with linear scaling of x,y. In the example shown in FIG. 20B, the Yxy data undergoes a 4:4:4 encode. Other encoding methods (e.g., 4:2:2, 4:2:0, 4:1:1) are compatible with the present invention. Although the example in FIG. 20B shows a Yxy encode, System 4 is operable to be used with a plurality of data formats.

Figure 20C:
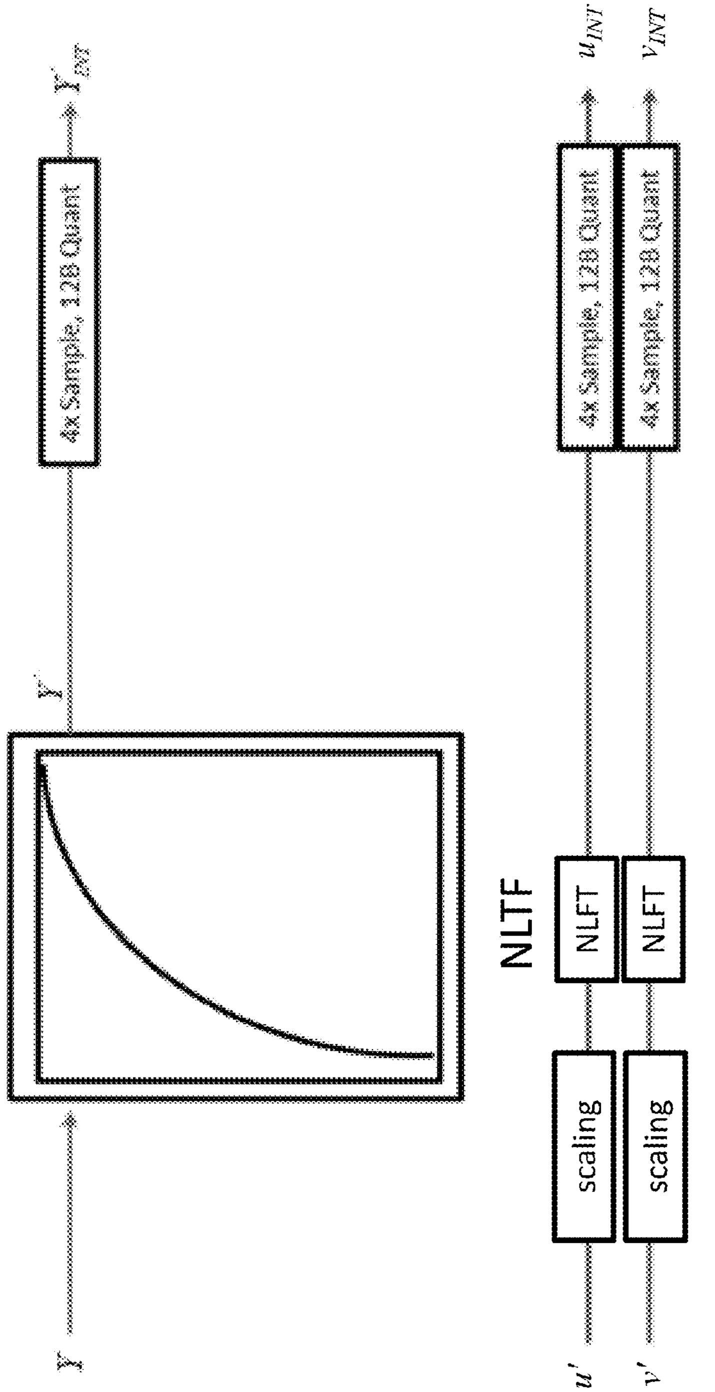
FIG. 20C illustrates one embodiment of a 4:4:4 Yu'v' encode with an NLTF applied to all three channels and linear scaling of u' and v'.

FIG. 20C illustrates one embodiment of a 4:4:4 Yu'v' encode with an NLTF applied to all three channels and linear scaling of u',v'. A full bandwidth luminance channel (Y) is used to carry image detail and the remaining color coordinate components (e.g., u',v') are also fully sampled. In the example shown in FIG. 20C, the Yu'v' data undergoes a 4:4:4 encode. Other encoding methods (e.g., 4:2:2, 4:2:0, 4:1:1) are compatible with the present invention. Although the example in FIG. 20C shows a Yu'v' encode, System 4 is operable to be used with a plurality of data formats.

Figure 20D:
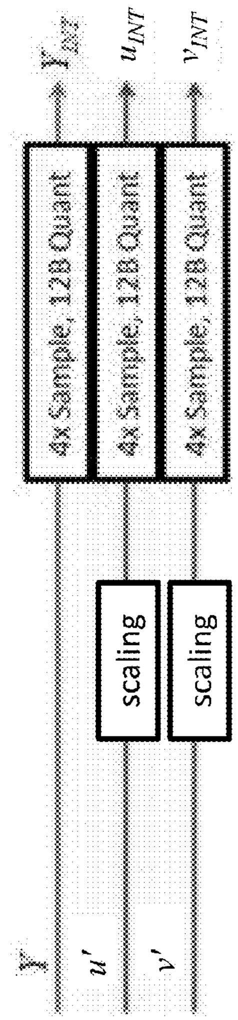
FIG. 20D illustrates one embodiment of a 4:4:4 Yu'v' encode without an NLTF and with linear scaling of u' and v'.

FIG. 20D illustrates one embodiment of a 4:4:4 Yu'v' encode without an NLTF and with linear scaling of u',v'. In the example shown in FIG. 20D, the Yu'v' data undergoes a 4:4:4 encode. Other encoding methods (e.g., 4:2:2, 4:2:0, 4:1:1) are compatible with the present invention. Although the example in FIG. 20D shows a Yu'v' encode, System 4 is operable to be used with a plurality of data formats.

Figure 21A:
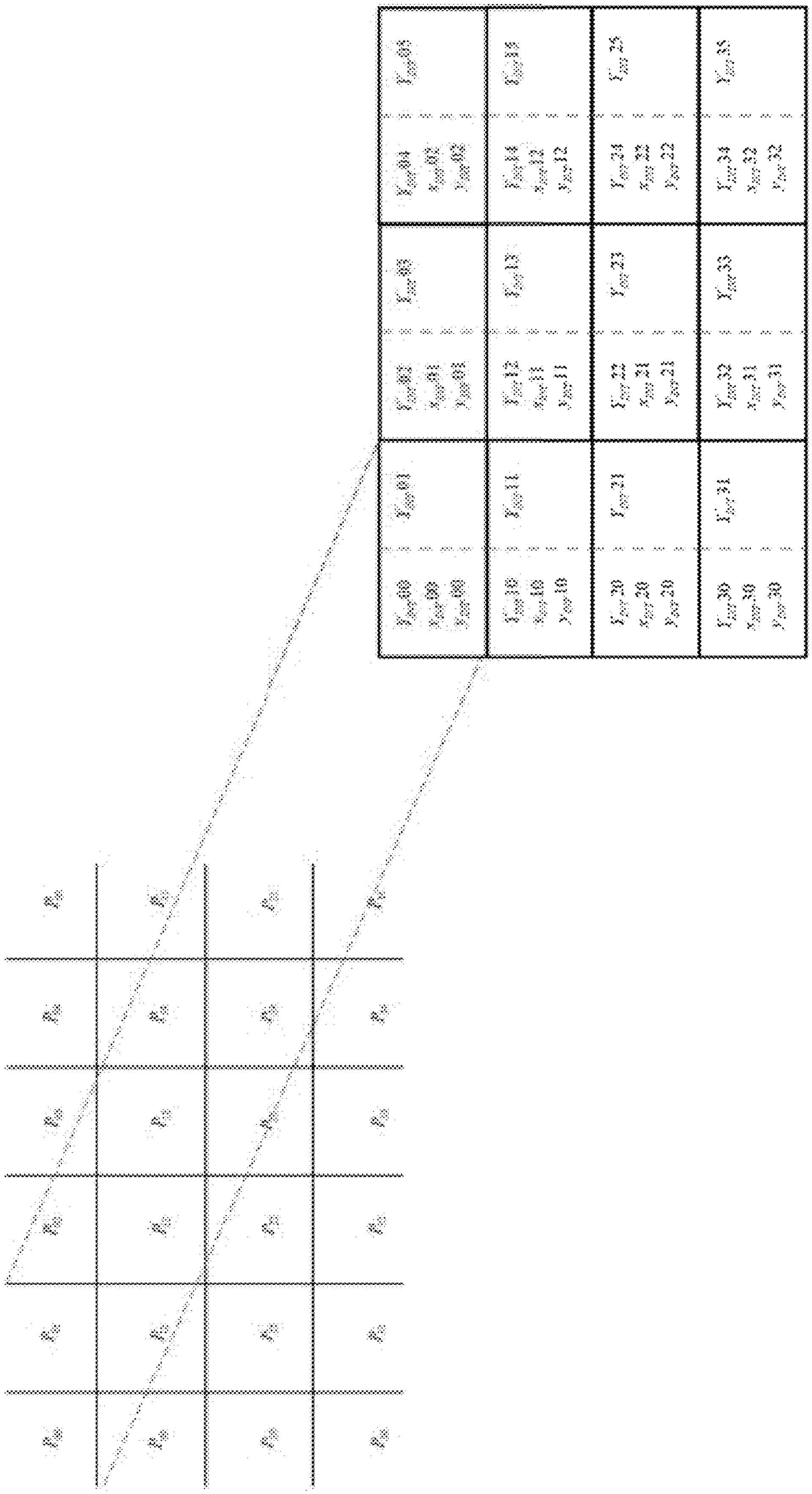
FIG. 21A illustrates sample placements of Yxy system components for a 4:2:2 pixel mapping.

FIG. 21A illustrates sample placements of Yxy system components for a 4:2:2 pixel mapping. A plurality of pixels (e.g., $P_{00}$-$P_{35}$) is shown in FIG. 21A. The first subscript number refers to a row number and the second subscript number refers to a column number. For pixel $P_{00}$, $Y'_{INT00}$ is the luma and the color components are $x_{INT00}$ and $y_{INT00}$. For pixel $P_{01}$, $Y'_{INT01}$ is the luma. For pixel $P_{10}$, $Y'_{INT10}$ is the luma and the color components are $x_{INT10}$ and $y_{INT10}$. For pixel $P_{11}$, $Y'_{INT11}$ is the luma. In one embodiment, the luma and the color components (e.g., the set of image data) corresponding to a particular pixel (e.g., $P_{00}$) is used to calculate color and brightness of subpixels. Although the example shown in FIG. 21A includes luma, it is equally possible that the data is sent linearly as luminance (e.g., $Y_{INT00}$). Further, although the example in FIG. 21A includes Yxy system components, System 4 is operable to be used with a plurality of data formats. While prior art systems often use x,y coordinates to map a gamut, the present invention is operable to provide pixel mapping data as Yxy data and transport data as a Y channel, a first colorimetric coordinate channel (e.g., x), and a second colorimetric coordinate channel (e.g., y).

Figure 21B:
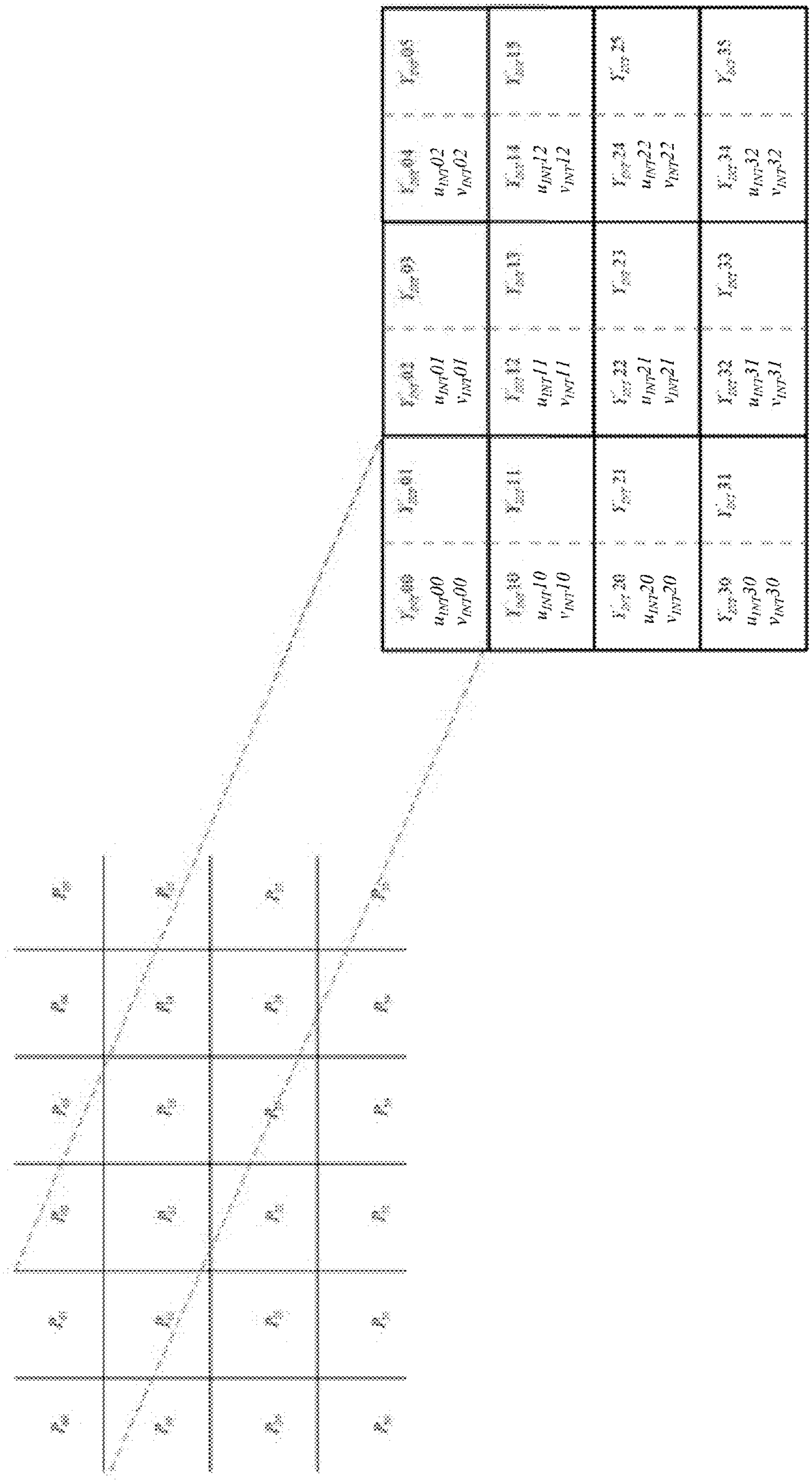
FIG. 21B illustrates sample placements of Yu'v' system components for a 4:2:2 pixel mapping.

FIG. 21B illustrates sample placements of Yu'v' system components for a 4:2:2 pixel mapping. A plurality of pixels (e.g., $P_{00}$-$P_{35}$) is shown in FIG. 21B. The first subscript number refers to a row number and the second subscript number refers to a column number. For pixel $P_{00}$, $Y'_{INT00}$ is the luma and the color components are $u_{INT00}$ and $v_{INT00}$. For pixel $P_{01}$, $Y'_{INT01}$ is the luma. For pixel $P_{10}$, $Y'_{INT10}$ is the luma and the color components are $u_{INT10}$ and $v_{INT10}$. For pixel $P_{11}$, $Y'_{INT11}$ is the luma. In one embodiment, the luma and the color components (e.g., the set of image data) corresponding to a particular pixel (e.g., $P_{00}$) is used to calculate color and brightness of subpixels. Although the example shown in FIG. 21B includes luma, it is equally possible that the data is sent linearly as luminance (e.g., $Y_{INT00}$). Further, although the example in FIG. 21A includes Yu'v' system components, System 4 is operable to be used with a plurality of data formats. While prior art systems often use u,'v' coordinates to map a gamut, the present invention is operable to provide pixel mapping data as Yu'v' data and transport data as a Y channel, a first colorimetric coordinate channel (e.g., u'), and a second colorimetric coordinate channel (e.g., v').

Figure 22A:
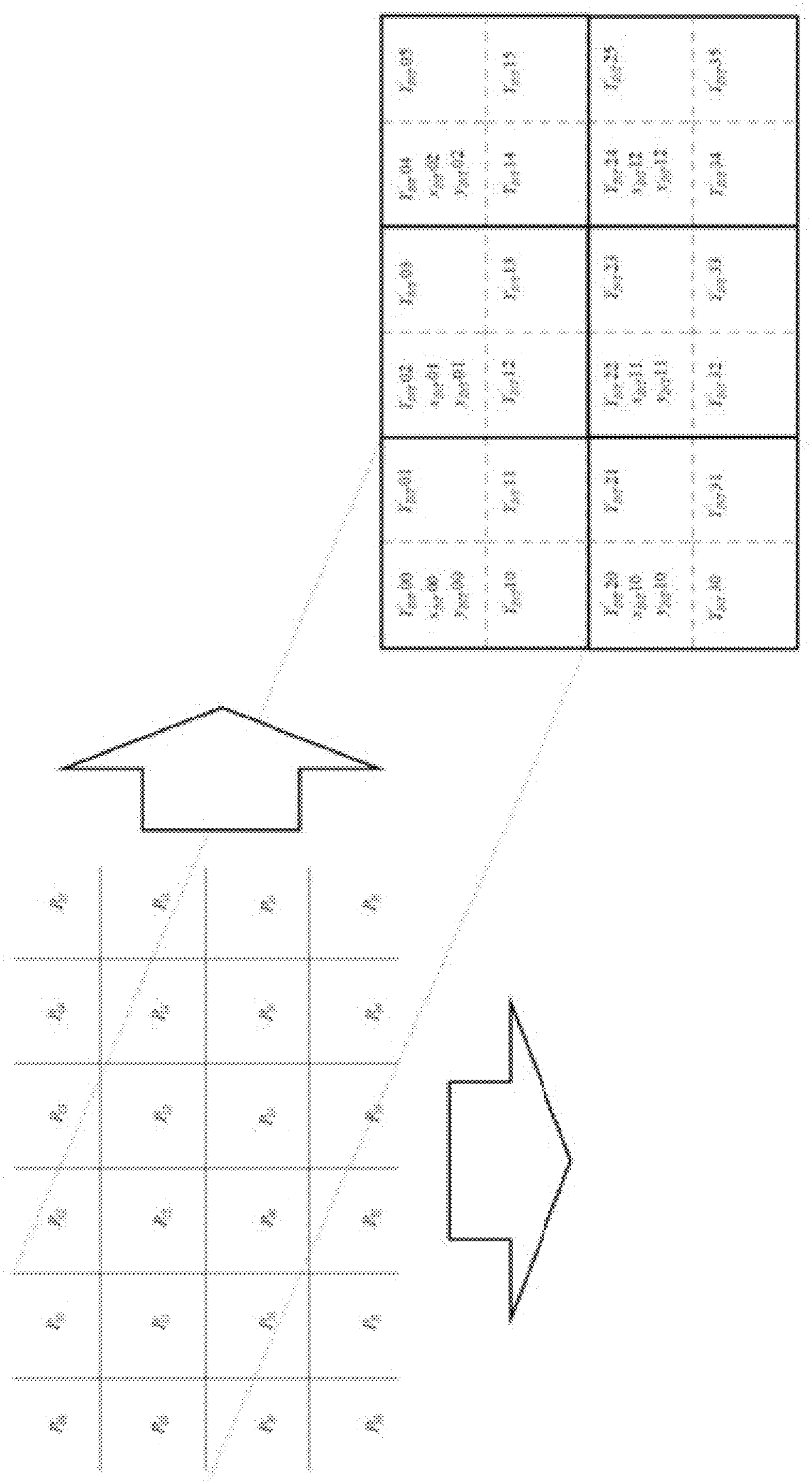
FIG. 22A illustrates sample placements of Yxy system components for a 4:2:0 pixel mapping.

FIG. 22A illustrates sample placements of Yxy system components for a 4:2:0 pixel mapping. A plurality of pixels (e.g., $P_{00}$-$P_{35}$) is shown in FIG. 22A. The first subscript number refers to a row number and the second subscript number refers to a column number. For pixel, $P_{00}$, $Y'_{INT00}$ is the luma and the color components are $x_{INT00}$ and $y_{INT00}$. For pixel $P_{01}$, $Y'_{INT01}$ is the luma. For pixel $P_{10}$, $Y'_{INT10}$ is the luma. For pixel $P_{11}$, $Y'_{INT11}$ is the luma. In one embodiment, the luma and the color components corresponding to a particular pixel (e.g., $P_{00}$) is used to calculate color and brightness of subpixels. Although the example shown in FIG. 22A includes luma, it is equally possible that the data is sent linearly as luminance (e.g., $Y_{INT00}$). Further, Although the example in FIG. 22A includes Yxy system components, System 4 is operable to be used with a plurality of data formats.

Figure 22B:
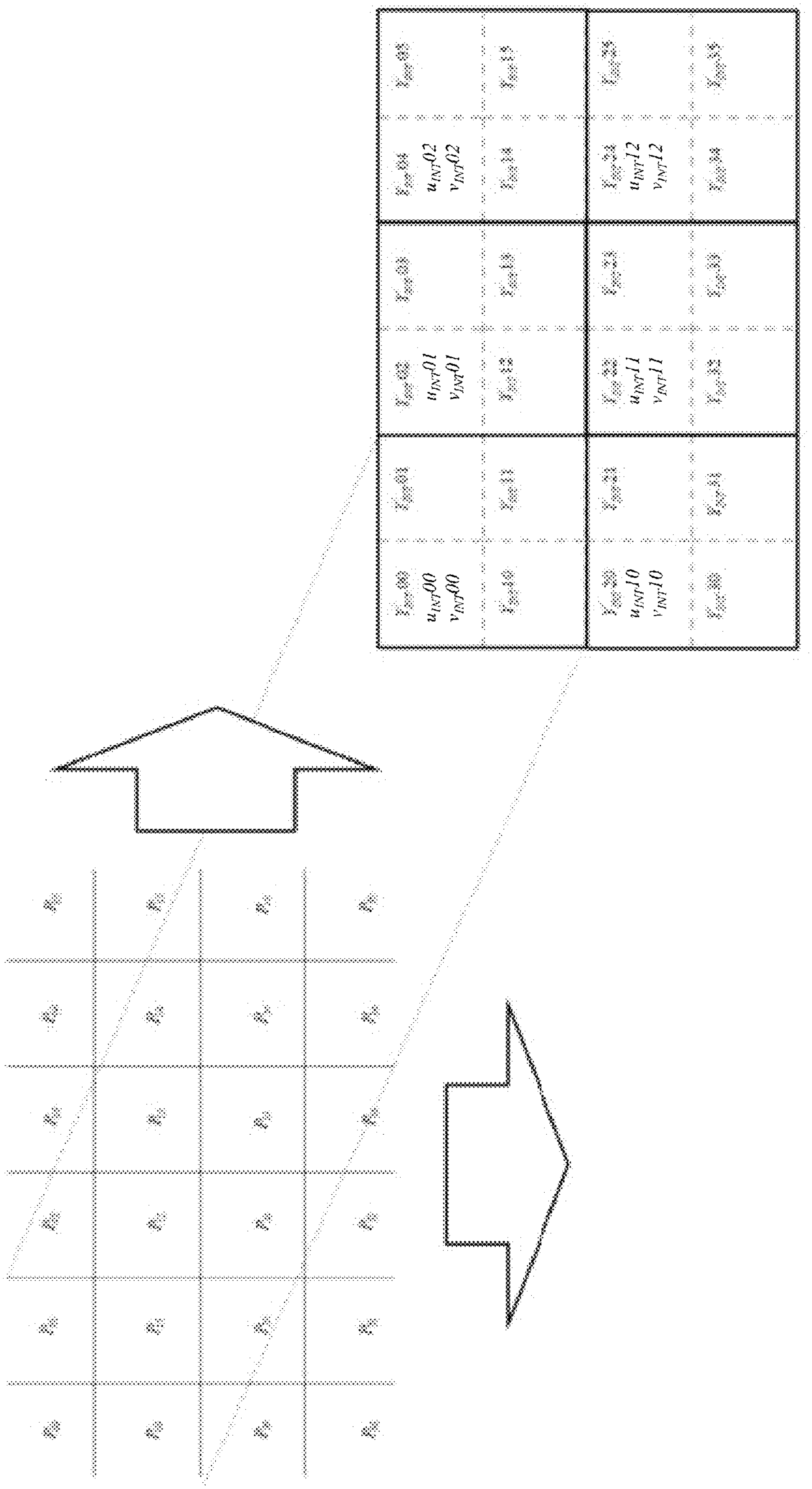
FIG. 22B illustrates sample placements of Yu'v' system components for a 4:2:0 pixel mapping.

FIG. 22B illustrates sample placements of Yu'v' system components for a 4:2:0 pixel mapping. A plurality of pixels (e.g., $P_{00}$-$P_{35}$) is shown in FIG. 22B. The first subscript number refers to a row number and the second subscript number refers to a column number. For pixel $P_{00}$, $Y'_{INT00}$ is the luma and the color components are $u_{INT00}$ and $v_{INT00}$. For pixel $P_{01}$, $Y'_{INT01}$ is the luma. For pixel $P_{10}$, $Y'_{INT10}$ is the luma. For pixel $P_{11}$, $Y'_{INT11}$ is the luma. In one embodiment, the luma and the color components corresponding to a particular pixel (e.g., $P_{00}$) is used to calculate color and brightness of subpixels. Although the example shown in FIG. 22B includes luma, it is equally possible that the data is sent linearly as luminance (e.g., $Y_{INT00}$). Further, Although the example in FIG. 22B includes Yu'v' system components, System 4 is operable to be used with a plurality of data formats.

In one embodiment, the set of image data includes pixel mapping data. In one embodiment, the pixel mapping data includes a subsample of the set of values in a color space. In a preferred embodiment, the color space is a Yxy color space (e.g., 4:2:2). In one embodiment, the pixel mapping data includes an alignment of the set of values in the color space (e.g., Yxy color space, Yu'v' color space).

Table 6 illustrates mapping to SMPTE ST2110 for 4:2:2 sampling of Yxy and Yu'v data. Table 7 illustrates mapping to SMPTE ST2110 for 4:4:4 linear and non-linear sampling of Yxy and Yu'v data. The present invention is compatible with a plurality of data formats and not restricted to Yxy or Yu'v data.

TABLE 6

| | | pgroup | | | |
|---|---|---|---|---|---|
| Sampling | Bit Depth | octets | pixels | Y PbPr Sample Order | Sample Order |
| 4:2:2 Yxy | 8 | 8 | 2 | $C_B$', Y0', $C_R$', Y1' | y0, Y0', x0, y1, Y1', x1 |
| | 10 | 10 | 2 | $C_B$', Y0', $C_R$', Y1' | y0, Y0', x0, y1, Y1', x1 |
| | 12 | 12 | 2 | $C_B$', Y0', $C_R$', Y1' | y0, Y0', x0, y1, Y1', x1 |
| | 16, 16f | 16 | 2 | C'$_B$, Y0', C'$_R$, Y'1 | y0, Y0', x0, y1, Y1', x1 |
| 4:2:2 Yu'v | 8 | 8 | 8 | $C_B$', Y0', $C_R$', Y1' | v'0, Y0', u'0, v'1, Y1', u'1 |
| | 10 | 10 | 2 | CB', Y0', CR', Y1' | v'0, Y0', u'0, v'1, Y1', u'1 |
| | 12 | 12 | 2 | $C_B$', Y0', $C_R$', Y1' | v'0, Y0', u'0, v'1, Y1', u'1 |
| | 16, 16f | 16 | 2 | C'$_B$, Y0', C'$_R$, Y'1 | v'0, Y0', u'0, v'1, Y1', u'1 |

TABLE 7

| | | pgroup | | | |
|---|---|---|---|---|---|
| Sampling | Bit Depth | octets | pixels | RGB/XYZ Sample Order | Sample Order |
| 4:4:4 | 8 | 3 | 1 | R, G, B | x, Y, y |
| Linear Yxy | 10 | 15 | 4 | R0, G0, B0, R1, G1, B1, R2, G2, B2 | x, Y0, y, x, Y1, y, x, Y2', y |
| | 12 | 9 | 2 | R0, G0, B0, R1, G1, B1 | x, Y0, y, x, Y1, y |
| | 16, 16f | 6 | 1 | R, G B | x, Y, y |
| 4:4:4 | 8 | 3 | 1 | R', G', B' | x, Y', y |
| Non-Linear | 10 | 15 | 4 | R0', G0', B0', R1', G1', B1', R2', G2', B2' | x, Y0', y, x, Y1', y, x, Y2', y |
| Yxy | 12 | 9 | 2 | R0', G0', B0', R1', G1', B1' | x, Y0', y, x, Y1', y |
| | 16, 16f | 6 | 1 | R', G', B' | x, Y', y |
| 4:4:4 | 8 | 3 | 1 | R, G, B | u', Y, v' |
| Linear Yu'v | 10 | 15 | 4 | R0, G0, B0, R1, G1, B1, R2, G2, B2 | u', Y0, v', u', Y1, v', u', Y2, v' |
| | 12 | 9 | 2 | R0, G0, B0, R1, G1, B1 | u', Y0, v', u', Y1, v' |
| | 16, 16f | 6 | 1 | R, G, B | u', Y, v' |
| 4:4:4 | 8 | 3 | 1 | R', G', B' | u', Y', v' |
| Non-Linear | 10 | 15 | 4 | R0', G0', B0', R1', G1', B1', R2', G2', B2' | u', Y0', v', u', Y1', v', u', Y2', v' |
| Yu'v | 12 | 9 | 2 | R0', G0', B0', R1', G1', B1' | u', Y0', v', u', Y1', v' |
| | 16, 16f | 6 | 1 | R', G', B' | u', Y', v' |

Figure 23A:
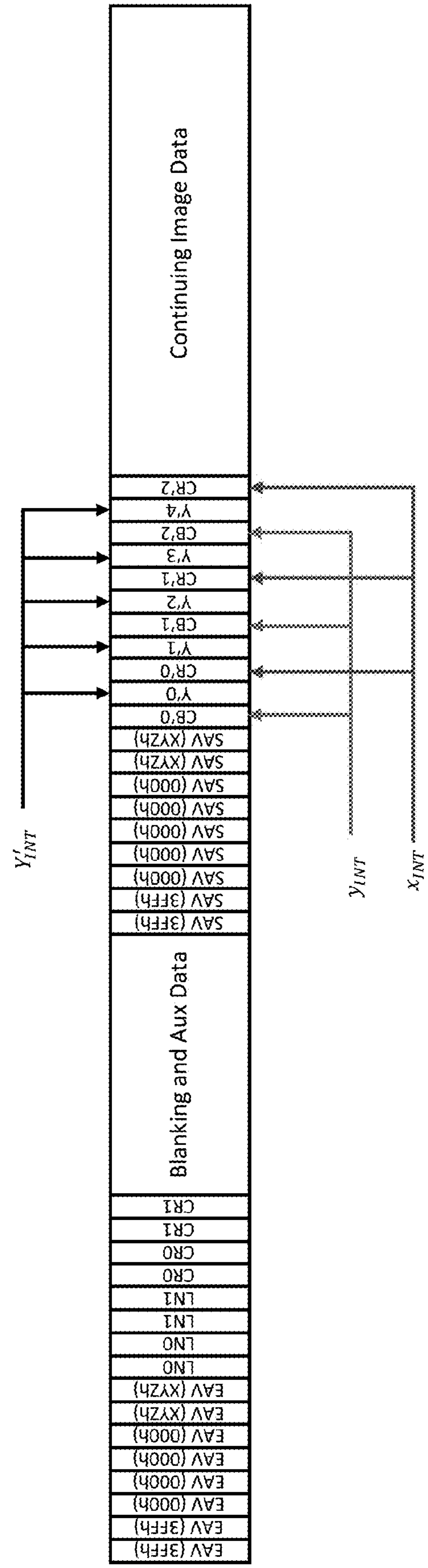
FIG. 23A illustrates one embodiment of a SMPTE ST292 Yxy system mapping.

FIG. 23A illustrates one embodiment of a SMPTE ST292 Yxy system mapping. To fit a Yxy system into a SMPTE ST292 stream involves the following substitutions: $Y'_{INT}$ is placed in the Y data segments, $x_{INT}$ is placed in the Cr data segments, and $y_{INT}$ is placed in the Cb data segments. In a preferred embodiment, luminance or luma is placed in the Y data segments, a first colorimetric coordinate is placed in the Cr data segments, and a second colorimetric coordinate is placed in the Cb data segments. Although the example in FIG. 23A shows a Yxy system mapping, System 4 is operable to be used with a plurality of data formats.

Figure 23B:
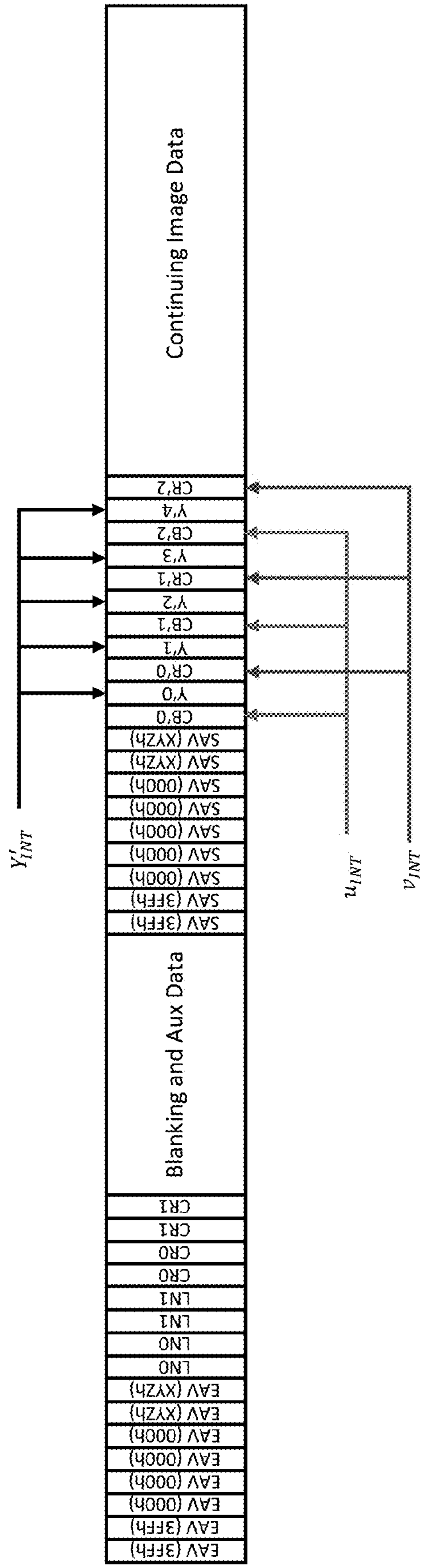
FIG. 23B illustrates one embodiment of a SMPTE ST292 Yu'v' system mapping.

FIG. 23B illustrates one embodiment of a SMPTE ST292 Yu'v' system mapping. To fit a Yu'v' system into a SMPTE ST292 stream involves the following substitutions: $Y'_{INT}$ is placed in the Y data segments, $u_{INT}$ is placed in the Cr data segments, and $v_{INT}$ is placed in the Cb data segments. In a preferred embodiment, luminance or luma is placed in the Y data segments, a first colorimetric coordinate is placed in the Cr data segments, and a second colorimetric coordinate is placed in the Cb data segments. Although the example in FIG. 23A shows a Yu'v' system mapping, System 4 is operable to be used with a plurality of data formats.

Figure 24A:
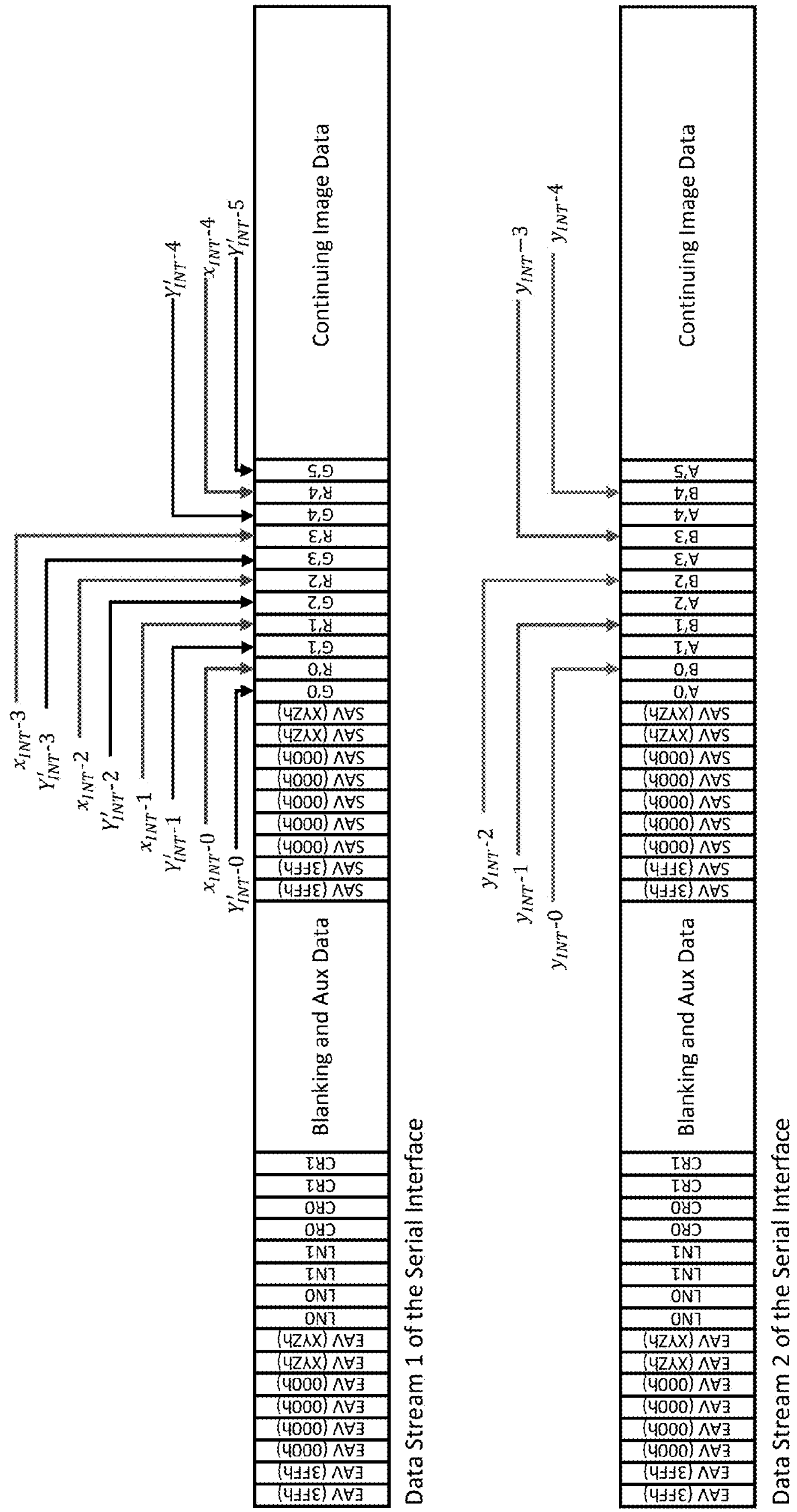
FIG. 24A illustrates one embodiment of a SMPTE ST2082 Yxy system mapping.

FIG. 24A illustrates one embodiment of a SMPTE ST2082 Yxy system mapping. To fit a Yxy system into a SMPTE ST2082 stream involves the following substitutions: $Y'_{INT}$ is placed in the G data segments, $x_{INT}$ is placed in the R data segments, and $y_{INT}$ is placed in the B data segments. In a preferred embodiment, luminance or luma is placed in the G data segments, a first colorimetric coordinate is placed in the R data segments, and a second colorimetric coordinate is placed in the B data segments. Although the example in FIG. 24A shows a Yxy system mapping, System 4 is operable to be used with a plurality of data formats.

Figure 24B:
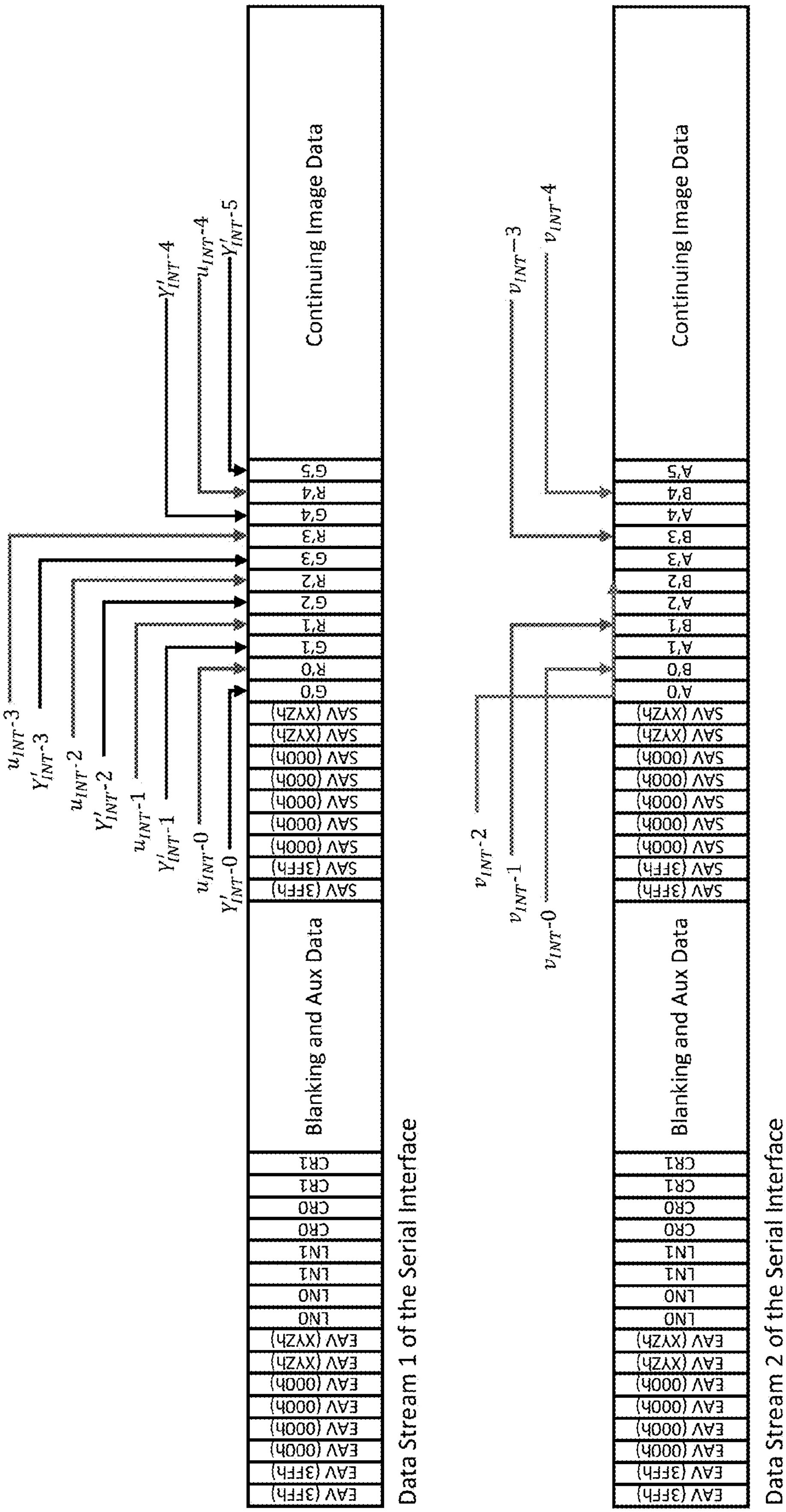
FIG. 24B illustrates one embodiment of a SMPTE ST2082 Yu'v' system mapping.

FIG. 24B illustrates one embodiment of a SMPTE ST2082 Yu'v' system mapping. To fit a Yu'v' system into a SMPTE ST2082 stream involves the following substitutions: $Y'_{INT}$ is placed in the G data segments, $u_{INT}$ is placed in the R data segments, and $v_{INT}$ is placed in the B data segments. In a preferred embodiment, luminance or luma is placed in the G data segments, a first colorimetric coordinate is placed in the R data segments, and a second colorimetric coordinate is placed in the B data segments. Although the example in FIG. 24B shows a Yu'v' system mapping, System 4 is operable to be used with a plurality of data formats.

Figure 25A:
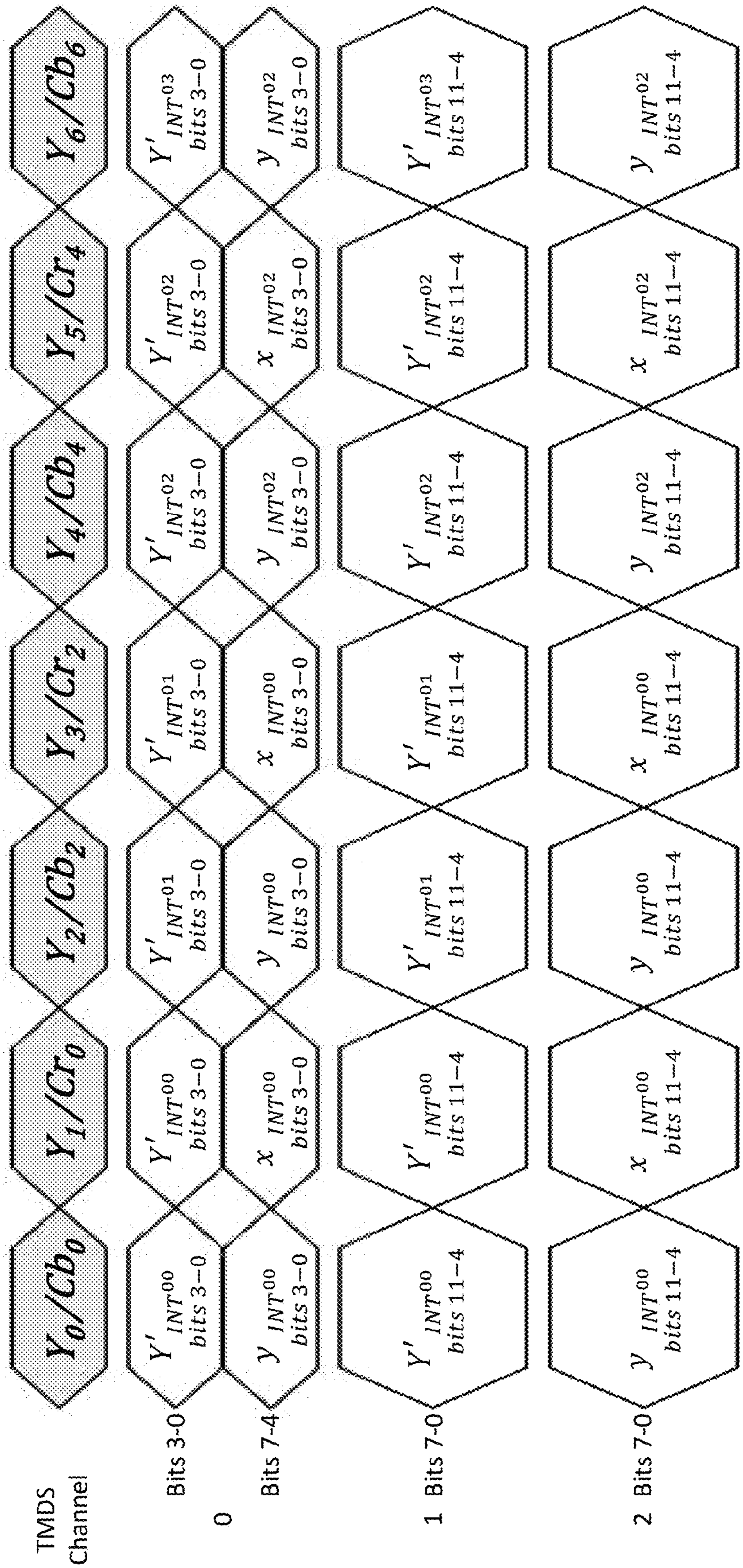
FIG. 25A illustrates one embodiment of Yxy inserted into a CTA 861 stream.

FIG. 25A illustrates one embodiment of Yxy inserted into a CTA 861 data stream. Although the example in FIG. 25A shows a Yxy system mapping, System 4 is operable to be used with a plurality of data formats.

Figure 25B:
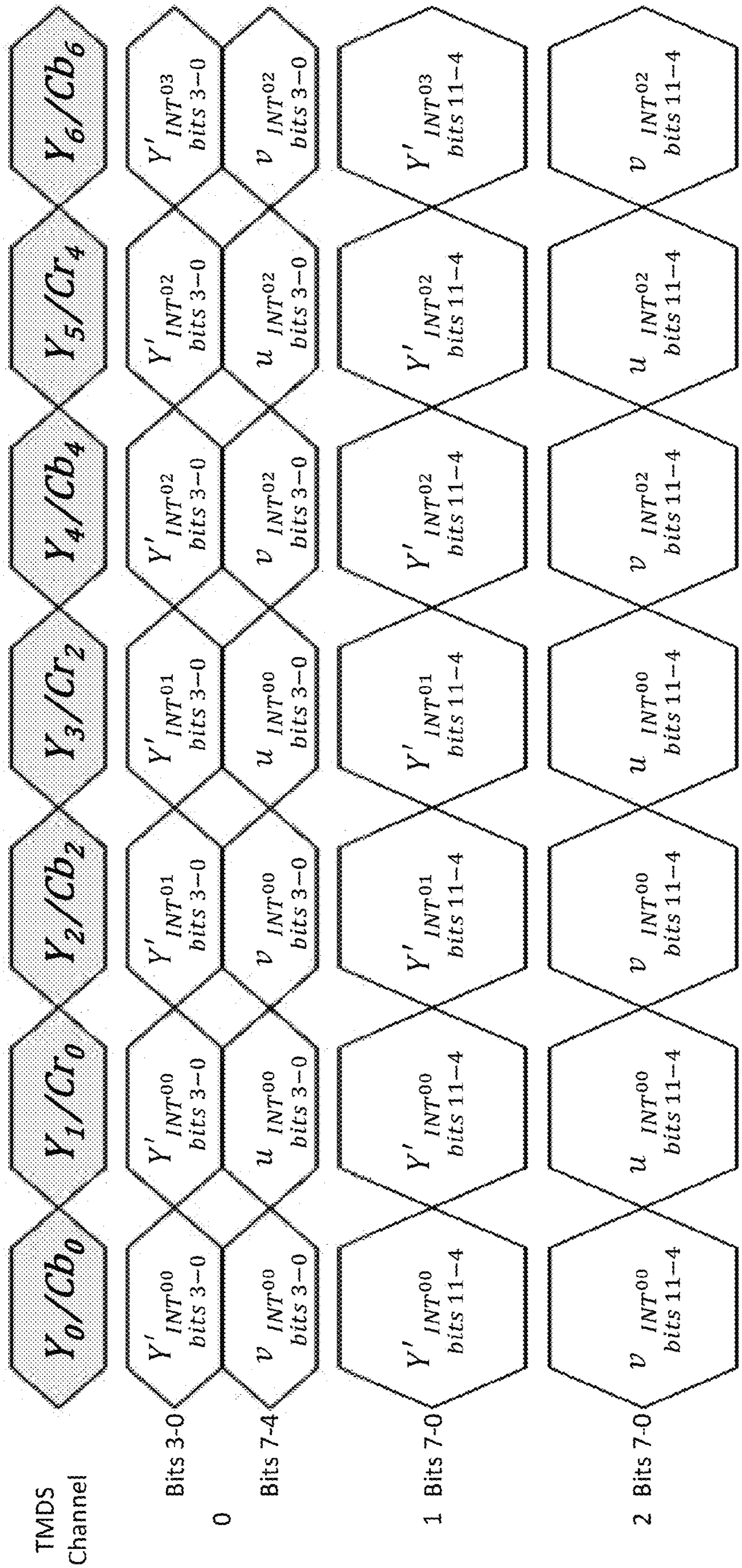
FIG. 25B illustrates one embodiment of Yu'v' inserted into a CTA 861 stream.

FIG. 25B illustrates one embodiment of Yu'v' inserted into a CTA 861 data stream. Although the example in FIG. 25B shows a Yu'v' system mapping, System 4 is operable to be used with a plurality of data formats.

Figure 26A:
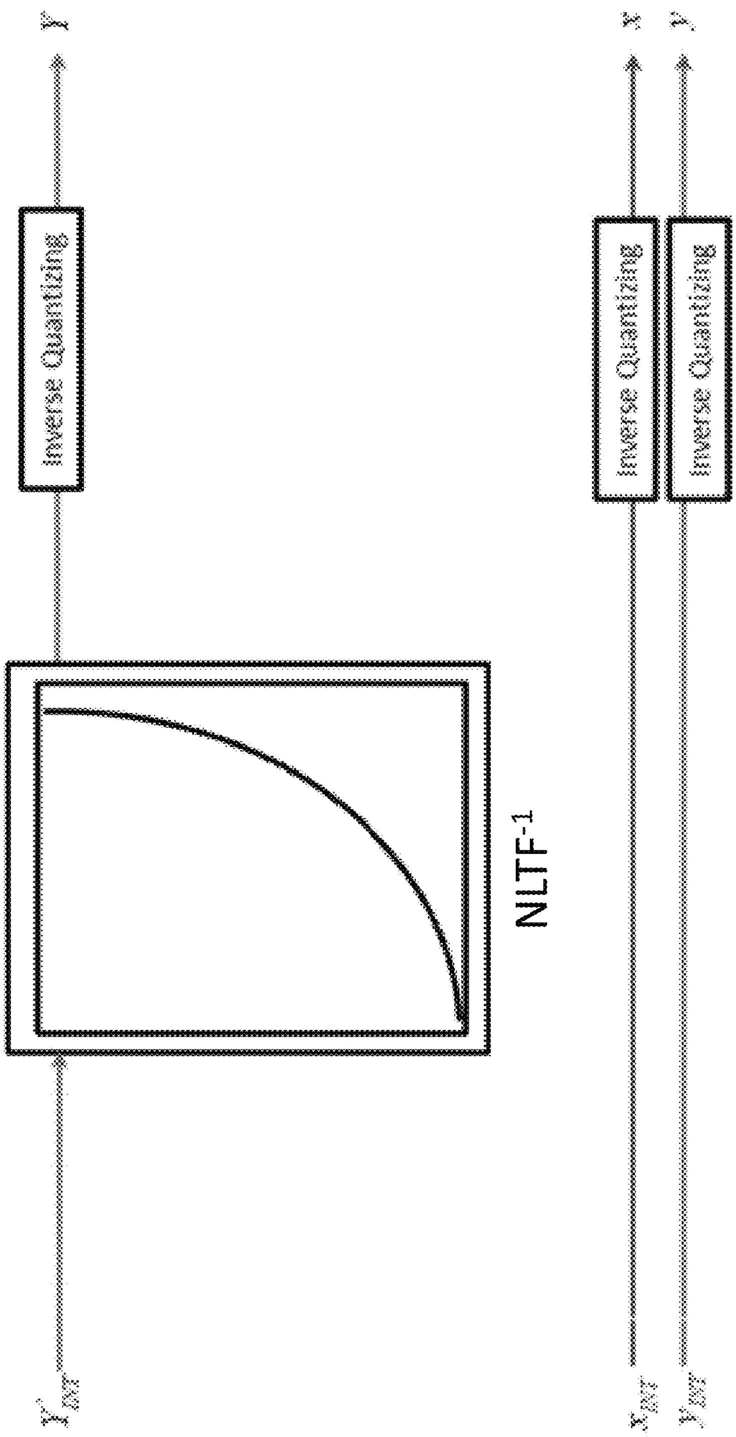
FIG. 26A illustrates one embodiment of a Yxy decode with an inverse non-linear transfer function ($NLTF^{-1}$) applied only to the Y channel.

FIG. 26A illustrates one embodiment of a Yxy decode with an $NLTF^{-1}$ applied only to the Y channel. In one embodiment, a non-linear function (e.g., $NLTF^{-1}$) is applied to the luma. The non-linear function is not applied to the two colorimetric coordinates. Although the example in FIG. 26A shows a Yxy decode, System 4 is operable to be used with a plurality of data formats.

In one embodiment, the $NLTF^{-1}$ is an inverse DRR function with a value between about 1.1 and about 4. In one embodiment, the $NLTF^{-1}$ is an inverse DRR function with a value between about 1.4 and about 4. In one embodiment, the $NLTF^{-1}$ is an inverse DRR function with a value between about 1.4 and about 2.4. In one embodiment, the $NLTF^{-1}$ is an inverse DRR function with a value between about 2 and about 4.

Figure 26B:
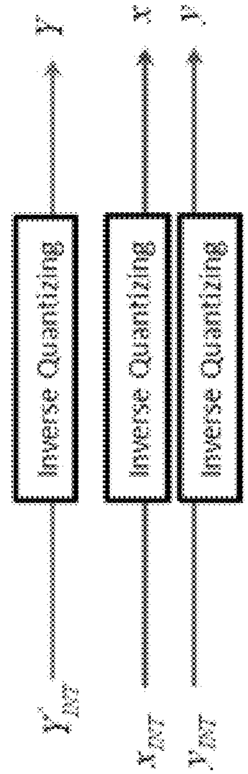
FIG. 26B illustrates one embodiment of a Yxy decode without an $NLTF^{-1}$ applied to any of the channels.

FIG. 26B illustrates one embodiment of a Yxy decode without an $NLTF^{-1}$ applied to any of the channels. In one embodiment, data is sent linearly as luminance. A non-linear function (e.g., an $NLTF^{-1}$) is not applied to the luminance or the two colorimetric coordinates. Although the example in FIG. 26B shows a Yxy decode, System 4 is operable to be used with a plurality of data formats.

Figure 26C:
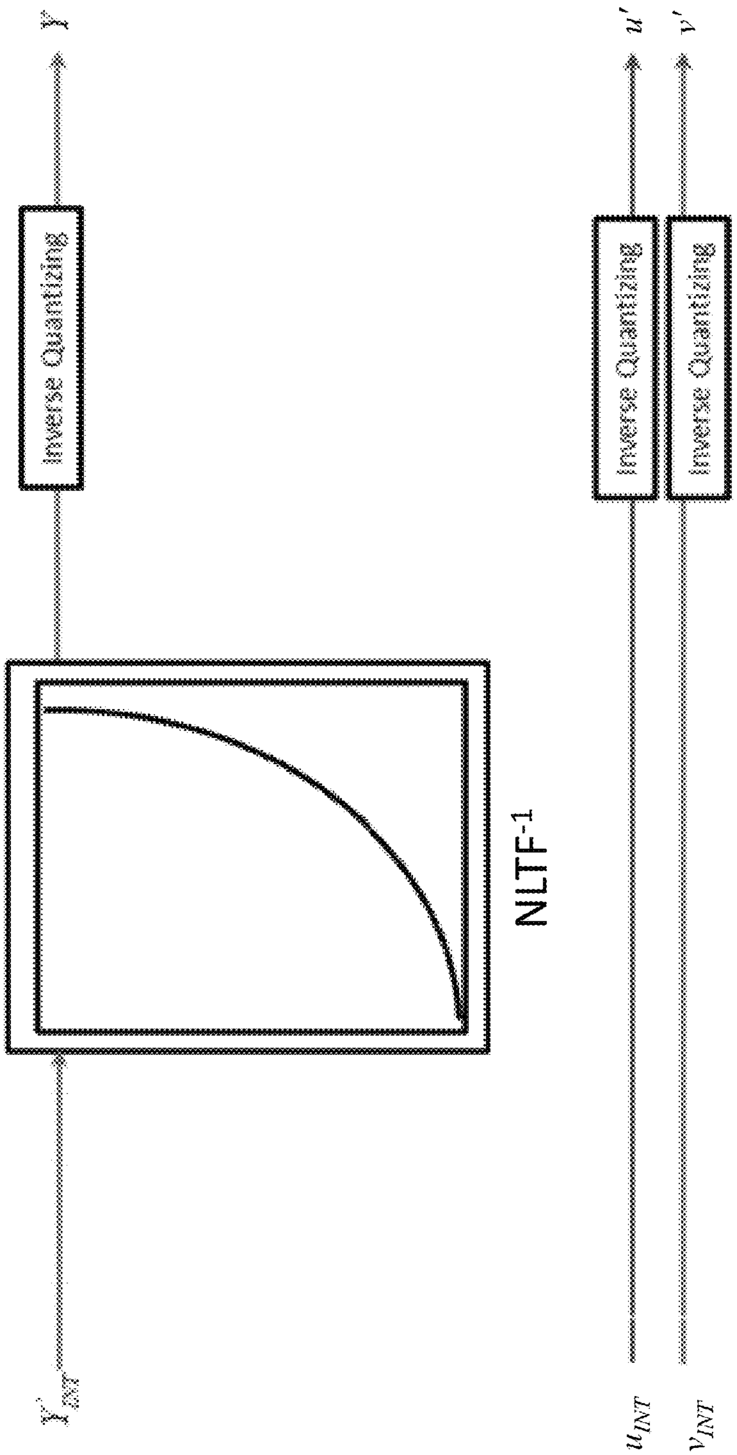
FIG. 26C illustrates one embodiment of a Yu'v' decode with an $NLTF^{-1}$ applied only to the Y channel.

FIG. 26C illustrates one embodiment of a Yu'v' decode with an $NLTF^{-1}$ applied only to the Y channel. In one embodiment, a non-linear function (e.g., $NLTF^{-1}$) is applied to the luma. The non-linear function is not applied to the two colorimetric coordinates. Although the example in FIG. 26C shows a Yu'v' decode, System 4 is operable to be used with a plurality of data formats.

Figure 26D:
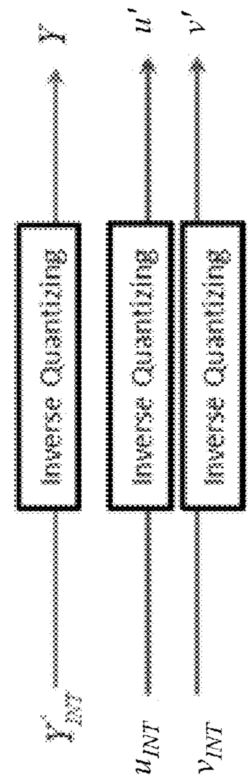
FIG. 26D illustrates one embodiment of a Yu'v' decode without an $NLTF^{-1}$ applied to any of the channels.

FIG. 26D illustrates one embodiment of a Yu'v' decode without an $NLTF^{-1}$ applied to any of the channels. In one embodiment, data is sent linearly as luminance. A non-linear function (e.g., an $NLTF^{-1}$) is not applied to the luminance or the two colorimetric coordinates. Although the example in FIG. 26D shows a Yu'v' decode, System 4 is operable to be used with a plurality of data formats.

Figure 27A:
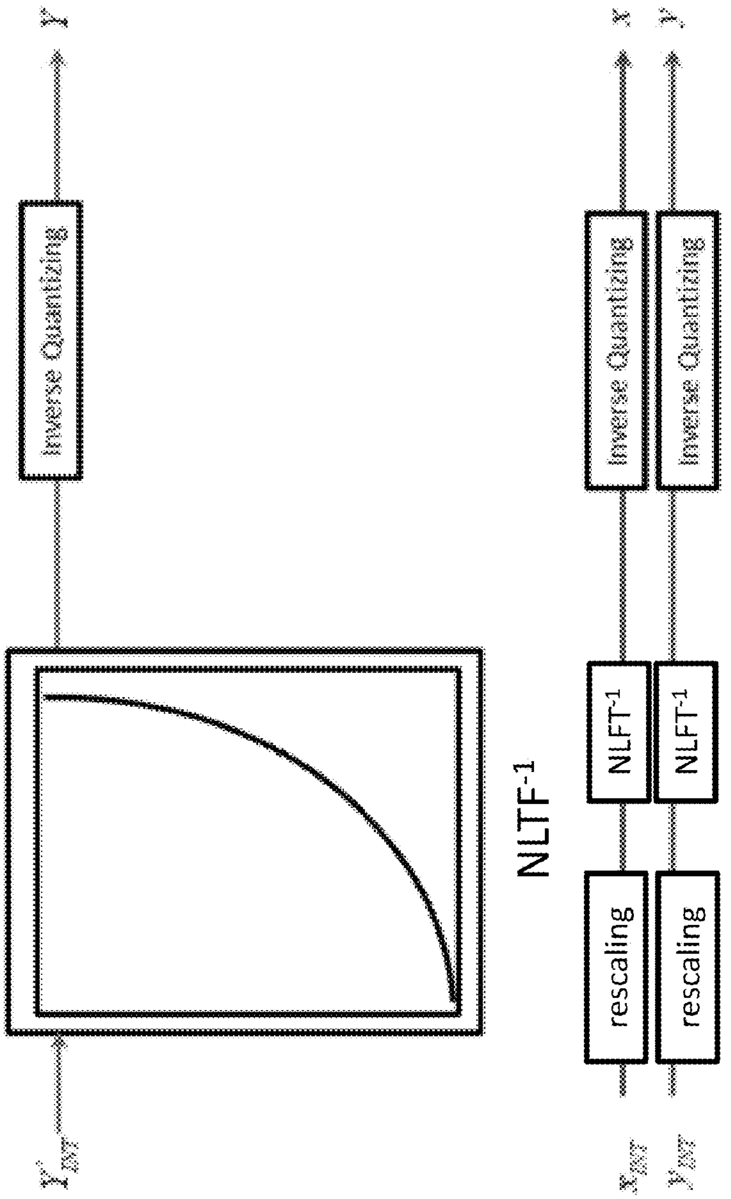
FIG. 27A illustrates one embodiment of a Yxy decode with an $NLTF^{-1}$ applied to all three channels and rescaling of x and y.

FIG. 27A illustrates one embodiment of a Yxy decode with an $NLTF^{-1}$ applied to all three channels and rescaling of x and y. In one embodiment, a non-linear function (e.g., an $NLTF^{-1}$) is applied to the luma and to the two colorimetric coordinates. Although the example in FIG. 27A shows a Yxy decode, System 4 is operable to be used with a plurality of data formats.

Figure 27B:
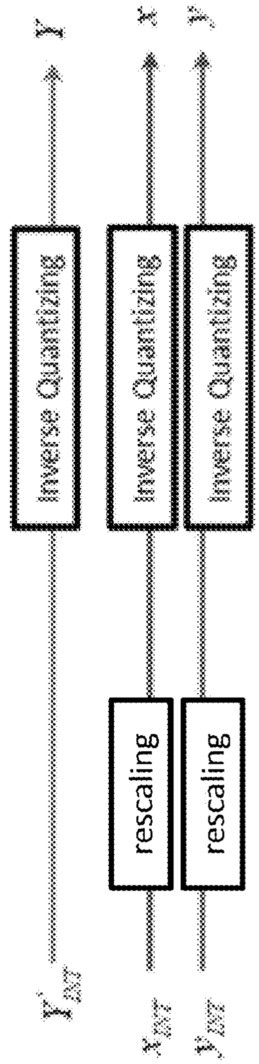
FIG. 27B illustrates one embodiment of a Yxy decode without an $NLTF^{-1}$ applied to any of the channels and with rescaling applied to the x and y channels.

FIG. 27B illustrates one embodiment of a Yxy decode without an $NLTF^{-1}$ applied to any of the channels and with rescaling applied to the x,y channels. In one embodiment, data is sent linearly as luminance. A non-linear function (e.g., an $NLTF^{-1}$) is not applied to the luminance or the two colorimetric coordinates. Although the example in FIG. 27B shows a Yxy decode, System 4 is operable to be used with a plurality of data formats (e.g., Yu'v').

Figure 27C:
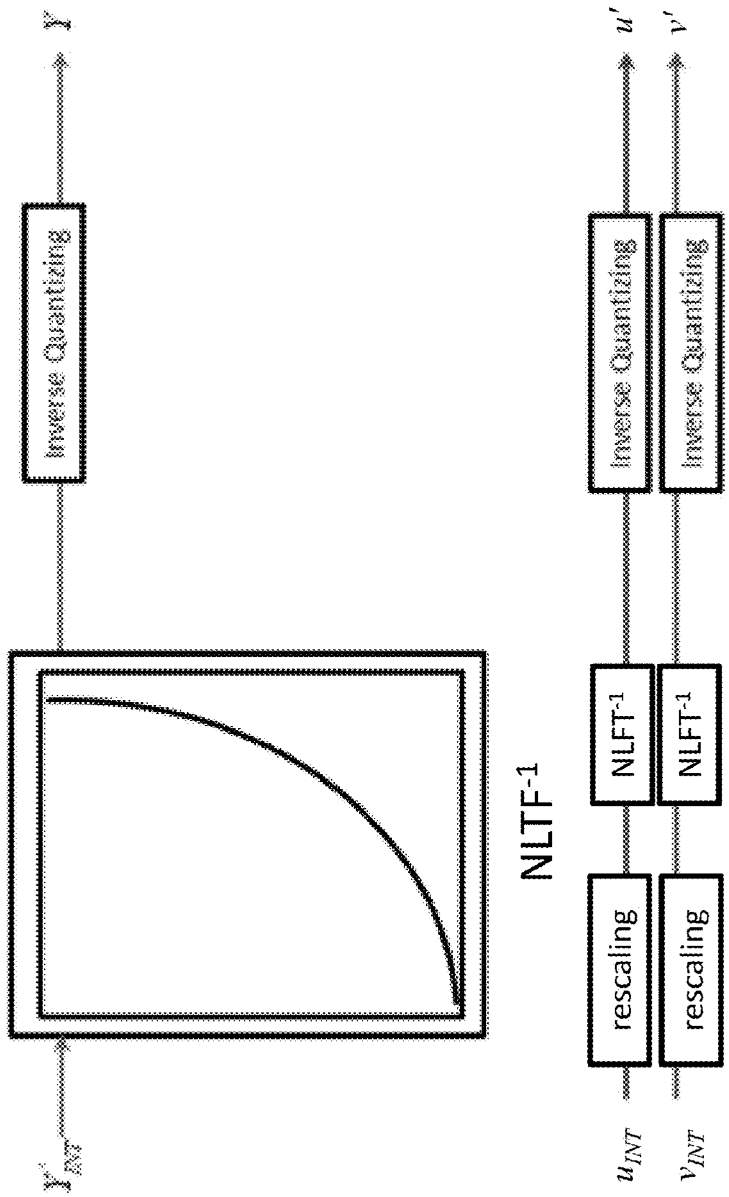
FIG. 27C illustrates one embodiment of a Yu'v' decode with an $NLTF^{-1}$ applied to all three channels and rescaling of u' and v'.

FIG. 27C illustrates one embodiment of a Yu'v' decode with an $NLTF^{-1}$ applied to all three channels and rescaling of u' and v'. In one embodiment, a non-linear function (e.g., an $NLTF^{-1}$) is applied to the luma and to the two colorimetric coordinates. Although the example in FIG. 27C shows a Yu'v' decode, System 4 is operable to be used with a plurality of data formats.

Figure 27D:
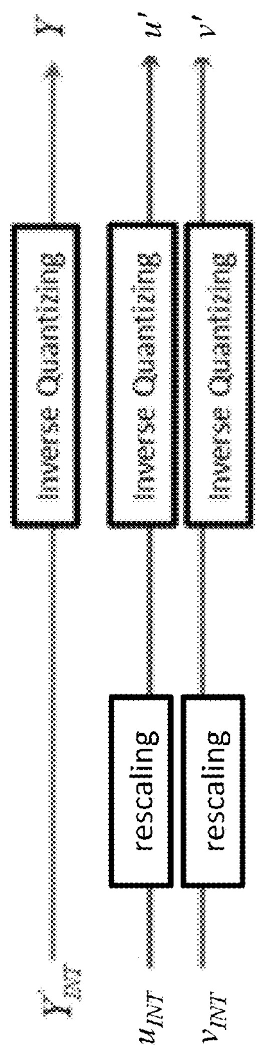
FIG. 27D illustrates one embodiment of a Yu'v' decode without an $NLTF^{-1}$ applied to any of the channels and with rescaling applied to the u' and v' channels.

FIG. 27D illustrates one embodiment of a Yu'v' decode without an $NLTF^{-1}$ applied to any of the channels and with rescaling applied to the u' and v' channels. In one embodiment, data is sent linearly as luminance. A non-linear function (e.g., an $NLTF^{-1}$) is not applied to the luminance or the two colorimetric coordinates. Although the example in FIG. 27D shows a Yu'v' decode, System 4 is operable to be used with a plurality of data formats.

Advantageously, XYZ is used as the basis of ACES for cinematographers and allows for the use of colors outside of the ITU-R BT.709 and/or the P3 color spaces, encompassing all of the CIE color space. Colorists often work in XYZ, so there is widespread familiarity with XYZ. Further, XYZ is used for other standards (e.g., JPEG 2000, Digital Cinema Initiatives (DCI)), which could be easily adapted for System 4. Additionally, most color spaces use XYZ as the basis for conversion, so the conversions between XYZ and most color spaces are well understood and documented. Many professional displays also have XYZ option as a color reference function.

In one embodiment, the image data converter includes at least one look-up table (LUT). In one embodiment, the at least one look-up table maps out of gamut colors to zero. In one embodiment, the at least one look-up table maps out of gamut colors to a periphery of visible colors.

Transfer Functions

The system design minimizes limitations to use standard transfer functions for both encode and/or decode processes. Current practices used in standards include, but are not limited to, ITU-R BT.1886, ITU-R BT.2020, SMPTE ST274, SMPTE ST296, SMPTE ST2084, and ITU-R BT.2100. These standards are compatible with this system and require no modification.

Encoding and decoding multi-primary (e.g., 6P, RGBC) images is formatted into several different configurations to adapt to image transport frequency limitations. The highest quality transport is obtained by keeping all components as multi-primary (e.g., RGBCMY) components. This uses the highest sampling frequencies and requires the most signal bandwidth. An alternate method is to sum the image details in a luminance channel at full bandwidth and then send the color difference signals at half or quarter sampling (e.g., Y Cr Cb Cc Cy). This allows a similar image to pass through lower bandwidth transports.

An IPT system is a similar idea to the Yxy system with several exceptions. An IPT system or an $IC_TC_P$ system is still an extension of XYZ and is operable to be derived from RGB and multiprimary (e.g., RGBCMY, RGBC) color coordinates. An IPT color description is operable to be substituted within a 4:4:4 sampling structure, but XYZ has already been established and does not require the same level of calculations. For an $IC_TC_P$ transport system, similar substitutions are operable to be made. However, both substitution systems are limited in that a non-linear function (e.g., OOTF) is contained in all three components. Although the non-linear function is operable to be removed for IPT or $IC_TC_P$, the derivation would still be based on a set of RGB primaries with a white point reference. Removing the non-linear function may also alter the bit depth noise and compressibility.

For transport, simple substitutions are operable to be made using the foundation of what is described with transport of XYZ for the use of IPT in current systems as well as the current standards used for $IC_TC_P$.

Figure 28A:
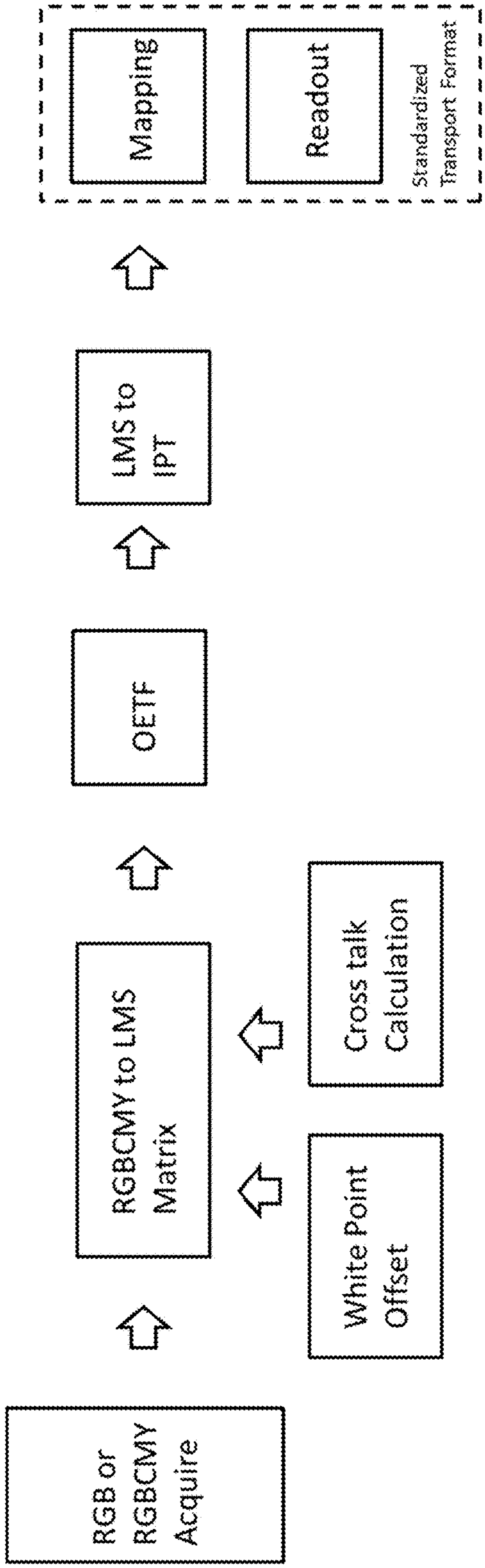
FIG. 28A illustrates one embodiment of an IPT 4:4:4 encode.

FIG. 28A illustrates one embodiment of an IPT 4:4:4 encode.

Figure 28B:
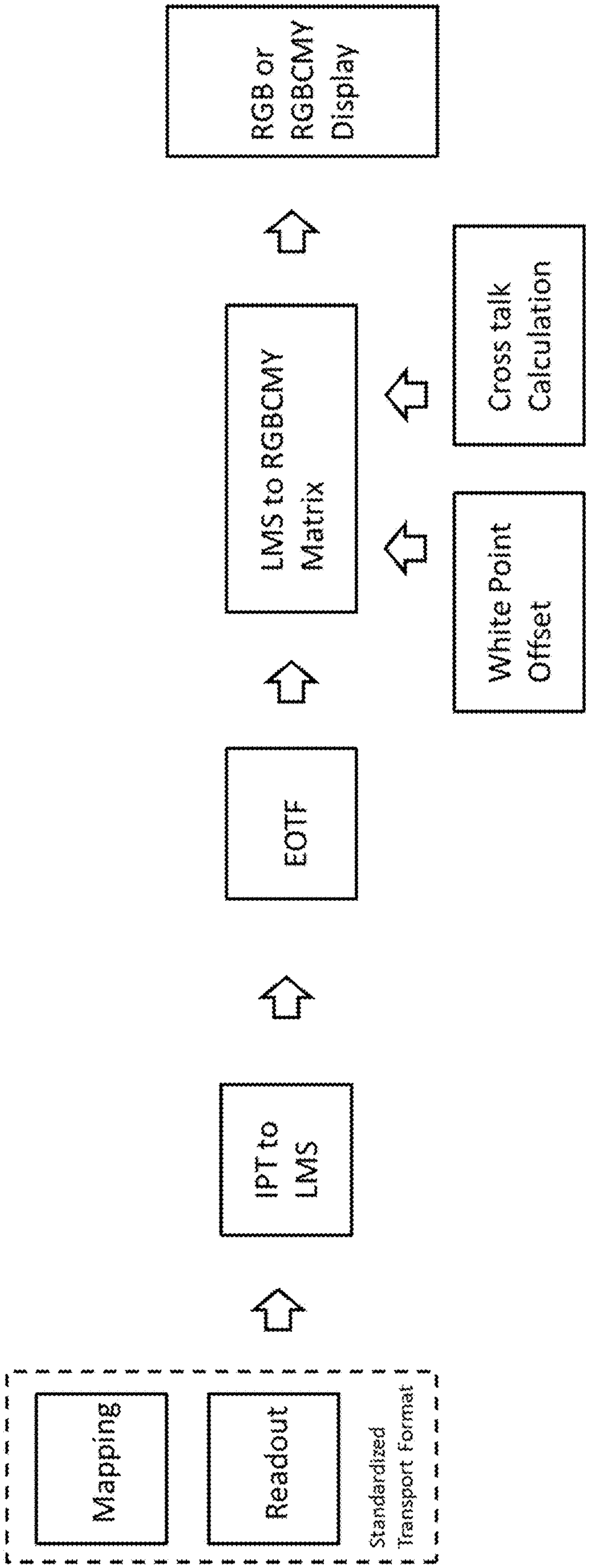
FIG. 28B illustrates one embodiment of an IPT 4:4:4 decode.

FIG. 28B illustrates one embodiment of an IPT 4:4:4 decode.

Figure 29A:
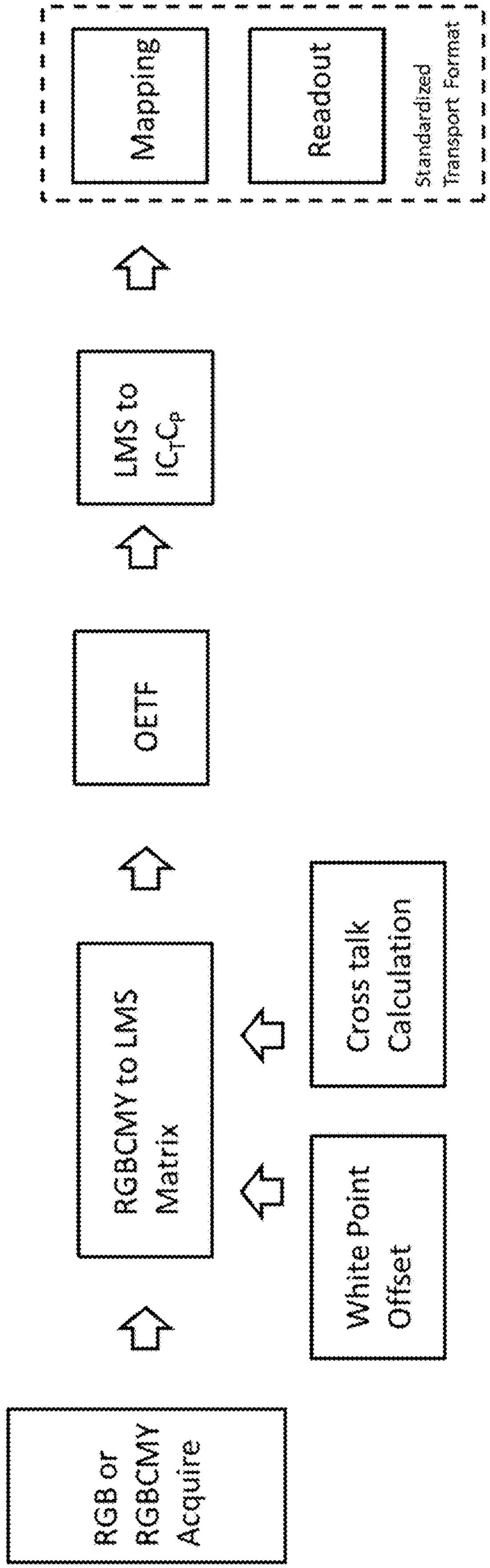
FIG. 29A illustrates one embodiment of an ICTCP 4:2:2 encode.

FIG. 29A illustrates one embodiment of an $IC_TC_P$ 4:2:2 encode.

Figure 29B:
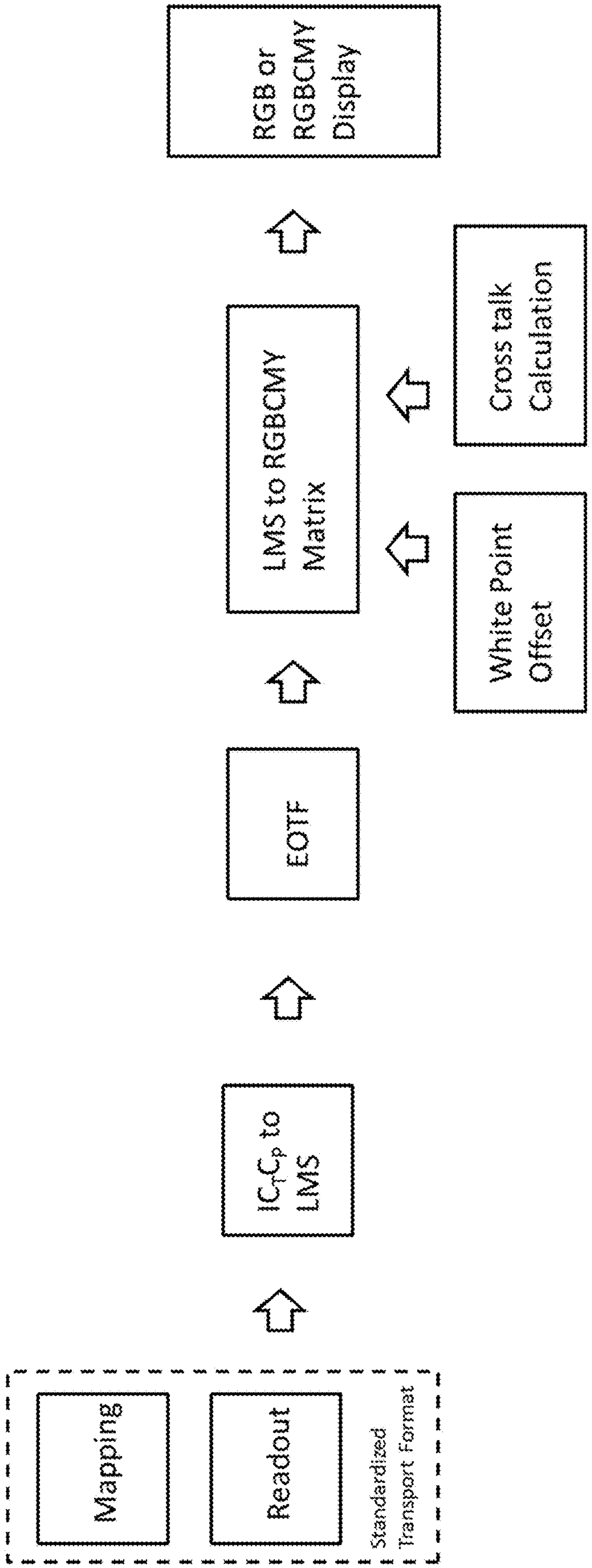
FIG. 29B illustrates one embodiment of an ICTCP 4:2:2 decode.

FIG. 29B illustrates one embodiment of an $IC_TC_P$ 4:2:2 decode.

Transfer functions used in systems 1, 2, and 3 are generally framed around two basic implementations. For images displaying using a standard dynamic range, the transfer functions are defined within two standards. The OETF is defined in ITU-R BT.709-6, table 1, row 1.2. The inverse function, the EOTF, is defined in ITU-R BT.1886. For high dynamic range imaging, the perceptual quantizer (PQ) and hybrid log-gamma (HLG) curves are described in ITU-R BT.2100-2: 2018, table 4.

Prior art involves the inclusion of a non-linearity based on a chosen optical performance. As imaging technology has progressed, different methods have evolved. At one time, computer displays were using a simple 1.8 gamma, while television assumed an inverse of a 0.045 gamma. When digital cinema was established, a 2.6 gamma was used, and complex HDR solutions have recently been introduced. However, because these are embedded within the RGB structure, conversion between formats is operable to be very complicated and requires vast amounts of processing. Advantageously, a Yxy or Yu'v' system does not require complicated conversion or large amounts of processing.

Reexamination of the use of gamma and optical based transfer curves for data compression led to the development of the Data Rate Reduction (DRR) technique. While the form of DRR is similar to the use of gamma, the purpose of DRR is to maximize the efficiency of the number of bits available to the display. The advantage is that DRR is operable to transfer to and/or from any OOTF system using a simple conversion method, such that any input transform is operable to be displayed using any output transform with minimal processing.

By using the DRR process, the image is operable to be encoded within the source device. The use of a common non-linearity allows faster and more accurate conversion. The design of this non-linearity is for data transmission efficiency, not as an optical transform function. This only works if certain parameters are set for the encode. Any pre-process is acceptable, but it must ensure an accurate 16-bit linear result.

Two methods are available for decode: (1) applying the inverse DRR to the input data and converting to a linear data format or (2) a difference between the DRR value and the desired display gamma is operable to be used to directly map the input data to the display for simple display gammas.

Another requirement is that the calculation be simple. By using DRR, processing is kept to a minimum, which reduces signal latency. The non-linearity (e.g., DRR) is applied based on bit levels, not image intensity.

System 4 is operable to use any of the transfer functions, which are operable to be applied to the Y component. However, to improve compatibility and to simplify conversion between standard transfer functions, a new method has been developed: a ½ DRR function. Advantageously, the ½ DRR function allows for a single calculation from the luminance (e.g., Y) component of the signal (e.g., Yxy signal, Yu'v' signal) to the display. Advantageously, the ½ DRR function is designed for data efficiency, not as an optical transform function. In one embodiment, the ½ DRR function is used instead of a non-linear function (e.g., OETF or EOTF). In one embodiment, signal input to the ½ DRR function is assumed to be linear and constrained between values of 0 and 1. In one embodiment, the ½ DRR function is optimized for 10-bit transport and/or 12-bit transport. Alternatively, the ½ DRR function is optimized for 14-bit transport and/or 16-bit transport. In an alternative embodiment, the ½ DRR function is optimized for 8-bit transport. A typical implementation applies an inverse of the ½ DRR function, which linearizes the signal. A conversion to a display gamut is then applied.

FIG. 103 illustrates one embodiment of a ½ DRR function.

In one embodiment, a DRR is applied to source media as $n=L^{1/\tau}$ and an inverse DRR ($DRR^{-1}$) is applied to a display (or sink) as $L=n^{\tau}$, where τ represents the exponent of the inverse non-linearity. In one embodiment, the system incorporates both the source gamma (e.g., OETF) and the display gamma (e.g., EOTF). For example, the following equation for a DRR is used:

$$L=n^{OETF*EOTF}/_{DRR\ value}$$

where the DRR value in this equation is the conversion factor from linear to non-linear. An inverse DRR ($DRR^{-1}$) is the re-expansion coefficient from the non-linear to the linear.

Advantageously, using the ½ DRR function with the OOTF gamma combines the functions into a single step rather than utilizing a two-step conversion process. In one embodiment, at least one tone curve is applied after the ½ DRR function. The ½ DRR function advantageously provides ease to convert to and from linear values. Given that all color and tone mapping has to be done in the linear domain, having a simple to implement conversion is desirable and makes the conversion to and from linear values easier and simpler.

FIG. 104 illustrates a graph of maximum quantizing error using the ½ DRR function. The maximum quantizing error from an original 16-bit image to a 10-bit (blue trace) signal is shown in the graph. In the embodiment shown in the graph, the maximum quantizing error is less than 0.05% (e.g., 0.047%) for 16-bit to 10-bit conversion using the ½ DRR function. The graph also shows the maximum quantizing error from the original 16-bit image to a 12-bit (orange trace) signal and a 14-bit (gray trace) signal.

While a ½ DRR is ideal for converting images with 16-bit (e.g., 16-bit float) values to 12-bit (e.g., 12-bit integer) values, for other data sets a ⅓ DRR provides equivalent performance in terms of peak signal-to-noise ratio (PSNR). For HDR content, which has a wider luminance dynamic range (e.g., up to 1000 $cd/m^2$), the ⅓ DRR conversion from 16-bit float maintains the same performance as ½ DRR. In one embodiment, an equation for finding an optimum value of tau is:

$$\tau = \frac{-\log_2(\text{Minimum Float Value})}{\text{Integer Bit Depth}}$$

In one embodiment, the Minimum Float Value is based on the IEEE Standard for Floating-Point Arithmetic (IEEE 754) (July 2019), which is incorporated herein by reference in its entirety. In one embodiment, the range of image values is normalized to between 0 and 1. The range of image values is preferably normalized to between 0 and 1 and then the DRR function is applied.

For example, for an HDR system (e.g., with a luminance dynamic range of 1000-4000 cd/m$^2$), the above equation becomes:

$$\tau = \frac{-\{\log_2(\text{Minimum Float Value}) - \log_2(\text{Peak } HDR \text{ value})\}}{\text{Integer Bit Depth}}$$

FIG. 108 illustrates one embodiment of a ⅓ DRR function.

In one embodiment, the DRR value is preferably between 0.25 and 0.9. Table 8 illustrates one embodiment of an evaluation of DRR vs. bit depth vs. full 16-bit float (equivalent to 24 f-stops). Table 9 illustrates one embodiment of a recommended application of DRR. Table 10 illustrates one embodiment of DRR functions optimized for 8 bits, 10 bits, and 12 bits, based on the desired dynamic range as indicted in f-stops. Each f-stop represents a doubling of light values. The f-stops provide a range of tones over which the noise, measured in f-stops (e.g., the inverse of the perceived signal-to-noise ratio, PSNR) remains under a specified maximum value. The lower the maximum noise, or the higher the PSNR, the better the image quality. In one embodiment, no DRR is applied to Yxy or Yu'v' 16-bit data. In one embodiment, the Yxy or Yu'v' 16-bit data covers 24 f-stops. In one embodiment, a 0.6 DRR is applied to Yxy or Yu'v' 12-bit data, a 0.5 DRR is applied to Yxy or Yu'v' 10-bit data, and/or a 0.4 DRR is applied to Yxy or Yu'v' 8-bit data. In one embodiment, the Yxy or Yu'v' 12-bit data, the Yxy or Yu'v' 10-bit data, and/or the Yxy or Yu'v' 8-bit data cover 20 f-stops.

TABLE 8

Evaluation of DRR vs bit depth vs. full 16 bit float (equiv to 24 f-stops)

| Bit Depth | DRR | PSNR |
|---|---|---|
| 12 | 0.5 | 76 |
| 10 | 0.417 | 63.7 |
| 8 | 0.333 | 49.7 |

TABLE 9

Recommended Application of DRR (equivalent to 20 f-stops)

| Bit Depth | f-stop | DRR | PSNR (test image) | PSNR (linear gradient) |
|---|---|---|---|---|
| 12 | 20 | 0.6 | 68.8 | 80.3 |
| 10 | 20 | 0.5 | 51.5 | 73.6 |
| 8 | 20 | 0.4 | 43.6 | 56.2 |

TABLE 10

Evaluation of DRR vs bit depth vs dynamic range in f-stops

| Bit Depth | f-stop | DRR | PSNR |
|---|---|---|---|
| 12 | 14 | 0.8571 | 63.3 |
| 12 | 16 | 0.75 | 67.4 |
| 12 | 20 | 0.6 | 68.8 |
| 10 | 14 | 0.7143 | 53.8 |
| 10 | 16 | 0.625 | 51.5 |
| 10 | 20 | 0.5 | 51.5 |
| 8 | 14 | 0.5714 | 40 |
| 8 | 16 | 0.5 | 39.8 |
| 8 | 20 | 0.4 | 43.6 |

Encoder and Decoder

In one embodiment, the multi-primary system includes an encoder operable to accept image data input (e.g., RAW, SDI, HDMI, DisplayPort, ethernet). In one embodiment, the image data input is from a camera, a computer, a processor, a flash memory card, a network (e.g., local area network (LAN)), or any other file storage or transfer medium operable to provide image data input. The encoder is operable to send processed image data (e.g., Yxy, XYZ, Yu'v') to a decoder (e.g., via wired or wireless communication). The decoder is operable to send formatted image data (e.g., SDI, HDMI, Ethernet, DisplayPort, Yxy, XYZ, Yu'v', legacy RGB, multi-primary data (e.g., RGBC, RGBCMY, etc.)) to at least one viewing device (e.g., display, monitor, projector) for display (e.g., via wired or wireless communication). In one embodiment, the decoder is operable to send formatted image data to at least two viewing devices simultaneously. In one embodiment, two or more of the at least two viewing devices use different color spaces and/or formats. In one example, the decoder sends formatted image data to a first viewing device in HDMI and a second viewing device in SDI. In another example, the decoder sends formatted image data as multi-primary (e.g., RGBCMY, RGBC) to a first viewing device and as legacy RGB (e.g., Rec. 709) to a second viewing device. In one embodiment, the Ethernet formatted image data is compatible with SMPTE ST2022. Additionally or alternatively, the Ethernet formatted image data is compatible with SMPTE ST2110 and/or any internet protocol (IP)-based transport protocol for image data.

The encoder and the decoder preferably include at least one processor. By way of example, and not limitation, the at least one processor may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information. In one embodiment, one or more of the at least one processor is operable to run predefined programs stored in at least one memory of the encoder and/or the decoder.

The encoder and/or the decoder include hardware, firmware, and/or software. In one embodiment, the encoder and/or the decoder is operable to be inserted into third party software (e.g., via a dynamic-link library (DLL)). In one embodiment, functionality and/or features of the encoder and/or the decoder are combined for efficiency.

FIG. 105 illustrates one embodiment of an encoder. The encoder includes at least one encoder input (e.g., SDI, HDMI, SMPTE ST2110, SMPTE ST2022, DisplayPort, fiber, ethernet) and at least one encoder output (e.g., SDI, HDMI, SMPTE ST2110, SMPTE ST2022, Yxy SDI, Yxy HDMI, Yu'v' SDI, Yu'v' HDMI, DisplayPort, fiber, ethernet). The encoder preferably includes an encoder operations programming port operable to provide updates to firmware and/or software on the encoder. For example, the encoder operations programming port is operable to update library functions, internal formatting, camera demosaicing (e.g., DeBayer) pattern algorithms, and/or look-up tables in the encoder. In one embodiment, the encoder includes a metadata input. In one embodiment, the encoder includes an encoder configuration central processing unit (CPU) operable to interface with at least one encoder memory. The encoder further includes an encoder equalizer, at least one encoder serial to parallel (S/P) converter (e.g., SDI S/P converter, HDMI S/P, Ethernet S/P converter), at least one encoder flash card reader, at least one Ethernet port, a demosaicing (e.g., DeBayer) engine, a linear converter, a scaler (e.g., 0-1), at least one custom encoder LUT, a color channel-to-XYZ converter (e.g., RGB in Rec. 709, P3, Rec. 2020; 6P; multi-primary; ACES; custom), an XYZ-to-Yxy converter, an XYZ-to-Yu'v' converter, a DRR function (e.g., ½ DRR), an xy scaler, a u'v' scaler, a sampling selector (e.g., 4:4:4, 4:2:2, 4:2:0), a metadata decoder, an encoder metadata formatter, at least one encoder parallel to serial (P/S) converter (e.g., SDI P/S converter, HDMI P/S converter, Ethernet P/S converter), at least one encoder formatter (e.g., SDI formatter, HDMI formatter, Ethernet formatter), and/or a watermark engine. In one embodiment, the input data is operable to bypass any combination of processing stages and/or components in the encoder.

The at least one encoder input includes, but is not limited to, an SDI input, an HDMI input, a DisplayPort input, an ethernet input, and/or a SMPTE ST2110 input. The SDI input preferably follows a modified version of SMPTE ST352 payload ID standard. In one embodiment, the SDI input is SMPTE ST292, SMPTE ST425, and/or SMPTE ST2082. In one embodiment, a video signal from the SDI input is then sent to the encoder equalizer to compensate for cable type and length. In one embodiment, the HDMI input is decoded with a standard HDMI receiver circuit. In one embodiment, the HDMI input is converted to a parallel format. In one embodiment, the HDMI input is defined within the CTA 861 standard. In another embodiment, the at least one encoder input includes image data (e.g., RAW data) from a flash device. The configuration CPU identifies a format on the flash card and/or a file type, and has software operable to read the image data and make it available to the encoder.

In one embodiment, the encoder operations port is operable to connect to an encoder control system (e.g., via a micro universal serial bus (USB) or equivalent). In one embodiment, the encoder control system is operable to control the at least one encoder memory that holds tables for the demosaicing (e.g., DeBayer) engine, load modifications to the linear converter and/or scaler, select the at least one input, loads a table for the at least one custom encoder LUT, bypass one or more of the at least one custom encoder LUT, bypass the demosaicing (e.g., DeBayer) engine, add or modify conversion tables for the RGB to XYZ converter, modify the DRR function (e.g., a ½ DRR function), turn the watermark engine on or off, modify a digital watermark for the watermark engine, and/or perform functions for the flash memory player (e.g., play, stop, forward, fast forward, rewind, fast rewind, frame selection).

In one embodiment, the metadata decoder is operable to decode Extended Display Identification Data (EDID) (e.g., for HDMI inputs), SDP parameters (SMPTE ST 2110), payload ID, and/or ancillary information (e.g., vertical ancillary data (VANC)). The encoder configuration CPU is operable to process data from the metadata decoder. Further, the encoder configuration CPU is operable to select particular settings and/or deliver selected data to the encoder metadata formatter. The metadata input is operable to insert additional data and/or different data values, which are also operable to be sent to the encoder metadata formatter. The encoder metadata formatter is operable to take information from the encoder configuration CPU and arrange the information to be reinserted into the output of the process. In one embodiment, each encoder output formatter then takes this formatted data and times it to be used in the serial stream.

In one embodiment, the at least one S/P converter is up to n bit for improved processing efficiency. The at least one S/P converter preferably formats the processed image data so that the encoder and/or the decoder is operable to use parallel processing. Advantageously, parallel processing keeps processing fast and minimizes latency.

The at least one encoder formatter is operable to organize the serial stream as a proper format. In a preferred embodiment, the encoder includes a corresponding encoder formatter for each of the at least one encoder output. For example, if the encoder includes at least one HDMI output in the at least one encoder output, the encoder also includes at least one HDMI formatter in the at least one encoder formatter; if the encoder includes at least one SDI output in the at least one encoder output, the encoder also includes at least one SDI formatter in the at least one encoder formatter; if the encoder includes at least one Ethernet output in the at least one encoder output, the encoder also includes at least one Ethernet formatter in the at least one encoder formatter; and so forth.

There is an advantage of inputting a RAW camera image to take advantage of the extended dynamic range and wider color gamut versus using a standard video input. In one embodiment, the demosaicing (e.g., DeBayer) engine is operable to convert RAW image data into a raster image. In one embodiment, the raster image is a 3-channel image (e.g., RGB). In one embodiment, the demosaicing (e.g., DeBayer) engine is bypassed for data that is not in a RAW image format. In one embodiment, the demosaicing (e.g., DeBayer) engine is configured to accommodate at least three primaries (e.g., 3, 4, 5, 6, 7, 8, etc.) in the Bayer or stripe pattern. To handle all of the different demosaicing (e.g., DeBayer) options, the operations programming port is operable to load a file with code required to adapt a specific pattern (e.g., Bayer). For images that are not RAW, a bypass path is provided and switched to and from using the encoder configuration CPU. In one embodiment, the encoder is operable to recognize the image data format and select the correct path automatically. Alternatively, the image data format is included in metadata.

The encoder configuration CPU is operable to recognize an input non-linearity value and provide an inverse value to the linear converter to linearize the image data. The scaler is operable to map out of gamut values into in gamut values.

In one embodiment, the at least one custom encoder LUT is operable to transform an input (e.g., a standard from a manufacturer) to XYZ, Yxy, or Yu'v'. Examples of the input include, but are not limited to, RED Log3G10, ARRI log C, ACEScc, SONY S-Log, CANON Log, PANASONIC V Log, PANAVISION Panalog, and/or BLACK MAGIC CinemaDNG. In one embodiment, the at least one custom encoder LUT is operable to transform the input to an output according to artistic needs. In one embodiment, the encoder does not include the color channel-to-XYZ converter or the XYZ-to-Yxy converter, as this functionality is incorporated into the at least one custom encoder LUT. In one embodiment, the at least one custom encoder LUT is a 65-cube look-up table. The at least one custom encoder LUT is preferably compatible with ACES Common LUT Format (CLF)—A Common File Format for Look-Up Tables S-2014-006, which was published Jul. 22, 2021 and which is incorporated herein by reference in its entirety. In one embodiment, the at least one custom encoder LUT is a multi-column LUT. The at least one custom encoder LUT is preferably operable to be loaded through the operations programming port. If no LUT is required, the encoder configuration CPU is operable to bypass the at least one custom encoder LUT.

In one embodiment, RGB or multi-primary (e.g., RGBCMY, RGBC) data is converted into XYZ data using the color channel-to-XYZ converter. In a preferred embodiment, a white point value for the original video data (e.g., RGB, RGBCMY) is stored in one or more of the at least one encoder memory. The encoder configuration CPU is operable to provide an adaption calculation using the white point value. The XYZ-to-Yxy converter is operable to convert XYZ data to Yxy data. Advantageously, the Yxy image data is segmented into a luminance value and a set of colorimetric values, the relationship between Y and x,y is operable to be manipulated to use lower data rates. Similarly, the XYZ-to-Yu'v' converter is operable to convert XYZ data to Yu'v' data, and the conversion is operable to be manipulated to use lower data rates. Any system with a luminance value and a set of colorimetric values is compatible with the present invention. The configuration CPU is operable to set the sample selector to fit one or more of the at least one encoder output. In one embodiment, the sampling selector sets a sampling structure (e.g., 4:4:4, 4:2:2, 4:2:0, 4:1:1). The sampling selector is preferably controlled by the encoder configuration CPU. In a preferred embodiment, the sampling selector also places each component in the correct serial data position as shown in Table 11.

TABLE 11

| | 4:4:4 | 4:2:2, 4:2:0, or 4:1:1 |
|---|---|---|
| Y | Y, G, I | Y, I |
| x or u' | $C_B$, R, X, $C_T$ | $C_B$, $C_T$ |
| y or v' | $C_R$, B, Z, $C_P$ | $C_R$, $C_P$ |

The encoder is operable to apply a DRR function (e.g., ½ DRR, ⅓ DRR) to the Y channel and the xy or u'v' channels. The encoder is also operable to apply scaling to the xy or u'v' channels.

The watermark engine is operable to modify an image from an original image to include a digital watermark. In one embodiment, the digital watermark is outside of the ITU-R BT.2020 color gamut. In one embodiment, the digital watermark is compressed, collapsed, and/or mapped to an edge of the smaller color gamut such that it is not visible and/or not detectable when displayed on a viewing device with a smaller color gamut than ITU-R BT.2020. In another embodiment, the digital watermark is not visible and/or not detectable when displayed on a viewing device with an ITU-R BT.2020 color gamut. In one embodiment, the digital watermark is a watermark image (e.g., logo), alphanumeric text (e.g., unique identification code), and/or a modification of pixels. In one embodiment, the digital watermark is invisible to the naked eye. In a preferred embodiment, the digital watermark is perceptible when decoded by an algorithm. In one embodiment, the algorithm uses an encryption key to decode the digital watermark. In another embodiment, the digital watermark is visible in a non-obtrusive manner (e.g., at the bottom right of the screen). The digital watermark is preferably detectable after size compression, scaling, cropping, and/or screenshots. In yet another embodiment, the digital watermark is an imperceptible change in sound and/or video. In one embodiment, the digital watermark is a pattern (e.g., a random pattern, a fixed pattern) using a luminance difference (e.g., 1 bit luminance difference). In one embodiment, the pattern is operable to change at each frame. The digital watermark is a dynamic digital watermark and/or a static digital watermark. In one embodiment, the dynamic digital watermark works as a full frame rate or a partial frame rate (e.g., half frame rate). The watermark engine is operable to accept commands from the encoder configuration CPU.

In an alternative embodiment, the at least one encoder input already includes a digital watermark when input to the encoder. In one embodiment, a camera includes the digital watermark on an image signal that is input to the encoder as the at least one encoder input.

The at least one encoder output includes, but is not limited to SDI, HDMI, DisplayPort, and/or ethernet. In one embodiment, at least one encoder formatter formats the image data to produce the at least one encoder output. The at least one encoder formatter includes, but is not limited to, an SDI formatter, an SMPTE ST2110, and/or an HDMI formatter. In one embodiment, the SDI formatter formats the serial video data into an SDI package as a Yxy or Yu'v' output. The SMPTE ST2110 formatter formats the serial video data into an ethernet package as a Yxy or Yu'v' output. The HDMI formatter formats the serial video data into an HDMI package as a Yxy or Yu'v' output.

FIG. 106 illustrates one embodiment of a decoder. The decoder includes at least one decoder input (e.g., SDI, HDMI, Ethernet, Yxy SDI, Yxy HDMI, Yxy Ethernet, Yu'v' SDI, Yu'v' HDMI Yu'v' Ethernet, DisplayPort, fiber) and at least one decoder output (e.g., Yxy SDI, Yu'v' SDI, at least one SDI, X'Y'Z', HDMI, Ethernet, DisplayPort, fiber). In one embodiment, the decoder includes a decoder configuration central processing unit (CPU) operable to interface with at least one decoder memory. The decoder preferably includes a decoder operations programming port operable to provide updates to firmware and/or software on the decoder. The decoder further includes a decoder equalizer, at least one decoder serial to parallel (S/P) converter (e.g., SDI S/P converter, HDMI S/P converter, Ethernet S/P converter), a watermark detection engine, a watermark subtraction engine, a DRR-to-linear converter (e.g., ½ DRR-to-linear converter), an xy de-scaler, a u'v' de-scaler, at least one sampling converter (e.g., 4:2:2 or 4:2:0 to 4:4:4 converter), at least one Yxy-to-XYZ converter, at least one Yu'v'-to-XYZ converter, a gamma library (e.g., linear, 2.2, 2.35, 2.4, 2.6, HLG, PQ, custom), an XYZ-to-color channel library (e.g., RGB (e.g., Rec. 709, P3, Rec. 2020); multi-primary data), a color channel-to-YUV library (e.g., RGB (e.g., Rec. 709, P3, Rec. 2020); multi-primary data), at least one sample selector, at least one transfer function, at least one custom decoder LUT, a metadata reader, a decoder metadata formatter, at least one decoder parallel to serial (P/S) converter (e.g., SDI X'Y'Z', at least one SDI, HDMI), and/or at least one decoder formatter (e.g., SDI X'Y'Z' formatter, SDI RGB formatter, SDI CMY formatter, HDMI formatter). In one embodiment, X'Y'Z' output includes a non-linear function (e.g., gamma, PQ, HLG) applied to XYZ data. In one embodiment, the processed image data is operable to bypass any combination of processing stages and/or components in the decoder.

In one embodiment, the decoder operations port is operable to connect to a decoder control system (e.g., via a micro universal serial bus (USB) or equivalent). In one embodiment, the decoder control system is operable to select the at least one decoder input, perform functions for the flash memory player (e.g., play, stop, forward, fast forward, rewind, fast rewind, frame selection), turn watermark detection on or off, add or modify the gamma library and/or look-up table selection, add or modify the XYZ-to-RGB library and/or look-up table selection, load data to the at least one custom decoder LUT, select bypass of one or more of the custom decoder LUT, and/or modify the Ethernet SDP. The gamma library preferably takes linear data and applies at least one non-linear function to the linear data. The at least non-linear function includes, but is not limited to, at least one standard gamma (e.g., those used in standard dynamic range (SDR) and high definition range (HDR) formats) and/or at least one custom gamma. In one embodiment, the at least one standard gamma is defined in ITU BT.709 or ITU BT.2100.

In one embodiment, the output of the gamma library is fed to the XYZ-to-RGB library, where tables are included to map the XYZ data to a standard RGB or YCbCr output format. In another embodiment, the output of the gamma library bypasses the XYZ-to-RGB library. This bypass leaves an output of XYZ data with a gamma applied. The selection of the XYZ-to-RGB library or bypass is determined by the configuration CPU. If the output format selected is YCbCr, then the XYZ-to-RGB library flags which sampling method is desired and provides that selection to the sampling selector. The sampling selector then formats the YCbCr data to a 4:2:2, 4:2:0, or 4:1:1 sampling structure.

In one embodiment, an input to the decoder does not include full pixel sampling (e.g., 4:2:2, 4:2:0, 4:1:1). The at least one sampling converter is operable to take subsampled images and convert the subsampled images to full 4:4:4 sampling. In one embodiment, the 4:4:4 Yxy image data is then converted to XYZ using the at least one Yxy-to-XYZ converter. In another embodiment, the 4:4:4 Yu'v' image data is then converted to XYZ using the Yu'v' using the at least one Yu'v'-to-XYZ converter. Image data is then converted from a parallel form to a serial stream.

The metadata reader is operable to read Extended Display Identification Data (EDID) (e.g., for HDMI inputs), SDP parameters (SMPTE ST 2110), payload ID, and/or ancillary information (e.g., vertical ancillary data (VANC)). The decoder configuration CPU is operable to process data from the metadata reader. Further, the decoder configuration CPU is operable to select particular settings and/or deliver selected data to the decoder metadata formatter. The decoder metadata formatter is operable to take information from the decoder configuration CPU and arrange the information to be reinserted into the output of the process. In one embodiment, each decoder output formatter then takes this formatted data and times it to be used in the serial stream.

In one embodiment, the at least one SDI output includes more than one SDI output. Advantageously, this allows for output over multiple links (e.g., System 3). In one embodiment, the at least one SDI output includes a first SDI output and a second SDI output. In one embodiment, the first SDI output is used to transport a first set of color channel data (e.g., RGB) and the second SDI output is used to transport a second set of color channel data (e.g., CMY).

The watermark detection engine detects the digital watermark. In one embodiment, a pattern of the digital watermark is loaded to the decoder using the operations programming port. In one embodiment, the decoder configuration CPU is operable to turn the watermark detection engine on and off. The watermark subtraction engine removes the digital watermark from image data before formatting for display on the at least one viewing device. In one embodiment, the decoder configuration CPU is operable to allow bypass of the watermark subtraction engine, which will leave the digital watermark on an output image. In a preferred embodiment, the decoder requires the digital watermark in the processed image data sent from the encoder to provide the at least one decoder output. Thus, the decoder does not send color channel data to the at least one viewing device if the digital watermark is not present in the processed image data. In an alternate embodiment, the decoder is operable to provide the at least one decoder output without the digital watermark in the processed image data sent from the encoder. If the digital watermark is not present in the processed image data, an image displayed on the at least one viewing device preferably includes a visible watermark.

In one embodiment, output from the watermark subtraction process includes data including a non-linearity (e.g., ½ DRR). Non-linear data is converted back to linear data using an inverse non-linear transfer function (e.g., $NLTF^{-1}$) for the Y channel and the xy or u'v' channels. The xy or u'v' channels are rescaled and undergo sampling conversion.

In one embodiment, the at least one custom decoder LUT includes a 9-column LUT. In one embodiment, the 9-column LUT includes 3 columns for a legacy RGB output (e.g., Rec. 709, Rec. 2020, P3) and 6 columns for a 6P multi-primary display (e.g., RGBCMY). Other numbers of columns (e.g., 7 columns) and alternative multi-primary displays (e.g., RGBC) are compatible with the present invention. In one embodiment, the at least one custom decoder LUT (e.g., the 9-column LUT) is operable to produce output values using tetrahedral interpolation. Advantageously, tetrahedral interpolation uses a smaller volume of color space to determine the output values, resulting in more accurate color channel data. In one embodiment, each of the tetrahedrons used in the tetrahedral interpolation includes a neutral diagonal. Advantageously, this embodiment works even with having less than 6 color channels. For example, a 4P output (e.g., RGBC) or a 5P output (e.g., RGBCY) using an FPGA is operable to be produced using tetrahedral interpolation. Further, this embodiment allows for an encoder to produce legacy RGB output in addition to multi-primary output. In an alternative embodiment, the at least one custom decoder LUT is operable to produce output value using cubic interpolation. The at least one custom decoder LUT is preferably operable to accept linear XYZ data. In one embodiment, the at least one custom decoder LUT is a multi-column LUT. The at least one custom decoder LUT is preferably operable to be loaded through the operations programming port. If no LUT is required, the decoder configuration CPU is operable to bypass the at least one custom decoder LUT.

In one embodiment, the at least one custom decoder LUT is operable to be used for streamlined HDMI transport. In one embodiment, the at least one custom decoder LUT is a 3D LUT. In one embodiment, the at least one custom decoder LUT is operable to take in a 3-column input (e.g., RGB, XYZ) and produce an output of greater than three columns (e.g., RGBC, RGBCY, RGBCMY). Advantageously, this system only requires 3 channels of data as the input to the at least one custom decoder LUT. In one embodiment, the at least one custom decoder LUT applies a non-linear function (e.g., inverse gamma) and/or a curve to produce a linear output. In another embodiment, the at least one custom decoder LUT is a trimming LUT.

The at least one decoder formatter is operable to organize a serial stream as a proper format for the at least one output. In a preferred embodiment, the decoder includes a corresponding decoder formatter for each of the at least one decoder output. For example, if the decoder includes at least one HDMI output in the at least one decoder output, the decoder also includes at least one HDMI formatter in the at least one decoder formatter; if the decoder includes at least one SDI output in the at least one decoder output, the decoder also includes at least one SDI formatter in the at least one decoder formatter; if the decoder includes at least one Ethernet output in the at least one decoder output, the decoder also includes at least one Ethernet formatter in the at least one decoder formatter; and so forth.

The encoder and/or the decoder are operable to generate, insert, and/or recover metadata related to an image signal. The metadata includes, but is not limited to, a color space (e.g., 6P-B, 6P-C), an image transfer function (e.g., DRR, gamma, PQ, HLG, ½ DRR), a peak white value, a white point (e.g., D65, D60, DCI), an image signal range (e.g., narrow (SMPTE) or full), sampling structure (e.g., 4:4:4, 4:2:2, 4:2:0, 4:1:1), bit depth, (e.g., 8, 10, 12, 16), and/or a signal format (e.g., RGB, Yxy, Yu'v', multi-primary (e.g., RGBCMY, RGBC)). In one embodiment, the metadata is inserted into SDI or ST2110 using ancillary (ANC) data packets. In another embodiment, the metadata is inserted using Vendor Specific InfoFrame (VSIF) data as part of the CTA 861 standard. In one embodiment, the metadata is compatible with SMPTE ST 2110-10:2017, SMPTE ST 2110-20:2017, SMPTE ST 2110-40:2018, SMPTE ST 352: 2013, and/or SMPTE ST 352:2011, each of which is incorporated herein by reference in its entirety.

Additional details about the multi-primary system and the display are included in U.S. application Ser. Nos. 17/180,441 and 17/209,959, and U.S. Patent Publication Nos. 20210027693, 20210020094, 20210035487, and 20210043127, each of which is incorporated herein by reference in its entirety.

Display Engine

In one embodiment, the present invention provides a display engine operable to interact with a graphics processing unit (GPU) and provide Yxy, XYZ, YUV, Yu'v', RGB, YCrCb, and/or $IC_TC_P$ configured outputs. In one embodiment, the display engine and the GPU are on a video card. Alternatively, the display engine and the GPU are embedded on a motherboard or a central processing unit (CPU) die. The display engine and the GPU are preferably included in and/or connected to at least one viewing device (e.g., display, video game console, smartphone, etc.). Additional information related to GPUs are disclosed in U.S. Pat. Nos. 9,098,323; 9,235,512; 9,263,000; 9,318,073; 9,442,706; 9,477,437; 9,494,994; 9,535,815; 9,740,611; 9,779,473; 9,805,440; 9,880,851; 9,971,959; 9,978,343; 10,032,244; 10,043,232; 10,114,446; 10,185,386; 10,191,759; 10,229,471; 10,324,693; 10,331,590; 10,460,417; 10,515,611; 10,521,874; 10,559,057; 10,580,105; 10,593,011; 10,600,141; 10,628,909; 10,705,846; 10,713,059; 10,769,746; 10,839,476; 10,853,904; 10,867,362; 10,922,779; 10,923,082; 10,963,299; and 10,970,805 and U.S. Patent Publication Nos. 20140270364, 20150145871, 20160180487, 20160350245, 20170178275, 20170371694, 20180121386, 20180314932, 20190034316, 20190213706, 20200098082, 20200183734, 20200279348, 20200294183, 20200301708, 20200310522, 20200379864, and 20210049030, each of which is incorporated herein by reference in its entirety.

In one embodiment, the GPU includes a render engine. In one embodiment, the render engine includes at least one render pipeline (RP), a programmable pixel shader, a programmable vector shader, a vector array processor, a curvature engine, and/or a memory cache. The render engine is operable to interact with a memory controller interface, a command CPU, a host bus (e.g., peripheral component interconnect (PCI), PCI Express (PCIe), accelerated graphics port (AGP)), and/or an adaptive full frame anti-aliasing. The memory controller interface is operable to interact with a display memory (e.g., double data rate (DDR) memory), a pixel cache, the command CPU, the host bus, and a display engine. The command CPU is operable to exchange data with the display engine.

FIG. 107 illustrates one embodiment of a display engine operable to interact with a graphics processing unit (GPU) according to the present invention. In a preferred embodiment, the display engine operable to interact with the GPU is included on a video card. The video card is operable to interface with a computer. In a preferred embodiment, the video card is operable to be inserted into a connector (e.g., PCIe connector, PCI connector, accelerated graphics port (AGP) connector, etc.) located within a computer. The computer includes a command central processing unit (CPU). The command CPU is dedicated to communication between the video card and the computer core. The command CPU is preferably operable to input instructions from an application programming interface (API). The command CPU is further operable to distribute appropriate commands to components in the video card. The video card further includes a memory controller interface. The memory controller interface is preferably a bus including hardware operable to manage which data is allowed on the bus and where the data is routed.

In one embodiment, the video card includes a plurality of video cards linked together to allow scaling of graphics processing. In one embodiment, the plurality of video cards is linked with a PCIe connector. Other connectors are compatible with the plurality of video cards. In one embodiment, each of the plurality of video cards has the same technical specifications. In one embodiment, the API includes methods for scaling the graphics processing, and the command CPU is operable to distribute the graphics processing across the plurality of video cards. The command CPU is operable to scale up the graphics processing as well as scale down the graphics processing based on processing demands and/or power demands of the system.

The display engine is operable to take rendered data from the GPU and convert the rendered data to a format operable to be displayed on at least one viewing device. The display engine includes a raster scaler, at least one video display controller (e.g., XYZ video display controller, RGB video display controller, $IC_TC_P$ video display controller), a color channel-to-XYZ converter, a linear converter, a scaler and/or limiter, a multi-column LUT with at least three columns (e.g., three-dimensional (3D) LUT (e.g., $129^3$ LUT)), an XYZ-to-Yxy converter, an XYZ-to-Yu'v' converter, a non-linear function and/or tone curve applicator (e.g., ½ DRR), a sampling selector, a video bus, and/or at least one output formatter and/or encoder (e.g., ST 2082, ST 2110, DisplayPort, HDMI). In one embodiment, the color channel-to-XYZ converter includes an RGB-to-XYZ converter. Additionally or alternatively, the color channel-to-XYZ converter includes a Yu'v'-to-XYZ converter, an $IC_TC_P$-to-XYZ converter and/or an ACES-to-XYZ converter. The video bus is operable to receive input from a graphics display controller and/or at least one input device (e.g., a cursor, a mouse, a joystick, a keyboard, a videogame controller, etc.).

The video card is operable to connect through any number of lanes provided by hardware on the computer. The video card is operable to communicate through a communication interface including, but not limited to, a PCIe Physical Layer (PHY) interface. In one embodiment, the communication interface is an API supported by the computer (e.g., OpenGL, Direct3D, OpenCL, Vulkan). Image data in the form of vector data or bitmap data is output from the communication interface into the command CPU. The communication interface is operable to notify the command CPU when image data is available. The command CPU opens the bus bidirectional gate and instructs the memory controller interface to transmit the image data to a double data rate (DDR) memory. The memory controller interface is operable to open a path from the DDR memory to allow the image data to pass to the GPU for rendering. After rendering, the image data is channeled back to the DDR for storage pending output processing by the display engine.

After the image data is rendered and stored in the DDR memory, the command CPU instructs the memory controller interface to allow rendered image data to load into the raster scaler. The command CPU loads the raster scaler with framing information. The framing information includes, but is not limited to, a start of file (SOF) identifier, an end of file (EOF) identifier, a pixel count, a pixel order, multi-primary data (e.g., RGBCMY data), and/or a frame rate. In one embodiment, the framing information includes HDMI and/or DisplayPort (e.g., CTA 861 format) information. In one embodiment, Extended Display Identification Data (EDID) is operable to override specifications in the API. The raster scaler provides output as image data formatted as a raster in the same format as the file which being read (e.g., RGB, XYZ, Yxy, Yu'v'). In one embodiment, the output of the raster scaler is RGB data, XYZ data, or Yxy data. Alternatively, the output of the raster scaler is Yu'v' data, $IC_TC_P$ data, or ACES data.

In one embodiment, the output of the raster scaler is sent to a graphics display controller. In one embodiment, the graphics display controller is operable to provide display information for a graphical user interface (GUI). In one embodiment, the RGB video controller and the XYZ video controller block image data from entering the video bus. Raster data includes, but is not limited to, synchronization data, an SOF, an EOF, a frame rate, a pixel order, multi-primary data (e.g., RGBCMY data), and/or a pixel count. In one embodiment, the raster data is limited to an RGB output that is operable to be transmitted to the at least one output formatter and/or encoder.

For common video display, a separate path is included. The separate path is operable to provide outputs including, but not limited to, SMPTE SDI, Ethernet, DisplayPort, and/or HDMI to the at least one output formatter and/or encoder. The at least one video display controller (e.g., RGB video display controller) is operable to limit and/or optimize video data for streaming and/or compression. In one embodiment, the RGB video display controller and the XYZ video display controller block image data from entering the video bus.

In a preferred embodiment, image data is provided by the raster scaler in the format provided by the file being played (e.g., RGB, multi-primary (e.g., RGBCMY), XYZ, Yxy, Yu'v'). In one embodiment, the raster scaler presets the XYZ video display controller as the format provided and contained within the raster size to be displayed. In one embodiment, non-linear information (e.g., OOTF) sent from the API through the command CPU is sent to the linear converter. The linear converter is operable to use the non-linear information. For example, if the image data was authored using an OETF, then an inverse of the OETF is operable to be used by the linear converter, or, if the image information already has an EOTF applied, the inverse of the EOTF is operable to be used by the linear converter. In one embodiment, the linear converter develops an EOTF map to linearize input data (e.g., when EOTF data is available). In one embodiment, the linear converter uses an EOTF when already available. After linear data is loaded and a summation process is developed, the XYZ video display controller passes the image data in its native format (e.g., RGB, multi-primary data (e.g., RGBCMY), XYZ, Yxy, Yu'v'), but without a non-linearity applied to the luminance (e.g., Y) component. The color channel-to-XYZ converter is operable to accept a native format (e.g., RGB, multi-primary data (e.g., RGBCMY), XYZ, Yxy, Yu'v') and convert to an XYZ format. In one embodiment, the XYZ format includes at least one chromatic adaptation (e.g., D60 to D65). For RGB, the XYZ video display controller uses data supplied from the command CPU, which obtains color gamut and white point specifications from the API to convert to an XYZ output. For a multi-primary system, a corresponding matrix or a look-up table (LUT) is used to convert from the multi-primary system to XYZ. In one embodiment, the multi-primary system is RGBCMY (e.g., 6P-B, 6P-C, S6 Pa, S6Pb). For a Yxy system, the color channel-to-XYZ converter formats the Yxy data back to XYZ data. For a Yu'v' system, the color channel-to-XYZ converter formats the Yu'v' data back to XYZ data. In another embodiment, the color channel-to-XYZ converter is bypassed. For example, the color channel-to-XYZ converter is bypassed if there is a requirement to stay within a multi-primary system. Additionally, the color channel-to-XYZ converter is bypassed for XYZ data.

In one embodiment, the input to the scaler and/or limiter is XYZ data or multi-primary data. In one embodiment, the multi-primary data includes, but is not limited to, RGBCMY (e.g., 6P-B, 6P-C, S6 Pa, S6Pb), RGBC, $RG_1G_2B$, RGBCW, RGBCY, $RG_1G_2BW$, $RGBW_RW_GW_B$, or $R_1R_2G_1G_2B_1B_2$. Other multi-primary data formats are compatible with the present invention. The scaler and/or limiter is operable to map out of gamut values (e.g., negative values) to in gamut values (e.g., out of gamut values developed in the process to convert to XYZ). In one embodiment, the scaler and/or limiter uses a gamut mapping algorithm to map out of gamut values to in gamut values.

In one embodiment, the input to the scaler and/or limiter is multi-primary data and all channels are optimized to have values between 0 and 1. For example, if the input is RGBCMY data, all six channels are optimized to have values between 0 and 1. In one embodiment, the output of the scaler and/or limiter is operable to be placed into a three-dimensional (3-D) multi-column LUT. In one embodiment, the 3-D multi-column LUT includes one column for each channel. For example, if the output is RGBCMY data, the 3-D multi-column LUT includes six columns (i.e., one for each channel). Within the application feeding the API, each channel is operable to be selected to balance out the white point and/or shade the image toward one particular color channel. In one embodiment, the 3-D multi-column LUT is bypassed if the output of the scaler and/or limiter is XYZ data. The output of the 3-D multi-column LUT is sent to the XYZ-to-Yxy converter, where a simple summation process is used to make the conversion. Alternatively, the output of the 3-D multi-column LUT is sent to the XYZ-to-Yu'v' converter. In one embodiment, if the video data is RGBCMY, the XYZ-to-Yxy converter or XYZ-to-Yu'v' process is bypassed.

Because the image data is linear, any tone curve is operable to be added to the luminance (e.g., Y). The advantage to the present invention using, e.g., Yxy data or Yu'v' data, is that only the luminance needs a tone curve modification. L*a*b* has a ⅓ gamma applied to all three channels. IPT and $IC_TC_P$ operate with a gamma in all three channels. The tone curve is operable to be added to the luminance (e.g., Y) only, with the colorimetric coordinates (e.g., x and y channels, u' and v' channels) remaining linear. The tone curve is operable to be anything (e.g., a non-linear function), including standard values currently used. In one embodiment, the tone curve is an EOTF (e.g., those described for television and/or digital cinema). Additionally or alternatively, the tone curve includes HDR modifications. In another embodiment, a non-linear transfer function is added to all three channels (e.g., Yxy or Yu'v').

In one embodiment, the output is handled through this process as three to six individual components (e.g., three components for Yxy, Yu'v', or XYZ, six components for RGBCMY, etc.). Alternative number of primaries and components are compatible with the present invention. However, in some serial formats, this level of payload is too large. In one embodiment, the sampling selector sets a sampling structure (e.g., 4:4:4, 4:2:2, 4:2:0, 4:1:1). In one embodiment, the sampling selector is operable to subsample processed image data. The sampling selector is preferably controlled by the command CPU. In one embodiment, the command CPU gets its information from the API and/or the display EDID. In a preferred embodiment, the sampling selector also places each component in the correct serial data position as shown in Table 11 (supra).

The output of the sampling select is fed to the main video bus, which integrates SOF and EOF information into the image data. It then distributes this to the at least one output formatter and/or encoder. In one embodiment, the output is RGBCMY. In one embodiment, the RGBCMY output is configured as 4:4:4:4:4:4 data. The format to the at least one viewing device includes, but is not limited to, SMPTE ST2082 (e.g., 3, 6, and 12G serial data output), SMPTE ST2110 (e.g., to move through ethernet), and/or CTA 861 (e.g., DisplayPort, HDMI). The video card preferably has the appropriate connectors (e.g., DisplayPort, HDMI) for distribution through any external system (e.g., computer) and connection to at least one viewing device (e.g., monitor, television, etc.). The at least one viewing device includes, but is not limited to, a smartphone, a tablet, a laptop screen, a light emitting diode (LED) display, an organic light emitting diode (OLED) display, a miniLED display, a microLED display, a liquid crystal display (LCD), a quantum dot display, a quantum nano emitting diode (QNED) device, a personal gaming device, a virtual reality (VR) device and/or an augmented reality (AR) device, an LED wall, a wearable display, and at least one projector. In one embodiment, the at least one viewing device is a single viewing device.

FIG. 109 illustrates one embodiment of a process flow diagram to convert an image for display. An image from an image source undergoes linear conversion and/or scaling (e.g., 0 to 1 scaling) to produce a processed image. The processed image undergoes RGB to XYZ conversion and XYZ to Yxy conversion. Alternatively, the processed image undergoes XYZ to Yu'v' conversion. At least one non-linear transfer function (NLTF) (e.g., ½ DRR) is applied to the luminance (Y) to create a luma (Y'). In a preferred embodiment, the x and y colorimetric coordinates are scaled and then have the at least one NLTF applied. Alternatively, the u' and v' colorimetric coordinates are scaled and then have the at least one NLTF applied. The colorimetric coordinates (x and y, u' and v') are fully sampled or subsampled. The luma and the colorimetric coordinates (e.g., fully sampled, sub sampled) are formatted with an output formatter (e.g., ST 2082, ST 2110, DisplayPort, HDMI) before signal transport, thereby creating formatted luma and colorimetric coordinates. The formatted luma and colorimetric coordinates are decoded by using an inverse of the at least one function (e.g., inverse ½ DRR), rescaling of the colorimetric coordinates (x and y, u' and v'), and sampling reconstruction, thereby creating decoded image data. The decoded image data undergoes Yxy to XYZ conversion or Yu'v' to XYZ conversion and XYZ to gamut (e.g., RGB, ITU-R BT.709, SMPTE RP431, ITU-R BT.2020, ACES, custom, multi-primary) conversion before a gamma function is applied, thereby creating image data. The image data is operable to be sent to a display (e.g., operable to display the gamut). In one embodiment, the image data undergoes further processing in the display.

The top of the diagram shows the process that typically resides in the camera or image generator. The bottom of the diagram shows the decode process typically located in the display. The image is acquired from a camera or generated from an electronic source. Typically, a gamma has been applied and needs to be removed to provide a linear image. After the linear image is acquired, the linear image is scaled to values between 0 and 1. this allows scaling to a desired brightness on the display. The source is operable to detail information related to the image including, but not limited to, a color gamut of the device and/or a white point used in acquisition. Using adaptation methods (e.g., chromatic adaptation), an accurate XYZ conversion is possible. After the image is coded as XYZ, it is operable to be converted to Yxy. The components are operable to be split into a Y path and an xy path or a Y path and a u'v' path. A non-linearity (e.g., DRR) is applied to the Y component. In one embodiment, the non-linearity (e.g., DRR) is also applied to the scaled xy or u'v' components. The xy or u'v' components are operable to be subsampled, if required, e.g., to fit into the application without loss of luminance information. These are recombined and input to a format process that formats the signal for output to a transport (e.g., SDI, IP packet).

After the signal arrives at the receiver, it is decoded to output the separate Yxy or Yu'v' components. The Y channel preferably has an inverse non-linearity (e.g., inverse DRR) applied to restore the Y channel to linear space. If the xy or u'v' channels had a non-linearity applied, the xy or u'v' channels preferably have the inverse non-linearity (e.g., inverse DRR) applied to restore the image data (i.e., Yxy, Yu'v') to linear space and then re-scaled to their original values. The xy or u'v' channels are brought back to full sub-pixel sampling. These are then converted from Yxy to XYZ or Yu'v' to XYZ. XYZ is operable to converted to the display gamut (e.g., RGB). Because a linear image is used, any gamma is operable to be applied by the display. This advantageously puts the limit of the image not in the signal, but at the maximum performance of the display.

With this method, images are operable to match between displays with different gammas, gamuts, and/or primaries (e.g., multi-primary). Colorimetric information and luminance are presented as linear values. Any white point, gamma, and/or gamut is operable to be defined, e.g., as a scene referred set of values or as a display referred set. Furthermore, dissimilar displays are operable to be connected and set to match if the image parameters fall within the limitations of the display. Advantageously, this allows accurate comparison without conversion.

In any system, the settings of the camera and the capabilities of the display are known. Current methods take an acquired image and confirm it to an assumed display specification. Even with a sophisticated system (e.g., ACES), the final output is conformed to a known display specification. The design intent of a Yxy or Yu'v' system is to avoid these processes by using a method of image encoding that allows the display to maximize performance while maintaining creative intent.

The system is operable to be divided into simpler parts for explanation: (1) camera/acquisition, (2) files and storage, (3) transmission, and (4) display. Most professional cameras have documentation describing the color gamut that is possible, the OETF used by the camera, and/or a white point to which the camera was balanced. In an RGB system, these parameters must be tracked and modified throughout the workflow.

However, in a Yxy or Yu'v' system, in one embodiment, these conversions are enabled by the camera as part of the encode process because image parameters are known at the time of acquisition. Thus, the Yxy or Yu'v' system has the intrinsic colorimetric and luminance information without having to carry along additional image metadata. Alternatively, the conversions are operable to be accomplished outside the camera in a dedicated encoder (e.g., hardware) or image processing (e.g., software) in a post-production application.

FIG. 110 illustrates one embodiment of a camera process flow. An image sensor (e.g., RGB sensor) in a camera is operable to obtain image data. In one embodiment, the image data is processed by the camera (e.g., via a camera manufacturer's proprietary process), thereby creating processed camera data. The image data or the camera data undergoes linear conversion and/or scaling (e.g., 0 to 1 scaling) to produce a processed image. In one embodiment, the processed image undergoes conversion from an acquisition gamut (e.g., RGB) to Yxy or Yu'v'. In one embodiment, a non-linear transfer function (NLTF) (e.g., DRR) is applied to Y (e.g., to create luma) and xy. In another embodiment, an NLTF (e.g., DRR) is applied to Y (e.g., to create luma) and u'v'. The luma and the colorimetric coordinates (e.g., fully sampled, subsampled) are formatted with an output formatter (e.g., ST 2082, ST 2110, DisplayPort, HDMI) to provide output data. In one embodiment, the output data is transmitted to a display and/or a decoder. Although the example shown in FIG. 110 uses Yxy or Yu'v' data, the system is operable to be used with a plurality of formats.

Images are acquired in a specific process designed by a camera manufacturer. Instead of using RAW output format, the process starts with the conversion of the RGB channels to a linear (e.g., 16-bit) data format, wherein the RGB data is normalized to 1. In one embodiment, this linear image is then converted from RGB to XYZ (e.g., via a conversion matrix) and then processed to produce the Yxy or Yu'v' data stream. Y continues as a fully sampled value, but xy or u'v' are operable to be subsampled (e.g., 4:2:2, 4:2:0). A DRR value is applied to Yxy or Yu'v' and scaled x and y or u' and v' values prior to being sent as a serial data stream or is stored in a suitable file container.

The biggest advantage that the Yxy or Yu'v' system provides is the ability to send one signal format to any display and achieve an accurate image. The signal includes all image information, which allows for the display design to be optimized for best performance. Issues (e.g., panel, backlight accuracy) are operable to be adjusted to the conformed image gamut and luminance based on the Yxy or Yu'v' data.

Prior art displays use a specific gamut. Typically, the specific gamut is an RGB gamut (e.g., Rec. 2020, P3, Rec. 709). Comparing different displays using a Yxy or Yu'v' input offers a significant advantage. Images displayed on a BT.709 monitor matches a P3 monitor and a BT.2020 monitor for all colors that fall within a gamut of the BT.709 monitor. Colors outside that gamut are controlled by the individual monitor optimized for that device. Images with gamuts falling within the P3 color space will match on the P3 monitor and the BT.2020 monitor until the image gamut exceeds the capability of the P3 monitor.

The display input process is like an inverted camera process. However, the output of this process is operable to be adapted to any display parameters using the same image data.

FIG. 111 illustrates one embodiment of a display process flow. In one embodiment, a Yxy or Yu'v' signal is input as a digital signal. In one embodiment, the digital signal undergoes equalization. The formatted luma and colorimetric coordinates are decoded by using an inverse of at least one non-linear function (e.g., inverse ½ DRR), thereby creating decoded image data. In one embodiment, the decoded image data undergoes Yxy to XYZ or Yu'v' or XYZ conversion to create XYZ data. The XYZ data is operable to converted to a gamut (e.g., RGB, ITU-R BT.709, SMPTE RP431, ITU-R BT.2020, ACES, custom, multi-primary) using an XYZ to gamut library, thereby creating gamut data. In one embodiment, a gamma library is operable to apply at least one function (e.g., linear, 2.2, 2.35, 2.4, 2.6 gamma functions, HLG, PQ, custom) to the gamut data. In one embodiment, the gamut data (e.g., with or without the at least one function applied) undergoes a calibration process (e.g., using a LUT) before being transmitted to a display panel and/or modulator. Although FIG. 111 illustrates a Yxy or Yu'v' signal, the system is compatible with a plurality of data formats.

Most image file formats are based on storing the RGB data, and typically only accommodate three sets of data. Advantageously, the Yxy or Yu'v' implementation only requires three sets of data, which simplifies substitutions into any file format.

The ability to move Yxy or Yu'v' coded image content in real time through transmission systems commonly used in production, broadcast, and streaming applications is essential. the requirements call for a simple system using minimal changes to current infrastructure. The Yxy or Yu'v' encoding of image data allows for a simple substitution with a modification to any payload data that is used to identify the type of encode.

The design of an RGB system uses information obtained from the camera and builds a replicating electrical representation formatted within signal. This means that each signal fed to a process or display must be formatted or reformatted to be viewed correctly. Yxy or Yu'v' redefine this and advantageously move the formatting into the acquiring device and the display, leaving a consistent signal available for differing devices. Connection in the system is simplified as connections and display setup are agnostic to the signal format.

System 4 Substitutions

For SMPTE and CTA serial data streams as well as SMPTE ethernet streams, the substitution of Yxy or Yu'v' into each format preferably follows that shown in Table 12.

TABLE 12

| New Values | RGB | $YC_RC_B$ | XYZ | $IC_TC_P$ |
|---|---|---|---|---|
| x or u' | R | $C_B$ | X | $C_T$ |
| Y | G | Y | Y | I |
| y or v' | B | $C_R$ | Z | $C_P$ |

In a preferred embodiment, payload ID identifies Yxy or Yu'v' at Byte 4 as shown in FIG. 113. FIG. 114A illustrates one embodiment of payload ID per SMPTE ST352:2013 and ST292:2018. FIG. 114B illustrates one embodiment of payload ID per SMPTE ST352:2013 and ST372:2017. FIG. 114C illustrates one embodiment of payload ID per SMPTE ST352:2013 and ST425:2017.

FIG. 115A illustrates one embodiment of a System 4 Yxy 10-bit 4:2:2 encode as applied to SMPTE ST292 (e.g., SMPTE ST292-1:2018).

FIG. 115B illustrates one embodiment of a System 4 Yu'v' 10-bit 4:2:2 encode as applied to SMPTE ST292 (e.g., SMPTE ST292-1:2018).

FIGS. 116A-116B illustrate one embodiment of a System 4 Yxy 10-bit 4:4:4 $YC_BC_R$ encode as applied to SMPTE ST372 (e.g., SMPTE ST372:2017). In one embodiment, the encode utilizes a first link (e.g., Link A) and a second link (e.g., Link B). FIG. 116A illustrates one embodiment of a first link for a System 4 Yxy 10-bit 4:4:4 $YC_BC_R$ encode as applied to SMPTE ST372. FIG. 116B illustrates one embodiment of a second link for a System 4 Yxy 10-bit 4:4:4 $YC_BC_R$ encode as applied to SMPTE ST372.

FIGS. 116C-116D illustrate one embodiment of a System 4 Yu'v' 10-bit 4:4:4 $YC_BC_R$ encode as applied to SMPTE ST372 (e.g., SMPTE ST372:2017). In one embodiment, the encode utilizes a first link (e.g., Link A) and a second link (e.g., Link B). FIG. 116C illustrates one embodiment of a first link for a System 4 Yu'v' 10-bit 4:4:4 $YC_BC_R$ encode as applied to SMPTE ST372. FIG. 116D illustrates one embodiment of a second link for a System 4 Yu'v' 10-bit 4:4:4 $YC_BC_R$ encode as applied to SMPTE ST372.

FIGS. 117A-117B illustrate one embodiment of a System 4 10-bit 4:4:4 Yxy RGB encode as applied to SMPTE ST372 (e.g., SMPTE ST372:2017). In one embodiment, the encode utilizes a first link (e.g., Link A) and a second link (e.g., Link B). FIG. 117A illustrates one embodiment of a first link for a System 4 Yxy 10-bit 4:4:4 RGB encode as applied to SMPTE ST372. FIG. 117B illustrates one embodiment of a second link for a System 4 Yxy 10-bit 4:4:4 RGB encode as applied to SMPTE ST372.

FIGS. 117C-117D illustrate one embodiment of a System 4 Yu'v' 10-bit 4:4:4 RGB encode as applied to SMPTE ST372 (e.g., SMPTE ST372:2017). In one embodiment, the encode utilizes a first link (e.g., Link A) and a second link (e.g., Link B). FIG. 117C illustrates one embodiment of a first link for a System 4 Yu'v' 10-bit 4:4:4 RGB encode as applied to SMPTE ST372. FIG. 117D illustrates one embodiment of a second link for a System 4 Yu'v' 10-bit 4:4:4 RGB encode as applied to SMPTE ST372.

FIGS. 118A-118B illustrate one embodiment of a System 4 12-bit 4:4:4 Yxy $YC_BC_R$ encode as applied to SMPTE ST372 (e.g., SMPTE ST372:2017). In one embodiment, the encode utilizes a first link (e.g., Link A) and a second link (e.g., Link B). FIG. 118A illustrates one embodiment of a first link for a System 4 Yxy 12-bit 4:4:4 $YC_BC_R$ encode as applied to SMPTE ST372. FIG. 118B illustrates one embodiment of a second link for a System 4 Yxy 12-bit 4:4:4 $YC_BC_R$ encode as applied to SMPTE ST372.

FIGS. 118C-118D illustrate one embodiment of a System 4 Yu'v' 12-bit 4:4:4 $YC_BC_R$ encode as applied to SMPTE ST372 (e.g., SMPTE ST372:2017). In one embodiment, the encode utilizes a first link (e.g., Link A) and a second link (e.g., Link B). FIG. 118C illustrates one embodiment of a first link for a System 4 Yu'v' 12-bit 4:4:4 $YC_BC_R$ encode as applied to SMPTE ST372. FIG. 118D illustrates one embodiment of a second link for a System 4 Yu'v' 12-bit 4:4:4 $YC_BC_R$ encode as applied to SMPTE ST372.

FIGS. 119A-119B illustrate one embodiment of a System 4 12-bit 4:4:4 Yxy RGB encode as applied to SMPTE ST372 (e.g., SMPTE ST372:2017). In one embodiment, the encode utilizes a first link (e.g., Link A) and a second link (e.g., Link B). FIG. 119A illustrates one embodiment of a first link for a System 4 Yxy 12-bit 4:4:4 RGB encode as applied to SMPTE ST372. FIG. 119B illustrates one embodiment of a second link for a System 4 Yxy 12-bit 4:4:4 RGB encode as applied to SMPTE ST372.

FIGS. 119C-119D illustrate one embodiment of a System 4 Yu'v' 12-bit 4:4:4 RGB encode as applied to SMPTE ST372 (e.g., SMPTE ST372:2017). In one embodiment, the encode utilizes a first link (e.g., Link A) and a second link (e.g., Link B). FIG. 119C illustrates one embodiment of a first link for a System 4 Yu'v' 12-bit 4:4:4 RGB encode as applied to SMPTE ST372. FIG. 119D illustrates one embodiment of a second link for a System 4 Yu'v' 12-bit 4:4:4 RGB encode as applied to SMPTE ST372.

FIGS. 120A-120B illustrate one embodiment of a System 4 10-bit 4:2:2 Yxy Level A encode as applied to SMPTE ST425 (e.g., SMPTE ST425-1:2017) ("Mapping Structure 1"). FIG. 120A illustrates one embodiment of a first data stream for a System 4 Yxy 10-bit 4:2:2 Level A encode as applied to SMPTE ST425. FIG. 120B illustrates one embodiment of a second data stream for a System 4 Yxy 10-bit 4:2:2 Level A encode as applied to SMPTE ST425.

FIGS. 120C-120D illustrate one embodiment of a System 4 Yu'v' 10-bit 4:2:2 Level A encode as applied to SMPTE ST425 (e.g., SMPTE ST425-1:2017) ("Mapping Structure 1"). FIG. 120C illustrates one embodiment of a first data stream for a System 4 Yu'v' 10-bit 4:2:2 Level A encode as applied to SMPTE ST425. FIG. 120D illustrates one embodiment of a second data stream for a System 4 Yu'v' 10-bit 4:2:2 Level A encode as applied to SMPTE ST425.

FIGS. 121A-121B illustrate one embodiment of a System 4 10-bit 4:4:4 Yxy Level A encode as applied to SMPTE ST425 (e.g., SMPTE ST425-1:2017) ("Mapping Structure 2"). FIG. 121A illustrates one embodiment of a first data stream for a System 4 Yxy 10-bit 4:4:4 Level A encode as applied to SMPTE ST425. FIG. 121B illustrates one embodiment of a second data stream for a System 4 Yxy 10-bit 4:4:4 Level A encode as applied to SMPTE ST425.

FIGS. 121C-121D illustrate one embodiment of a System 4 Yu'v' 10-bit 4:4:4 Level A encode as applied to SMPTE ST425 (e.g., SMPTE ST425-1:2017) ("Mapping Structure 2"). FIG. 121C illustrates one embodiment of a first data stream for a System 4 Yu'v' 10-bit 4:4:4 Level A encode as applied to SMPTE ST425. FIG. 121D illustrates one embodiment of a second data stream for a System 4 Yu'v' 10-bit 4:4:4 Level A encode as applied to SMPTE ST425.

FIGS. 122A-122B illustrate one embodiment of a System 4 Yxy 12-bit 4:4:4 Level A encode as applied to SMPTE ST425 (e.g., SMPTE ST425-1:2017) ("Mapping Structure 3"). FIG. 122A illustrates one embodiment of a first data stream for a System 4 Yxy 12-bit 4:4:4 Level A encode as applied to SMPTE ST425. FIG. 122B illustrates one embodiment of a second data stream for a System 4 Yxy 12-bit 4:4:4 Level A encode as applied to SMPTE ST425.

FIGS. 122C-122D illustrate one embodiment of a System 4 Yu'v' 12-bit 4:4:4 Level A encode as applied to SMPTE ST425 (e.g., SMPTE ST425-1:2017) ("Mapping Structure 3"). FIG. 122C illustrates one embodiment of a first data stream for a System 4 Yu'v' 12-bit 4:4:4 Level A encode as applied to SMPTE ST425. FIG. 122D illustrates one embodiment of a second data stream for a System 4 Yu'v' 12-bit 4:4:4 Level A encode as applied to SMPTE ST425.

FIGS. 123A-123B illustrate one embodiment of a System 4 12-bit 4:2:2 Yxy Level A encode as applied to SMPTE ST425 (e.g., SMPTE ST425-1:2017) ("Mapping Structure 4"). FIG. 123A illustrates one embodiment of a first data stream for a System 4 Yxy 12-bit 4:2:2 Level A encode as applied to SMPTE ST425. FIG. 123B illustrates one embodiment of a second data stream for a System 4 Yxy 12-bit 4:2:2 Level A encode as applied to SMPTE ST425.

FIGS. 123C-123D illustrate one embodiment of a System 4 Yu'v' 12-bit 4:2:2 Level A encode as applied to SMPTE ST425 (e.g., SMPTE ST425-1:2017) ("Mapping Structure 4"). FIG. 123C illustrates one embodiment of a first data stream for a System 4 Yu'v' 12-bit 4:2:2 Level A encode as applied to SMPTE ST425. FIG. 123D illustrates one embodiment of a second data stream for a System 4 Yu'v' 12-bit 4:2:2 Level A encode as applied to SMPTE ST425.

FIGS. 124A-124B illustrate one embodiment of a System 4 Yxy Level B Multiplex Dual Stream (DS) encode as applied to SMPTE ST425 (e.g., SMPTE ST425-1:2017). FIG. 124A illustrates one embodiment of a first data stream for a System 4 Yxy Level B Multiplex Dual Stream (DS) encode as applied to SMPTE ST425. FIG. 124B illustrates one embodiment of a second data stream for a System 4 Yxy Level B Multiplex Dual Stream (DS) encode as applied to SMPTE ST425.

FIGS. 124C-124D illustrate one embodiment of a System 4 Yu'v' Level B Multiplex Dual Stream (DS) encode as applied to SMPTE ST425 (e.g., SMPTE ST425-1:2017). FIG. 124C illustrates one embodiment of a first data stream for a System 4 Yu'v' Level B Multiplex Dual Stream (DS) encode as applied to SMPTE ST425. FIG. 124D illustrates one embodiment of a second data stream for a System 4 Yu'v' Level B Multiplex Dual Stream (DS) encode as applied to SMPTE ST425.

FIGS. 125A-125B illustrate one embodiment of a System 4 Yxy 10-bit Level B Multiplex Dual Link (DL) encode as applied to SMPTE ST425 (e.g., SMPTE ST425-1:2017). FIG. 125A illustrates one embodiment of a first data link for a System 4 Yxy 10-bit Level B Multiplex Dual Link (DL) encode as applied to SMPTE ST425. FIG. 125B illustrates one embodiment of a second data link for a System 4 Yxy 10-bit Level B Multiplex Dual Link (DL) encode as applied to SMPTE ST425.

FIGS. 125C-125D illustrate one embodiment of a System 4 Yu'v' 10-bit Level B Multiplex Dual Link (DL) encode as applied to SMPTE ST425 (e.g., SMPTE ST425-1:2017). FIG. 125C illustrates one embodiment of a first data link for a System 4 Yu'v' 10-bit Level B Multiplex Dual Link (DL) encode as applied to SMPTE ST425. FIG. 125D illustrates one embodiment of a second data link for a System 4 Yu'v' 10-bit Level B Multiplex Dual Link (DL) encode as applied to SMPTE ST425.

FIGS. 126A-126B illustrate one embodiment of a System 4 Yxy 12-bit Level B Multiplex Dual Link (DL) encode as applied to SMPTE ST425 (e.g., SMPTE ST425-1:2017). FIG. 126A illustrates one embodiment of a first data link for a System 4 Yxy 12-bit Level B Multiplex Dual Link (DL) encode as applied to SMPTE ST425. FIG. 126B illustrates one embodiment of a second data link for a System 4 Yxy 12-bit Level B Multiplex Dual Link (DL) encode as applied to SMPTE ST425.

FIGS. 126C-126D illustrate one embodiment of a System 4 Yu'v' 12-bit Level B Multiplex Dual Link (DL) encode as applied to SMPTE ST425 (e.g., SMPTE ST425-1:2017). FIG. 126C illustrates one embodiment of a first data link for a System 4 Yu'v' 12-bit Level B Multiplex Dual Link (DL) encode as applied to SMPTE ST425. FIG. 126D illustrates one embodiment of a second data link for a System 4 Yu'v' 12-bit Level B Multiplex Dual Link (DL) encode as applied to SMPTE ST425.

In one embodiment, the formatting is compatible with SMPTE ST2022-6 (2012). Advantageously, there is no need to add any identification because the Yxy or Yu'v' identification is included in the mapped payload ID. SMPTE ST2022 does not describe any modifications to mapping, so mapping to Ethernet simply follows the appropriate SDI standard. In one embodiment, map code 0x00 uses Level A direct mapping from SMPTE ST292 or SMPTE ST425. In one embodiment, map code 0x01 uses Level B direct mapping formatted as SMPTE ST372 DL. In one embodiment, map code 0x02 uses Level B direct mapping formatted as SMPTE ST292 DS.

FIG. 127 is a table illustrating modification of SMPTE ST2036-1 (2014) parameters to include System 4 (e.g., Yxy, Yu'v').

Table 13 illustrates construction of 4:4:4 pgroups. Table 14 illustrates construction of 4:2:2 pgroups. Table 15 illustrates construction of 4:2:0 pgroups.

TABLE 13

Construction of 4:4:4 pgroups

| sampling | depth | pgroup size (octets) | pgroup coverage (pixels) | Sample Order |
|---|---|---|---|---|
| YCbCr- 4:4:4 | 8 | 3 | 1 | C'B, Y', C'R |
| CLYCbCr- 4:4:4 | 10 | 15 | 4 | C0'B, Y0', C0'R, C1'B, Y1', C1'R, C2'B, Y2', C2'R, C3'B, Y3', C3'R |
| | 12 | 9 | 2 | C0'B, Y0', C0'R, C1'B, Y1', C1'R |
| | 16, 16f | 6 | 1 | C'B, Y', C'R |
| ICtCp- 4:4:4 | 8 | 3 | 1 | CT, I, CP |
| | 10 | 15 | 4 | C0T, I0, C0P, C1T, I1, C1P, C2T, I2, C2P, C3T, I3, C3P |
| | 12 | 9 | 2 | C0T, I0, C0P, C1T, I1, C1P |
| | 16, 16f | 6 | 1 | CT, I, CP |
| RGB | 8 | 3 | 1 | R, G, B |
| (linear) | 10 | 15 | 4 | R0, G0, B0, R1, G1, B1, R2, G2, B2, R3, G3, B3 |
| | 12 | 9 | 2 | R0, G0, B0, R1, G1, B1 |
| | 16, 16f | 6 | 1 | R, G, B |
| RGB | 8 | 3 | 1 | R', G', B' |
| (non- linear) | 10 | 15 | 4 | R0', G0', B0', R1', G1', B1', R2', G2', B2', R3', G3',B3' |
| | 12 | 9 | 2 | R0', G0', B0', R1', G1', B1' |
| | 16, 16f | 6 | 1 | R', G',B' |

TABLE 13-continued

| Construction of 4:4:4 pgroups | | | | |
|---|---|---|---|---|
| sampling | depth | pgroup size (octets) | pgroup coverage (pixels) | Sample Order |
| XYZ | 12 | 9 | 2 | X0', Y0', Z0', X1', Y1', Z1' |
| | 16, 16f | 6 | 1 | X', Y', Z' |
| Yxy-4:4:4 | 10 | 15 | 4 | x0, Y0', y0, x1, Y1', y1, x2, Y2', y2, x3, Y3', y3 |
| | 12 | 9 | 2 | x0, Y0', y0, x1, Y1', y1 |
| | 16, 16f | 6 | 1 | x, Y', y |
| Yu'v'-4:4:4 | 10 | 15 | 4 | u'0, Y0', v'0, u'1, Y1', v'1, u'2, Y2',v'2, u'3, Y3', v'3 |
| | 12 | 9 | 2 | u'0, Y0', v'0, u'1, Y1', v'1 |
| | 16, 16f | 6 | 1 | u', Y', v' |

TABLE 14

| Construction of 4:2:2 pgroups | | | | |
|---|---|---|---|---|
| sampling | depth | pgroup size (octets) | pgroup coverage (pixels) | Sample Order |
| YCbCr- 4:2:2 | 8 | 4 | 2 | C'B, Y0', C'R, Y1' |
| CLYCbCr- 4:2:2 | 10 | 5 | 2 | C'B, Y0', C'R, Y1' |
| | 12 | 6 | 2 | C'B, Y0', C'R, Y1' |
| | 16, 16f | 8 | 2 | C'B, Y0', C'R, Y1' |
| ICtCp- 4:2:2 | 8 | 4 | 2 | C'T, I0', C'P, I1' |
| | 10 | 5 | 2 | C'T, I0', C'P, I1' |
| | 12 | 6 | 2 | C'T, I0', C'P, I1' |
| | 16, 16f | 8 | 2 | C'T, I0', C'P, I1' |
| Yxy-4:2:2 | 10 | 5 | 2 | x, Y0', y, Y1' |
| | 12 | 6 | 2 | x, Y0', y, Y1' |
| | 16, 16f | 8 | 2 | x, Y0', y, Y1' |
| Yu'v'-4:2:2 | 10 | 5 | 2 | u', Y0', v', Y1' |
| | 12 | 6 | 2 | u', Y0', v', Y1' |
| | 16, 16f | 8 | 2 | u', Y0', v', Y1' |

TABLE 15

| Construction of 4:2:0 pgroups | | | | |
|---|---|---|---|---|
| sampling | depth | pgroup size (octets) | pgroup coverage (pixels) | Sample Order |
| YCbCr- 4:2:0 | 8 | 6 | 4 | Y'00-Y'01-Y'10-Y'11-$C_B$'00-$C_R$'00 |
| CLYCbCr- 4:2:0 | 10 | 15 | 8 | Y'00-Y'01-Y'10-Y'11-$C_B$'00-$C_R$'00, Y'02-Y'03-Y'12-Y'13-$C_B$'01-$C_R$'01 |
| | 12 | 9 | 4 | Y'00-Y'01-Y'10-Y'11-$C_B$'00-$C_R$'00 |
| ICtCp- 4:2:0 | 8 | 6 | 4 | I00-I01-I10-I11-$C_T$00-$C_P$00 |
| | 10 | 15 | 8 | I00-I01-I10-I11-$C_T$00-$C_P$00, I02-I03-I12-I13-$C_T$01-$C_P$01 |
| | 12 | 9 | 4 | I00-I01-I10-I11-$C_T$00-$C_P$00 |
| Yxy- 4:2:0 | 10 | 15 | 8 | Y'00-Y'01-Y'10-Y'11-x00-y00, Y'02-Y'03-Y'12-Y'13-x01-y01 |
| | 12 | 9 | 4 | Y'00-Y'01-Y10-Y'11-x00-y00 |
| Yu'v'- 4:2:0 | 10 | 15 | 8 | Y'00-Y'01-Y'10-Y'11-u'00-v'00, Y'02-Y'03-Y'12-Y'13-u'01-v'01 |
| | 12 | 9 | 4 | Y'00-Y'01-Y10-Y'11-u'00-v'00 |

In one embodiment, SDP parameters are defined using SMPTE ST2110-20 (2017). In one embodiment, a Yxy or Yu'v' system uses CIE S 014-3:2011 as a colorimetry standard. Table 16 illustrates one embodiment of SDP colorimetry flag modification.

TABLE 16

| SDP Flag | Colorimetry Standard |
|---|---|
| BT601 | ITU-R BT.601-7 |
| BT709 | ITU-R BT.709-6 |

TABLE 16-continued

| SDP Flag | Colorimetry Standard |
|---|---|
| BT2020 | ITU-R BT.2020-2 |
| BT2100 | ITU-R BT.2100 table 2 |
| ST2065-1 | SMPTE ST2065-1: 2021 ACES |
| ST2065-3 | SMPTE ST2065-3: 2020 ADX |
| UNSPECIFIED | No specification |
| XYZ | ISO 11664-1 1931 Standard Observer |
| Yxy | ISO 11664-3/CIE S 014-3: 2011 |
| Yu'v' | ISO 11664-5/CIE S 014-3: 2011 |

In one example, the SDP parameters for a Yxy system are as follows: m=video 30000 RTP/AVP 112, a=rtpmap:112 raw/90000, a=fmtp:112, sampling=YCbCr-4:2:2, width=1280, height=720, exactframerate=60000/1001, depth=10, TCS (Transfer Characteristic System)=SDR, colorimetry=Yxy, PM=2110GPM, SSN=ST2110-20:2017.

FIG. 128 is a table illustrating modification of CTA 861 Table 6—Colorimetry Transfer Characteristics to include System 4 (e.g., Yxy, Yu'v'). In one embodiment, CTA 861 standards conform to CTA 861-H (2021), which is incorporated herein by reference in its entirety.

FIG. 129A is a table for Yxy 8-bit 4:2:2 encoding with 4 lanes. FIG. 129B is a table for Yxy 8-bit 4:2:2 encoding with 2 lanes. FIG. 129C is a table for Yxy 8-bit 4:2:2 encoding with 1 lane.

FIG. 129D is a table for Yu'v' 8-bit 4:2:2 encoding with 4 lanes. FIG. 129E is a table for Yu'v' 8-bit 4:2:2 encoding with 2 lanes. FIG. 129F is a table for Yu'v' 8-bit 4:2:2 encoding with 1 lane.

FIG. 130A is a table for Yxy 10-bit 4:2:2 encoding with 4 lanes. FIG. 130B is a table for Yxy 10-bit 4:2:2 encoding with 2 lanes. FIG. 130C is a table for Yxy 10-bit 4:2:2 encoding with 1 lane.

FIG. 130D is a table for Yu'v' 10-bit 4:2:2 encoding with 4 lanes. FIG. 130E is a table for Yu'v' 10-bit 4:2:2 encoding with 2 lanes. FIG. 130F is a table for Yu'v' 10-bit 4:2:2 encoding with 1 lane.

FIG. 131A is a table for Yxy 12-bit 4:2:2 encoding with 4 lanes. FIG. 131B is a table for Yxy 12-bit 4:2:2 encoding with 2 lanes. FIG. 131C is a table for Yxy 12-bit 4:2:2 encoding with 1 lane.

FIG. 131D is a table for Yu'v' 12-bit 4:2:2 encoding with 4 lanes. FIG. 131E is a table for Yu'v' 12-bit 4:2:2 encoding with 2 lanes. FIG. 131F is a table for Yu'v' 12-bit 4:2:2 encoding with 1 lane.

FIG. 132A is a table for Yxy 16-bit 4:2:2 encoding with 4 lanes. FIG. 132B is a table for Yxy 16-bit 4:2:2 encoding with 2 lanes. FIG. 132C is a table for Yxy 16-bit 4:2:2 encoding with 1 lane.

FIG. 132D is a table for Yu'v' 16-bit 4:2:2 encoding with 4 lanes. FIG. 132E is a table for Yu'v' 16-bit 4:2:2 encoding with 2 lanes. FIG. 132F is a table for Yu'v' 16-bit 4:2:2 encoding with 1 lane.

FIG. 133A is a table for Yxy 10-bit 4:4:4 encoding with 4 lanes. FIG. 133B is a table for Yxy 10-bit 4:4:4 encoding with 2 lanes. FIG. 133C is a table for Yxy 10-bit 4:4:4 encoding with 1 lane.

FIG. 133D is a table for Yu'v' 10-bit 4:4:4 encoding with 4 lanes. FIG. 133E is a table for Yu'v' 10-bit 4:4:4 encoding with 2 lanes. FIG. 133F is a table for Yu'v' 10-bit 4:4:4 encoding with 1 lane.

FIG. 134A is a table for Yxy 12-bit 4:4:4 encoding with 4 lanes. FIG. 134B is a table for Yxy 12-bit 4:4:4 encoding with 2 lanes. FIG. 134C is a table for Yxy 12-bit 4:4:4 encoding with 1 lane.

FIG. 134D is a table for Yu'v' 12-bit 4:4:4 encoding with 4 lanes. FIG. 134E is a table for Yu'v' 12-bit 4:4:4 encoding with 2 lanes. FIG. 134F is a table for Yu'v' 12-bit 4:4:4 encoding with 1 lane.

FIG. 135A is a table for Yxy 16-bit 4:4:4 encoding with 4 lanes. FIG. 135B is a table for Yxy 16-bit 4:4:4 encoding with 2 lanes. FIG. 135C is a table for Yxy 16-bit 4:4:4 encoding with 1 lane.

FIG. 135D is a table for Yu'v' 16-bit 4:4:4 encoding with 4 lanes. FIG. 135E is a table for Yu'v' 16-bit 4:4:4 encoding with 2 lanes. FIG. 135F is a table for Yu'v' 16-bit 4:4:4 encoding with 1 lane.

The identification of a Yxy or Yu'v' formatted connection is preferably provided in the auxiliary video information (AVI) (e.g., for CTA 861). In one embodiment, the AVI is provided according to InfoFrame version 4 as shown in FIG. 136. Additional information is available in ANSI/CTA-861-H-2021, which is incorporated herein by reference in its entirety. See, e.g., ANSI/CTA-861-H-2021 Section 6.2. In one embodiment, location of the identification is in data byte 14 (e.g., ACE3, ACE2, ACE1, ACE0. In one embodiment, ACE3=0, ACE2=0, ACE1=1, and ACE0=1 identifies a Yxy 4:4:4 formatted image without a DRR applied; ACE3=0, ACE2=1, ACE1=0, and ACE0=0 identifies a Yxy 4:2:2 formatted image without a DRR applied; ACE3=0, ACE2=1, ACE1=0, and ACE0=1 identifies a Yxy 4:2:0 formatted image without a DRR applied; ACE3=0, ACE2=1, ACE1=1, and ACE0=0 identifies a Yxy 4:4:4 formatted image with a DRR applied; ACE3=0, ACE2=1, ACE1=1, and ACE0=1 identifies a Yxy 4:2:2 formatted image with a DRR applied; ACE3=1, ACE2=0, ACE1=0, and ACE0=0 identifies a Yxy 4:2:0 formatted image with a DRR applied; ACE3=1, ACE2=0, ACE1=0, and ACE0=1 identifies a Yu'v' 4:4:4 formatted image without a DRR applied; ACE3=1, ACE2=0, ACE1=1, and ACE0=0 identifies a Yu'v' 4:2:2 formatted image without a DRR applied; ACE3=1, ACE2=0, ACE1=1, and ACE0=1 identifies a Yu'v' 4:2:0 formatted image without a DRR applied; ACE3=1, ACE2=1, ACE1=0, and ACE0=0 identifies a Yu'v' 4:4:4 formatted image with a DRR applied; ACE3=1, ACE2=1, ACE1=0, and ACE0=1 identifies a Yu'v' 4:2:2 formatted image with a DRR applied; and ACE3=1, ACE2=1, ACE1=1, and ACE0=0 identifies a Yu'v' 4:2:0 formatted image with a DRR applied. In another embodiment, ACE3=0, ACE2=0, ACE1=1, and ACE0=1 identifies a Yxy 4:4:4 formatted image; ACE3=0, ACE2=1, ACE1=0, and ACE0=0 identifies a Yxy 4:2:2 formatted image; and ACE3=0, ACE2=1, ACE1=0, and ACE0=1 identifies a Yxy 4:2:0 formatted image. In one embodiment, data byte 2 (C1, C0) reads as C1=1 and C0=1 and data byte 3 (EC2, EC1, EC0) reads as EC2=1, EC1=1, and EC0=1. Table 17 illustrates values for data byte 2. Table 18 illustrates values for data byte 3. Table 19 illustrates values for data byte 14.

TABLE 17

| C1 | C0 | Colorimetry |
|---|---|---|
| 0 | 0 | No Data |
| 0 | 1 | SMPTE 170M [1] |
| 1 | 0 | ITU-R BT.709 [7] |
| 1 | 1 | Extended Colorimetry Information Valid (colorimetry indicated in bits EC0, EC1, and EC2. See Table 13) |

TABLE 18

| EC2 | EC1 | EC0 | Extended Colorimetry |
|---|---|---|---|
| 0 | 0 | 0 | xvYCC601 |
| 0 | 0 | 1 | xvYCC709 |
| 0 | 1 | 0 | sYCC601 |
| 0 | 1 | 1 | opYCC601 |
| 1 | 0 | 0 | opRGB |
| 1 | 0 | 1 | ITU-R BT.2020 Y'CC'BCC'RC |
| 1 | 1 | 0 | ITU-R BT.2020 R'G'B' or Y'C'BC'R |
| 1 | 1 | 1 | Additional Colorimetry Extension Information Valid (colorimetry indicated in bits ACE0, ACE1, ACE2, and ACE3. See Table 25) |

TABLE 19

| ACE3 | ACE3 | ACE1 | ACE0 | Additional Colorimetry Extension |
|---|---|---|---|---|
| 0 | 0 | 0 | 0 | SMPTE ST2113 (P3 D65) R'G'B' |
| 0 | 0 | 0 | 1 | SMPTE ST2113 (P3 DCI) R'G'B' |
| 0 | 0 | 1 | 0 | ITU-R BT.2100 $IC_TC_P$ |
| 0 | 0 | 1 | 1 | Yxy 4:4:4 DRR not applied |
| 0 | 1 | 0 | 0 | Yxy 4:2:2 DRR not applied |
| 0 | 1 | 0 | 1 | Yxy 4:2:0 DRR not applied |
| 0 | 1 | 1 | 0 | Yxy 4:4:4 DRR applied |
| 0 | 1 | 1 | 1 | Yxy 4:2:2 DRR applied |
| 1 | 0 | 0 | 0 | Yxy 4:2:0 DRR applied |
| 1 | 0 | 0 | 1 | Yuv 4:4:4 DRR not applied |
| 1 | 0 | 1 | 0 | Yuv 4:2:2 DRR not applied |
| 1 | 0 | 1 | 1 | Yuv 4:2:0 DRR not applied |
| 1 | 1 | 0 | 0 | Yuv 4:4:4 DRR applied |
| 1 | 1 | 0 | 1 | Yuv 4:2:2 DRR applied |
| 1 | 1 | 1 | 0 | Yuv 4:2:0 DRR applied |
| 0x0F | | | | Reserved |

Shifted Bit Encoding

Shifted bit encoding arranges Yxy or Yu'v' image data so that more bits are operable to be encoded into a serial stream than what is described in the standard. To do this, quantization levels of x and y or u' and v' are operable to be lowered with minimal effect on visual image quality by applying a DRR profile (e.g., a ½ DRR or a ⅓ DRR). The DRR profile is preferably a value between about 0.25 and about 0.9. For example, a 16-bit image is operable to be transported on a 12-bit channel. In one embodiment, Y data values are maximized by moving at least one bit of the Y data values to the xy or u'v' channels. The at least one bit is preferably a Least Significant Bit (LSB). An example is shown in FIG. 137A with a 16-bit Y channel shared with both 12-bit xy channels. For Y, bits $Y_0$ and $Y_1$ are shared with x coordinate data. For $Y_2$ and $Y_3$, these values are shared with y coordinate data. This allows a full 16-bit word to be included into a 12-bit stream (16 into 12). x and y values are constrained to 10 most significant bits (MSBs). This is operable to be a 12-bit word to be included into a 10-bit stream (12 into 10) as shown in FIG. 137B and a 10-bit word to be included into an 8-bit stream (10 into 8) as shown in FIG. 137C. In one embodiment, a non-linearity (e.g., ½ DRR, ⅓ DRR) is applied to x and y. In one embodiment, the non-linearity is a DRR between about 0.25 and about 0.9. In another embodiment, the non-linearity is a DRR between about 0.25 and about 0.7. In one embodiment, the ½ DRR includes a value between about 0.41 and about 0.7. In one embodiment, the ⅓ DRR includes a value between about 0.25 and about 0.499. In one embodiment, the non-linearity is only applied to x and y (e.g., Y, x', y'). In one example, the non-linearity is only applied to x and y for a 16-bit to 12-bit shift. In another embodiment, the non-linearity is applied to Y, x, and y (e.g., Y', x', y'). In one example, the non-linearity is applied to Y, x, and y for a 12-bit to 10-bit shift or a 10-bit to 8-bit shift. In one embodiment, a ½ DRR is applied to standard dynamic range images as 10 bit and/or 12 bit. In another embodiment, a ⅓ DRR is applied for 8 bit and/or high dynamic range images. Although the examples provided above utilize Yxy, the system is also compatible with a plurality of formats (e.g., Yu'v').

An example is shown in FIG. 137D with a 16-bit Y channel shared with both 12-bit u'v' channels. For Y, bits $Y_0$ and $Y_1$ are shared with u' coordinate data. For $Y_2$ and $Y_3$, these values are shared with v' coordinate data. This allows a full 16-bit word to be included into a 12-bit stream (16 into 12). u' and v' values are constrained to 10 most significant bits (MSBs). This is operable to be for a 12-bit word to be included into a 10-bit stream (12 into 10) as shown in FIG. 137B and a 10-bit word to be included into an 8-bit stream (10 into 8) as shown in FIG. 137C. In one embodiment, a non-linearity (e.g., ½ DRR, ⅓ DRR) is applied to x and y. In one embodiment, the non-linearity is a DRR between about 0.25 and about 0.9. In another embodiment, the non-linearity is a DRR between about 0.25 and about 0.7. In one embodiment, the ½ DRR includes a value between about 0.41 and about 0.7. In one embodiment, the ⅓ DRR includes a value between about 0.25 and about 0.499. In one embodiment, the non-linearity is only applied to x and y (e.g., Y, x', y'). In one example, the non-linearity is only applied to x and y for a 16-bit to 12-bit shift. In another embodiment, the non-linearity is applied to Y, x, and y (e.g., Y', x', y'). In one example, the non-linearity is applied to Y, x, and y for a 12-bit to 10-bit shift or a 10-bit to 8-bit shift. In one embodiment, a ½ DRR is applied to standard dynamic range images as 10 bit and/or 12 bit. In another embodiment, a ⅓ DRR is applied for 8 bit and/or high dynamic range images. Although the examples provided above utilize Yxy, the system is also compatible with a plurality of formats (e.g., Yu'v').

$IC_tC_p$ is also a method for encoding a color set, but is based on the CIE LMS model. Because Ct and Cp define a color position, a shifted bit method is also operable to be used with $IC_tC_p$. In one embodiment, a substitution is required as shown in Table 20.

TABLE 20

| New values | RGB | Y $C_r$ $C_b$ | XYZ | Yxy | Yu'v' |
|---|---|---|---|---|---|
| $C_T$ | R | $C_B$ | X | x | u' |
| I | G | Y | Y | Y | Y |
| $C_P$ | B | $C_R$ | Z | y | v' |

In one embodiment, I data values are maximized by moving at least one bit of the I data values to the Ct and Cp channels. The at least one bit is preferably a Least Significant Bit (LSB). An example is shown in FIG. 138A with a 16-bit I channel is shared with both 12-bit Ct and Cp channels. For I, bits $I_0$ and $I_1$ are shared with Ct data. For $I_2$ and $I_3$, these values are shared with Cp data. This allows a full 16-bit word to be included into a 12-bit stream (16 into 12). Ct and Cp values are constrained to 10 most significant bits (MSBs). This is operable to be a 12-bit word to be included into a 10-bit stream (12 into 10) as shown in FIG. 138B and a 10-bit word to be included into an 8-bit stream (10 into 8) as shown in FIG. 138C. In one embodiment, a non-linearity (e.g., ½ DRR, ⅓ DRR) is applied to Ct and Cp. In one embodiment, the non-linearity is a DRR between about 0.25 and about 0.55. In one embodiment, the non-linearity is only applied to Ct and Cp (e.g., I, Ct', Cp'). In one example, the non-linearity is only applied to Ct and Cp for a 16-bit to 12-bit shift. In another embodiment, the non-linearity is applied to I, Ct, and Cp (e.g., I', Ct', Cp'). In one example, the non-linearity is applied to I, Ct, and Cp for a 12-bit to 10-bit shift or a 10-bit to 8-bit shift. In one embodiment, a ½ DRR is applied to standard dynamic range images as 10 bit and/or 12 bit. In another embodiment, a ⅓ DRR is applied for 8 bit and/or high dynamic range images.

In one embodiment, the system further includes gamut scaling. Colorimetric coordinates x and y are operable to describe values that are not actual colors, allowing for the colorimetric coordinates to be scaled to make encoding more efficient. The maximum x value (CIE 1931) that describes a color is 0.73469. The maximum y value (CIE 1931) is 0.8341. In one embodiment, the scaling includes dividing x by a first divisor and y by a second divisor. In one embodiment, the first divisor is about 0.74 and the second divisor is about 0.83. In one embodiment, the first divisor is between about 0.66 and about 0.82. In one embodiment, the second divisor is between about 0.74 and about 0.92. In one embodiment, x and y are substituted with $x_s$ and $y_s$, which are calculated as shown below:

$$x_s = \frac{x}{0.74}$$

$$y_s = \frac{y}{0.84}$$

The tables and figures below use x and y, but the present invention is compatible with $x_s$ and $y_s$. Advantageously, $x_s$ and $y_s$ provide increased efficiency.

As previously described, in one embodiment, the system further includes gamut scaling. Colorimetric coordinates u' and v' are operable to describe values that are not actual colors, allowing for the colorimetric coordinates to be scaled to make encoding more efficient. The maximum u' value (CIE 1976) that describes a color is 0.63. The maximum v' value (CIE 1976) that describes a color is 0.59. In one embodiment, the scaling includes dividing x by a first divisor and y by a second divisor. In one embodiment, the first divisor is about 0.63 and the second divisor is about 0.59. In one embodiment, the first divisor is between about 0.55 and about 0.70. In one embodiment, the second divisor is between about 0.53 and about 0.65. In one embodiment, u' and v' are substituted with $u_s$ and $v_s$, which are calculated as shown below:

$$u_s = \frac{u'}{0.63}$$

$$v_s = \frac{v'}{0.59}$$

The tables and figures below use u' and v', but the present invention is compatible with $u_s$ and $v_s$. Advantageously, $u_s$ and $v_s$ provide increased efficiency.

FIG. 139A illustrates one embodiment of a 12-bit into 10-bit shift for a Yxy 4:2:2 encode as applied to SMPTE ST292 (e.g., SMPTE ST292-1:2018). FIG. 139B illustrates one embodiment of a 12-bit into 10-bit shift for a Yu'v' 4:2:2 encode as applied to SMPTE ST292 (e.g., SMPTE ST292-1:2018). Modifications to payload ID metadata are shown in FIGS. 113 and 114A-114C.

FIGS. 140A-140B illustrate one embodiment of a 12-bit into 10-bit shift for a Yxy 4:4:4 $YC_BC_R$ encode as applied to SMPTE ST372 (e.g., SMPTE ST372:2017). In one embodiment, the encode utilizes a first link (e.g., Link A) and a second link (e.g., Link B). FIG. 140A illustrates one embodiment of a first link for a 12-bit into 10-bit shift for a Yxy 4:4:4 $YC_BC_R$ encode as applied to SMPTE ST372. FIG. 140B illustrates one embodiment of a second link for a 12-bit into 10-bit shift for a Yxy 4:4:4 $YC_BC_R$ encode as applied to SMPTE ST372.

FIGS. 140C-140D illustrate one embodiment of a 12-bit into 10-bit shift for a Yu'v' 4:4:4 $YC_BC_R$ encode as applied to SMPTE ST372 (e.g., SMPTE ST372:2017). In one embodiment, the encode utilizes a first link (e.g., Link A) and a second link (e.g., Link B). FIG. 140C illustrates one embodiment of a first link for a 12-bit into 10-bit shift for a Yu'v' 4:4:4 $YC_BC_R$ encode as applied to SMPTE ST372. FIG. 140D illustrates one embodiment of a second link for a 12-bit into 10-bit shift for a Yu'v' 4:4:4 $YC_BC_R$ encode as applied to SMPTE ST372.

FIGS. 141A-141B illustrate one embodiment of a 12-bit into 10-bit shift for a Yxy 4:4:4 RGB encode as applied to SMPTE ST372 (e.g., SMPTE ST372:2017). In one embodiment, the encode utilizes a first link (e.g., Link A) and a second link (e.g., Link B). FIG. 141A illustrates one embodiment of a first link for a 12-bit into 10-bit shift for a Yxy 4:4:4 RGB encode as applied to SMPTE ST372. FIG. 141B illustrates one embodiment of a second link for a 12-bit into 10-bit shift for a Yxy 4:4:4 RGB encode as applied to SMPTE ST372.

FIGS. 141C-141D illustrate one embodiment of a 12-bit into 10-bit shift for a Yu'v' 4:4:4 RGB encode as applied to SMPTE ST372 (e.g., SMPTE ST372:2017). In one embodiment, the encode utilizes a first link (e.g., Link A) and a second link (e.g., Link B). FIG. 141C illustrates one embodiment of a first link for a 12-bit into 10-bit shift for a Yu'v' 4:4:4 RGB encode as applied to SMPTE ST372. FIG. 141D illustrates one embodiment of a second link for a 12-bit into 10-bit shift for a Yu'v' 4:4:4 RGB encode as applied to SMPTE ST372.

FIGS. 142A-142B illustrate one embodiment of a 16-bit into 12-bit shift for a Yxy 4:4:4 $YC_BC_R$ encode as applied to SMPTE ST372 (e.g., SMPTE ST372:2017). In one embodiment, the encode utilizes a first link (e.g., Link A) and a second link (e.g., Link B). FIG. 142A illustrates one embodiment of a first link for a 16-bit into 12-bit shift for a Yxy 4:4:4 $YC_BC_R$ encode as applied to SMPTE ST372. FIG. 142B illustrates one embodiment of a second link for a 16-bit into 12-bit shift for a Yxy 4:4:4 $YC_BC_R$ encode as applied to SMPTE ST372.

FIGS. 142C-142D illustrate one embodiment of a 16-bit into 12-bit shift for a Yu'v' 4:4:4 $YC_BC_R$ encode as applied to SMPTE ST372 (e.g., SMPTE ST372:2017). In one embodiment, the encode utilizes a first link (e.g., Link A) and a second link (e.g., Link B). FIG. 142C illustrates one embodiment of a first link for a 16-bit into 12-bit shift for a Yu'v' 4:4:4 $YC_BC_R$ encode as applied to SMPTE ST372. FIG. 142D illustrates one embodiment of a second link for a 16-bit into 12-bit shift for a Yu'v' 4:4:4 $YC_BC_R$ encode as applied to SMPTE ST372.

FIGS. 143A-143B illustrate one embodiment of a 16-bit into 12-bit shift for a Yxy 4:4:4 RGB encode as applied to SMPTE ST372 (e.g., SMPTE ST372:2017). In one embodiment, the encode utilizes a first link (e.g., Link A) and a second link (e.g., Link B). FIG. 143A illustrates one embodiment of a first link for a 16-bit into 12-bit shift for a Yxy 4:4:4 RGB encode as applied to SMPTE ST372. FIG. 143B illustrates one embodiment of a second link for a 16-bit into 12-bit shift for a Yxy 4:4:4 RGB encode as applied to SMPTE ST372.

FIGS. 143A-143B illustrate one embodiment of a 16-bit into 12-bit shift for a Yu'v' 4:4:4 RGB encode as applied to SMPTE ST372 (e.g., SMPTE ST372:2017). In one embodiment, the encode utilizes a first link (e.g., Link A) and a second link (e.g., Link B). FIG. 143A illustrates one embodiment of a first link for a 16-bit into 12-bit shift for a Yu'v' 4:4:4 RGB encode as applied to SMPTE ST372. FIG. 143B illustrates one embodiment of a second link for a 16-bit into 12-bit shift for a Yu'v' 4:4:4 RGB encode as applied to SMPTE ST372.

FIGS. 144A-144B illustrate one embodiment of a 12-bit into 10-bit shift for a Yxy 4:2:2 Level A encode as applied to SMPTE ST425 (e.g., SMPTE ST425-1:2017) ("Mapping Structure 1"). FIG. 144A illustrates one embodiment of a first data stream for a 12-bit into 10-bit shift for a Yxy 4:2:2 Level A encode as applied to SMPTE ST425. FIG. 144B illustrates one embodiment of a second data stream for a 12-bit into 10-bit shift for a Yxy 4:2:2 Level A encode as applied to SMPTE ST425.

FIGS. 144C-144D illustrate one embodiment of a 12-bit into 10-bit shift for a Yu'v' 4:2:2 Level A encode as applied to SMPTE ST425 (e.g., SMPTE ST425-1:2017) ("Mapping Structure 1"). FIG. 144C illustrates one embodiment of a first data stream for a 12-bit into 10-bit shift for a Yu'v' 4:2:2 Level A encode as applied to SMPTE ST425. FIG. 144D illustrates one embodiment of a second data stream for a 12-bit into 10-bit shift for a Yu'v' 4:2:2 Level A encode as applied to SMPTE ST425.

FIGS. 145A-145B illustrate one embodiment of a 12-bit into 10-bit shift for a Yxy 4:4:4 Level A encode as applied to SMPTE ST425 (e.g., SMPTE ST425-1:2017) ("Mapping Structure 2"). FIG. 145A illustrates one embodiment of a first data stream for a 12-bit into 10-bit shift for a Yxy 4:4:4 Level A encode as applied to SMPTE ST425. FIG. 145B illustrates one embodiment of a second data stream for a 12-bit into 10-bit shift for a Yxy 4:4:4 Level A encode as applied to SMPTE ST425.

FIGS. 145C-145D illustrate one embodiment of a 12-bit into 10-bit shift for a Yu'v' 4:4:4 Level A encode as applied to SMPTE ST425 (e.g., SMPTE ST425-1:2017) ("Mapping Structure 2"). FIG. 145C illustrates one embodiment of a first data stream for a 12-bit into 10-bit shift for a Yu'v' 4:4:4 Level A encode as applied to SMPTE ST425. FIG. 145D illustrates one embodiment of a second data stream for a 12-bit into 10-bit shift for a Yu'v' 4:4:4 Level A encode as applied to SMPTE ST425.

FIGS. 146A-146B illustrate one embodiment of a 16-bit into 12-bit shift for a Yxy 4:4:4 Level A encode as applied to SMPTE ST425 (e.g., SMPTE ST425-1:2017) ("Mapping Structure 3"). FIG. 146A illustrates one embodiment of a first data stream for a 16-bit into 12-bit shift for a Yxy 4:4:4 Level A encode as applied to SMPTE ST425. FIG. 146B illustrates one embodiment of a second data stream for a 16-bit into 12-bit shift for a Yxy 4:4:4 Level A encode as applied to SMPTE ST425.

FIGS. 146C-146D illustrate one embodiment of a 16-bit into 12-bit shift for a Yu'v' 4:4:4 Level A encode as applied to SMPTE ST425 (e.g., SMPTE ST425-1:2017) ("Mapping Structure 3"). FIG. 146C illustrates one embodiment of a first data stream for a 16-bit into 12-bit shift for a Yu'v' 4:4:4 Level A encode as applied to SMPTE ST425. FIG. 146D illustrates one embodiment of a second data stream for a 16-bit into 12-bit shift for a Yu'v' 4:4:4 Level A encode as applied to SMPTE ST425.

FIGS. 147A-147B illustrate one embodiment of a 16-bit into 12-bit shift for a Yxy 4:2:2 Level A encode as applied to SMPTE ST425 (e.g., SMPTE ST425-1:2017) ("Mapping Structure 4"). FIG. 147A illustrates one embodiment of a first data stream for a 16-bit into 12-bit shift for a Yxy 4:2:2 Level A encode as applied to SMPTE ST425. FIG. 147B illustrates one embodiment of a second data stream for a 16-bit into 12-bit shift for a Yxy 4:2:2 Level A encode as applied to SMPTE ST425.

FIGS. 147C-147D illustrate one embodiment of a 16-bit into 12-bit shift for a Yu'v' 4:2:2 Level A encode as applied to SMPTE ST425 (e.g., SMPTE ST425-1:2017) ("Mapping Structure 4"). FIG. 147C illustrates one embodiment of a first data stream for a 16-bit into 12-bit shift for a Yu'v' 4:2:2 Level A encode as applied to SMPTE ST425. FIG. 147D illustrates one embodiment of a second data stream for a 16-bit into 12-bit shift for a Yu'v' 4:2:2 Level A encode as applied to SMPTE ST425.

FIGS. 148A-148B illustrate one embodiment of a 12-bit into 10-bit shift for a Yxy Level B Multiplex Dual Stream (DS) encode as applied to SMPTE ST425 (e.g., SMPTE ST425-1:2017). FIG. 148A illustrates one embodiment of a first data stream for a 12-bit into 10-bit shift for a Yxy Level B Multiplex Dual Stream (DS) encode as applied to SMPTE ST425. FIG. 148B illustrates one embodiment of a second data stream for a 12-bit into 10-bit shift for a Yxy Level B Multiplex Dual Stream (DS) encode as applied to SMPTE ST425.

FIGS. 148C-148D illustrate one embodiment of a 12-bit into 10-bit shift for a Yu'v' Level B Multiplex Dual Stream (DS) encode as applied to SMPTE ST425 (e.g., SMPTE ST425-1:2017). FIG. 148C illustrates one embodiment of a first data stream for a 12-bit into 10-bit shift for a Yu'v' Level B Multiplex Dual Stream (DS) encode as applied to SMPTE ST425. FIG. 148D illustrates one embodiment of a second data stream for a 12-bit into 10-bit shift for a Yu'v' Level B Multiplex Dual Stream (DS) encode as applied to SMPTE ST425.

FIGS. 149A-149B illustrate one embodiment of a 12-bit into 10-bit shift for a Yxy Level B Multiplex Dual Link (DL) encode as applied to SMPTE ST425 (e.g., SMPTE ST425-1:2017). FIG. 149A illustrates one embodiment of a first data link for a 12-bit into 10-bit shift for a Yxy Level B Multiplex Dual Link (DL) encode as applied to SMPTE ST425. FIG. 149B illustrates one embodiment of a second data link for a 12-bit into 10-bit shift for a Yxy Level B Multiplex Dual Link (DL) encode as applied to SMPTE ST425.

FIGS. 149C-149D illustrate one embodiment of a 12-bit into 10-bit shift for a Yu'v' Level B Multiplex Dual Link (DL) encode as applied to SMPTE ST425 (e.g., SMPTE ST425-1:2017). FIG. 149A illustrates one embodiment of a first data link for a 12-bit into 10-bit shift for a Yu'v' Level B Multiplex Dual Link (DL) encode as applied to SMPTE ST425. FIG. 149B illustrates one embodiment of a second data link for a 12-bit into 10-bit shift for a Yu'v' Level B Multiplex Dual Link (DL) encode as applied to SMPTE ST425.

FIGS. 150A-150B illustrate one embodiment of a 16-bit into 12-bit shift for a Yxy Level B Multiplex Dual Link (DL) encode as applied to SMPTE ST425 (e.g., SMPTE ST425-1:2017). FIG. 150A illustrates one embodiment of a first data link for a 16-bit into 12-bit shift for a Yxy Level B Multiplex Dual Link (DL) encode as applied to SMPTE ST425. FIG. 150B illustrates one embodiment of a second data link for a Yxy 16-bit into 12-bit shift for a Level B Multiplex Dual Link (DL) encode as applied to SMPTE ST425.

FIGS. 150C-150D illustrate one embodiment of a 16-bit into 12-bit shift for a Yu'v' Level B Multiplex Dual Link (DL) encode as applied to SMPTE ST425 (e.g., SMPTE ST425-1:2017). FIG. 150C illustrates one embodiment of a first data link for a 16-bit into 12-bit shift for a Yu'v' Level B Multiplex Dual Link (DL) encode as applied to SMPTE ST425. FIG. 150D illustrates one embodiment of a second data link for a 16-bit into 12-bit shift for a Yu'v' Level B Multiplex Dual Link (DL) encode as applied to SMPTE ST425.

In a preferred embodiment, identification of shifted bit encoding utilizes a modification to SMPTE 2048-1:2011, which is incorporated herein by reference in its entirety. Because most of the SDI payload ID is used for other signal identification, the indicator for a shifted bit encode must be placed in the vertical ancillary data (VANC) portion of the serial stream for ST292, ST372, ST425, ST2081, and ST2082 formats. Per ST2048-1, the VANC portion is defined as shown in FIG. 151. Per the ST2048-1, DID is set to 41 h and SDID is set to 02 h. In a preferred embodiment, identification of a signal (e.g., Yxy, ICtCp, Yu'v') using bit shifting is flagged by bit 5 within the ACT2 word as shown in FIG. 152. Yxy or Yu'v' identification is still defined in the SMPTE ST352 tables.

FIG. 153 is a table illustrating modification of SMPTE ST2036 parameters to include System 4 with bit shifting (e.g., Y'x'y', Y'u'v'). In one embodiment, SMPTE ST2036 is SMPTE ST2036-1 (2014), which is incorporated herein by reference in its entirety.

FIG. 154 is a table illustrating modification of CTA 861 Table 6—Colorimetry Transfer Characteristics to include System 4 with bit shifting (e.g., Y'x'y', Y'u'v'). In one embodiment, CTA 861 standards conform to CTA 861-H (2021), which is incorporated herein by reference in its entirety.

Bit shifting is difficult to understand when using direct notation. FIG. 155A illustrates grouped bits as placed in a DisplayPort or HDMI stream for an 8-bit Yxy 4:2:2 system. For example, S1-0 indicates data set word 1 pixel 0. FIG. 155B illustrates grouped bits as placed in a DisplayPort or HDMI stream for an 8-bit Y'u'v' 4:2:2 system.

FIG. 156A is a table for Yxy or Y'u'v' 10-bit into 8-bit 4:2:2 encoding with 4 lanes. FIG. 156B is a table for Yxy or Y'u'v' 10-bit into 8-bit 4:2:2 encoding with 2 lanes. FIG. 156C is a table for Yxy or Y'u'v' 10-bit into 8-bit 4:2:2 encoding with 1 lane.

FIG. 157A illustrates word set designations as placed in a DisplayPort or HDMI stream for a 10-bit Yxy 4:2:2 system. FIG. 157B illustrates word set designations as placed in a DisplayPort or HDMI stream for a 10-bit Y'u'v' 4:2:2 system.

FIG. 158A is a table for Yxy or Y'u'v' 12-bit into 10-bit 4:2:2 encoding with 4 lanes. FIG. 158B is a table for Yxy or Y'u'v' 12-bit into 10-bit 4:2:2 encoding with 2 lanes. FIG. 158C is a table for Yxy or Y'u'v' 12-bit into 10-bit 4:2:2 encoding with 1 lane.

FIG. 159A illustrates word set designations as placed in a DisplayPort or HDMI stream for a 12-bit Yxy 4:2:2 system. FIG. 159B illustrates word set designations as placed in a DisplayPort or HDMI stream for a 12-bit Y'u'v' 4:2:2 system.

FIG. 160A is a table for Yxy or Y'u'v' 16-bit into 12-bit 4:2:2 encoding with 4 lanes. FIG. 160B is a table for Yxy or Y'u'v' 16-bit into 12-bit 4:2:2 encoding with 2 lanes. FIG. 160C is a table for Yxy or Y'u'v' 16-bit into 12-bit 4:2:2 encoding with 1 lane.

FIG. 161A illustrates word set designations as placed in a DisplayPort or HDMI stream for a 10-bit Yxy 4:4:4 system. FIG. 161B illustrates word set designations as placed in a DisplayPort or HDMI stream for a 10-bit Y'u'v' 4:4:4 system.

FIG. 162A is a table for Yxy or Y'u'v' 12-bit into 10-bit 4:4:4 encoding with 4 lanes. FIG. 162B is a table for Yxy or Y'u'v' 12-bit into 10-bit 4:4:4 encoding with 2 lanes. FIG. 162C is a table for Yxy or Y'u'v' 12-bit into 10-bit 4:4:4 encoding with 1 lane.

FIG. 163A illustrates word set designations as placed in a DisplayPort or HDMI stream for a 12-bit Yxy 4:4:4 system. FIG. 163B illustrates word set designations as placed in a DisplayPort or HDMI stream for a 12-bit Y'u'v' 4:4:4 system.

FIG. 164A is a table for Yxy or Y'u'v' 16-bit into 12-bit 4:4:4 encoding with 4 lanes. FIG. 164B is a table for Yxy or Y'u'v' 16-bit into 12-bit 4:4:4 encoding with 2 lanes. FIG. 164C is a table for Yxy or Y'u'v' 16-bit into 12-bit 4:4:4 encoding with 1 lane.

The identification of a Yxy or Y'u'v' formatted connection is preferably provided in the auxiliary video information (AVI). In one embodiment, the AVI is provided according to InfoFrame version 4. Additional information is available in ANSI/CTA-861-H-2021, which is incorporated herein by reference in its entirety. In one embodiment, location of the identification is in data byte 14 (e.g., ACE3, ACE2, ACE1, ACE0. In one embodiment, ACE3=0, ACE2=0, ACE1=1, and ACE0=1 identifies a Yxy 4:4:4 formatted image without a DRR applied; ACE3=0, ACE2=1, ACE1=0, and ACE0=0 identifies a Yxy 4:2:2 formatted image without a DRR applied; ACE3=0, ACE2=1, ACE1=0, and ACE0=1 identifies a Yxy 4:2:0 formatted image without a DRR applied; ACE3=0, ACE2=1, ACE1=1, and ACE0=0 identifies a Yxy 4:4:4 formatted image with a DRR applied; ACE3=0, ACE2=1, ACE1=1, and ACE0=1 identifies a Yxy 4:2:2 formatted image with a DRR applied; ACE3=1, ACE2=0, ACE1=0, and ACE0=0 identifies a Yxy 4:2:0 formatted image with a DRR applied; ACE3=1, ACE2=0, ACE1=0, and ACE0=1 identifies a Yu'v' 4:4:4 formatted image without a DRR applied; ACE3=1, ACE2=0, ACE1=1, and ACE0=0 identifies a Yu'v' 4:2:2 formatted image without a DRR applied; ACE3=1, ACE2=0, ACE1=1, and ACE0=1 identifies a Yu'v' 4:2:0 formatted image without a DRR applied; ACE3=1, ACE2=1, ACE1=0, and ACE0=0 identifies a Yu'v' 4:4:4 formatted image with a DRR applied; ACE3=1, ACE2=1, ACE1=0, and ACE0=1 identifies a Yu'v' 4:2:2 formatted image with a DRR applied; and ACE3=1, ACE2=1, ACE1=1, and ACE0=0 identifies a Yu'v' 4:2:0 formatted image with a DRR applied. In another embodiment, ACE3=0, ACE2=0, ACE1=1, and ACE0=1 identifies a Yxy 4:4:4 formatted image; ACE3=0, ACE2=1, ACE1=0, and ACE0=0 identifies a Yxy 4:2:2 formatted image; and ACE3=0, ACE2=1, ACE1=0, and ACE0=1 identifies a Yxy 4:2:0 formatted image. In one embodiment, data byte 2 (C1, C0) reads as C1=1 and C0=1 and data byte 3 (EC2, EC1, EC0) reads as EC2=1, EC1=1, and EC0=1. In one embodiment, data byte 5 identifies whether image data is using bit shifting (YQ1). Data byte 2 values are discussed in Table 17 (supra), data byte 3 values are discussed in Table 18 (supra), and data byte 14 values are discussed in Table 19 (supra). Table 21 illustrates values for data byte 5 for a bit shifted system.

TABLE 21

| | | YCC Quantization Range | |
|---|---|---|---|
| YQ1 | YQ0 | Y = YCbCr | Y = RGB |
| 0 | 0 | Limited Range | Required Setting |
| 0 | 1 | Full Range | Reserved |
| 1 | 0 | Bit Shifting | Reserved |
| 1 | 1 | Reserved | Reserved |

In an alternative embodiment, identification of bit shifting occurs in SMPTE ST352 (e.g., instead of SMPTE ST2036). FIG. 113 illustrates a table including modifications to payload ID metadata as applied to SMPTE ST352 to indicate bit shifting (e.g., byte 4 bit 6).

Six-Primary Color Encode Using a 4:4:4 Sampling Method

Figure 30:
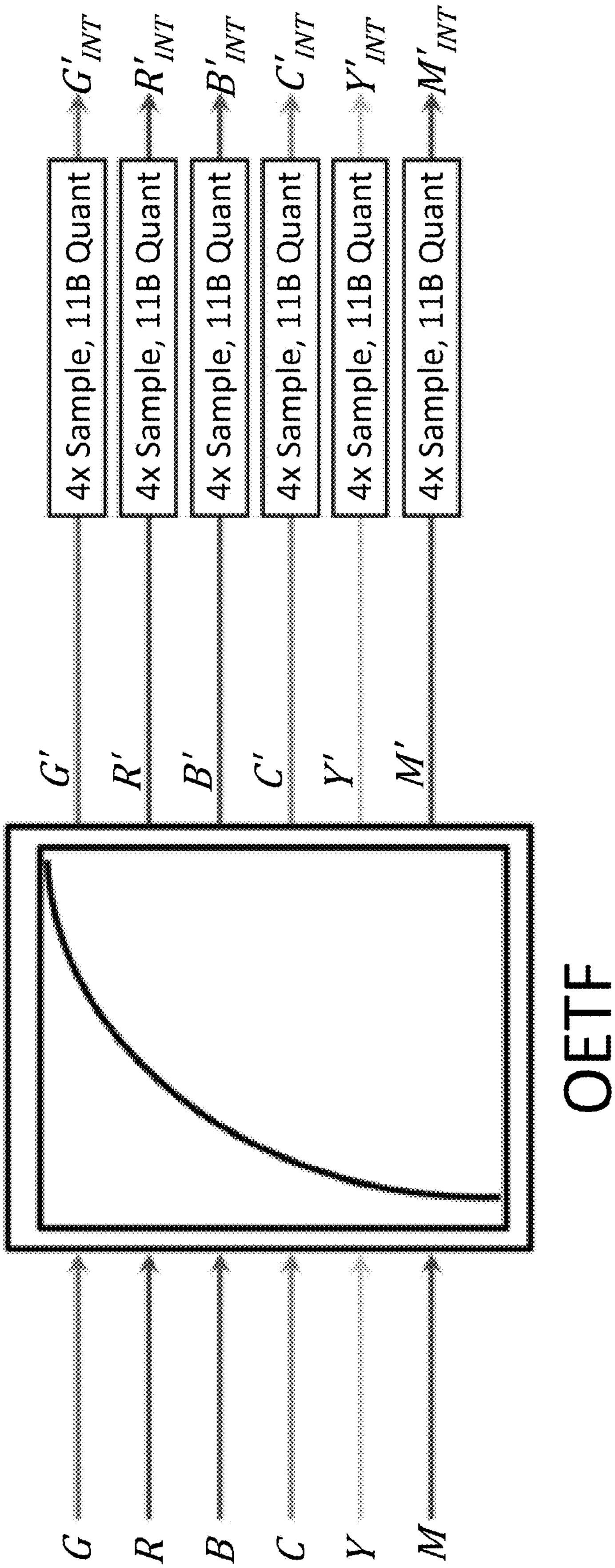
FIG. 30 illustrates one embodiment of a six-primary color system encode using a 4:4:4 sampling method.

FIG. 30 illustrates one embodiment of a six-primary color system encode using a 4:4:4 sampling method.

Subjective testing during the development and implementation of the current digital cinema system (DCI Version 1.2) showed that perceptible quantizing artifacts were not noticeable with system bit resolutions higher than 11 bits. Current serial digital transport systems support 12 bits. Remapping six color components to a 12-bit stream is accomplished by lowering the bit limit to 11 bits (values 0 to 2047) for 12-bit serial systems or 9 bits (values 0 to 512) for 10-bit serial systems. This process is accomplished by processing multi-primary (e.g., RGBCMY) video information through a standard Optical Electronic Transfer Function (OETF) (e.g., ITU-R BT.709-6), digitizing the video information as four samples per pixel, and quantizing the video information as 11-bit or 9-bit.

In another embodiment, the multi-primary (e.g., RGBCMY) video information is processed through a standard Optical Optical Transfer Function (OOTF). In yet another embodiment, the multi-primary (e.g., RGBCMY) video information is processed through a Transfer Function (TF) other than OETF or OOTF. TFs consist of two components, a Modulation Transfer Function (MTF) and a Phase Transfer Function (PTF). The MTF is a measure of the ability of an optical system to transfer various levels of detail from object to image. In one embodiment, performance is measured in terms of contrast (degrees of gray), or of modulation, produced for a perfect source of that detail level. The PTF is a measure of the relative phase in the image(s) as a function of frequency. A relative phase change of 180°, for example, indicates that black and white in the image are reversed. This phenomenon occurs when the TF becomes negative.

There are several methods for measuring MTF. In one embodiment, MTF is measured using discrete frequency generation. In one embodiment, MTF is measured using continuous frequency generation. In another embodiment, MTF is measured using image scanning. In another embodiment, MTF is measured using waveform analysis.

In one embodiment, the six-primary color system is for a 12-bit serial system. Current practices normally set black at bit value 0 and white at bit value 4095 for 12-bit video. In order to package six colors into the existing three-serial streams, the bit defining black is moved to bit value 2048. Thus, the new encode has RGB values starting at bit value 2048 for black and bit value 4095 for white and non-RGB primary (e.g., CMY) values starting at bit value 2047 for black and bit value 0 as white. In another embodiment, the six-primary color system is for a 10-bit serial system.

Figure 31:
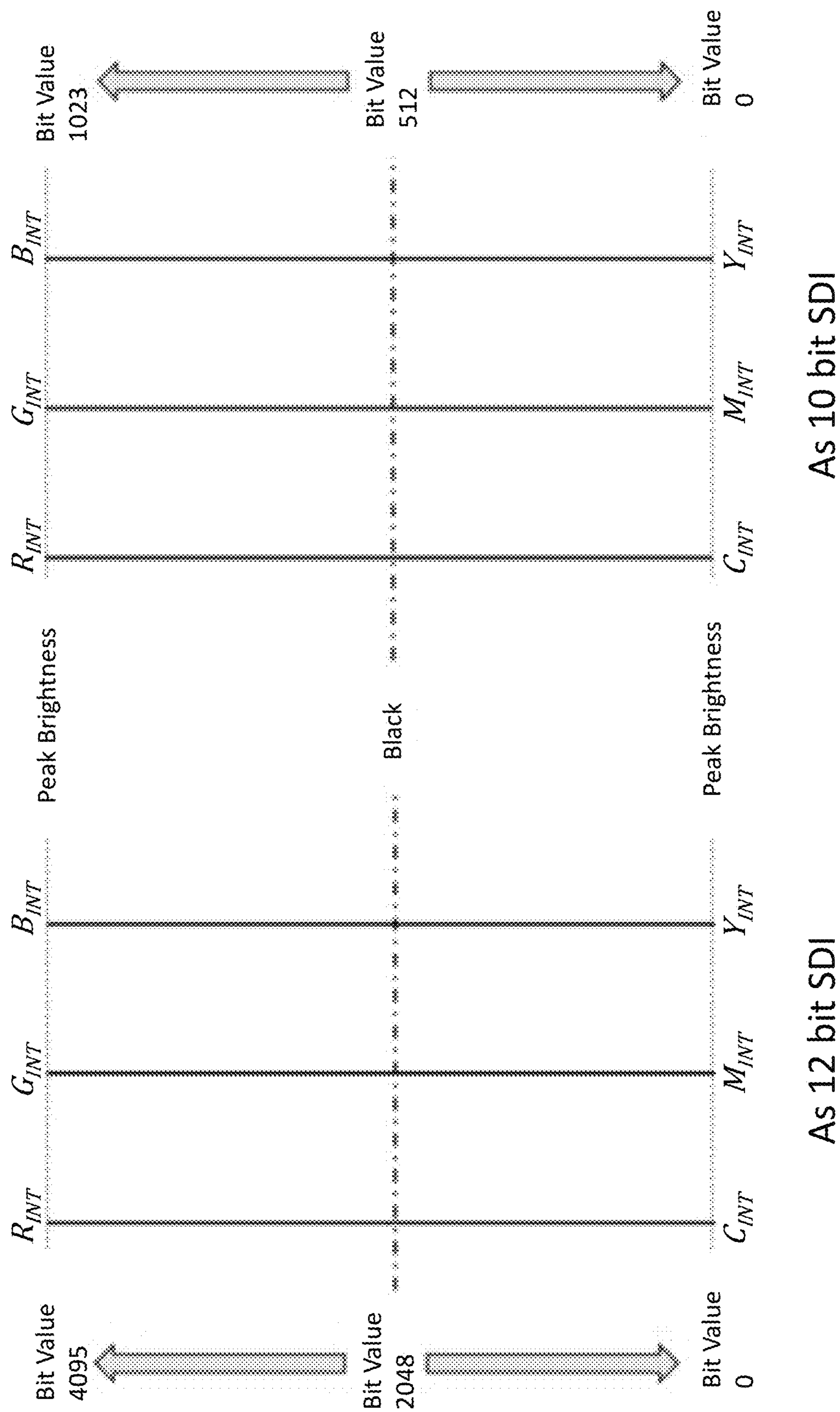
FIG. 31 illustrates one embodiment for a method to package six channels of primary information into the three standard primary channels used in current serial video standards by modifying bit numbers for a 12-bit SDI and a 10-bit SDI.
Figure 32:
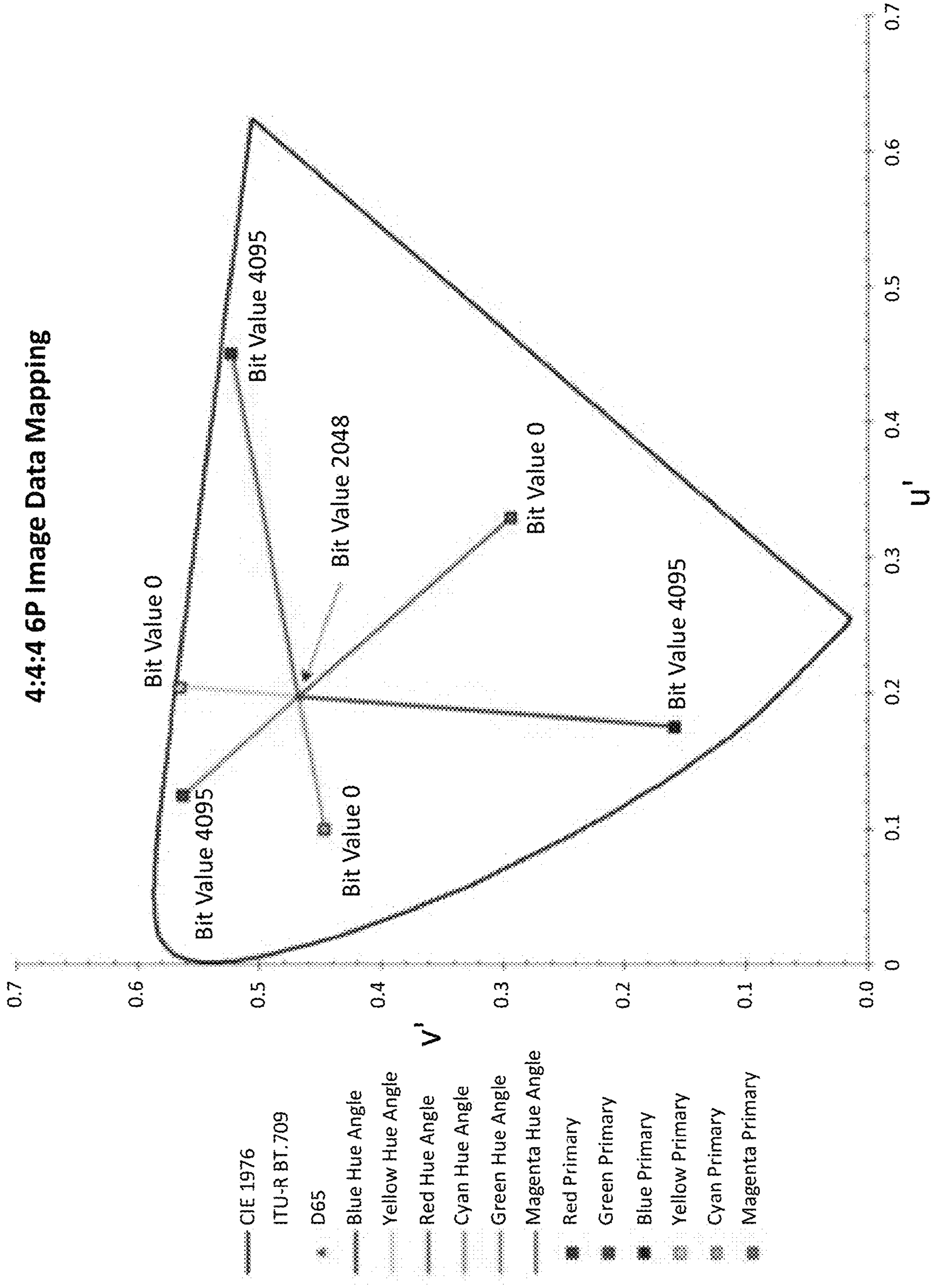
FIG. 32 illustrates a simplified diagram estimating perceived viewer sensation as code values define each hue angle.

FIG. 31 illustrates one embodiment for a method to package six channels of primary information into the three standard primary channels used in current serial video standards by modifying bit numbers for a 12-bit SDI and a 10-bit SDI. FIG. 32 illustrates a simplified diagram estimating perceived viewer sensation as code values define each hue angle. TABLE 22 and TABLE 23 list bit assignments for computer, production, and broadcast for a 12-bit system and a 10-bit system, respectively. In one embodiment, "Computer" refers to bit assignments compatible with CTA 861-G, November 2016, which is incorporated herein by reference in its entirety. In one embodiment, "Production" and/or "Broadcast" refer to bit assignments compatible with SMPTE ST 2082-0 (2016), SMPTE ST 2082-1 (2015), SMPTE ST 2082-10 (2015), SMPTE ST 2082-11 (2016), SMPTE ST 2082-12 (2016), SMPTE ST 2110-10 (2017), SMPTE ST 2110-20 (2017), SMPTE ST 2110-21 (2017), SMPTE ST 2110-30 (2017), SMPTE ST 2110-31 (2018), and/or SMPTE ST 2110-40 (2018), each of which is incorporated herein by reference in its entirety.

TABLE 22

| 12-Bit Assignments | Computer | | Production | | Broadcast | |
|---|---|---|---|---|---|---|
| | RGB | CMY | RGB | CMY | RGB | CMY |
| Peak Brightness | 4095 | 0 | 4076 | 16 | 3839 | 256 |
| Minimum Brightness | 2048 | 2047 | 2052 | 2032 | 2304 | 1792 |

TABLE 23

| 10-Bit Assignments | Computer | | Production | | Broadcast | |
|---|---|---|---|---|---|---|
| | RGB | CMY | RGB | CMY | RGB | CMY |
| Peak Brightness | 1023 | 0 | 1019 | 4 | 940 | 64 |
| Minimum Brightness | 512 | 511 | 516 | 508 | 576 | 448 |

In one embodiment, the OETF process is defined in ITU-R BT.709-6, which is incorporated herein by reference in its entirety. In one embodiment, the OETF process is defined in ITU-R BT.709-5, which is incorporated herein by reference in its entirety. In another embodiment, the OETF process is defined in ITU-R BT.709-4, which is incorporated herein by reference in its entirety. In yet another embodiment, the OETF process is defined in ITU-R BT.709-3, which is incorporated herein by reference in its entirety. In yet another embodiment, the OETF process is defined in ITU-R BT.709-2, which is incorporated herein by reference in its entirety. In yet another embodiment, the OETF process is defined in ITU-R BT.709-1, which is incorporated herein by reference in its entirety.

In one embodiment, the encoder is a non-constant luminance encoder. In another embodiment, the encoder is a constant luminance encoder.

Six-Primary Color Packing/Stacking Using a 4:4:4 Sampling Method

Figure 33:
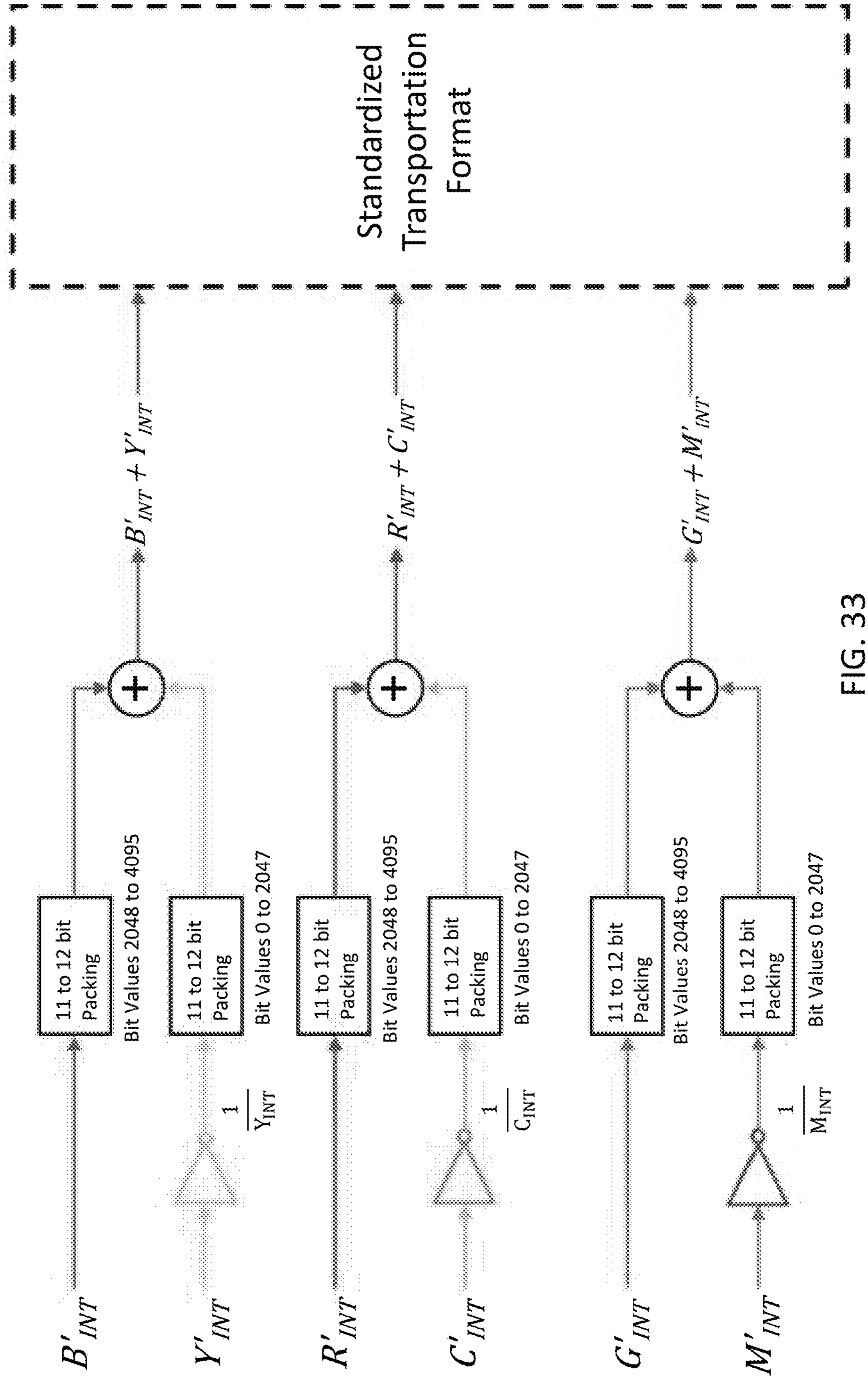
FIG. 33 illustrates one embodiment for a method of stacking/encoding six-primary color information using a 4:4:4 video system.

FIG. 33 illustrates one embodiment for a method of stacking/encoding six-primary color information using a 4:4:4 video system. Image data must be assembled according the serial system used. This is not a conversion process, but instead is a packing/stacking process. In one embodiment, the packing/stacking process is for a six-primary color system using a 4:4:4 sampling method.

Figure 34:
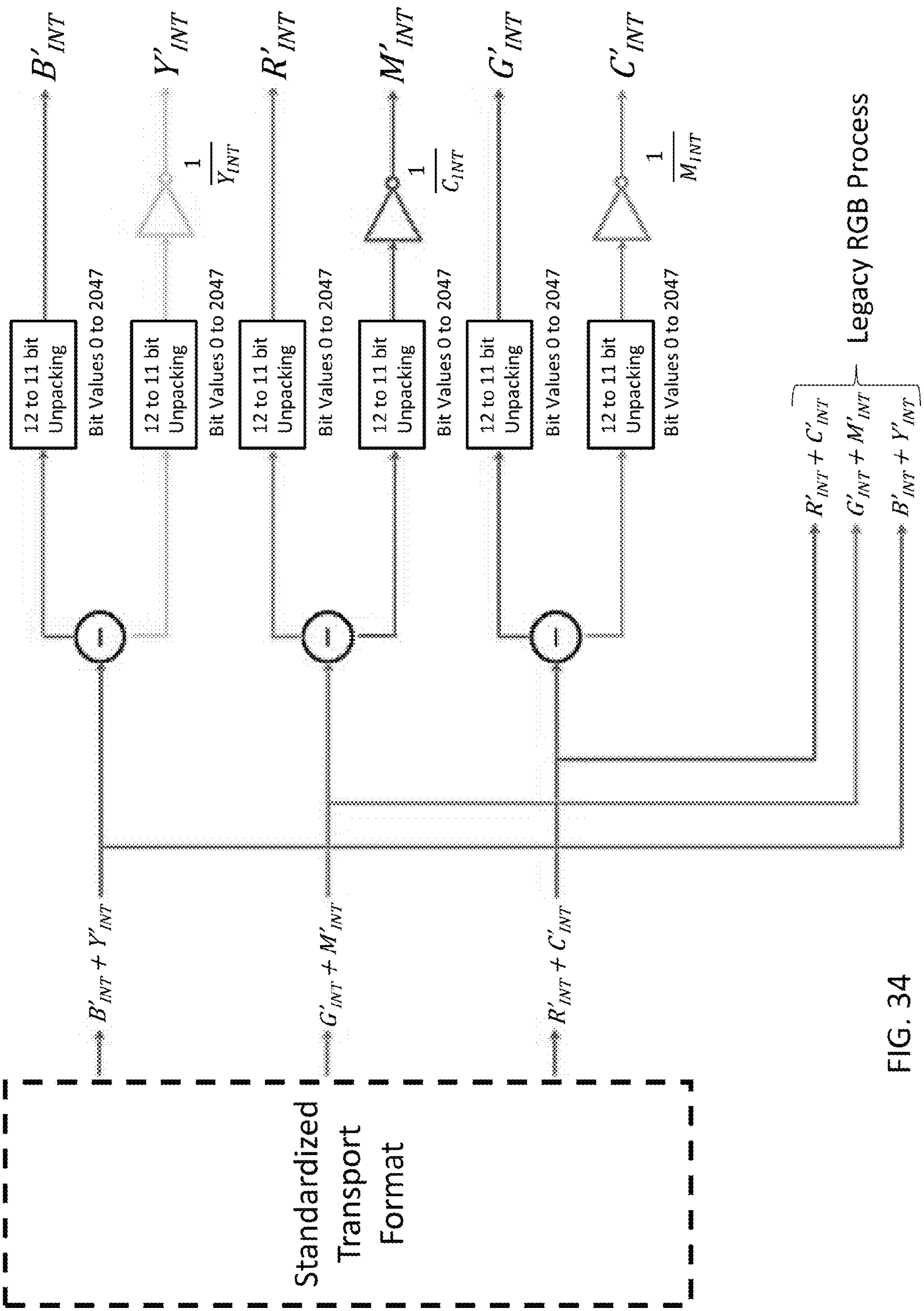
FIG. 34 illustrates one embodiment for a method of unstacking/decoding six-primary color information using a 4:4:4 video system.
Figure 35:
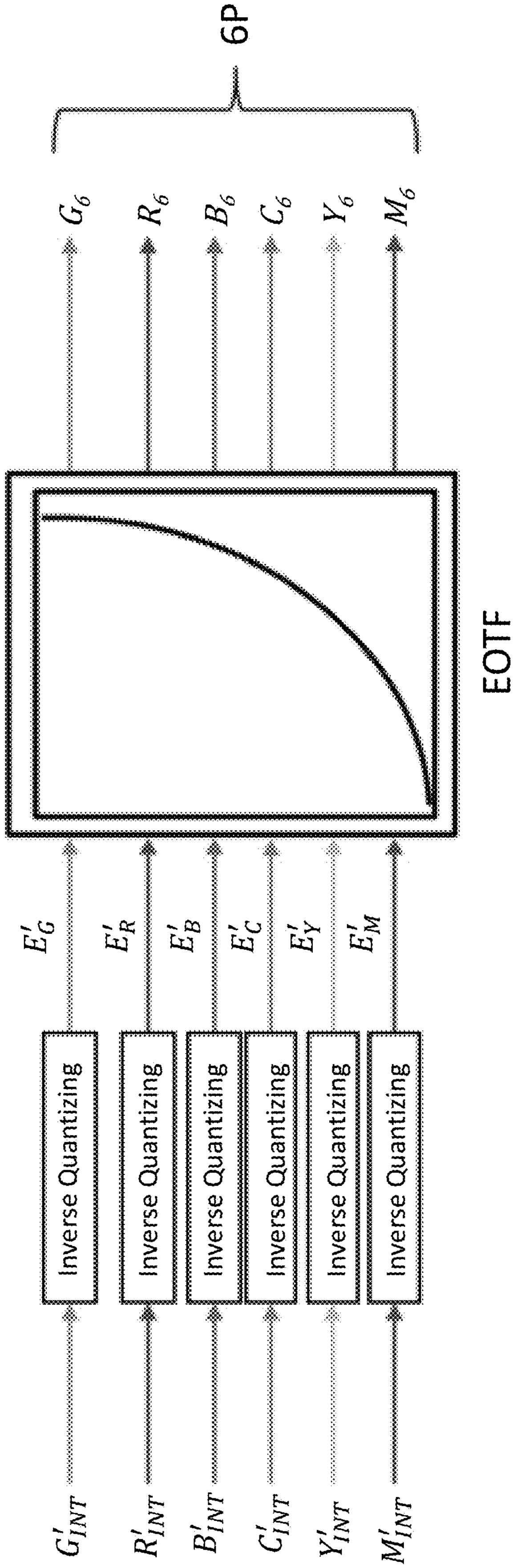
FIG. 35 illustrates one embodiment of a 4:4:4 decoder for a six-primary color system.

FIG. 34 illustrates one embodiment for a method of unstacking/decoding six-primary color information using a 4:4:4 video system. In one embodiment, the RGB channels and the non-RGB (e.g., CMY) channels are combined into one 12-bit word and sent to a standardized transport format. In one embodiment, the standardized transport format is SMPTE ST424 SDI. In one embodiment, the decode is for a non-constant luminance, six-primary color system. In another embodiment, the decode is for a constant luminance, six-primary color system. In yet another embodiment, an electronic optical transfer function (EOTF) (e.g., ITU-R BT.1886) coverts image data back to linear for display. In one embodiment, the EOTF is defined in ITU-R BT.1886 (2011), which is incorporated herein by reference in its entirety. FIG. 35 illustrates one embodiment of a 4:4:4 decoder.

System 2 uses sequential mapping to the standard transport format, so it includes a delay for the non-RGB (e.g., CMY) data. The non-RGB (e.g., CMY) data is recovered in the decoder by delaying the RGB data. Since there is no stacking process, the full bit level video is operable to be transported. For displays that are using optical filtering, this RGB delay is operable to be removed and the process of mapping image data to the correct filter is operable to be eliminated by assuming this delay with placement of the optical filter and the use of sequential filter colors.

Figure 36:
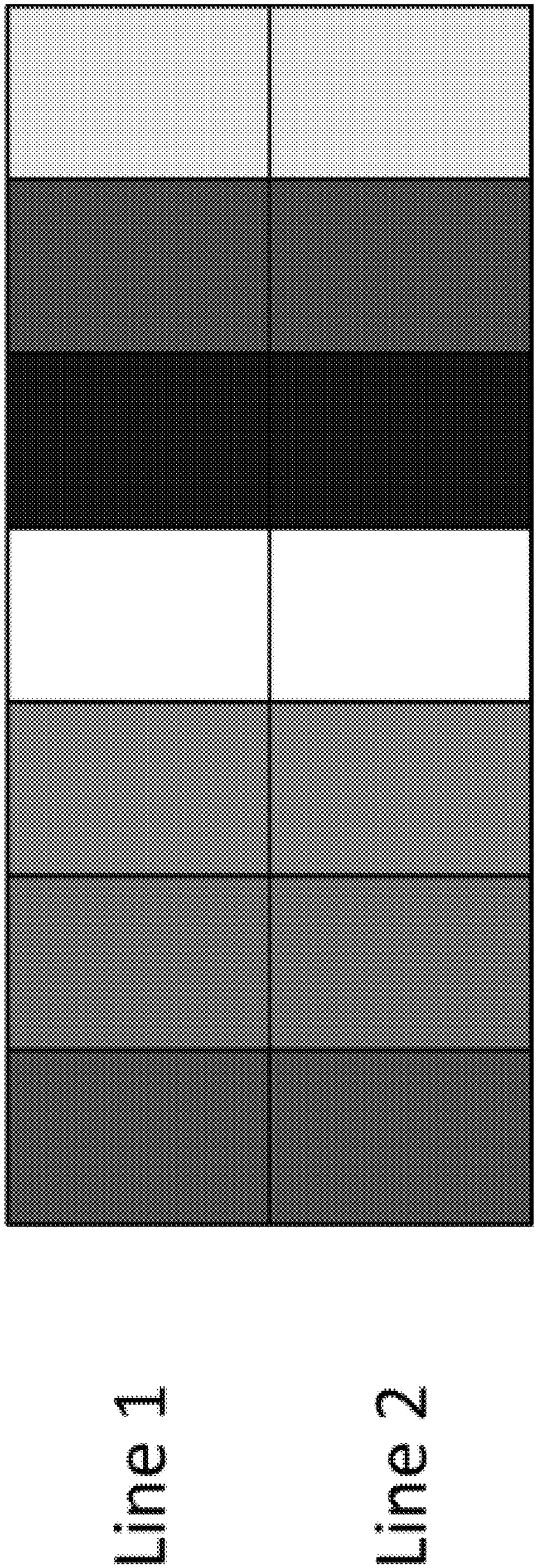
FIG. 36 illustrates one embodiment of an optical filter.
Figure 37:
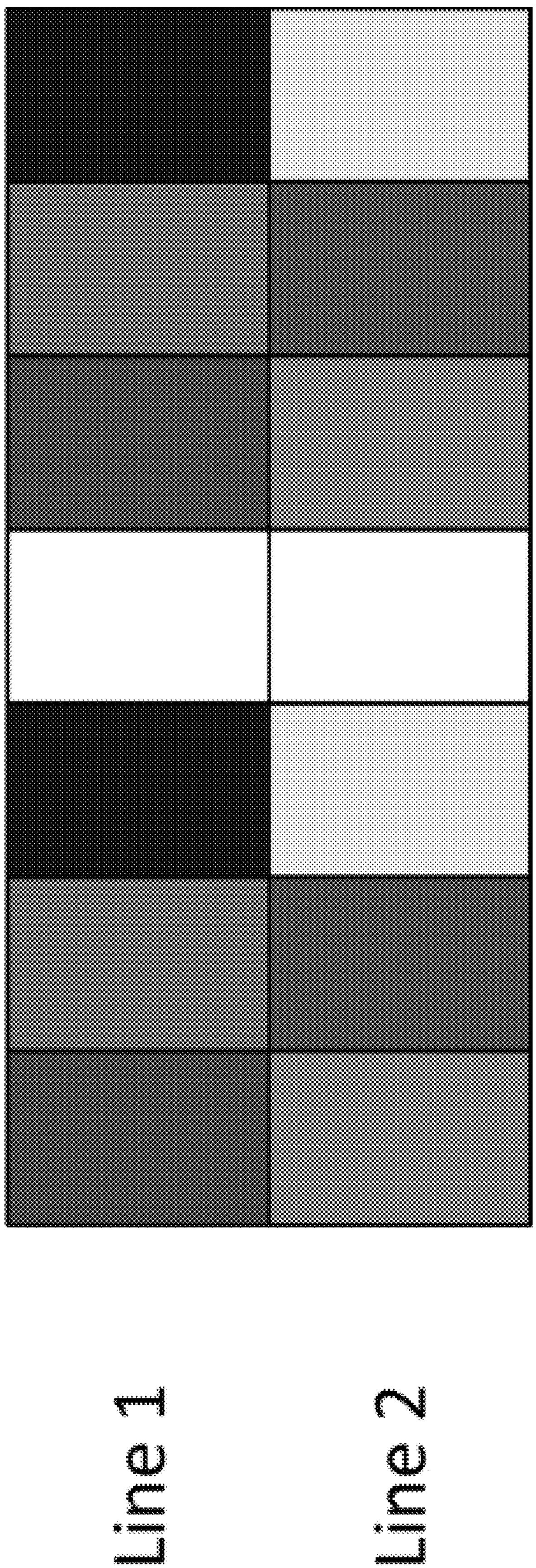
FIG. 37 illustrates another embodiment of an optical filter.

Two methods are operable to be used based on the type of optical filter used. Since this system is operating on a horizontal pixel sequence, some vertical compensation is required and pixels are rectangular. This is operable to be either as a line double repeat using the same multi-primary (e.g., RGBCMY) data to fill the following line as shown in FIG. 36, or is operable to be separated as RGB on line one and non-RGB (e.g., CMY) on line two as shown in FIG. 37. The format shown in FIG. 37 allows for square pixels, but the non-RGB (e.g., CMY) components require a line delay for synchronization. Other patterns eliminating the white subpixel are also compatible with the present invention.

Figure 38:
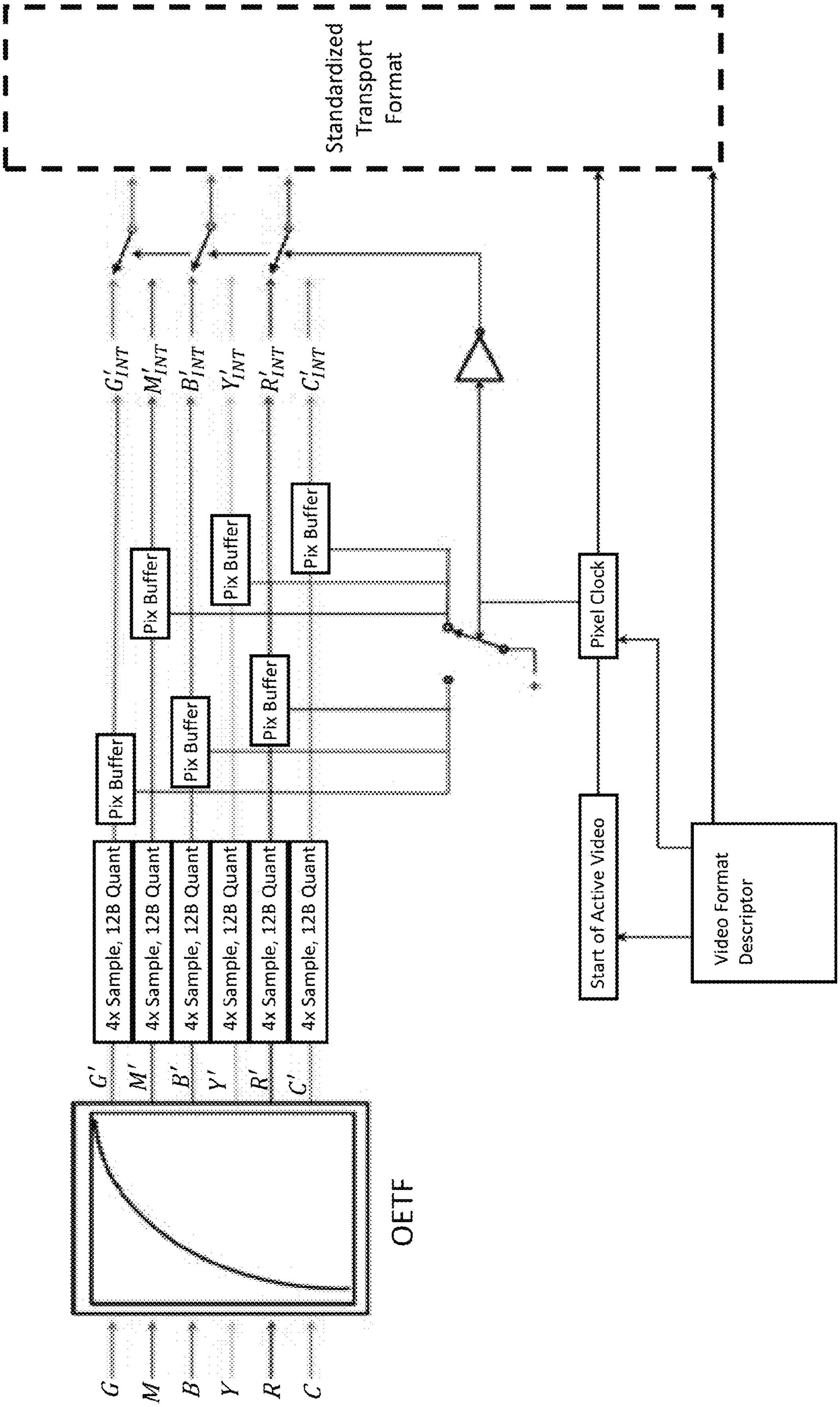
FIG. 38 illustrates an embodiment of the present invention for sending six primary colors to a standardized transport format.

FIG. 38 illustrates an embodiment of the present invention for sending six primary colors to a standardized transport format using a 4:4:4 encoder according to System 2. Encoding is straight forward with a path for RGB sent directly to the transport format. RGB data is mapped to each even numbered data segment in the transport. Non-RGB (e.g., CMY) data is mapped to each odd numbered segment. Because different resolutions are used in all of the standardized transport formats, there must be identification for what they are so that the start of each horizontal line and horizontal pixel count are operable to be identified to time the RGB/non-RGB (e.g., CMY) mapping to the transport. The identification is the same as currently used in each standardized transport function. TABLE 24, TABLE 25, TABLE 26, and TABLE 27 list 16-bit assignments, 12-bit assignments, 10-bit assignments, and 8-bit assignments, respectively. In one embodiment, "Computer" refers to bit assignments compatible with CTA 861-G, November 2016, which is incorporated herein by reference in its entirety. In one embodiment, "Production" and/or "Broadcast" refer to bit assignments compatible with SMPTE ST 2082-0 (2016), SMPTE ST 2082-1 (2015), SMPTE ST 2082-10 (2015), SMPTE ST 2082-11 (2016), SMPTE ST 2082-12 (2016), SMPTE ST 2110-10 (2017), SMPTE ST 2110-20 (2017), SMPTE ST 2110-21 (2017), SMPTE ST 2110-30 (2017), SMPTE ST 2110-31 (2018), and/or SMPTE ST 2110-40 (2018), each of which is incorporated herein by reference in its entirety.

TABLE 24

16-Bit Assignments

| | Computer | | Production | |
|---|---|---|---|---|
| | RGB | CMY | RGB | CMY |
| Peak Brightness | 65536 | 65536 | 65216 | 65216 |
| Minimum Brightness | 0 | 0 | 256 | 256 |

TABLE 25

12-Bit Assignments

| | Computer | | Production | | Broadcast | |
|---|---|---|---|---|---|---|
| | RGB | CMY | RGB | CMY | RGB | CMY |
| Peak Brightness | 4095 | 4095 | 4076 | 4076 | 3839 | 3839 |
| Minimum Brightness | 0 | 0 | 16 | 16 | 256 | 256 |

TABLE 26

10-Bit Assignments

| | Computer | | Production | | Broadcast | |
|---|---|---|---|---|---|---|
| | RGB | CMY | RGB | CMY | RGB | CMY |
| Peak Brightness | 1023 | 1023 | 1019 | 1019 | 940 | 940 |
| Minimum Brightness | 0 | 0 | 4 | 4 | 64 | 64 |

TABLE 27

8-Bit Assignments

| | Computer | | Production | | Broadcast | |
|---|---|---|---|---|---|---|
| | RGB | CMY | RGB | CMY | RGB | CMY |
| Peak Brightness | 255 | 255 | 254 | 254 | 235 | 235 |
| Minimum Brightness | 0 | 0 | 1 | 1 | 16 | 16 |

Figure 39:
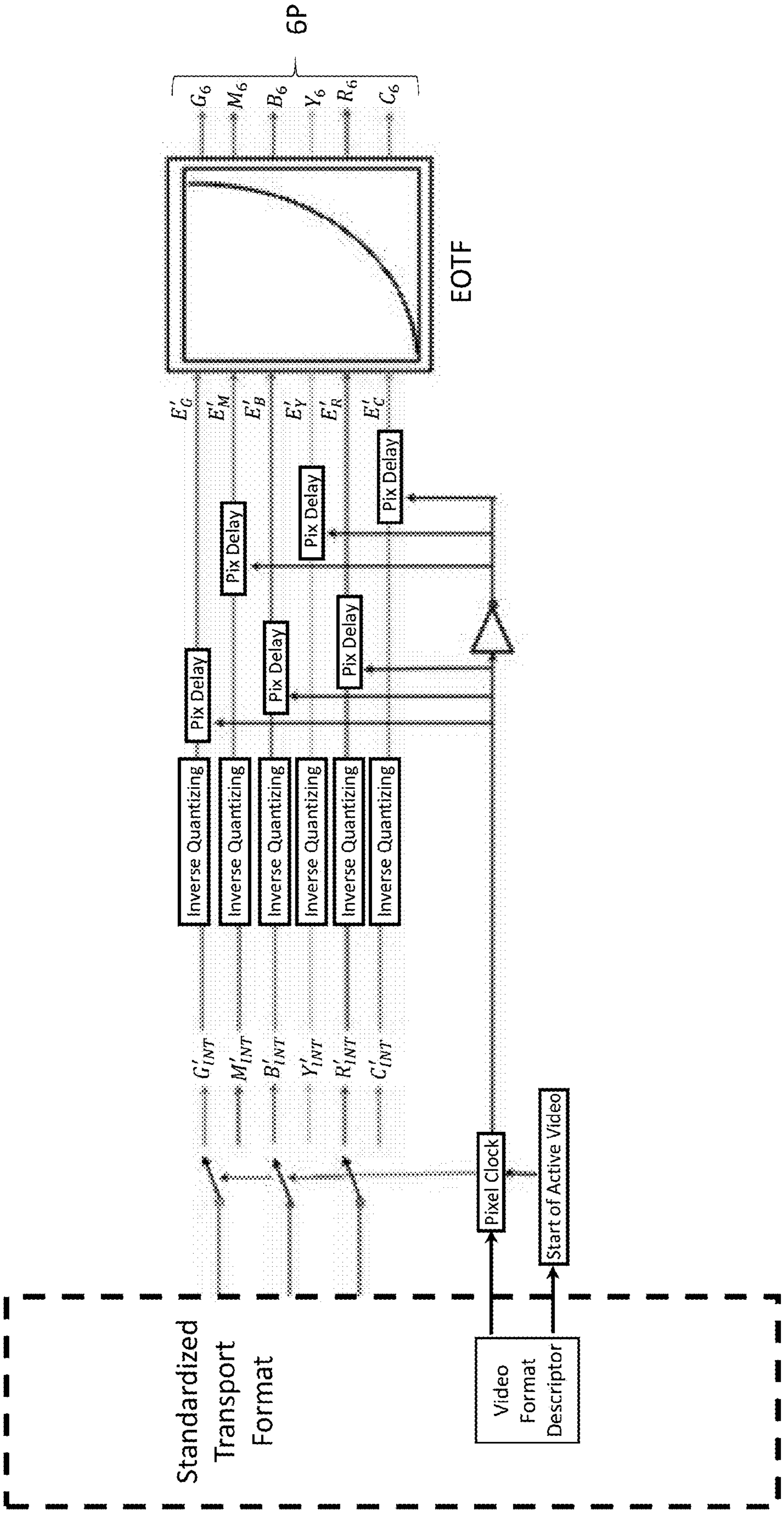
FIG. 39 illustrates one embodiment of a decode process adding a pixel delay to the RGB data for realigning the channels to a common pixel timing.

The decode adds a pixel delay to the RGB data to realign the channels to a common pixel timing. EOTF is applied and the output is sent to the next device in the system. Metadata based on the standardized transport format is used to identify the format and image resolution so that the unpacking from the transport is operable to be synchronized. FIG. 39 shows one embodiment of a decoding with a pixel delay.

In one embodiment, the decoding is 4:4:4 decoding. With this method, the six-primary color decoder is in the signal path, where 11-bit values for RGB are arranged above bit value 2048, while non-RGB (e.g., CMY) levels are arranged below bit value 2047 as 11-bit. If the same data set is sent to a display and/or process that is not operable for six-primary color processing, the image data is assumed as black at bit value 0 as a full 12-bit word. Decoding begins by tapping image data prior to the unstacking process.

Six-Primary Color Encode Using a 4:2:2 Sampling Method

In one embodiment, the packing/stacking process is for a six-primary color system using a 4:2:2 sampling method. In order to fit the new six-primary color system into a lower bandwidth serial system, while maintaining backwards compatibility, the standard method of converting from six primaries (e.g., RGBCMY) to a luminance and a set of color difference signals requires the addition of at least one new image designator. In one embodiment, the encoding and/or decoding process is compatible with transport through SMPTE ST 292-0 (2011), SMPTE ST 292-1 (2011, 2012, and/or 2018), SMPTE ST 292-2 (2011), SMPTE ST 2022-1 (2007), SMPTE ST 2022-2 (2007), SMPTE ST 2022-3 (2010), SMPTE ST 2022-4 (2011), SMPTE ST 2022-5 (2012 and/or 2013), SMPTE ST 2022-6 (2012), SMPTE ST 2022-7 (2013), and/or and CTA 861-G (2016), each of which is incorporated herein by reference in its entirety.

In order for the system to package all of the image while supporting both six-primary and legacy displays, an electronic luminance component (Y) must be derived. The first component is: $E'_{Y_6}$. For an RGBCMY system, it is operable to be described as:

$$E'_{Y_6}=0.1063E'_{Red}+0.23195E'_{Yellow}+0.3576E'_{Green}+0.19685E'_{Cyan}+0.0361E'_{Blue}+0.0712E'_{Magenta}$$

Critical to getting back to legacy display compatibility, value $E'_{-Y}$ is described as:

$$E'_{-Y}=E'_{Y_6}-(E'_{Cyan}+E'_{Yellow}+E'_{Magenta})$$

In addition, at least two new color components are disclosed. These are designated as $C_C$ and Cy components. The at least two new color components include a method to compensate for luminance and enable the system to function with older Y Cb Cr infrastructures. In one embodiment, adjustments are made to Cb and Cr in a Y Cb Cr infrastructure since the related level of luminance is operable for division over more components. These new components are as follows:

$$E'_{CR}=\frac{(E'_R-E'_{Y_6})}{1.7874},\ E'_{CB}=\frac{(E'_B-E'_{Y_6})}{1.9278},$$

$$E'_{CC}=\frac{(E'_C-E'_{Y_6})}{1.6063},\ E'_{CY}=\frac{(E'_Y-E'_{Y_6})}{1.5361}$$

Within such a system, it is not possible to define magenta as a wavelength. This is because the green vector in CIE 1976 passes into, and beyond, the CIE designated purple line. Magenta is a sum of blue and red. Thus, in one embodiment, magenta is resolved as a calculation, not as optical data. In one embodiment, both the camera side and the monitor side of the system use magenta filters. In this case, if magenta were defined as a wavelength, it would not land at the point described. Instead, magenta would appear as a very deep blue which would include a narrow bandwidth primary, resulting in metameric issues from using narrow spectral components. In one embodiment, magenta as an integer value is resolved using the following equation:

$$M_{INT}=\left[\frac{\frac{B_{INT}}{2}+\frac{R_{INT}}{2}}{2}\right]$$

The above equation assists in maintaining the fidelity of a magenta value while minimizing any metameric errors. This is advantageous over prior art, where magenta appears instead as a deep blue instead of the intended primary color value.

Six-Primary Non-Constant Luminance Encode Using a 4:2:2 Sampling Method

In one embodiment, the six-primary color system using a non-constant luminance encode for use with a 4:2:2 sampling method. In one embodiment, the encoding process and/or decoding process is compatible with transport through SMPTE ST 292-0 (2011), SMPTE ST 292-1 (2011, 2012, and/or 2018), SMPTE ST 292-2 (2011), SMPTE ST 2022-1 (2007), SMPTE ST 2022-2 (2007), SMPTE ST 2022-3 (2010), SMPTE ST 2022-4 (2011), SMPTE ST 2022-5 (2012 and/or 2013), SMPTE ST 2022-6 (2012), SMPTE ST 2022-7 (2013), and/or and CTA 861-G (2016), each of which is incorporated herein by reference in its entirety.

Figure 40:
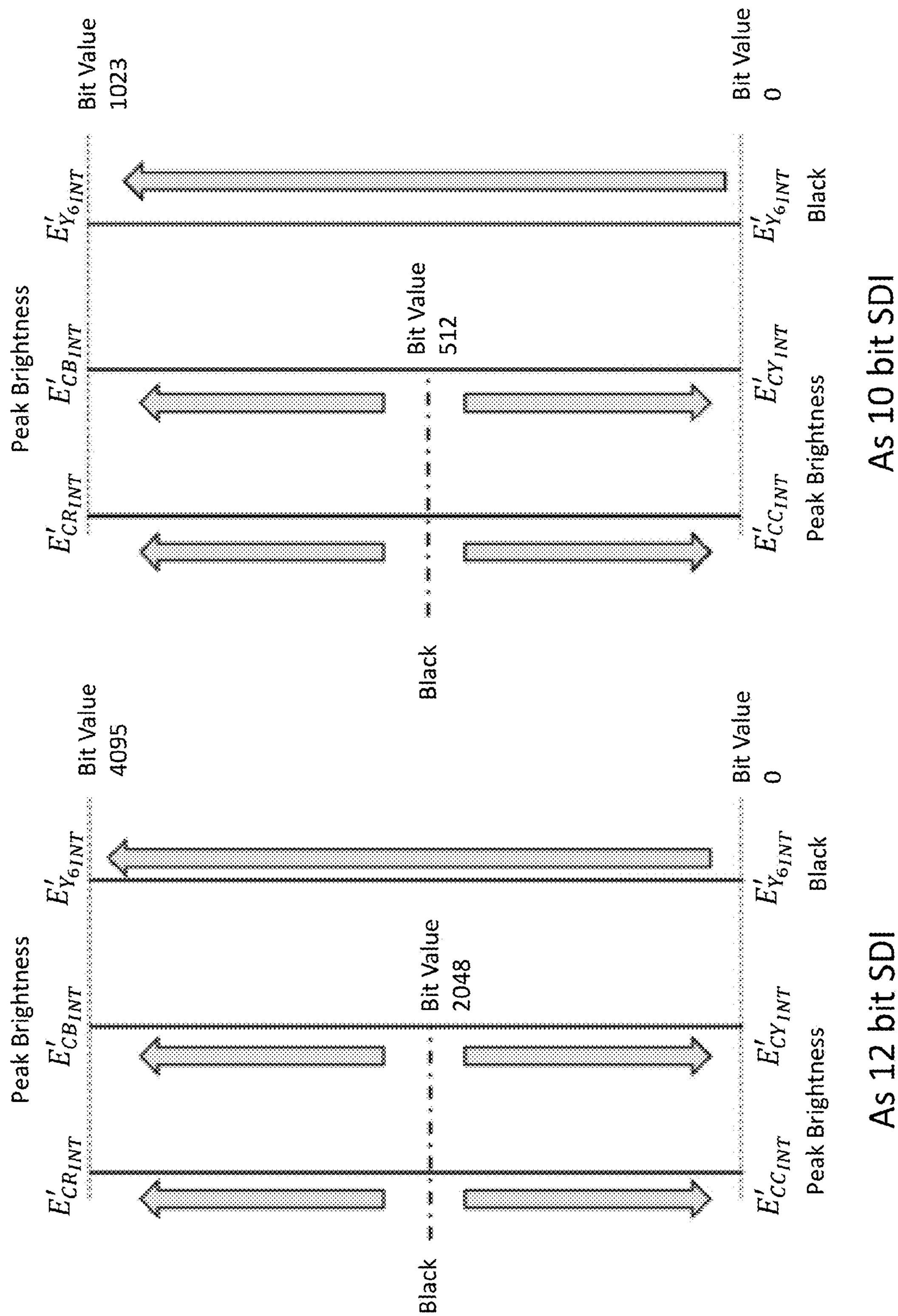
FIG. 40 illustrates one embodiment of an encode process for 4:2:2 video for packaging five channels of information into the standard three-channel designs.

Current practices use a non-constant luminance path design, which is found in all the video systems currently deployed. FIG. 40 illustrates one embodiment of an encode process for 4:2:2 video for packaging five channels of information into the standard three-channel designs. For 4:2:2, a similar method to the 4:4:4 system is used to package five channels of information into the standard three-channel designs used in current serial video standards. FIG. 40 illustrates 12-bit SDI and 10-bit SDI encoding for a 4:2:2 system. TABLE 28 and TABLE 29 list bit assignments for a 12-bit and 10-bit system, respectively. In one embodiment, "Computer" refers to bit assignments compatible with CTA 861-G, November 2016, which is incorporated herein by reference in its entirety. In one embodiment, "Production" and/or "Broadcast" refer to bit assignments compatible with SMPTE ST 2082-0 (2016), SMPTE ST 2082-1 (2015), SMPTE ST 2082-10 (2015), SMPTE ST 2082-11 (2016), SMPTE ST 2082-12 (2016), SMPTE ST 2110-10 (2017), SMPTE ST 2110-20 (2017), SMPTE ST 2110-21 (2017), SMPTE ST 2110-30 (2017), SMPTE ST 2110-31 (2018), and/or SMPTE ST 2110-40 (2018), each of which is incorporated herein by reference in its entirety.

TABLE 28

| 12-Bit Assignments | | | | | | | | | |
|---|---|---|---|---|---|---|---|---|---|
| | Computer | | | Production | | | Broadcast | | |
| | $EY_6$ | $EC_R$, $EC_B$ | $EC_C$, $EC_Y$ | $EY_6$ | $EC_R$, $EC_B$ | $EC_C$, $EC_Y$ | $EY_6$ | $EC_R$, $EC_B$ | $EC_C$, $EC_Y$ |
| Peak Brightness | 4095 | 4095 | 0 | 4076 | 4076 | 16 | 3839 | 3839 | 256 |
| Minimum Brightness | 0 | 2048 | 2047 | 16 | 2052 | 2032 | 256 | 2304 | 1792 |

TABLE 29

| 10-Bit Assignments | | | | | | | | | |
|---|---|---|---|---|---|---|---|---|---|
| | Computer | | | Production | | | Broadcast | | |
| | $EY_6$ | $EC_R$, $EC_B$ | $EC_C$, $EC_Y$ | $EY_6$ | $EC_R$, $EC_B$ | $EC_C$, $EC_Y$ | $EY_6$ | $EC_R$, $EC_B$ | $EC_C$, $EC_Y$ |
| Peak Brightness | 1023 | 1023 | 0 | 1019 | 1019 | 4 | 940 | 940 | 64 |
| Minimum Brightness | 0 | 512 | 511 | 4 | 516 | 508 | 64 | 576 | 448 |

Figure 41:
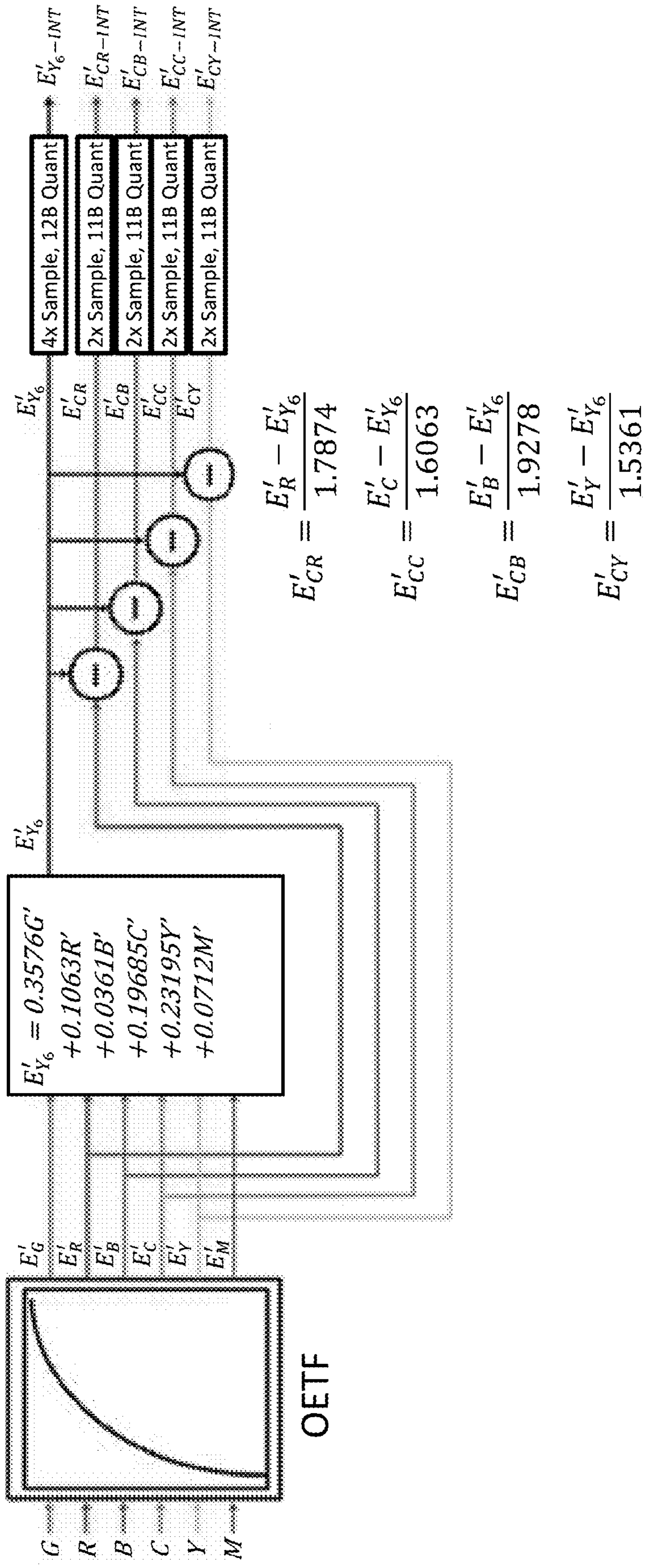
FIG. 41 illustrates one embodiment for a non-constant luminance encode for a six-primary color system.

FIG. 41 illustrates one embodiment for a non-constant luminance encoding process for a six-primary color system. The design of this process is similar to the designs used in current RGB systems. Input video is sent to the Optical Electronic Transfer Function (OETF) process and then to the $E_{Y_6}$ encoder. The output of this encoder includes all of the image detail information. In one embodiment, all of the image detail information is output as a monochrome image.

The output is then subtracted from $E'_R$, $E'_B$, $E'_C$, and $E'_Y$ to make the following color difference components:

$$E'_{CR}, E'_{CB}, E'_{CC}, E'_{CY}$$

These components are then half sampled (x2) while $E'_{Y_6}$ is fully sampled (x4).

Figure 42:
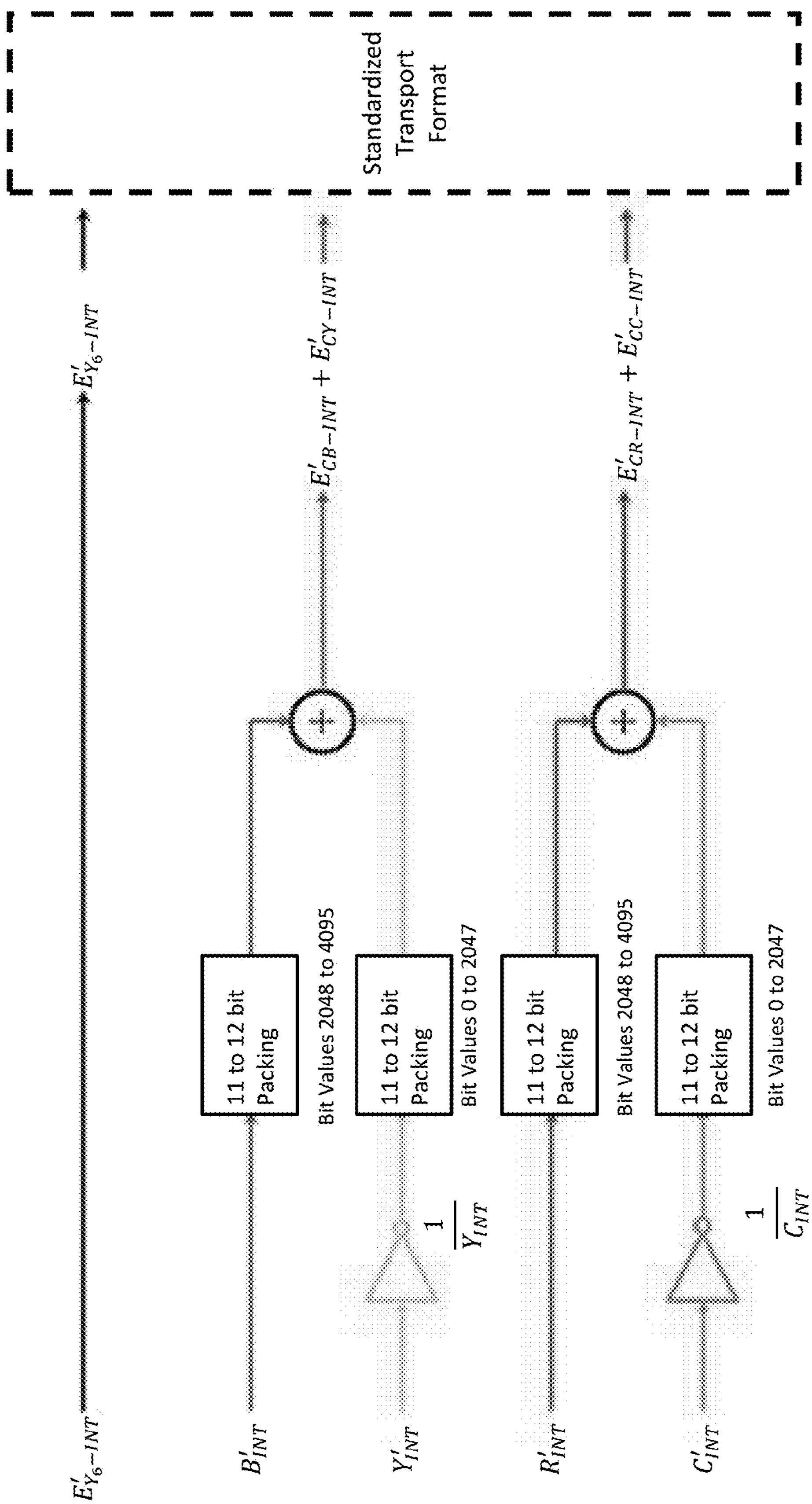
FIG. 42 illustrates one embodiment of a packaging process for a six-primary color system.

FIG. 42 illustrates one embodiment of a packaging process for a six-primary color system. These components are then sent to the packing/stacking process. Components $E'_{CY\text{-}INT}$ and $E'_{CC\text{-}INT}$ are inverted so that bit 0 now defines peak luminance for the corresponding component. In one embodiment, this is the same packaging process performed with the 4:4:4 sampling method design, resulting in two 11-bit components combining into one 12-bit component.

Six-Primary Non-Constant Luminance Decode Using a 4:2:2 Sampling Method

Figure 43:
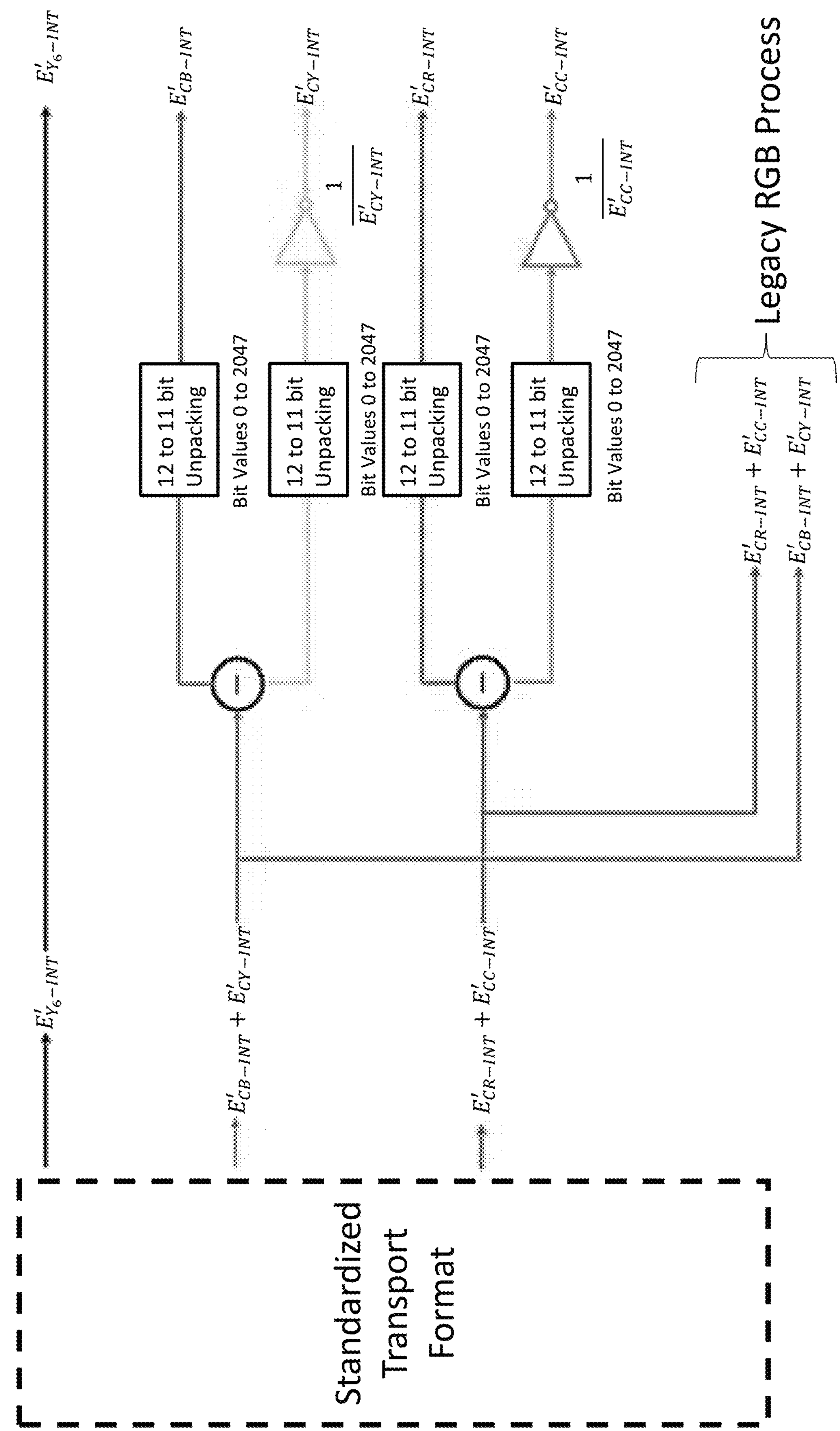
FIG. 43 illustrates a 4:2:2 unstack process for a six-primary color system.

FIG. 43 illustrates a 4:2:2 unstack process for a six-primary color system. In one embodiment, the image data is extracted from the serial format through the normal processes as defined by the serial data format standard. In another embodiment, the serial data format standard uses a 4:2:2 sampling structure. In yet another embodiment, the serial data format standard is SMPTE ST292. The color difference components are separated and formatted back to valid 11-bit data. Components $E'_{CY-INT}$ and $E'_{CC-INT}$ are inverted so that bit value 2047 defines peak color luminance.

Figure 44:
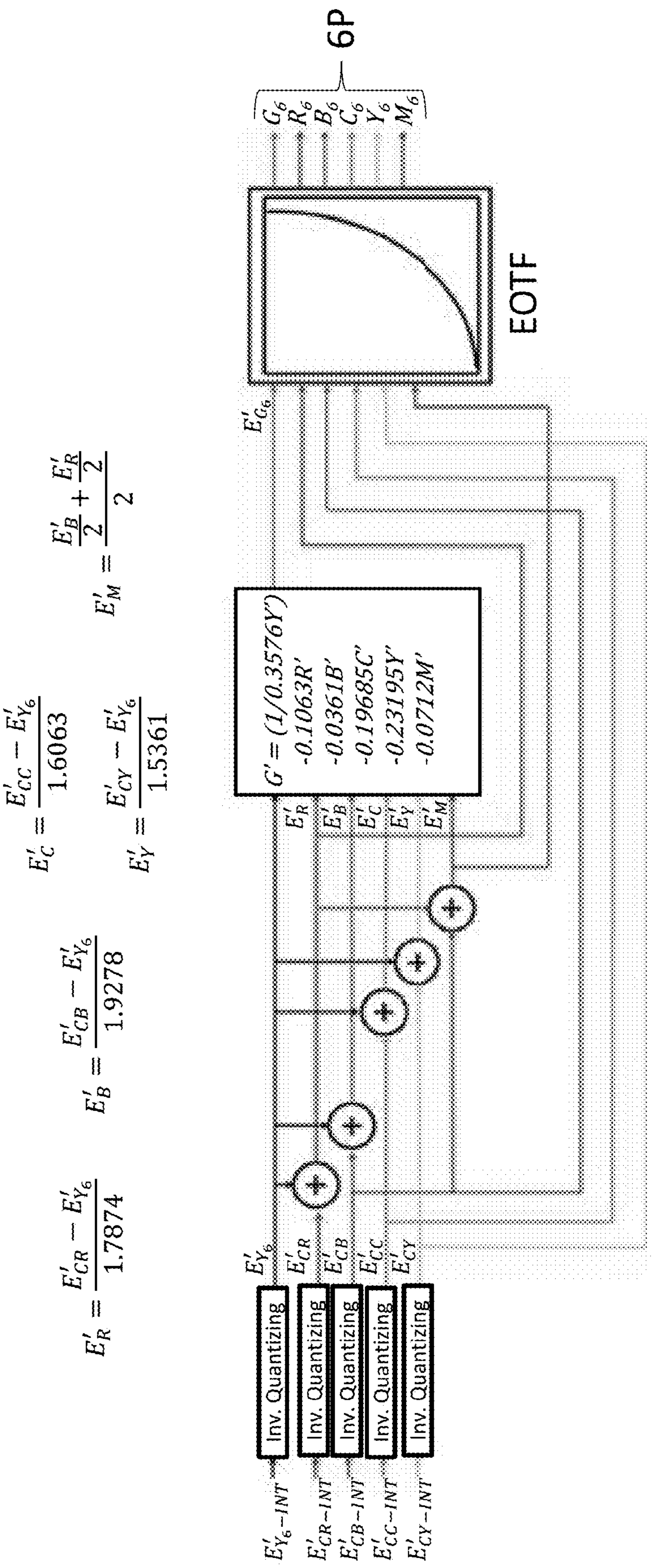
FIG. 44 illustrates one embodiment of a process to inversely quantize each individual color and pass the data through an electronic optical function transfer (EOTF) in a non-constant luminance system.

FIG. 44 illustrates one embodiment of a process to inversely quantize each individual color and pass the data through an electronic optical function transfer (EOTF) in a non-constant luminance system. The individual color components, as well as $E'_{Y_6-INT}$, are inversely quantized and summed to breakout each individual color. Magenta is then calculated and $E'_{Y_6-INT}$ is combined with these colors to resolve green. These calculations then go back through an Electronic Optical Transfer Function (EOTF) process to output the six-primary color system.

In one embodiment, the decoding is 4:2:2 decoding. This decode follows the same principles as the 4:4:4 decoder. However, in 4:2:2 decoding, a luminance channel is used instead of discrete color channels. Here, image data is still taken prior to unstack from the $E'_{CB-INT}+E'_{CY-INT}$ and $E'_{CR-INT}+E'_{CC-INT}$ channels. With a 4:2:2 decoder, a new component, called $E'_{-Y}$, is used to subtract the luminance levels that are present from the CMY channels from the $E'_{CB-INT}+E'_{CY-INT}$ and $E'_{CR-INT}+E'_{CC-INT}$ components. The resulting output is now the R and B image components of the EOTF process. $E'_{-Y}$ is also sent to the G matrix to convert the luminance and color difference components to a green output. Thus, R'G'B' is input to the EOTF process and output as $G_{RGB}$, $R_{RGB}$, and $B_{RGB}$. In another embodiment, the decoder is a legacy RGB decoder for non-constant luminance systems.

In one embodiment, the standard is SMPTE ST292. In one embodiment, the standard is SMPTE RP431-2. In one embodiment, the standard is ITU-R BT.2020. In another embodiment, the standard is SMPTE RP431-1. In another embodiment, the standard is ITU-R BT.1886. In another embodiment, the standard is SMPTE ST274. In another embodiment, the standard is SMPTE ST296. In another embodiment, the standard is SMPTE ST2084. In yet another embodiment, the standard is ITU-R BT.2100. In yet another embodiment, the standard is SMPTE ST424. In yet another embodiment, the standard is SMPTE ST425. In yet another embodiment, the standard is SMPTE ST2110.

Six-Primary Constant Luminance Decode Using a 4:2:2 Sampling Method

Figure 45:
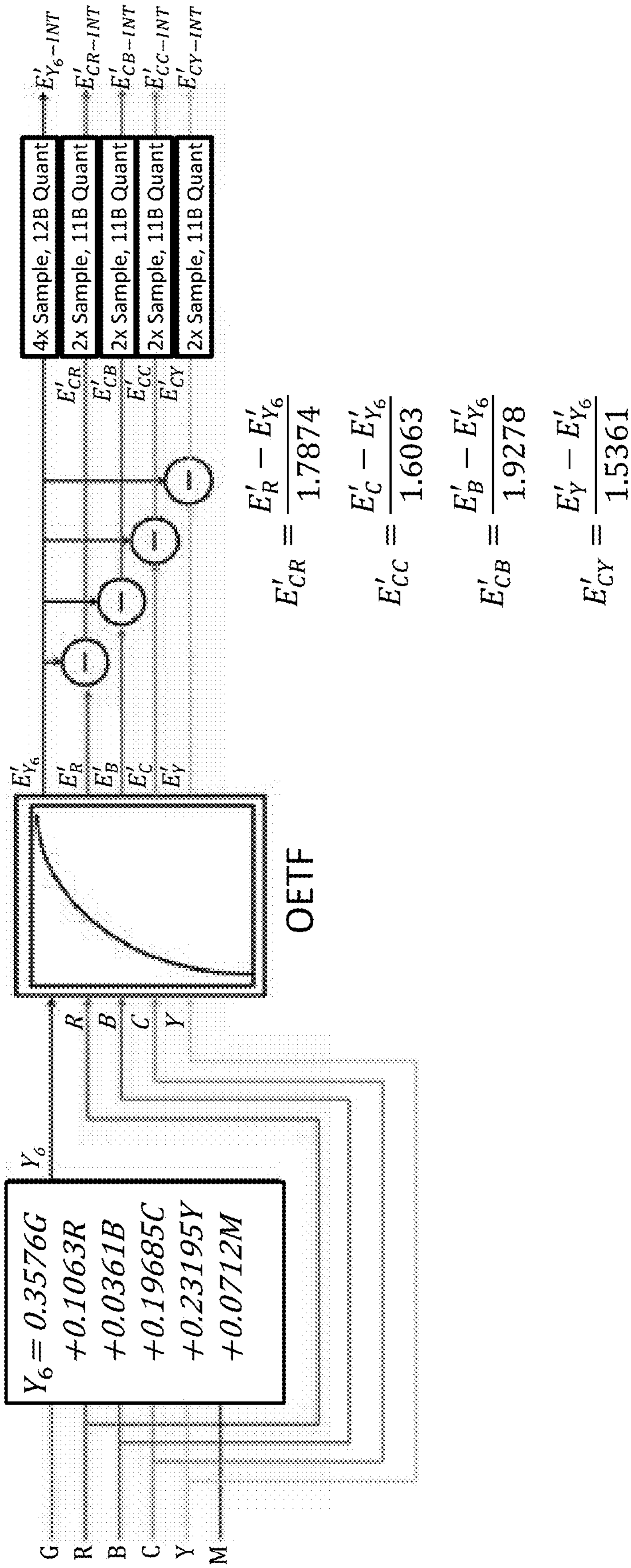
FIG. 45 illustrates one embodiment of a constant luminance encode for a six-primary color system.
Figure 46:
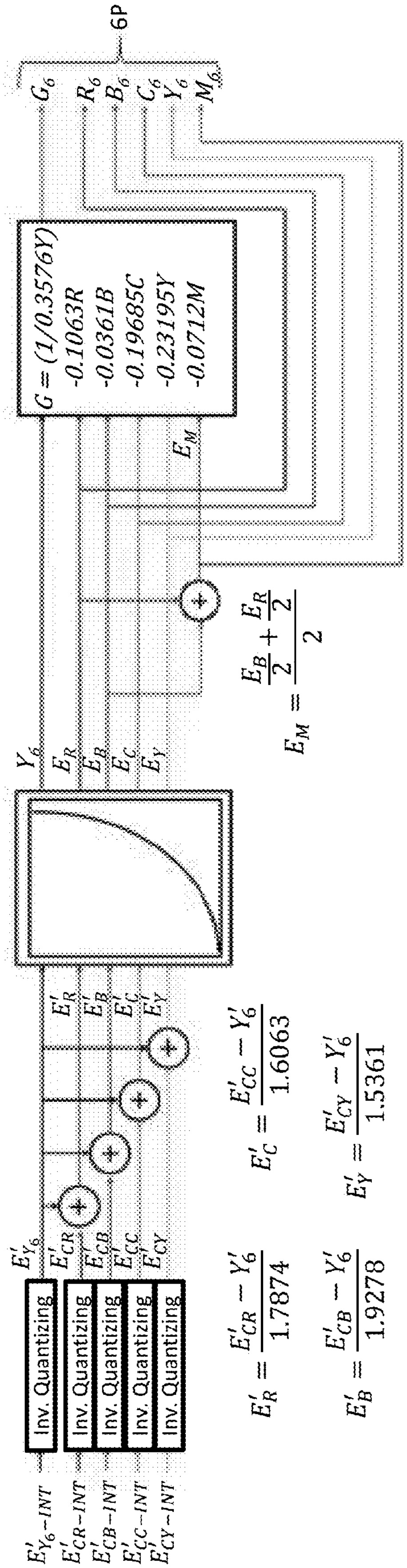
FIG. 46 illustrates one embodiment of a constant luminance decode for a six-primary color system.

FIG. 45 illustrates one embodiment of a constant luminance encode for a six-primary color system. FIG. 46 illustrates one embodiment of a constant luminance decode for a six-primary color system. The process for constant luminance encode and decode are very similar. The main difference being that the management of $E_{y_6}$ is linear. The encode and decode processes stack into the standard serial data streams in the same way as is present in a non-constant luminance, six-primary color system. In one embodiment, the stacker design is the same as with the non-constant luminance system.

System 2 operation is using a sequential method of mapping to the standard transport instead of the method in System 1 where pixel data is combined to two color primaries in one data set as an 11-bit word. The advantage of System 1 is that there is no change to the standard transport. The advantage of System 2 is that full bit level video is operable to be transported, but at double the normal data rate.

The difference between the systems is the use of two Y channels in System 2. In one embodiment, $Y_{RGB}$ and $Y_{CMY}$ are used to define the luminance value for RGB as one group and CMY for the other. Alternative primaries are compatible with the present invention.

Figure 47:
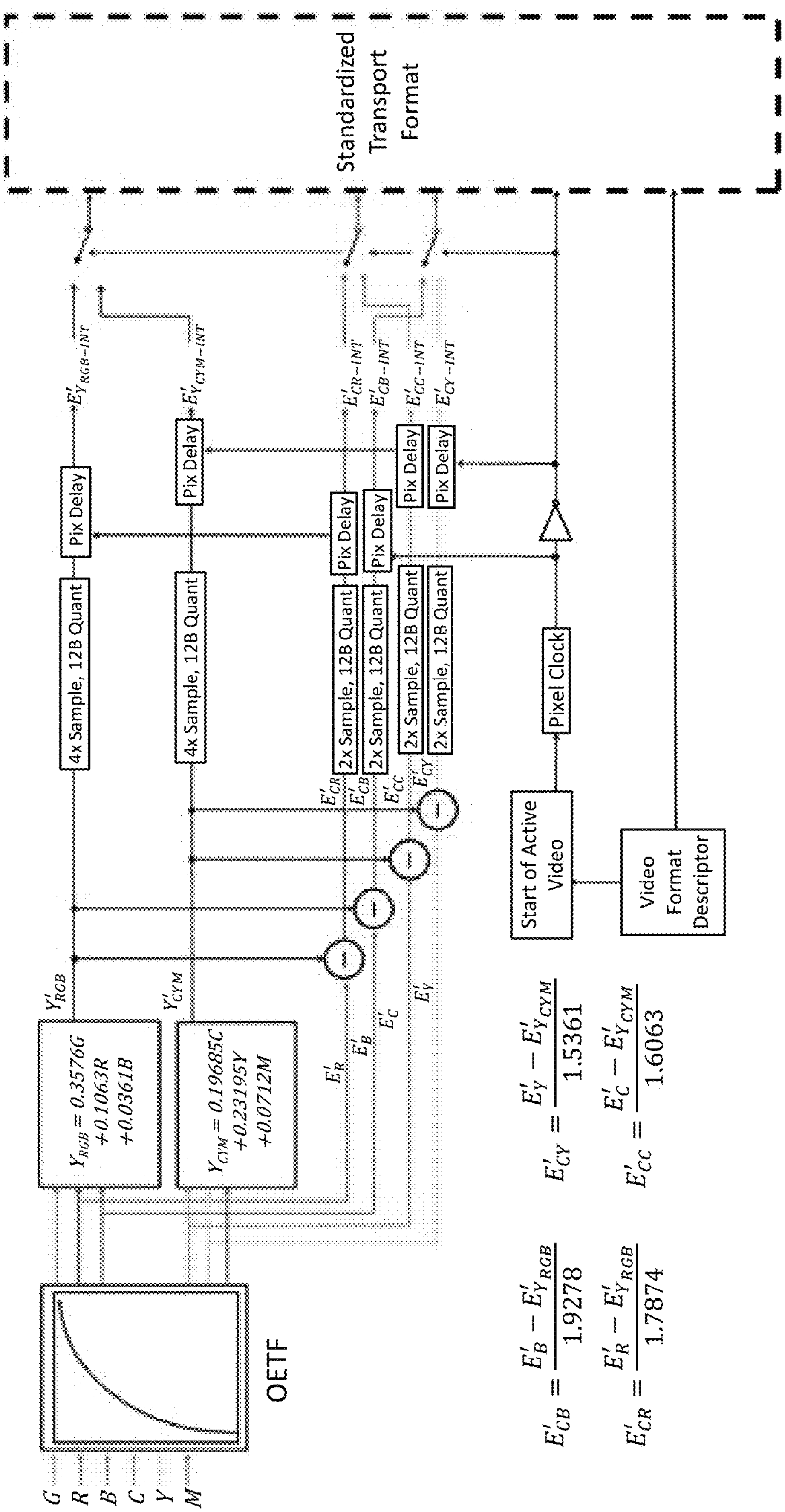
FIG. 47 illustrates one example of 4:2:2 non-constant luminance encoding.

FIG. 47 illustrates one example of 4:2:2 non-constant luminance encoding. Because the RGB and CMY components are mapped at different time intervals, there is no requirement for a stacking process and data is fed directly to the transport format. The development of the separate color difference components is identical to System 1. Alternative primaries are compatible with the present invention.

The encoder for System 2 takes the formatted color components in the same way as System 1. Two matrices are used to build two luminance channels. $Y_{RGB}$ contains the luminance value for the RGB color primaries. $Y_{CMY}$ contains the luminance value for the CMY color primaries. A set of delays are used to sequence the proper channel for $Y_{RGB}$, $Y_{CMY}$, and the RBCY channels. Because the RGB and non-RGB (e.g., CMY) components are mapped at different time intervals, there is no requirement for a stacking process, and data is fed directly to the transport format. The development of the separate color difference components is identical to System 1. The Encoder for System 2 takes the formatted color components in the same way as System 1. Two matrices are used to build two luminance channels: $Y_{RGB}$ contains the luminance value for the RGB color primaries and $Y_{CMY}$ contains the luminance value for the CMY color primaries. This sequences $Y_{RGB}$, CR, and CC channels into the even segments of the standardized transport and $Y_{CMY}$, CB, and CY into the odd numbered segments. Since there is no combining color primary channels, full bit levels are operable to be used limited only by the design of the standardized transport method. In addition, for use in matrix driven displays, there is no change to the input processing and only the method of outputting the correct color is required if the filtering or emissive subpixel is also placed sequentially.

Timing for the sequence is calculated by the source format descriptor which then flags the start of video and sets the pixel timing.

Figure 48:
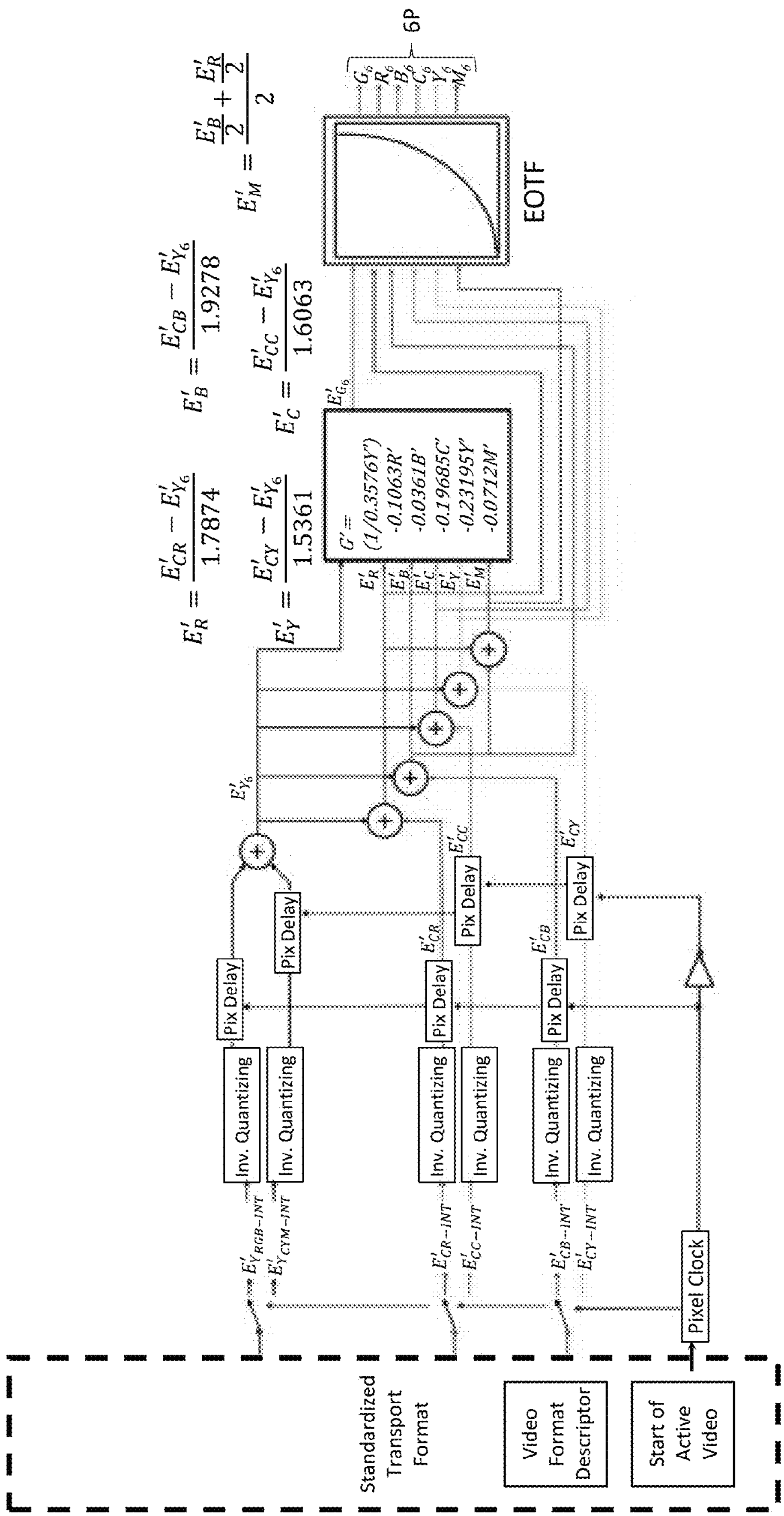
FIG. 48 illustrates one embodiment of a non-constant luminance decoding system.

FIG. 48 illustrates one embodiment of a non-constant luminance decoding system. Decoding uses timing synchronization from the format descriptor and start of video flags that are included in the payload ID, SDP, or EDID tables. This starts the pixel clock for each horizontal line to identify which set of components are routed to the proper part of the decoder. A pixel delay is used to realign the color primarily data of each subpixel. $Y_{RGB}$ and $Y_{CMY}$ are combined to assemble a new $Y_6$ component which is used to decode the CR, CB, CC, CY, and CM components into RGBCMY.

Figure 49:
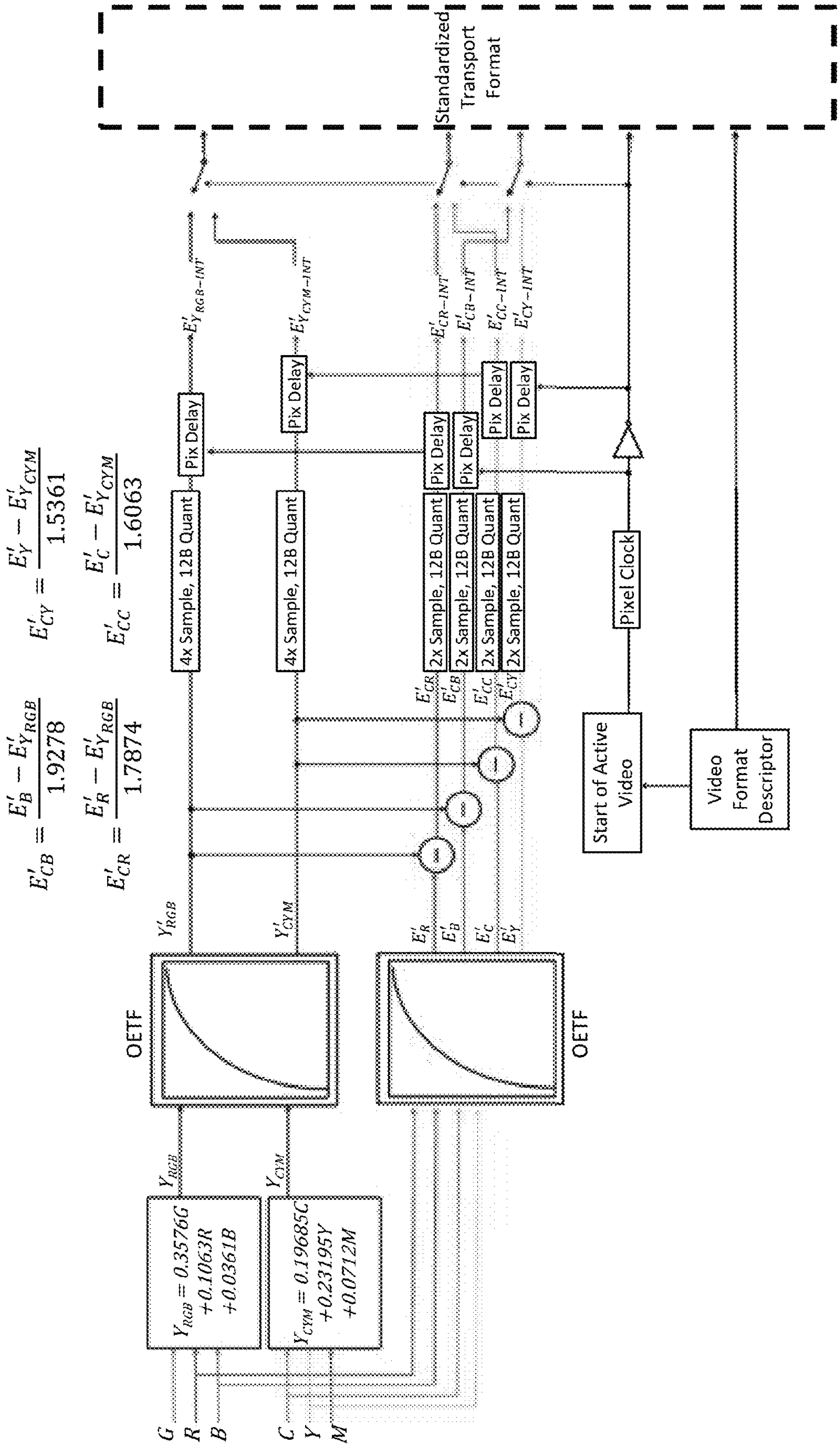
FIG. 49 illustrates one embodiment of a 4:2:2 constant luminance encoding system.
Figure 50:
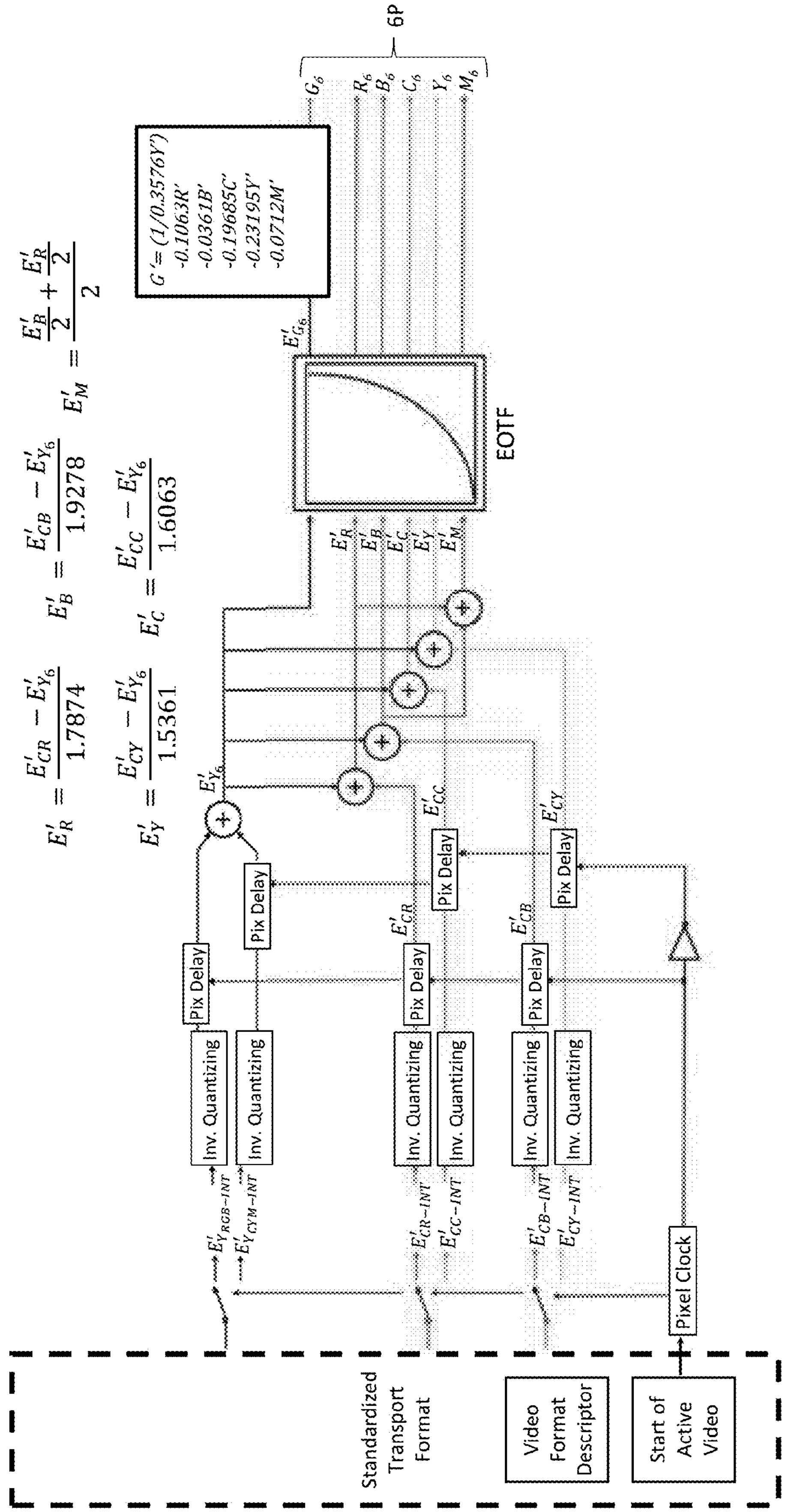
FIG. 50 illustrates one embodiment of a 4:2:2 constant luminance decoding system.

The constant luminance system is not different from the non-constant luminance system in regard to operation. The difference is that the luminance calculation is done as a linear function instead of including the OOTF. FIG. 49 illustrates one embodiment of a 4:2:2 constant luminance encoding system. FIG. 50 illustrates one embodiment of a 4:2:2 constant luminance decoding system.

Six-Primary Color System Using a 4:2:0 Sampling System

In one embodiment, the six-primary color system uses a 4:2:0 sampling system. The 4:2:0 format is widely used in H.262/MPEG-2, H.264/MPEG-4 Part 10 and VC-1 compression. The process defined in SMPTE RP2050-1 provides a direct method to convert from a 4:2:2 sample structure to a 4:2:0 structure. When a 4:2:0 video decoder and encoder are connected via a 4:2:2 serial interface, the 4:2:0 data is decoded and converted to 4:2:2 by up-sampling the color difference component. In the 4:2:0 video encoder, the 4:2:2 video data is converted to 4:2:0 video data by down-sampling the color difference component.

There typically exists a color difference mismatch between the 4:2:0 video data from the 4:2:0 video data to be encoded. Several stages of codec concatenation are common through the processing chain. As a result, color difference signal mismatch between 4:2:0 video data input to 4:2:0 video encoder and 4:2:0 video output from 4:2:0 video decoder is accumulated and the degradation becomes visible.

Filtering within a Six-Primary Color System Using a 4:2:0 Sampling Method

When a 4:2:0 video decoder and encoder are connected via a serial interface, 4:2:0 data is decoded and the data is converted to 4:2:2 by up-sampling the color difference component, and then the 4:2:2 video data is mapped onto a serial interface. In the 4:2:0 video encoder, the 4:2:2 video data from the serial interface is converted to 4:2:0 video data by down-sampling the color difference component. At least one set of filter coefficients exists for 4:2:0/4:2:2 up-sampling and 4:2:2/4:2:0 down-sampling. The at least one set of filter coefficients provide minimally degraded 4:2:0 color difference signals in concatenated operations.

Filter Coefficients in a Six-Primary Color System Using a 4:2:0 Sampling Method

Figure 51:
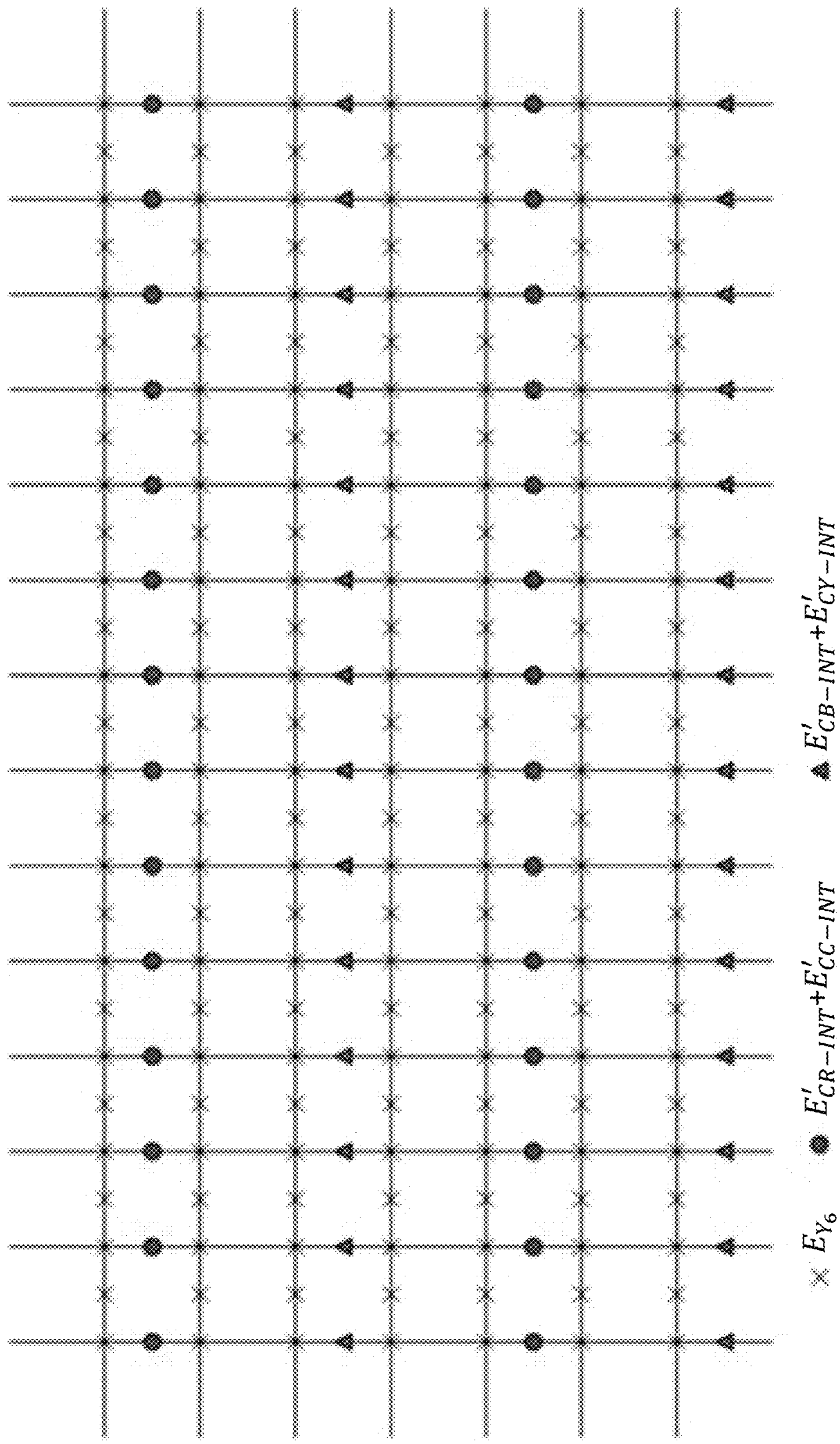
FIG. 51 illustrates a raster encoding diagram of sample placements for a six-primary color system.

FIG. 51 illustrates one embodiment of a raster encoding diagram of sample placements for a six-primary color 4:2:0 progressive scan system. Within this compression process, horizontal lines show the raster on a display matrix. Vertical lines depict drive columns. The intersection of these is a pixel calculation. Data around a particular pixel is used to calculate color and brightness of the subpixels. Each "X" shows placement timing of the $E_{Y_6\text{-}INT}$ sample. Red dots depict placement of the $E'_{CR\text{-}INT}+E'_{CC\text{-}INT}$ sample. Blue triangles show placement of the $E'_{CB\text{-}INT}+E'_{CY\text{-}INT}$ sample.

In one embodiment, the raster is an RGB raster. In another embodiment, the raster is a RGBCMY raster.

Six-Primary Color System Backwards Compatibility

By designing the color gamut within the saturation levels of standard formats and using inverse color primary positions, it is easy to resolve an RGB image with minimal processing. In one embodiment for six-primary encoding, image data is split across three color channels in a transport system. In one embodiment, the image data is read as six-primary data. In another embodiment, the image data is read as RGB data. By maintaining a standard white point, the axis of modulation for each channel is considered as values describing two colors (e.g., blue and yellow) for a six-primary system or as a single color (e.g., blue) for an RGB system. This is based on where black is referenced. In one embodiment of a six-primary color system, black is decoded at a mid-level value. In an RGB system, the same data stream is used, but black is referenced at bit zero, not a mid-level.

In one embodiment, the RGB values encoded in the 6P stream are based on ITU-R BT.709. In another embodiment, the RGB values encoded are based on SMPTE RP431. Advantageously, these two embodiments require almost no processing to recover values for legacy display.

Two decoding methods are proposed. The first is a preferred method that uses very limited processing, negating any issues with latency. The second is a more straightforward method using a set of matrices at the end of the signal path to conform the 6P image to RGB.

In one embodiment, the decoding is for a 4:4:4 system. In one embodiment, the assumption of black places the correct data with each channel. If the 6P decoder is in the signal path, 11-bit values for RGB are arranged above bit value 2048, while CMY level are arranged below bit value 2047 as 11-bit. However, if this same data set is sent to a display or process that is does not understand 6P processing, then that image data is assumed as black at bit value 0 as a full 12-bit word.

Figure 52:
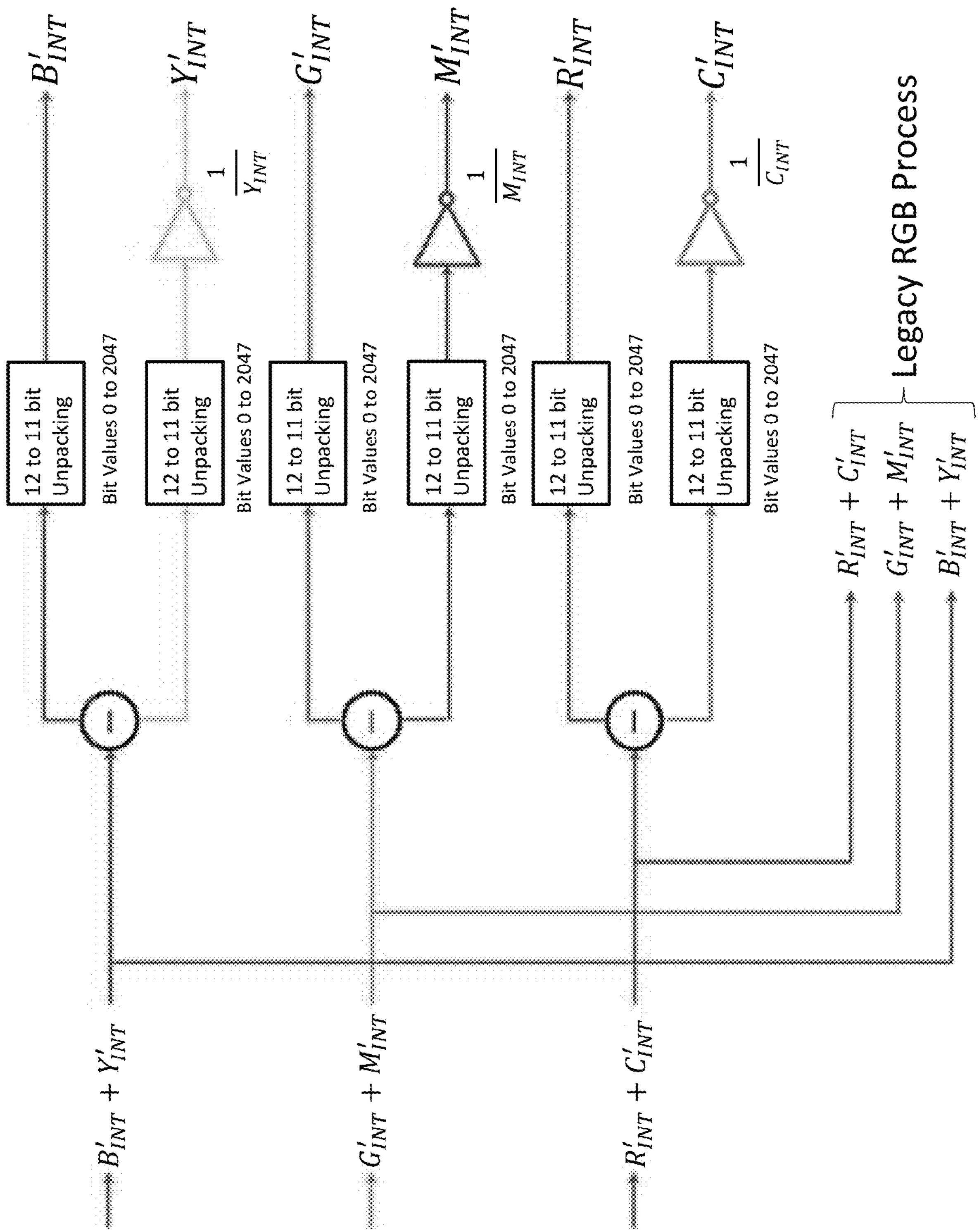
FIG. 52 illustrates one embodiment of the six-primary color unstack process in a 4:2:2 video system.
Figure 53:
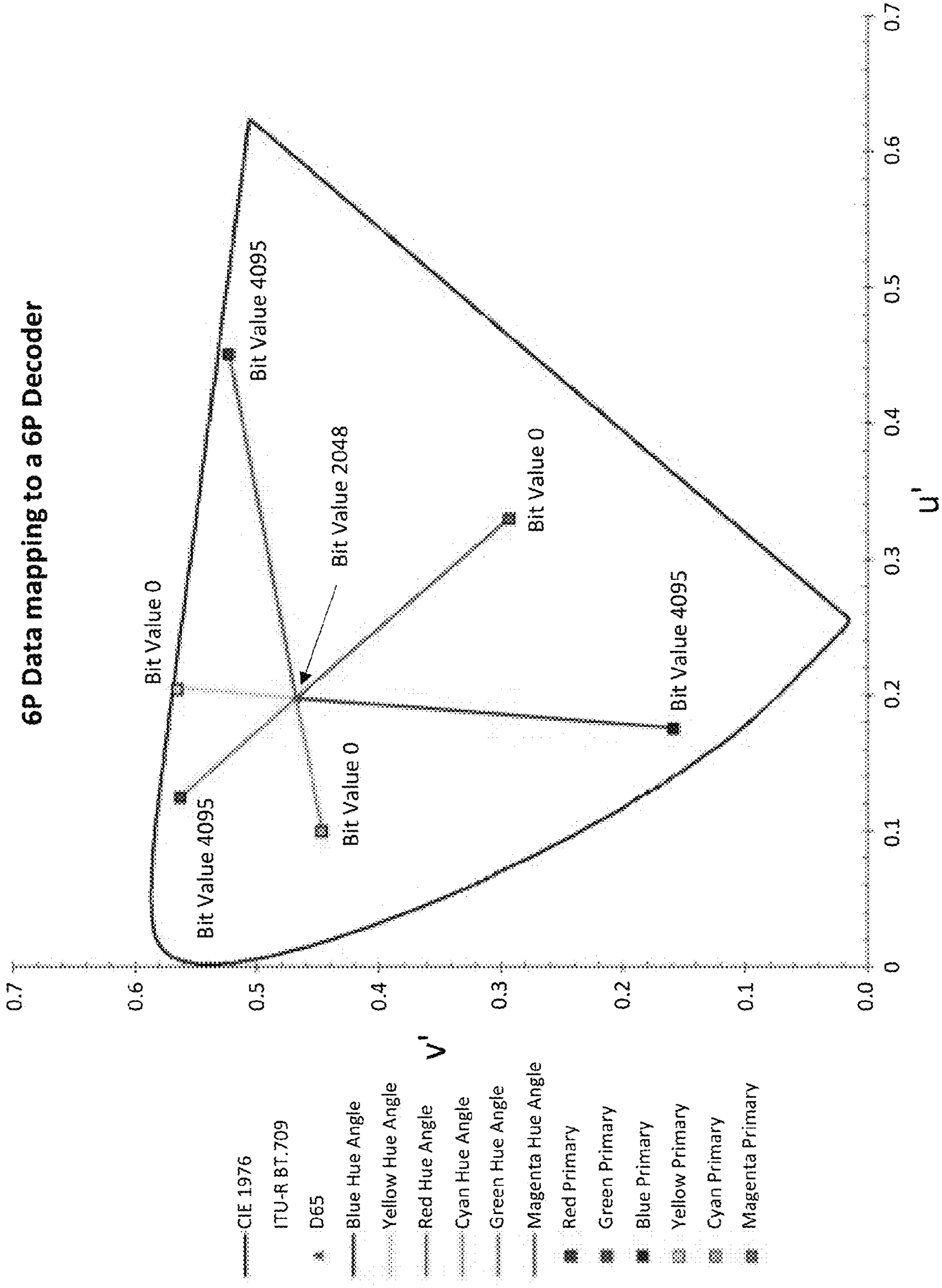
FIG. 53 illustrates one embodiment of mapping input to the six-primary color system unstack process.
Figure 54:
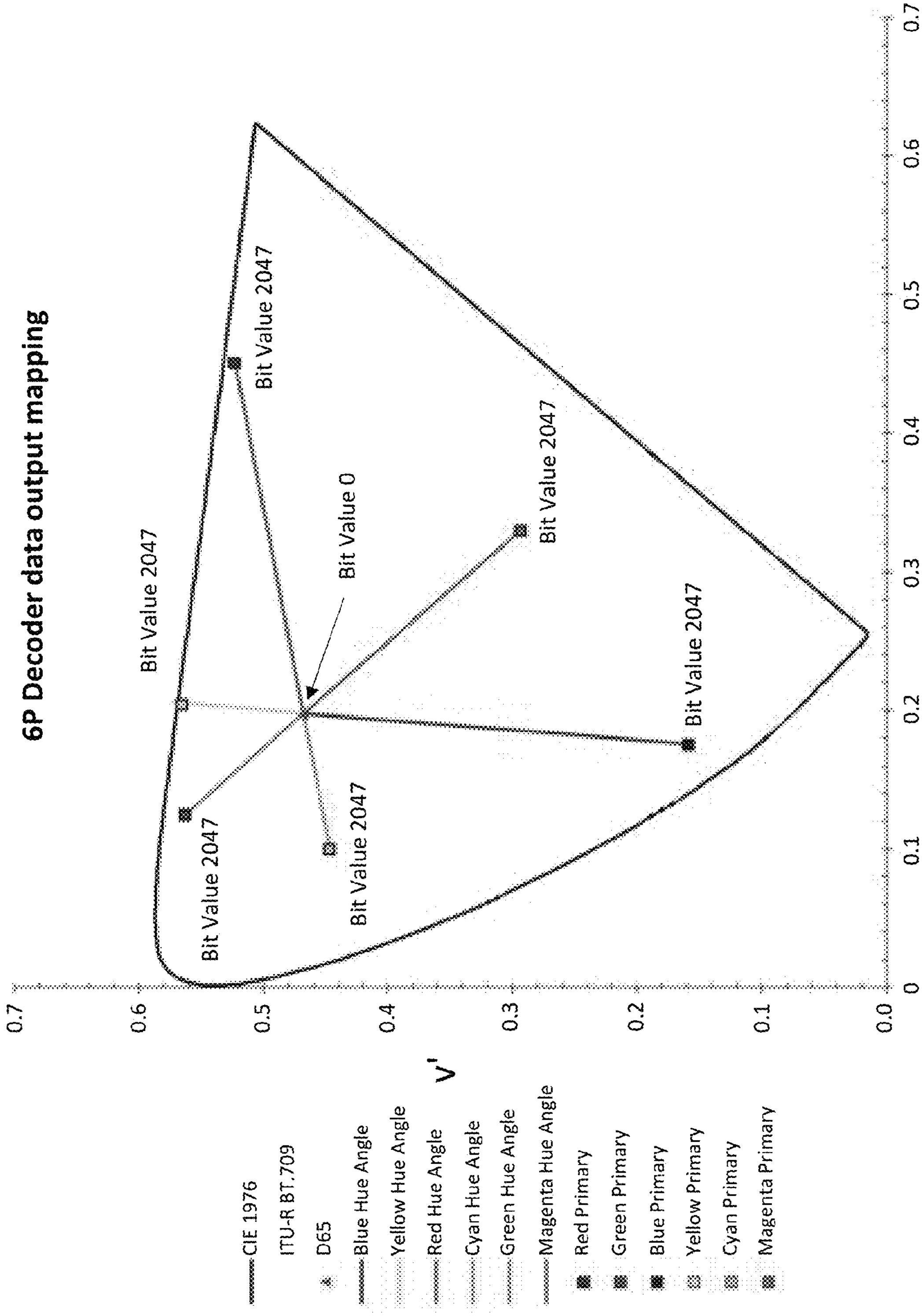
FIG. 54 illustrates one embodiment of mapping the output of a six-primary color system decoder.
Figure 55:
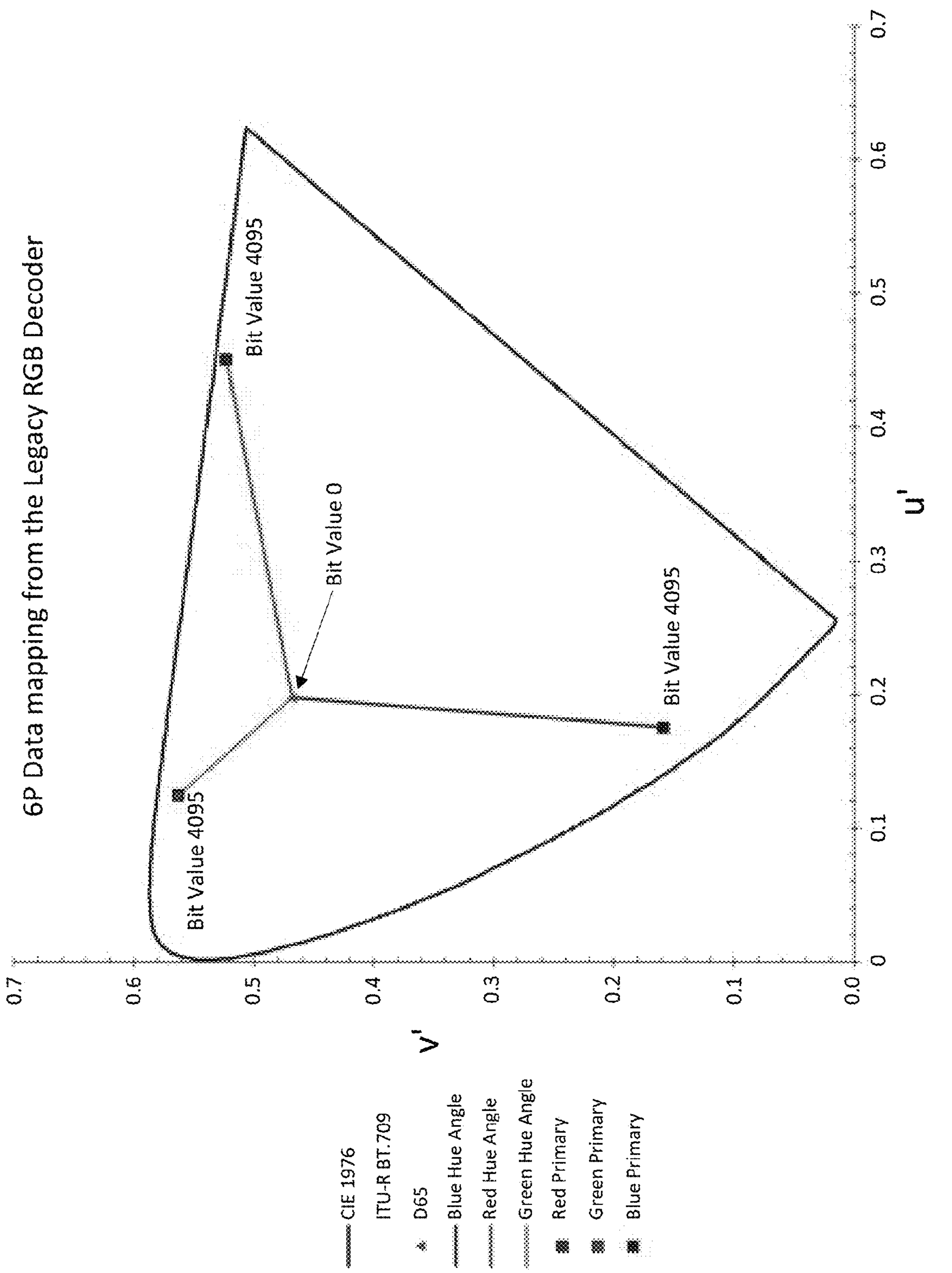
FIG. 55 illustrates one embodiment of mapping the RGB decode for a six-primary color system.

FIG. 52 illustrates one embodiment of the six-primary color unstack process in a 4:2:2 video system. Decoding starts by tapping image data prior to the unstacking process. The input to the 6P unstack will map as shown in FIG. 53. The output of the 6P decoder will map as shown in FIG. 54. This same data is sent uncorrected as the legacy RGB image data. The interpretation of the RGB decode will map as shown in FIG. 55.

Figure 56:
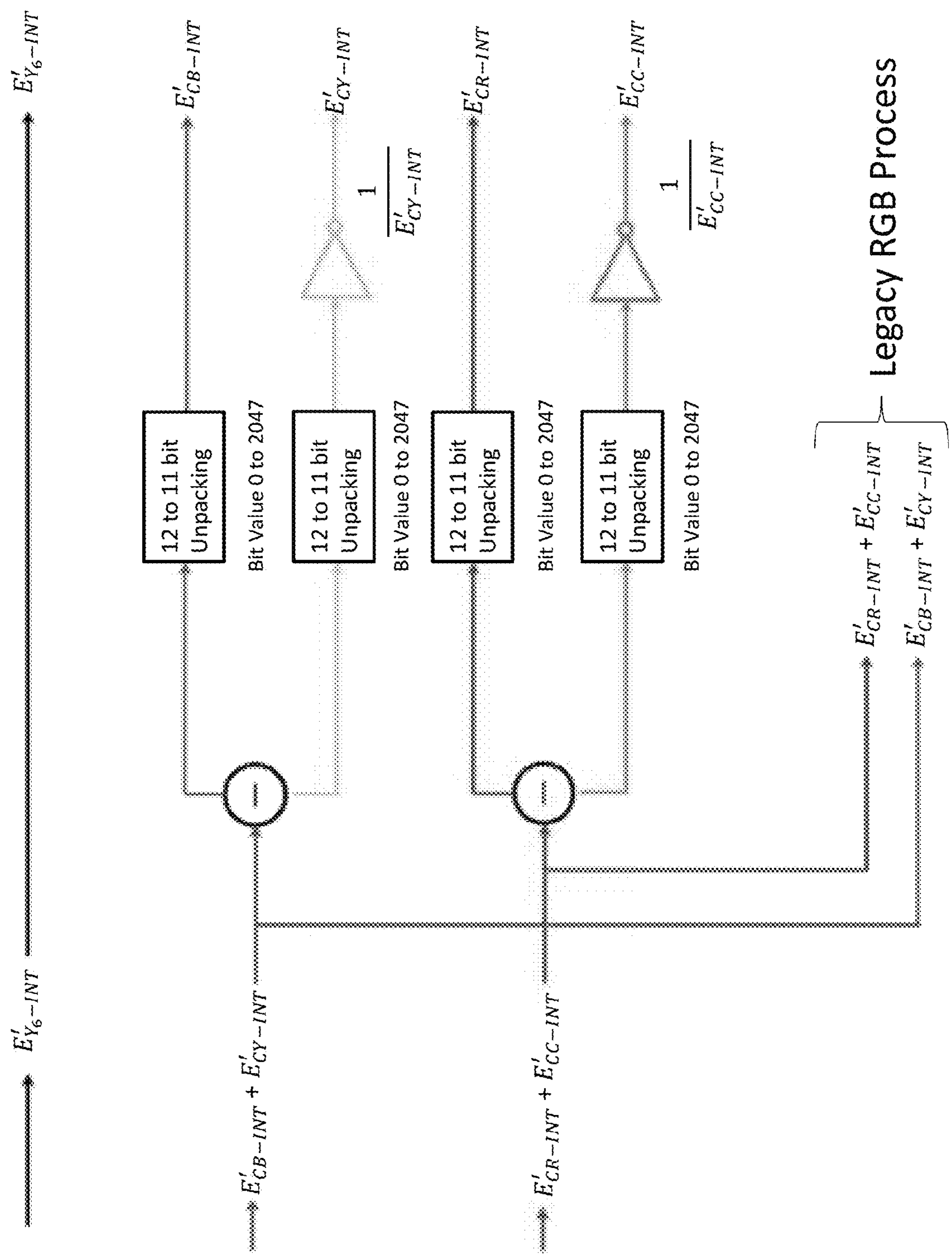
FIG. 56 illustrates one embodiment of an unstack system for a six-primary color system.

Alternatively, the decoding is for a 4:2:2 system. This decode uses the same principles as the 4:4:4 decoder, but because a luminance channel is used instead of discrete color channels, the processing is modified. Legacy image data is still taken prior to unstack from the $E'_{CB\text{-}INT}+E'_{CY\text{-}INT}$ and $E'_{CR\text{-}INT}+E'_{CC\text{-}INT}$ channels as shown in FIG. 56.

Figure 57:
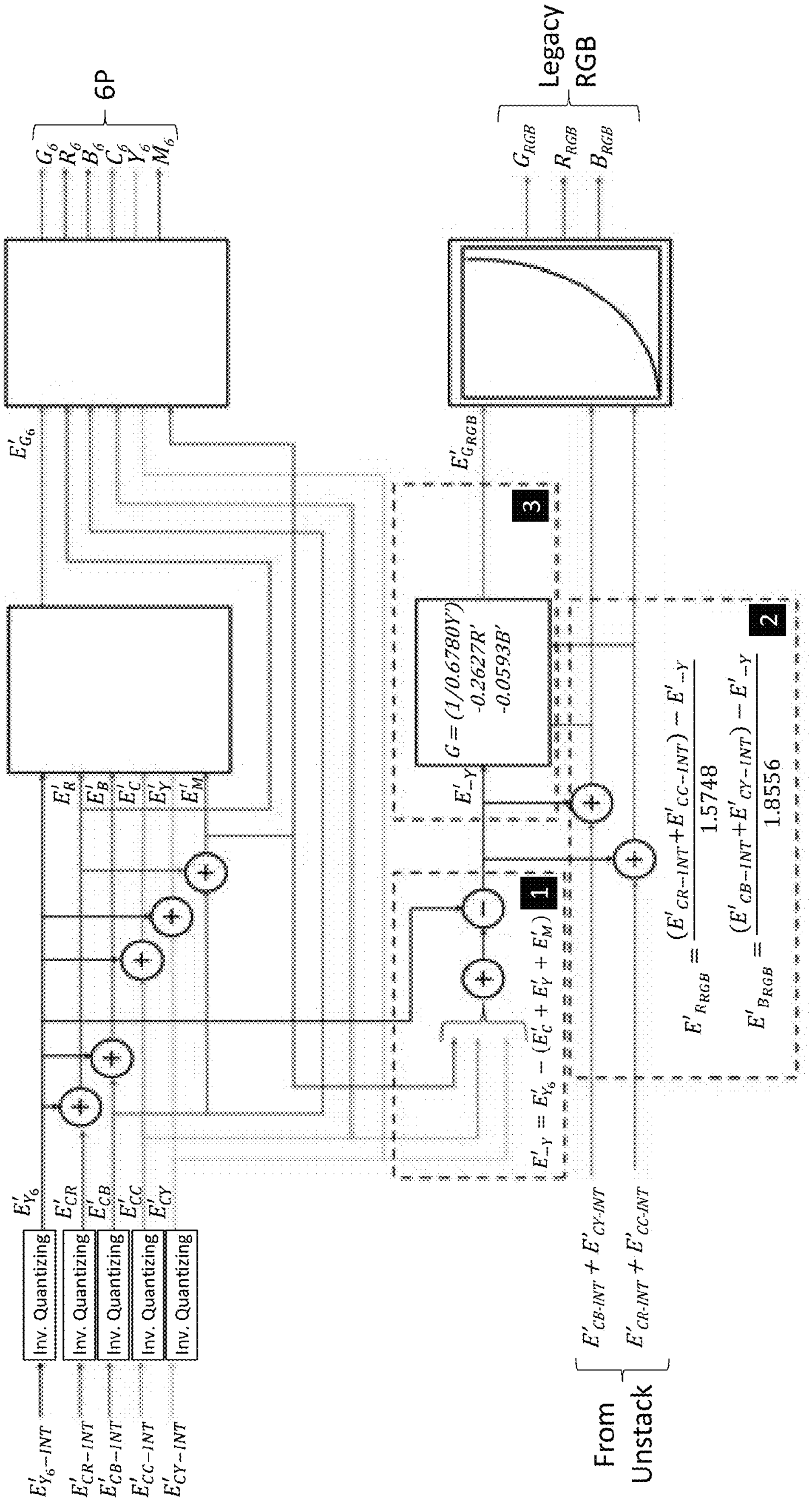
FIG. 57 illustrates one embodiment of a legacy RGB decoder for a six-primary, non-constant luminance system.

FIG. 57 illustrates one embodiment of a non-constant luminance decoder with a legacy process. The dotted box marked (1) shows the process where a new component called $E'_{-Y}$ is used to subtract the luminance levels that are present from the CMY channels from the $E'_{CB\text{-}INT}+E'_{CY\text{-}INT}$ and $E'_{CR\text{-}INT}+E'_{CC\text{-}INT}$ components as shown in box (2). The resulting output is now the R and B image components of the EOTF process. $E'_{-Y}$ is also sent to the G matrix to convert the luminance and color difference components to a green output as shown in box (3). Thus, R'G'B' is input to the EOTF process and output as $G_{RGB}$, $R_{RGB}$, and $B_{RGB}$. In another embodiment, the decoder is a legacy RGB decoder for non-constant luminance systems.

Figure 58:
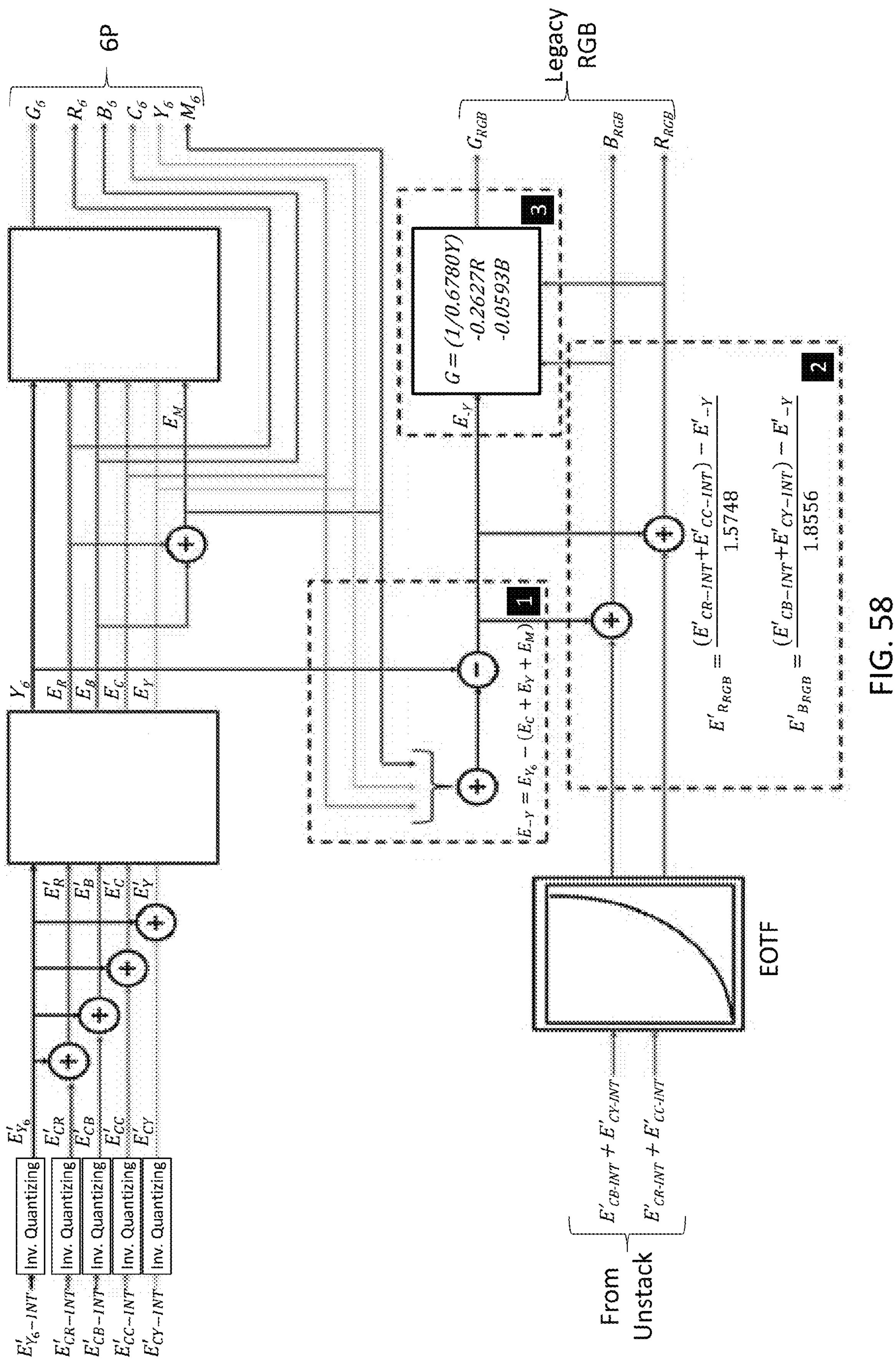
FIG. 58 illustrates one embodiment of a legacy RGB decoder for a six-primary, constant luminance system.

For a constant luminance system, the process is very similar with the exception that green is calculated as linear as shown in FIG. 58.

Six-Primary Color System Using a Matrix Output

Figure 59:
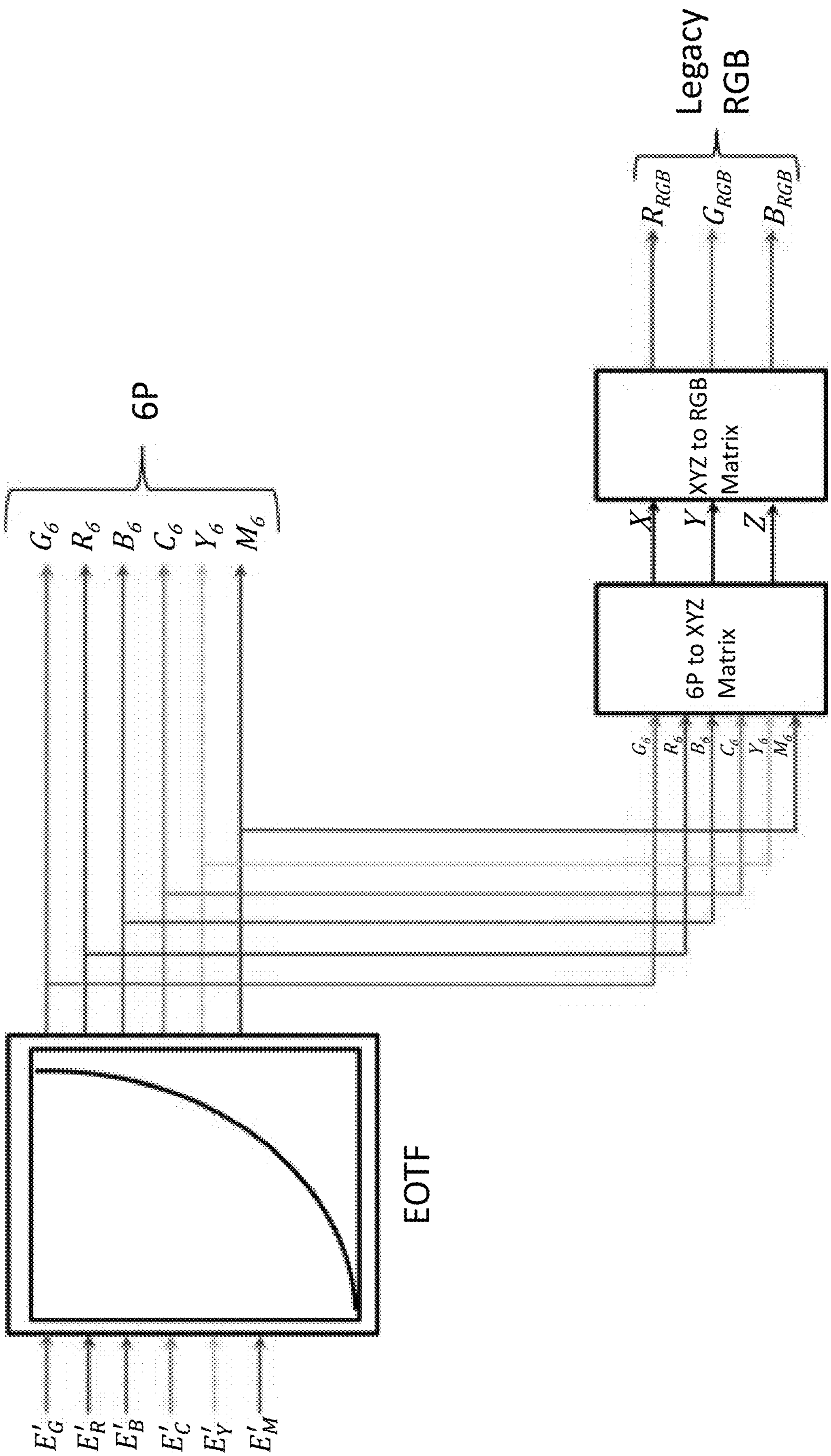
FIG. 59 illustrates one embodiment of a six-primary color system with output to a legacy RGB system.

In one embodiment, the six-primary color system outputs a legacy RGB image. This requires a matrix output to be built at the very end of the signal path. FIG. 59 illustrates one embodiment of a legacy RGB image output at the end of the signal path. The design logic of the C, M, and Y primaries is in that they are substantially equal in saturation and placed at substantially inverted hue angles compared to R, G, and B primaries, respectively. In one embodiment, substantially equal in saturation refers to a ±10% difference in saturation values for the C, M, and Y primaries in comparison to saturation values for the R, G, and B primaries, respectively. In addition, substantially equal in saturation covers additional percentage differences in saturation values falling within the ±10% difference range. For example, substantially equal in saturation further covers a ±7.5% difference in saturation values for the C, M, and Y primaries in comparison to the saturation values for the R, G, and B primaries, respectively; a ±5% difference in saturation values for the C, M, and Y primaries in comparison to the saturation values for the R, G, and B primaries, respectively; a ±2% difference in saturation values for the C, M, and Y primaries in comparison to the saturation values for the R, G, and B primaries, respectively; a ±1% difference in saturation values for the C, M, and Y primaries in comparison to the saturation values for the R, G, and B primaries, respectively; and/or a ±0.5% difference in saturation values for the C, M, and Y primaries in comparison to the saturation values for the R, G, and B primaries, respectively. In a preferred embodiment, the C, M, and Y primaries are equal in saturation to the R, G, and B primaries, respectively. For example, the cyan primary is equal in saturation to the red primary, the magenta primary is equal in saturation to the green primary, and the yellow primary is equal in saturation to the blue primary.

In an alternative embodiment, the saturation values of the C, M, and Y primaries are not required to be substantially equal to their corollary primary saturation value among the R, G, and B primaries, but are substantially equal in saturation to a primary other than their corollary R, G, or B primary value. For example, the C primary saturation value is not required to be substantially equal in saturation to the R primary saturation value, but rather is substantially equal in saturation to the G primary saturation value and/or the B primary saturation value. In one embodiment, two different color saturations are used, wherein the two different color saturations are based on standardized gamuts already in use.

In one embodiment, substantially inverted hue angles refers to a ±10% angle range from an inverted hue angle (e.g., 180 degrees). In addition, substantially inverted hue angles cover additional percentage differences within the ±10% angle range from an inverted hue angle. For example, substantially inverted hue angles further covers a ±7.5% angle range from an inverted hue angle, a ±5% angle range from an inverted hue angle, a ±2% angle range from an inverted hue angle, a ±1% angle range from an inverted hue angle, and/or a ±0.5% angle range from an inverted hue angle. In a preferred embodiment, the C, M, and Y primaries are placed at inverted hue angles (e.g., 180 degrees) compared to the R, G, and B primaries, respectively.

In one embodiment, the gamut is the ITU-R BT.709-6 gamut. In another embodiment, the gamut is the SMPTE RP431-2 gamut.

The unstack process includes output as six, 11-bit color channels that are separated and delivered to a decoder. To convert an image from a six-primary color system to an RGB image, at least two matrices are used. One matrix is a 3×3 matrix converting a six-primary color system image to XYZ values. A second matrix is a 3×3 matrix for converting from XYZ to the proper RGB color space. In one embodiment, XYZ values represent additive color space values, where XYZ matrices represent additive color space matrices. Additive color space refers to the concept of describing a color by stating the amounts of primaries that, when combined, create light of that color.

Figure 60:
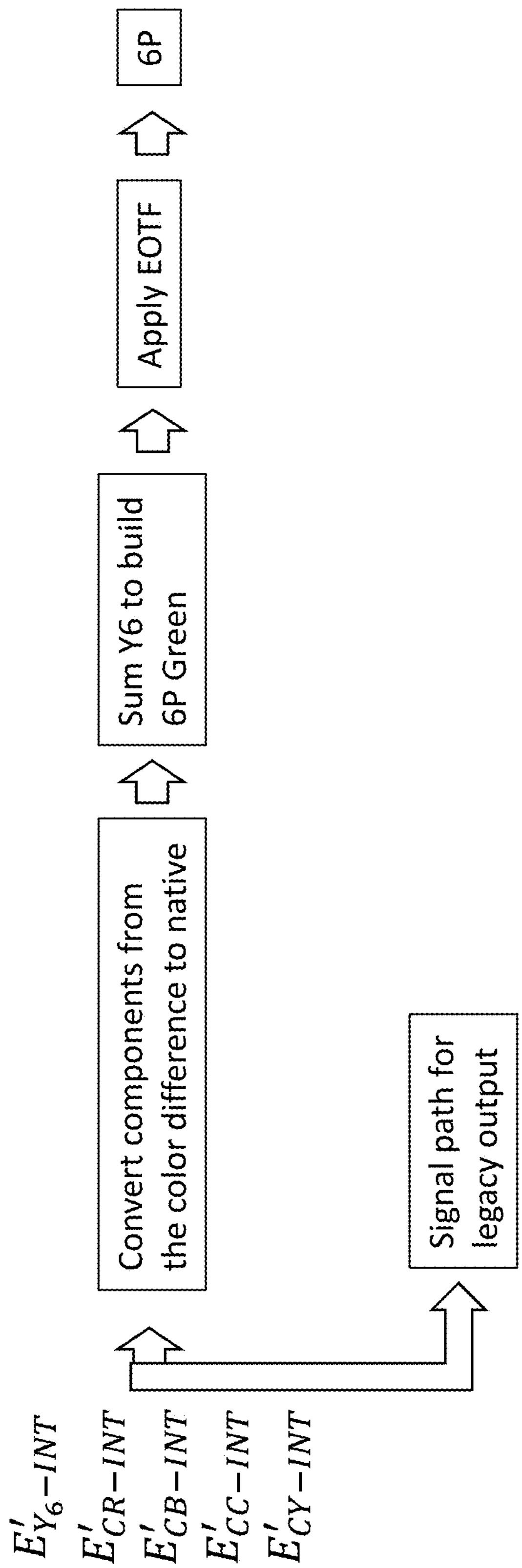
FIG. 60 illustrates one embodiment of six-primary color output using a non-constant luminance decoder.
Figure 61:
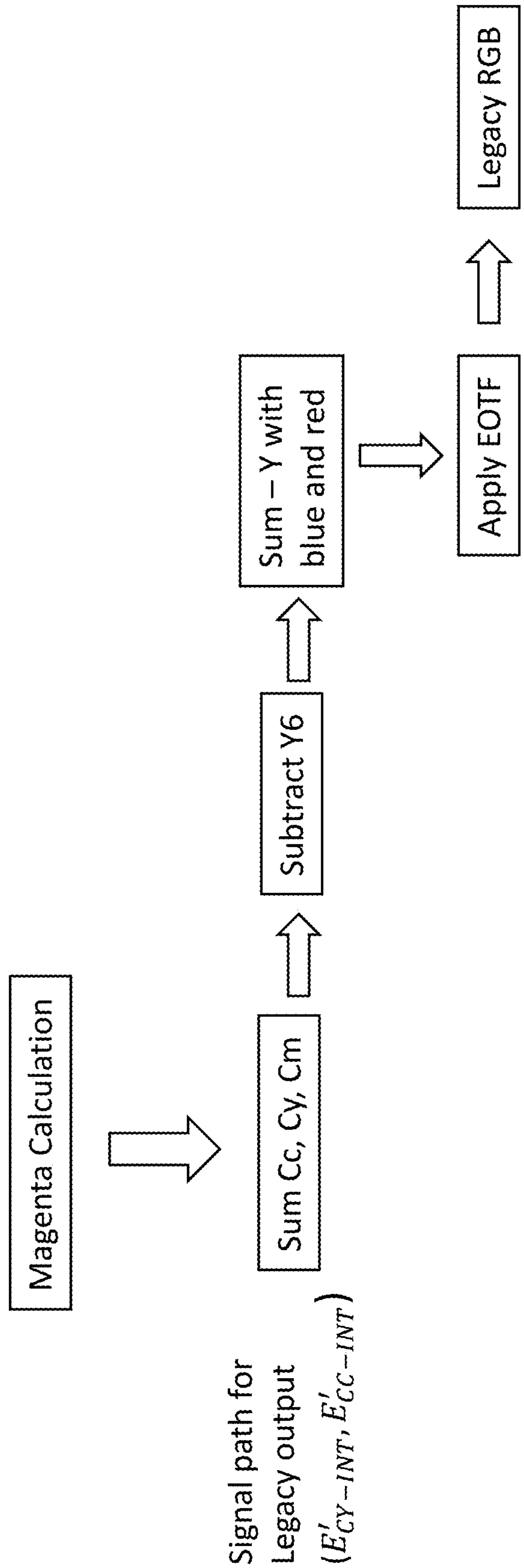
FIG. 61 illustrates one embodiment of a legacy RGB process within a six-primary color system.

When a six-primary display is connected to the six-primary output, each channel will drive each color. When this same output is sent to an RGB display, the non-RGB (e.g., CMY) channels are ignored and only the RGB channels are displayed. An element of operation is that both systems drive from the black area. At this point in the decoder, all are coded as bit value 0 being black and bit value 2047 being peak color luminance. This process is also operable to be reversed in a situation where an RGB source is operable to feed a six-primary display. The six-primary display would then have no information for the non-RGB (e.g., CMY) channels and would display the input in a standard RGB gamut. FIG. 60 illustrates one embodiment of six-primary color output using a non-constant luminance decoder. FIG. 61 illustrates one embodiment of a legacy RGB process within a six-primary color system.

The design of this matrix is a modification of the CIE process to convert RGB to XYZ. First, u'v' values are converted back to CIE 1931 xyz values using the following formulas:

$$x = \frac{9u'}{(6u' - 16v' + 12)}$$

$$y = \frac{4v'}{(6u' - 16v' + 12)}$$

$$z = 1 - x - y$$

Next, RGBCMY values are mapped to a matrix. The mapping is dependent upon the gamut standard being used. In one embodiment, the gamut is ITU-R BT.709-6. The mapping for RGBCMY values for an ITU-R BT.709-6 (6P-B) gamut are:

$$\left[\begin{pmatrix} & x & y & z \\ R & 0.640 & 0.330 & 0.130 \\ G & 0.300 & 0.600 & 0.100 \\ B & 0.150 & 0.060 & 0.790 \\ C & 0.439 & 0.540 & 0.021 \\ Y & 0.165 & 0.327 & 0.509 \\ M & 0.320 & 0.126 & 0.554 \end{pmatrix}\right.$$

$$\left.\begin{pmatrix} & R & G & B & C & Y & M \\ x & 0.640 & 0.300 & 0.150 & 0.439 & 0.165 & 0.319 \\ y & 0.330 & 0.600 & 0.060 & 0.540 & 0.327 & 0.126 \\ z & 0.030 & 0.100 & 0.790 & 0.021 & 0.509 & 0.554 \end{pmatrix}\right] = \begin{pmatrix} 0.519 & 0.393 & 0.140 \\ 0.393 & 0.460 & 0.160 \\ 0.140 & 0.160 & 0.650 \end{pmatrix}$$

In one embodiment, the gamut is SMPTE RP431-2. The mapping for RGBCMY values for a SMPTE RP431-2 (6P-C) gamut are:

$$\left[\begin{pmatrix} & x & y & z \\ R & 0.680 & 0.320 & 0.000 \\ G & 0.264 & 0.691 & 0.045 \\ B & 0.150 & 0.060 & 0.790 \\ C & 0.450 & 0.547 & 0.026 \\ Y & 0.163 & 0.342 & 0.496 \\ M & 0.352 & 0.142 & 0.505 \end{pmatrix}\right.$$

-continued $$\left[\begin{pmatrix} & R & G & B & C & Y & M \\ x & 0.680 & 0.264 & 0.150 & 0.450 & 0.163 & 0.352 \\ y & 0.320 & 0.690 & 0.060 & 0.547 & 0.342 & 0.142 \\ z & 0.000 & 0.045 & 0.790 & 0.026 & 0.496 & 0.505 \end{pmatrix}\right] = \begin{pmatrix} 0.565 & 0.400 & 0.121 \\ 0.400 & 0.549 & 0.117 \\ 0.121 & 0.117 & 0.650 \end{pmatrix}$$

Following mapping the RGBCMY values to a matrix, a white point conversion occurs:

$$X = \frac{x}{y}$$
$$Y = 1$$
$$Z = 1 - x - y$$

For a six-primary color system using an ITU-R BT.709-6 (6P-B) color gamut, the white point is D65:

$$0.9504 = \frac{0.3127}{0.3290}$$
$$0.3584 = 1 - 0.3127 - 0.3290$$

For a six-primary color system using a SMPTE RP431-2 (6P-C) color gamut, the white point is D60:

$$0.9541 = \frac{0.3218}{0.3372}$$
$$0.3410 = 1 - 0.3218 - 0.3372$$

Following the white point conversion, a calculation is required for RGB saturation values, $S_R$, $S_G$, and $S_B$. The results from the second operation are inverted and multiplied with the white point XYZ values. In one embodiment, the color gamut used is an ITU-R BT.709-6 color gamut. The values calculate as:

$$\begin{bmatrix} S_R \\ S_G \\ S_B \end{bmatrix}^{ITU-R\ BT\cdot 709-6} = \left[\begin{pmatrix} 5.445 & -4.644 & -0.0253 \\ -4.644 & 6.337 & -0.563 \\ -0.0253 & -0.563 & 1.682 \end{pmatrix}\begin{pmatrix} 0.950 \\ 1 \\ 0.358 \end{pmatrix}\right]$$

Where $$\begin{bmatrix} S_R \\ S_G \\ S_B \end{bmatrix}^{ITU-R\ BT\cdot 709-6} = \begin{bmatrix} 0.522 \\ 1.722 \\ 0.015 \end{bmatrix}$$

In one embodiment, the color gamut is a SMPTE RP431-2 color gamut. The values calculate as:

$$\begin{bmatrix} S_R \\ S_G \\ S_B \end{bmatrix}^{SMPTE\ RP431-2} = \left[\begin{pmatrix} 3.692 & -2.649 & -0.211 \\ -2.649 & 3.795 & -0.189 \\ -0.211 & -0.189 & 1.611 \end{pmatrix}\begin{pmatrix} 0.954 \\ 1 \\ 0.341 \end{pmatrix}\right]$$

Where $$\begin{bmatrix} S_R \\ S_G \\ S_B \end{bmatrix}^{SMPTE\ RP431-2} = \begin{bmatrix} 0.802 \\ 1.203 \\ 0.159 \end{bmatrix}$$

Next, a six-primary color-to-XYZ matrix must be calculated. For an embodiment where the color gamut is an ITU-R BT.709-6 color gamut, the calculation is as follows:

$$\begin{bmatrix} X \\ Y \\ Z \end{bmatrix} = \left[\begin{pmatrix} 0.519 & 0.393 & 0.140 \\ 0.393 & 0.460 & 0.160 \\ 0.140 & 0.160 & 0.650 \end{pmatrix}^{ITU-RBT\cdot 709-6} \begin{pmatrix} 0.522 & 1.722 & 0.153 \\ 0.522 & 1.722 & 0.153 \\ 0.522 & 1.722 & 0.153 \end{pmatrix}^{D65}\right]$$

Wherein the resulting matrix is multiplied by the $S_R S_G S_B$ matrix:

$$\begin{bmatrix} X \\ Y \\ Z \end{bmatrix} = \begin{bmatrix} 0.271 & 0.677 & 0.002 \\ 0.205 & 0.792 & 0.003 \\ 0.073 & 0.276 & 0.010 \end{bmatrix} \begin{bmatrix} R \\ G \\ B \\ C \\ Y \\ M \end{bmatrix}^{ITU-RBT\cdot 709-6}$$

For an embodiment where the color gamut is a SMPTE RP431-2 color gamut, the calculation is as follows:

$$\begin{bmatrix} X \\ Y \\ Z \end{bmatrix} = \left[\begin{pmatrix} 0.565 & 0.401 & 0.121 \\ 0.401 & 0.549 & 0.117 \\ 0.121 & 0.117 & 0.650 \end{pmatrix}^{SMPTE\ RP431-2} \begin{pmatrix} 0.802 & 1.203 & 0.159 \\ 0.802 & 1.203 & 0.159 \\ 0.802 & 1.203 & 0.159 \end{pmatrix}^{D60}\right]$$

Wherein the resulting matrix is multiplied by the $S_R S_G S_B$ matrix:

$$\begin{bmatrix} X \\ Y \\ Z \end{bmatrix} = \begin{bmatrix} 0.453 & 0.482 & 0.019 \\ 0.321 & 0.660 & 0.019 \\ 0.097 & 0.141 & 0.103 \end{bmatrix} \begin{bmatrix} R \\ G \\ B \\ C \\ Y \\ M \end{bmatrix}^{SMPTE\ RP431-2}$$

Finally, the XYZ matrix must converted to the correct standard color space. In an embodiment where the color gamut used is an ITU-R BT709.6 color gamut, the matrices are as follows:

$$\begin{bmatrix} R \\ G \\ B \end{bmatrix}^{ITU-RBT709.6} = \begin{bmatrix} 3.241 & -1.537 & -0.499 \\ -0.969 & 1.876 & 0.042 \\ 0.056 & -0.204 & 1.057 \end{bmatrix} \begin{bmatrix} X \\ Y \\ Z \end{bmatrix}$$

In an embodiment where the color gamut used is a SMPTE RP431-2 color gamut, the matrices are as follows:

$$\begin{bmatrix} R \\ G \\ B \end{bmatrix}^{SMPTE\ RP431-2} = \begin{bmatrix} 2.73 & -1.018 & -0.440 \\ -0.795 & 1.690 & 0.023 \\ 0.041 & -0.088 & 1.101 \end{bmatrix} \begin{bmatrix} X \\ Y \\ Z \end{bmatrix}$$

Packing a Six-Primary Color System into $Ic_TC_P$ $IC_TC_P$ (ITP) is a color representation format specified in the Rec. ITU-R BT.2100 standard that is used as a part of the color image pipeline in video and digital photography systems for high dynamic range (HDR) and wide color gamut (WCG) imagery. The I (intensity) component is a luma component that represents the brightness of the video. $C_T$ and $C_P$ are blue-yellow ("tritanopia") and red-green ("protanopia") chroma components. The format is derived from an associated RGB color space by a coordination transformation that includes two matrix transformations and an intermediate non-linear transfer function, known as a gamma pre-correction. The transformation produces three signals: I, $C_T$, and $C_P$. The ITP transformation is operable to be used with RGB signals derived from either the perceptual quantizer (PQ) or hybrid log-gamma (HLG) nonlinearity functions. The PQ curve is described in ITU-R BT2100-2: 2018, Table 4, which is incorporated herein by reference in its entirety.

Figure 62:
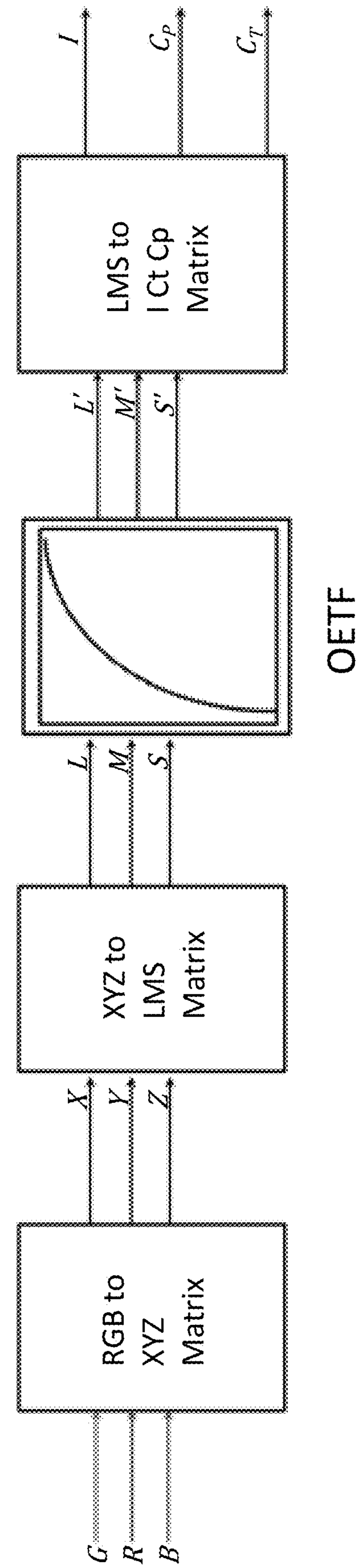
FIG. 62 illustrates one embodiment of packing six-primary color system image data into an $IC_TC_P$ (ITP) format.

FIG. 62 illustrates one embodiment of packing six-primary color system image data into an $IC_TC_P$ (ITP) format. In one embodiment, RGB image data is converted to an XYZ matrix. The XYZ matrix is then converted to an LMS matrix. The LMS matrix is then sent to an optical electronic transfer function (OETF). The conversion process is represented below:

$$\begin{bmatrix} L \\ M \\ S \end{bmatrix} = \left[\begin{pmatrix} a_{11} & a_{12} & a_{13} \\ a_{21} & a_{22} & a_{23} \\ a_{31} & a_{32} & a_{33} \end{pmatrix} \begin{pmatrix} 0.359 & 0.696 & -0.036 \\ -0.192 & 1.100 & 0.075 \\ 0.007 & 0.075 & 0.843 \end{pmatrix}\right] \begin{bmatrix} R \\ G \\ B \end{bmatrix}$$

Output from the OETF is converted to ITP format. The resulting matrix is:

$$\begin{pmatrix} 0.5 & 0.5 & 0 \\ 1.614 & -3.323 & 1.710 \\ 4.378 & -4.246 & -0.135 \end{pmatrix}$$

Figure 63:
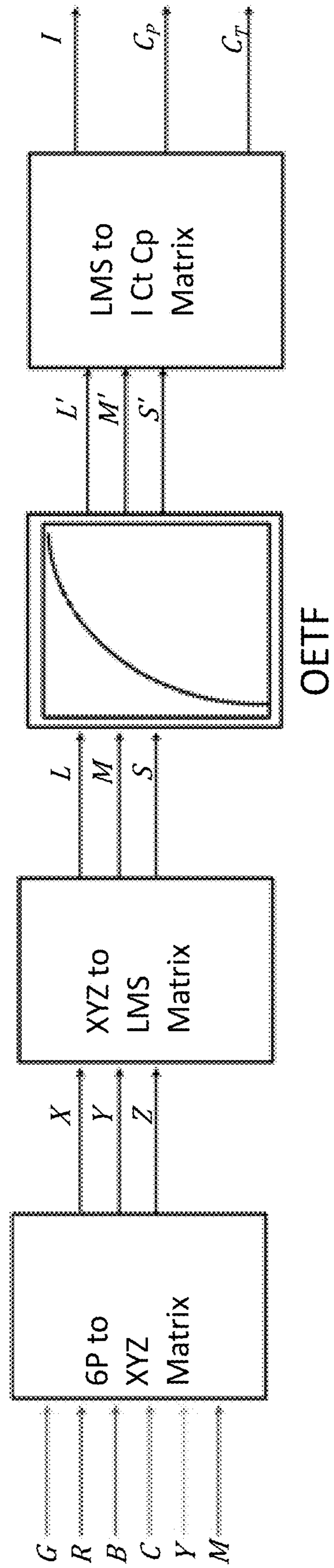
FIG. 63 illustrates one embodiment of a six-primary color system converting RGBCMY image data into XYZ image data for an ITP format.

FIG. 63 illustrates one embodiment of a six-primary color system converting RGBCMY image data into XYZ image data for an ITP format (e.g., 6P-B, 6P-C). For a six-primary color system, this is modified by replacing the RGB to XYZ matrix with a process to convert RGBCMY to XYZ. This is the same method as described in the legacy RGB process. The new matrix is as follows for an ITU-R BT.709-6 (6P-B) color gamut:

$$\begin{bmatrix} L \\ M \\ S \end{bmatrix} = \begin{pmatrix} 0.271 & 0.677 & 0.002 \\ 0.205 & 0.792 & 0.003 \\ 0.073 & 0.277 & 0.100 \end{pmatrix} \begin{pmatrix} 0.359 & 0.696 & -0.036 \\ -0.192 & 1.100 & 0.075 \\ 0.007 & 0.075 & 0.843 \end{pmatrix} \begin{bmatrix} R \\ G \\ B \\ C \\ Y \\ M \end{bmatrix}^{ITU-RBT\cdot 709-6}$$

RGBCMY data, based on an ITU-R BT.709-6 color gamut, is converted to an XYZ matrix. The resulting XYZ matrix is converted to an LMS matrix, which is sent to an OETF. Once processed by the OETF, the LMS matrix is converted to an ITP matrix. The resulting ITP matrix is as follows:

$$\begin{pmatrix} 0.5 & 0.5 & 0 \\ 1.614 & -3.323 & 1.710 \\ 4.378 & -4.246 & -0.135 \end{pmatrix}$$

In another embodiment, the LMS matrix is sent to an Optical Optical Transfer Function (OOTF). In yet another embodiment, the LMS matrix is sent to a Transfer Function other than OOTF or OETF.

In another embodiment, the RGBCMY data is based on the SMPTE ST431-2 (6P-C) color gamut. The matrices for an embodiment using the SMPTE ST431-2 color gamut are as follows:

$$\begin{bmatrix} L \\ M \\ S \end{bmatrix} = \begin{pmatrix} 0.453 & 0.481 & 0.019 \\ 0.321 & 0.660 & 0.019 \\ 0.097 & 0.141 & 0.103 \end{pmatrix} \begin{pmatrix} 0.359 & 0.696 & -0.036 \\ -0.192 & 1.100 & 0.075 \\ 0.007 & 0.075 & 0.843 \end{pmatrix} \begin{bmatrix} R \\ G \\ B \\ C \\ Y \\ M \end{bmatrix}^{SMPTE\ ST431-2}$$

The resulting ITP matrix is:

$$\begin{pmatrix} 0.5 & 0.5 & 0 \\ 1.614 & -3.323 & 1.710 \\ 4.378 & -4.246 & -0.135 \end{pmatrix}$$

The decode process uses the standard ITP decode process, as the $S_RS_GS_B$ cannot be easily inverted. This makes it difficult to recover the six RGBCMY components from the ITP encode. Therefore, the display is operable to use the standard ICtCp decode process as described in the standards and is limited to just RGB output.

Converting to a Five-Color Multi-Primary Display

In one embodiment, the system is operable to convert image data incorporating five primary colors. In one embodiment, the five primary colors include Red (R), Green (G), Blue (G), Cyan (C), and Yellow (Y), collectively referred to as RGBCY. In another embodiment, the five primary colors include Red (R), Green (G), Blue (B), Cyan (C), and Magenta (M), collectively referred to as RGBCM. In one embodiment, the five primary colors do not include Magenta (M).

In one embodiment, the five primary colors include Red (R), Green (G), Blue (B), Cyan (C), and Orange (O), collectively referred to as RGBCO. RGBCO primaries provide optimal spectral characteristics, transmittance characteristics, and makes use of a D65 white point. See, e.g., Moon-Cheol Kim et al., *Wide Color Gamut Five Channel Multi-Primary for HDTV Application*, Journal of Imaging Sci. & Tech. Vol. 49, No. 6, November/December 2005, at 594-604, which is hereby incorporated by reference in its entirety.

In one embodiment, a five-primary color model is expressed as F=MC, where F is equal to a tristimulus color vector, $F=(X, Y, Z)^T$, and C is equal to a linear display control vector, $C=(C1, C2, C3, C4, C5)^T$. Thus, a conversion matrix for the five-primary color model is represented as $$M = \begin{pmatrix} X_1 & X_2 & X_3 & X_4 & X_5 \\ Y_1 & Y_2 & Y_3 & Y_4 & Y_5 \\ Z_1 & Z_2 & Z_3 & Z_4 & Z_5 \end{pmatrix}$$

Using the above equation and matrix, a gamut volume is calculated for a set of given control vectors on the gamut boundary. The control vectors are converted into CIELAB uniform color space. However, because matrix M is non-square, the matrix inversion requires splitting the color gamut into a specified number of pyramids, with the base of each pyramid representing an outer surface and where the control vectors are calculated using linear equation for each given XYZ triplet present within each pyramid. By separating regions into pyramids, the conversion process is normalized. In one embodiment, a decision tree is created in order to determine which set of primaries are best to define a specified color. In one embodiment, a specified color is defined by multiple sets of primaries. In order to locate each pyramid, 2D chromaticity look-up tables are used, with corresponding pyramid numbers for input chromaticity values in xy or u'v'. Typical methods using pyramids require 1000×1000 address ranges in order to properly search the boundaries of adjacent pyramids with look-up table memory. The system of the present invention uses a combination of parallel processing for adjacent pyramids and at least one algorithm for verifying solutions by checking constraint conditions. In one embodiment, the system uses a parallel computing algorithm. In one embodiment, the system uses a sequential algorithm. In another embodiment, the system uses a brightening image transformation algorithm. In another embodiment, the system uses a darkening image transformation algorithm. In another embodiment, the system uses an inverse sinusoidal contrast transformation algorithm. In another embodiment, the system uses a hyperbolic tangent contrast transformation algorithm. In yet another embodiment, the system uses a sine contrast transformation execution times algorithm. In yet another embodiment, the system uses a linear feature extraction algorithm. In yet another embodiment, the system uses a JPEG2000 encoding algorithm. In yet another embodiment, the system uses a parallelized arithmetic algorithm. In yet another embodiment, the system uses an algorithm other than those previously mentioned. In yet another embodiment, the system uses any combination of the aforementioned algorithms.

Mapping a Six-Primary Color System into Standardized Transport Formats

Each encode and/or decode system fits into existing video serial data streams that have already been established and standardized. This is key to industry acceptance. Encoder and/or decoder designs require little or no modification for a six-primary color system to map to these standard serial formats.

Figure 64:
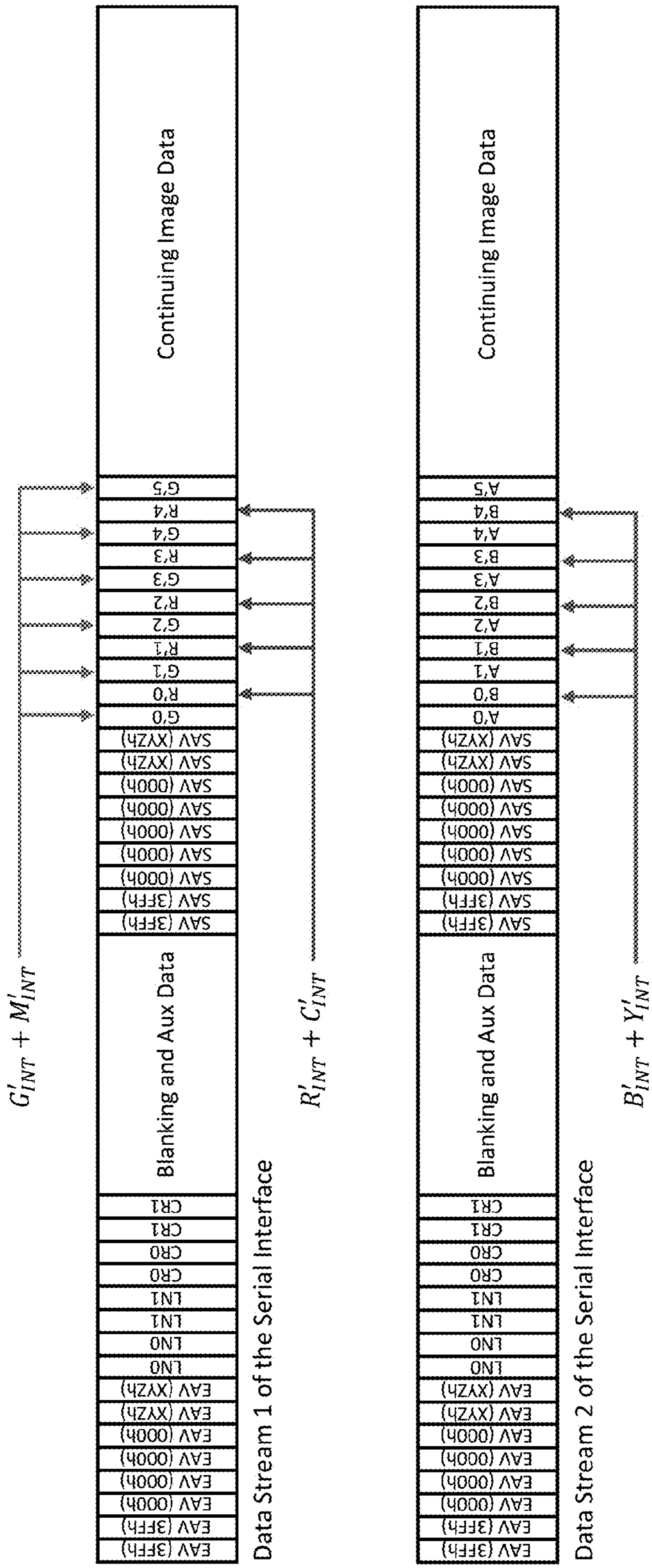
FIG. 64 illustrates one embodiment of six-primary color mapping with SMPTE ST424.

FIG. 64 illustrates one embodiment of a six-primary color system mapping to a SMPTE ST424 standard serial format. The SMPTE ST424/ST425 set of standards allow very high sampling systems to be passed through a single cable. This is done by using alternating data streams, each containing different components of the image. For use with a six-primary color system transport, image formats are limited to RGB due to the absence of a method to send a full bandwidth Y signal.

Figure 65:
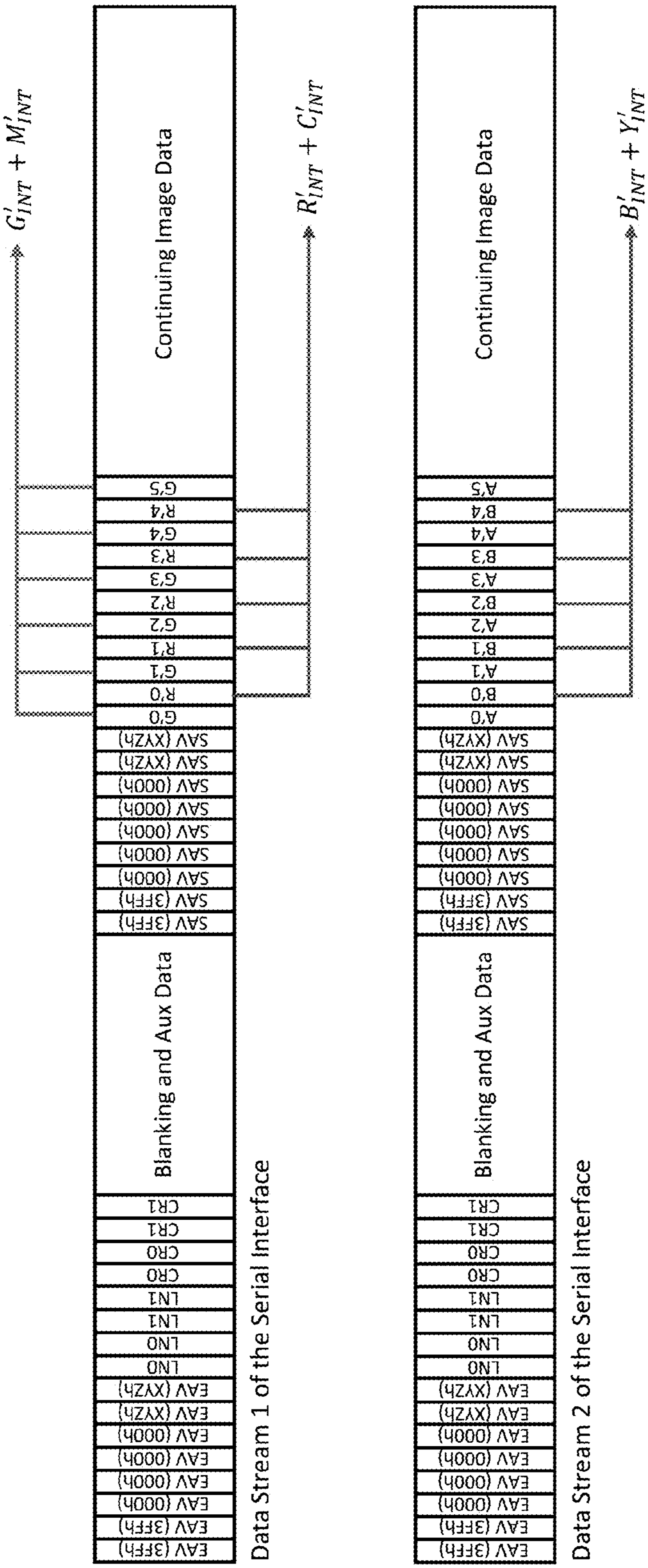
FIG. 65 illustrates one embodiment of a six-primary color system readout for a SMPTE ST424 standard.

The process for mapping a six-primary color system to a SMPTE ST425 format is the same as mapping to a SMPTE ST424 format. To fit a six-primary color system into a SMPTE ST425/424 stream involves the following substitutions: $G'_{INT}+M'_{INT}$ is placed in the Green data segments, $R'_{INT}+C'_{INT}$ is placed in the Red data segments, and $B'_{INT}+Y'_{INT}$ is placed into the Blue data segments. FIG. 65 illustrates one embodiment of an SMPTE 424 6P readout.

System 2 requires twice the data rate as System 1, so it is not compatible with SMPTE 424. However, it maps easily into SMPTE ST2082 using a similar mapping sequence. In one example, System 2 is used to have the same data speed defined for 8K imaging to show a 4K image.

Figure 66:
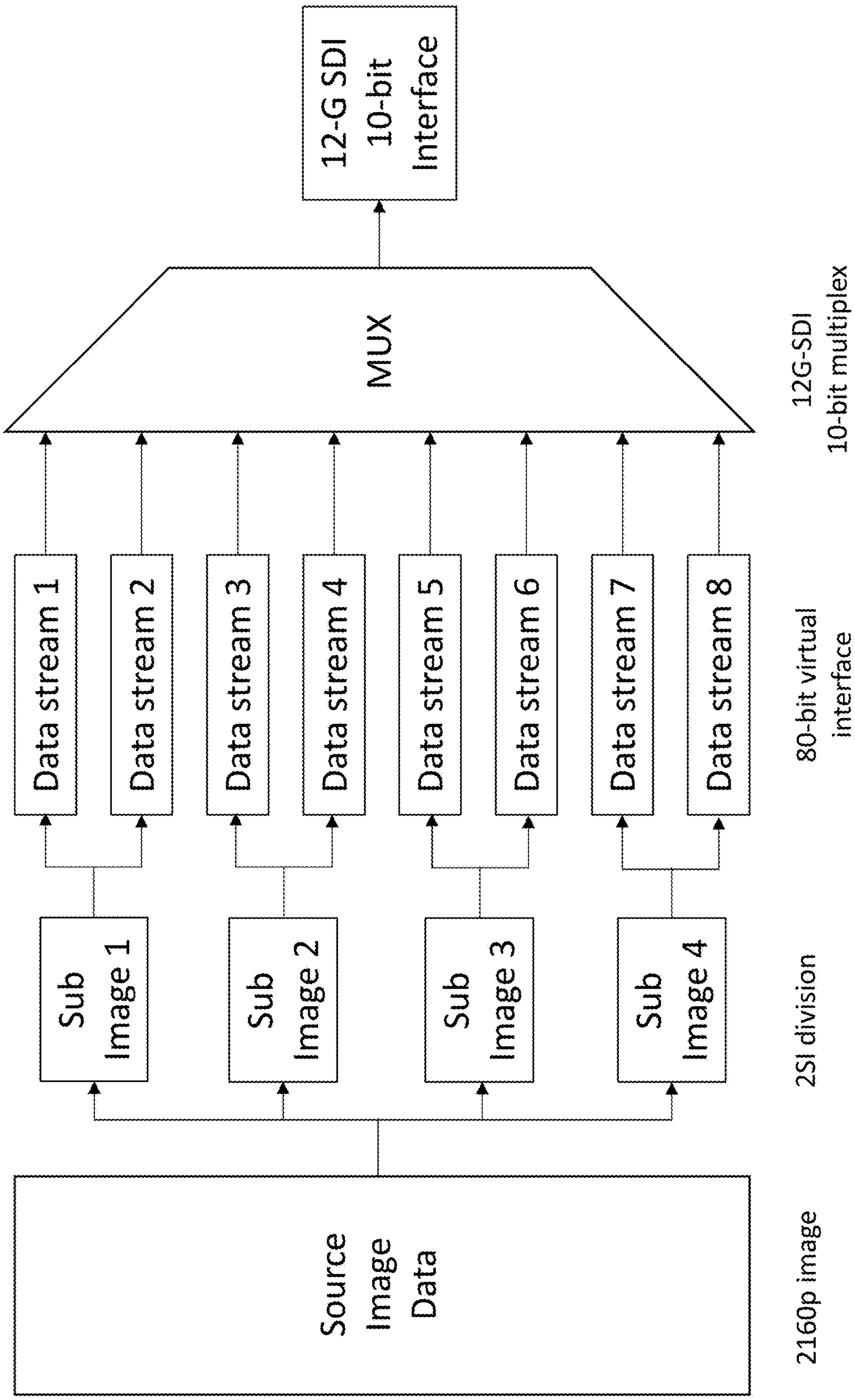
FIG. 66 illustrates a process of 2160p transport over 12G-SDI.

In one embodiment, sub-image and data stream mapping occur as shown in SMPTE ST2082. An image is broken into four sub-images, and each sub-image is broken up into two data streams (e.g., sub-image 1 is broken up into data stream 1 and data stream 2). The data streams are put through a multiplexer and then sent to the interface as shown in FIG. 66.

Figure 67:
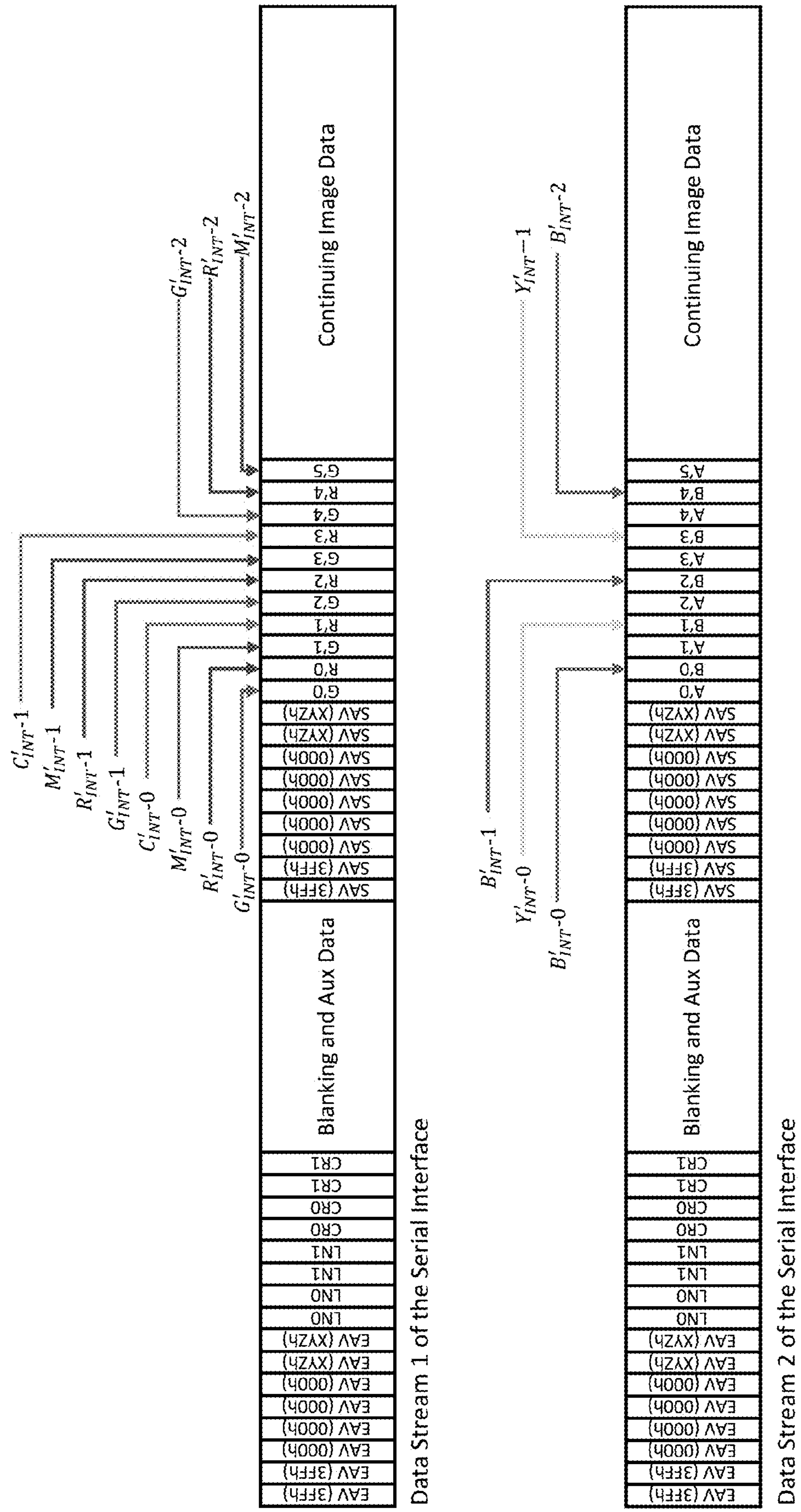
FIG. 67 illustrates one embodiment for mapping RGBCMY data to the SMPTE ST2082 standard for a six-primary color system.
Figure 68:
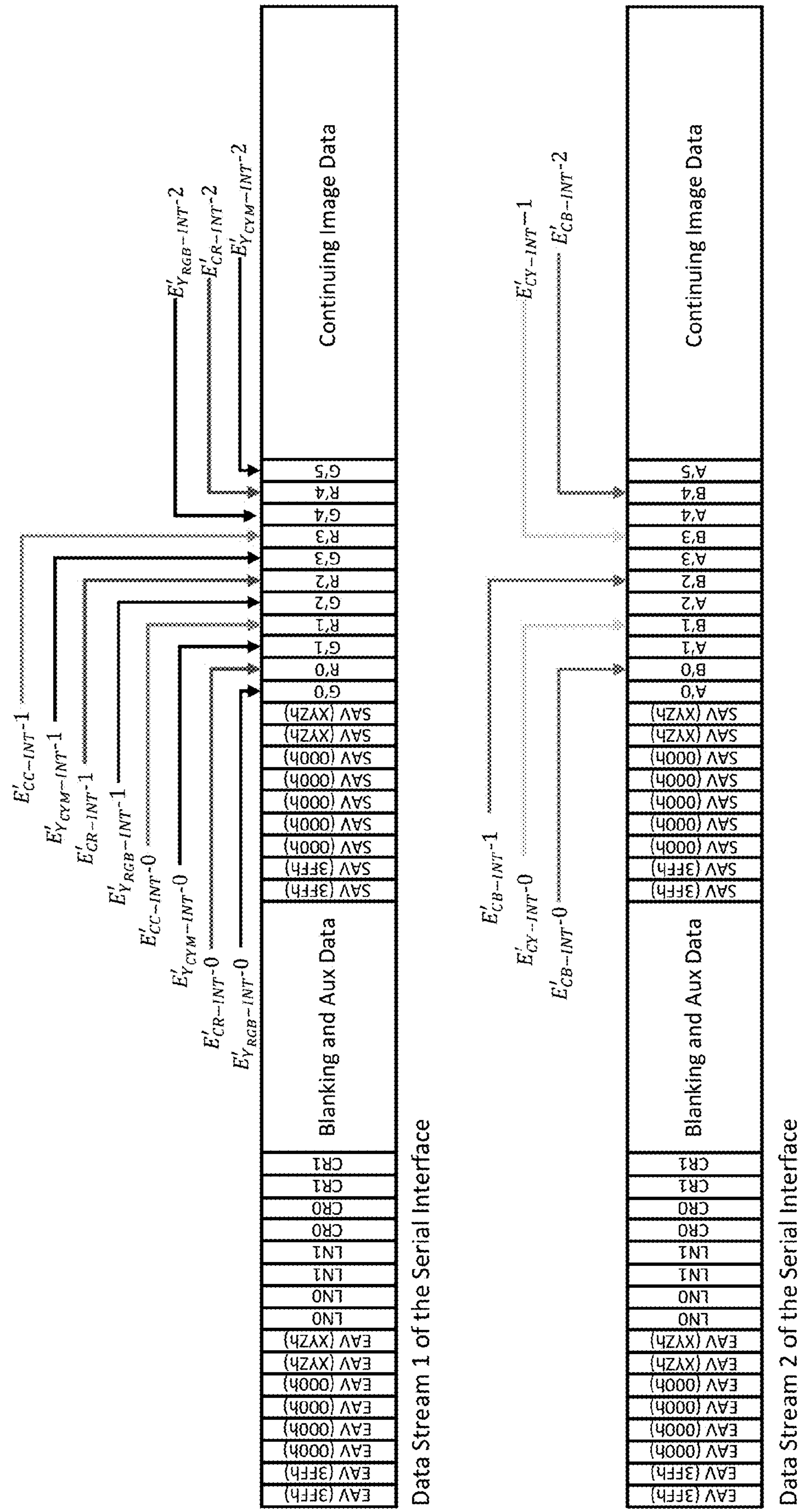
FIG. 68 illustrates one embodiment for mapping $Y_{RGB}$ $Y_{CMY}$ $C_R$ $C_B$ $C_C$ $C_Y$ data to the SMPTE ST2082 standard for a six-primary color system.

FIG. 67 and FIG. 68 illustrate serial digital interfaces for a six-primary color system using the SMPTE ST2082 standard. In one embodiment, the six-primary color system data is RGBCMY data, which is mapped to the SMPTE ST2082 standard (FIG. 67). Data streams 1, 3, 5, and 7 follow the pattern shown for data stream 1. Data streams 2, 4, 6, and 8 follow the pattern shown for data stream 2. In one embodiment, the six-primary color system data is $Y_{RGB}$ $Y_{CMY}$ $C_R$ $C_B$ $C_C$ $C_Y$ data, which is mapped to the SMPTE ST2082 standard (FIG. 68). Data streams 1, 3, 5, and 7 follow the pattern shown for data stream 1. Data streams 2, 4, 6, and 8 follow the pattern shown for data stream 2.

In one embodiment, the standard serial format is SMPTE ST292. SMPTE ST292 is an older standard than ST424 and is a single wire format for 1.5 GB video, whereas ST424 is designed for up to 3 GB video. However, while ST292 is operable to identify the payload ID of SMPTE ST352, it is constrained to only accepting an image identified by a hex value, 0h. All other values are ignored. Due to the bandwidth and identifications limitations in ST292, a component video six-primary color system incorporates a full bit level luminance component. To fit a six-primary color system into a SMPTE ST292 stream involves the following substitutions: $E'_{Y_6-INT}$ is placed in the Y data segments, $E'_{Cb-INT}+E'_{Cy-INT}$ is placed in the Cb data segments, and $E'_{Cr}+E'_{Cc-INT}$ is placed in the Cr data segments. In another embodiment, the standard serial format is SMPTE ST352.

SMPTE ST292 and ST424 Serial Digital Interface (SDI) formats include payload identification (ID) metadata to help the receiving device identify the proper image parameters. The tables for this need modification by adding at least one flag identifying that the image source is a six-primary color RGB image. Therefore, six-primary color system format additions need to be added. In one embodiment, the standard is the SMPTE ST352 standard.

Figure 69:
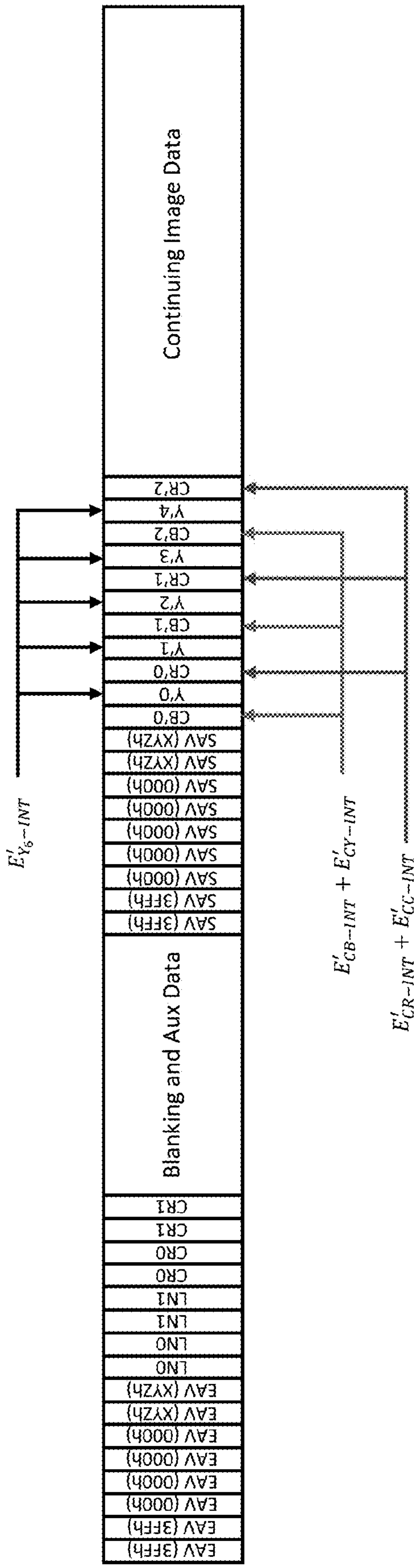
FIG. 69 illustrates one embodiment for mapping six-primary color system data using the SMPTE ST292 standard.
Figure 70:
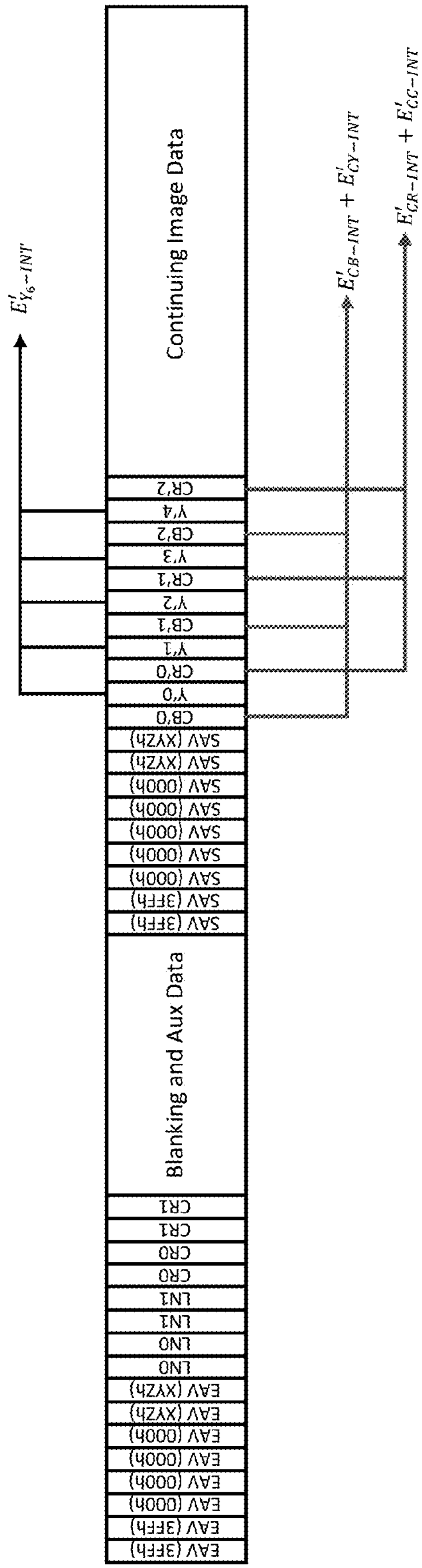
FIG. 70 illustrates one embodiment of the readout for a six-primary color system using the SMPTE ST292 standard.

FIG. 69 illustrates one embodiment of an SMPTE ST292 6P mapping. FIG. 70 illustrates one embodiment of an SMPTE ST292 6P readout.

FIG. 71 illustrates modifications to the SMPTE ST352 standards for a six-primary color system. Hex code "Bh" identifies a constant luminance source and flag "Fh" indicates the presence of a six-primary color system. In one embodiment, Fh is used in combination with at least one other identifier located in byte 3. In another embodiment, the Fh flag is set to 0 if the image data is formatted as System 1 and the Fh flag is set to 1 if the image data is formatted as System 2.

In another embodiment, the standard serial format is SMPTE ST2082. Where a six-primary color system requires more data, it may not always be compatible with SMPTE ST424. However, it maps easily into SMPTE ST2082 using the same mapping sequence. This usage would have the same data speed defined for 8K imaging in order to display a 4K image.

In another embodiment, the standard serial format is SMPTE ST2022. Mapping to ST2022 is similar to mapping to ST292 and ST242, but as an ETHERNET format. The output of the stacker is mapped to the media payload based on Real-time Transport Protocol (RTP) 3550, established by the Internet Engineering Task Force (IETF). RTP provides end-to-end network transport functions suitable for applications transmitting real-time data, including, but not limited to, audio, video, and/or simulation data, over multicast or unicast network services. The data transport is augmented by a control protocol (RTCP) to allow monitoring of the data delivery in a manner scalable to large multicast networks, and to provide control and identification functionality. There are no changes needed in the formatting or mapping of the bit packing described in SMPTE ST 2022-6: 2012 (HBRMT), which is incorporated herein by reference in its entirety.

FIG. 72 illustrates one embodiment of a modification for a six-primary color system using the SMPTE ST2202 standard. For SMPTE ST2202-6:2012 (HBRMT), there are no changes needed in formatting or mapping of the bit packing. ST2022 relies on header information to correctly configure the media payload. Parameters for this are established within the payload header using the video source format fields including, but not limited to, MAP, FRAME, FRATE, and/or SAMPLE. MAP, FRAME, and FRATE remain as described in the standard. MAP is used to identify if the input is ST292 or ST425 (RGB or Y Cb Cr). SAMPLE is operable for modification to identify that the image is formatted as a six-primary color system image. In one embodiment, the image data is sent using flag "0h" (unknown/unspecified).

In another embodiment, the standard is SMPTE ST2110. SMPTE ST2110 is a relatively new standard and defines moving video through an Internet system. The standard is based on development from the IETF and is described under RFC3550. Image data is described through "pgroup" construction. Each pgroup consists of an integer number of octets. In one embodiment, a sample definition is RGB or YCbCr and is described in metadata. In one embodiment, the metadata format uses a Session Description Protocol (SDP) format. Thus, pgroup construction is defined for 4:4:4, 4:2:2, and 4:2:0 sampling as 8-bit, 10-bit, 12-bit, and in some cases 16-bit and 16-bit floating point wording. In one embodiment, six-primary color image data is limited to a 10-bit depth. In another embodiment, six-primary color image data is limited to a 12-bit depth. Where more than one sample is used, it is described as a set. For example, 4:4:4 sampling for blue, as a non-linear RGB set, is described as C0'B, C1'B, C2'B, C3'B, and C4'B. The lowest number index being left most within the image. In another embodiment, the method of substitution is the same method used to map six-primary color content into the ST2110 standard.

In another embodiment, the standard is SMPTE ST2110. SMPTE ST2110-20 describes the construction for each pgroup. In one embodiment, six-primary color system content arrives for mapping as non-linear data for the SMPTE ST2110 standard. In another embodiment, six-primary color system content arrives for mapping as linear data for the SMPTE ST2110 standard.

FIG. 73 illustrates a table of 4:4:4 sampling for a six-primary color system for a 10-bit video system. For 4:4:4 10-bit video, 15 octets are used and cover 4 pixels.

FIG. 74 illustrates a table of 4:4:4 sampling for a six-primary color system for a 12-bit video system. For 4:4:4 12-bit video, 9 octets are used and cover 2 pixels before restarting the sequence.

Non-linear RGBCMY image data would arrive as: $G'_{INT}+M'_{INT}$, $R'_{INT}+C'_{INT}$, and $B'_{INT}+Y'_{INT}$. Component substitution would follow what has been described for SMPTE ST424, where $G'_{INT}+M'_{INT}$ is placed in the Green data segments, $R'_{INT}+C'_{INT}$ is placed in the Red data segments, and $B'_{INT}+Y'_{INT}$ is placed in the Blue data segments. The sequence described in the standard is shown as R0', G0', B0', R1', G1', B1', etc.

FIG. 75 illustrates sequence substitutions for 10-bit and 12-bit video in 4:2:2 sampling systems in a Y Cb Cr Cc Cy color space. Components are delivered to a 4:2:2 pgroup including, but not limited to, $E'_{Y6-INT}$, $E'_{Cb-INT}+E'_{Cy-INT}$, and $E'_{Cr-INT}+E'_{Cc-INT}$. For 4:2:2 10-bit video, 5 octets are used and cover 2 pixels before restarting the sequence. For 4:2:2 12-bit video, 6 octets are used and cover 2 pixels before restarting the sequence. Component substitution follows what has been described for SMPTE ST292, where $E'_{Y6-INT}$ is placed in the Y data segments, $E'_{Cb-INT}+E'_{Cy-INT}$ is placed in the Cb data segments, and $E'_{Cr-INT}+E'_{Cc-INT}$ is placed in the Cr data segments. The sequence described in the standard is shown as Cb0', Y0', Cr0', Y1', Cr1', Y3', Cb2', Y4', Cr2', Y5', etc. In another embodiment, the video data is represented at a bit level other than 10-bit or 12-bit. In another embodiment, the sampling system is a sampling system other than 4:2:2. In another embodiment, the standard is STMPE ST2110.

Figure 76:
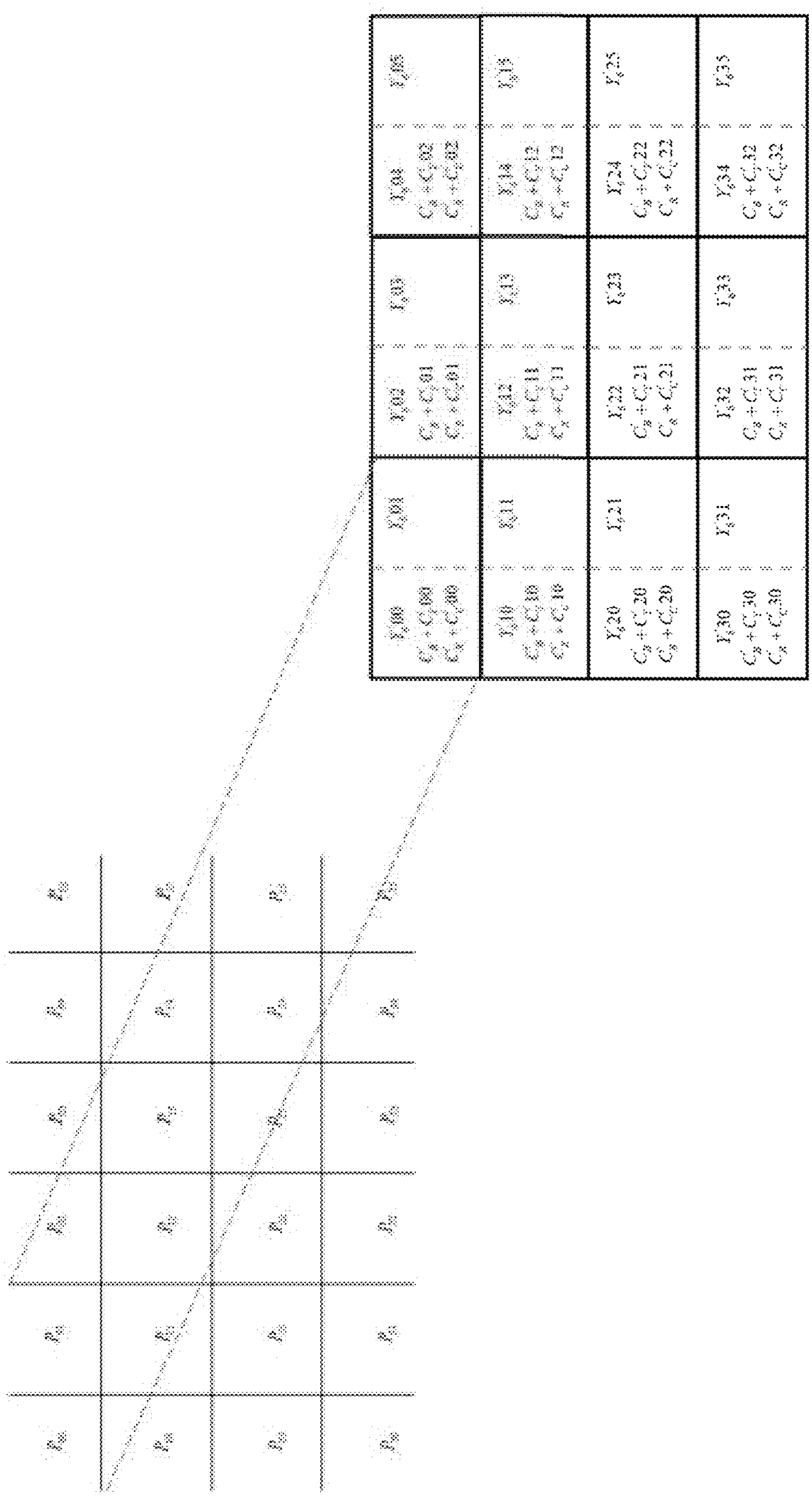
FIG. 76 illustrates sample placements of six-primary system components for a 4:2:2 sampling system image.

FIG. 76 illustrates sample placements of six-primary system components for a 4:2:2 sampling system image. This follows the substitutions illustrated in FIG. 75, using a 4:2:2 sampling system.

FIG. 77 illustrates sequence substitutions for 10-bit and 12-bit video in 4:2:0 sampling systems using a Y Cb Cr Cc Cy color space. Components are delivered to a pgroup including, but not limited to, $E'_{Y6-INT}$, $E'_{Cb-INT}+E'_{Cy-INT}$) and $E'_{Cr-INT}+E'_{Cc-INT}$. For 4:2:0 10-bit video data, 15 octets are used and cover 8 pixels before restarting the sequence. For 4:2:0 12-bit video data, 9 octets are used and cover 4 pixels before restarting the sequence. Component substitution follows what is described in SMPTE ST292 where $E'_{Y6-INT}$ is placed in the Y data segments, $E'_{Cb-INT}+E'_{Cy-INT}$ is placed in the Cb data segments, and $E'_{Cr-INT}+E'_{Cc-INT}$ is placed in the Cr data segments. The sequence described in the standard is shown as Y'00, Y'01, Y', etc.

Figure 78:
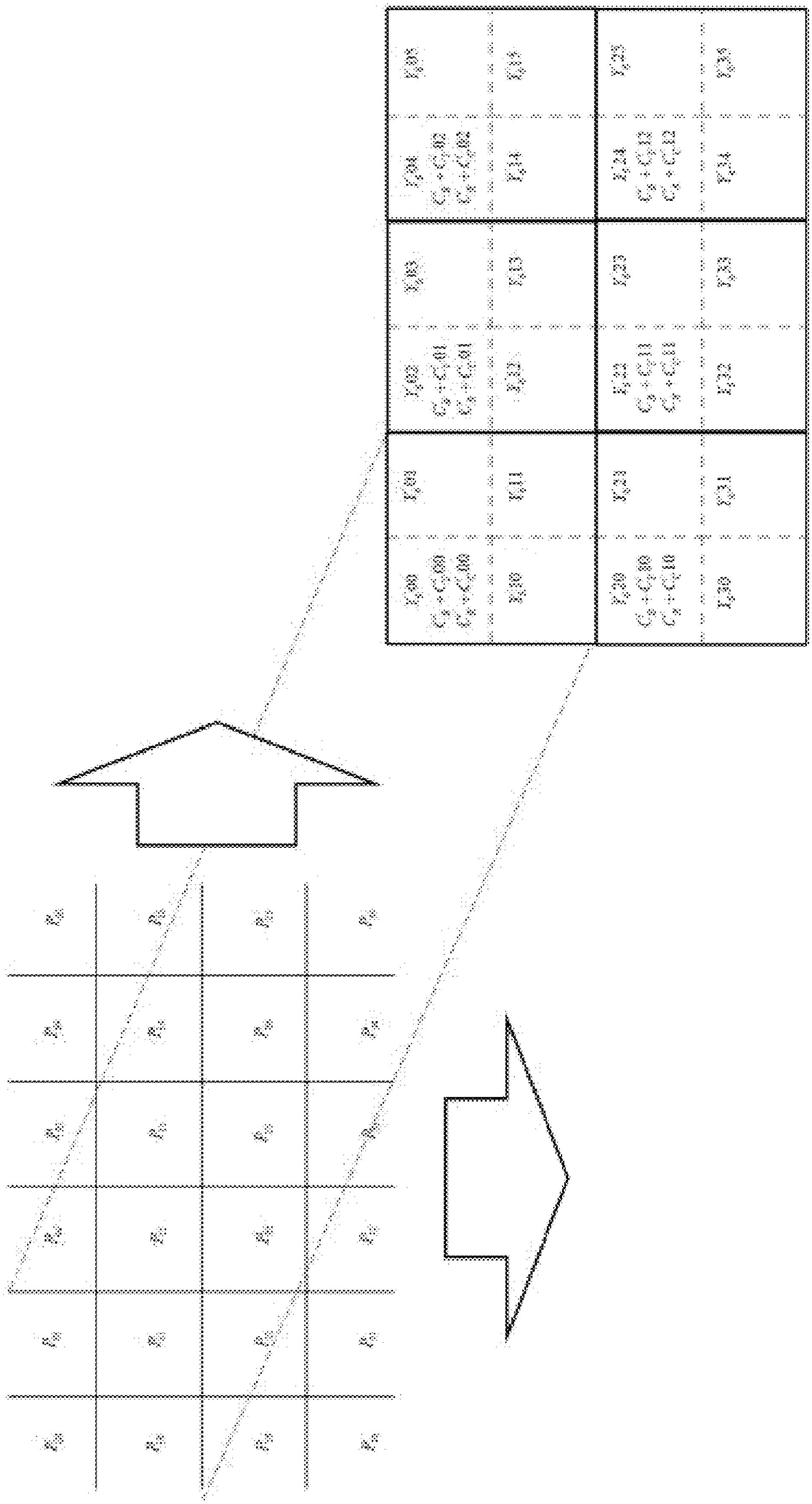
FIG. 78 illustrates sample placements of six-primary system components for a 4:2:0 sampling system image.

FIG. 78 illustrates sample placements of six-primary system components for a 4:2:0 sampling system image. This follows the substitutions illustrated in FIG. 77, using a 4:2:0 sampling system.

FIG. 79 illustrates modifications to SMPTE ST2110-20 for a 10-bit six-primary color system in 4:4:4 video. SMPTE ST2110-20 describes the construction of each "pgroup". Normally, six-primary color system data and/or content would arrive for mapping as non-linear. However, with the present system there is no restriction on mapping data and/or content. For 4:4:4, 10-bit video, 15 octets are used and cover 4 pixels before restarting the sequence. Non-linear, six-primary color system image data would arrive as $G'_{INT}$, $B'_{INT}$, $R'_{INT}$, $M'_{INT}$, $Y'_{INT}$, and $C'_{INT}$. The sequence described in the standard is shown as R0', G0', B0', R1', G1', B1', etc.

FIG. 80 illustrates modifications to SMPTE ST2110-20 for a 12-bit six-primary color system in 4:4:4 video. For 4:4:4, 12-bit video, 9 octets are used and cover 2 pixels before restarting the sequence. Non-linear, six-primary color system image data would arrive as $G'_{INT}$, $B'_{INT}$, $R'_{INT}$, $M'_{INT}$, $Y'_{INT}$, and $C'_{INT}$. The sequence described in the standard is shown as R0', G0', B0', R1', G1', B1', etc.

FIG. 81 illustrates modifications to SMPTE ST2110-20 for a 10-bit six primary color system in 4:2:2 video. Components that are delivered to a SMPTE ST2110 pgroup include, but are not limited to, $E'_{Yrgb-INT}$, $E'_{Ycym-INT}$, $E'_{Cb-INT}$, $E'_{Cr-INT}$, $E'_{Cy-INT}$, and $E'_{Cc-INT}$. For 4:2:2, 10-bit video, 5 octets are used and cover 2 pixels before restarting the sequence. For 4:2:2:2, 12-bit video, 6 octets are used and cover 2 pixels before restarting the sequence. Component substitution follows what is described for SMPTE ST292, where $E'_{Yrgb-INT}$ or $E'_{Ycym-INT}$ are placed in the Y data segments, $E'_{Cr-INT}$ or $E'_{Cc-INT}$ are placed in the Cr data segments, and $E'_{Cb-INT}$ or $E'_{Cy-INT}$ are placed in the Cb data segments. The sequence described in the standard is shown as Cb'0, Y'0, Cr'0, Y'1, Cb'1, Y'2, Cr'1, Y'3, Cb'2, Y'4, Cr'2, etc.

FIG. 82 illustrates modifications to SMPTE ST2110-20 for a 12-bit six-primary color system in 4:2:0 video. Components that are delivered to a SMPTE ST2110 pgroup are the same as with the 4:2:2 method. For 4:2:0, 10-bit video, 15 octets are used and cover 8 pixels before restarting the sequence. For 4:2:0, 12-bit video, 9 octets are used and cover 4 pixels before restarting the sequence. Component substitution follows what is described for SMPTE ST292, where $E'_{Yrgb-INT}$ or $E'_{Ycym-INT}$ are placed in the Y data segments, $E'_{Cr-INT}$ or $E'_{Cc-INT}$ are placed in the Cr data segments, and $E'_{Cb-INT}$ or $E'_{Cy-INT}$ are placed in the Cb data segments. The sequence described in the standard is shown as Y'00, Y'01, Y', etc.

Table 30 summarizes mapping to SMPTE ST2110 for 4:2:2:2:2 and 4:2:0:2:0 sampling for System 1 and Table 31 summaries mapping to SMPTE ST2110 for 4:4:4:4:4:4 sampling (linear and non-linear) for System 1.

TABLE 30

| | | Pgroup | | | |
|---|---|---|---|---|---|
| Sampling | Bit Depth | Octets | Pixels | Y PbPr Sample Order | 6P Sample Order |
| 4:2:2:2:2 | 8 | 4 | 2 | $C_B'$, Y0', $C_R'$, Y1' | |
| | 10 | 5 | 2 | $C_B'$, Y0', $C_R'$, Y1' | $C_B' + C_Y'$, Y0', $C_R' + C_C'$, Y1' |
| | 12 | 6 | 2 | $C_B'$, Y0', $C_R'$, Y1' | $C_B' + C_Y'$, Y0', $C_R' + C_C'$, Y1' |
| | 16, 16f | 8 | 2 | $C'_B$, Y'0, $C'_R$, Y'1 | $C_B' + C_Y'$, Y0', $C_R' + C_C'$, Y1' |
| 4:2:0:2:0 | 8 | 6 | 4 | Y'00, Y'01, Y'10, Y'11, $C_B'00$, $C_R'00$ | |
| | 10 | 15 | 8 | Y'00, Y'01, Y'10, Y'11, $C_B'00$, $C_R'00$ Y'02, Y'03, Y'12, Y'13, $C_B'01$, $C_R'01$ | Y'00, Y'01, Y'10, Y'11, $C_B'00 + C_Y'00$, $C_R'00 + C_C'00$ Y'02, Y'03, Y'12, Y'13, $C_B'01 + C_Y'01$, $C_R'01 + C_C'01$ |
| | 12 | 9 | 4 | Y'00, Y'01, Y'10, Y'11, $C_B'00$, $C_R'00$ | Y'00, Y'01, Y'10, Y'11, $C_B'00 + C_Y'00$, $C_R'00 + C_C'00$ |

TABLE 31

| | | pgroup | | | |
|---|---|---|---|---|---|
| Sampling | Bit Depth | Octets | pixels | RGB Sample Order | 6P Sample Order |
| 4:4:4:4:4:4 | 8 | 3 | 1 | R, G, B | |
| Linear | 10 | 15 | 4 | R0, G0, B0, R1, G1, B1, R2, G2, B2 | R + C0, G + M0, B + Y0, R + C1, G + M1, B + Y1, R + C2, G + M2, B + Y2 |
| | 12 | 9 | 2 | R0, G0, B0, R1, G1, B1 | R + C0, G + M0, B + Y0, R + C1, G + M1, B + Y1 |
| | 16, 16f | 6 | 1 | R, G, B | R + C, G + M, B + Y |
| 4:4:4:4:4:4 | 8 | 3 | 1 | R', G', B' | |
| Non-Linear | 10 | 15 | 4 | R0', G0', B0', R1', G1', B1', R2', G2', B2' | R' + C'0, G' + M'0, B' + Y'0, R' + C'1, G' + M'1, B' + Y'1, R' + C'2, G' + M'2, B' + Y'2 |
| | 12 | 9 | 2 | R0', G0', B0', R1', G1', B1' | R' + C'0, G' + M'0, B' + Y'0, R' + C'1, G' + M'1, B' + Y'1 |
| | 16, 16f | 6 | 1 | R', G', B' | R' + C', G' + M', B' + Y' |

Table 32 summarizes mapping to SMPTE ST2110 for 4:2:2:2:2 sampling for System 2 and Table 33 summaries mapping to SMPTE ST2110 for 4:4:4:4:4:4 sampling (linear and non-linear) for System 2.

TABLE 32

| Sampling | Bit Depth | pgroup octets | pgroup pixels | Y PbPr Sample Order | 6P Sample Order |
|---|---|---|---|---|---|
| 4:2:2:2:2 | 8 | 8 | 2 | $C_B$', Y0', $C_R$', Y1' | $C_B$', $C_Y$', $Y_{RGB}$0', $C_R$', $C_C$', $Y_{CMY}$0' $C_B$', $C_Y$ ', $Y_{RGB}$1' |
| | 10 | 10 | 2 | $C_B$', Y0', $C_R$', Y1' | $C_B$', $C_Y$', $Y_{RGB}$0', $C_R$', $C_C$', $Y_{CMY}$0' $C_B$', $C_Y$', $Y_{RGB}$1' |
| | 12 | 12 | 2 | $C_B$', Y0', $C_R$', Y1' | $C_B$', $C_Y$', $Y_{RGB}$0', $C_R$', $C_C$', $Y_{CMY}$0' $C_B$', $C_Y$', $Y_{RGB}$1' |
| | 16, 16f | 16 | 2 | C'$_B$, Y'0, C'$_R$, Y'1 | $C_B$', $C_Y$', $Y_{RGB}$0', $C_R$', $C_C$', $Y_{CMY}$0' $C_B$', $C_Y$', $Y_{RGB}$1' |

TABLE 33

| Sampling | Bit Depth | pgroup octets | pgroup pixels | RGB Sample Order | 6P Sample Order |
|---|---|---|---|---|---|
| 4:4:4:4:4:4 | 8 | 3 | 1 | R, G, B | R, C, G, M, B, Y |
| Linear | 10 | 15 | 4 | R0, G0, B0, R1, G1, B1, R2, G2, B2 | R0, C0, G0, M0, B0, Y0, R1, C1, G1, M1, B1, Y1, R2, C2, G2, M2, B2 + Y2 |
| | 12 | 9 | 2 | R0, G0, B0, R1, G1, B1 | R0, C0, G0, M0, B0, Y0, R1, C1, G1, M1, B1, Y1 |
| | 16, 16f | 6 | 1 | R, G, B | R, C, G, M, B, Y |
| 4:4:4:4:4:4 | 8 | 3 | 1 | R', G', B' | R', C', G', M', B', Y' |
| Non-Linear | 10 | 15 | 4 | R0', G0', B0', R1', G1', B1', R2', G2 ', B2 ' | R0', C0', G0', M0', B0', Y0', R1', C1', G1', M1', B1', Y1', R2', C2', G2', M2', B2' + Y2' |
| | 12 | 9 | 2 | R0', G0', B0', R1', G1', B1' | R0', C0', G0', M0', B0', Y0', R1', C1', G1', M1', B1', Y1' |
| | 16, 16f | 6 | 1 | R', G', B' | R', C', G', M', B', Y' |

Session Description Protocol (Sdp) Modification for a Six-Primary Color System

SDP is derived from IETF RFC 4566 which sets parameters including, but not limited to, bit depth and sampling parameters. IETF RFC 4566 (2006) is incorporated herein by reference in its entirety. In one embodiment, SDP parameters are contained within the RTP payload. In another embodiment, SDP parameters are contained within the media format and transport protocol. This payload information is transmitted as text. Therefore, modifications for the additional sampling identifiers requires the addition of new parameters for the sampling statement. SDP parameters include, but are not limited to, color channel data, image data, framerate data, a sampling standard, a flag indicator, an active picture size code, a timestamp, a clock frequency, a frame count, a scrambling indicator, and/or a video format indicator. For non-constant luminance imaging, the additional parameters include, but are not limited to, RGBCMY-4:4:4, YBRCY-4:2:2, and YBRCY-4:2:0. For constant luminance signals, the additional parameters include, but are not limited to, CLYBRCY-4:2:2 and CLYBRCY-4:2:0.

Additionally, differentiation is included with the colorimetry identifier in one embodiment. For example, 6PB1 defines 6P with a color gamut limited to ITU-R BT.709 formatted as System 1, 6PB2 defines 6P with a color gamut limited to ITU-R BT.709 formatted as System 2, 6PB3 defines 6P with a color gamut limited to ITU-R BT.709 formatted as System 3, 6PC1 defines 6P with a color gamut limited to SMPTE RP 431-2 formatted as System 1, 6PC2 defines 6P with a color gamut limited to SMPTE RP 431-2 formatted as System 2, 6PC3 defines 6P with a color gamut limited to SMPTE RP 431-2 formatted as System 3, 6PS1 defines 6P with a color gamut as Super 6P formatted as System 1, 6PS2 defines 6P with a color gamut as Super 6P formatted as System 2, and 6PS3 defines 6P with a color gamut as Super 6P formatted as System 3.

Colorimetry is also operable to be defined between a six-primary color system using the ITU-R BT.709-6 standard and the SMPTE ST431-2 standard, or colorimetry is operable to be left defined as is standard for the desired standard. For example, the SDP parameters for a 1920×1080 six-primary color system using the ITU-R BT.709-6 standard with a 10-bit signal as System 1 are as follows: m=video 30000 RTP/AVP 112, a=rtpmap:112 raw/90000, a=fmtp:112, sampling=YBRCY-4:2:2, width=1920, height=1080, exactframerate=30000/1001, depth=10, TCS=SDR, colorimetry=6PB1, PM=2110GPM, SSN=ST2110-20:2017.

In one embodiment, the six-primary color system is integrated with a Consumer Technology Association (CTA) 861-based system. CTA-861 establishes protocols, requirements, and recommendations for the utilization of uncompressed digital interfaces by consumer electronics devices including, but not limited to, digital televisions (DTVs), digital cable, satellite or terrestrial set-top boxes (STBs), and related peripheral devices including, but not limited to, DVD players and/or recorders, and other related Sources or Sinks.

These systems are provided as parallel systems so that video content is parsed across several line pairs. This enables each video component to have its own transition-minimized differential signaling (TMDS) path. TMDS is a technology for transmitting high-speed serial data and is used by the Digital Visual Interface (DVI) and High-Definition Multimedia Interface (HDMI) video interfaces, as well as other digital communication interfaces. TMDS is similar to low-voltage differential signaling (LVDS) in that it uses differential signaling to reduce electromagnetic interference (EMI), enabling faster signal transfers with increased accuracy. In addition, TMDS uses a twisted pair for noise reduction, rather than a coaxial cable that is conventional for carrying video signals. Similar to LVDS, data is transmitted serially over the data link. When transmitting video data, and using HDMI, three TMDS twisted pairs are used to transfer video data.

In such a system, each pixel packet is limited to 8 bits only. For bit depths higher than 8 bits, fragmented packs are used. This arrangement is no different than is already described in the current CTA-861 standard.

Based on CTA extension Version 3, identification of a six-primary color transmission would be performed by the sink device (e.g., the monitor). Adding recognition of the additional formats would be flagged in the CTA Data Block Extended Tag Codes (byte 3). Since codes 33 and above are reserved, any two bits are operable to be used to identify that the format is RGB, RGBCMY, Y Cb Cr, or Y Cb Cr Cc Cy and/or identify System 1 or System 2. Should byte 3 define a six-primary sampling format, and where the block 5 extension identifies byte 1 as ITU-R BT.709, then logic assigns as 6P-B. However, should byte 4 bit 7 identify colorimetry as DCI-P3, the color gamut would be assigned as 6P-C.

In one embodiment, the system alters the AVI Infoframe Data to identify content. AVI Infoframe Data is shown in Table 10 of CTA 861-G. In one embodiment, Y2=1, Y1=0, and Y0=0 identifies content as 6P 4:2:0:2:0. In another embodiment, Y2=1, Y1=0, and Y0=1 identifies content as Y Cr Cb Cc Cy. In yet another embodiment, Y2=1, Y1=1, and Y0=0 identifies content as RGBCMY.

Byte 2 C1=1, C0=1 identifies extended colorimetry in Table 11 of CTA 861-G. Byte 3 EC2, EC1, EC0 identifies additional colorimetry extension valid in Table 13 of CTA 861-G. Table 14 of CTA 861-G reserves additional extensions. In one embodiment, ACE3=1, ACE2=0, ACE1=0, and ACE0=X identifies 6P-B. In one embodiment, ACE3=0, ACE2=1, ACE1=0, and ACE0=X identifies 6P-C. In one embodiment, ACE3=0, ACE2=0, ACE1=1, and ACE0=X identifies System 1. In one embodiment, ACE3=1, ACE2=1, ACE1=0, and ACE0=X identifies System 2.

Figure 83:
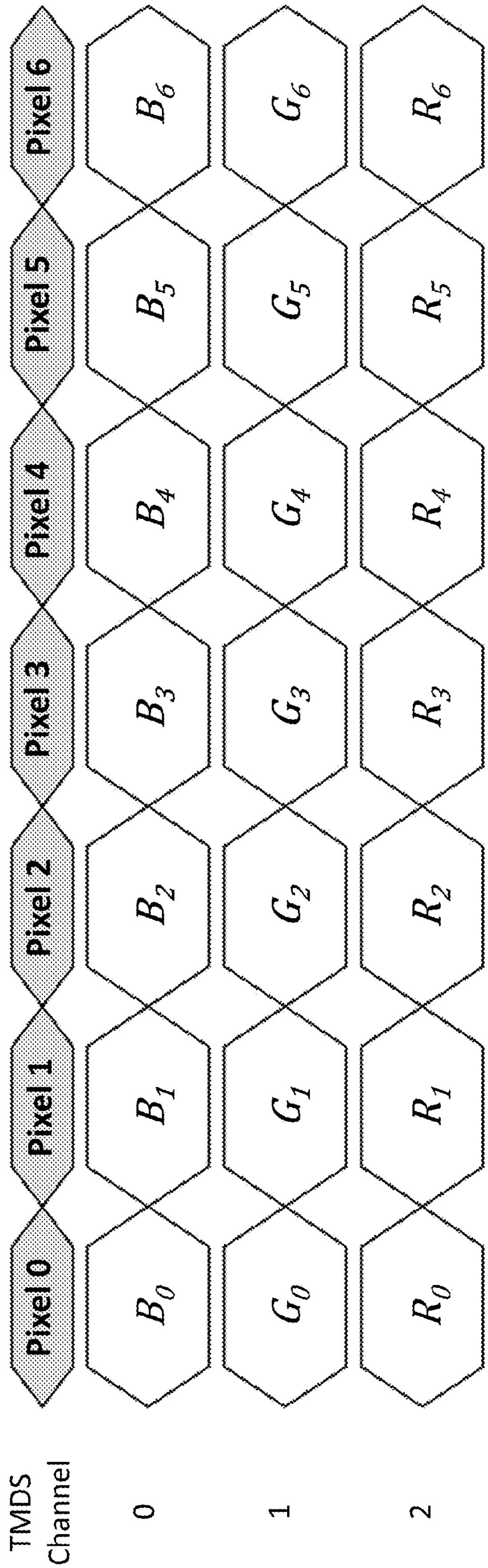
FIG. 83 illustrates an RGB sampling transmission for a 4:4:4 sampling system.
Figure 84:
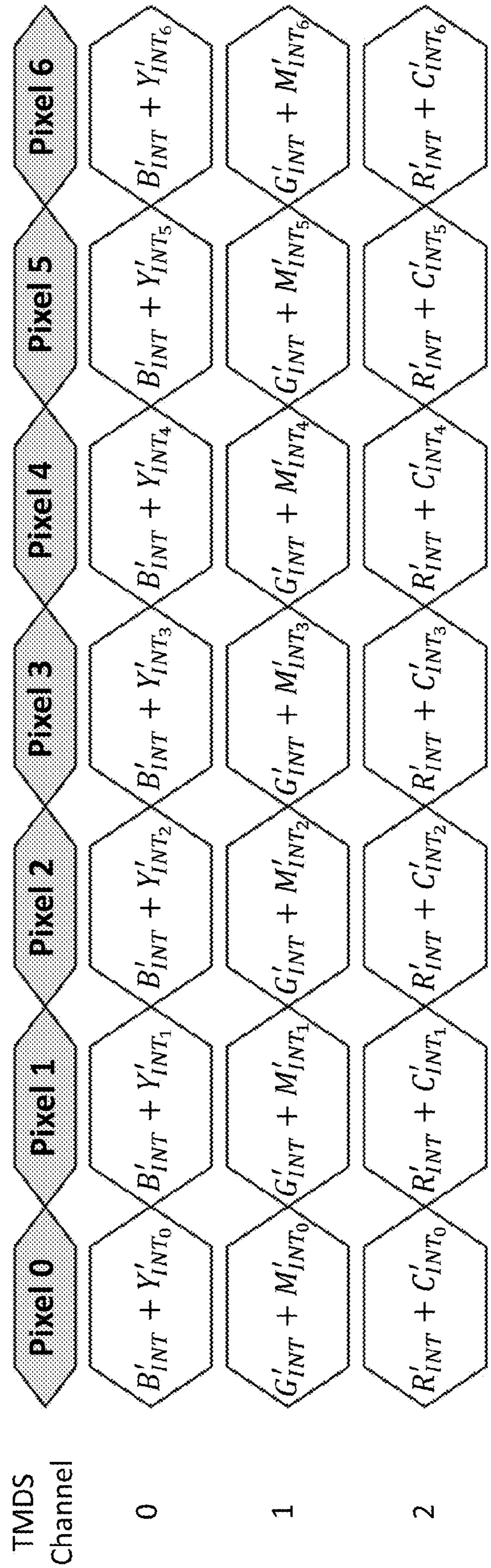
FIG. 84 illustrates a RGBCMY sampling transmission for a 4:4:4 sampling system.
Figure 85:
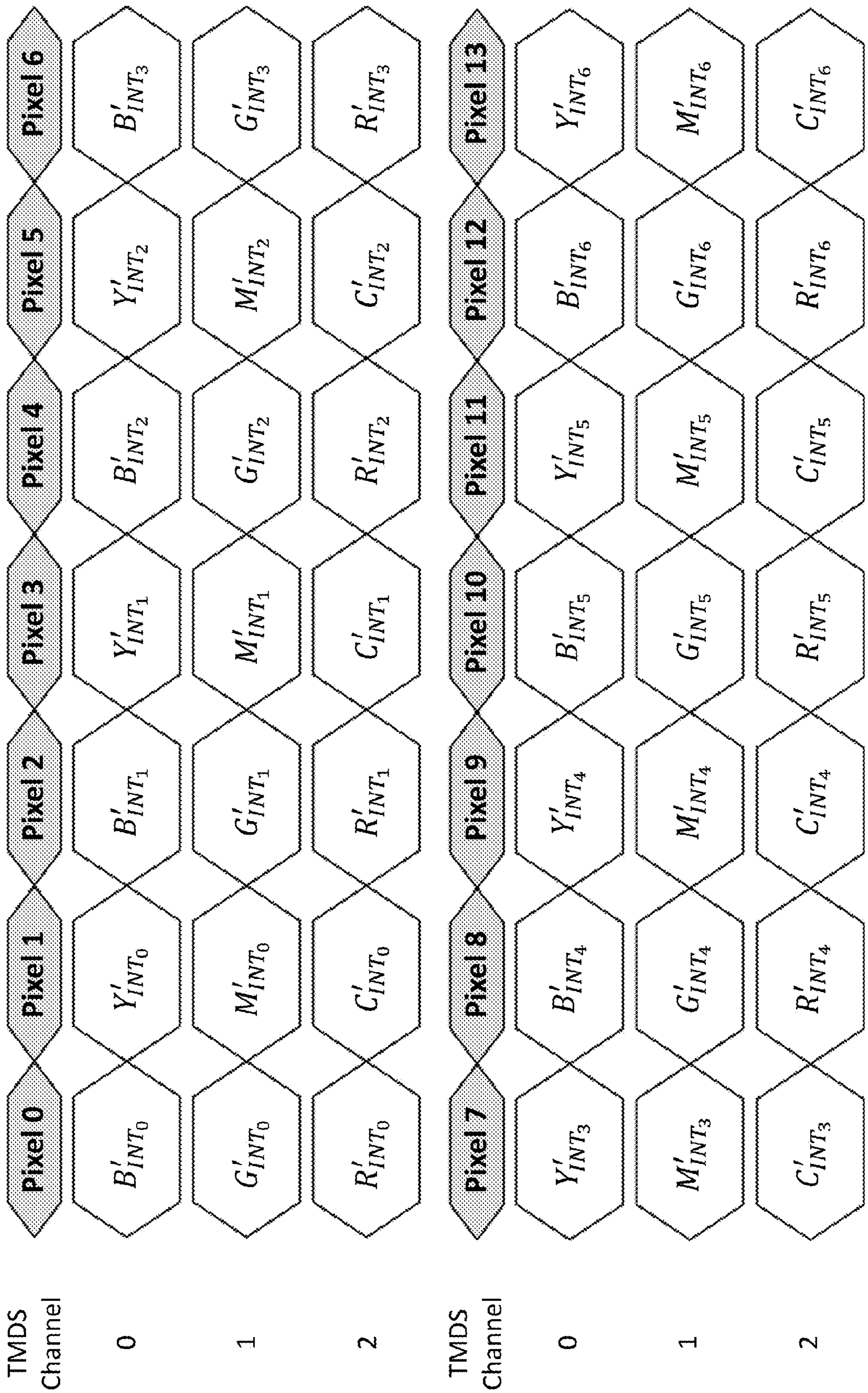
FIG. 85 illustrates an example of System 2 to RGBCMY 4:4:4 transmission.
Figure 86:
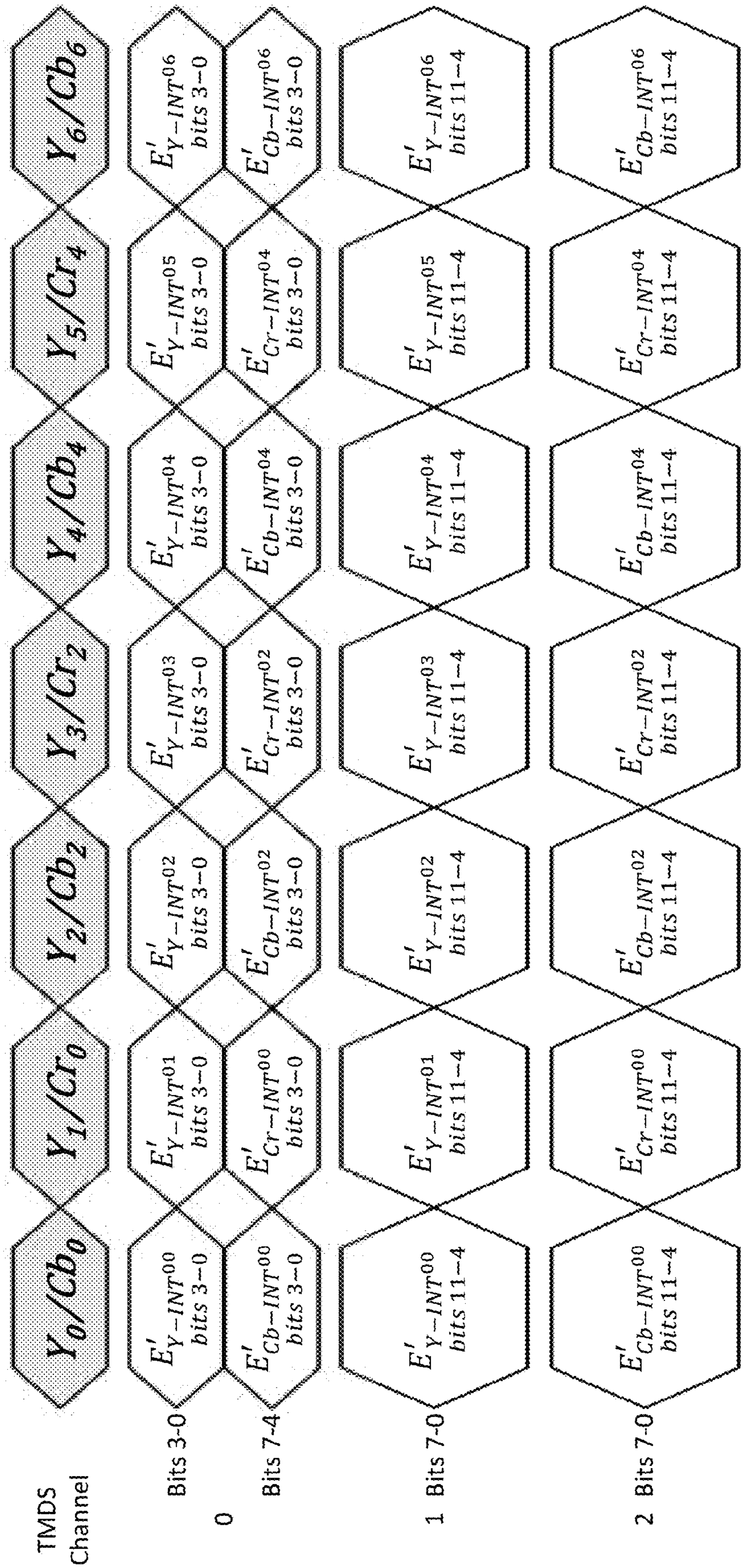
FIG. 86 illustrates a Y Cb Cr sampling transmission using a 4:2:2 sampling system.
Figure 87:
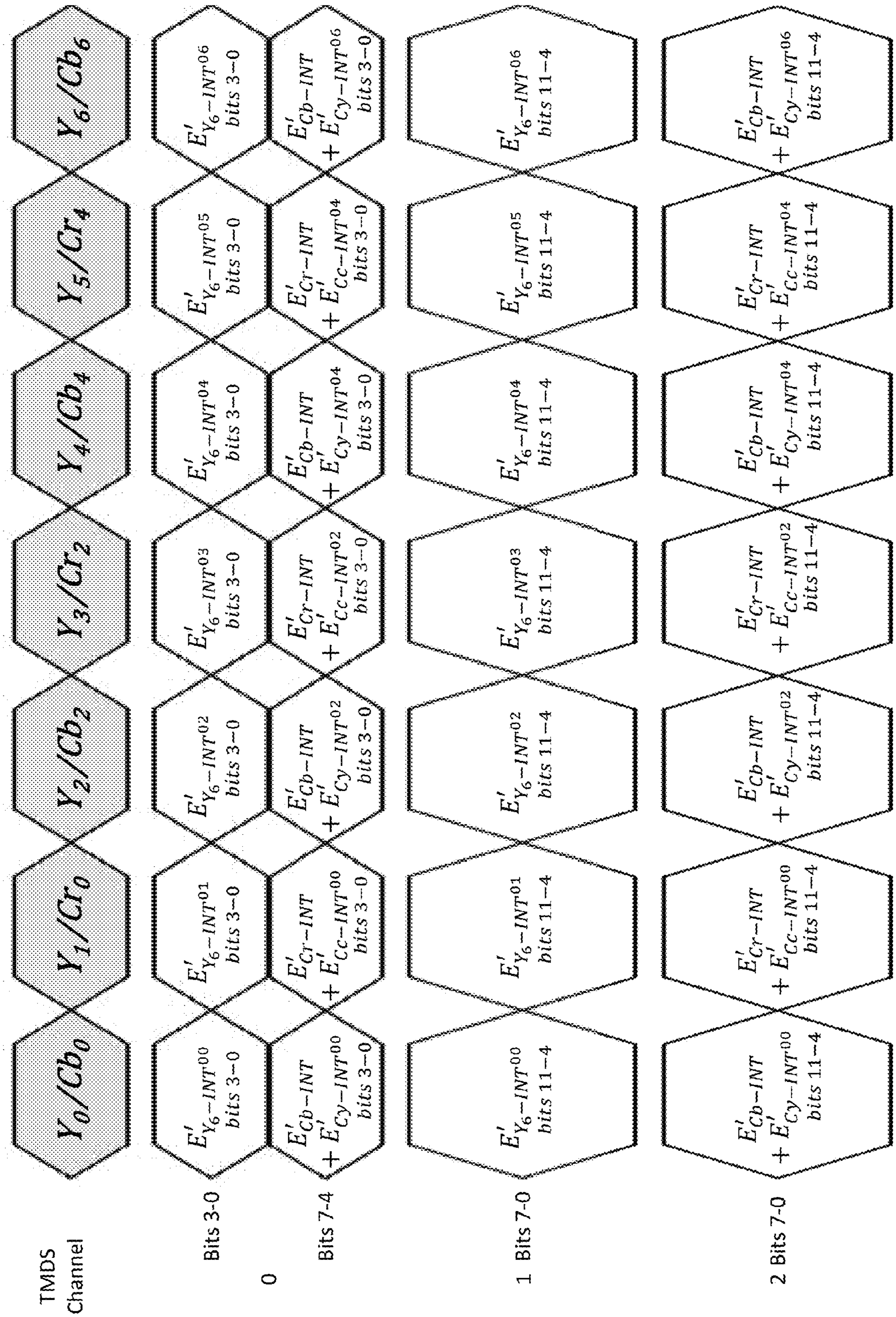
FIG. 87 illustrates a Y Cr Cb Cc Cy sampling transmission using a 4:2:2 sampling system.
Figure 88:
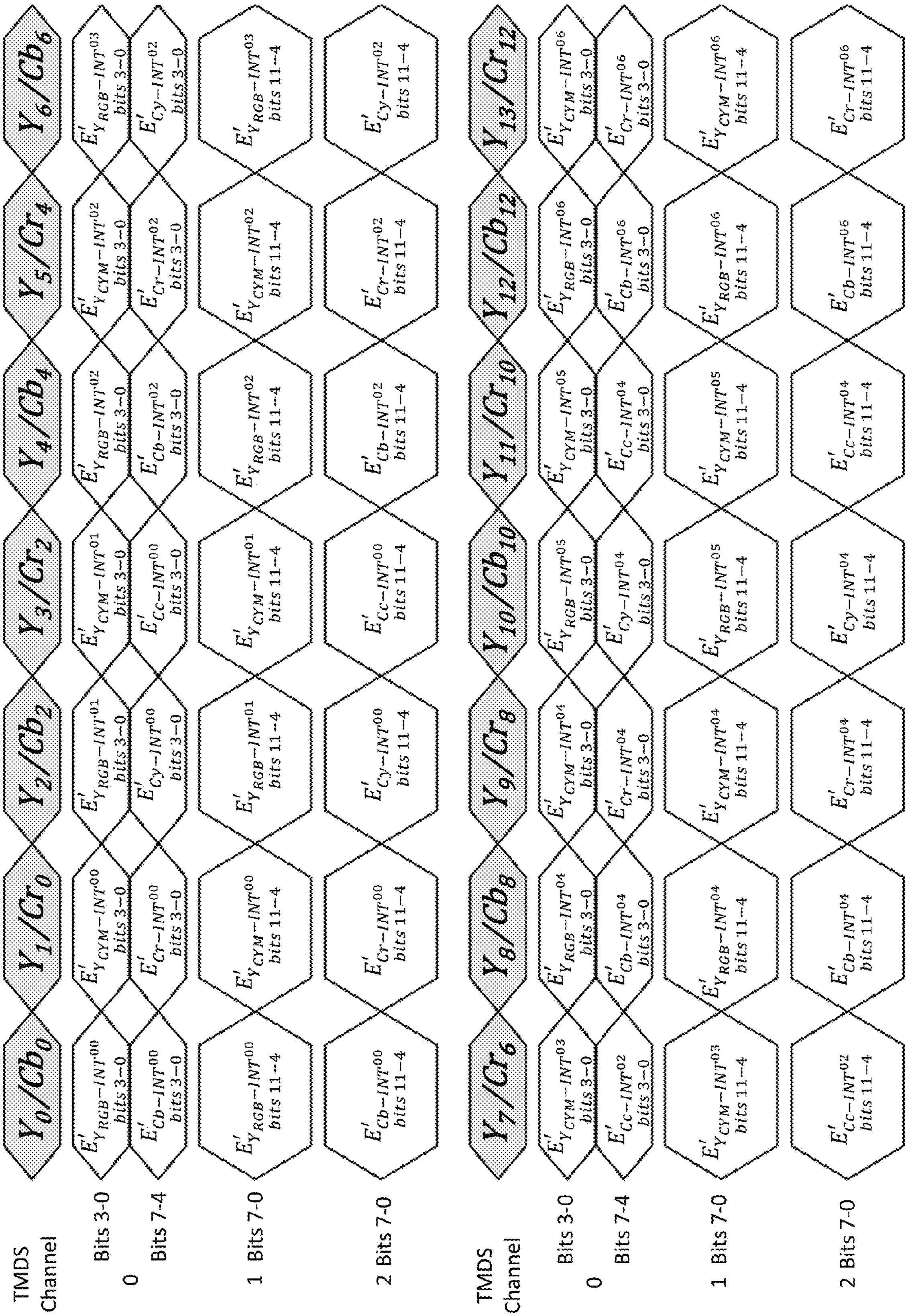
FIG. 88 illustrates an example of a System 2 to Y Cr Cb Cc Cy 4:2:2 Transmission as non-constant luminance.
Figure 89:
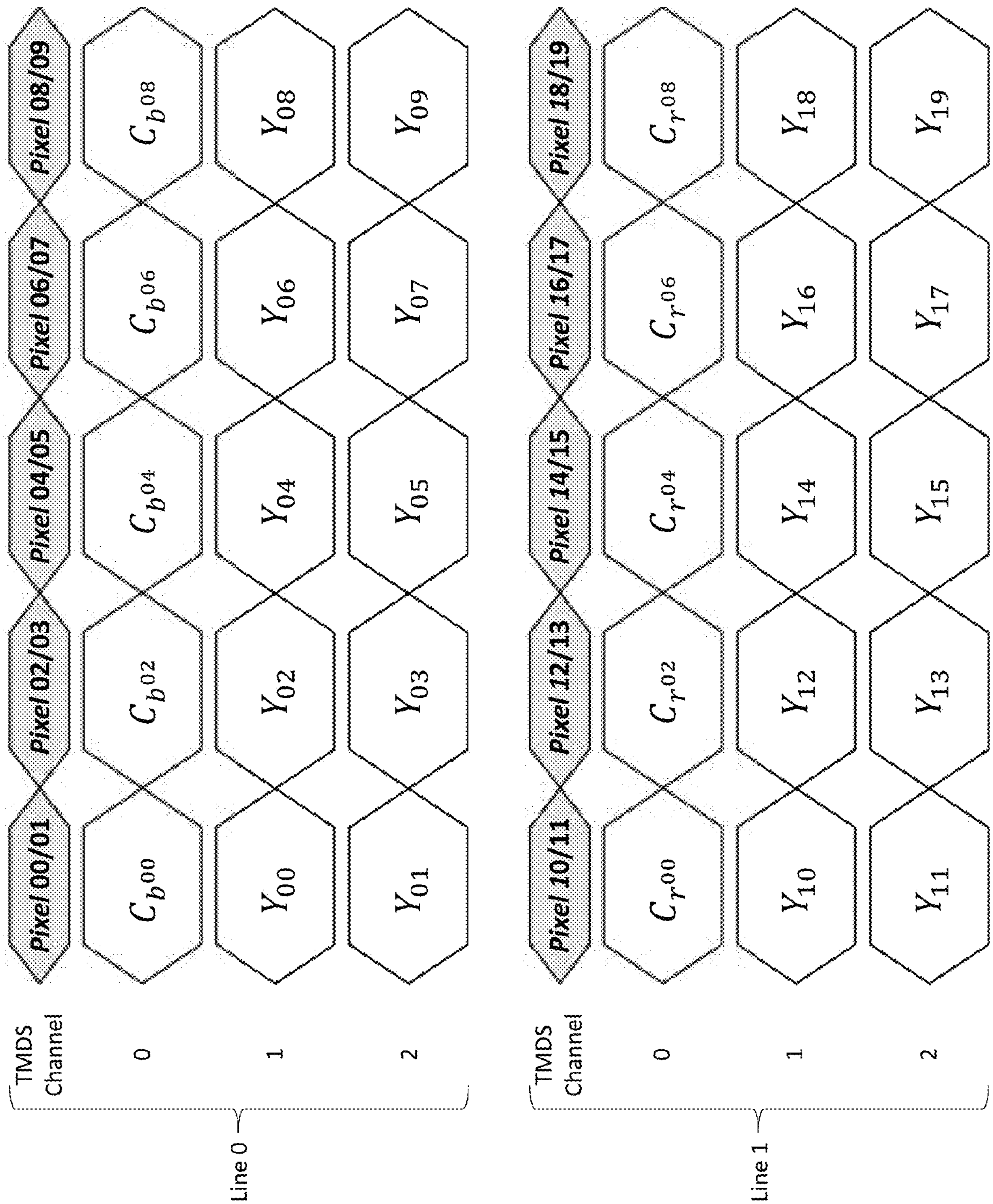
FIG. 89 illustrates a Y Cb Cr sampling transmission using a 4:2:0 sampling system.
Figure 90:
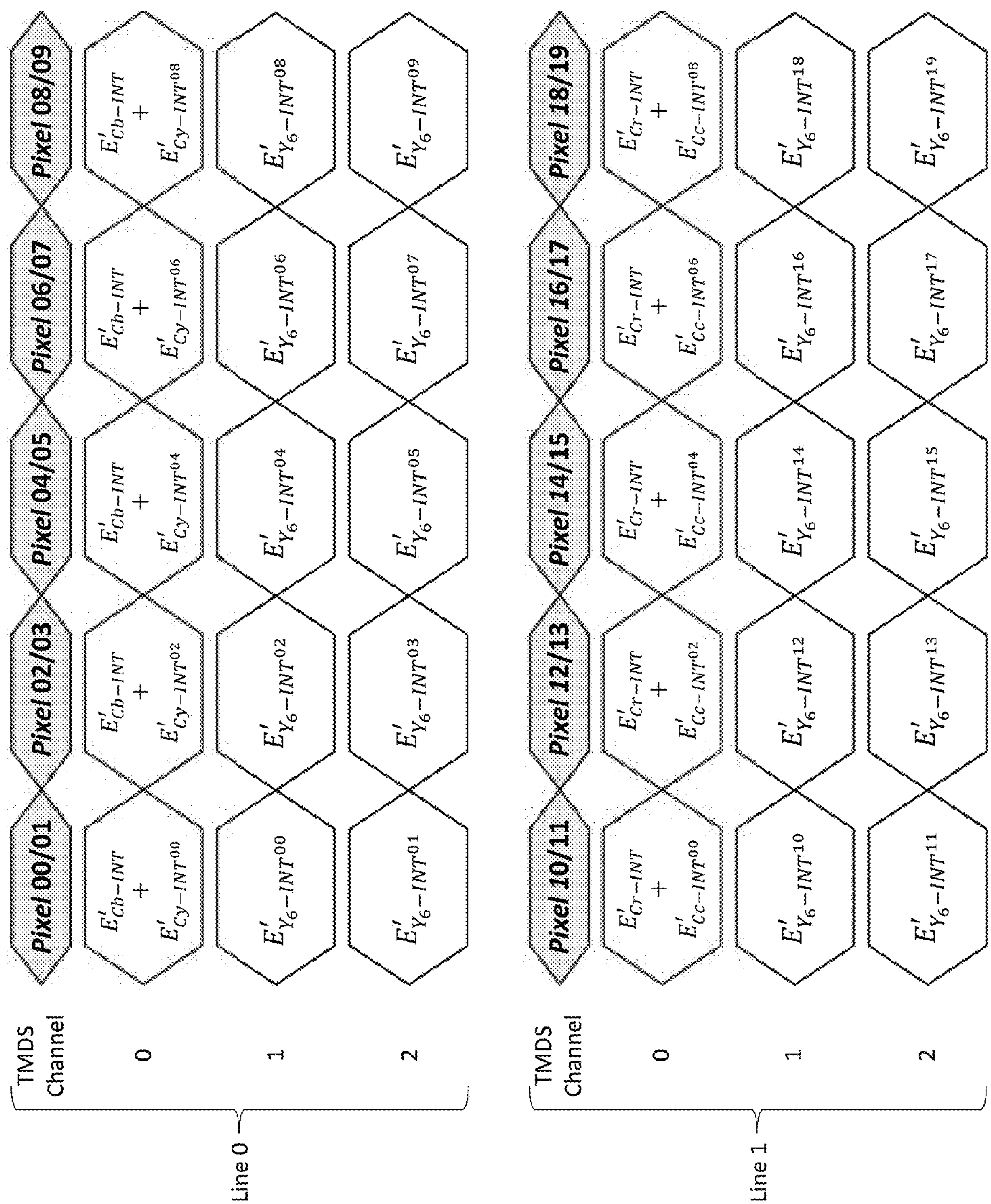

FIG. 83 illustrates the current RGB sampling structure for 4:4:4 sampling video data transmission. For HDMI 4:4:4 sampling, video data is sent through three TMDS line pairs. FIG. 84 illustrates a six-primary color sampling structure, RGBCMY, using System 1 for 4:4:4 sampling video data transmission. In one embodiment, the six-primary color sampling structure complies with CTA 861-G, November 2016, Consumer Technology Association, which is incorporated herein by reference in its entirety. FIG. 85 illustrates an example of System 2 to RGBCMY 4:4:4 transmission. FIG. 86 illustrates current Y Cb Cr 4:2:2 sampling transmission as non-constant luminance. FIG. 87 illustrates a six-primary color system (System 1) using Y Cr Cb Cc Cy 4:2:2 sampling transmission as non-constant luminance. FIG. 88 illustrates an example of a System 2 to Y Cr Cb Cc Cy 4:2:2 Transmission as non-constant luminance. In one embodiment, the Y Cr Cb Cc Cy 4:2:2 sampling transmission complies with CTA 861-G, November 2016, Consumer Technology Association. FIG. 89 illustrates current Y Cb Cr 4:2:0 sampling transmission. FIG. 90 illustrates a six-primary color system (System 1) using Y Cr Cb Cc Cy 4:2:0 sampling transmission.

HDMI sampling systems include Extended Display Identification Data (EDID) metadata. EDID metadata describes the capabilities of a display device to a video source. The data format is defined by a standard published by the Video Electronics Standards Association (VESA). The EDID data structure includes, but is not limited to, manufacturer name and serial number, product type, phosphor or filter type, timings supported by the display, display size, luminance data, and/or pixel mapping data. The EDID data structure is modifiable and modification requires no additional hardware and/or tools.

EDID information is transmitted between the source device and the display through a display data channel (DDC), which is a collection of digital communication protocols created by VESA. With EDID providing the display information and DDC providing the link between the display and the source, the two accompanying standards enable an information exchange between the display and source.

In addition, VESA has assigned extensions for EDID. Such extensions include, but are not limited to, timing extensions (00), additional time data black (CEA EDID Timing Extension (02)), video timing block extensions (VTB-EXT (10)), EDID 2.0 extension (20), display information extension (DI-EXT (40)), localized string extension (LS-EXT (50)), microdisplay interface extension (MI-EXT (60)), display ID extension (70), display transfer characteristics data block (DTCDB (A7, AF, BF)), block map (F0), display device data block (DDDB (FF)), and/or extension defined by monitor manufacturer (FF).

In one embodiment, SDP parameters include data corresponding to a payload identification (ID) and/or EDID information.

Multi-Primary Color System Display

Figure 91:
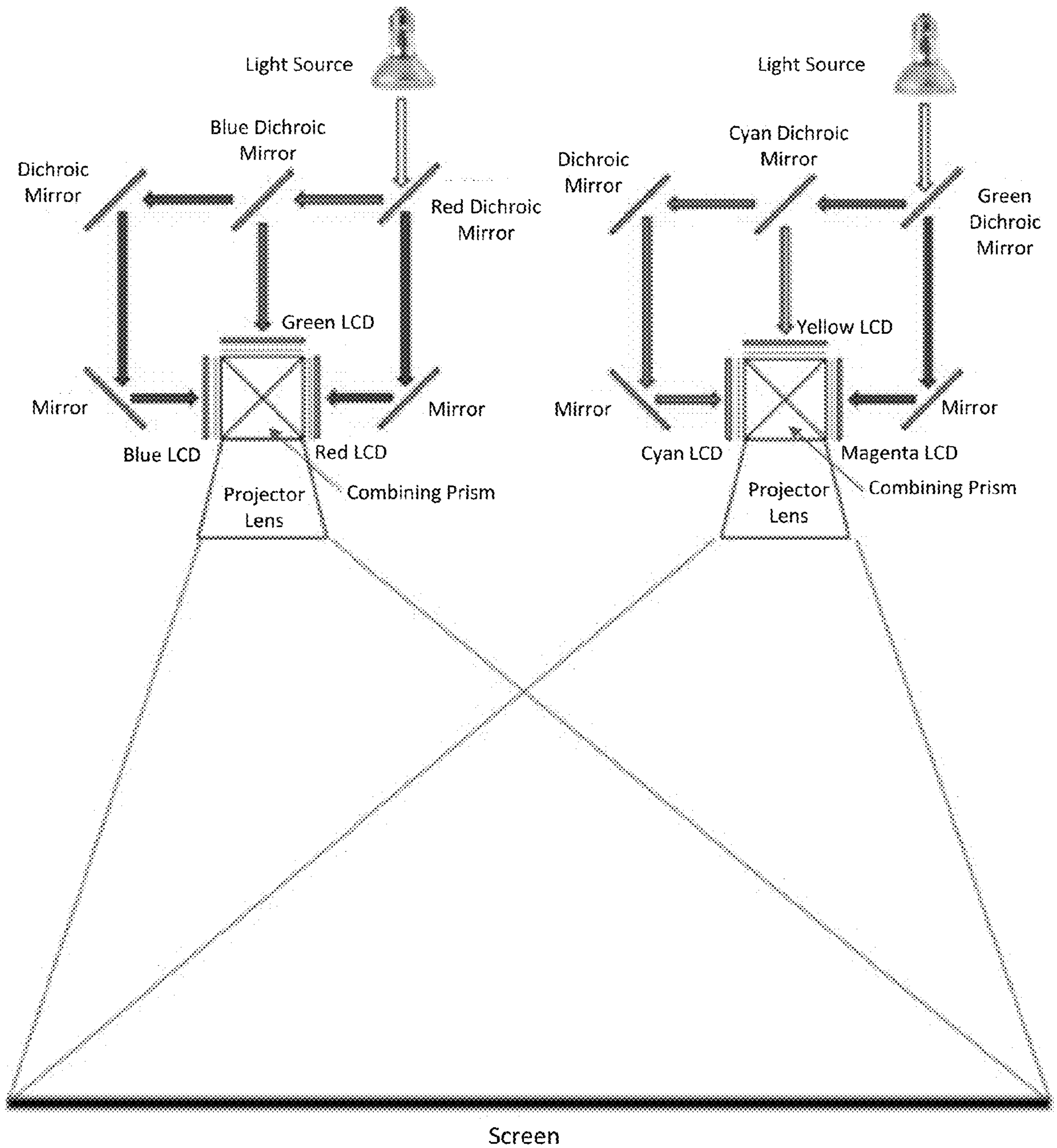

FIG. 91 illustrates a dual stack LCD projection system for a six-primary color system. In one embodiment, the display is comprised of a dual stack of projectors. This display uses two projectors stacked on top of one another or placed side by side. Each projector is similar, with the only difference being the color filters in each unit. Refresh and pixel timings are synchronized, enabling a mechanical alignment between the two units so that each pixel overlays the same position between projector units. In one embodiment, the two projectors are Liquid-Crystal Display (LCD) projectors. In another embodiment, the two projectors are Digital Light Processing (DLP) projectors. In yet another embodiment, the two projectors are Liquid-Crystal on Silicon (LCOS) projectors. In yet another embodiment, the two projectors are Light-Emitting Diode (LED) projectors.

Figure 92:
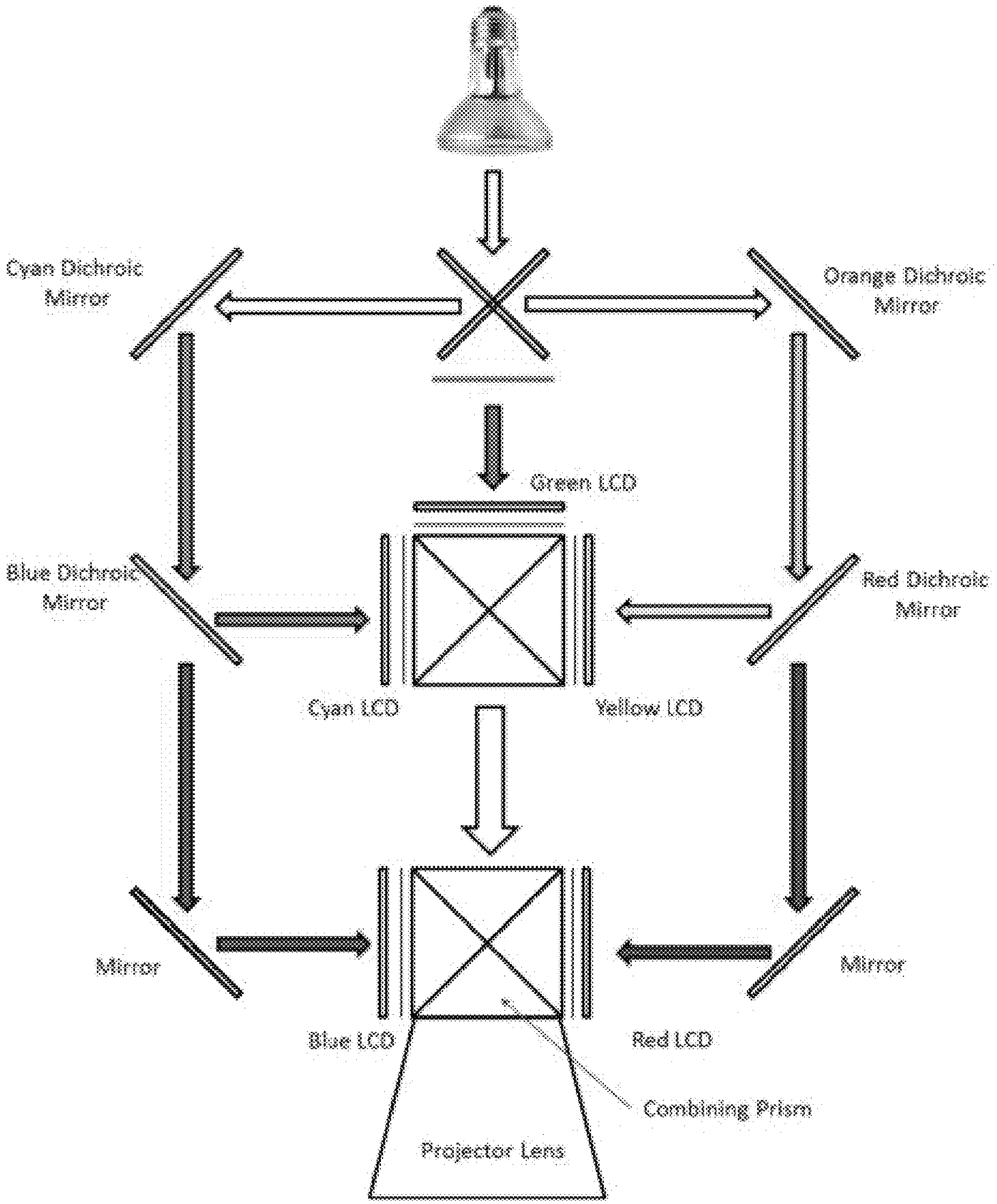

In one embodiment, the display is comprised of a single projector. A single projector six-primary color system requires the addition of a second cross block assembly for the additional colors. One embodiment of a single projector (e.g., single LCD projector) is shown in FIG. 92. A single projector six-primary color system includes a cyan dichroic mirror, an orange dichroic mirror, a blue dichroic mirror, a red dichroic mirror, and two additional standard mirrors. In one embodiment, the single projector six-primary color system includes at least six mirrors. In another embodiment, the single projector six-primary color system includes at least two cross block assembly units.

Figure 93:
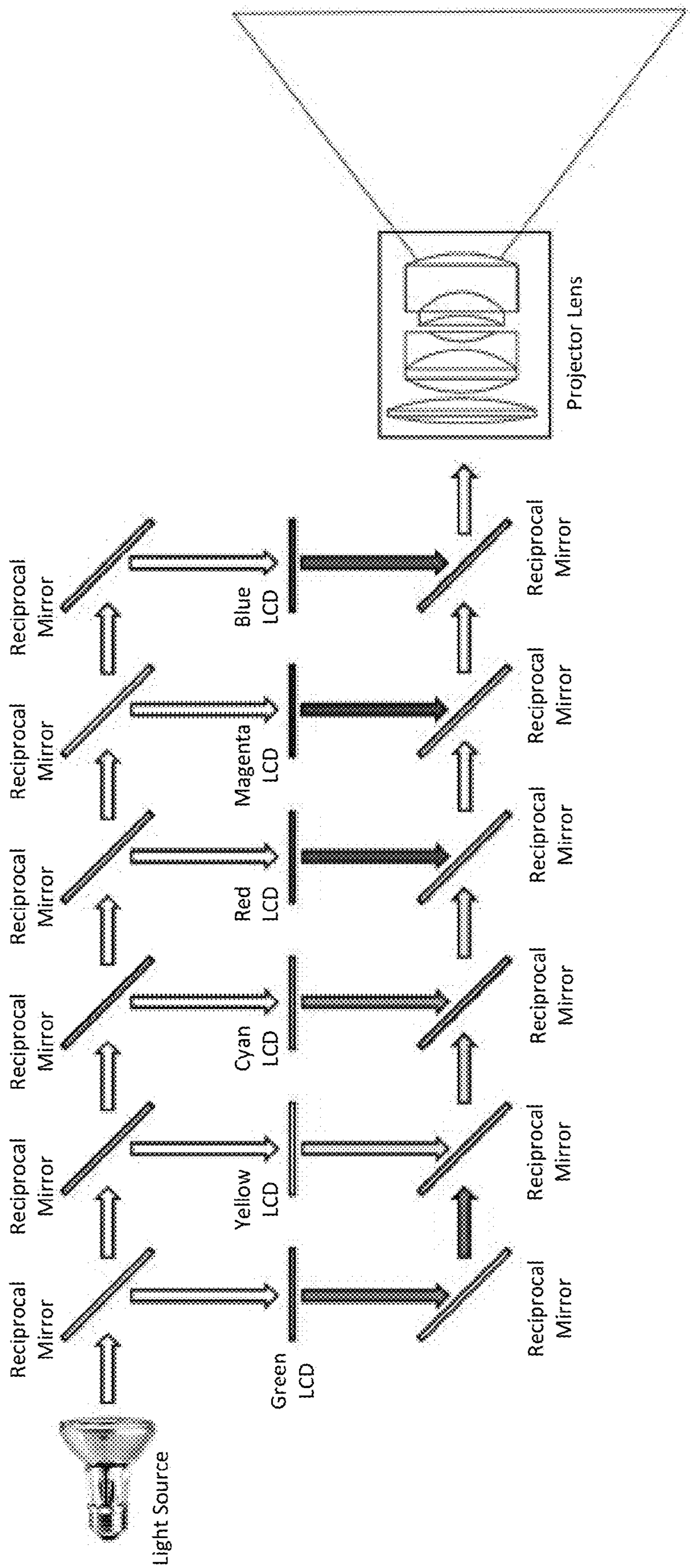

FIG. 93 illustrates a six-primary color system using a single projector and reciprocal mirrors. In one embodiment, the display is comprised of a single projector unit working in combination with at first set of at least six reciprocal mirrors, a second set of at least six reciprocal mirrors, and at least six LCD units. Light from at least one light source emits towards the first set of at least six reciprocal mirrors. The first set of at least six reciprocal mirrors reflects light towards at least one of the at least six LCD units. The at least six LCD units include, but are not limited to, a Green LCD, a Yellow LCD, a Cyan, LCD, a Red LCD, a Magenta LCD, and/or a Blue LCD. Output from each of the at least six LCDs is received by the second set of at least six reciprocal mirrors. Output from the second set of at least six reciprocal mirrors is sent to the single projector unit. Image data output by the single projector unit is output as a six-primary color system. In another embodiment, there are more than two sets of reciprocal mirrors. In another embodiment, more than one projector is used.

Figure 94:
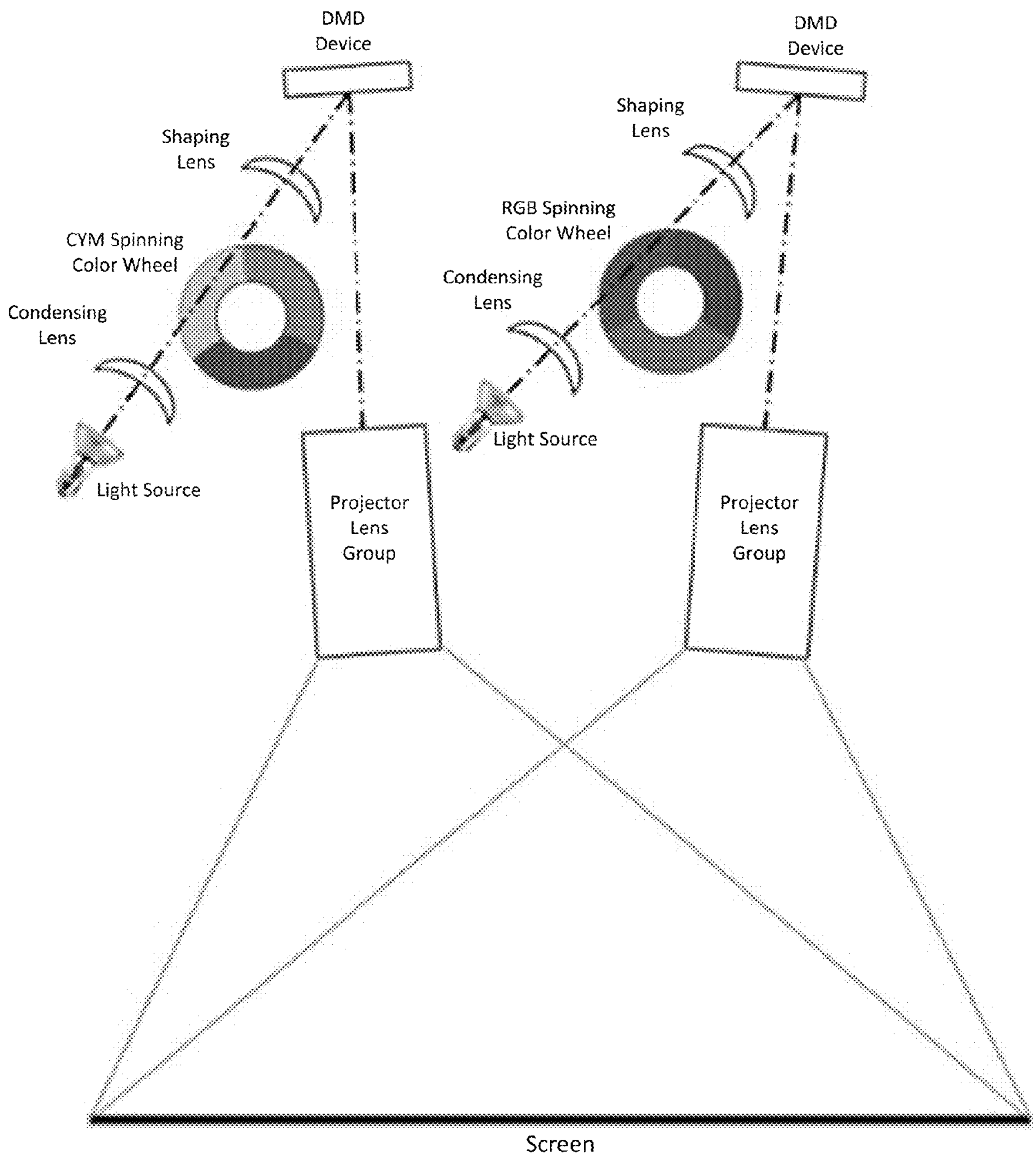

In another embodiment, the display is comprised of a dual stack Digital Micromirror Device (DMD) projector system. FIG. 94 illustrates one embodiment of a dual stack DMD projector system. In this system, two projectors are stacked on top of one another. In one embodiment, the dual stack DMD projector system uses a spinning wheel filter. In another embodiment, the dual stack DMD projector system uses phosphor technology. In one embodiment, the filter systems are illuminated by a xenon lamp. In another embodiment, the filter system uses a blue laser illuminator system. Filter systems in one projector are RGB, while the second projector uses a CMY filter set. The wheels for each projector unit are synchronized using at least one of an input video sync or a projector to projector sync, and timed so that the inverted colors are output of each projector at the same time.

In one embodiment, the projectors are phosphor wheel systems. A yellow phosphor wheel spins in time with a DMD imager to output sequential RG. The second projector is designed the same, but uses a cyan phosphor wheel. The output from this projector becomes sequential BG. Combined, the output of both projectors is YRGGCB. Magenta is developed by synchronizing the yellow and cyan wheels to overlap the flashing DMD.

Figure 95:
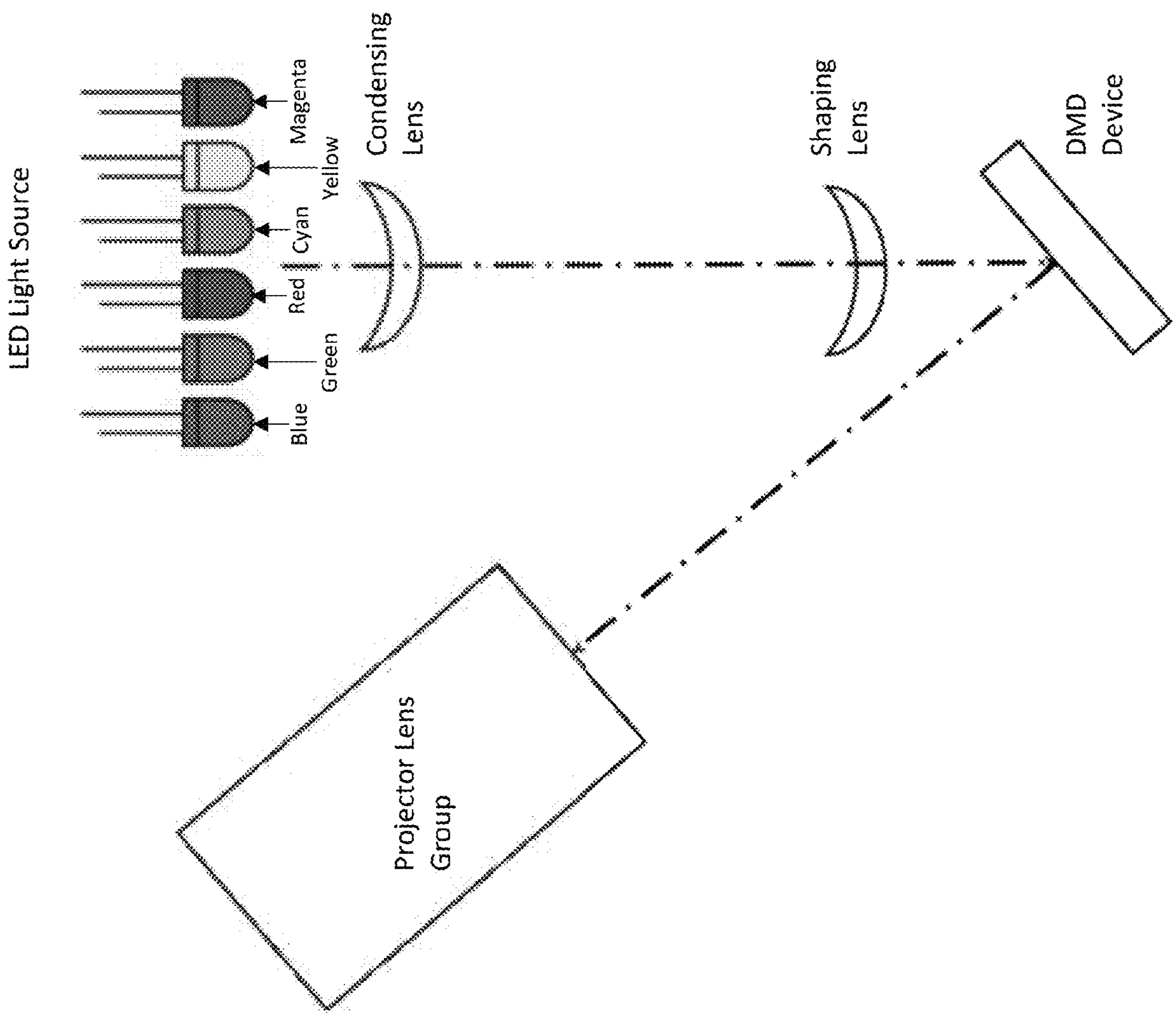

In another embodiment, the display is a single DMD projector solution. A single DMD device is coupled with an RGB diode light source system. In one embodiment, the DMD projector uses LED diodes. In one embodiment, the DMD projector includes CMY diodes. In another embodiment, the DMD projector creates CMY primaries using a double flashing technique. FIG. 95 illustrates one embodiment of a single DMD projector solution.

Figure 96:
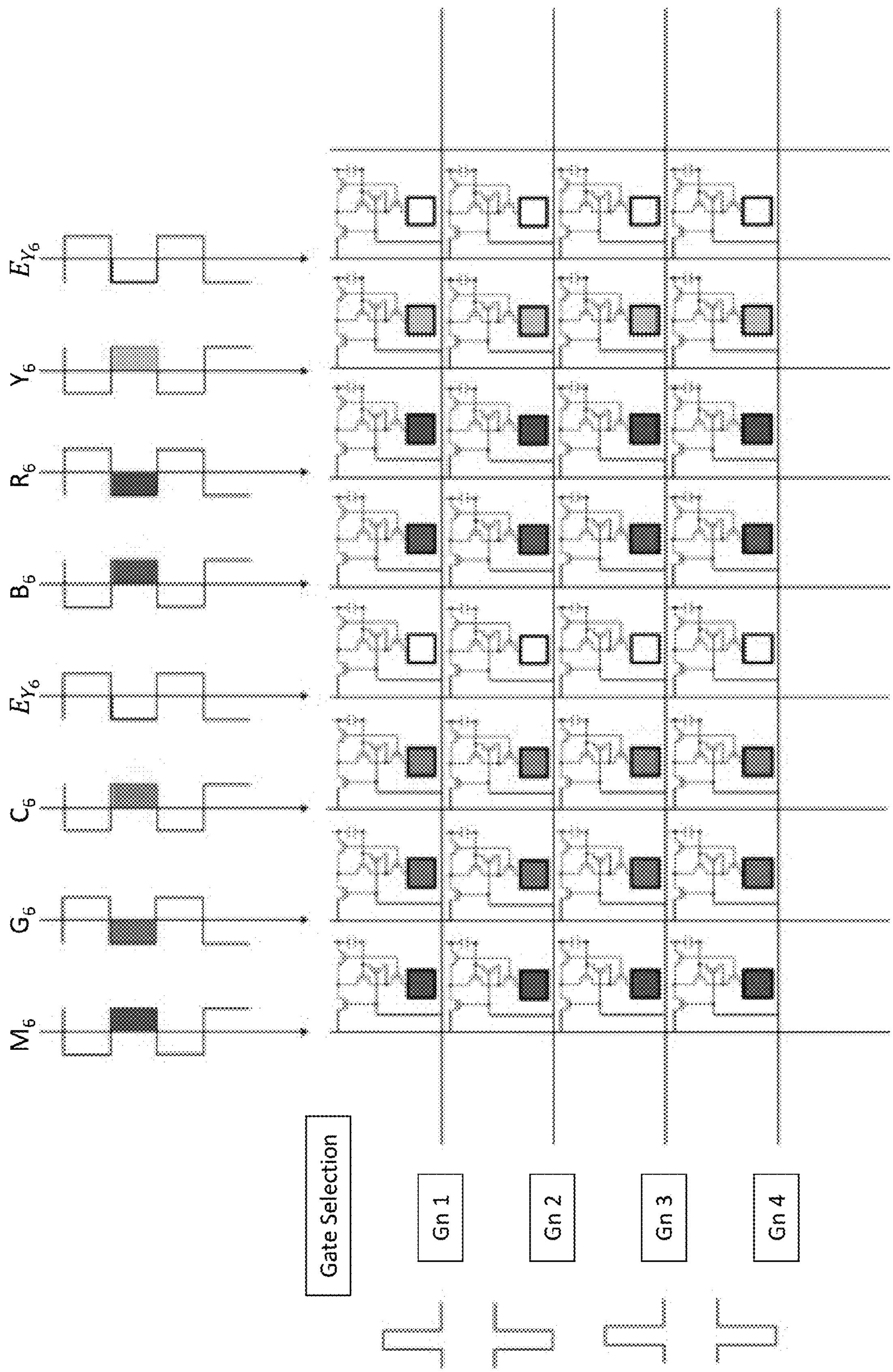

FIG. 96 illustrates one embodiment of a six-primary color system using a white OLED display. In yet another embodiment, the display is a white OLED monitor. Current emissive monitor and/or television designs use a white emissive OLED array covered by a color filter. Changes to this type of display only require a change to pixel indexing and new six color primary filters. Different color filter arrays are used, placing each subpixel in a position that provides the least light restrictions, color accuracy, and off axis display.

Figure 97:
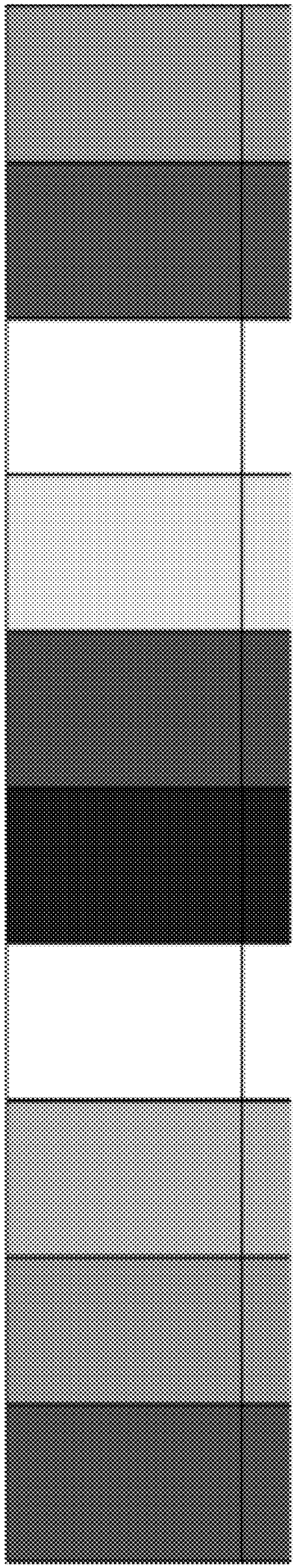

FIG. 97 illustrates one embodiment of an optical filter array for a white OLED display.

Figure 98:
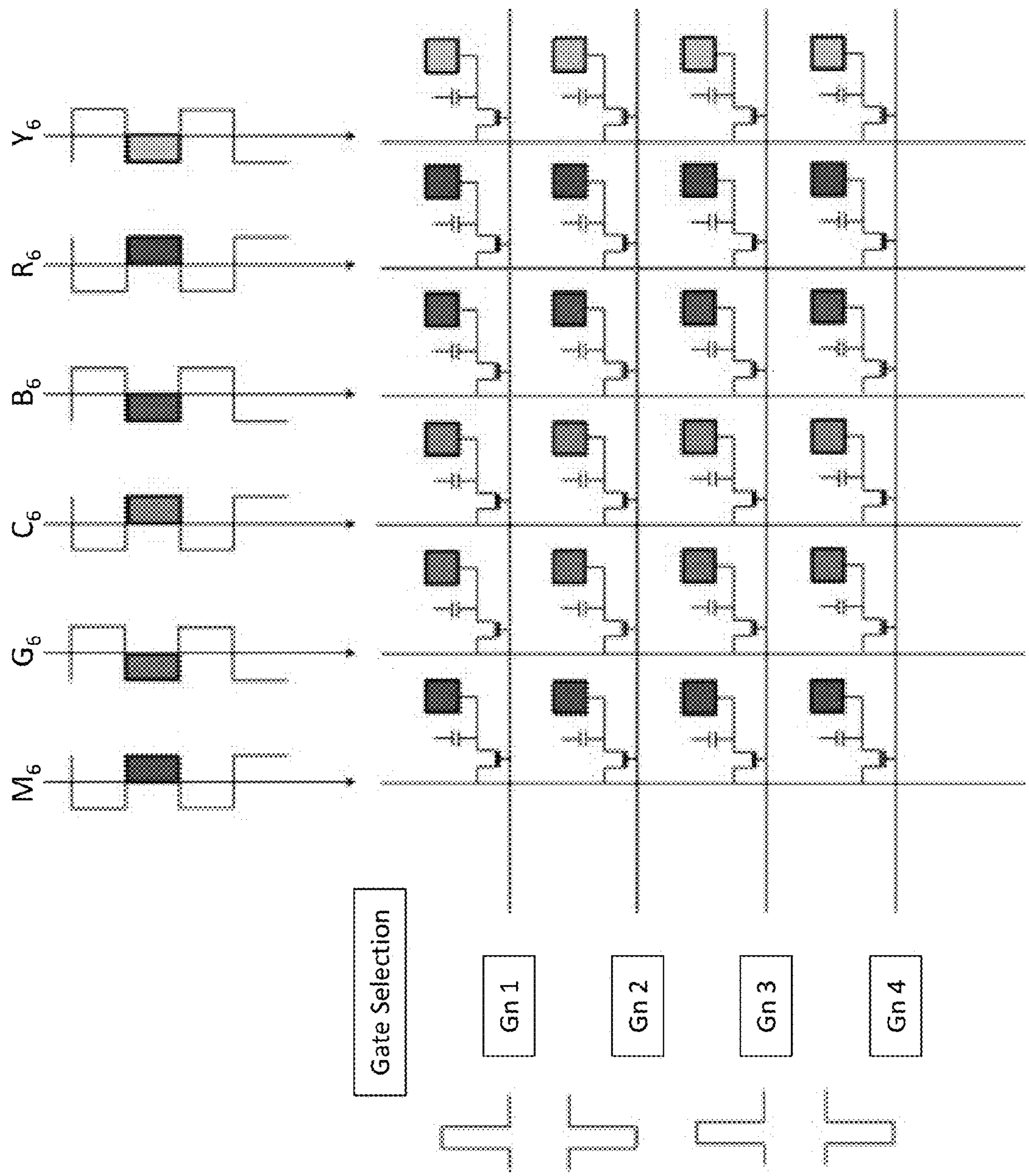

FIG. 98 illustrates one embodiment of a matrix of an LCD drive for a six-primary color system with a backlight illuminated LCD monitor. In yet another embodiment, the display is a backlight illuminated LCD display. The design of an LCD display involves adding the CMY subpixels. Drives for these subpixels are similar to the RGB matrix drives. With the advent of 8K LCD televisions, it is technically feasible to change the matrix drive and optical filter and have a 4K six-primary color TV.

Figure 99:
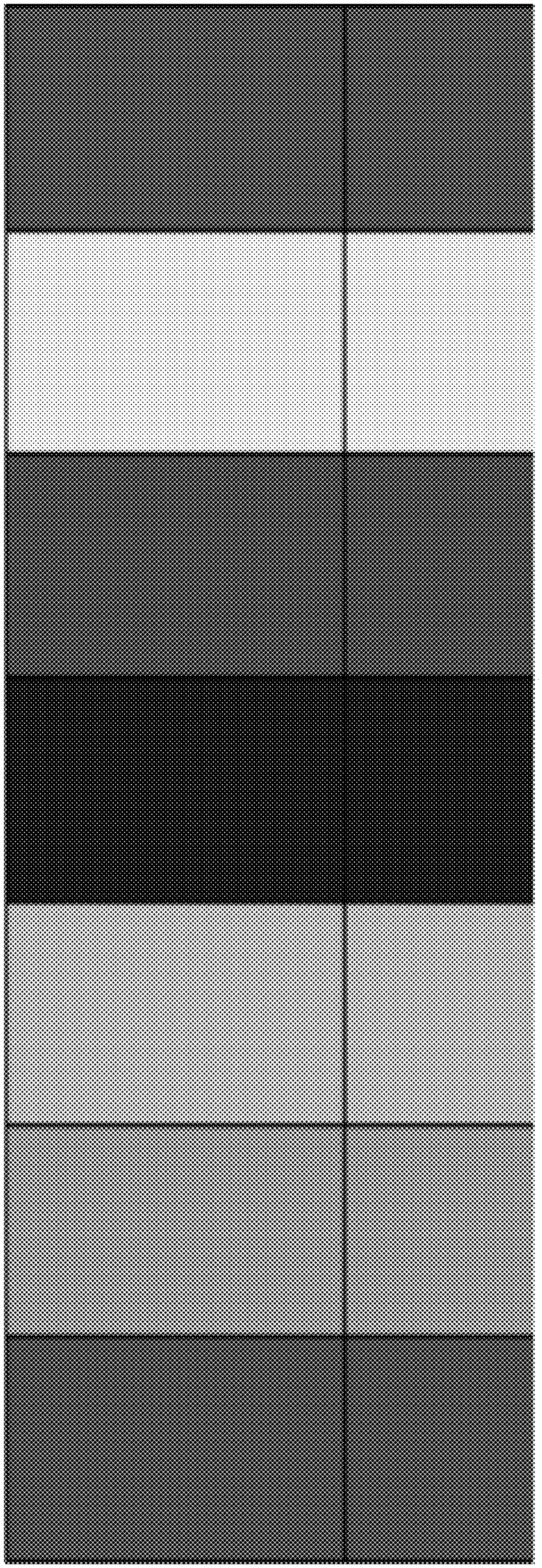

FIG. 99 illustrates one embodiment of an optical filter array for a six-primary color system with a backlight illuminated LCD monitor. The optical filter array includes the additional CMY subpixels.

In yet another embodiment, the display is a direct emissive assembled display. The design for a direct emissive assembled display includes a matrix of color emitters grouped as a six-color system. Individual channel inputs drive each Quantum Dot (QD) element illuminator and/or micro LED element.

Figure 100:
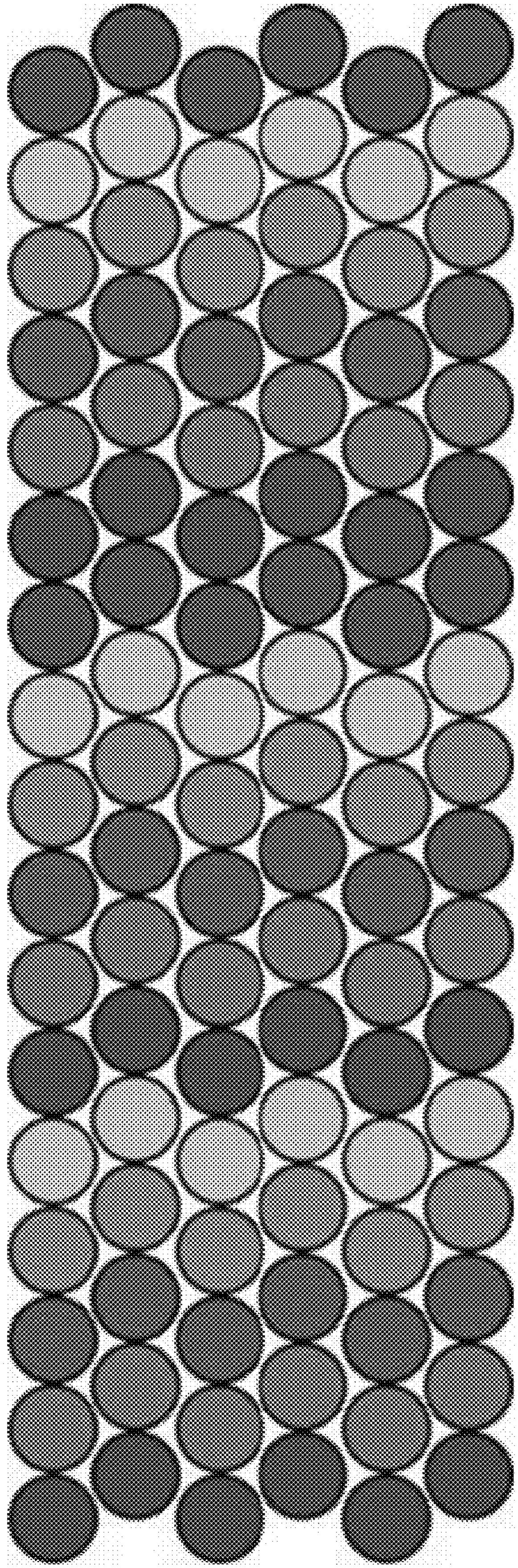

FIG. 100 illustrates an array for a Quantum Dot (QD) display device.

Figure 101:
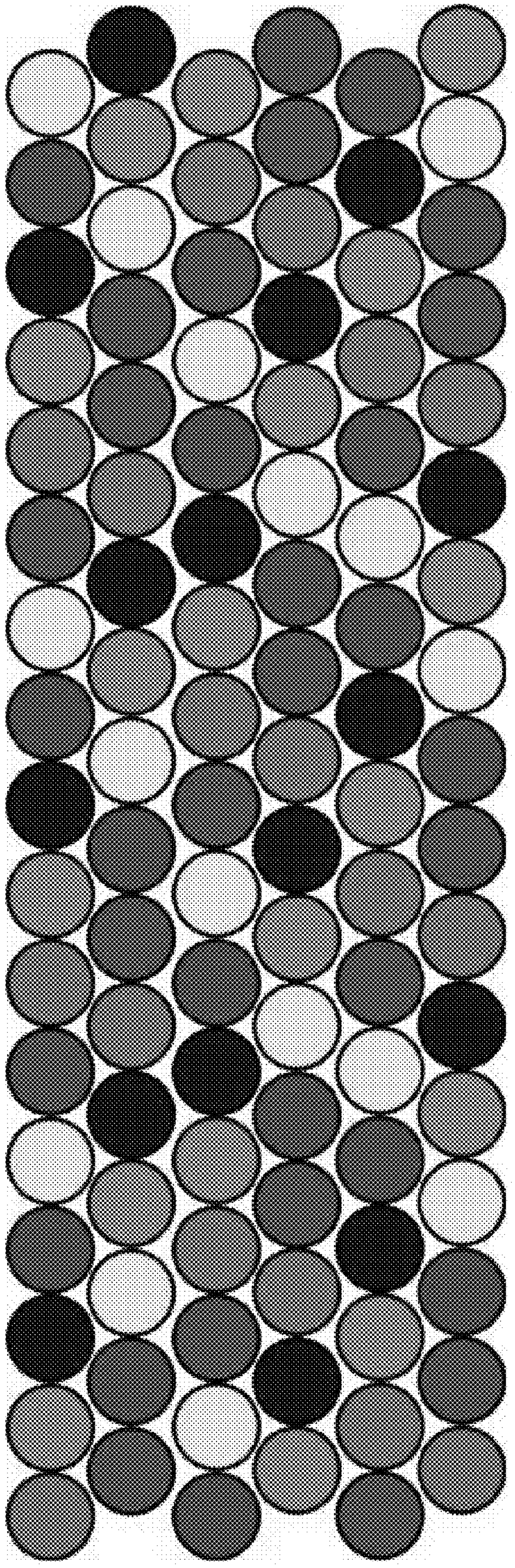

FIG. 101 illustrates one embodiment of an array for a six-primary color system for use with a direct emissive assembled display.

FIG. 102 illustrates one embodiment of a six-primary color system in an emissive display that does not incorporate color filtered subpixels. For LCD and WOLED displays, this is operable to be modified for a six-primary color system by expanding the RGB or WRGB filter arrangement to an RGBCMY matrix. For WRGB systems, the white subpixel is operable to be removed as the luminance of the three additional primaries will replace it. SDI video is input through an SDI decoder. In one embodiment, the SDI decoder outputs to a Y CrCbCcCy-RGBCMY converter. The converter outputs RGBCMY data, with the luminance component (Y) subtracted. RGBCMY data is then converted to RGB data. This RGB data is sent to a scale sync generation component, receives adjustments to image controls, contrast, brightness, chroma, and saturation, is sent to a color correction component, and output to the display panel as LVDS data. In another embodiment the SDI decoder outputs to an SDI Y-R switch component. The SDI Y-R switch component outputs RGBCMY data. The RGBCMY data is sent to a scale sync generation component, receives adjustments to image controls, contrast, brightness, chroma, and saturation, is sent to a color correction component, and output to a display panel as LVDS data.

FIG. 112 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 may house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, notebook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 112 multiple processors 860 and/or multiple buses 868 may be used, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multiprocessor system). Alternatively, some steps or methods may be performed by circuitry that is specific to a given function.

According to various embodiments, the computer system 800 may operate in a networked environment using logical connections to local and/or remote computing devices 820, 830, 840 through a network 810. A computing device 830 may connect to a network 810 through a network interface unit 896 connected to a bus 868. Computing devices may communicate communication media through wired networks, direct-wired connections or wirelessly, such as acoustic, RF, or infrared, through an antenna 897 in communication with the network antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications, or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any deliver media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology, discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for computing devices 820, 830, and 840. The distributed computing devices 820, 830, and 840 are connected to an edge server in the edge computing network based on proximity, availability, latency, bandwidth, and/or other factors.

It is also contemplated that the computer system 800 may not include all of the components shown in FIG. 112 may include other components that are not explicitly shown in FIG. 112 or may utilize an architecture completely different than that shown in FIG. 112. The various illustrative logical blocks, modules, elements, circuits, and algorithms described in connection with the embodiments discussed herein may be implemented as electronic hardware, computer software, or combinations of both. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or positioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A system for displaying a primary color system, comprising:

a set of image data including a set of primary color signals, wherein the set of primary color signals corresponds to a set of values in an International Commission on Illumination (CIE) Yu'v' color space, wherein the set of values in the CIE Yu'v' color space includes a luminance (Y) and two colorimetric coordinates (u',v'), and wherein the two colorimetric coordinates (u',v') are independent from the luminance (Y);

an image data converter, wherein the image data converter includes a digital interface, and wherein the digital interface is operable to encode and decode the set of values in the CIE Yu'v' color space;

at least one non-linear function for processing the set of values in the CIE Yu'v' color space, wherein the at least one non-linear function is applied to data related to the luminance (Y) and data related to the two colorimetric coordinates (u',v'), wherein the at least one non-linear function includes a data rate reduction function with a value between about 0.25 and about 0.9 and/or an inverse data rate reduction function with a value between about 1.1 and about 4; and at least one viewing device;

wherein the at least one viewing device and the image data converter are in network communication;

wherein the encode and the decode includes transportation of processed Yu'v' data, wherein the processed Yu'v' data includes a first channel related to the luminance (Y), a second channel related to a first colorimetric coordinate (u') of the two colorimetric coordinates (u',v'), and a third channel related to the second colorimetric coordinate (v') of the two colorimetric coordinates (u',v'); and wherein the image data converter is operable to convert the set of image data for display on the at least one viewing device.

2. The system of claim 1, wherein the at least one viewing device is operable to display the primary color system based on the set of image data, wherein the primary color system displayed on the at least one viewing device is based on the set of image data.

3. The system of claim 1, wherein the image data converter is operable to convert the set of primary color signals to the set of values in the CIE Yu'v' color space and/or the set of values in the CIE Yu'v' color space to a plurality of color gamuts.

4. The system of claim 1, wherein the image data converter is operable to fully sample the processed Yu'v' data on the first channel and subsample the processed Yu'v' data on the second channel and the third channel.

5. The system of claim 1, wherein the processed Yu'v' data on the first channel, the second channel, and the third channel are fully sampled.

6. The system of claim 1, wherein the encode includes scaling of the two colorimetric coordinates (u',v'), thereby creating a first scaled colorimetric coordinate and a second scaled colorimetric coordinate.

7. The system of claim 6, wherein the scaling includes dividing the first colorimetric coordinate (u') by a first divisor to create the first scaled colorimetric coordinate and dividing the second colorimetric coordinate (v') by a second divisor to create the second scaled colorimetric coordinate, wherein the first divisor is between about 0.55 and about 0.70, and wherein the second divisor is between about 0.53 and about 0.65.

8. The system of claim 1, wherein the decode includes rescaling of data related to the first scaled colorimetric coordinate and data related to the second scaled colorimetric coordinate.

9. The system of claim 8, wherein the rescaling includes multiplying the data related to the first scaled colorimetric coordinate by a first multiplier and multiplying the data related to the second colorimetric coordinate by a second multiplier, wherein the first multiplier is between about 1.42 and about 1.82, and wherein the second multiplier is between about 1.53 and about 1.89.

10. The system of claim 1, wherein the encode includes converting the set of primary color signals to XYZ data and then converting the XYZ data to create the set of values in the CIE Yu'v' color space and/or the decode includes converting the processed Yu'v' data to XYZ data and then converting the XYZ data to a format operable to display on the at least one viewing device.

11. The system of claim 1, wherein the processed Yu'v' data is transported using a standardized transportation format.

12. The system of claim 11, wherein the standardized transportation format is operable to transport RGB data or YCbYCr data.

13. The system of claim 1, wherein the image data converter applies one or more of the at least one non-linear function to encode and/or decode the set of values in the CIE Yu'v' color space.

14. The system of claim 1, wherein the image data converter includes a look-up table.

15. The system of claim 1, wherein the set of image data includes pixel mapping data.

16. A system for displaying a primary color system, comprising:

a set of image data including a set of primary color signals, wherein the set of primary color signals corresponds to a set of values in an International Commission on Illumination (CIE) Yu'v' color space, wherein the set of values in the CIE Yu'v' color space includes a luminance (Y) and two colorimetric coordinates (u',v'), and wherein the two colorimetric coordinates (u',v') are independent from the luminance (Y);

an image data converter, wherein the image data converter includes a digital interface, and wherein the digital interface is operable to encode and decode the set of values in the CIE Yu'v' color space; and at least one non-linear function for processing the set of values in the CIE Yu'v' color space, wherein the at least one non-linear function is applied to data related to the luminance (Y) and data related to the two colorimetric coordinates (u',v'), wherein the at least one non-linear function includes a data rate reduction function with a value between about 0.25 and about 0.9 and/or an inverse data rate reduction function with a value between about 1.1 and about 4;

a set of Session Description Protocol (SDP) parameters; and at least one viewing device;

wherein the at least one viewing device and the image data converter are in network communication;

wherein the encode and the decode includes transportation of processed Yu'v' data, wherein the processed Yu'v' data includes a first channel related to the luminance (Y), a second channel related to a first colorimetric coordinate (u') of the two colorimetric coordinates (u',v'), and a third channel related to the second colorimetric coordinate (v') of the two colorimetric coordinates (u',v'); and wherein the image data converter is operable to convert the set of image data for display on the at least one viewing device.

17. The system of claim 16, wherein the SDP parameters are modifiable.

18. A method for displaying a primary color system, comprising:

providing a set of image data including a set of primary color signals, wherein the set of primary color signals corresponds to a set of values in an International Commission on Illumination (CIE) Yu'v' color space, wherein the set of values in the CIE Yu'v' color space includes a luminance (Y) and two colorimetric coordinates (u',v');

encoding the set of image data in the CIE Yu'v' color space using a digital interface of an image data converter, wherein the image data converter is in network communication with at least one viewing device;

processing the set of image data in the CIE Yu'v' color space by scaling the two colorimetric coordinates (u',v') and applying at least one non-linear function to the luminance (Y) and the scaled two colorimetric coordinates, wherein the at least one non-linear function includes a data rate reduction function with a value between about 0.25 and about 0.9;

decoding the set of image data in the CIE Yu'v' color space using the digital interface of the image data converter; and the image data converter converting the set of image data for display on the at least one viewing device;

wherein the encoding and the decoding include transportation of processed Yu'v' data, wherein the processed Yu'v' data includes a first channel related to the luminance (Y), a second channel related to a first colorimetric coordinate (u') of the two colorimetric coordinates (u',v'), and a third channel related to the second colorimetric coordinate (v') of the two colorimetric coordinates (u',v').

19. The method of claim 18, wherein the scaling of the two colorimetric coordinates includes dividing the first colorimetric coordinate (u') by a first divisor to create a first scaled colorimetric coordinate and data related to the second colorimetric coordinate (v') by a second divisor to create a second scaled colorimetric coordinate, wherein the first divisor is between about 0.55 and about 0.70, and wherein the second divisor is between about 0.53 and about 0.65.

20. The method of claim 18, wherein the decoding of the set of image data includes rescaling data related to the two scaled colorimetric coordinates and applying an inverse of the at least one non-linear function to data related to the luminance (Y) and the data related to the two colorimetric coordinates (u',v'), wherein the inverse of the at least one non-linear function is an inverse data rate reduction function with a value between about 1.1 and about 4.

* * * * *